(12) United States Patent
Mikurak

(10) Patent No.: US 7,130,807 B1
(45) Date of Patent: Oct. 31, 2006

(54) TECHNOLOGY SHARING DURING DEMAND AND SUPPLY PLANNING IN A NETWORK-BASED SUPPLY CHAIN ENVIRONMENT

(75) Inventor: Michael G. Mikurak, Hamilton, NJ (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/444,739

(22) Filed: Nov. 22, 1999

(51) Int. Cl.
G06Q 99/00 (2006.01)
(52) U.S. Cl. ......................................................... 705/7
(58) Field of Classification Search .................... 705/1,
705/7, 8, 10, 26, 37; 700/106; 702/60; 434/249
See application file for complete search history.

(56) References Cited

U.S. PATENT DOCUMENTS

| | | | |
|---|---|---|---|
| 4,491,947 A | 1/1985 | Frank | |
| 4,972,453 A | 11/1990 | Daniel et al. | |
| 4,992,940 A * | 2/1991 | Dworkin | 705/26 |
| 5,109,337 A | 4/1992 | Ferriter et al. | |
| 5,159,685 A | 10/1992 | Kung | |
| 5,204,821 A * | 4/1993 | Inui et al. | 700/106 |
| 5,297,031 A | 3/1994 | Gutterman et al. | |
| 5,483,637 A | 1/1996 | Winokur et al. | |
| 5,493,689 A | 2/1996 | Waclawsky et al. | |
| 5,495,610 A | 2/1996 | Shing et al. | |
| 5,513,343 A | 4/1996 | Sakano et al. | |
| 5,539,877 A | 7/1996 | Winokur et al. | |
| 5,610,839 A | 3/1997 | Karolak et al. | |
| 5,621,663 A | 4/1997 | Skagerling | |
| 5,630,070 A | 5/1997 | Dietrich et al. | |
| 5,646,864 A | 7/1997 | Whitney | |
| 5,655,068 A | 8/1997 | Opoczynksi | |
| 5,694,546 A | 12/1997 | Reisman | |
| 5,729,735 A | 3/1998 | Meyering | |
| 5,761,502 A | 6/1998 | Jacobs | |
| 5,764,543 A | 6/1998 | Kennedy | |
| 5,768,501 A | 6/1998 | Lewis | |
| 5,805,458 A * | 9/1998 | McNamara et al. | 702/60 |
| 5,819,028 A | 10/1998 | Manghirmalani et al. | |
| 5,820,770 A | 10/1998 | Cohen et al. | |
| 5,832,196 A | 11/1998 | Croslin et al. | |
| 5,835,911 A | 11/1998 | Nakagawa | |
| 5,864,483 A | 1/1999 | Brichta | |

(Continued)

FOREIGN PATENT DOCUMENTS

WO     WO 97/24691    * 7/1997

OTHER PUBLICATIONS

Three steps you can take today to strengthen your supply chain. Chandler, Mark. Apparel Industry Magazine, v59n9, pp. 146-148, Sep. 1998.*

(Continued)

Primary Examiner—Susanna M. Diaz
(74) Attorney, Agent, or Firm—Oppenheimer Wolff & Donnelly LLP

(57) ABSTRACT

The present disclosure provides for supplying collaborative planning by a computerized framework manager. Steps include furnishing network connections and collecting supply and demand information from business entities. Such information is analyzed and used to facilitate planning among the business entites. The network provides data access for multiple data sources and the network is used to store capacity data. The computerized framework manager conducts reverse inventory management of the business entities through the collection of data; analysis of data is then used to predict future demand, and predicted future demand is used to forecast costs to manufacturers, from which suggestions regarding optimization is made.

3 Claims, 130 Drawing Sheets

U.S. PATENT DOCUMENTS

| | | | |
|---|---|---|---|
| 5,864,662 A | | 1/1999 | Brownmiller et al. |
| 5,883,955 A | | 3/1999 | Ronning |
| 5,890,175 A | | 3/1999 | Wong et al. |
| 5,893,905 A | | 4/1999 | Main et al. |
| 5,895,454 A | | 4/1999 | Harrington |
| 5,907,490 A | | 5/1999 | Oliver |
| 5,946,662 A | * | 8/1999 | Ettl et al. ................. 705/8 |
| 5,953,707 A | * | 9/1999 | Huang et al. ............. 705/10 |
| 5,974,391 A | | 10/1999 | Hongawa |
| 5,974,395 A | | 10/1999 | Bellini et al. |
| 5,974,403 A | | 10/1999 | Takriti et al. |
| 5,987,423 A | | 11/1999 | Arnold et al. |
| 5,999,525 A | | 12/1999 | Krishnaswamy et al. |
| 6,006,016 A | | 12/1999 | Faigon et al. |
| 6,006,196 A | | 12/1999 | Feigin et al. |
| 6,006,251 A | | 12/1999 | Toyouchi |
| 6,058,426 A | | 5/2000 | Godwin et al. |
| 6,067,525 A | | 5/2000 | Johnson et al. |
| 6,104,868 A | | 8/2000 | Peters et al. |
| 6,115,690 A | * | 9/2000 | Wong .......................... 705/7 |
| 6,151,582 A | | 11/2000 | Huang et al. |
| 6,151,643 A | | 11/2000 | Cheng |
| 6,157,915 A | * | 12/2000 | Bhaskaran et al. ............. 705/7 |
| 6,167,378 A | | 12/2000 | Weber, Jr. |
| 6,195,697 B1 | | 2/2001 | Bowman-Amuah |
| 6,199,204 B1 | | 3/2001 | Donohue |
| 6,253,339 B1 | | 6/2001 | Tse et al. |
| 6,256,676 B1 | | 7/2001 | Taylor et al. |
| 6,289,462 B1 | | 9/2001 | Mcnabb et al. |
| 6,349,237 B1 | | 2/2002 | Koren et al. |
| 6,351,738 B1 | * | 2/2002 | Clark ......................... 705/37 |
| 6,363,411 B1 | * | 3/2002 | Dugan et al. ............... 709/202 |
| 6,405,364 B1 | | 6/2002 | Bowman-Amuah |
| 6,411,922 B1 | | 6/2002 | Clark et al. |
| 6,425,006 B1 | | 7/2002 | Chari et al. |
| 6,516,350 B1 | | 2/2003 | Lumelsky |
| 6,524,109 B1 | * | 2/2003 | Lacy et al. ................. 434/219 |
| 6,731,625 B1 | * | 5/2004 | Eastep et al. ............... 370/352 |
| 2001/0011222 A1 | | 8/2001 | McLaughlin et al. |

OTHER PUBLICATIONS

International comparisons of supply chain management in grocery retailing. Fernie, John. Service industries Journal, v15n4, pp. 134-147, Oct. 1995.*

Press Release from Logility's archived web site. "Logility Pioneers True Internet Collaboration with i-Community." Jul. 13, 1999.*

Bartholomew, Doug. "The Infrastructure." Industry Week, vol. 248, No. 16, pp. 62-66, Sep. 6, 1999.*

"Network Trends: Internet Technology Improves Supply Chain Management". Asia computer Trends. Singapore. Dec. 14, 1998.

"Network Two Chooses Netcool to Support Ongoing Expansion and Proactive Management Initiative", Business Wire, Nov. 2, 1998, 2 pages, [Retrieved on Mar. 19, 2002], Retrieved from: Proquest.

"Proactive Networks Joins Check Point Software Technologies; OPSEC Alliance", Nov. 9, 1998, 3 pages, [Retrieved on Mar. 19, 20002], Retrieved from: http://www.checkpoint.com/press/partners/1998/proactive110998.html.

"Proactive Neworks Offers TelAlert-Pronto Watch 2.5 Integration", business Wire, Nov. 2, 1998, 2 pages, [retrived on Mar. 19, 2002], Retrieved from: Proquest.

"User's Guide for Microsoft Project." 1995; Microsoft Corporation. pp. 3,4, 14-16, 82-84, 91, 130, 132-134, 175, 209. Document No. Pj62476-0895.

*Dayco* Statement Regarding Related Applications.

* cited by examiner

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CR ID ||||||| CD ID |||||||||
| 01 | TP1 BITS 0-15 ||||||||||||||||
| 02 | TP1 BITS 16-31 ||||||||||||||||
| 03 | TP3 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL. ORIGINATING PORT 0-15 ||||||||||||||||
| 07 | OP | TPL. TERMINATING PORT 0-14 |||||||||||||||
| 08 | TP | OTG. ORIGINATING TRUNK GROUP |||||||||||||| TT |
| 09 | TERMINATING TRUNK GROUP (1-12) |||||||||||| TP3Q ||||
| 10 | TP6Q | ACTION CODE |||||| OTC ||||| TTC ||||
| 11 | ID1 ||||| ID2 ||||| ANI INDEX ||||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| A1 |||| A2 ||||
| 15 | A3 |||| A4 |||| A5 |||| A6 ||||
| 16 | A7 |||| A8 |||| A9 |||| A10 ||||
| 17 | A11 |||| A12 |||| A13 |||| A14 ||||
| 18 | A15 |||| A16 |||| A17 |||| A18 ||||
| 19 | A19 |||| A20 |||| A21 |||| A22 ||||
| 20 | D1 |||| D2 |||| D3 |||| D4 ||||
| 21 | D5 |||| D6 |||| D7 |||| D8 ||||
| 22 | D9 |||| D10 |||| D11 |||| D12 ||||
| 23 | D13 |||| D14 |||| D15 |||| D16 ||||
| 24 | D17 |||| PTD1 |||| PTD2 |||| PTD3 ||||
| 25 | PTD4 |||| PTD5 |||| PTD6 |||| PTD7 ||||
| 26 | PTD8 |||| PTD9 |||| PTD10 ||||||||
| 27 | FC |||| TMC |||| KAT |||| TP7Q ||||
| 28 | EC, ENTRY CODE ||||||| PD ||| ND ID ||| DIVID |||
| 29 | D0 | CC | IN || SC | CD | DE | DT || SA || NOCLI |||||
| 30 | CN1 |||| CN2 |||| CN3 |||| CN4 ||||
| 31 | ACIF ||| SS7 RELEASE CODE |||||||| NCIDSEQ ||| NL | RS |
| BIT | 00 | 01 | 02 | 03 | 04 | 05 | 06 | 07 | 08 | 09 | 10 | 11 | 12 | 13 | 14 | 15 |

FIG. 29

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c}{CR ID} | | | \multicolumn{8}{c}{CD ID} | | | | | | | |
| 01 | \multicolumn{16}{c}{TP1 BITS 0-15} | | | | | | | | | | | | | | | |
| 02 | \multicolumn{16}{c}{TP1 BITS 16-31} | | | | | | | | | | | | | | | |
| 03 | \multicolumn{13}{c}{TP3 BITS 0-12} | | | | | | | | | | | | | \multicolumn{3}{c}{TP6 0-2} | | |
| 04 | \multicolumn{10}{c}{TP6 BITS 3-12} | | | | | | | | | | \multicolumn{6}{c}{TP7 BITS 0-5} | | | | | |
| 05 | \multicolumn{16}{c}{TP7 BITS 6-21} | | | | | | | | | | | | | | | |
| 06 | \multicolumn{16}{c}{OPL. ORIGINATING PORT 0-15} | | | | | | | | | | | | | | | |
| 07 | \multicolumn{1}{c}{OP} | | | | | | | | | | | | | | | |

| Word | Bits 00–15 |
|---|---|
| 00 | CR ID \| CD ID |
| 01 | TP1 BITS 0-15 |
| 02 | TP1 BITS 16-31 |
| 03 | TP3 BITS 0-12 \| TP6 0-2 |
| 04 | TP6 BITS 3-12 \| TP7 BITS 0-5 |
| 05 | TP7 BITS 6-21 |
| 06 | OPL. ORIGINATING PORT 0-15 |
| 07 | OP \| TPL. TERMINATING PORT 0-14 |
| 08 | TP \| OTG. ORIGINATING TRUNK GROUP \| TT |
| 09 | TERMINATING TRUNK GROUP (1-12) \| TP3Q |
| 10 | TP6Q \| ACTION CODE \| OTC \| TTC |
| 11 | ID1 \| ID2 \| ANI INDEX |
| 12 | CLI 1 \| CLI 2 \| CLI 3 \| CLI 4 |
| 13 | CLI 5 \| CLI 6 \| CLI 7 \| CLI 8 |
| 14 | CLI 9 \| CLI 10 \| CLI 11 \| CLI 12 |
| 15 | CLI 13 \| CLI 14 \| CLI 15 \| A1 |
| 16 | A2 \| A3 \| A4 \| A5 |
| 17 | A6 \| A7 \| A8 \| A9 |
| 18 | A10 \| A11 \| A12 \| A13 |
| 19 | A14 \| A15 \| A16 \| A17 |
| 20 | A18 \| A19 \| A20 \| A21 |
| 21 | A22 \| A23 \| A24 \| A25 |
| 22 | A26 \| A27 \| A28 \| A29 |
| 23 | A30 \| A31 \| A32 \| A33 |
| 24 | A34 \| A35 \| A36 \| A37 |
| 25 | A38 \| A39 \| A40 \| A41 |
| 26 | A42 \| A43 \| A44 \| A45 |
| 27 | FC \| TMC \| KAT \| TP7Q |
| 28 | EC, ENTRY CODE \| PD \| ND ID \| DIVID |
| 29 | DO \| MN \| CC \| IN \| SC \| CD \| DE \| DT \| SA \| NOCLI |
| 30 | CN1 \| CN2 \| CN3 \| CN4 |
| 31 | ACIF \| SS7 RELEASE CODE \| NCIDSEQ \| NL \| RS |

FIG. 30

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 32 | | | | | | | | | | | | | | | | |
| 33 | | | | | | | | | | | | | | | | |
| 34 | ID1 | | | | ID2 | | | | ID3 | | | | ID4 | | | |
| 35 | ID5 | | | | ID6 | | | | ID7 | | | | ID8 | | | |
| 36 | ID9 | | | | ID10 | | | | ID11 | | | | ID12 | | | |
| 37 | ID13 | | | | ID14 | | | | ID15 | | | | ID16 | | | |
| 38 | ID17 | | | | ID18 | | | | ID19 | | | | ID20 | | | |
| 39 | ID21 | | | | ID22 | | | | ID23 | | | | ID24 | | | |
| 40 | ID25 | | | | PTD1 | | | | PTD2 | | | | PTD3 | | | |
| 41 | PTD4 | | | | PTD5 | | | | PTD6 | | | | PTD7 | | | |
| 42 | PTD8 | | | | PTD9 | | | | PTD10 | | | | PTD11 | | | |
| 43 | PTD12 | | | | PTD13 | | | | PTD14 | | | | PTD15 | | | |
| 44 | EIR CALL TYPE | | | | | | | | OVFAL | | | | | | | CB |
| 45 | OVFCL | | | | DTA 1 | | | | DTA 2 | | | | DTA 3 | | | |
| 46 | DTA 4 | | | | DTA 5 | | | | DTA 6 | | | | DTA 7 | | | |
| 47 | DTA 8 | | | | DTA 9 | | | | DTA 10 | | | | DTA 11 | | | |
| 48 | DTA 12 | | | | DTA 13 | | | | DTA 14 | | | | DTA 15 | | | |
| 49 | OVFC | | | | | | | | DTAC | | | | | NCID | | |
| 50 | NETWORK CALL IDENTIFIER (NCID) | | | | | | | | | | | | | | | |
| 51 | NETWORK CALL IDENTIFIER (NCID) | | | | | | | | | | | | | | | |
| 52 | NETWORK CALL IDENTIFIER (NCID) | | | | | | | | | | | | | | | |
| 53 | NETWORK CALL IDENTIFIER (NCID) | | | | | | | | | | | | | | | |
| 54 | NETWORK CALL IDENTIFIER (NCID) | | | | | | | | | | | | | | | |
| 55 | | | | | | | | | | | | | | | | |
| 56 | | | | | | | | | | | | | | | | |
| 57 | | | | | | | | | | | | | | | | |
| 58 | | | | | | | | | | | | | | | | |
| 59 | | | | | | | | | | | OUS TYPE | | | OUIE | | |
| 60 | OUIE COUNT CONT. | | | | | | | | | | | | | OVFCS | | |
| 61 | ORIGINATING NX64 BITMAP (1-16) | | | | | | | | | | | | | | | |
| 62 | ORIG NX64 BITMAP (17-24) | | | | | | | | TERM NX64 BITMAP (17-24) | | | | | | | |
| 63 | TERMINATING NX64 BITMAP (9-24) | | | | | | | | | | | | | | | |

FIG. 31

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{l}{CR ID} | | | | | | | | | | | |

MSB ... LSB

| WORD | BITS 00–15 |
|---|---|
| 00 | CR ID \| CD ID |
| 01 | TP1 BITS 0-15 |
| 02 | TP1 BITS 16-31 |
| 03 | TP4 BITS 0-12 \| TP6 0-2 |
| 04 | TP6 BITS 3-12 \| TP7 BITS 0-5 |
| 05 | TP7 BITS 6-21 |
| 06 | OPL. ORIGINATING PORT 0-15 |
| 07 | OP \| TPL. TERMINATING PORT 0-14 |
| 08 | TP \| OTG. ORIGINATING TRUNK GROUP \| TT |
| 09 | TERMINATING TRUNK GROUP (1-12) \| TP3Q |
| 10 | TP6Q \| ACTION CODE \| OTC \| TTC |
| 11 | ID1 \| ID2 \| ONACC \| TNACC |
| 12 | CLI 1 \| CLI 2 \| CLI 3 \| CLI 4 |
| 13 | CLI 5 \| CLI 6 \| CLI 7 \| CLI 8 |
| 14 | CLI 9 \| CLI 10 \| A1 \| A2 |
| 15 | A3 \| A4 \| A5 \| A6 |
| 16 | A7 \| A8 \| A9 \| A10 |
| 17 | A11 \| A12 \| A13 \| A14 |
| 18 | A15 \| A16 \| A17 \| A18 |
| 19 | A19 \| A20 \| A21 \| A22 |
| 20 | D1 \| D2 \| D3 \| D4 |
| 21 | D5 \| D6 \| D7 \| D8 |
| 22 | D9 \| D10 \| D11 \| D12 |
| 23 | D13 \| D14 \| D15 \| D16 |
| 24 | D17 \| OPIN |
| 25 | OPIN \| TPS BITS 0-12 |
| 26 | RN1 \| RN2 \| RN3 \| RN4 |
| 27 | FC \| TMC \| KAT \| TP7Q |
| 28 | EC, ENTRY CODE \| PD \| ND ID \| DIVID |
| 29 | D0 \| CC \| IN \| SC \| CD \| DE \| DT \| PP \| XC \| SA \| NOCLI |
| 30 | CN1 \| CN2 \| CN3 \| CN4 |
| 31 | ACIF \| SS7 RELEASE CODE \| NCIDSEQ \| NL \| RS |

FIG. 32

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c} CR ID | | | | | | CD ID | | | | | |
| 01 | TP1 BITS 0-15 |||||||||||||||
| 02 | TP1 BITS 16-31 |||||||||||||||
| 03 | TP4 BITS 0-12 ||||||||||||| TP6 0-2 |||
| 04 | TP6 BITS 3-12 |||||||||| TP7 BITS 0-5 ||||||
| 05 | TP7 BITS 6-21 |||||||||||||||
| 06 | OPL. ORIGINATING PORT 0-15 |||||||||||||||
| 07 | OP | TPL. TERMINATING PORT 0-14 |||||||||||||||
| 08 | TP || OTG. ORIGINATING TRUNK GROUP ||||||||||||| TT |
| 09 | TERMINATING TRUNK GROUP (1-12) |||||||||| TP3Q |||||
| 10 | TP6Q || ACTION CODE |||||| OTC ||||| TTC |||
| 11 | ID1 |||| ID2 |||| ONACC |||| TNACC ||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| CLI 11 |||| CLI 12 ||||
| 15 | CLI 13 |||| CLI 14 |||| CLI 15 |||| A1 ||||
| 16 | A2 |||| A3 |||| A4 |||| A5 ||||
| 17 | A6 |||| A7 |||| A8 |||| A9 ||||
| 18 | A10 |||| A11 |||| A12 |||| A13 ||||
| 19 | A14 |||| A15 |||| A16 |||| A17 ||||
| 20 | A18 |||| A19 |||| A20 |||| A21 ||||
| 21 | A22 |||| A23 |||| A24 |||| A25 ||||
| 22 | A26 |||| A27 |||| A28 |||| A29 ||||
| 23 | A30 |||| A31 |||| A32 |||| A33 ||||
| 24 | A34 |||| A35 |||| A36 |||| A37 ||||
| 25 | A38 |||| A39 |||| A40 |||| A41 ||||
| 26 | A42 |||| A43 |||| A44 |||| A45 ||||
| 27 | FC |||| TNC |||| KAT |||| TF7Q ||||
| 28 | EC, ENTRY CODE |||||||| PD ||| ND ID ||| DIVID ||
| 29 | DO | MM | CC | IN | SC | CD | DE | DT | PP | XC | SA | NOCLI |||||
| 30 | CN1 |||| CN2 |||| CN3 |||| CN4 ||||
| 31 | ACIF |||| SS7 RELEASE CODE |||||||| NCIDSEQ ||| NL | RS |

BITS 00 01 02 03 04 05 06 07 08 09 10 11 12 13 14 15
EOSR/EPOSR FORMAT

FIG. 33

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 32 | \multicolumn{8}{c}{T & C GUEST 1} | | | | | | | | | T & C GUEST 2 | | | | | | | |
| 33 | T & C GUEST 3 |||||||| T & C GUEST 4 ||||||||
| 34 | ID1 |||| ID2 |||| ID3 |||| ID4 ||||
| 35 | ID5 |||| ID6 |||| ID7 |||| ID8 ||||
| 36 | ID9 |||| ID10 |||| ID11 |||| ID12 ||||
| 37 | ID13 |||| ID14 |||| ID15 |||| ID16 ||||
| 38 | ID17 |||| ID18 |||| ID19 |||| ID20 ||||
| 39 | ID21 |||| ID22 |||| ID23 |||| ID24 ||||
| 40 | ID25 |||| PTD1 |||| PTD2 |||| PTD3 ||||
| 41 | PTD4 |||| PTD5 |||| PTD6 |||| PTD7 ||||
| 42 | PTD8 |||| PTD9 |||| PTD10 |||| PTD11 ||||
| 43 | PTD12 |||| PTD13 |||| PTD14 |||| PTD15 ||||
| 44 | EIR CALL TYPE ||||||| OVFAL |||||||| CB |
| 45 | OVFCL |||| DTA1 |||| DTA2 |||| DTA3 ||||
| 46 | DTA4 |||| DTA5 |||| DTA6 |||| DTA7 ||||
| 47 | DTA8 |||| DTA9 |||| DTA10 |||| DTA11 ||||
| 48 | DTA12 |||| DTA13 |||| DTA14 |||| DTA15 ||||
| 49 | OVFC |||||| DTAC ||||||| NCID |||
| 50 | NETWORK CALL IDENTIFIER (NCID) ||||||||||||||||
| 51 | NETWORK CALL IDENTIFIER (NCID) ||||||||||||||||
| 52 | NETWORK CALL IDENTIFIER (NCID) ||||||||||||||||
| 53 | NETWORK CALL IDENTIFIER (NCID) ||||||||||||||||
| 54 | NETWORK CALL IDENTIFIER (NCID) ||||||||||||||||
| 55 | T & C ROOM 1 |||||||| T & C ROOM 2 ||||||||
| 56 | T & C ROOM 3 |||||||| T & C ROOM 4 ||||||||
| 57 | T & C ROOM 5 |||||||| T & C ROOM 6 ||||||||
| 58 | EAC1 |||| EAC2 |||| EAC3 |||| EAC4 ||||
| 59 | EAC5 |||| EAC6 |||| EAC7 |||| EAC8 ||||
| 60 | EAC9 |||| EAC10 |||| EAC11 |||| EAC12 ||||
| 61 | | OPIN ||||||||||||| OVFCS |||
| 62 | TP5-OPERATOR RELEASE ||||||||||||| | | |
| 63 | RN1 |||| RN2 |||| RN3 |||| RN4 ||||

FIG. 34

| BIT | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c}{CR ID} | \multicolumn{10}{c}{SYNC WORD (MINUS 2, OCTAL 7776)} |
| 01 | \multicolumn{16}{c}{CDID, CALL DISCONNECT I.D. NUMBER (0-15)} |
| 02 | \multicolumn{16}{c}{CDID, CALL DISCONNECT I.D. NUMBER (16-31)} |
| 03 | \multicolumn{6}{c}{SWID 1} | \multicolumn{5}{c}{SWID 2} | \multicolumn{5}{c}{SWID 3} |
| 04 | \multicolumn{8}{c}{ST-SWITCH TYPE} | \multicolumn{8}{c}{EQ-EVENT QUALIFIER} |
| 05 | \multicolumn{16}{c}{SERIT-SER EVENT TIME (0-15)} |
| 06 | \multicolumn{16}{c}{SERIT-SER EVENT TIME (16-31)} |
| 07 | | | | | \multicolumn{12}{c}{FCDID-FIRST RECORD CDID (12 LSAs)} |
| 08 | | | | | \multicolumn{12}{c}{LCDID-LAST RECORD CDID (12 LSAs)} |
| 09 | | | | | \multicolumn{12}{c}{NCDID-NEXT RECORD CDID (12 LSAs)} |
| 10 | \multicolumn{16}{c}{NBSN-NEMAS BLOCK SEQUENCE NUMBER} |
| 11 | \multicolumn{16}{c}{PT-PREVIOUS TIME (0-15)} |
| 12 | \multicolumn{16}{c}{PT-PREVIOUS TIME (16-31)} |
| 13 | SI | \multicolumn{15}{c}{TIME OFFSET} |
| 14 | | | | | | | | | | | | | | | | |
| 15 | | | | | | | | | | | | | | | | |
| 16 | \multicolumn{8}{c}{SOFTWARE LOAD ID1} | \multicolumn{8}{c}{SOFTWARE LOAD ID2} |
| 17 | \multicolumn{8}{c}{SOFTWARE LOAD ID3} | \multicolumn{8}{c}{SOFTWARE LOAD ID4} |
| 18 | \multicolumn{8}{c}{SOFTWARE LOAD ID5} | \multicolumn{8}{c}{SOFTWARE LOAD ID6} |
| 19 | \multicolumn{8}{c}{LAST PATCHS/PR RLS1} | \multicolumn{8}{c}{LAST PATCHS/PR RLS2} |
| 20 | \multicolumn{5}{c}{QCDR} | \multicolumn{6}{c}{QSCDR} | | | | | |
| 21 | \multicolumn{5}{c}{QPMR} | \multicolumn{6}{c}{QSPMR} | | | | | |
| 22 | \multicolumn{5}{c}{QOSR} | \multicolumn{6}{c}{QSOSR} | | | | | |
| 23 | \multicolumn{5}{c}{QPOSR} | \multicolumn{6}{c}{QSPOSR} | | | | | |
| 24 | \multicolumn{5}{c}{QSER} | \multicolumn{6}{c}{CNPN} | | | | | |
| 25 | \multicolumn{16}{c}{CDR THROTTLE START TIME (0-15)} |
| 26 | \multicolumn{16}{c}{CDR THROTTLE START TIME (16-31)} |
| 27 | \multicolumn{16}{c}{CDR THROTTLE STOP TIME (0-15)} |
| 28 | \multicolumn{16}{c}{CDR THROTTLE STOP TIME (16-31)} |
| 29 | | | | | | | | | | | | \multicolumn{5}{c}{FORMAT VER.} |
| 30 | \multicolumn{16}{c}{THROTTLE COUNT (0-15)} |
| 31 | \multicolumn{16}{c}{THROTTLE COUNT (16-31)} |

FIG. 35

TECHNOLOGY SHARING DURING DEMAND AND SUPPLY PLANNING IN A NETWORK-BASED SUPPLY CHAIN ENVIRONMENT

The present application is related to and claims the benefit of U.S. application Ser. No. 09/444,886 entitled "SYSTEM, METHOD AND ARTICLE OF MANUFACTURE FOR REVERSE INVENTORY MANAGEMENT DURING DEMAND AND SUPPLY PLANNING IN A NETWORK-BASED SUPPLY CHAIN ENVIRONMENT" filed Nov. 22, 1999 and incorporated herein by reference.

FIELD OF INVENTION

The present invention relates to e-Commerce and more particularly to technology sharing during demand and supply planning in a network-based supply chain environment.

BACKGROUND OF INVENTION

The ability to quickly, easily and efficiently communicate has always been a critical component, if not a necessity, for successful business operations. Today, as the global economy continues to expand, the ability to communicate is even more important. In partial response to these demands, sophisticated telecommunications equipment has been developed that permits users to quickly and easily place, receive, transfer and switch telephone calls as well as provide advanced features a such as call accounting and voice messaging functionality. As these features have become widely available in local telecommunications equipment, such as private branch exchange (PBX) telephone switches, central offices, key and hybrid telephone systems (small telecommunications switches), call accounting systems, voice messaging systems, computer telephony interface (CTI) devices, automatic call distribution (ACD) devices, internet servers, etc., the demand for and installation of these systems has continued to expand. Often, a vast number of sites have layered or "integrated" two or more of the aforementioned devices and rarely are these different devices using the same operating system or of the same brand. More often, these differing devices include a mixture of operating systems and brands.

Such a mix of advanced telecommunications equipment, however, still typically relies upon a significant amount of manual human interaction to install, setup, operate, modify and maintain. Specifically, when a new telephone switch such as a PBX is to be installed at a facility, not only must the physical equipment itself be installed, but the equipment must be configured and programmed to operate as desired by the users of the facility. In fact, as more and more advanced features have become available in the equipment, the burden on the equipment installer to initially setup and configure these features for the specific needs of the end user and the burden on the technician in maintaining and modifying the equipment, the associated cable records for the equipment, and cable and service activities, has also increased.

When a telephone switch is accompanied by other telecommunications equipment, such as voice messaging systems, call accounting systems, CTI devices, wireless communication servers, or ACD devices, installation inconveniences are still further multiplied. Specifically, many of these ancillary pieces of equipment require additional entry of user information that is duplicative of information already entered into the main telephone switching equipment. In such case, not only must a technician program the main telecommunications switch, but additional time (and money) must be spent for programming ancillary equipment with similar information. Typically, these systems must be perfectly synchronized with each other or problems will occur. As a result, the total cost of the installation is greatly increased and data entry error rates are greatly increased.

To further complicate the installation and management of this equipment, each discrete change to one component of a telecommunications system often requires additional, similar changes to several other components. Furthermore, these additional changes typically must be done in a specific order and, since the operating system design of each of the telecommunications devices often changes from manufacturer to manufacturer and from device to device, by using an entirely different command structure for each different component. Therefore, when done manually, a technician must remember different command structures for each of the devices that require programming and also must remember the order in which the changes should be made and further may require different terminals, passwords, procedures, software, etc. Thus, a highly skilled technician having familiarity with all of the various types of equipment that make up the telecommunications system must perform these changes, or as is more common, multiple technicians are required. Clearly, with even a limited number of devices that require installation, maintenance, or programming, the likelihood of an error is greatly increased.

Since modern telecommunications equipment provides substantial flexibility in programming to accommodate varying preferences of different users, it is often necessary to begin the installation of such equipment by surveying users as to their desires and preferences so that these can be accurately reflected through programming of the equipment. This is typically done by distributing a questionnaire to each user to receive information sufficient to allow the equipment to be properly configured. Thus, not only is there a substantial time commitment needed to review and enter the information received on such questionnaires into the equipment, but significant effort on the part of each and every user is also required to complete the questionnaires. Typically, collection of this data and entry of it must wait until the system is installed, while in the present invention described below, this information can be stored externally, checked for omissions, checked for errors or duplications and processed months in advance.

Such disadvantages are particularly highlighted when an outdated PBX or central office system is replaced with an improved system, or a change is made in a present system. In such case each user is typically surveyed as to their preferences, as above, and this information is manually re-entered after installation of the improved PBX or central office system. Thus, since equipment upgrades impact each and every user in a facility, a significant devotion of resources is required. As a result, the benefits of advanced features provided by improved telecommunications equipment often does not outweigh the installation costs and thus many organizations either do not upgrade their equipment, or delay such upgrades as long as possible.

There is thus a need for a supply chain intermediary to overcome these disadvantages, particularly in an e-Commerce environment.

SUMMARY OF INVENTION

The present disclosure provides for a computerized framework manager to supply collaborative planning over a network. The computerized framework manager furnishes connections to a network for use by a plurality of business entities. The framework manager then receives from one business entity information relating to demand of the business entity's offerings. Information is further received from a second business entity relating to its supply of offerings. This information is analyzed by the framework manager to plan for future supply and demand of said offerings; further the framework manager uses the network to provide data access from multiple sources. Further, the framework manager uses the network to store capacity data. Additionally, the framework manager conducts reverse inventory management of the first and second business entitles, wherein it uses the network to collect data regarding services offered and supplied, analyzes such data collected to determine the statute of a service, using such status to predict future demand, using such status to project manufacturer offerings, and suggesting to the manufacturer changes to optimize supply and costs of manufacturer offerings.

DESCRIPTION OF THE DRAWINGS

The foregoing and other objects, aspects and advantages are better understood from the following detailed description of a preferred embodiment of the invention with reference to the drawings, in which:

FIG. 29 illustrates the CDR and PNR call record formats in accordance with a preferred embodiment;

FIGS. 30 and 31 collectively illustrate the ECDR and EPNR call record formats in accordance with a preferred embodiment;

FIG. 32 illustrates the OSR and POSR call record formats in accordance with a preferred embodiment;

FIGS. 33 and 34 collectively illustrate the EOSR and EPOSR call record formats in accordance with a preferred embodiment;

FIG. 35 illustrates the SER call record format in accordance with a preferred embodiment;

FIG. 127 is a representation of a bandwidth market in accordance with one embodiment of the present invention;

FIG. 128 is a flowchart illustrating a contract negotiation in accordance with one embodiment of the present invention;

FIG. 129 is a flowchart depicting a method for automatically identifying an amount of unused bandwidth of a user;

FIG. 130 is a flowchart illustrating another method of identifying the amount of bandwidth of a user;

FIG. 131 is a flowchart illustrating a method for exchanging money for bandwidth;

FIG. 132 is an illustration a summary of a contract negotiation process;

FIG. 133 is an illustration of a more detailed contract negotiation process;

FIG. 134 is a flow chart illustrating a method of performing clearing and settlement functions in a bandwidth market environment;

FIG. 135 illustrates in overview a system arrangement for implementing the over the counter (or other) bandwidth market system of the instant invention;

FIG. 136 is a flow chart of data processing for qualifying for execution of an order communicated from a branch order entry clerk or account executive;

FIG. 137 illustrates data processing for executing and accounting for orders that have been qualified for execution by the order qualifying data processing of FIG. 136;

FIG. 138 is the left portion of a flow chart for the data processing of block 13714 of FIG. 137 for updating the inventory cost (average price per unit of bandwidth AVCST (BWTH)) of the bandwidth BWTH and the running profit PR(BWTH) realized from the execution of each trade;

Figure 137:
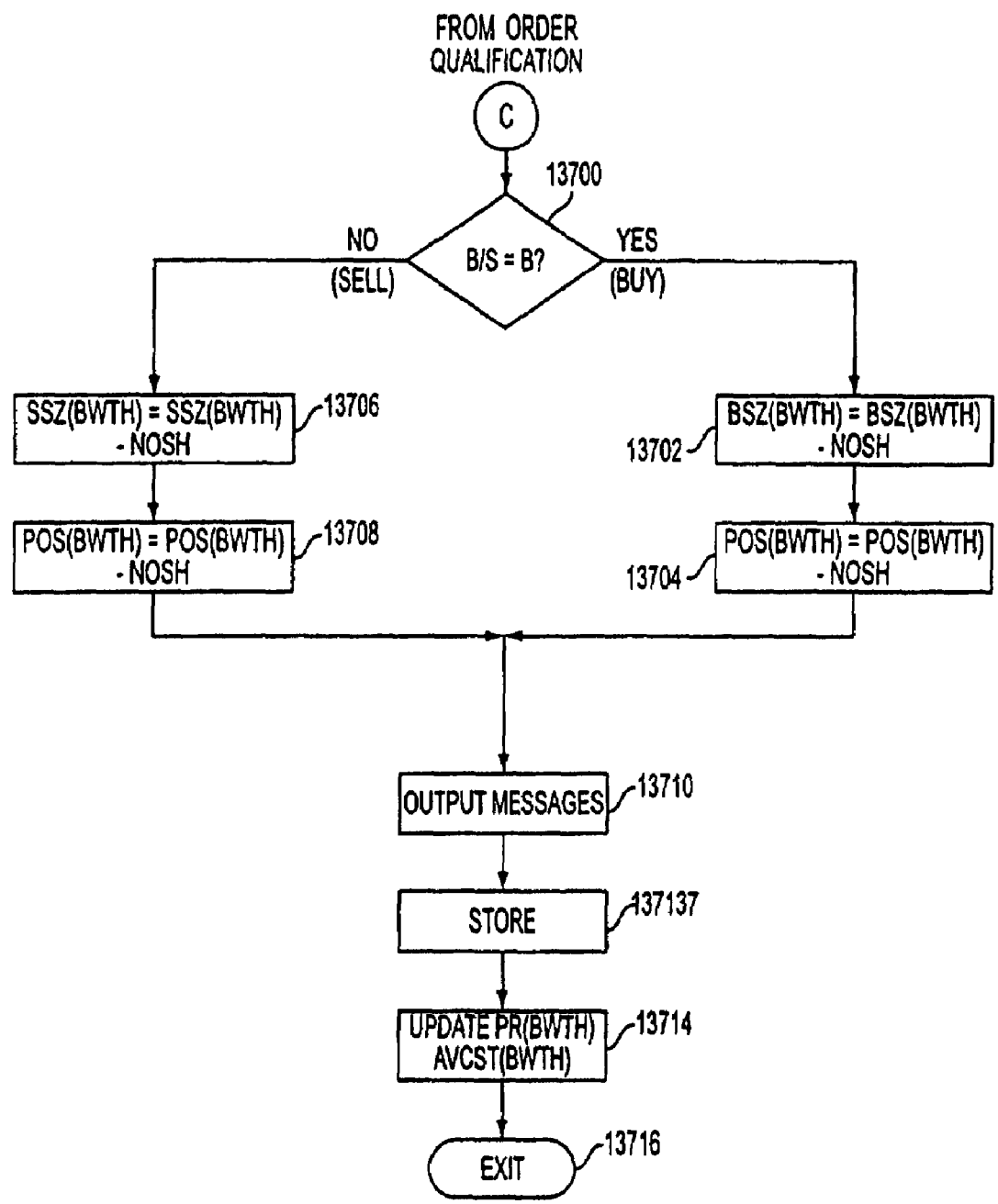
Figure 139:
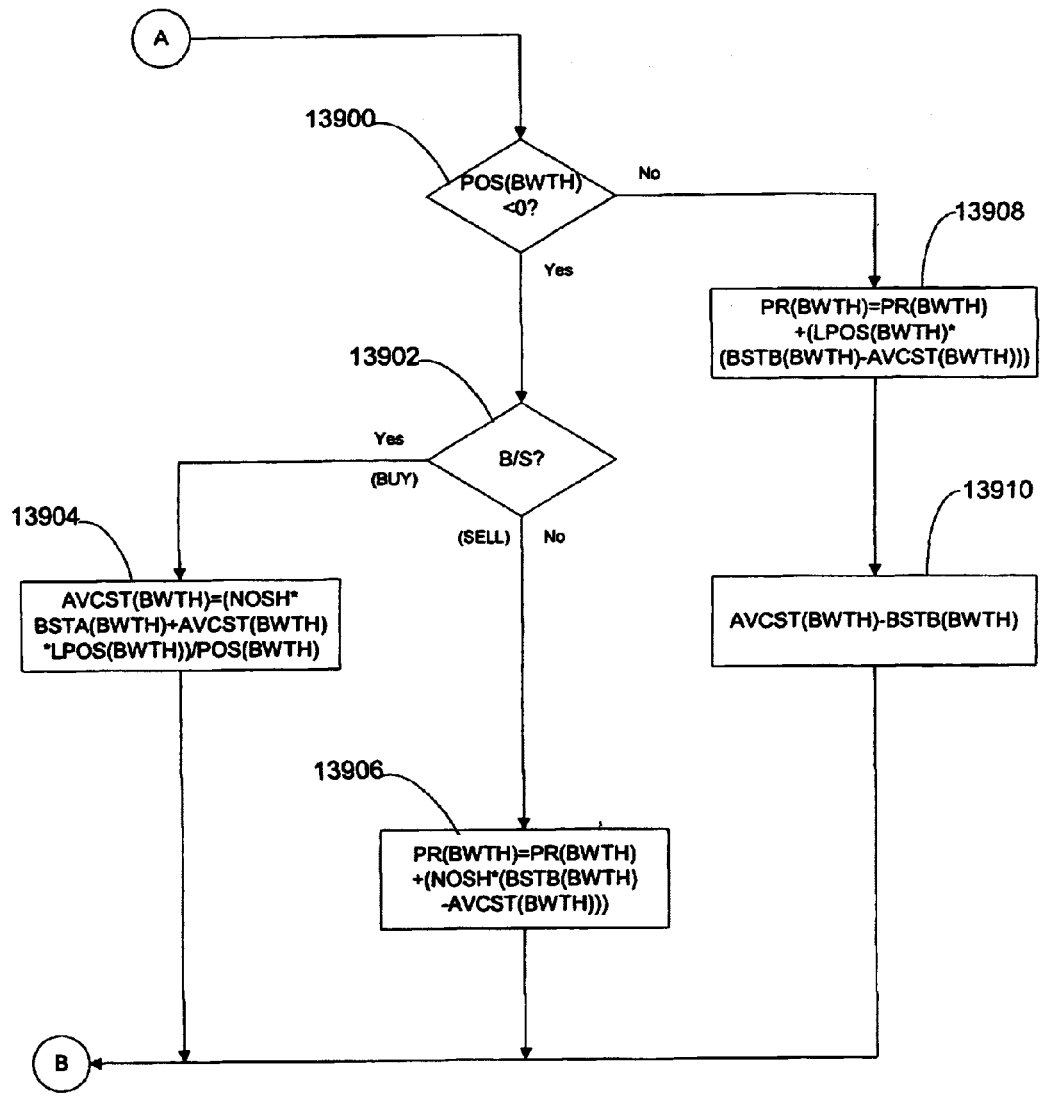
Figure 140:
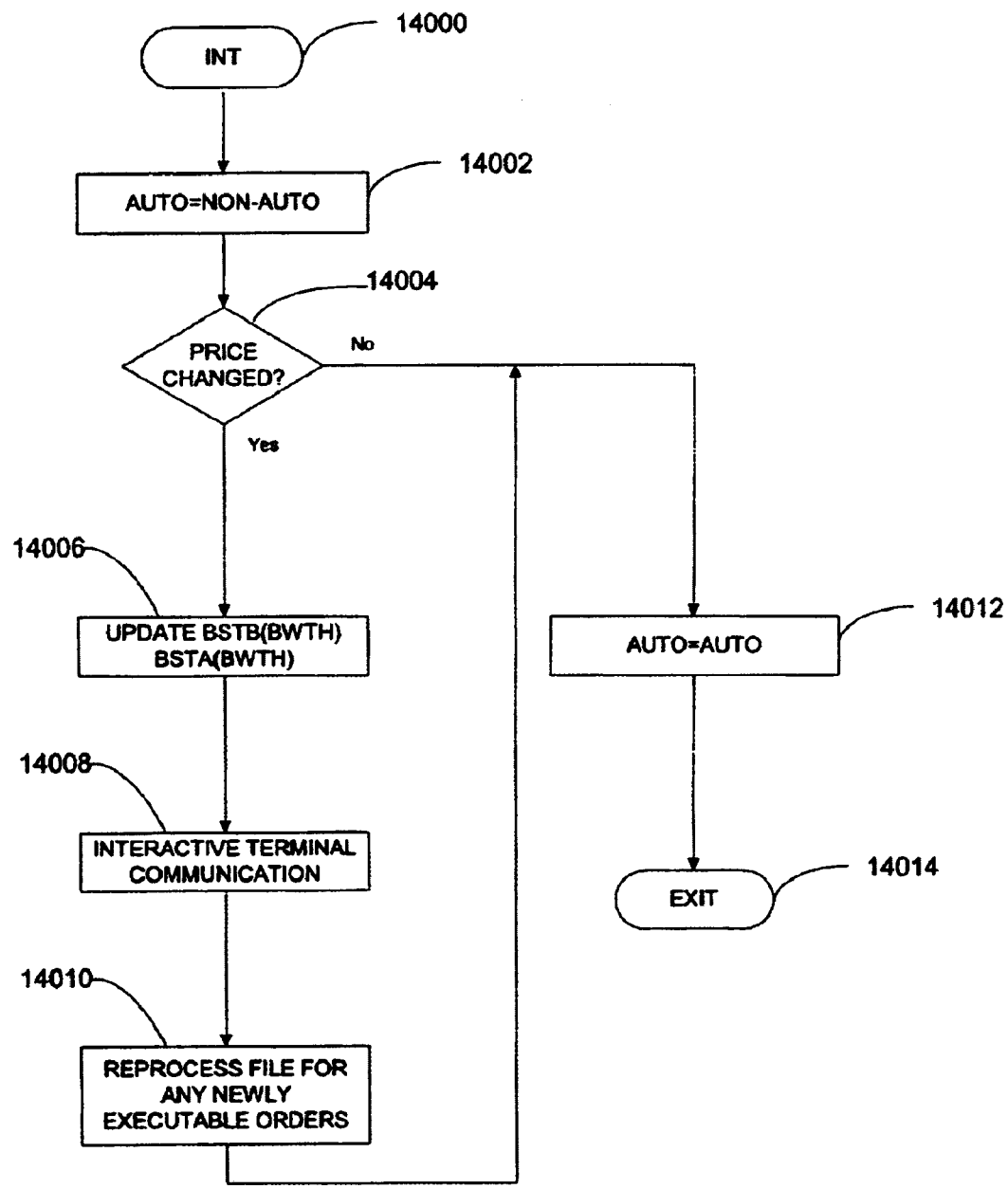
Figure 141:
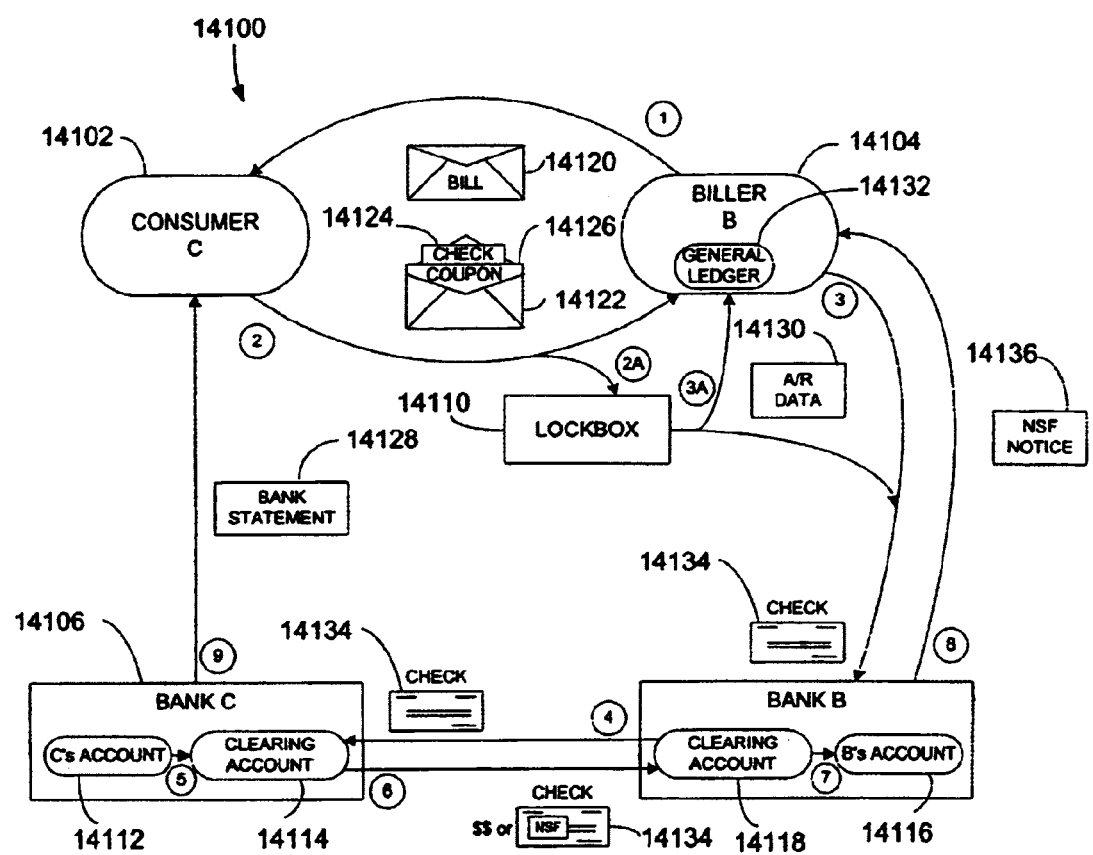
Figure 142:
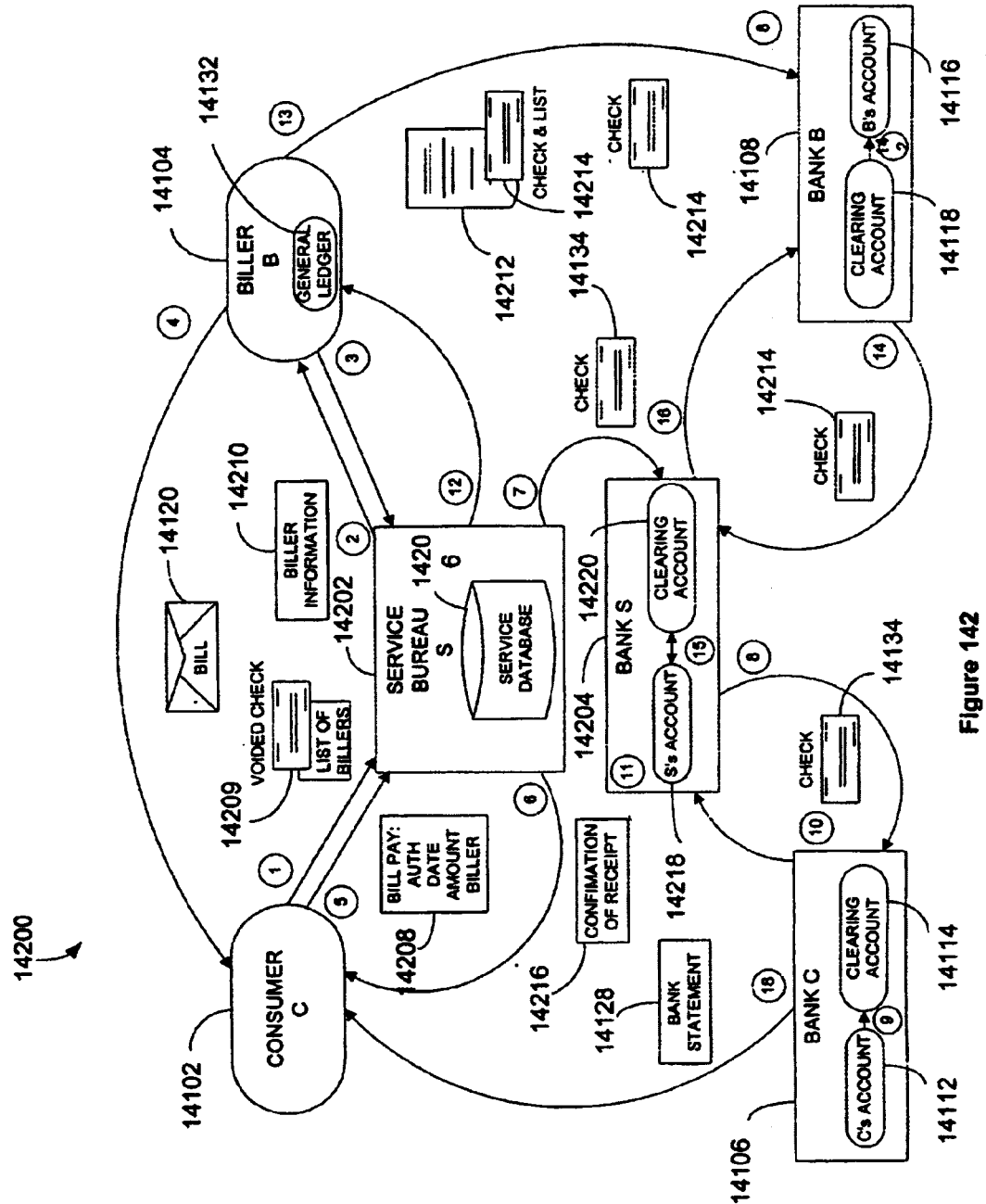
Figure 143:
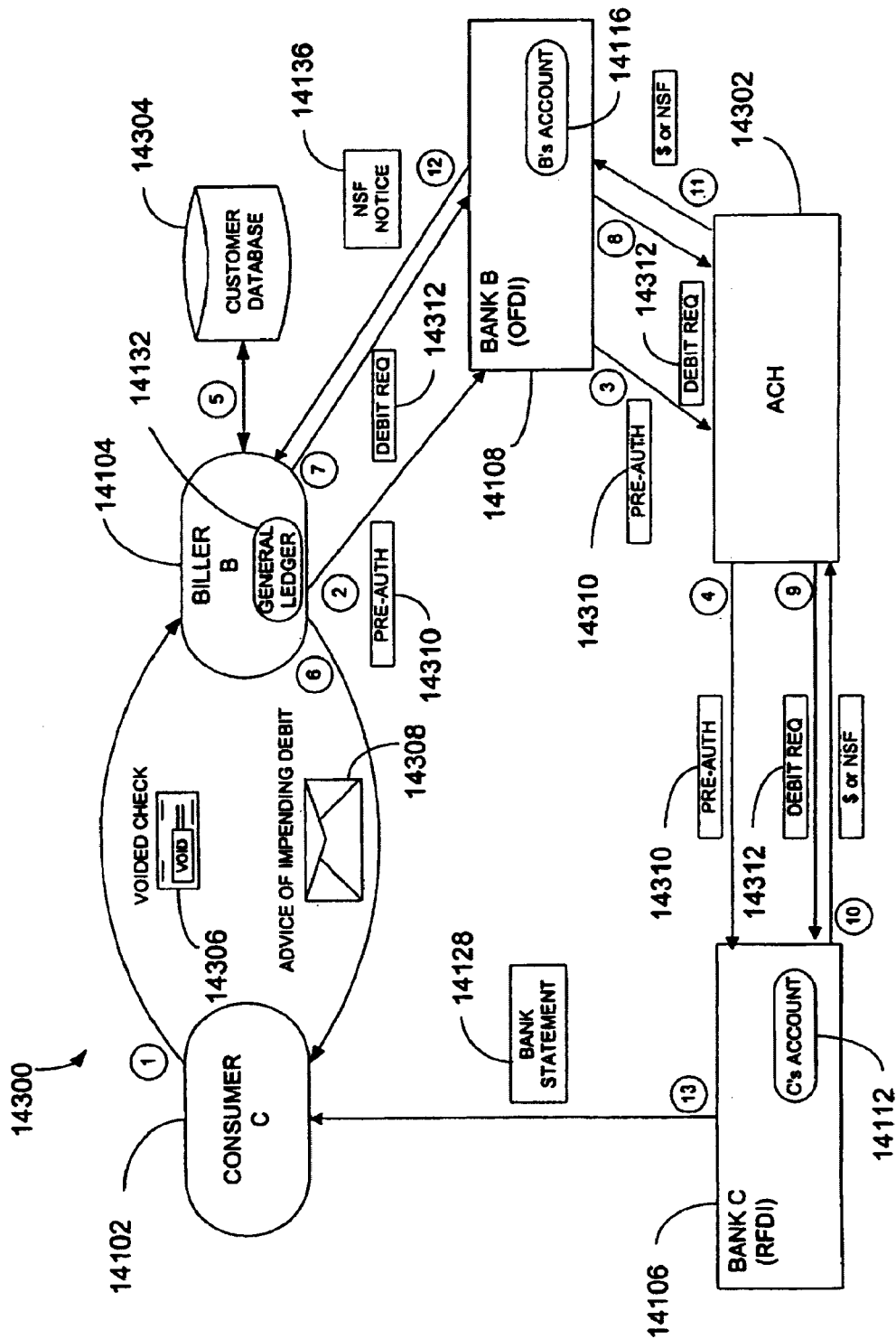

FIG. 139 is the right portion of a flow chart for the data processing of block 13714 of FIG. 137 for updating the inventory cost (average price per unit of bandwidth AVCST (BWTH)) of the bandwidth BWTH and the running profit PR(BWTH) realized from the execution of each trade;

FIG. 140 is a flow chart illustrating data processing upon receipt of a new market maker quotation from the bandwidth market system;

FIG. 141 is a block diagram of a bill pay system relying on postal mailed payments;

FIG. 142 is a block diagram of a bill pay system wherein consumers pay bills using a bill pay service bureau which has the consumers as customers;

FIG. 143 is a block diagram of a bill pay system where billers initiate automatic debits from consumers' bank accounts; and

DESCRIPTION OF THE PREFERRED EMBODIMENTS

Figure 1:
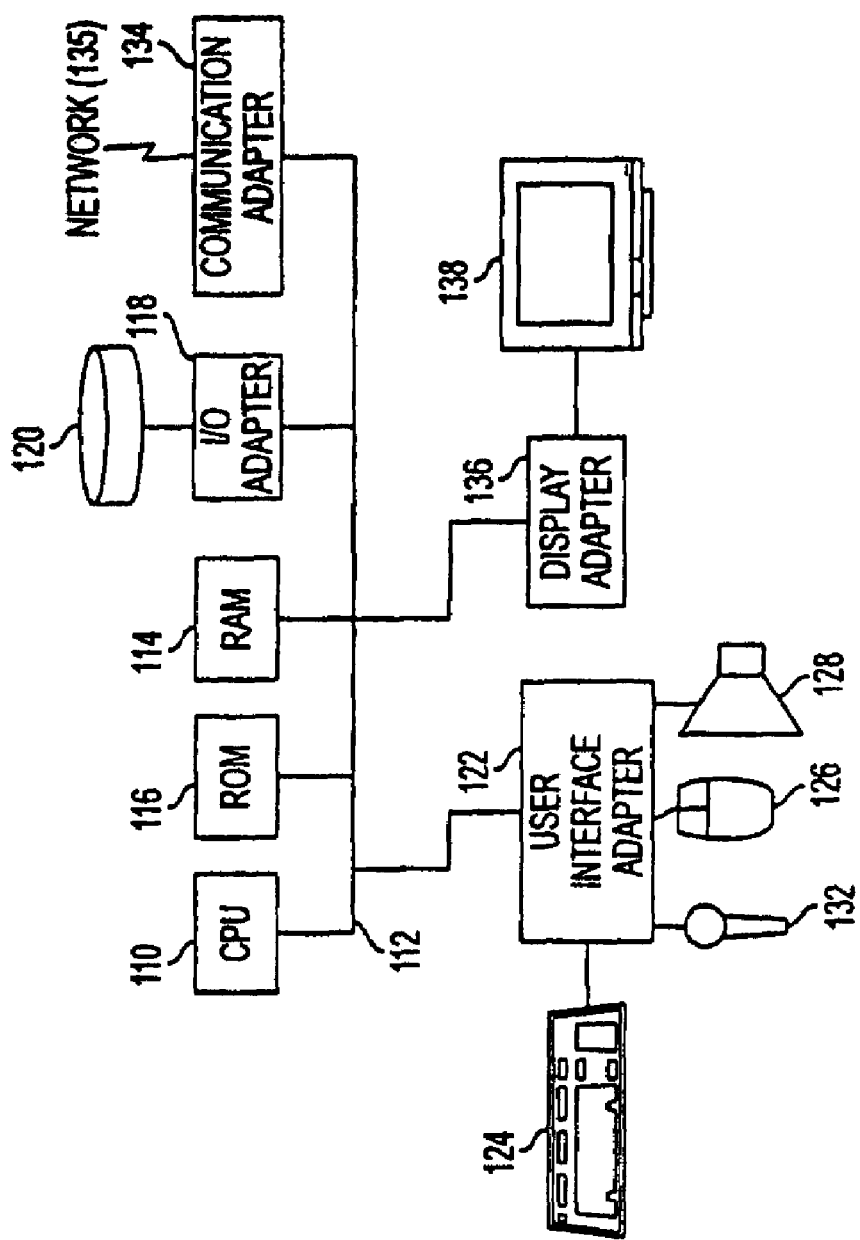
FIG. 1 is a schematic diagram of a hardware implementation of one embodiment of the present invention.

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other.

Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

eSupply Chain Model

Figure 2:
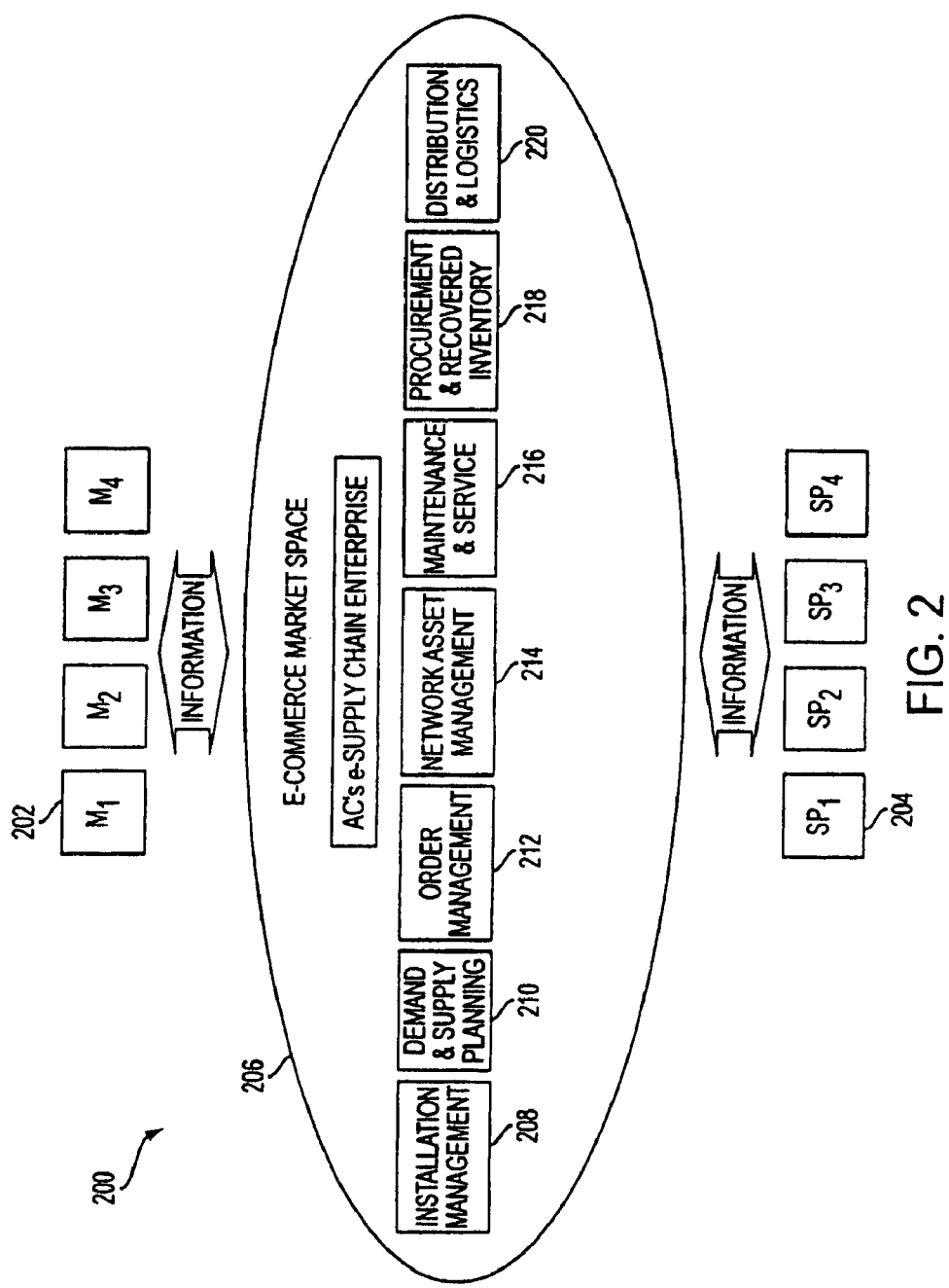
FIG. 2 illustrates an embodiment of a system for combined industry supply management between one or multiple manufacturers and one or many service providers and/or vendors and/or resellers.

FIG. 2 illustrates an illustrative embodiment of a system 200 for combined industry supply management between one or multiple manufacturers 202 and one or many service providers 204 and/or vendors and/or resellers, etc. For clarity, the majority of the following discussion will discuss service providers, but it should be kept in mind that the present invention will operate equally well with vendors, resellers, etc.

In more detail, the present invention manages the supply chain between the manufacturer(s) and service provider(s). The industry supply management is centralized in an eCommerce Market Space 206, which includes components that manage end-to-end supply chain information such as demand planning, order fulfillment, scheduling, inventory, etc. In embodiments of the present invention in which multiple manufacturers and service providers participate, some of the benefits of the present invention include: economies of scale are enabled, rationalization of procurement and inventory, rationalization of distribution and logistics facilities, and facilitation of the development of an industry-wide standard. More benefits will be set forth below in the discussion of FIG. 4.

Preferably, the group of manufacturers of such a system each has a common logistics profile and limitations. The manufacturers may focus on production core competence and would also be responsible for strategic and tactical optimization of network assets.

Also preferably, the group of service providers have common network profiles. The service providers may focus on customers, new businesses and channels, etc. Further, under the system of the present invention, the service providers would be allowed to migrate from operations focus to strategic technology and market management.

The components may include some or all of an installation management component 208, a demand and supply component 210, an order management component 212, a network asset management component 214, a maintenance and service component 216, a procurement and recovered inventory component 218, and/or a distribution and logistics component 220.

Figure 3:
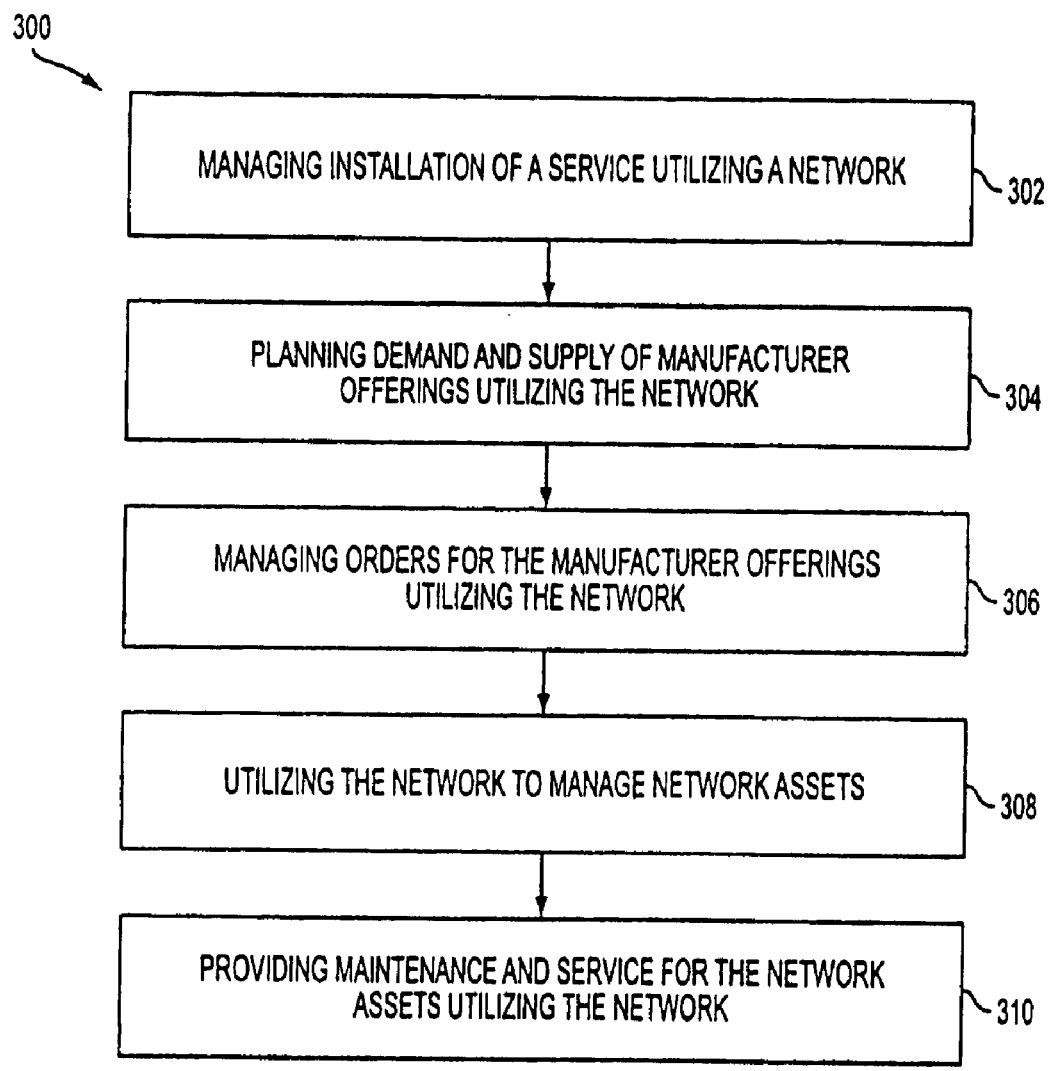
FIG. 3 is a flowchart for a process for affording a network-based supply chain framework in accordance with an embodiment of the present invention.

FIG. 3 illustrates a flowchart for a process 300 for affording a network-based supply chain framework in accordance with an embodiment of the present invention. Installation of a service is managed utilizing a network in operation 302. Demand and supply of manufacturer offerings are planned utilizing the network in operation 304 and orders for the manufacturer offerings are also managed utilizing the network in operation 306. The network is also utilized to manage network assets including providing maintenance and service for the network assets utilizing the network (see operations 308 and 310).

Benefit Areas

Figure 4:
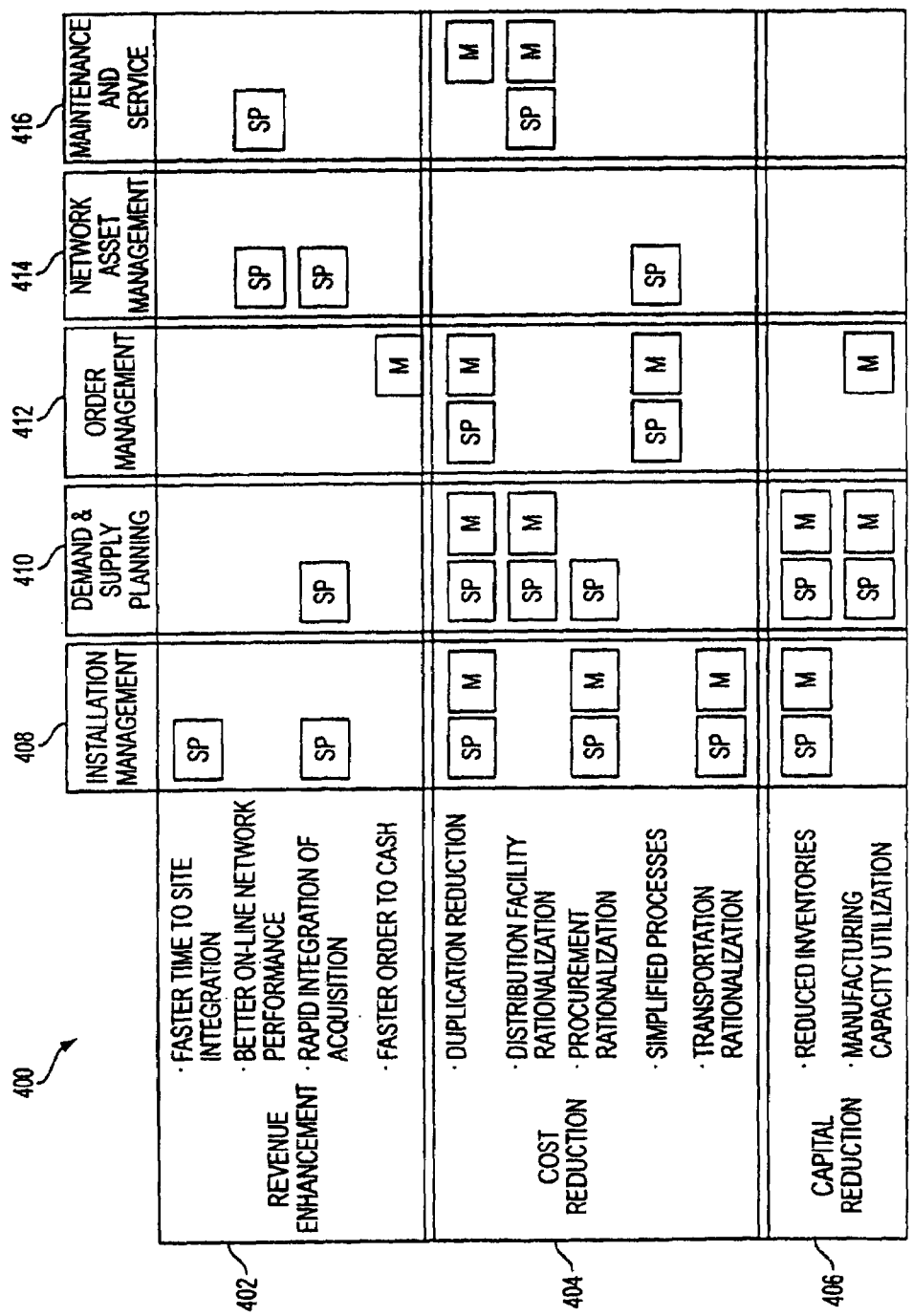
FIG. 4 is a chart illustrating the relations between benefit areas and components of the e-Commerce Market Space in accordance with an embodiment of the present invention.

FIG. 4 is a chart 400 illustrating the relations between benefit areas and components of the e-Commerce Market Space in accordance with an embodiment of the present invention. The benefit areas include a revenue enhancement benefit area 402, a cost reduction benefit area 404, and a capital reduction benefit area 406.

Each benefit area includes a number of associated benefits. Illustrative benefits associated with revenue enhancement 402 include: (a) faster time to site integration; (b) better on-line network performance; (c) rapid integration of acquisition; and (d) faster order to cash. Illustrative benefits associated with cost reduction 404 include: (a) duplication reduction; (b) distribution facility rationalization; (c) procurement rationalization; (d) simplified processes; and (e) transportation rationalization. Illustrative benefits associated with capital reduction 406 include: (a) reduced inventories; and (b) manufacturing capacity utilization.

FIG. 4 also includes a plurality of columns for various components of the present invention. These columns may include an Installation Management component column 408, a Demand and Supply Planning component column 410, an Order Management component column 412, a Network Asset Management component column 414, and a Maintenance and Service component column 416.

Displayed under each column in FIG. 4 are rectangular boxes that each have either a "SP" or a "M" displayed inside them. The "SP" boxes indicate that a particular benefit for that particular component may be attributed to a service provider. The "M" boxes indicate that a particular benefit for that particular component may be attributed to a manufacturer.

As an example, in an illustrative embodiment of the present invention, the Installation Management component, may include the following benefits to the service provider by looking at FIG. 4 in closer detail: faster time to site integration, rapid integration of acquisition, duplication reduction, procurement rationalization, transportation rationalization, and reduced inventories. In this illustrative embodiment, the Installation Management component may also include the following benefits to the manufacturer: duplication reduction, procurement rationalization, transportation rationalization, and reduced inventories.

With continuing reference to FIG. 4, in this illustrative embodiment of the present invention, benefits for the service provider under the Demand and Supply Planning component may include the following: rapid integration of acquisition, duplication reduction, distribution facility rationalization, procurement rationalization, reduced inventories, and manufacturing capacity utilization. Further, benefits for the manufacturer under the Demand and Supply Planning component in this illustrative embodiment of the present invention may include the following: duplication reduction, distribution facility rationalization, reduced inventories, and manufacturing capacity utilization.

With regards to the Order Management component for this illustrative embodiment, benefits for the service provider may include the following (as illustrated in FIG. 4): duplication reduction, and procurement rationalization. Benefits for the manufacturer under the Order Management component in this illustrative embodiment of the present invention may include: faster order to cash, duplication reduction, simplified processes, and manufacturing capacity utilization.

Turning now to the Network Asset Management component column, benefits for the service provider for the Network Asset Management component may include: better on-line network performance, rapid integration of acquisition, and simplified processes.

Lastly, in this illustrative embodiment of the present invention, benefits for the service provider under the Maintenance and Service component may include: better on-line network performance, and distribution facility rationalization. Benefits for the manufacturer under the Maintenance and Service component may include: duplication reduction, and distribution facility rationalization.

Figure 5:
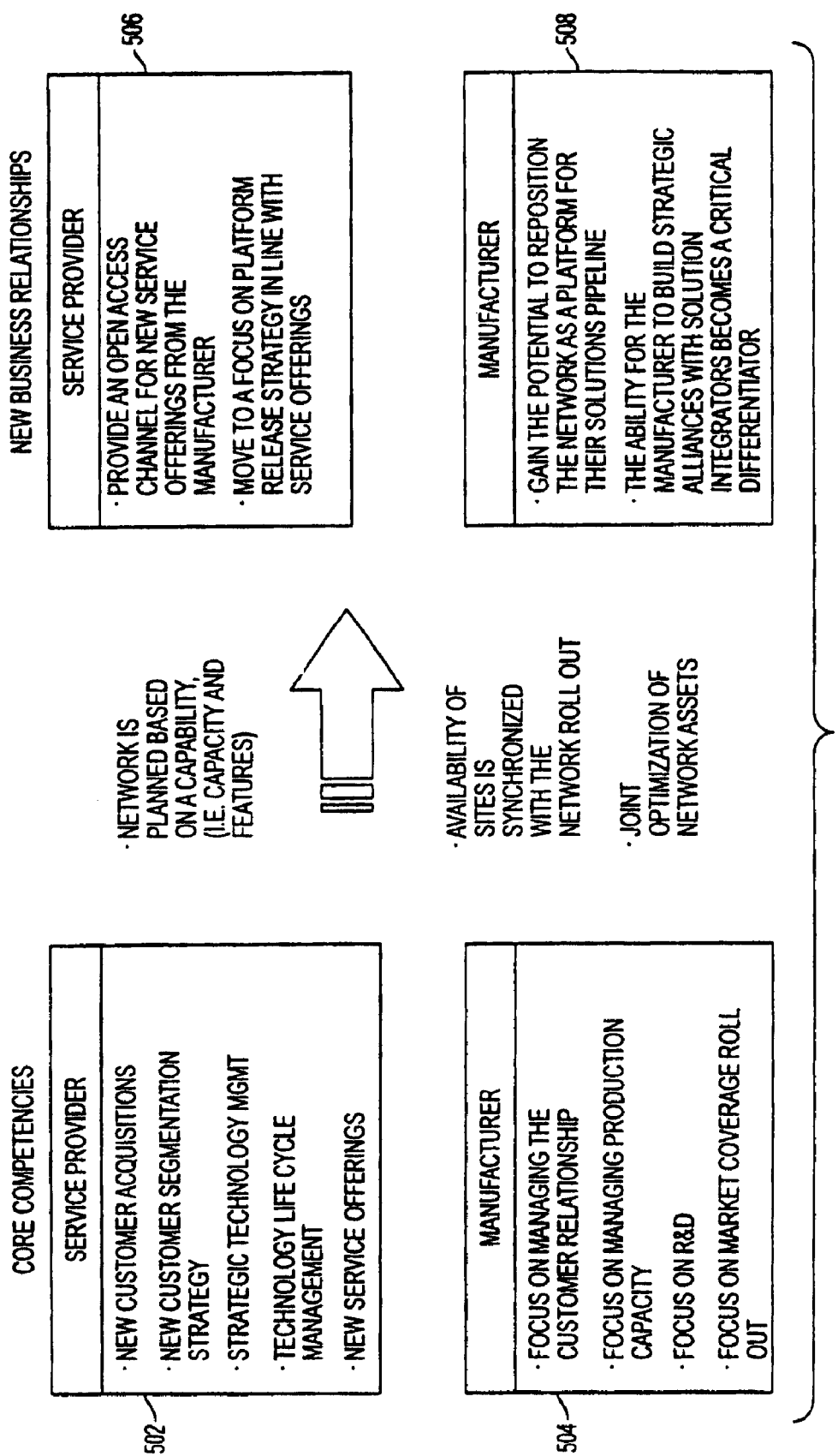
FIG. 5 is a schematic illustration of the relationship between areas of core competence of both operators and manufacturers for creating an environment for new business relationships in accordance with an embodiment of the present invention.

FIG. 5 is a schematic illustration of the relationship between areas of core competence of both operators and manufacturers for creating an environment for new business relationships in accordance with an embodiment of the present invention. In such an embodiment, core competencies of a service provider 502 may include: new customer acquisitions, new customer segmentation strategy, technology life cycle management, and new service offerings. Core competencies of a manufacturer 504 may include: focus on managing the customer relationship, focus on managing production capacity, focus on research and development ("R&D"), and focus on market coverage roll out. In such an embodiment, the network may be planned based on a capability, such as capacity and features.

Availability of sites may be synchronized with the network roll out and network assets may be jointly optimized.

With continuing reference to FIG. 5, the creating of an environment for new business relationships with respect to the service provider 506 provides an open access channel for new service offerings from the manufacturer so that focus may be moved on a platform release strategy in line with service offerings. The environment for new business relationships with respect to the manufacturer 508 may allows for the gaining of the potential to reposition the network as a platform for their solutions pipeline where the ability for the manufacturer to build strategic alliances with solution integrators becomes a critical differentiator.

Figure 6:
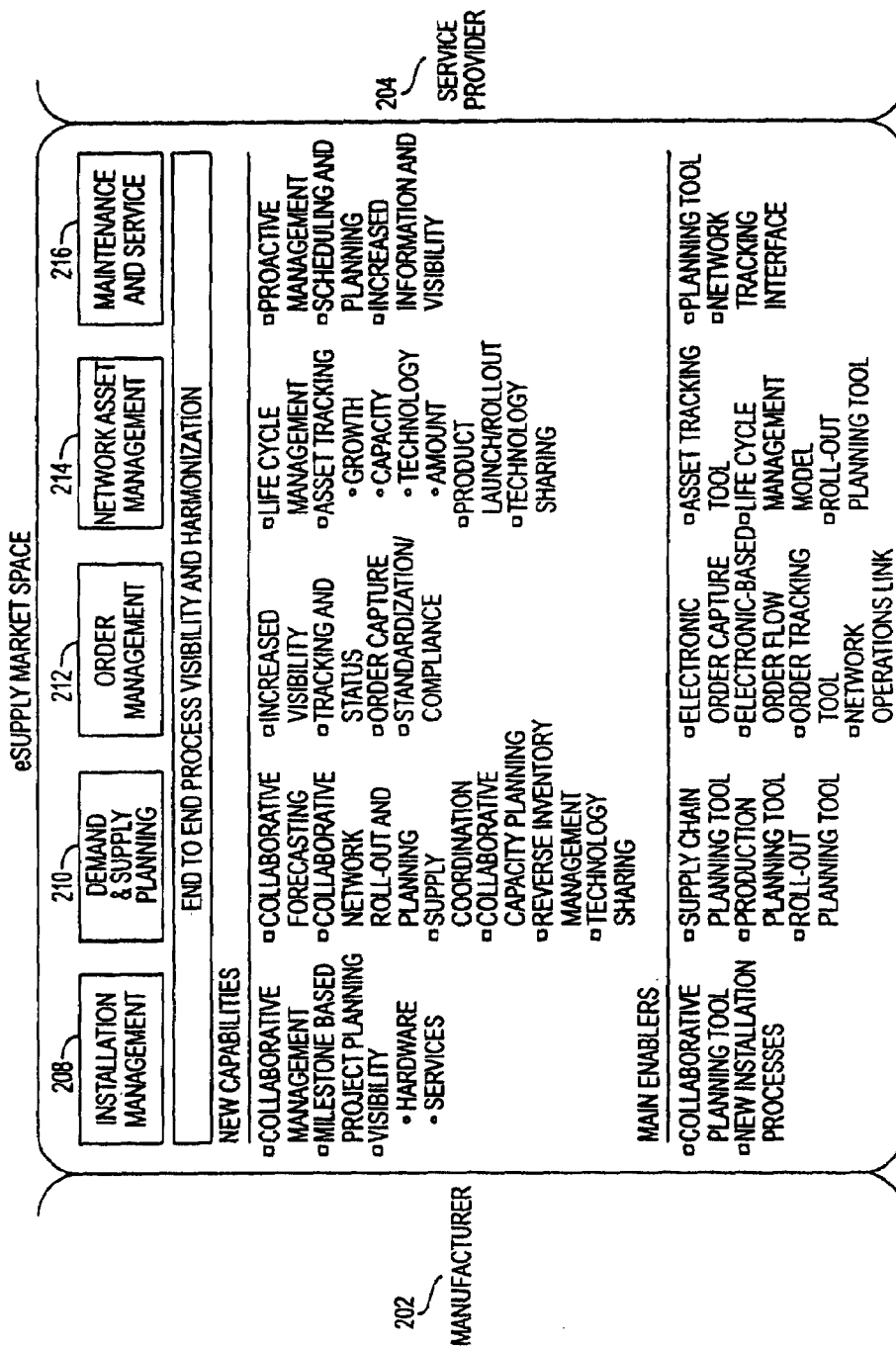
FIG. 6 illustrates some of the components in the eCommerce Market Space and illustrative capabilities of the components.

FIG. 6 illustrates some of the components in the eCommerce Market Space and illustrative capabilities of the components.

Installation Management 208

Figure 7:
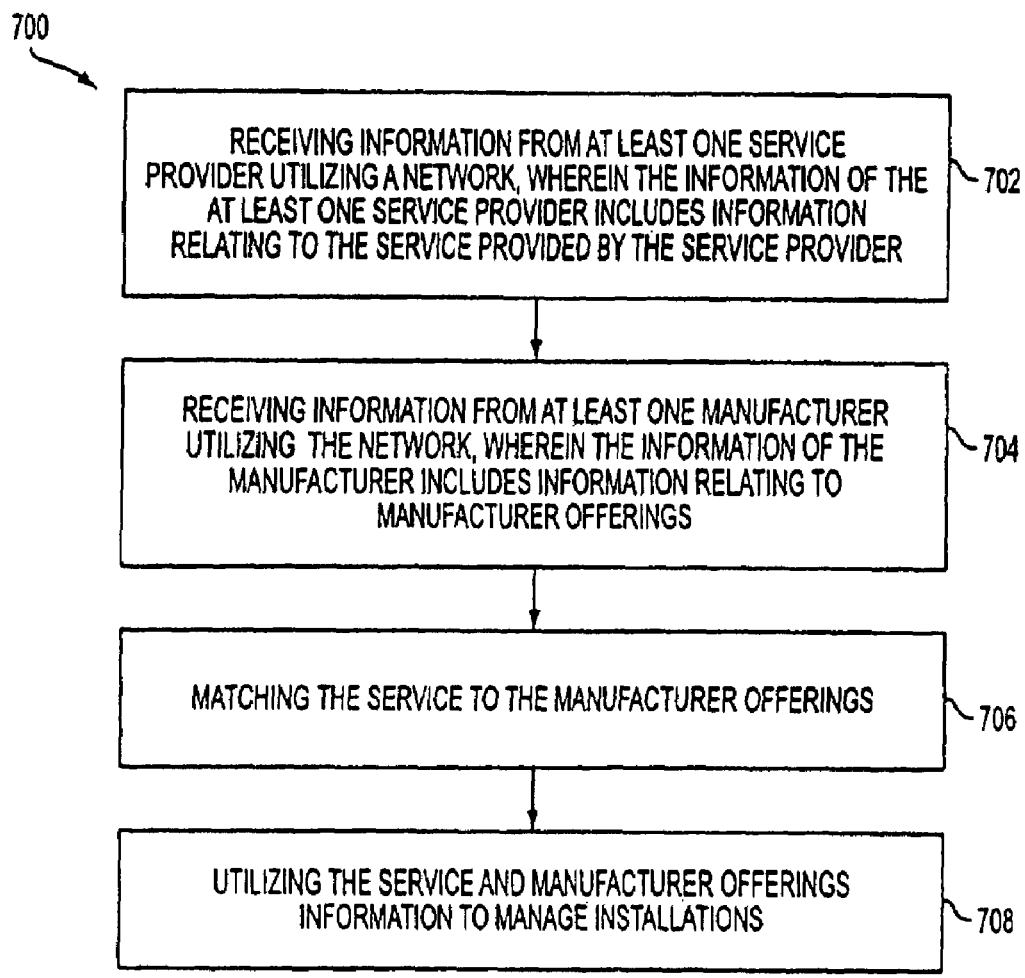
FIG. 7 is a flowchart illustrating a methodology for installation management utilizing a network in accordance with an embodiment of the present invention.

FIG. 7 illustrates a flowchart for a methodology 700 for installation management utilizing a network in accordance with an embodiment of the present invention. In operation 702, information is received from at least one service provider utilizing a network. This information includes information relating to the service provided by the service provider. Also received utilizing the network is information from at least one manufacturer in operation 704. This information includes information relating to manufacturer offerings. The service is matched in operation 706 to the manufacturer offerings and the service and manufacturer offerings information are utilized to manage installations in operation 708.

In an embodiment of the present invention, collaboration between the matched service provider and the manufacturer may also be managed. In such an embodiment, the management of collaboration may include facilitating the transmitting of information between the matched service provider and the manufacturer utilizing the network. In an aspect of this embodiment, a collaborative planning tool may be provided for managing the collaboration between the matched service provider and the manufacturer.

In another embodiment of the present invention, milestone based project planning may be facilitated between the matched service provider and the manufacturer. In a further embodiment, the manufacturer offerings of the matched manufacturer may be displayed to the matched service provider and services provided by the matched service provider may be displayed to the matched manufacturer utilizing the network.

In an aspect of the present invention, the information of the manufacturer may include information relating to the availability of the manufacturer offerings. In such an aspect, the service provider may be notified of the availability of the manufacturer offerings that match the service installation information.

In one example of the present invention particularly applicable to installation of communication lines between telecommunications providers and their suppliers, a method is provided for use in cooperation with a computer having memory in a Synchronous Optical Network (SONET) for generating an optimized transition plan for the placement of Self-Healing Rings (SHR) and the routing of point-to-point demand in accordance with projected customer demand over a selected multi-period time interval.

SONET is both a standard and a set of specifications for building high speed, digital communications networks that run over fiberoptic cables while interfacing with existing electrical protocols and asynchronous transmission equipment. Fiberoptics has revolutionized telecommunications in view of the large bandwidth availability (currently estimated in the hundreds of gigabits per second) which continues to increase with technological advances such as wave-division multiplexing and similar developments in light polarization and dispersion-shifted fibers.

As those skilled in the art will recognize, SONET specifies a digital hierarchy based on Optical Carrier (OC) rather than electrical levels. SONET does define Synchronous Transport Signals (STS), however, which are electrical interfaces used as the multiplexing mechanisms within SONET Network Elements (NE). Network elements combine STS-1s as needed up to STS-N where N is the number of STS-1s, then convert the total electrical multiplex to an optical carrier and transmit it over optical fiber. SONET is multiplexed at the byte level, allowing services to be dynamically placed into the broadband STS for transport. The basic SONET of 64 Kbps per byte is the same speed as the conceptual voice channel DSO allowing SONET to easily integrate all currently used digital services into the optical hierarchy.

One of the principal benefits of SONET is that it allows for the direct multiplexing of current network services, such as DS1, DS1C, DS2, and DS3 into the synchronous payload of STS-1. As those skilled in the art will recognize, the above rates, as in the case of most defined rates, were developed based on existing transmission systems. For example, the DS1 and DS2 signal rates (1.544 million bits per second and 6.312 million bits per second) are the transmission rates of the T1 and T2 wire pair carrier systems. Initially, one multiplexer, called an M12, was used to combined four DS1 channels into a DS2, and a second multiplexer, called an M23, was used to combine seven DS2 channels into a DS3. Presently, most networks use a single multiplexer termed an M13, which combines twenty-eight DS1 channels into a DS3. Of course, one of the key attributes of these previous multiplexer designs is that they permit DS1 signals to be timed independently, i.e. asynchronous multiplexing. Bits can therefore be sent at different transmission rates because individual channels need not be synchronized to a common timing source.

The asynchronous DS3 multiplexing standard was implemented in the days when most networks utilized analog technology and the few digital systems in existence generated their own clocking systems. Significantly, the transmission specifications for DS1 signals specify that the bit rate is 1.544 million bits per second, plus or minus 75 bps. To compensate for this range, additional bits must therefore be "stuffed" into each DS1 signal before they are multiplexed to a higher rate. Again, as those skilled in the art will recognize, while bit stuffing supports independently clocked input signals, it also makes it nearly impossible to locate individual DS1 or DSO channels within a DS3 bit stream. To extract a single channel, a DS3 signal would need to first be demultiplexed through Ml 3 components into twenty-eight DS1s before the channels could be switched or rearranged. As a result, the process of adding or deleting channels is expensive.

In contrast to asynchronous multiplexing, the SONET standard defines a viable alternative which supports greater capacity and efficiency. In the SONET multiplexing format, the basic signal transmission rate—STS-1—operates at 51.84 million bits per second. AN STS-1 can carry 28 DS1 signals or one asynchronous DS3. STS-1 signals are then multiplexed to produce higher bit rates—STS-2, STS-3, etc. As referenced above, the other term used to define the SONET signal levels is optical carrier. The bit rates are the same in each case, so the bit rate of the STS-1 equals the bit rate of the OC-1. The only difference is the type of signal that is being referenced. For example, if the signal is in an electrical format, it is referred to as an STS. Similarly, if the signal is in an optical format—compatible with a fiber medium—it is referred to as an OC.

The SONET standards define an alternative to asynchronous DS3 multiplexing, which describes how to divided STS signals into lower speed increments, i.e. virtual tributaries. The major advantage of synchronous multiplexing is that when DS1 and other low-speed channels are multiplexed directly into the STS format, the lower speed channels can be identified and reconfigured for drop-and-insert. As a result, the drop-and-insert process can be done simpler with less expense of hardware then the back-to-back M13 multiplexers used in asynchronous multiplexing.

Because of the large bandwidth availability in fiber, and the growing volume of data traffic, disruptions from link and node failures due to cable cuts, for example, become increasingly serious. Network survivability has therefore become a major concern for SONET designers and has fueled interest in what is known in the art as "ring" architectures. Such architectures take advantage of the capability provided by synchronous multiplexing in SONET to eliminate the need to backhaul traffic to central hubs. Thus, at each switching office, the SONET transport node directly accesses the required time slots in the bit stream through the use of modified Add-Drop Multiplexers (ADM). The SONET ring topology permits the creation of highly survivable networks which are viewed in the communications industry as essential for obtaining business for critical data communications.

In most cases, the deployment of SONET rings results in cost savings since it is far less expensive for carriers to install a fiber ring then to deploy point-to-point links. Consider, for example, a rural route, where linking remote terminals to a central office in a point-to-point application would require six multiplexers—one at each site and at the Central Office (CO) for each route—and six fibers, two to each site. In a ring topology, all that is required is one multiplexer at the CO and two fibers that go through a multiplexer at each site for a total of four multiplexers and two fibers. Significantly, in the ring topology, working or service traffic is routed in one direction only. If that fiber fails, traffic is rerouted on a protection fiber to flow in the opposite direction. In this manner, working traffic bypasses the failure to get to its proper destination.

Against this background, it is readily seen that there is significant debate in the communications industry regarding the type and location of rings, and in particular, Self-Healing Rings (SHR) to deploy. As those skilled in the art will recognize, the directionality of service routing and the protection mechanism are key attributes that distinguish different self-healing ring architectures. For example, a unidirectional ring routes service traffic in only one direction of the ring. On the other hand, a bidirectional ring routes the components of a duplex circuit in opposite directions on the ring. Similarly, in a path-switched ring, traffic is protected on a per path basis, and the switching is based on the health of each individual path where it exits the ring. Still further, in a line-switched ring, switching is based on the health of the line between each pair of nodes. Thus, when a line is faulty, the entire line is switched off to a protection loop at the failure's boundaries.

The method and system of this example of the present invention utilizes selected mixed-integer programs to efficiently model the information obtained during the iterative steps of the present invention in cooperation with a computer having sufficient memory. Such steps include the determination of nodes within the SONET under review, identification of the number of periods within the selected time interval, the determination of demand between nodes over this time period, preferably in units of DS3, and the determination of discounted add-drop costs for a plurality of selected Add/Drop Multiplexers (ADM's) and related components based upon projected availability. If the number of nodes under review is small, once this information is determined, then the optimized discounted fixed and interconnection costs for this plurality of ADM's may be determined in accordance with a first selected mixed integer program.

An electrical signal may thereafter be generated for receipt by the computer memory corresponding to a set of logical self-healing rings with preliminary, albeit detailed, routing information. In contrast, when the number of nodes under review is large, a heuristic approach is required.

In the heuristic approach, the user is required to load traffic to existing rings by repetitively identifying the smallest point-to-point demand between nodes on existing rings and assigning this demand to the rings until no demand left may be routed. Thereafter, a proposed ring is created by identifying the greatest unsatisfied point-to-point demand between two adjacent nodes and assigning the nodes to the ring. At this point, new proposed rings may either be randomly generated until all demand has been satisfied or, in the alternative, existing rings may be expanded. If the latter step is selected, expansion is carried out by repetitively calculating the largest unsatisfied demand of neighbor nodes for each of the proposed rings and identifying a plurality of neighbor nodes having the greatest unsatisfied demand. At that point, a determination may be made regarding the deficit of each of the proposed rings as well as the identification of a plurality of proposed rings with the greatest deficit.

Finally, one of the rings with the greatest deficit may be assigned to one of the neighbor nodes and inter-ring traffic may be loaded until all demand has been routed. Traffic is loaded through a process of repetitively identifying demand that can be routed the greatest distance through the smallest number of proposed rings and assigning that demand accordingly. At this point, an electrical signal is summarily generated also for receipt by said computer memory and corresponding to a set of logical self-healing rings with preliminary routing information.

Once logical rings have been determined, whether in accordance with a mixed integer program or through repetitive iterations such as in the heuristic approach, the placement of physical self-healing rings and optimal traffic routing may thereafter be determined by retrieving the logical SHR and preliminary routing information from memory and maximizing the percentage of demand covered and minimizing the total inter-ring traffic cost. This is accomplished through modeling the same in accordance with yet another mixed integer program and generating a corresponding electrical signal for receipt by said computer memory.

Demand and Supply Planning 210

Figure 8:
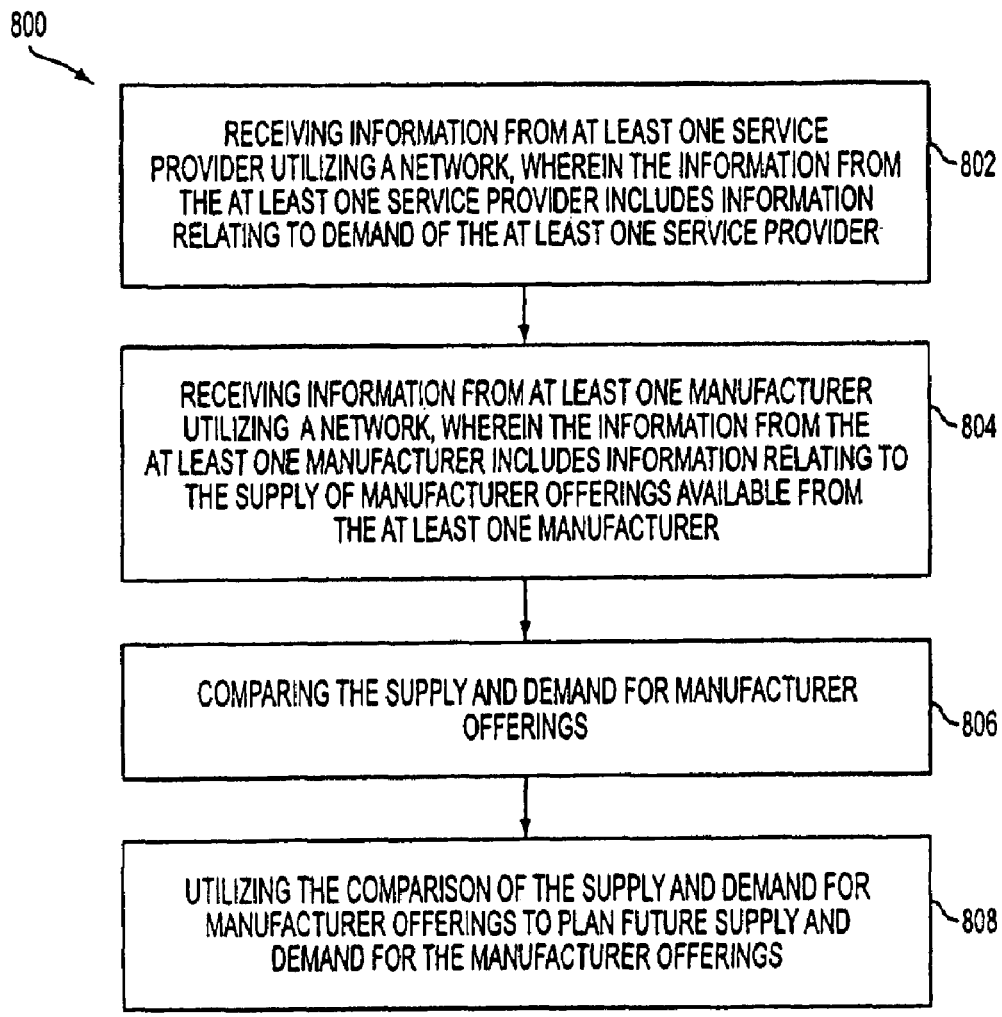
FIG. 8 is a flowchart depicting a process for demand and supply planning utilizing a network.

In accordance with an embodiment of the present invention, FIG. 8 illustrates a flowchart for a process 800 for demand and supply planning utilizing a network where information from one or more service providers relating to demand of the service providers is received utilizing the network in operation 802. Received in operation 804 utilizing the network is information from one or more manufacturers relating to the available supply of manufacturer offerings. The supply and demand for manufacturer offerings are compared to one another in operation 806 and this comparison is used in operation 808 to plan future supply and demand for the manufacturer offerings.

In an embodiment of the present invention, collaborative forecasting may also be facilitated between service providers and manufacturers utilizing the network. In another embodiment of the present invention, collaborative network roll-out and planning utilizing the network may be facilitated between service providers and manufacturers. As an option, a roll-out planning tool may be provided for facilitating collaborative network roll-out and planning between the service providers and the manufacturers utilizing the network. In a further embodiment of the present invention, the supply of manufacturer offerings between manufacturers and service providers may be coordinated utilizing the network. In such an embodiment, a supply chain planning tool may be provided for coordinating the supply of manufacturer offerings between the manufacturers and the service providers utilizing the network.

In even another embodiment of the present invention, collaborative capacity planning may also be facilitated between service providers and manufacturers utilizing the network. In one aspect of this embodiment, a production planning tool may be provided for facilitating the collaborative capacity planning. In yet a further embodiment of the present invention, reverse inventory management may be conducted between the at least one service provider and the at least one manufacturer utilizing the network. Also, the sharing of technology between service providers and manufacturers may be facilitated utilizing the network.

One exemplary embodiment of the present invention is adapted primarily for monitoring and controlling customer power demand in a utility such as electric, gas, and water. In particular, this embodiment of the present invention is designed for the collection and transmission of user demand requirements and the control of user demand for utility services.

Domestic residential demand for electric power is growing at approximately 2% annually. Although utility companies can maintain pace with this growth by constructing more peaking and power plants, this is not necessarily in the best interest of the utility companies and society at large. The factors of cost, fuel availability, and environmental concerns of both the utility company and the public in general have prompted a shift of emphasis from building additional generation capacity for satisfying the increasing demand to developing and employing a method and means of efficiency improvements, production facility optimization, and electrical conservation through demand side management. Implicit in this is the fact that not all electric power costs the same to generate. Power generated during peak times is more expensive than "base-line" power. For demand side management, utility companies will charge on a cost basis rather than an average use basis that has existed in the past.

Heretofore, systems have been proposed for communicating utility usage at a customer's home to a central office. For example, U.S. Pat. No. 4,086,434 discloses a remote condition reporting system including a microprocessor with memory and a firmware program, telephone dialing equipment, a clock, and a plurality of inputs from meter readings and the outputs of sensors. The system initiates telephone calls to the utility company central offices at predetermined intervals to report utility usage including time of day power usage metering.

This embodiment of the present invention includes a monitoring and control system in which communication occurs through a fully distributed digital telecommunications switch without a centralized routing and handling facility. The distribution network is deployable to large numbers of residential and commercial customers for bi-directional real-time communication. While initially designed for use with an electric power utility, the invention is applicable in monitoring and controlling demand for other utilities such as gas or water, as well as for data services.

A controlled load management and feedback system includes a power company central computer facility, a plurality of home monitoring and control networks, and one or more wide band distribution networks interconnecting home monitoring and control networks and the central computer facility. The distribution networks connect to one or more central computer systems through substation gateways via high-speed digital lines.

The home monitoring and control network is located and operated within the power utility customer's home and includes electrical control, monitoring, and measurement devices which allow the utility to monitor electrical consumption in real time, assist the customer in optimizing electrical power consumption, and communicate real-time consumption and changes in consumption to the power utility via the distribution network. Further, the home network permits automatic meter reading and remote service disconnect and reconnect.

The distribution network includes a wire-based (hybrid fiber/coaxial cable) distribution system and an intelligent utility unit (IUU), which interfaces with the home network. The IUU controls, communicates, and configures devices within the home network, and communicates information from the home network back to the utility central computer via the distribution system. The distribution network is configured in cells or small hubs which support 250–2,000 users at a time.

The utility central computer includes a T-based communication digital backbone network which communicates with a distribution network through gateways typically located within a power substation. The backbone network consolidates traffic from different substations and routes the traffic to the utility host computer, thus providing access to every user on the system. The host computer is able to forecast trends and predict when demand will exceed supply, thus allowing corrective action to be taken. The computer can also generate reports for utility management and consumers showing usage and savings through demand management.

Order Management 212

Figure 9:
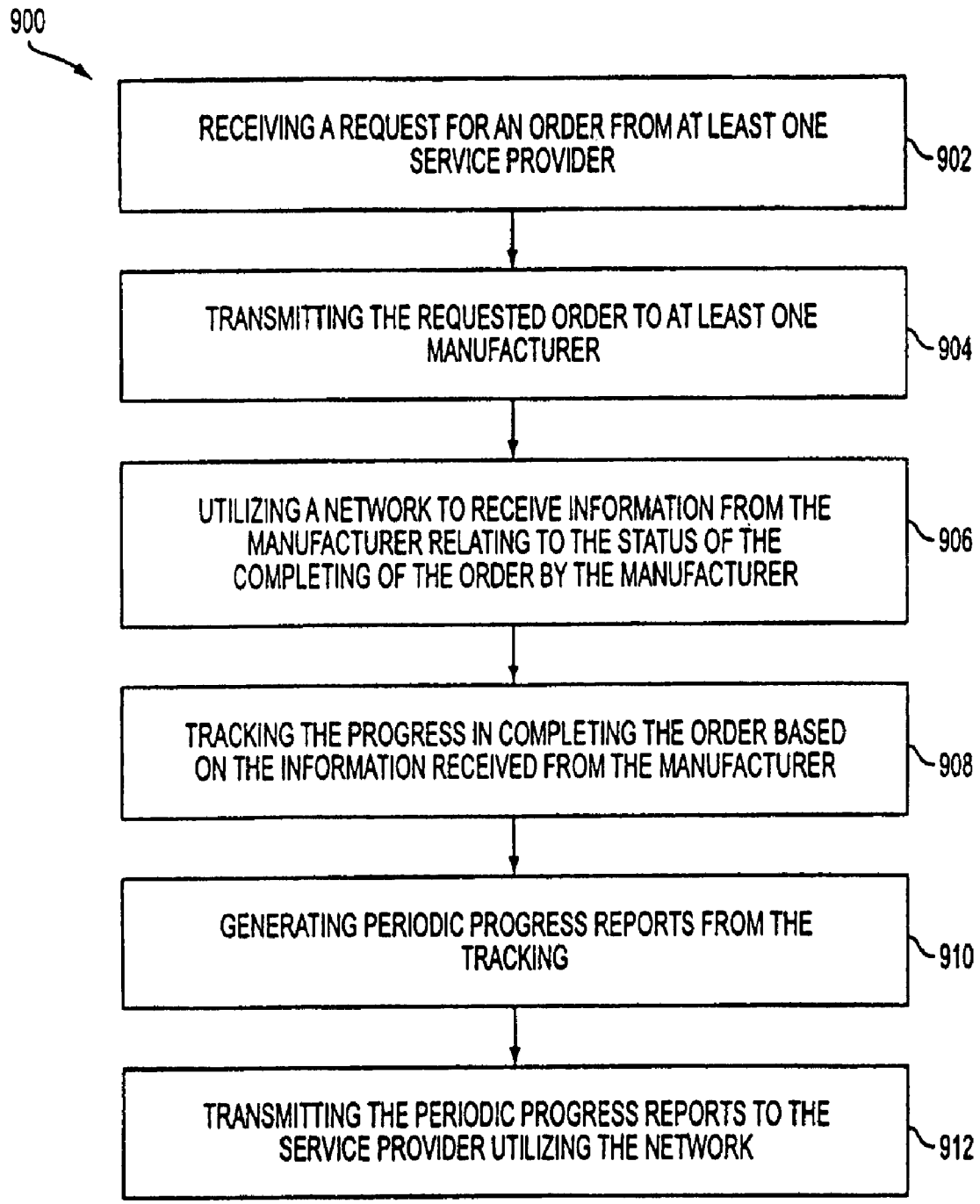
FIG. 9 illustrates a flowchart for a methodology for managing orders in a network-based supply chain in accordance with an embodiment of the present invention.

FIG. 9 illustrates a flowchart for a methodology 900 for managing orders in a network-based supply chain in accordance with an embodiment of the present invention. When a request for an order is received from a service provider in operation 902, the request is subsequently transmitted to one or more manufacturers in operation 904. A network is utilized in operation 906 to receive information from the manufacturer relating to the status of the completing of the order by the manufacturer. The manufacture's progress in completing the order is tracked in operation 908 based on the information received from the manufacturer. Periodic progress reports are generated from the tracking and then transmitted to the service provider utilizing the network in operations 910 and 912.

In an aspect of the present invention, the order request may be received from the service provider utilizing the network. Similarly, in another aspect of the present invention, the requested order may be transmitted to the at least one manufacture utilizing the network. As an option, an order tracking tool may be provided from tracking the completion of the order.

In one embodiment of the present invention, the network may also be utilized to receive information from suppliers of the manufacturer relating to the status of delivering supplies to the manufacturer as well as to track the progress in supplying the manufacturer based on the information received from the at least one supplier. In such an embodiment, the periodic progress reports may also include information relating to the tracking of the at least one supplier. In yet a further aspect of the present invention, a network operations link may be provided for linking to the at least one service provider and the at least one manufacturer.

An illustrative embodiment of the present invention unitarily and automatically manages ordering processes based on order information supplied by a particular department or section. In order to achieve this, there is provided an order management system for automatically placing an order with one of a plurality of suppliers when order information is input by one of a plurality of orderers.

Accordingly, this embodiment of the present invention includes a terminal unit provided to each of the orderers. The terminal unit includes means for inputting the order information, which is then transmitted to a communication network. A central management unit receives the order information from the terminal unit through the communication network. The central management unit includes collection processing means for managing order history information and section information with respect to each orderer. The collection processing means calculates a total cost of previous orders based on the order history information of one of the orderers sending the order information and order information sent from the one of the orderers. The central management unit also includes order permission means for permitting an execution of an ordering process when the calculated total of the previously ordered costs is within a budget of the orderer. The budget may be included in the section information.

Since an ordering process is executed only when the total cost of the previous orders for each of the orderers which may correspond to each department or section in a company, each department or section placing an order can be prevented from exceeding their budget.

The central management unit may further include a supplier selecting process for calculating a total cost of previously received order for each of the suppliers based on the order history information and the order information, and for selecting one of the suppliers whose total cost of previously received orders is within an order limit. Thus, exceeding the order limit previously set to each of the suppliers is prevented.

Additionally, the supplier selecting process may select one of the suppliers based on the order history information so that each of the suppliers equally receives orders. Optionally, the supplier selecting process manages supplier information including an order prohibition flag which represents a prohibition of placing an order with a supplier indicated by the order prohibition flag. As another option, the supplier selecting process selects one of the suppliers offering the lowest price when an item to be ordered is supplied by a plurality of suppliers.

The order management system according to the present invention may further comprise an ordering process for placing an order through the communication network with the suppliers based on the order information.

According to one embodiment of the present invention, an order management process automatically places an order with one of a plurality of suppliers when order information is input by one of a plurality of orderers. The order management process is performed in an order management system which has a plurality of terminal units provided to the respective orderers and a central management unit connected to each of the terminal units. During the management process, order information from one of the terminal units us sent to the central management unit. A total cost of previous orders is calculated based on order history information of one of the orderers sending the order information and order information sent from the one of orderers by managing the order history information and section information with respect to each of the orderers. An execution of an ordering process is permitted when the calculated total cost of previous orders is within a budget of the orderer. The budget may be included in the section information.

According to this embodiment of the invention, since an ordering process is executed only when the total cost of the previous orders for each of the orderers which may correspond to each department or section in a company, each department or section placing an order is prevented from exceeding their budget.

Optionally, the order management process may include calculating a total cost of previously received orders for each of the suppliers based on the order history information and the order information as well as selecting one of the suppliers whose calculated total cost of previously received orders is within an order limit. Thus, exceeding the order limit previously set to each of the suppliers can be prevented.

Additionally, the order management process may further include selecting the one of the suppliers based on the order history information so that each of the suppliers equally receives orders. As an option, an order to be placed with a supplier may be prohibited by indication by an order prohibition flag included in supplier information. As another option, one of the suppliers offering the lowest price may be selected when an item to be ordered is supplied by a plurality of suppliers. As yet another option, the order management process may further include automatically placing an order with the suppliers based on the order information through a communication network connecting the central management unit to each of the suppliers. It should be noted that the order management process may be performed by a combination of a general purpose computer and a processor readable medium such as a memory provided in the computer or a CD-ROM, disk, tape, etc. which stores program information used by the computer.

Network Asset Management 214

Figure 10:
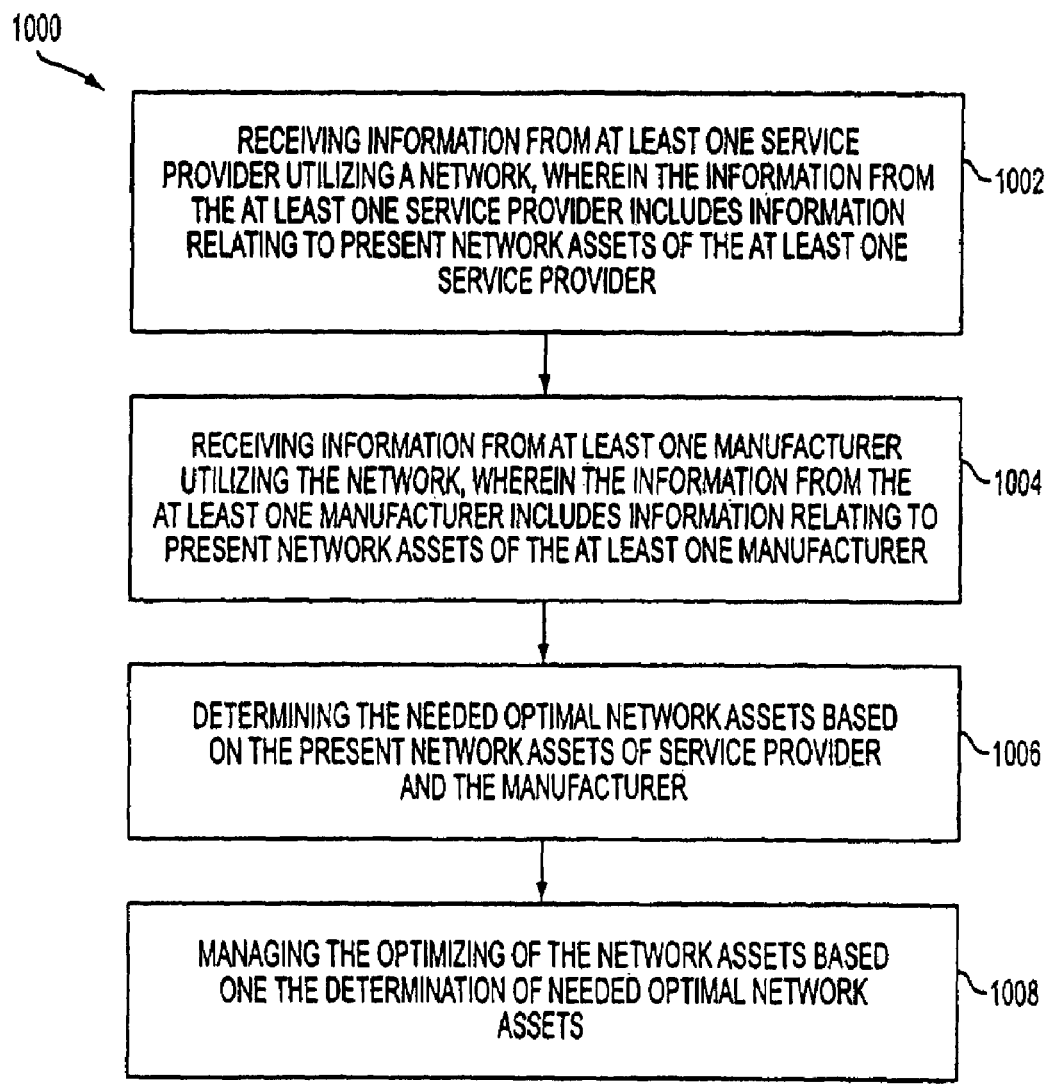
FIG. 10 illustrates a flowchart for a process for managing assets in a network-based supply chain in accordance with an embodiment of the present invention.

FIG. 10 illustrates a flowchart for a process 1000 for managing assets in a network-based supply chain in accordance with an embodiment of the present invention. Utilizing a network, information is received information from at least one service provider in operation 1002. This information includes information relating to present network assets of the service provider. Information is also received utilizing the network from at least one manufacturer in operation 1004. The information from the manufacturers includes information relating to present network assets of the manufacturers. In operation 1006, a determination is made for optimal network assets needed for the service provider and manufacturer based on the present network assets of service provider and the manufacturer. Based on this determination, the optimizing of the network assets is managed in operation 1008.

In an embodiment of the present invention, the life cycle of network assets of the service providers and the manufacturers may also be managed utilizing the network. In an aspect of this embodiment, a life cycle management model may be utilized for managing the life cycle of the network assets. In an additional embodiment of the present invention, the sharing of technology between the service providers and the manufacturers may be facilitated utilizing the network utilizing the network.

In another embodiment of the present invention, network assets of the service providers and the manufacturers may be tracked utilizing the network. The network assets may be tracked according to: growth of the network asset, capacity of the network asset, technological level of the network asset, and/or amount of the network asset. In one aspect of this embodiment of the present invention, an asset tracking tool may be utilized for tracking the network assets.

In yet a further embodiment of the present invention, the roll-out of services provided by the service providers and manufacturer offerings provided by the manufacturers may be managed utilizing the network based on the received present network asset information. In such an embodiment, a roll-out planning tool may be utilized for managing the roll-out of services provided by the service providers and manufacturer offerings provided by the manufacturers.

Maintenance and Service 216

Figure 11:
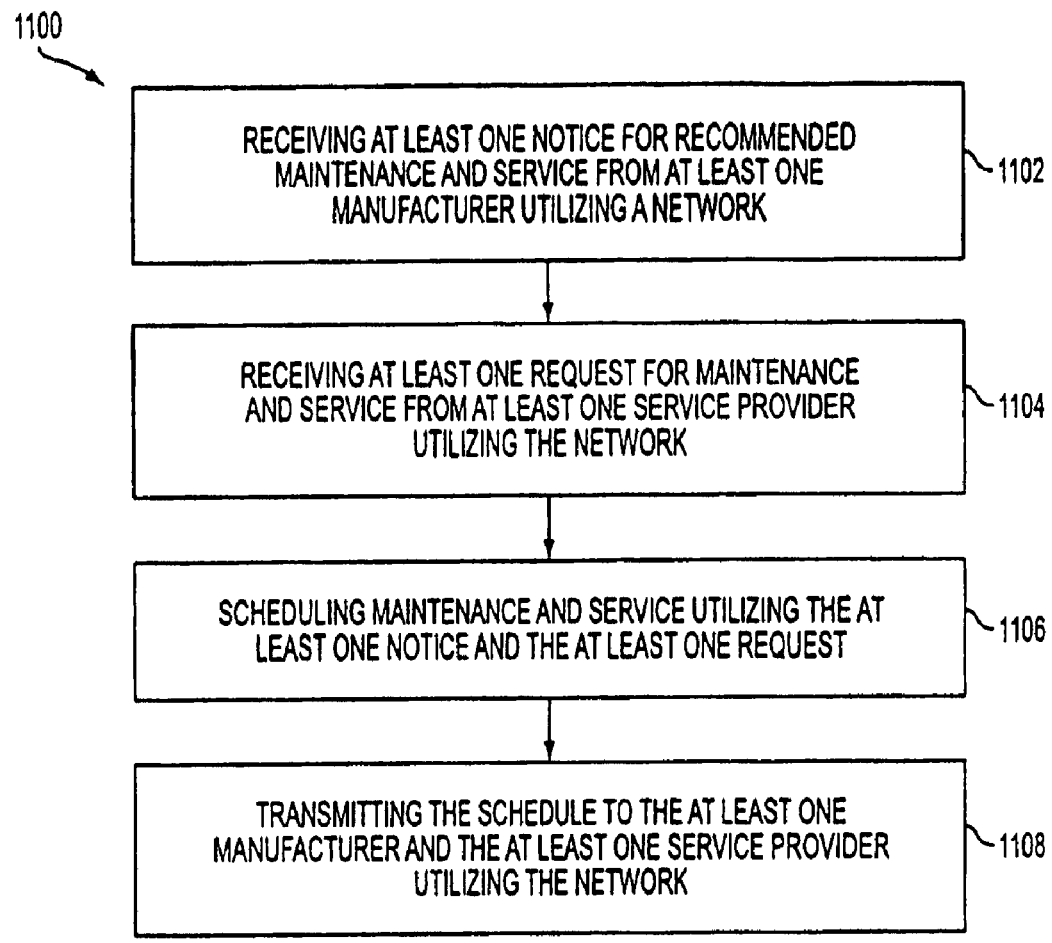
FIG. 11 illustrates a flowchart for a methodology for providing maintenance and service in a network-based supply chain in accordance with an embodiment of the present invention.

FIG. 11 illustrates a flowchart for a methodology 1100 for providing maintenance and service in a network-based supply chain in accordance with an embodiment of the present invention. In operation 1102, one or more notices recommended maintenance and service are received utilizing a network from at one or more manufacturers. In operation 1104, one or more requests for maintenance and service are received utilizing the network from one or more service providers. Maintenance and service is scheduled in operation 1106 utilizing the notices and the requests. The schedule is transmitted to the manufacturers and the service providers utilizing the network in operation 1108.

In an embodiment of the present invention, the availability of the manufacturers to perform maintenance and service may be monitored utilizing the network. In this embodiment, the manufacturers are scheduled to perform maintenance and service based on their availability. In another embodiment of the present invention, the progress of the manufacturers in completing scheduled maintenance and service may be monitored utilizing the network. The schedule may then be adjusted according to the progress of the manufacturers. The adjusted schedule is then transmitted utilizing the network to the manufacturers and the service providers.

In an aspect of the present invention, a scheduling and planning tool may be provided for scheduling maintenance and service. In another aspect of the present invention, a network tracking interface may be provided for monitoring the progress of the manufacturers in completing scheduled maintenance and service. In a further aspect of the present invention, the network may comprise a wide-area network.

Exemplary Embodiment of the Present Invention Adaptable to Communications Services The following table is used to clarify terms used in this section of the description of the invention.

| | |
|---|---|
| AAA | Authentication, Authorization, Addressing |
| ADSL | Asymmetric Digital Subscriber Line |
| AIN | Advanced Intelligent Networks |
| AMA | Automatic Message Accounting |
| ATM | Asynchronous Transfer Mode |
| BIM | Business Integration Methodology |
| BSS | Business Support System |
| CDR | Call Detail Record |
| DTMF | Dual-Tone Multi-Frequency |
| GSM | Global System for Mobile Communications |
| IN | Intelligent Network |
| IP | Internet Protocol |
| JPEP | Joint Picture Expert Group |
| LMDS | Local Multi-Point Distribution Service |
| MPEG | Moving Picture Expert Group |
| NGN | Next Generation Network |

| | -continued |
|---|---|
| OSS | Operational Support Systems |
| PCM | Pulse Code Modulation |
| PSTN | Public Switched Telephone Network |
| QoS | Quality of Service |
| RAS | Remote Access Server |
| SCE | Service Creation Environment |
| SCP | Service Control Point |
| SMDS | Switched Multi Megabit Data Service |
| SSP | Service Switching Point |
| SONET | Synchronous Optical Network |
| STP | Service Transfer Point |
| TCP | Transmission Control Protocol |
| xDSL | Generic name for Digital Subscriber Line |
| (D)WDM | (Dense) Wave Division Multiplexing |

Data networks today rely heavily on shared medium, packet-based LAN technologies for both access and backbone connections. The use of packet switching systems, such as bridges and routers, to connect these LANs into global internets is now widespread. An internet router must be capable of processing packets based on many different protocols, including IP, IPX, DECNET, AppleTALK, OSI, SNA and others. The complexities of building networks capable of switching packets around the world using these different protocols is challenging to both vendors and users.

Standards-based LAN systems work reasonably well at transfer rates up to about 100 Mbps. At transfer rates above 100 Mbps, providing the processing power required by a packet switch interconnecting a group of networks becomes economically unrealistic for the performance levels desired. This inability to economically "scale up" performance is beginning to cause restrictions in some user's planned network expansions. Also, today's data networks do not provide network managers with enough control over bandwidth allocation and user access.

Tomorrow's networks are expected to support "multimedia" applications with their much greater bandwidth and real-time delivery requirements. The next generation networks should also have the ability to dynamically reconfigure the network so that it can guarantee a predetermined amount of bandwidth for the requested quality of service (QOS). This includes providing access, performance, fault tolerance and security between any specified set of end systems as directed by the network's manager. The concept is to provide network managers with complete "command and control" over the entire network's infrastructure—not just tell them when a failure has occurred.

A new set of technologies known as asynchronous transfer mode (ATM) may provide the best, long-term solution for implementing the requirements of both private and public internets. ATM promises to provide a more economical and scalable set of technologies for implementing the ultra-high-performance information networks that will be required to provide the quality of service users will demand. Thus, over the next 20 years, the network infrastructure may change from packet-based standards to one based on ATM cell switching. While changes in the accompanying network will be dramatic, it would be desirable for users making the transition to be able to retain their most recent equipment investment.

Another expected change in tomorrow's networks is a change in data flow. Data flow in today's network typically follows the client-server computing model. This is where many clients are all transferring data into and out of one or more network servers. Clients do not normally talk to each other; they share data by using the server. While this type of data exchange will continue, much more of the information flow in tomorrow's networks will be peer-to-peer. Since the ultimate goal is a truly distributed computing environment where all systems act as both the client and server, more of the data flow will follow a peer-to-peer model. The network will be required to provide more direct access to all peers wishing to use high-performance backbone internets connecting, for example, the desktop computers.

The bulk of information transported in the future will be of digital origin. This digital information will require a great deal more bandwidth than today's separate voice, fax, and SNA networks which operate with acceptable performance using voice grade telephone lines. Voice will shrink as a percentage of total traffic, while other forms of information including image and video will greatly increase. Even when compressing is available, the bandwidth requirements for both inside and outside building networks will need to be greatly expanded.

Text files and images can be sent over existing packet-based networks because the delivery of this information is not time critical. The new traffic (voice and video) is delivery time sensitive—variable or excessive latency will degrade the quality of service and can render this information worthless.

The usefulness of packet switching networks for the transmission of digital information, particularly burst type information, has long been recognized. Such networks are generally point-to-point in nature in that a packet from a single source is directed to a single destination by an address attached to the packet. The network responds to the packet address by connecting the packet to the appropriate destination.

Packet switching networks are also used which combine burst type data with the more continuous types of information such as voice, high quality audio, and motion video. Commercialization of voice, video and audio transmission makes it desirable to be able to connect packets to multiple destinations, called packet broadcasting.

For example, a broadcast video service such as pay-per-view television involves a single source of video packets, each of which is directed to multiple video receivers. Similarly, conferencing capabilities for voice communication also require single source to multiple destination transmission.

One prior packet broadcast arrangement comprises a network consisting of a packet duplication arrangement followed by a packet routing arrangement. As a broadcast packet enters this network, packet copies are made in the packet duplicating arrangement until as many copies exist as there are destinations for the packet. A translation table look up is then performed at the duplication arrangement outputs for each of the packet copies to provide a different, single destination address for each copy. All of the packet copies with their new packet addresses are then applied to the packet routing arrangement, which connects them to the appropriate network output ports.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

The widely-used Telenet public packet switching network routes data using a two-level hierarchy. The hierarchy comprises a long distance-spanning backbone network with a multiplicity of nodes or hubs, each of which utilizes a cluster of backbone switches; and smaller geographic area networks with backbone trunks, access lines and clustered lower level switches connected to each hub. Packet-switched data is transmitted through the network via VCs, using CCITT (International Telegraph and Telephone Consultative Committee of the International Telecommunications Union) X.75 protocol, which is a compatible enhancement of X.25 protocol.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communication intelligently, the first by network protocols and the second by higher level protocols. Each of these protocols has a series of layers. Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally refereed to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DCE issues a call-connected packet to its related DTE. At that point the call is established and the data transfer phase may begin by delivery of data packets. When the call is compared, i.e., the session is to end, a call-clearing procedure is initiated.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the VC for the sought call to the preceding hub. An alternative link is then selected by that hub, or, if none is available there, the VC circuit is again cleared back to the next preceding hub, and so forth, until an available path is uncovered from the routing tables. Messages concerning link and/or hub failures are communicated immediately to the network control center, and that information is dispatched to the rest of the network by the center.

In typical present-day concentrators and packet switches, the data processing devices reside in a plurality of cards or boards containing printed circuits or integrated circuits for performing the various functions of the respective device in combination with the system software. Typically, the cards are inserted into designated slots in cages within a console, with backplane access to a data bus for communication with one another or to other devices in the network. The VME bus is presently the most popular 16/32-bit backplane bus. References from time to time herein to cards or boards will be understood to mean the various devices embodied in such cards or boards.

Many public data networks (PDNs) offer little or no security for communications between users and hosts or other data processing devices within the network, in keeping with the "public purpose" of the network and the desire for accessibility by a large number of actual and prospective users. Where restrictions on access are necessary or desirable, it is customary to assign each authorized user an identification (ID) number or a password, or both, which must be used to gain access to the host. More elaborate security measures are necessary where access may be had to highly confidential data.

Some data communication networks involve a variety of different customers each of whom makes available a host and one or more databases to its users, and may place a level of security on its database which differs from the level placed by other customers on their respective hosts and databases. In those instances, it is customary to make the host responsible for security and access to itself and its associated database. Thus, a user might have access to certain destinations in the network without restriction, but no access to other destinations.

Market Drivers

According to Yankee Group Research, network management costs continue to increase, with network managers spending an average of 45 percent of their budget on ongoing network management, 20 percent on equipment, and 35 percent on network transport services. It is a constant battle to reduce these costs yet somehow improve overall service to their customers. Reducing overall network management costs can be very difficult in today's business environment. Networks continue to become more complex, with more and more demands being placed on the network managers and planners. For example, the exponential growth of remote access has made their jobs more difficult, as the requirement to establish and manage connections for remote offices and telecommuters is often required without additional personnel or budget resources. Unfortunately, network managers and planners spend so much time in "firefighting" mode, trying to support their complex networks, that very little time is actually spent planning for network growth and enhancements. Combined with this is the fact that it is becoming difficult to keep highly skilled employees given the demand for certain skills in the marketplace, and the premiums that will be paid for those skills. So, what is a network manager to do? More and more, they are looking outside for help.

The market for customer network management services is generally referred to as Managed Networked Services (MNS). Yankee Group estimates this market will estimated to grow from $3 B to 9 B within the next three years. MNS became the focus of service providers in 1995 as they saw revenues for frame relay network services double for two years in a row. What began as a way to boost the popularity of frame relay services by offering to lease and manage routers has blossomed into a diverse set of services that are now closer to those associated with outsourcing. Yankee Group research shows that 37 percent of Fortune 1000 managers are already outsourcing or plan to outsource their ongoing network operations management. In addition, it is the communications provider that is thought of as the most likely provider for one-stop shopping services.

The present invention's overall approach to implementing the NM/MNS market offering is two fold. The current opportunity that presents itself is MNS. While this market opportunity for clients is large, they need assistance in understanding data network management—for years they have been solely focused on voice. Additionally, they need to move into this market quickly in order to maintain and grow revenue. To this end, the present invention includes a set of assets consisting primarily of job aids and software that can greatly reduce our clients lead time for service implementation.

Secondly, the present invention assists service providers by providing them the tools to better manage their carrier data networks—the packet switched networks of the future. The present invention significantly enhances and scales MNS assets to address carrier network management in a data networking world. This solution template enables the convergence of circuit and packet switching network control centers and workforces.

The present invention's market offering suggests companies take a graduated approach to delivering MNS. One end of the continuum consists of MNS for current network services, including leased lines, frame relay, and X.25. On the far end is outsourced MNS characterized by long-term contracts, involving hundreds of millions of dollars. The NM/MNS market offering is proposing our clients go beyond the management of the router and the WAN, and into the world of the local area network (LAN), even as far as the desktop and business applications. Service providers have been intimidated by these propositions in the past, since management of the LAN and its equipment and applications has clearly not been their forté.

It is hard to describe a typical MNS engagement because this is such a new. There are three "entry points" in which the present invention can become involved in helping our companies to move into the MNS market:

Business Strategy—Companies may look to the present invention for assistance in creating a business strategy for entering the MNS market. Typically, this type of engagement will defines a company's target market for MNS (small, mid-market, large) and defines the service offerings that are best suited for the company to offer. These engagements will be followed by analysis, design and implementation projects.

Requirements Analysis—Companies may already have developed a concrete business strategy that defines which services they will offer within markets. In this case, the present invention's work will begin by helping define the company's network environment requirements. This work will be followed by design and implementation projects.

Design and Implementation—Companies may be ready to move to the design and implementation phases of creating an MNS capability. Generally, the present invention will confirm that their network meets the requirements to provide the service, then assist the client in the designing and implementing an appropriate solution suite.

In an effort to clearly communicate exactly how we define NM/MNS we have created an online catalog of services. The present invention's solution is a continuous cycle that begins with the four major processes associated with NM/MNS. These processes drive the technology and the people components of the solution. Within each of these processes are a number of core functions and sub-functions. The MNS Online Catalog contains all of this information, including the supporting process, technology and organizational solutions for each function.

Our solution is called the Managed Networked Services Integrated Solution (MNSIS) and has been developed using an approach which integrates Process, Technology, and People considerations.

Process

At the highest level, there are four major processes that must be performed to manage any network:
Service Planning
Managing Change
Operations Management
Service Management Each process should be performed in order to provide a complete NM/MNS solution. As mentioned above, each process has a number of associated functions and subfunctions that provide the complete picture of the process. The major functions associated with each process are as follows.

Technology

The main goal of the technology solution is to provide access to network information to make informed decisions. The present invention includes three layers of management: element management, information services management and presentation management. Every action starts with an incident. Processing is tailored to handling the incident with technology that responds to the unique characteristics of each incident.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an Object Request Broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second environment is potentially bandwidth poor where dial-up or wireless access may be used along with more traditional LAN access. This is also where browser technology is employed.

People

The people vision for the NM/S include an organization model for customer service support, the corresponding roles and responsibilities for this organization model and a conceptual design for workforce transformation to packet switching.

Customer Service Support

Customer service support provides a single point of contact that is customer focused. This single point of contact provides technical expertise in resolving customer incidents, troubles and requests. Generally a three tiered support structure is optimal for satisfying customer service needs. Each tier, or level, possesses an increasing level of skill, with tasks and responsibilities distributed accordingly. Such a structure is as follows:

Tier 1—typically has a broad set of technical skills and is the first level of support to the customer. Typically this group is responsible for resolving 60–70 percent of the opened problems.

Tier 2—are technical experts and field support personnel who may specialize in specific areas. Typically this group is responsible for resolving 30–40 percent of the opened problems.

Tier 3—are considered solution experts and often consist of hardware vendors, software vendors or custom application development/maintenance teams (in-depth skills needed to investigate and resolve difficult problems within their area of expertise). They are the last resort for solving the most difficult problems. Typically this group is responsible for resolving 5 percent or fewer of the opened problems.

The above model is generally referred to as the Skilled Model because personnel at all three tiers are highly skilled. This model generally creates a high percentage of calls resolved on the first call. Other approaches include:

Functional Model

In this model, users are requested to contact different areas (via VRU) depending on the nature of the incident. Calls are routed to the customer support representative best able to handle the call. This model can easily be coupled with the Skilled Model, and has been at previous client engagements.

Bypass Model

In this model, Tier 1 only logs calls, they do not resolve calls. One advantage of this model is that skilled resources don't have to waste time logging calls.

Software and Assets

Managed Networked Services Integrated Solution—The integrated network management solution template consists of a suite of best of breed third party software products that automate problem diagnosis, notification, custom-developed reporting, and IP services monitoring. This solution template is a great first step in realizing our technology solution vision.

Web-Based SLA Reporting Tool—is a browser based tool that provides the personalized SLA reports to customers in both a template and ad-hoc format.

Data Mining Demonstration—Provides the capability to analyze network management data looking for patterns and correlations across multiple dimensions. Build models of the behavior of the data in order to predict future growth or problems and facilitate managing the network in a proactive, yet cost-effective manner.

Customer to Event Mapping Module—Add-on module to the Managed Networked Services Integrated Solution which maps network element events, to service offerings, to customers. This tool allows the Customer Service Representative to proactively address network outages with customers.

Process Definitions and Functions

Service Planning

Service Planning includes both the strategic and tactical planning required to manage distributed environments effectively. Although most planning typically occurs during roll-out of the system, certain planning activities must otherwise take place. Service Planning ensures that change can be successfully controlled and implemented.

Service Management Planning

Operations Management Planning

Managing Change Planning

Strategic Planning

Managing Change

Includes processes and procedures for handling necessary changes to systems or the organization in a distributed environment.

Change Control
Testing
Implementing
Software Distribution

Operations Management

Systems Management consists of the day-to-day operational functions required to maintain the system (e.g. fault detection/correction, security management and performance management).

Production Control
Monitoring and Control
Fault Management
Security Management

Service Management

Service Management controls the overall service to the users of the system. It isolates users from how the system is managed, and ensures that users receive the quality support services they need to carry out their daily business activities.

SLA/OLA Management
Help Desk
Quality Management
Billing and Accounting

The present invention includes a system, method, and article of manufacture for providing a hybrid circuit switched/packet switched network. This hybrid network is used as a transitioning network to transition from old "Core" network architectures to "New Core" networks. In the present description, the details of the NGN transitioning network will first be set forth after which details relating to specific billing aspects of the present invention will be described.

PSTN, wireless, and cable networks have continued to grow at their organic rates determined by the growth of the vertical services they were providing. In the beginning, the data networks used a small portion of the backbone SONET bandwidth, while PSTN was still the dominant bandwidth user. Due to the exponential growth in IP traffic, the IP based data networks are soon slated to utilize more bandwidth than the PSTN. Also huge technical advances in packet technologies have made it possible to carry traditional voice over IP networks. This has started a move towards the "Next Generation Network (NGN)" where there will be more sharing of common network infrastructure to provide services, and these services will start to become more interoperable. The main thrust of technologies in the "NGN" will be to provide interoperability between the new packet based infrastructure and existing legacy infrastructures. Due to the large investments made in the legacy infrastructure, they will continue to exist for some time, but most new innovations will occur on the packet based infrastructure. Slowly, the parallel networks that were created to serve distinct services will merge to use a common packet based backbone and only differ in how access is provided (wire-line, wireless, cable, satellite). The "NGN" is a transition network which will exist during the transformation from the current "Core" to the "New Core".

As packet technologies continue to develop rapidly, it will be possible to support what was once a distinct set of services (voice, video, wireless) on separate parallel networks, on one integrated packet based network. There will still be separate access technologies (wireless, satellite, cable, wire-line) to access these services, but the access networks will all use a common "New Core" network and its capabilities. The services will be interoperable across various access technologies, and users will freely use services that cross many access technologies, e.g. wireless to cable phone services, web browsing from wireless devices etc.

The present invention maps a course for the network evolution from circuit to packet switched technology using a migratory approach in which the network becomes a hybrid circuit and packet topology over a 3 to 7 year period.

Next, the network architecture for the wire-line network as it transforms from "Core" to "NGN" to "New Core" will be described. Followed by architecture for cable, wireless and satellite based access networks.

The Wire-Line Network Architecture

"Core" Network Architecture

The current wire-line "Core" network consists of parallel PSTN, SMDS, ATM, Frame-Relay, B/PRI and IP networks. The PSTN network has been evolving over the last century and is a mix of old and new circuit switched technologies. The PSTN network mainly provides point-to-point interactive two-way voice communication services. The service set has evolved to include many intelligent network (IN) service features. During the late 1980s, Advanced Intelligent Networks (AIN) emerged as the architecture to support new voice based services on the PSTN infrastructure.

IN Requirements and Architecture in the Current "Core"

The major IN requirements include session establishment, advanced call processing, call routing and call treatment (network messages and call termination). Examples of applications and features are the CLASS family of services (Call waiting, Call forwarding, Conference calling, Call rejection), enhanced call routing, Number Portability, Calling Card Services, and Audio delivered Information Services (e.g. travel, stocks and weather).

These IN capabilities are enabled by devices such as SCP, STP, SSP and EIP in the AIN environment. These devices participate in the execution and completion of an IN service. In order to develop, test and launch new IN service applications on the above mentioned components, service providers deploy Service Creation Environment (SCE) platforms, which provide an environment to quickly create new IN services. These SCE platforms are closely tied to the runtime environment and therefore with very few exceptions become a major undertaking and a complex coordination effort to launch a new or modified IN service in the "Core" network environment.

Data Networks in the "Core"

While the PSTN was growing in feature functionality as well as traffic demand, new data networks have been created to support the inter-networking of computing devices. These data networks provide interconnection to geographically dispersed computing devices at varying levels of transmission bandwidth (e.g. 56/64K, T-1/E-1, T-3/E-3, OC-3/STM-1). The data networks consist of many technologies e.g. SMDS, ATM, frame-relay and IP. In some cases, these data networks themselves are parallel networks, in other cases, they share a common technology in the backbone (e.g. ATM can be the backbone for frame relay and IP data networks). These data networks share the same SONET based backbone with the PSTN network. The services on the PSTN and the data networks are very distinct and non-interoperable (example: voice versus web access).

With the rapid explosion of the Internet, and innovation in packet based technologies, the IP based data network has become the dominant network in terms of user traffic, and its growth is slated to continue exponentially. This phenomenon has created a dilemma for traffic planners and engineers of the Core network. They have seen traffic grow on the access portions of their networks (PSTN) but have realized very little financial benefits from this usage because third party service providers have been the termination point of these internet data users. The incumbents have began to devise intelligent network solutions for this data traffic (example RAS with SS7 gateway) in order to solve two major challenges: 1) off loading data traffic from the voice infrastructure to alleviate the congestion issues that face traditional voice customers and 2) collecting revenues from the third party data services providers (ISP's) for access and routing callers to their Points Of Presence.

Due to the high growth in IP and other data services, many new service providers have emerged that are building only IP based data networks, and provide only IP based data services. Their business strategy is to continue to ride the technological innovation of IP and packet based technologies and build complete suites of services on a packet based infrastructure. Because they are investing in only one form of network (as opposed to many parallel networks), their unit cost of services is low, they are not encumbered by legacy networks and systems, and they can provide cheaper and better services to customers; hence they pose a significant threat to incumbent telecom service providers.

"Next Generation Network" Architecture

As packet based technologies continue to develop and provide the services that were only available on other networks (e.g. PSTN, cable), and new (green field) service providers continue to exploit their advantage, it has become necessary for many incumbent service providers to transition their "Core" network to the "Next Generation Network", where they can share the rapid technical advantages of packet technologies, and improve their cost structure, and at the same time offer new services on the "Next Generation Network".

New IP Based services in the "NGN"

While there are components in the NGN that ensure interoperability between "NGN" and PSTN, there are also a huge new set of new services that are built entirely on the NGN components which is provide feature rich multimedia (voice, video, data) based communication services as well as enabling many E-Commerce services enabled by IP technologies. These components (described later in detail) include directories, policies, user authentication, registration, and encryption. These components enable services like integrated messaging, multimedia conversations, on-demand multi-point conference, enhanced security & authentication, various classes of media transport services, numerous automations in electronic internet commerce activities e.g. banking, shopping, customer care, education, etc. As the NGN matures third party value added service providers will develop IP based services that will combine applications such as electronic commerce (procurement, warehousing, distribution and fulfillment) as well as online banking to present the consumer with an integrated boundless shopping experience.

Growth of Bandwidth in the "NGN"

In addition to new service features, the NGN also employs the use of new wire-line broadband access technologies, notably xDSL. Traditional wire-line access technologies will continue to be deployed at higher and higher speeds; wire-line access will move from predominantly T-1 speeds to T-3 and OC-n speeds. These new broadband access technologies will increase the need for higher bandwidth in "NGN" core. The "NGN" core continues to use a SONET backbone, but will gradually move to using (D)WDM technologies to provide the bandwidth required to support broadband access.

New and emerging technologies such as Giga-Bit Ethernet and Wire Speed IP may find their way to the network backbone, but not until Giga-bit Ethernet technology matures to handle a wide array of network services such as connection oriented circuit emulation. The use of Wire Speed IP technology is suitable for an enterprise network but lacks the robustness and scalability needed for carrier grade backbones. For this reason, there will always be a need for ATM in the backbone.

The architecture in the "NGN" provides seamless interoperability of services between the packet based network and the traditional PSTN. New "NGN" packet based capabilities will be developed to support AIN type features, while inter-operating with legacy PSTN/SS7/AIN. Large scale innovation in the IP based IN type capabilities (e.g. global number transparency, utilization of web based information, rich media communications) will create new services for IP enabled communication devices. Innovations on the PSTN will occur slowly, and may be restricted to maintaining interoperability of legacy PSTN with "NGN". In many cases, legacy PSTN components (e.g. SSP, SCP) will continue to evolve so that they can use common IP based packet switching technologies (e.g. IP, TCP, UDP), as opposed to using existing circuit switched technologies (e.g. MTP).

IN Requirements and Architecture in the Next Generation Network (NGN)

Given the huge revenues and global nature of PSTN services, as well as their use of SS7 and AIN technologies, components that allow interoperability between "NGN" and PSTN will need to be developed. These will include IP/PSTN Gateways, IP/PSTN address translators, IP/SS7 Gateways, IP enabled SSP's, and IP based Intelligent Peripherals. In addition to IN enablers, new components (as will be describe later) with features like directories, policies, user authentication, registration, session encryption, etc. will also be developed to enhance the IN capabilities. The NGN-IN enablers will provide the next level of intelligence in order to address communication over mixed media types, control of multiple session characteristics, collaborative communications needs, ubiquitous network access, "any to any" communications, and multimedia delivered information services. Note that these "NGN" components will continue to evolve to provide similar and enhanced capabilities in the "New Core".

The following provides a description of new components in the "NGN" and the "New Core" that provide enhanced IP based services. The Intelligent IP (I²P) Network enablers are categorized as follows:

Session Control (Bandwidth, Switching and Routing)
Media Control (Call Treatment such as media conversion)
Policy Management (Directory, Access control, Security)
Bandwidth Management (Transport and real time restoration)

The components for the "NGN" are described as individual functional units but may be combined for practicality on individual network devices as the requirements dictate. These components have been designed to operate in a distributed network environment to increase the flexibility of the NGN and New Core. The architecture provides a robust, secure and isolated messaging infrastructure for delivering control plane information to these devices.

This infrastructure includes a well defined message set for accessing the functions that are provided by these components and data that resides in the rules database. The control plane architecture is efficient and has a unique mechanism for sharing service, user and control data without duplication. This permits mobile NGN service users to maintain the same experience and have access to the same information regardless of where or how they access the network.

Example: Assuming a US based NGN service user was roaming in Europe and wanted to access the network but has the use of specific calling information stored in his profile database in the US, how would such a challenge be overcome without replicating the user's data onto every rules database on the NGN to ensure that the user would not be denied access to features and services which the user typically subscribed. Obviously, storing or replicating this data and then managing synchronicity over a worldwide network would be process intensive, costly and cumbersome. This intelligent network architecture addresses these issues efficiently with mechanisms that make remote data available locally for the duration of a session and then caches the information in short term non-volatile memory not in the foreign rules database server. In other words although a user's profile may be physically stored in a Rules database in the United States, the user may access the network from Europe and be automatically granted access to the specific services and features that normally would be available during his US service experience. The remote session controller in Europe would communicate with the cross network location register and rules database server to identify the subscriber's "home" rules database in order to collect the policies and profile of the subscriber for use in Europe; this is done by using the inter device message sets (command and control) over the control plane sub network. Unlike other mechanisms often employed, this mechanism does not replicate this information onto the local (European) rules database, making long term control data management predictable. The design is CORBA compliant and therefore can be interconnected with other standards based networks.

Rules Database server
  Determines Subscriber Profile
  Session requirements such as Bandwidth, Quality Of Service, Class Of Service
  Routing preferences based on Priority, Cost, Termination Location
  Media and Application requirements (Voice Telephone to Video Telephone, Multi-point, text to speech, Fax to E-mail etc.)
  Content Separation (Example: Tells the intelligent peripheral and protocol converter to separate the Audio stream from the data and video stream on an H.32x call; It may also instruct the protocol converter to process the stream so as to enable this audio stream to be fed to a destination which supports traditional analog voice hence the G.728/9 content from the H.32x session would be converted first to AD/PCM and then sent to a Class 5 circuit based switch and terminated on a circuit switched SS7 network POTS line)

Access Device (Session Control)
  Provides connectivity and session termination from customer premises to the NGN
  Acts as the hub for the various applications (Video, Voice, Fax, Web Data, Unified Messaging)
  Provides systems management and reporting functions May provide application multiplexing (allowing simultaneous multi application access)

Intelligent Peripheral (Media Control)
Provides services such as DTMF parsing, Voice prompting, Messaging, Speech recognition, Text to Speech, Text to Fax, etc.

Protocol Conversion (Policy Management)
Receives session requirements from Rules database
Selects and executes required filters to enable activation, processing and tear-down of sessions
Interfaces with existing CORE network to process information across NGN/Extended CORE
Filters and Converts signals from SS7 /ISDN to TCP/IP /H.323
Converts Signaling data from one format to another (example: G.728/9 to AD/PCM or Vocaltec to Vienna Systems, etc.)

Network Access Control Point (Session Control)
Similar to a switching node on an SS7 circuit switched network.
First or Last Access Point in the network
Provides actual call/session handling, routing and processing based on instructions from the Rules Database server Session Manager/Event Logger (Session Control)
This process or application is critical since it is the "glue" between the end user application and the communications network. It is responsible for collection and distribution of end-user session preferences, application requirements, access device capability and accounting policy information to the required "IN enabling" components. In summary its main functions are to:
Create the AMA/CDR and other usage records
Interfaces external $3^{rd}$ party Network Gateways.
Liase with Clearing Houses and Cross Network Location Registers
Feeds the Financial Infrastructure Cross Network (Roaming) Location Register (Policy Management)
Similar to the Home location register in the wireless/cellular telephony world. This functional component provides the required policies governing users who access third party networks and cross geographical boundaries. It keeps in constant contact with other cross network location registers of the geographically dispersed but inter-connected networks, exchanging accounting, service feature profile and control data for local and roaming subscribers.

"New Core" Network Architecture
Most of the attributes of the "New Core" will already be in place as part of "NGN". These include all intelligent components of the packet based "NGN" described above. The emergence of "New Core" signals the retirement of legacy PSTN network infrastructure. The traditional PSTN may never get removed from the public network, it may continue to be available as a universally accessible telecommunication service, highly subsidized and regulated by government agencies (AMTRAK model). But for the purposes for business and technical innovation, traditional PSTN network will largely become irrelevant.
As the PSTN based access methods go away, entirely IP based access methods will emerge in the "New Core", where all end devices connected to the "New Core" are IP enabled. All existing methods of wire-line based access (xDSL, T-1, T-3, fiber) will continue to provide access to IP based services over the "New Core". New access technologies (e.g. power-line) will emerge, but will still use the same packet based capabilities in the "New Core".

The trends observed in the "NGN" will continue with increased broadband access. Other access methods (cable, satellite, wireless) will also complete their transformation to the "New Core". These will all become IP enabled access technologies that will use the "New Core" for complete set of services, thus really providing seamless services across many different access technologies.

The Wireless Data Network Architecture

The current wireless "Core" network consists of wireless based access and roaming capabilities that inter-operate with wire-line PSTN "Core" infrastructure to provide interoperable PSTN services. As the PSTN migrates to "NGN" and "New Core", the wireless PSTN access infrastructure will also migrate to connect to "NGN" and "New Core" to provide wireless PSTN access services while utilizing new capabilities in the "NGN" and the "New Core". There will also be innovations in the wireless end-devices such that they will become IP enabled, and will thus allow a broad range of innovations by allowing mobility to the wire-line IP based service capabilities (e.g. web browsing, e-mail etc.). These wireless access methods to the "New Core" will be restricted to lower speeds due to the legacy nature of this wireless infrastructure while new broadband wireless access may emerge to provide a new set of IP enabled wireless devices that can provide broadband services over wireless/mobile devices. In Europe, significant improvements in technologies such as GSM have provided insight into some NGN and New CORE capabilities such as 300 Kilobits of access bandwidth to deliver information to hand-held wireless devices. The potential of such capabilities coupled with the traditional strengths of wireless communications such as roaming and error handling enabled by digitization, at this stage seems limitless when aggregated with the intelligence of the NGN and New CORE backbone.

LMDS is an emerging technology in the local high speed wire-less access, which utilizes the 25–35 GHz microwave spectrum for point to point and point to multi-point communications. The end users either share an antenna connected to a digital receiver which is connected to a channel bank. The application server be it voice (PBX), video (CODEC), or Data (Router or Switch) interfaces with the NGN via the channel bank. A session originates from the application which interacts with the server to request authentication (AAA), then a session is established between originator and destination application by routing the call through the NGN components such as Gateways and Switches.

The Emerging Satellite Data Network Architecture

In addition to the wireless access infrastructure, new service providers have emerged that are trying to use low earth orbiting satellites (LEOS) to build a new access as well as backbone network infrastructure. The earlier version of these networks were built using traditional PSTN service model, hence they lack the bandwidth scalability for data services. In the "New Core", these will migrate to new packet switched based broadband LEO infrastructure, which will provide both high speed access as well as high speed backbone in the packet based "NGN" and "New Core". A satellite based broadband access mechanism will also be very suitable for multi-point services that will be developed on the "New Core".

The Cable Network Architecture

Cable networks were developed for mainly broadband broadcast of analog video entertainment services. The current "Core" cable infrastructure is suitable to serve one way video broadcast. Cable service providers are now upgrading their cable infrastructure to support high speed internet access. Thus in the "NGN" scenario for cable networks, cable will provide a new access mechanism for IP services, while simultaneously transport video content using the current video broadcast technology. Thus the IP enabled devices attached to the "NGN" cable infrastructure can take advantage of all the new components and capabilities described in the wire-line "NGN". This will enable seam-less services between devices that are accessing the "NGN" via a wire-line or cable infrastructures. This "NGN" cable infrastructure can provide IP based telephony services using the same components of the wire-line "NGN" that provide IP telephony to wire-line IP devices.

The digital network segment that interfaces with the "NGN" comprises of a coaxial cable local loop which is connected to a cable data modulator running QAM/DPSK protocols. The coaxial loop is terminated at the customer premise by an Ethernet cable modem which delivers the IP Tone to the applications (Voice, Video, Data) that may reside on a PC or application server. The cable modems used provide users and applications with a wide range of bandwidth options from 2 to 10 Mbits per second depending on configuration and choice of equipment vendor.

With the evolution of the "New Core" in the wire-line, the cable will continue to provide another broadband access mechanism for IP based services. As the "New Core" matures and enhances in capabilities (probably 10 years away), such that it can provide high speed real-time video content (to provide same quality as cable), it can be envisaged that the cable will becomes an entirely IP access mechanism (just like all wire-line access becomes an IP access mechanism). Then the broadcast video content will be delivered to IP enabled cable attached devices just like any other rich media will be delivered over the IP network. It is even conceivable that video encoding technologies such as MPEG2 and motion JPEG will be further improved to deliver higher resolution digital media over the cable infrastructure using NGN and CORE delivery mechanisms. The network becomes transparent and the applications and content drive the creativity of the service creation process. The PSTN like services will be delivered to devices connected via cable access just like they are delivered to other wire-line connected devices on the "New Core".

NGN Creation Strategy

The network transformation plan comprises of the following phases

Strategy

Market Trial

Service Launch

Consolidation and Optimization

Strategy

Determine where our current network fits in the evolutionary continuum from CORE to NGN or New CORE. Having identified the appropriate positioning of the network, select an architectural scenario that best serves business and technical objectives of the engagement.

Market Trial

Develop and launch a market trial that would measure and assess the viability of the introduction of the proposed service. Additionally, this trial validates the approach to transform specific parts of the infrastructure towards the "NGN" and "New Core". The market trial provides the entry-exit criteria, metrics, Key Performance Indicators etc. to assess the success of the market trial.

Service Launch

Develop, plan and manage the detailed network, systems, process and program management aspects of the launch of a "New Core" that is applicable for the network based on the strategy developed above. This ensures that the network systems planned and developed will be future-ready. The OSS and back-office systems are be able to support the processes required for service creation and management in the "New Core". The network creation processes provides the program management tools to ensure that the launch is successfully executed. These include entry and exit criteria for network creation, KPIs for quality management, program planning and management tool-kits.

Service Consolidation and Optimization

As the network operator moves into operating and maintaining the "NGN", there will be many parallel market driven journeys during which services and capabilities will be developed for the "NGN". The network creation process provides tools to assist the client into improving efficiencies of these parallel journeys. These optimization efforts will include organizational, process and technology driven changes to create efficiency based on consolidation of processes, as well as measurement tools to determine the success of such consolidation. The network architecture roadmap and business blueprint will act as the foundation to ensure that during the consolidation phase the "NGN" maintains the required architecture framework to sustain it for the long term.

Now that the details regarding the NGN have been set forth, information will now be presented concerning billing when the quality of service is degraded.

Degraded Quality of Service and Billing

A typical telecommunication network comprises multiple telecommunication switches located throughout a geographical area. When a user makes a call, the call may be routed through one or more switches before reaching its destination.

Figure 12:
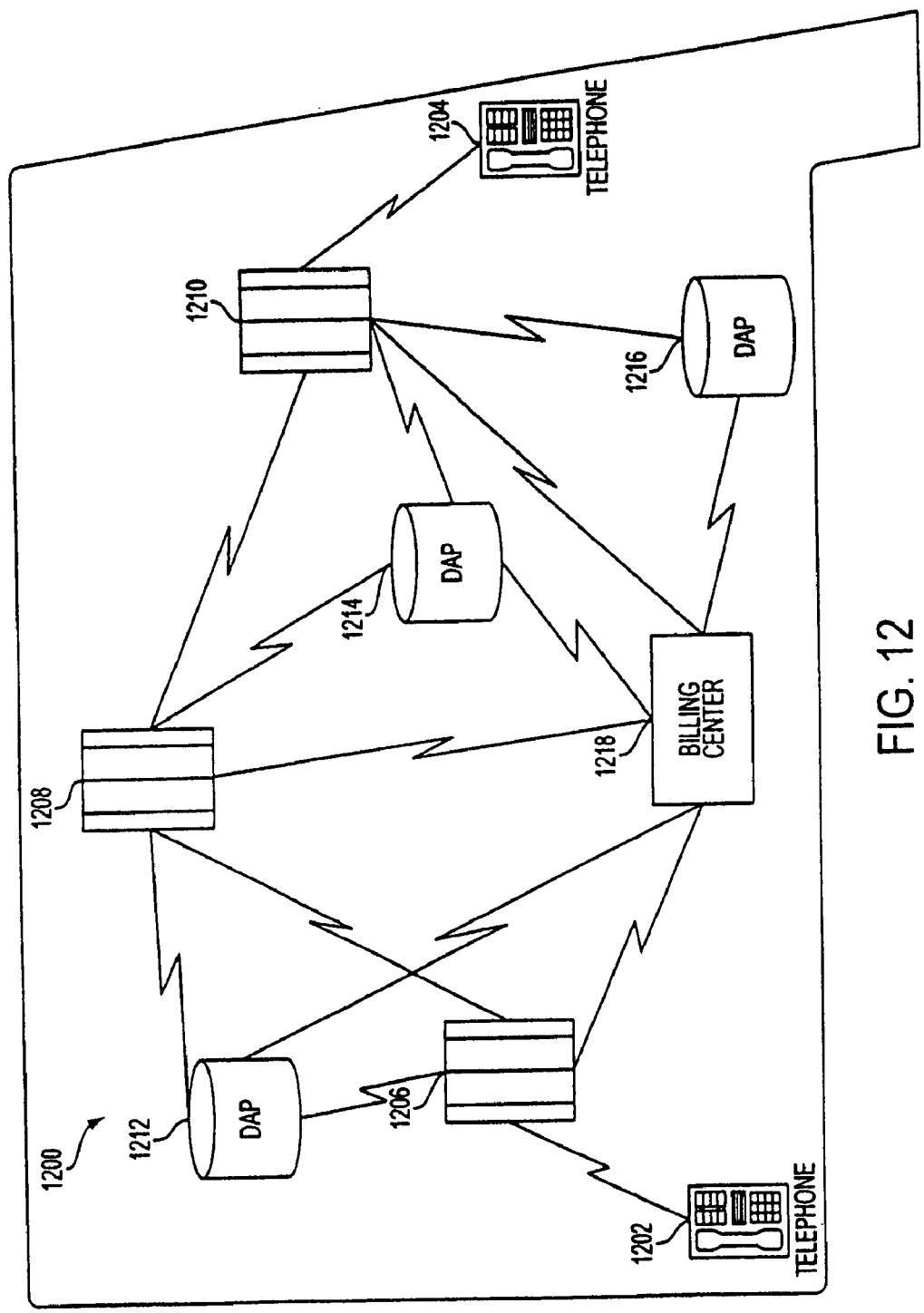
FIG. 12 is a block diagram of an exemplary telecommunications system in accordance with a preferred embodiment.

FIG. 12 illustrates an exemplary telecommunications system 1200 across the United States. For purposes of illustration, a caller 1202 places a call from Los Angeles, Calif. to a party 112 located in New York City, N.Y. Such a call is typically transmitted across three (3) switches: the Los Angeles, Calif. switch 1206; the Chicago, Ill. switch 1208; and the New York City, N.Y. switch 1210. In this scenario, the originating switch is the Los Angeles, Calif. switch 1206, and the terminating switch is the New York City, N.Y. switch 1210.

Each of the switches, 1206–1210, is connected to two (2) or more Data Access Points (DAP) 1212–1216, for instance a primary DAP 1212–1216 and a backup DAP 1212–1216. A DAP 1212–1216 is a facility that receives requests for information from the switches 12166–1210, processes the requests, and returns the requested information back to the requesting switch 1206–1210. The switches 1206–1210 use information from the DAPs 1212–1216 to process calls through the network.

When a call passes through one of the switches, 1206–1210, that switch creates a call record. The call record contains information on the call, including but not limited to: routing, billing, call features, and trouble shooting information. After the call is terminated, each switch 1206–1210 that processed the call completes the associated call record. The switches 1206–1210 combine multiple call records into a billing block.

When a switch 1206–1210 fills the billing block, the switch 1206–1210 sends the billing block to a billing center 1218. Thus, the billing center 1218 receives one billing block from each switch 1206–1210 that handled the call, which in this case would be three billing blocks. The billing center 1218 searches each billing block and retrieves the call record associated with the call, thereby retrieving one call record per switch 1206–1210 that handled the call. The billing center 1218 then uses one or more of the retrieved call records to generate a billing entry. The billing center 1218 is also connected to each DAP 1212–1216 to retrieve information regarding a switch 1206–1210 or call record. However, billing in the present invention is increased because the hybrid network also contains proxy intelligence.

Figure 13:
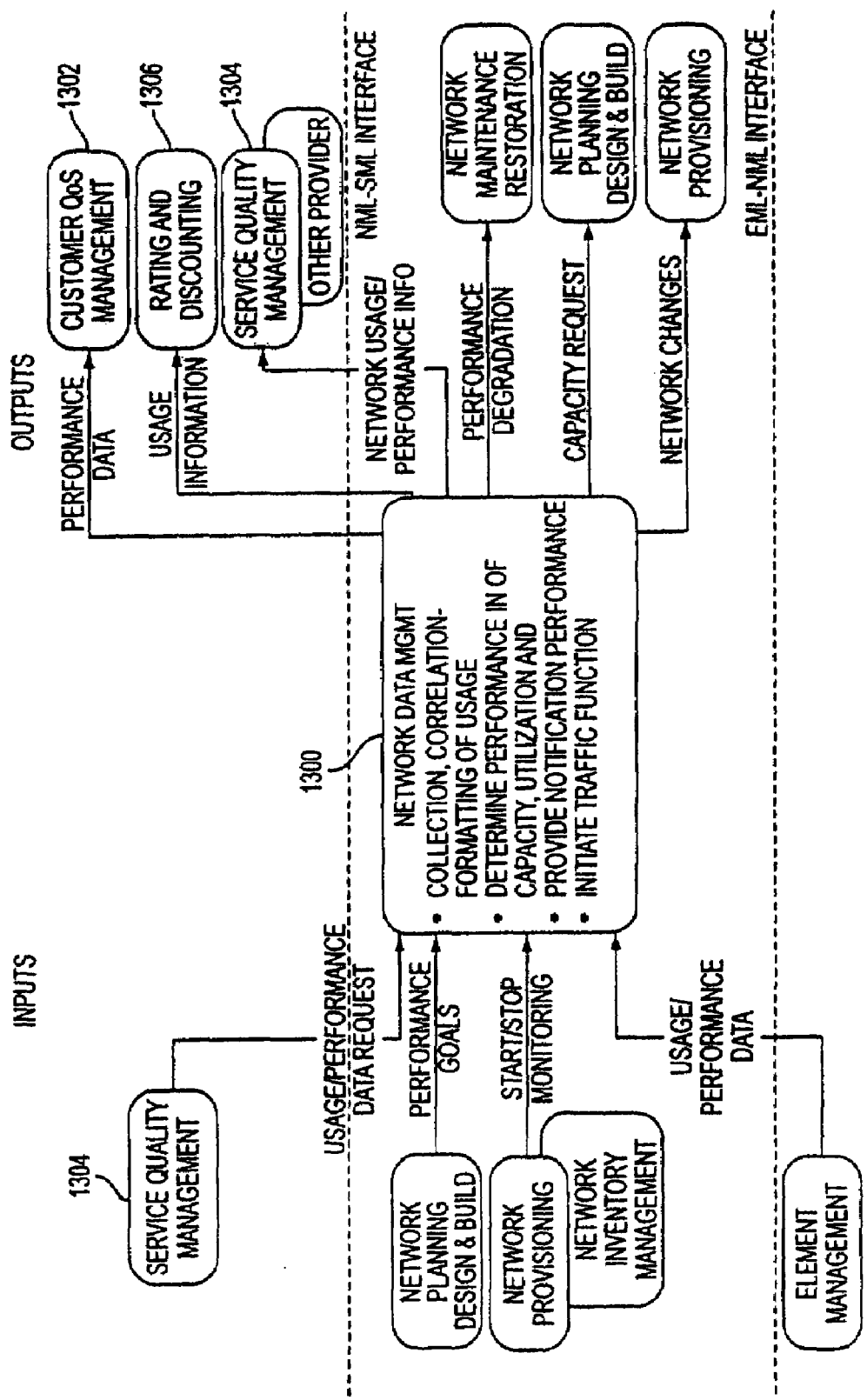
FIG. 13 shows a block diagram of the Network Data Management in accordance with a preferred embodiment.

FIG. 13 shows a block diagram of the Network Data Management 1300 in accordance with a preferred embodiment of the present invention. Network Data Management 1300 encompasses the collection of usage data and events for the purpose of network performance and traffic analysis. This data may also be an input to Billing (Rating and Discounting) processes at the Service Management Layer, depending on the service and its architecture.

The process provides sufficient and relevant information to verify compliance/non-compliance to Service Level Agreements (SLA). The process provides sufficient usage information for rating and billing.

This process ensures that the Network Performance goals are tracked, and that notification is provided when they are not met (threshold exceeded, performance degradation). This also includes thresholds and specific requirements for billing. This includes information on capacity, utilization, traffic and usage collection. In some cases, changes in traffic conditions may trigger changes to the network for the purpose of traffic control. Reduced levels of network capacity can result in requests to Network Planning for more resources.

Figure 14:
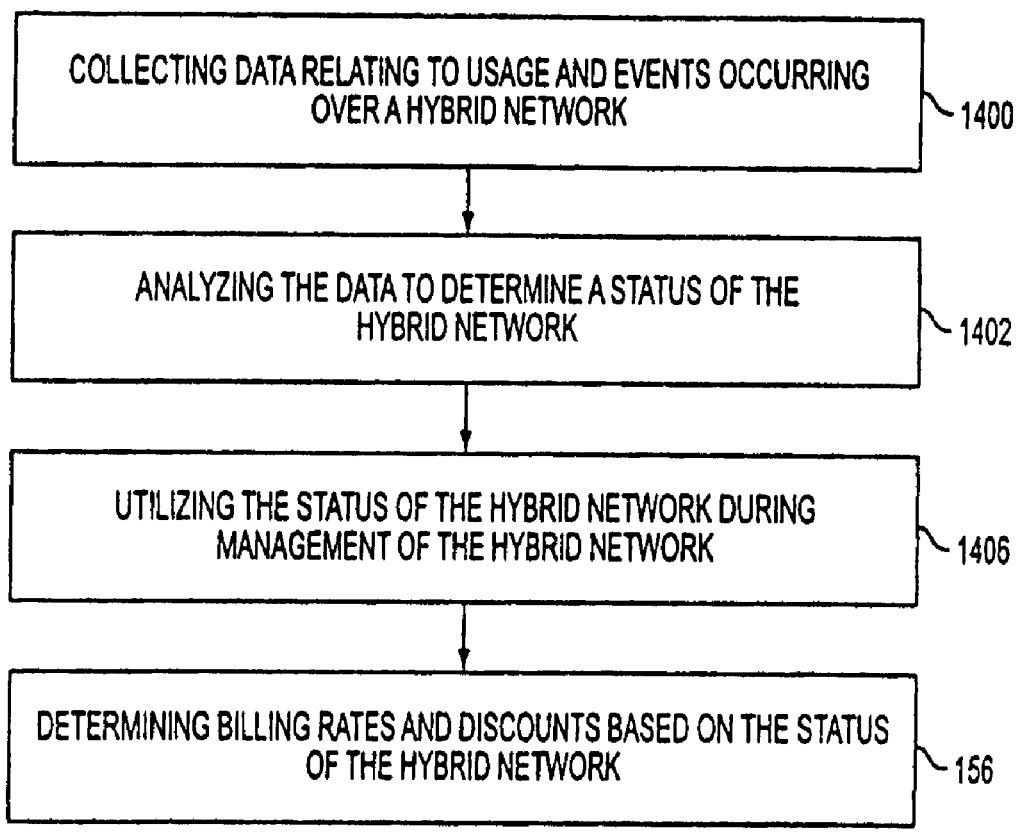
FIG. 14 is a flowchart illustrating a Network Data Management process in accordance with a preferred embodiment.

FIG. 14 is a flowchart illustrating a network data management process in accordance with a preferred embodiment. First, in step 1400, data is collected relating to usage and events occurring over a hybrid network. Next, in step 1402, the data is analyzed to determine a status of the hybrid network which in turn, in step 1404, is utilized during management of the hybrid network. Further, in step 1406, billing rates and discounts are determined based on the status of the hybrid network.

Figure 15:
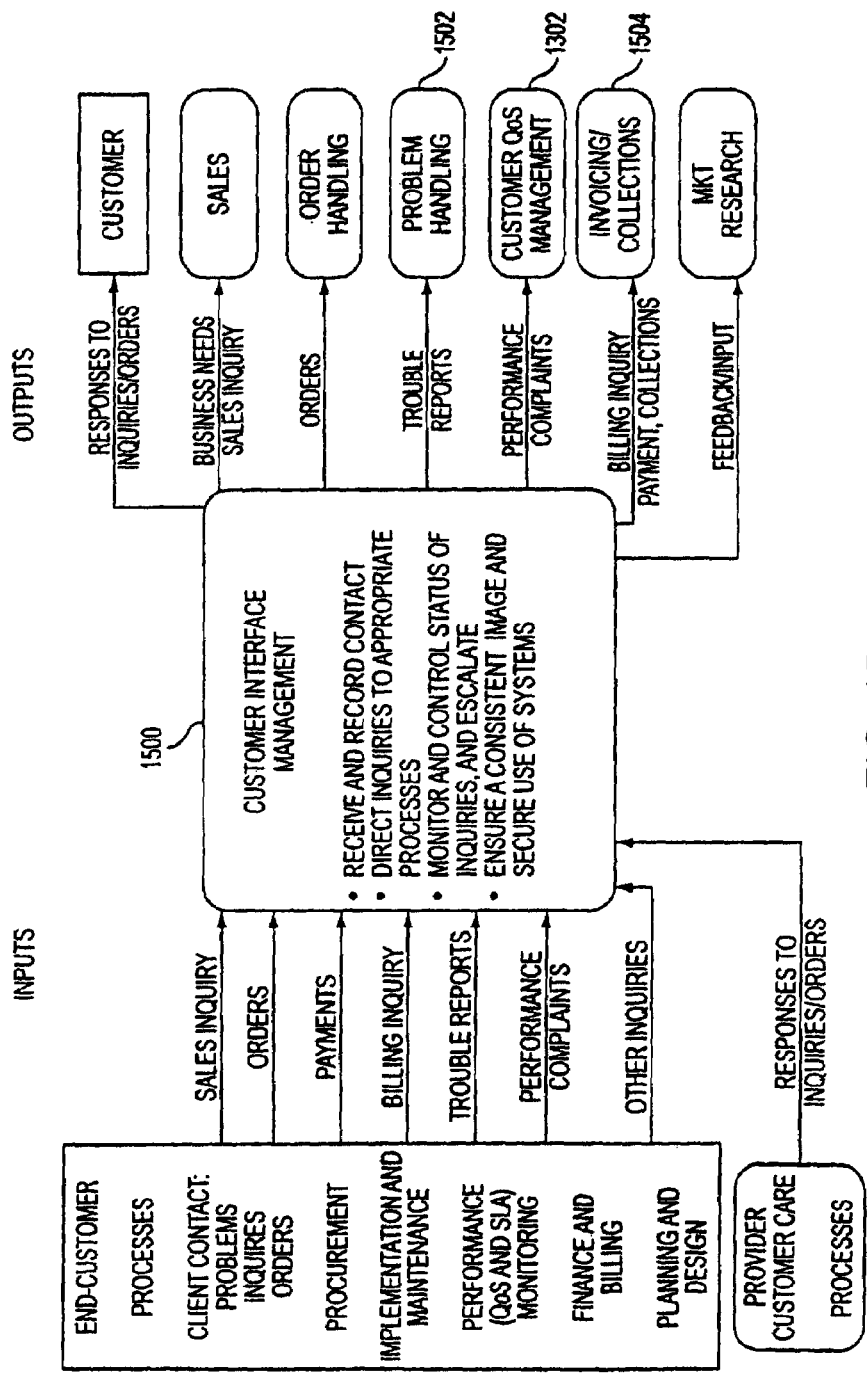
FIG. 15 shows a block diagram of the Customer Interface Management Process in accordance with a preferred embodiment.

In addition to the Network Data Management 1300 generating billing events, the present invention also uses a Customer Interface Management process 132, as shown in FIG. 15, to directly interact with customers and translate customer requests and inquiries into appropriate "events" such as, the creation of an order or trouble ticket or the adjustment of a bill. This process logs customer contacts, directs inquiries to the appropriate party, and tracks the status to completion. In those cases where customers are given direct access to service management systems, this process assures consistency of image across systems, and security to prevent a customer from harming their network or those of other customers. The aim is to provide meaningful and timely customer contact experiences as frequently as the customer requires.

Figure 16:
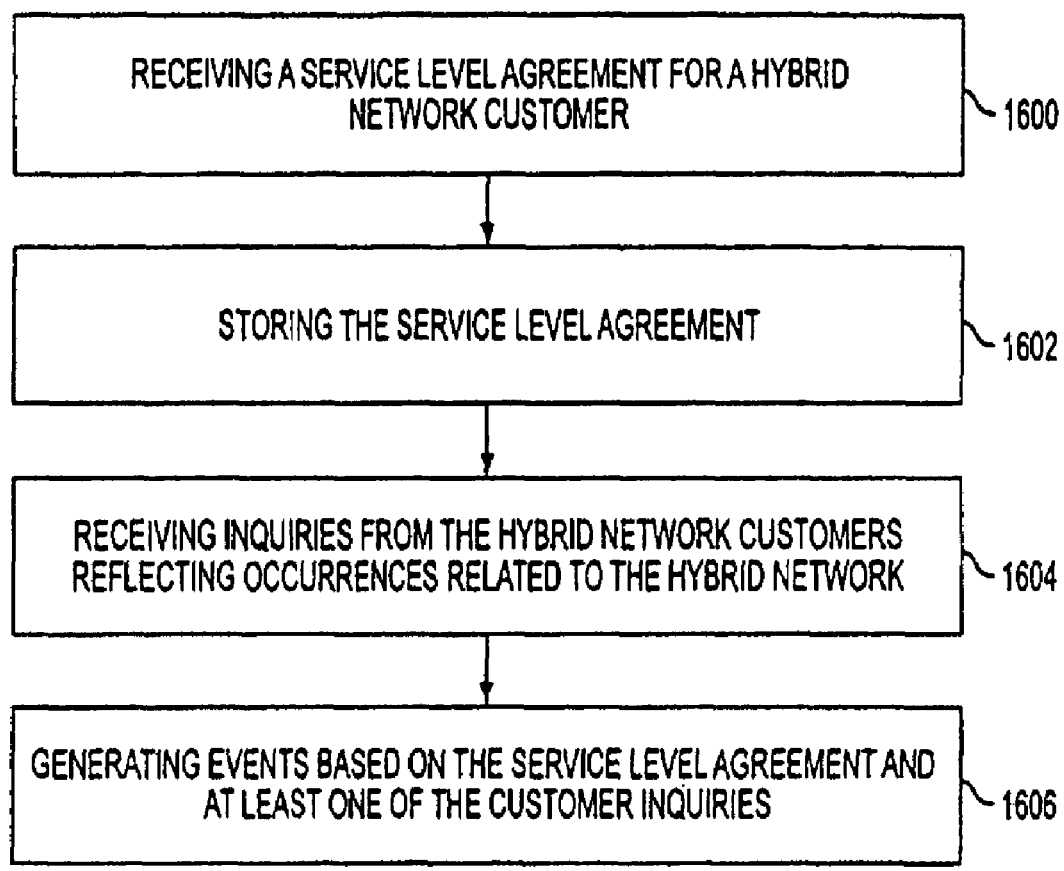
FIG. 16 is a flowchart illustrating a Customer Interface Management Process in accordance with a preferred embodiment.

FIG. 16 is a flowchart illustrating a Customer Interface Management Process in accordance with a preferred embodiment. First, in step 1600, a service level agreement is received for a hybrid network customer. Next, in step 1602, the service level agreement is stored after which, in step 1604, inquiries are received from network customers reflecting occurrences related to the hybrid network. Thereafter, in step 1606, events are generated based on the customer inquiries and the service level agreement.

Figure 17:
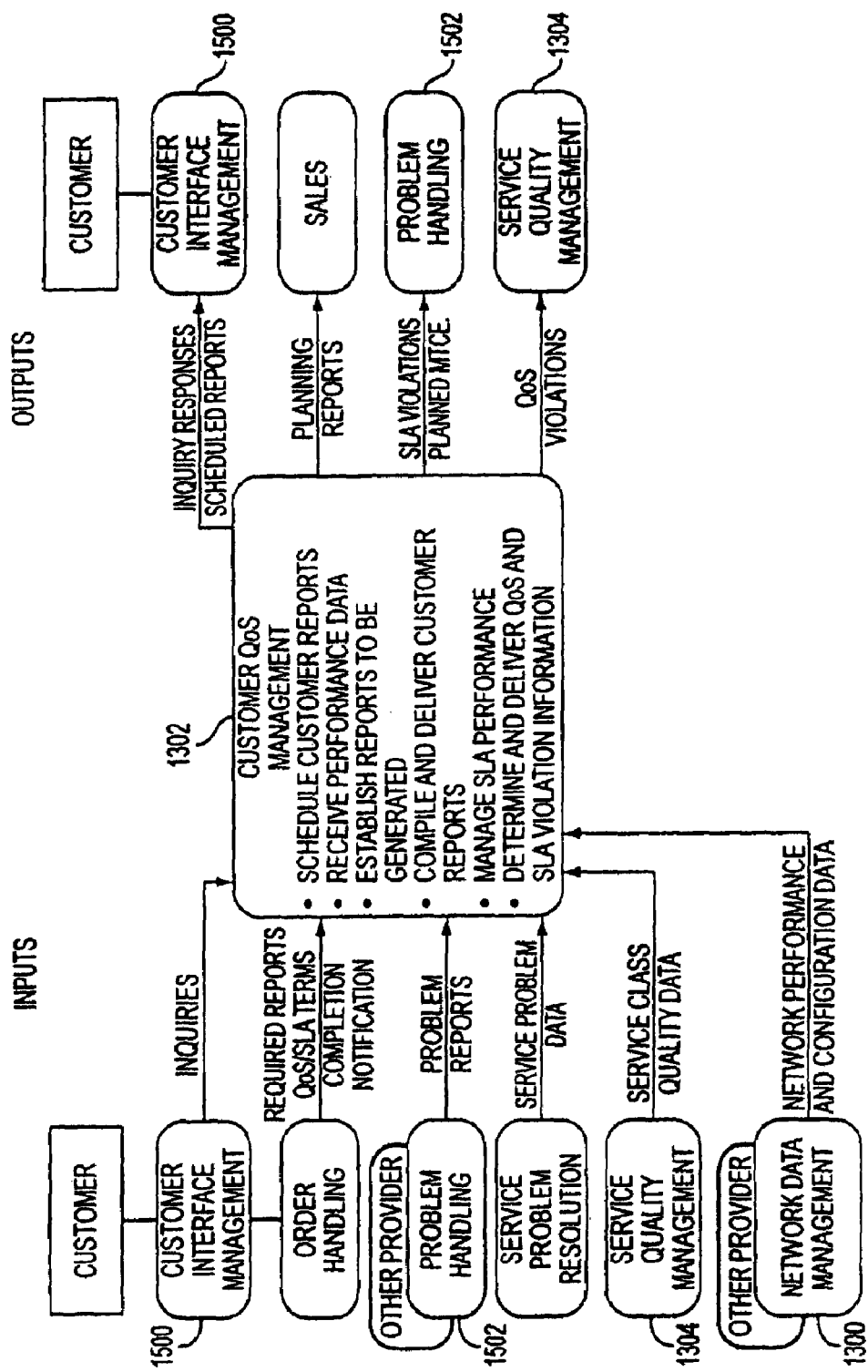
FIG. 17 shows a block diagram of the Customer Quality of Service Management Process in accordance with a preferred embodiment.

The Network Data Management 1300 and Customer Interface Management process 1500 are used to give information to the Customer Quality of Service Management Process 1302, as shown in FIG. 17. The Customer Quality of Service Management Process 1302 encompasses monitoring, managing and reporting of quality of service as defined in Service Descriptions, Service Level Agreements (SLA), and other service-related documents. It includes network performance, but also performance across all of service parameters, e.g., Orders Completed On Time. Outputs of this process are standard (predefined) and exception reports, including; dashboards, performance of a service against an SLA, reports of any developing capacity problems, reports of customer usage patterns, etc. In addition, this process responds to performance inquiries from the customer. For SLA violations, the process supports notifying Problem Handling and for QoS violations, notifying Service Quality Management 1304. The aim is to provide effective monitoring. Monitoring and reporting must provide SP management and customers meaningful and timely performance information across the parameters of the services provided. The aim is also to manage service levels that meet specific SLA commitments and standard service commitments.

Figure 18:
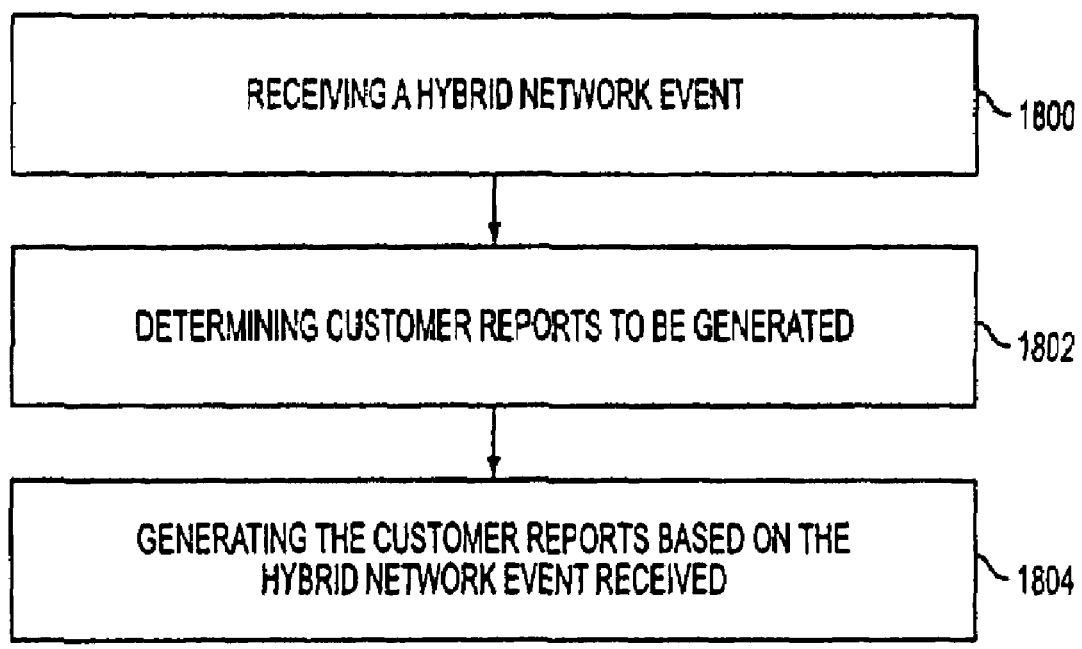
FIG. 18 is a flowchart illustrating a Customer Quality of Service Management Process in accordance with a preferred embodiment.

FIG. 18 is a flowchart illustrating a Customer Quality of Service Management Process in accordance with a preferred embodiment. First, in step 1800, a hybrid network event is received which may include customer inquiries, required reports, completion notification, quality of service terms, service level agreement terms, service problem data, quality data, network performance data, and/or network configuration data. Next, in step 1802, the system determines customer reports to be generated and, in step 1804, generates the customer reports accordingly based on the event received.

Figure 19:
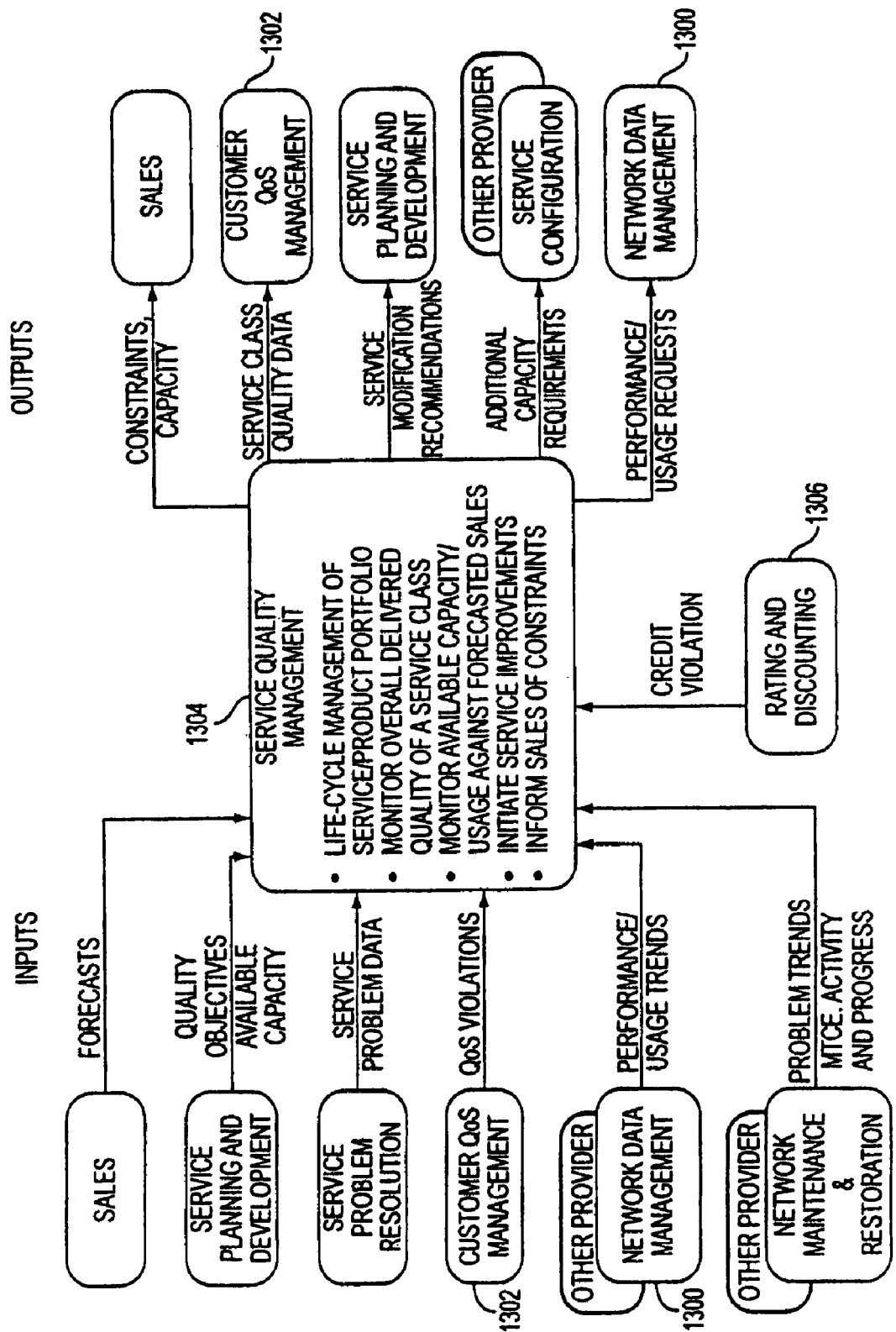
FIG. 19 shows a block diagram of the Service Quality Management in accordance with a preferred embodiment.

FIG. 19 shows a block diagram of the Service Quality Management 1304 in accordance with a preferred embodiment of the present invention. The Service Quality Management Process 1304 supports monitoring service or product quality on a service class basis in order to determine:

Whether service levels are being met consistently

Whether there are any general problems with the service or product

Whether the sale and use of the service is tracking to forecasts.

This process also encompasses taking appropriate action to keep service levels within agreed targets for each service class and to either keep ahead of demand or alert the sales process to slow sales. The aim is to provide effective service specific monitoring, management and customers meaningful and timely performance information across the parameters of the specific service. The aim is also to manage service levels to meet SLA commitments and standard commitments for the specific service.

Figure 20:
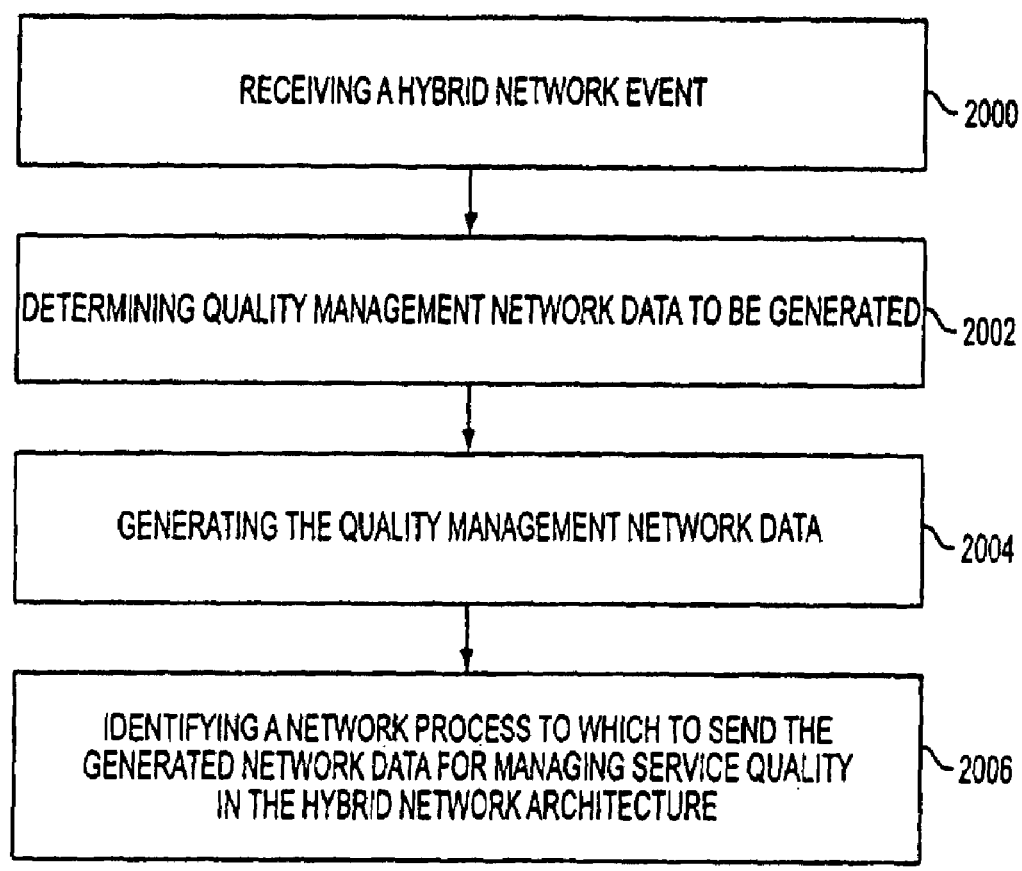
FIG. 20 is a flowchart illustrating a Service Quality Management Process in accordance with a preferred embodiment.

FIG. 20 is a flowchart illustrating a Service Quality Management Process in accordance with a preferred embodiment. First, in step 2000, a hybrid network event is received that may include forecasts, quality objectives, available capacity, service problem data, quality of service violations, performance trends, usage trends, problem trends, maintenance activity, maintenance progress, and/or credit violations. Next, in step 2002, quality management network data is determined and, in step 2004, the quality management network data is generated. Such quality management network data may include constraint data, capacity data, service class quality data, service modification recommendations, additional capacity requirements, performance requests, and/or usage requests. Finally, in step 2006, a network process to which to send the generated data is identified.

Figure 21:
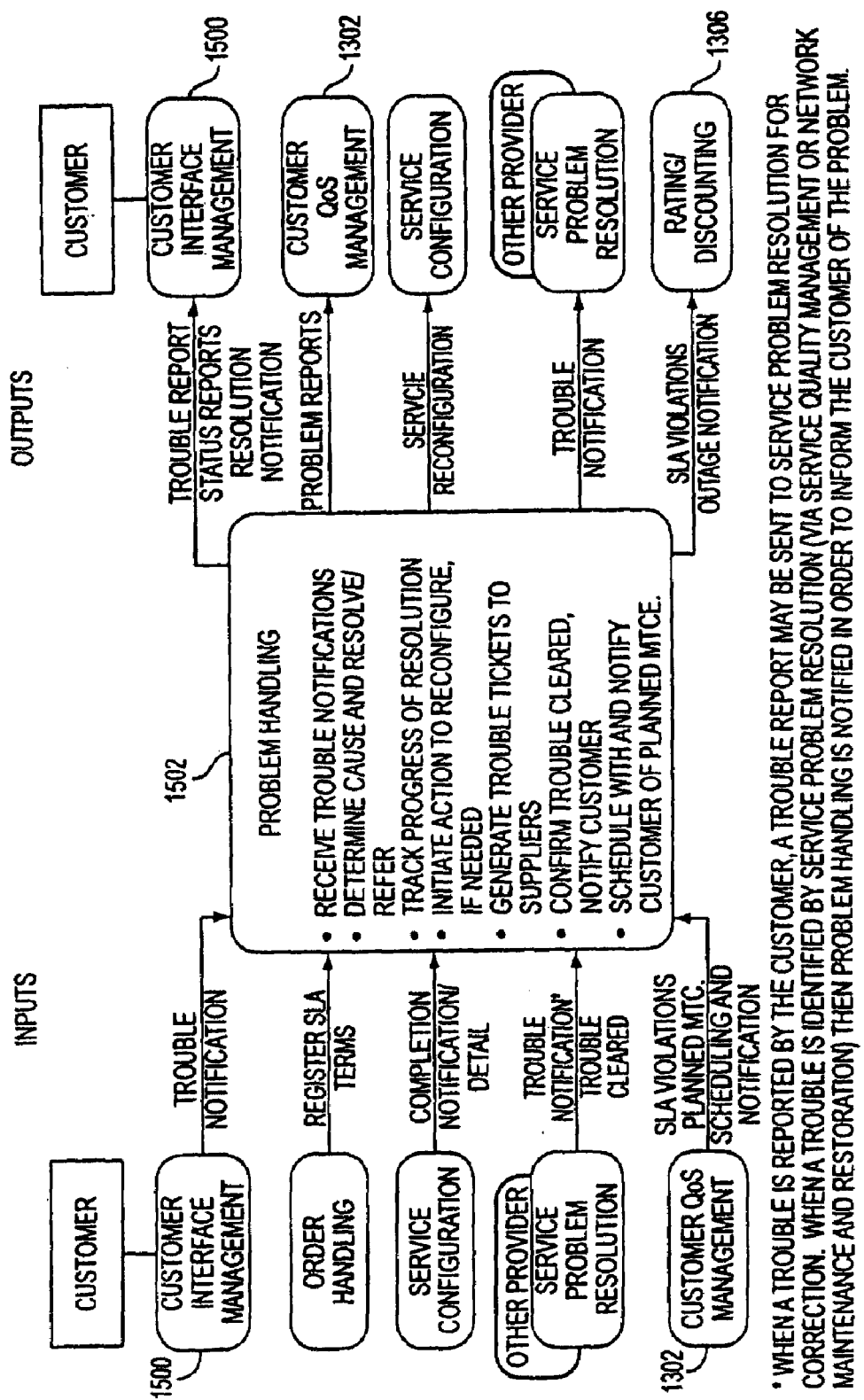
FIG. 21 shows a block diagram of the Problem Handling Process in accordance with a preferred embodiment.

FIG. 21 shows a block diagram of the Problem Handling Process 1502. The Problem Handling Process receives information from the Customer Interface Management Process 1500 and the Customer Quality of service Management Process 1302. It is responsible for receiving service complaints from customers, resolve them to the customer's satisfaction and provide meaningful status on repair or restoration activity. This process is also responsible for any service-affecting problems, including:

notifying the customer in the event of a disruption (whether reported by the customer or not),
resolving the problem to the customer's satisfaction, and providing meaningful status on repair or restoration activity.

This proactive management also includes planned maintenance outages. The aim is to have the largest percentage of problems proactively identified and communicated to the customer, to provide meaningful status and to resolve in the shortest timeframe.

Figure 22:
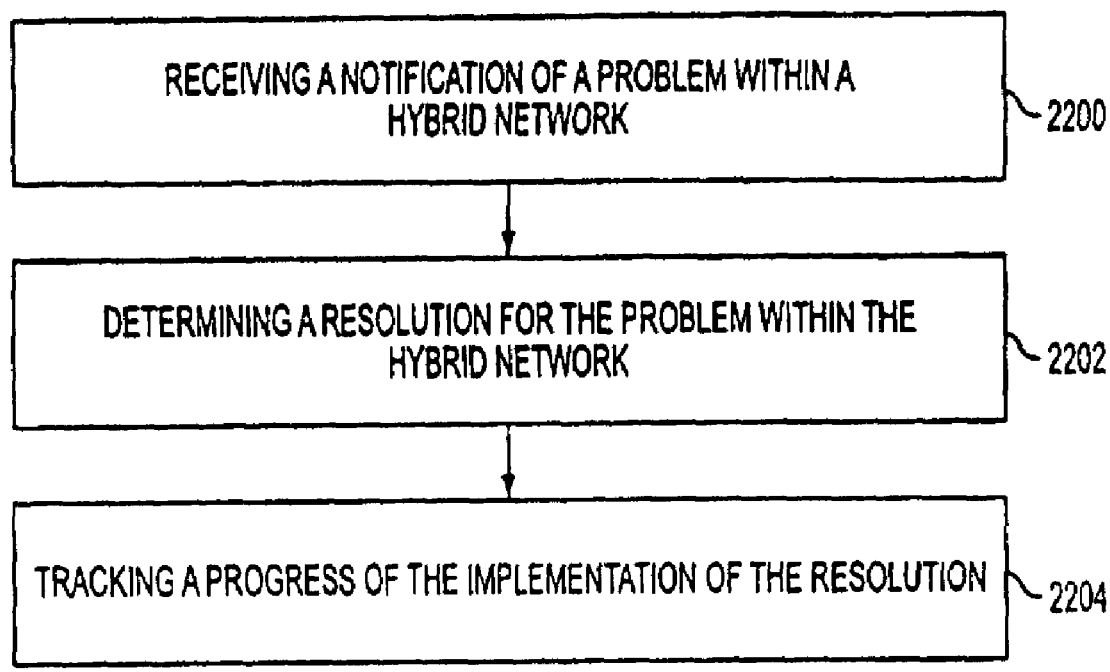
FIG. 22 is a flowchart illustrating a Problem Handling Management Process in accordance with a preferred embodiment.

FIG. 22 is a flowchart illustrating a Problem Handling Management Process in accordance with a preferred embodiment. First, in step 2200, a notification of a problem within a hybrid network is received by the system. Next, in step 2202, a resolution for the problem within the hybrid network is determined. The resolution may include a status report, resolution notification, problem reports, service reconfiguration, trouble notification, service level agreement violations, and/or outage notification. Finally, in step 2204, the progress of the implementation of the resolution is tracked.

Figure 23:
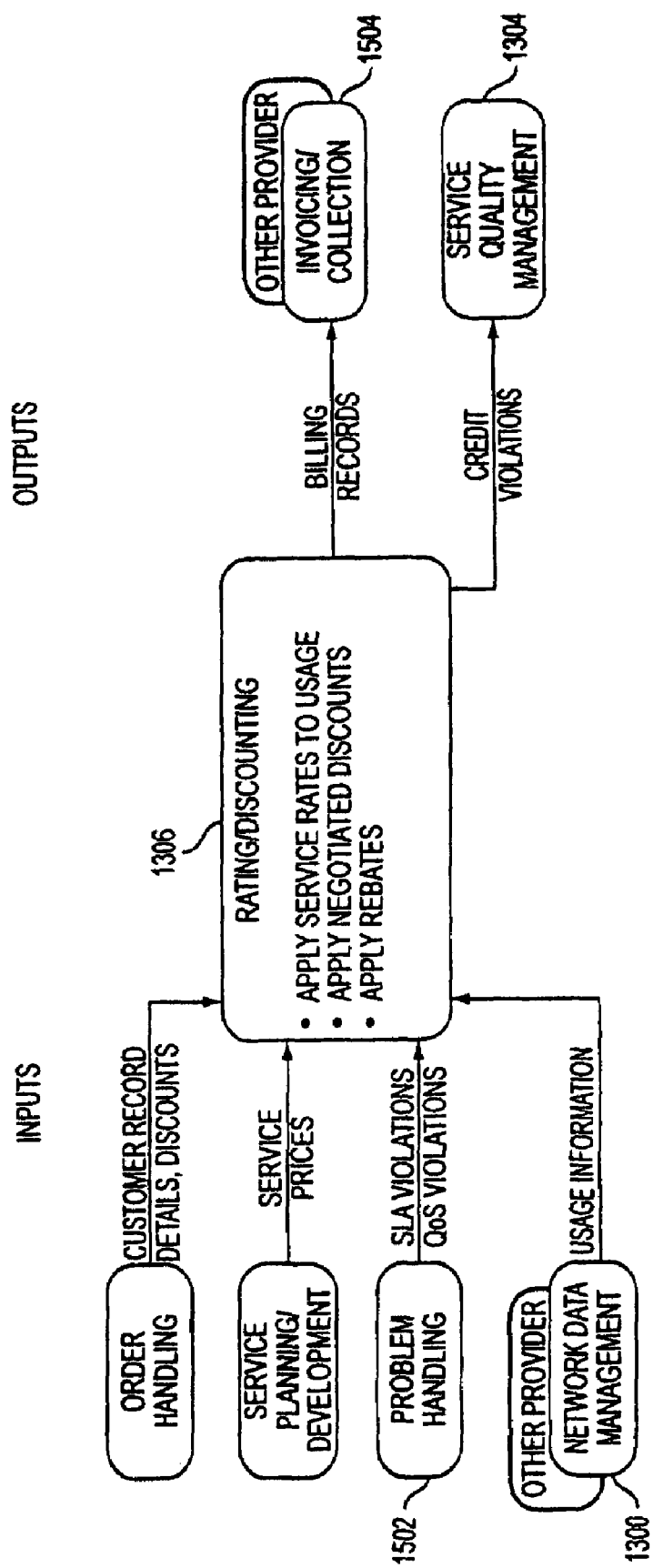
FIG. 23 shows a block diagram of the Rating and Discounting Process in accordance with a preferred embodiment.

The Problem Handling Process 1502 and the Network Data Management 1300 feed information to the Rating and Discounting Process 1306, as shown in FIG. 23.

This process applies the correct rating rules to usage data on a customer-by-customer basis, as required. It also applies any discounts agreed to as part of the Ordering Process, for promotional discounts and charges, and for outages. In addition, the Rating and Discounting Process 1306 applies any rebates due because service level agreements were not met. The aim is to correctly rate usage and to correctly apply discounts, promotions and credits.

Figure 24:
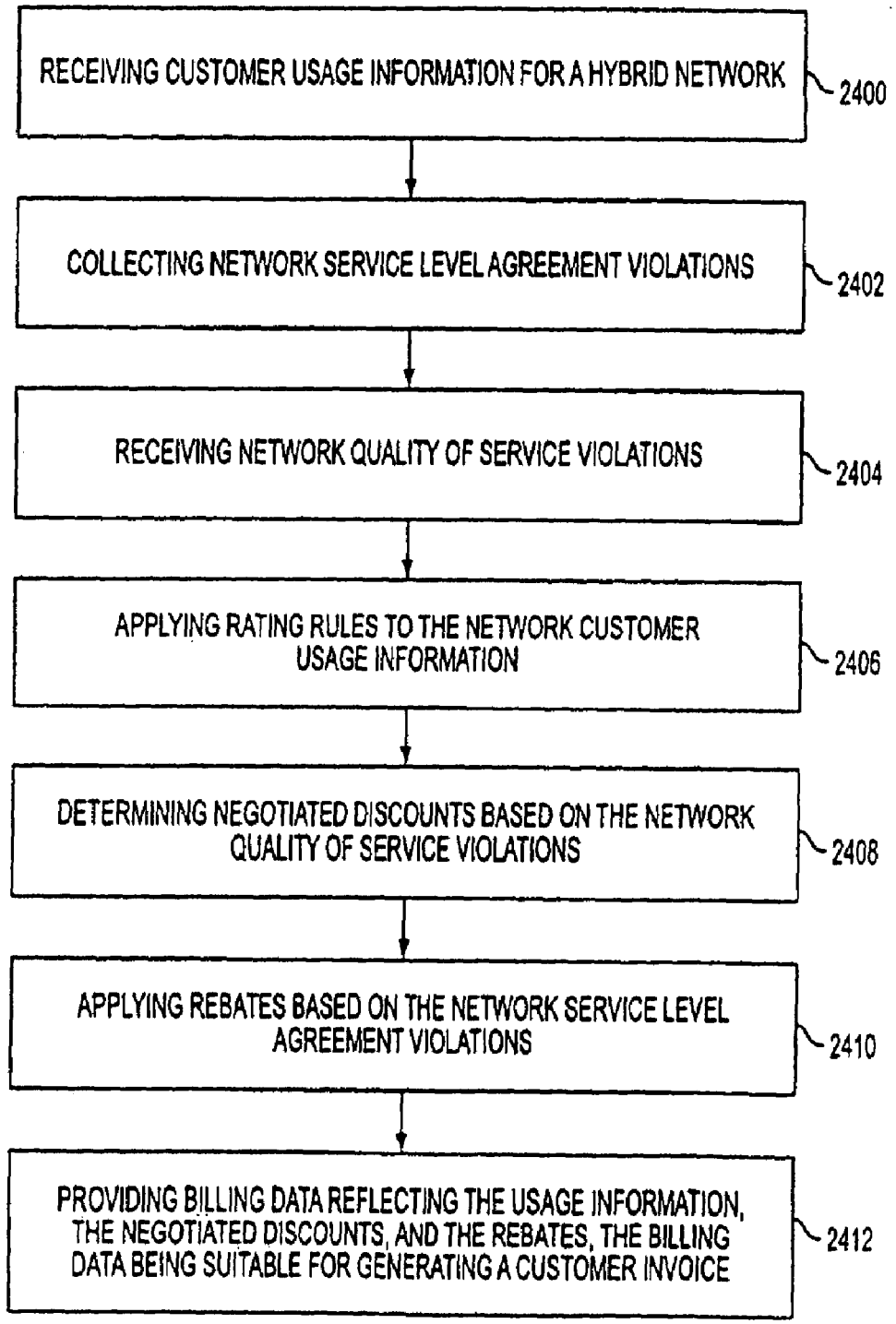
FIG. 24 is a flowchart illustrating Rating and Discounting Process in accordance with a preferred embodiment.

FIG. 24 is a flowchart illustrating Rating and Discounting Process in accordance with a preferred embodiment. First, in step 2400, hybrid network customer usage information is received. In step 2402, network service level agreement violations are collected and, in step 2404, network quality of service violations are received by the Rating and Discounting system. Next, in step 2406, rating rules are applied to the network customer usage information. Further, in step 2408, negotiated discounts are determined based on the network quality of service violations and, in step 2410, rebates are determined based on the network service level agreement violations. Thereafter, in step 2412, billing data reflecting the usage information, the negotiated discounts, and the rebates is provided to generate a customer invoice.

Figure 25:
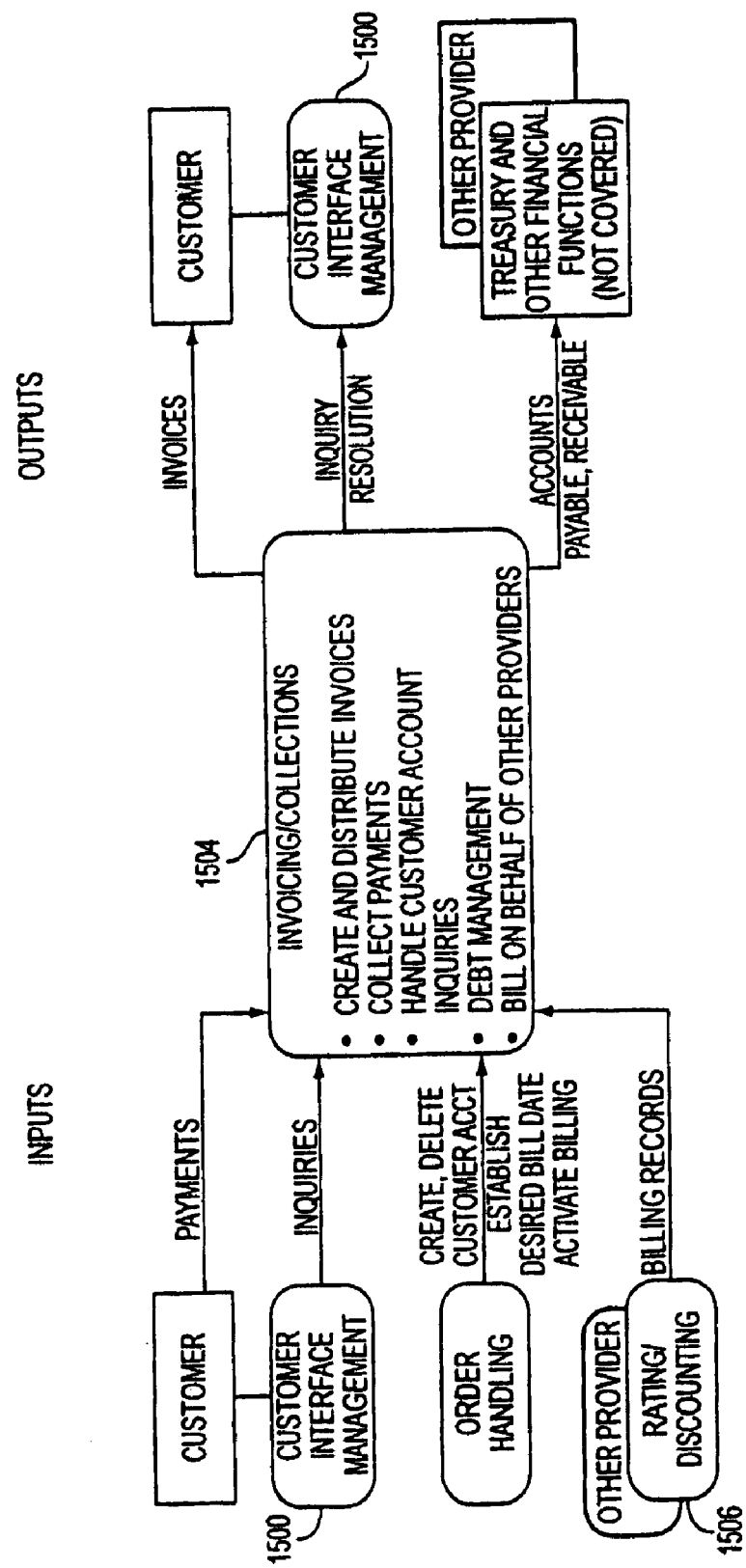
FIG. 25 shows a block diagram of the Invoice and Collections Process in accordance with a preferred embodiment.

Utilizing information from the Rating and Discounting Process 1306, the Invoice and Collections Process 1504, as shown in FIG. 25, creates correct billing information. This process encompasses sending invoices to customers, processing their payments and performing payment collections. In addition, this process handles customer inquiries about bills, and is responsible to resolve billing problems to the customer's satisfaction. The aim is to provide a correct bill and, if there is a billing problem, resolve it quickly with appropriate status to the customer. An additional aim is to collect money due the service provider in a professional and customer supportive manner.

Figure 26:
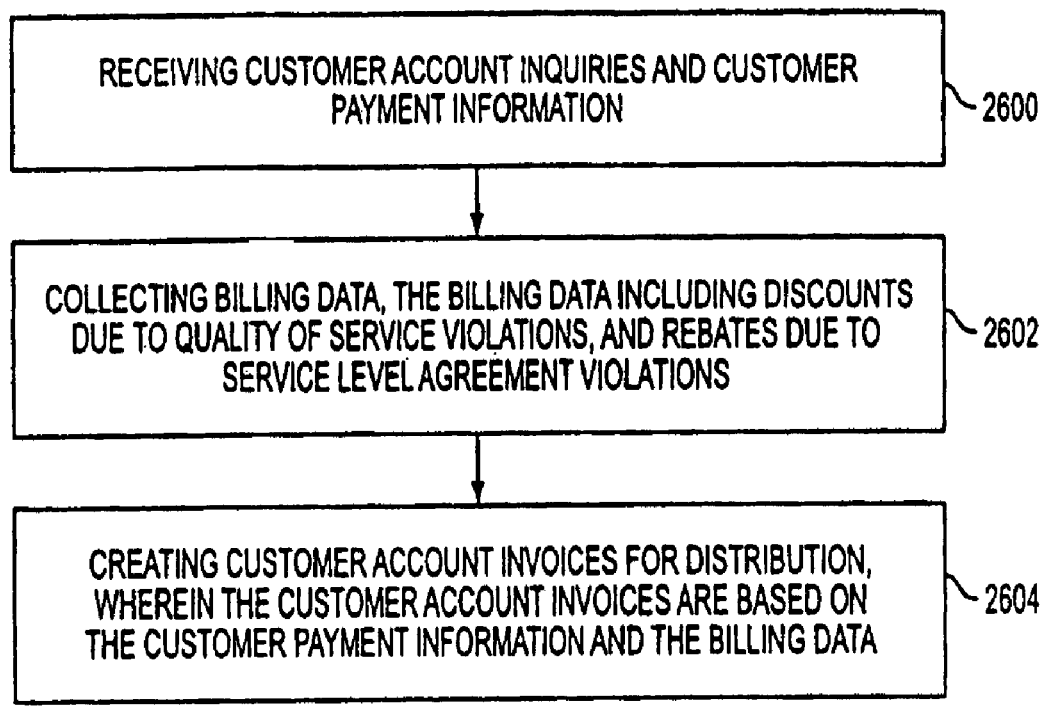
FIG. 26 is a flowchart illustrating an Invoice and Collections Process in accordance with a preferred embodiment.

FIG. 26 is a flowchart illustrating an Invoice and Collections Process in accordance with a preferred embodiment. First, in step 2600, customer account inquiries and customer payment information is received by the system. Next, in step 2602, billing data, including discounts due to quality of service violations and rebates due to service level agreement violations, is collected and processed. Thereafter, in step 2604, customer account invoices are created for distribution based on the customer payment information and the billing data.

Mediation and activity tracking are provided by the event logger and event manager. The event logger and event manager feed the rating and billing information for degraded service using the personally customized rules database. Utilizing an expert system for the tailored capabilities of each customer, the event driver, collector and manager analyze notification events generated by the system. When a notification event is received the system analyzes the event and uses it to identify the customer. The notification event is also used to credit the customer if they experience a non-impacting event that breaches the customer's contract. In addition to the system itself generating the notification event, the customer is also able to notify the provider directly should such an event occur.

Figure 27:
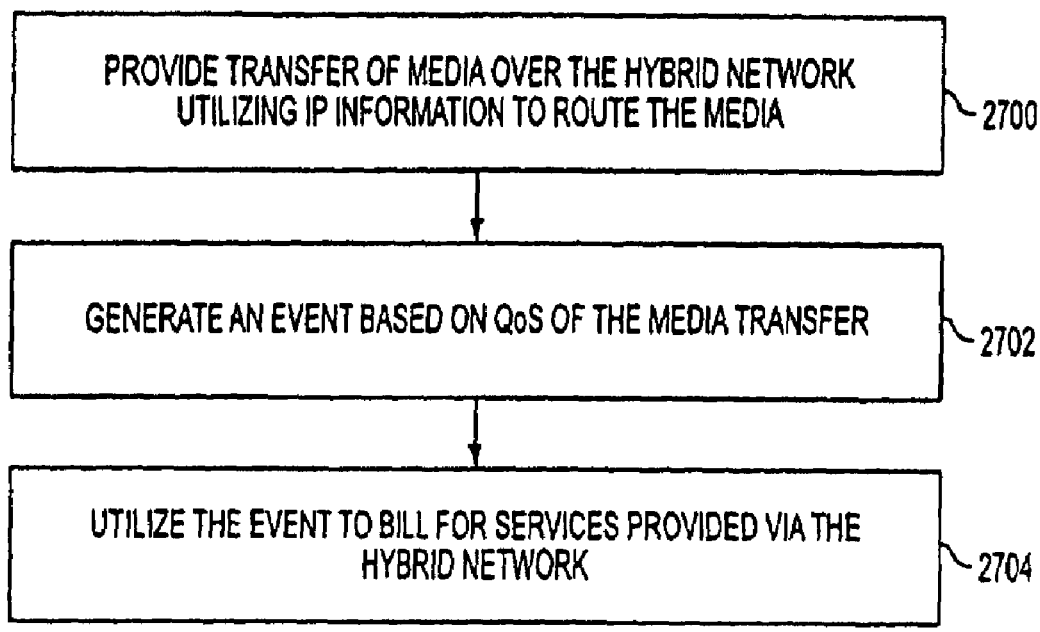
FIG. 27 is a flowchart showing illustrating media communication over a hybrid network in accordance with a preferred embodiment.

FIG. 27 is a flowchart illustrating media communication over the hybrid network of the present invention. When a customer initiates a use of the hybrid network, the hybrid network, in a first step 2700, transfers the media over the network using IP information to route it to the appropriate destination. The media transferred over the network may be telephony data, image data, or any other data capable of packet switched transmission.

In a second step 2702, events are generated based on the quality of service of the media transfer. As discussed above with reference to FIG. 17 and FIG. 19, these events include performance notifications due to SLA violations, and customer generated events from the Customer Interface Management Process 1500.

In a third step 2704, the events generated in step 2702 are utilized to generate a bill for the customer. In addition to normal billing for service provided via the hybrid network, the bill is modified based on events generated during the media transfer. For example, events representing SLA violations are used to credit customers. As discussed above with reference to FIGS. 21, 23, and 25, the Problem Handling Process 1502 is responsible for receiving service complaints and other service-affecting problems. Together with the Network Data Management 1300, the Problem Handling Process feeds data to the Discounting Process 1306. The Discounting Process 1306 applies the correct rating rules on a customer-by-customer basis, and applies discounts for events, such as outages and other SLA violations. Finally, the Invoice and Collections Process 1504, utilizes the information from the Discounting Process 1306 to create customer billing information.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location, which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record causes unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises when using only local switch time in that there is no accommodation for time changes due to daylight savings time. In addition, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision, such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

There is also a need to match all of the call records associated with a specific telephone call. For example, for proper billing and cost control, it is necessary for the billing center to match the originating switch's call record to the terminating switch's call record. Also, for troubleshooting and security purposes, it may be necessary to trace a specific telephone call through the network with ease in order to isolate problem areas.

Therefore, there is a need for switches of a telecommunications network to uniquely identify each telephone call that traverses the network, thereby uniquely identifying all of the call records associated with a specific telephone call.

An Embodiment

Call Record Format

An embodiment solves the problem of providing a flexible and expandable call record format by implementing both a small and a large call record format. In particular, the embodiment implements a default 32-word call record format, plus an expanded 64-word call record format. An embodiment uses a 32-word call record format for the typical telephone call, which comprises the majority of all telephone calls, and uses a 64-word call record format when additional information is needed regarding the call. This implementation provides the flexibility needed to efficiently manage varying data requirements of a given call record. New call features can be developed and easily incorporated into the variable call record format of the present invention.

This embodiment also records timepoints in the epoch time format. The embodiment records the origination time of a call in epoch time format, and the remaining timepoints are offsets, or the number of seconds, from that origination time. This embodiment solves the problems associated with converting to and from daylight savings time because daylight savings time is a local time offset and does not affect the epoch time. Furthermore, the timepoints in epoch time format require less space in the call record than they do in local switch time format.

The epoch time format may represent coordinated universal time (UTC), as determined at Greenwich, England, which has a time zone of zero (0) local switch time, or any other time. Epoch time is only a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

Network Call Identifier

This embodiment solves the problem of uniquely identifying each telephone call and all of the call records associated with a specific telephone call by providing a unique identifier to each call record. It generates a network call identifier (NCID) that is assigned to each call record at the point of call origination, that is, the originating switch generates an NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This embodiment also provides the switch capability of discarding a received NCID and generating a new NCID. A switch discards a received NCID if the NCID format is invalid or unreliable, thereby ensuring a valid unique identifier to be associated with each call going through the network. For instance, an NCID may be unreliable if generated by third party switches in the telecommunications network.

This embodiment relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The embodiment also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 28:
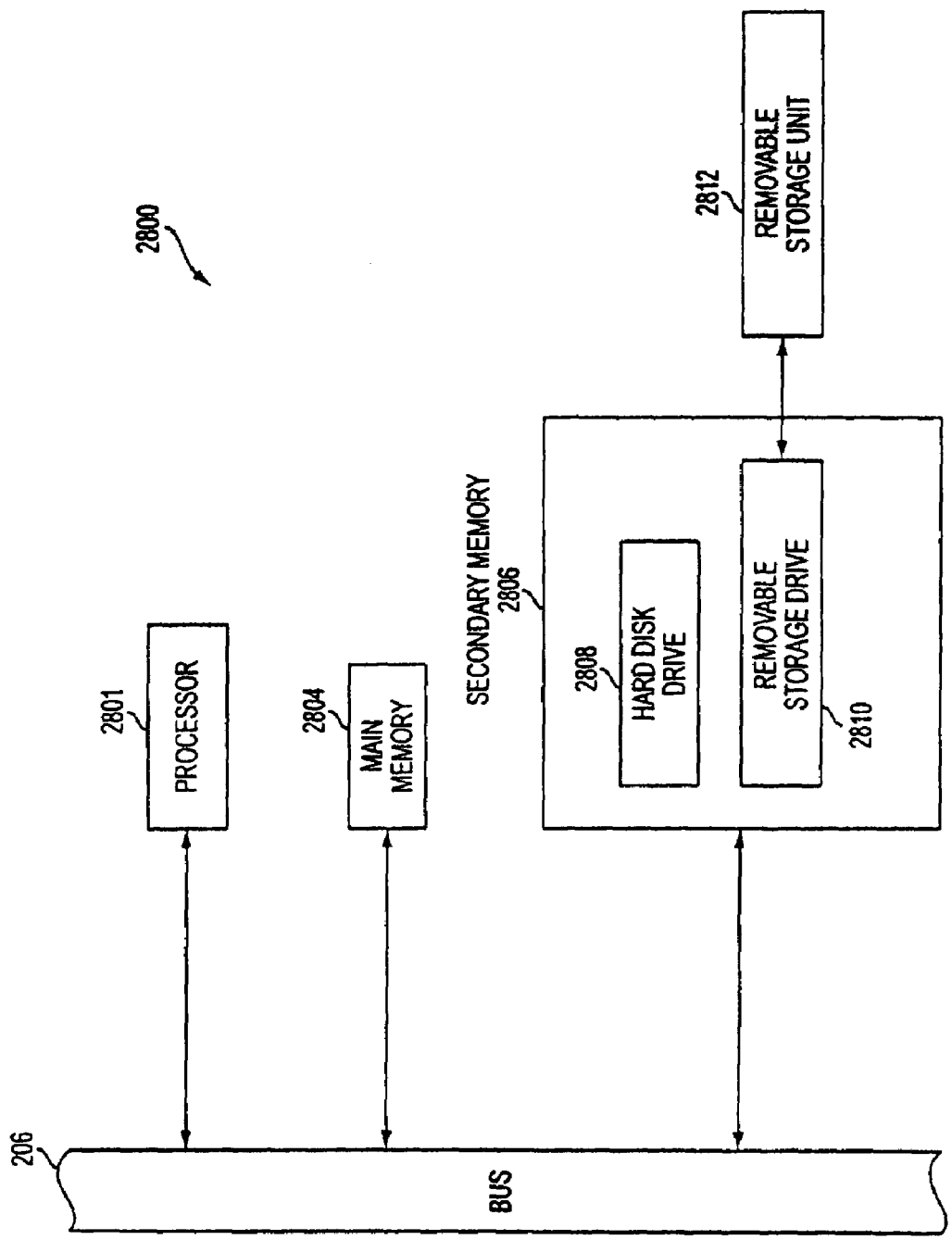
FIG. 28 is a block diagram of an exemplary computer system in accordance with a preferred embodiment.

The chosen embodiment is computer software executing within a computer system. FIG. 28 shows an exemplary computer system. The computer system 2800 includes one or more processors, such as a processor 2801. The processor 2801 is connected to a communication bus 2802.

The computer system 2800 also includes a main memory 2804, preferably random access memory (RAM), and a secondary memory 2806. The secondary memory 2806 includes, for example, a hard disk drive 2808 and/or a removable storage drive 2810, representing a floppy disk drive, a magnetic tape drive, a compact disk drive, etc. The removable storage drive 2810 reads from and/or writes to a removable storage unit 2812 in a well known manner.

Removable storage unit 2812, also called a program storage device or a computer program product, represents a floppy disk, magnetic tape, compact disk, etc. The removable storage unit 2812 includes a computer usable storage medium having therein stored computer software and/or data.

Computer programs (also called computer control logic) are stored in main memory 2804 and/or the secondary memory 2806. Such computer programs, when executed, enable the computer system 2800 to perform the functions of the present invention as discussed herein. In particular, the computer programs, when executed, enable the processor 2801 to perform the functions of the present invention. Accordingly, such computer programs represent controllers of the computer system 2800.

Another embodiment is directed to a computer program product comprising a computer readable medium having control logic (computer software) stored therein. The control logic, when executed by the processor 2801, causes the processor 2801 to perform the functions as described herein.

Another embodiment is implemented primarily in hardware using, for example, a hardware state machine. Implementation of the hardware state machine so as to perform the functions described herein will be apparent to persons skilled in the relevant arts.

Call Record Format

This embodiment provides the switches of a telecommunication network with nine (9) different record formats. These records include: Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). Each record is 32 words in length, and the expanded version of each record is 64 words in length.

Example embodiments of the nine (9) call record formats discussed herein are further described in FIGS. 29–35. The embodiments of the call records of the present invention comprise both 32-word and 64-word call record formats. It would be apparent to one skilled in the relevant art to develop alternative embodiments for call records comprising a different number of words and different field definitions. FIG. 29 shows a graphical representation of the CDR and PNR call record formats. FIGS. 30 and 31 show a graphical representation of the ECDR and EPNR call record formats. FIG. 32 shows a graphical representation of the OSR and POSR call record format. FIGS. 33 and 34 show a graphical representation of the EOSR and EPOSR call record formats. FIG. 35 shows a graphical representation of the SER record format.

The CDR and PNR, and thereby the ECDR and EPNR, are standard call record formats and contain information regarding a typical telephone call as it passes through a switch. The CDR is used for a non-VNET customer, whereas the PNR is used for a VNET customer and is generated at switches that originate VNET calls. The fields of these two records are identical except for some field-specific information described below.

The OSR and POSR, and thereby the EOSR and EPOSR, contain information regarding a telephone call requiring operator assistance and are generated at switches or systems actually equipped with operator positions. A switch completes an OSR for a non-VNET customer and completes a POSR for a private VNET customer. These records are only generated at switches or systems that have the capability of performing operator services or network audio response system (NARS) functions. The formats of the two (2) records are identical except for some field-specific information described below.

A SER is reserved for special events such as the passage of each hour mark, time changes, system recoveries, and at the end of a billing block. The SER record format is also described in more detail below.

Figure 36:
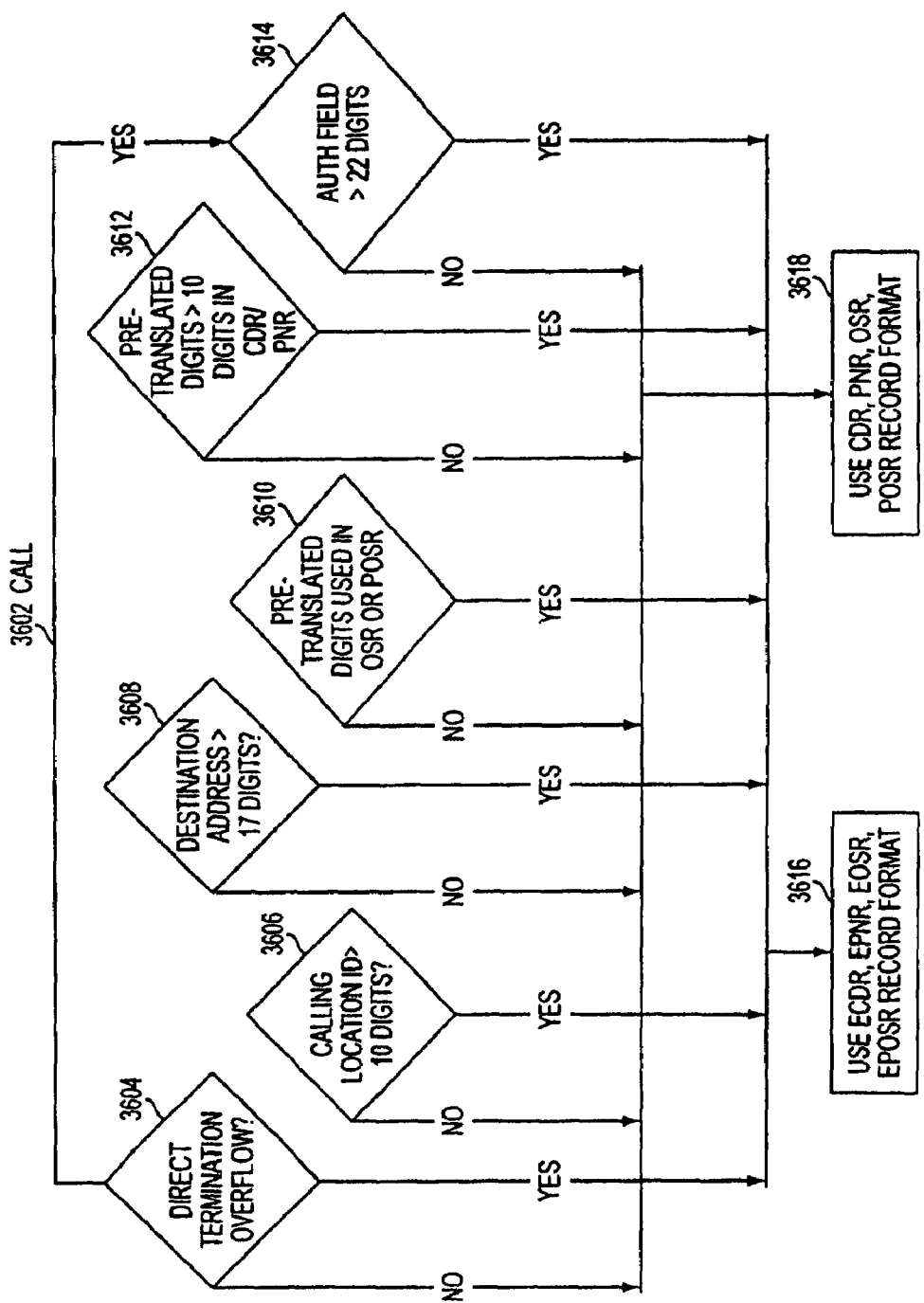
FIGS. 36 and 37 are control flow diagrams illustrating the conditions under which a switch uses the expanded record format in accordance with a preferred embodiment.
Figure 37:
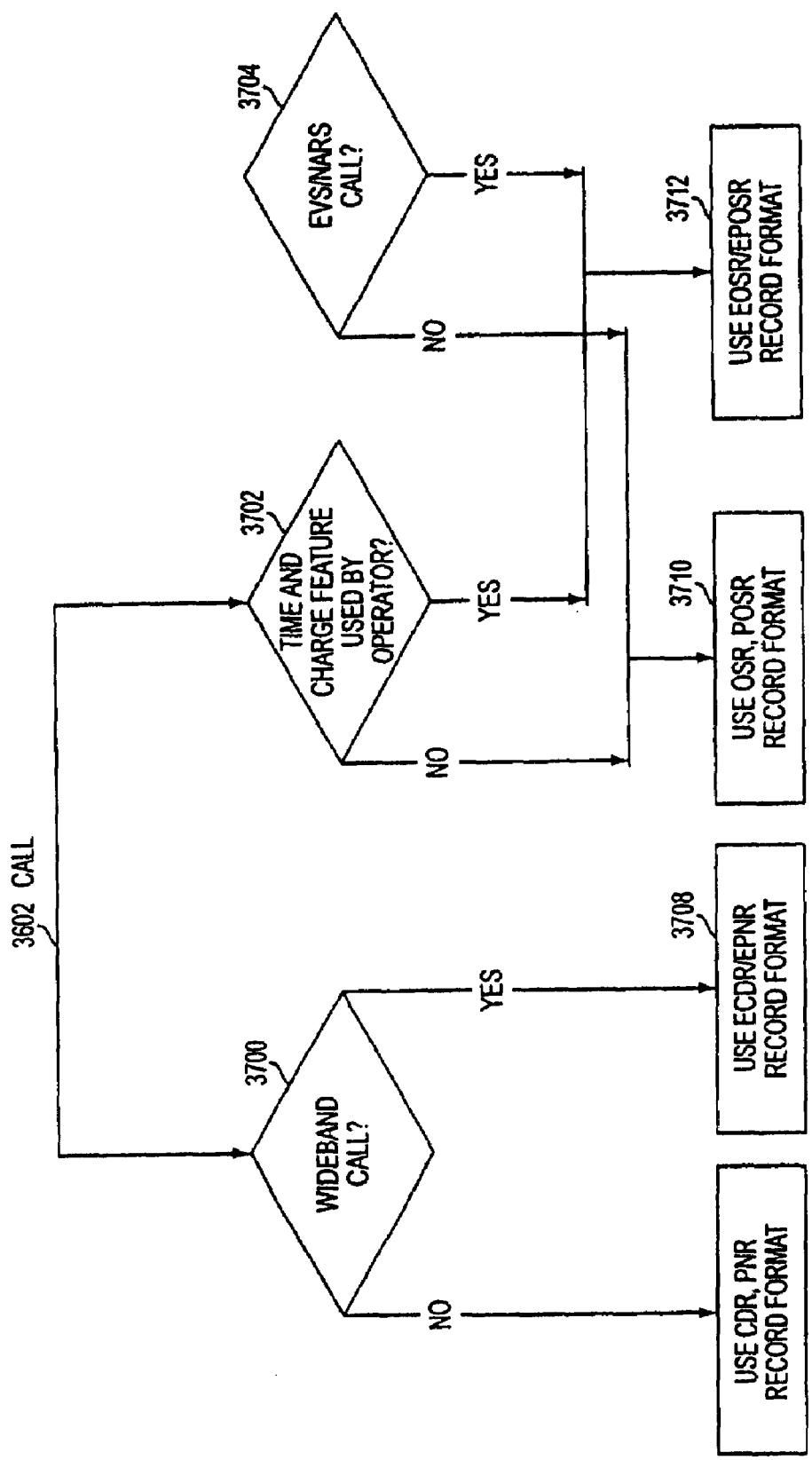

FIGS. 36 and 37 collectively illustrate the logic that a switch uses to determine when to use an expanded version of a record format. A call 3602 comes into a switch 1206–1210 (called the current switch for reference purposes; the current switch is the switch that is currently processing the call), at which time that switch 1206–1210 determines what call record and what call record format (small/default or large/expanded) to use for the call's 3602 call record. In this regard, the switch 1206–1210 makes nine (9) checks for each call 3602 that it receives. The switch 1206–1210 uses an expanded record for a call 3602 that passes any check as well as for a call 3602 that passes any combination of checks.

The first check 3604 determines if the call is involved in a direct termination overflow (DTO) at the current switch 1206–1210. For example, a DTO occurs when a customer makes a telephone call 3602 to an 800 number and the original destination of the 800 number is busy. If the original destination is busy, the switch overflows the telephone call 3602 to a new destination. In this case, the switch must record the originally attempted destination, the final destination of the telephone call 3602, and the number of times of overflow. Therefore, if the call 3602 is involved in a DTO, the switch 1206–1210 must complete an expanded record (ECDR, EPNR, EOSR, EPOSR) 3616.

The second check 3606 made on a call 3602 by a switch 1206–1210 determines if the calling location of the call 3602 is greater than ten (10) digits. The calling location is the telephone number of the location from where the call 3602 originated. Such an example is an international call which comprises at least eleven (11) digits. If the calling location is greater than ten (10) digits, the switch records the telephone number of the calling location in an expanded record (ECDR, EPNR, EOSR, EPOSR) 3616.

A switch 1206–1210 makes a third check 3608 on a call 3602 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 3616.

A switch 1206–1210 makes a fourth check 3610 on a call 3602 to determine if the pre-translated digits field is used with an operated assisted service call. The pre-translated digits are the numbers of the call 3602 as dialed by a caller if the call 202 must be translated to another number within the network. Therefore, when a caller uses an operator service, the switch 1206–1210 records the dialed numbers in expanded record (EOSR, EPOSR) 3616.

In a fifth check 3612 on a call 3602, a switch 1206–1210 determines if the pre-translated digits of a call 3602 as dialed by a caller without operator assistance has more than ten (10) digits. If there are more than ten (10) pre-translated digits, the switch 1206–1210 records the dialed numbers in expanded record (ECDR, EPNR) 3616.

In a sixth check 3614 on a call 3602, a switch 1206–1210 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 1206–1210 records the billing information in an expanded record (ECDR, EPNR, EOSR, EPOSR) 3616.

In a seventh check 3700 on a call 3602, a switch 1206–1210 determines if the call 3602 is a wideband call. A wideband call is one that requires multiple transmission lines, or channels. For example, a typical video call requires six (6) transmission channels: one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 3708.

In an eighth check 3702 on a call 3602, a switch 1206–1210 determines if the time and charges feature was used by an operator. The time and charges feature is typically used in a hotel scenario when a hotel guest makes a telephone call using the operator's assistance and charges the call 3602 to her room. After the call 3602 has completed, the operator informs the hotel guest of the charge, or cost, of the call 3602. If the time and charges feature was used with a call 3602, the switch 1206–1210 records the hotel guest's name and room number in an expanded record (EOSR, EPOSR) 3712.

The ninth, and final, check 3704 made on a call 3602 by a switch 1206–1210 determines if the call 3602 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVS/NARS call 3602, the NARS switch 1206–1210 records the customer's menu selections in an expanded record (EOSR, EPOSR) 3712.

If none of the checks 3604–3704 return a positive result, then the switch 1206–1210 uses the default record format (OSR, POSR) 3710. Once the checks have been made on a call, a switch generates and completes the appropriate call record. Call record data is recorded in binary and Telephone Binary Coded Decimal (TBCD) format. TBCD format is illustrated below:

0000=TBCD-Null

0001=digit 1

0010=digit 2

0011=digit 3

0100=digit 4

0101=digit 5

0110=digit 6

0111=digit 7

1000=digit 8

1001=digit 9

1010=digit 0

1011=special digit 1 (DTMF digit A)

1100=special digit 2 (DTMF digit B)

1101=special digit 3 (DTMF digit C)

1110=special digit 4 (DTMF digit D)

1111=special digit 5 (Not Used)

All TBCD digit fields must be filled with TBCD-Null, or zero, prior to data being recorded. Where applicable, dialed digit formats conform to these conventions:

N=digits 2–9

X=digits 0–9

Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments from a particular date/time in history. The embodiment of the present invention uses a date/time of midnight (00:00 am UTC) on Jan. 1, 1976, but this serves as an example and is not a limitation. It would be readily apparent to one skilled in the relevant art to implement an epoch time based on another date/time. In the records, Timepoint 1 represents the epoch time that is the origination time of the call 3602. The other timepoint stored in the records are the number of seconds after Timepoint 1, that is, they are offsets from Timepoint 1 that a particular timepoint occurred. All of the timepoint fields must be filled in with "O's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time, which in this embodiment is UTC. The Time offset is a number reflecting the switch time relative to the UTC, that is, the offset due to time zones and, if appropriate, daylight savings time changes. There are three factors to consider when evaluating time change relative to UTC. First, there are time zones on both sides of UTC, and therefore there may be both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Third, there are many areas of the world that have time zones that are not in exact one-hour increments. For example, Australia has one time zone that has a thirty (30) minute difference from the two time zones on either side of it, and Northern India has a time zone that is fifteen (15) minutes after the one next to it. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.

i) Epoch Time+(Sign Bit*Time Offset)=Local Switch Time ii) Local Switch Time—(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours*60 minutes/hour=360 minutes). See FIG. 35 for more details on the SER record format. When recording Timepoint 1 in the call record, the switch multiplies the Time Offset by 60, because there is 60 seconds in each 1 minute increment, and determines whether the offset is positive or negative by checking the Sign Bit. This example results in a value of −21,600 (−1*360 minutes*60 seconds/minute=−21,600 seconds). Using equation (ii) from above, if the local switch time were midnight, the corresponding epoch time might be, for example, 1,200,000,000. Subtracting the Time Offset of −21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 38:
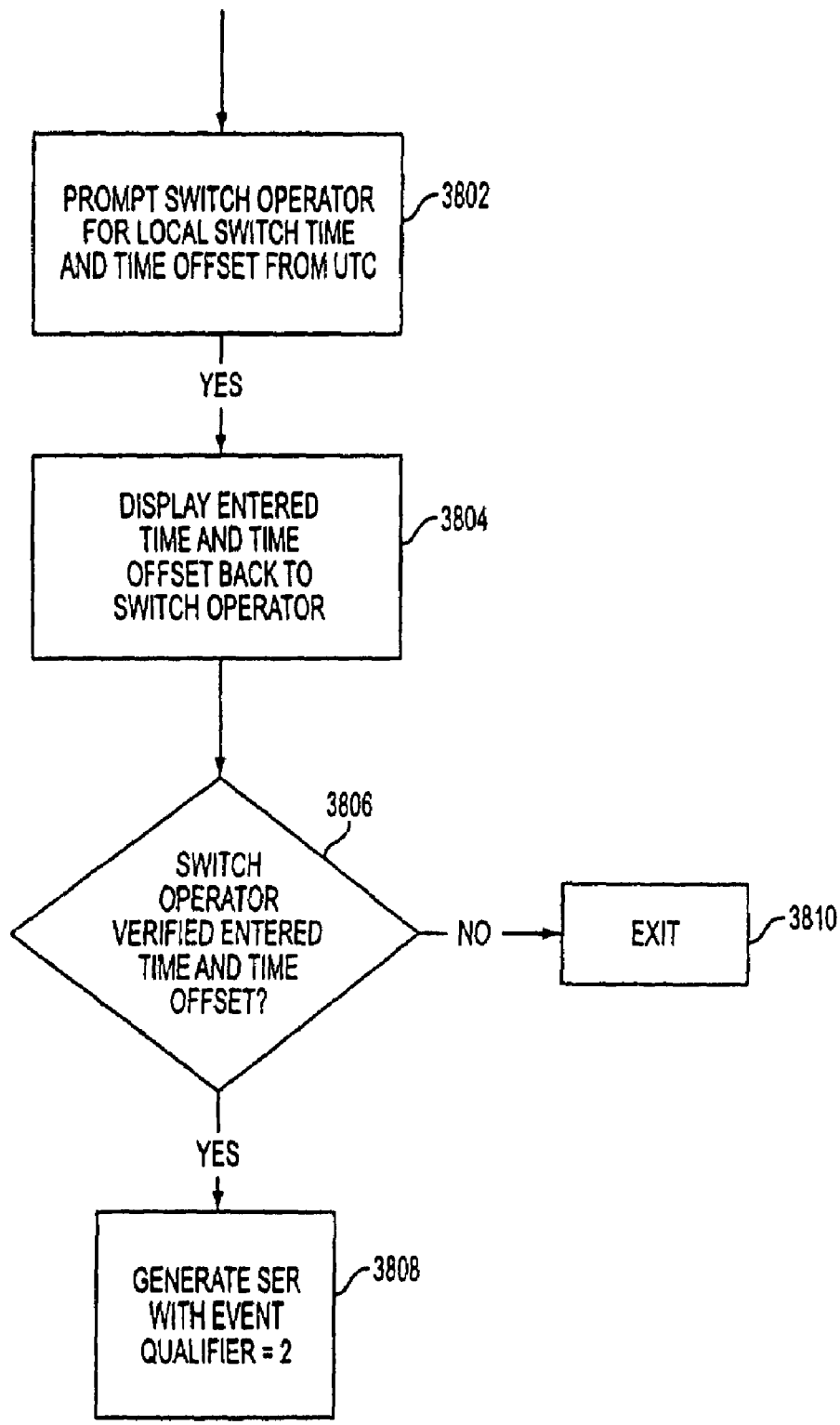
FIG. 38 is a control flow diagram illustrating the Change Time command in accordance with a preferred embodiment.

Two commands are used when changing time. First, FIG. 38 illustrates the control flow of the Change Time command, which changes the Local Switch Time and the Time Offset. In FIG. 38, after a switch operator enters the Change Time command, the switch enters step 3802 and prompts the switch operator for the Local Switch Time and Time Offset from UTC. In step 3802 the switch operator enters a new Local Switch Time and Time Offset. Continuing to step 3804, the new time and Time Offset are displayed back to the switch operator. Continuing to step 3806, the switch operator must verify the entered time and Time Offset before the actual time and offset are changed on the switch. If in step 3806 the switch operator verifies the changes, the switch proceeds to step 3808 and generates a SER with an Event Qualifier equal to two which identifies that the change was made to the Local Switch Time and Time Offset of the switch. The billing center uses the SER for its bill processing. The switch proceeds to step 3810 and exits the command. Referring back to step 3806, if the switch operator does not verify the changes, the switch proceeds to step 3810 and exits the command without updating the Local Switch Time and Time Offset. For more information on SER, see FIG. 35.

Figure 39:
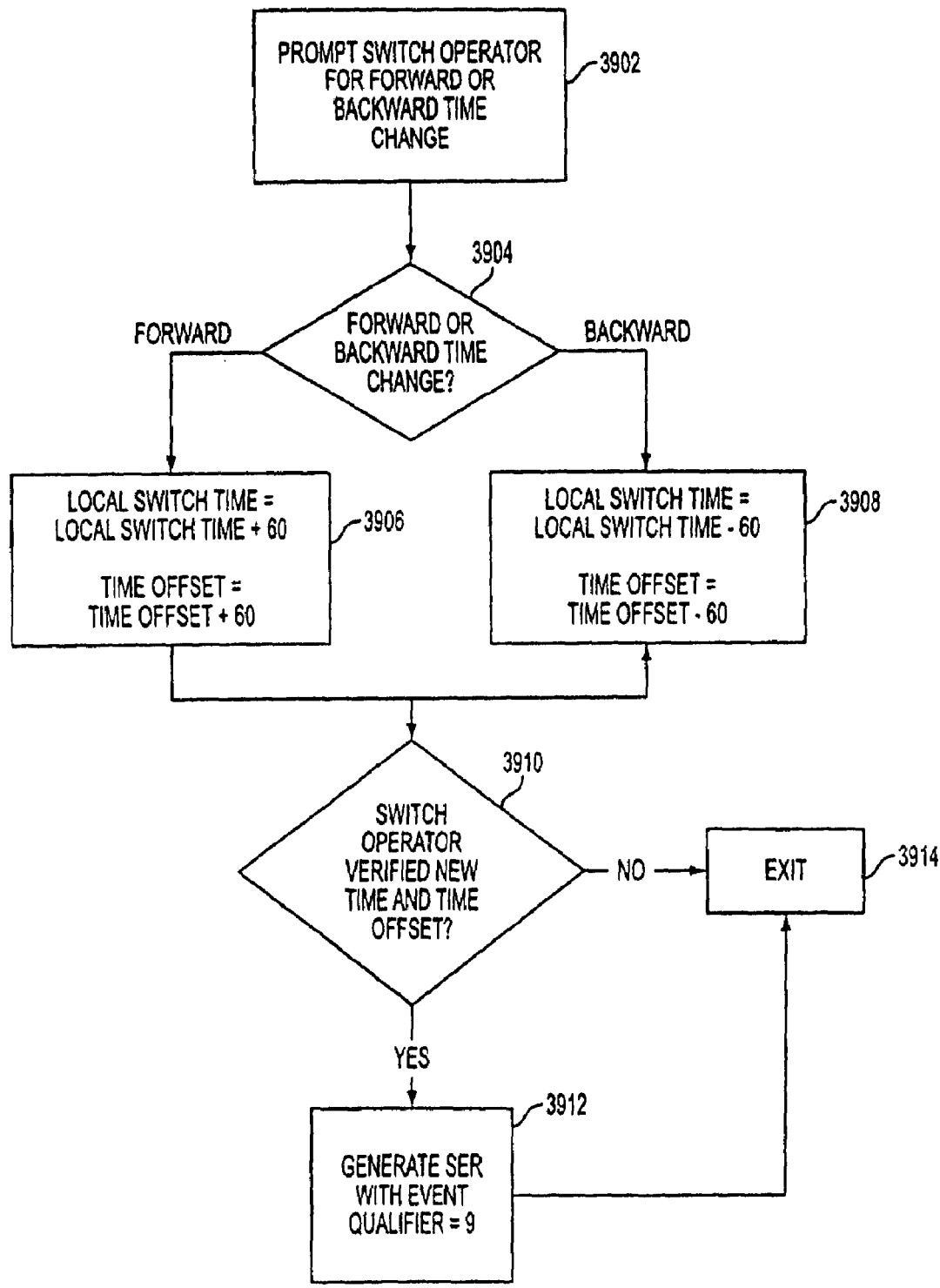
FIG. 39 is a control flow diagram illustrating the Change Daylight Savings Time command in accordance with a preferred embodiment.

FIG. 39 illustrates the control flow for the Change Daylight Savings Time command which is the second command for changing time. In FIG. 39, after a switch operator enters the Change Daylight Savings Time command, the switch enters step 3902 and prompts the switch operator to select either a Forward or Backward time change. Continuing to step 3904, the switch operator makes a selection. In step 3904, if the switch operator selects the Forward option, the switch enters step 3906. In step 3906, the switch sets the Local Switch Time forward one hour and adds one hour (count of 60) to the Time Offset. The switch then proceeds to step 3910. Referring back to step 3904, if the switch operator selects the Backward option, the switch sets the Local Switch Time back one hour and subtract one hour (count of 60) from the Time Offset. The switch then proceeds to step 3910.

In step 3910, the switch operator must verify the forward or backward option and the new Local Switch Time and Time Offset before the actual time change takes place. If in step 3910, the switch operator verifies the new time and Time Offset, the switch proceeds to step 3912 and generates a SER with an Event Qualifier equal to nine which changes the Local Switch Time and Time Offset of the switch. The switch proceeds to step 3914 and exits the command. Referring back to step 3910, if the switch operator does not verify the changes, the switch proceeds to step 3914 and exits the command without updating the Local Switch Time and Time Offset.

After the successful completion of a Change Daylight Savings Time Command, the billing records are affected by the new Time Offset. This embodiment allows the epoch time, used as the billing time, to increment normally through the daylight savings time change procedure, and not to be affected by the change of Local Switch Time and Time Offset.

Network Call Identifier

An embodiment provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits): This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID.

ii) Originating Trunk Group (14 bits): This field represents the originating trunk group as defined in the 32/64-word call record format described above.

iii) Originating Port Number (19 bits): This field represents the originating port number as defined in the 32/64-word call record format described above.

iv) Timepoint 1 (32 bits): This field represents the Timepoint 1 value as defined in the 32/64-word call record format described above.

v) Sequence Number (3 bits): This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format. Each switch records the NCID in either the 32 or 64-word call record format. Regarding the 32-word call record format, intermediate and terminating switches will record the NCID in the AuthCode field of the 32-word call record if the AuthCode filed is not used to record other information. In this case, the Originating Switch ID is the NCS Switch ID, not the alphanumeric Switch ID as recorded in the SER call record. If the AuthCode is used for other information, the intermediate and terminating switches record the NCID in the 64-word call record format. In contrast, originating switches do not use the AuthCode field when storing an NCID in a 32-word call record. Originating switches record the subfields of the NCID in the corresponding separate fields of the 32-word call record. That is, the Originating Switch ID is stored as an alphanumeric Switch ID in the Switch ID field of the SER call record; the Originating Trunk Group is stored in the Originating Trunk Group field of the 32-word call record; the Originating Port Number is stored in the Originating Port field of the 32-word call record; the Timepoint 1 is stored in the Timepoint 1 field of the 32-word call record; the Sequence Number is stored in the NCID Sequence Number field of the 32-word call record. The 32-word call record also includes an NCID Location (NCID-LOC) field to identify when the NCID is recorded in the AuthCode field of the call record. If the NCID Location field contains a '1,' then the AuthCode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32-word call record.

Regarding the 64-word call record format, the expanded call record includes a separate field, call the NCID field, to store the 82 bits of the NCID. This call record is handled the same regardless of whether an originating, intermediate, or terminating switch stores the NCID. In the 64-word call record format, the Originating Switch ID is the NCS Switch ID, not the alphanumeric Switch ID as recorded in the SER call record.

Figure 40:
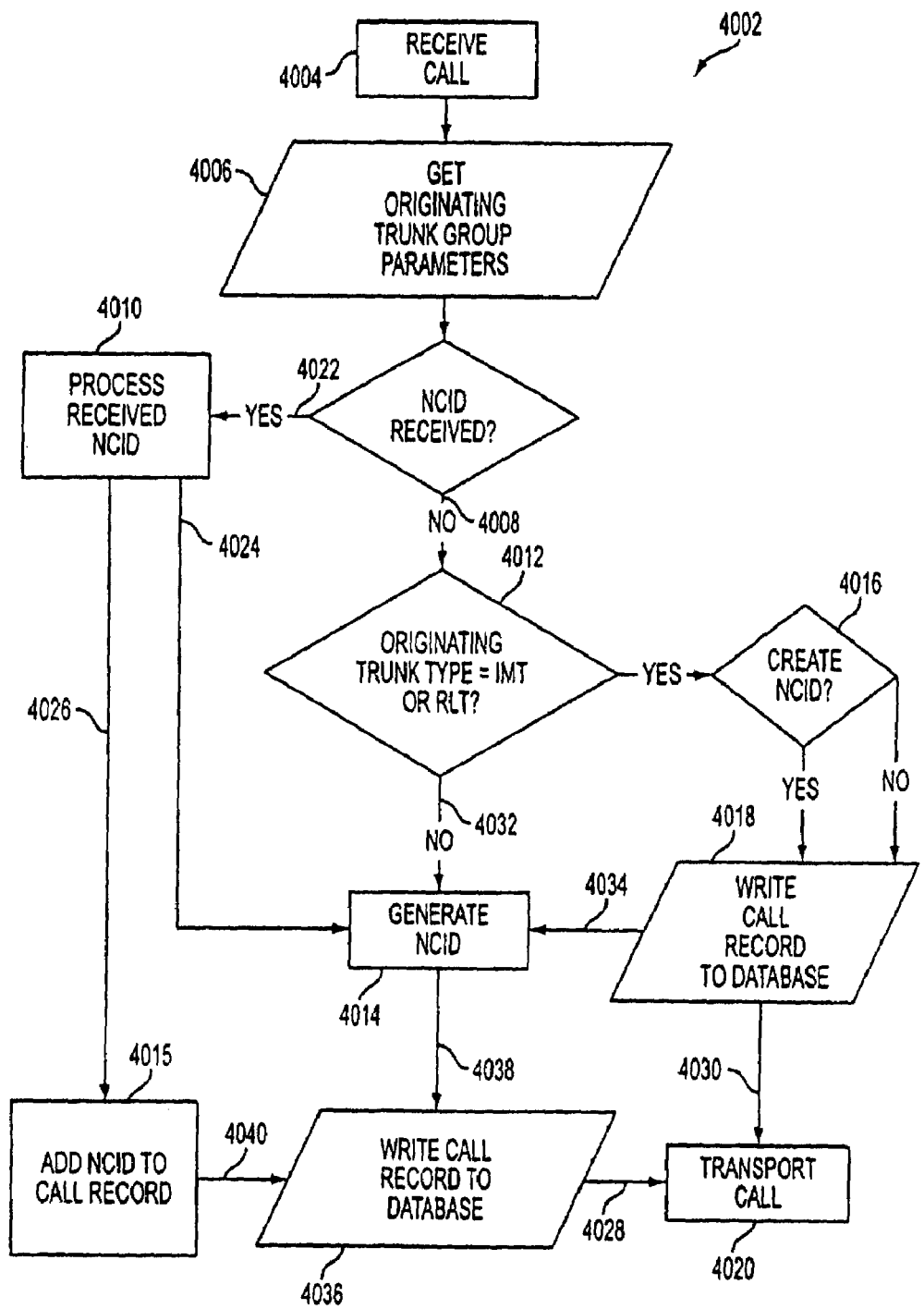
FIG. 40 is a control flow diagram illustrating the Network Call Identifier (NCID) switch call processing in accordance with a preferred embodiment.

FIG. 40 illustrates the control flow of the Network Call Identifier switch call processing. A call 3602 comes into a switch 1206–1210 (called the current switch for reference purposes; the current switch is the switch that is currently processing the call) at step 4004. In step 4004, the current switch receives the call 3602 and proceeds to step 4006. In step 4006, the current switch accesses a local database and gets the trunk group parameters associated with the originating trunk group of the call 3602. After getting the parameters, the current switch proceeds to step 4008. In step 4008, the current switch determines if it received an NCID with the call 3602. If the current switch did not receive an NCID with the call 3602, the switch continues to step 4012.

In step 4012, the switch analyzes the originating trunk group parameters to determine the originating trunk group type. If the originating trunk group type is an InterMachine Trunk (IMT) or a release link trunk (RLT), then the switch proceeds to step 4016. An IMT is a trunk connecting two normal telecommunication switches, whereas a RLT is a trunk connecting an intelligent services network (ISN) platform to a normal telecommunication switch. When the current switch reaches step 4016, the current switch knows that it is not an originating switch and that it has not received an NCID. In step 4016, the current switch analyzes the originating trunk group parameters to determine whether it is authorized to create an NCID for the call 3602. In step 4016, if the current switch is not authorized to create an NCID for the call 3602, the current switch proceeds to step 4018. When in step 4018, the current switch knows that it is not an originating switch, it did not receive an NCID for the call 3602, but is not authorized to generate an NCID. Therefore, in step 4018, the current switch writes the call record associated with the call 3602 to the local switch database and proceeds to step 4020. In step 4020, the current switch transports the call 3602 out through the network with its associated NCID. Step 4020 is described below in more detail.

Referring again to step 4016, if the current switch is authorized to create an NCID for the call 3602, the current switch proceeds to step 4014. In step 4014, the current switch generates a new NCID for the call 3602 before continuing to step 4036. In step 4036, the current switch writes the call record, including the NCID, associated with the call 3602 to the local switch database and proceeds to step 4020. In step 4020, the current switch transports the call 3602 out through the network with its associated NCID. Step 4020 is described below in more detail.

Referring again to step 4012, if the current switch determines that the originating trunk group type is not an IMT or RLT, the current switch proceeds to step 4014. When reaching step 4014, the current switch knows that it is an originating switch and, therefore, must generate a NCID for the call 3602. Step 4014 is described below in more detail. After generating a NCID in step 4014, the current switch proceeds to step 4036 to write the call record, including the NCID, associated with the call 3602 to the local database. After writing the call record, the current switch proceeds to step 4020 to transport the call out through the network with its associated NCID. Step 4020 is also described below in more detail.

Referring again to step 4008, if the current switch determines that it received an NCID with the call 3602, the current switch proceeds to step 4010. In step 4010, the current switch processes the received NCID. In step 4010, there are two possible results. First, the current switch may decide not to keep the received NCID thereby proceeding from step 4010 to step 4014 to generate a new NCID. Step 4010 is described below in more detail. In step 4014, the current switch may generate a new NCID for the call 3602 before continuing to step 4036. Step 4014 is also described below in more detail. In step 4036, the current switch writes the call record associated with the call 3602 to the local database. The current switch then proceeds to step 4020 and transports the call 3602 out through the network with its associated NCID. Step 4020 is also described below in more detail.

Referring again to step 4010, the current switch may decide to keep the received NCID thereby proceeding from step 4010 to step 4015. In step 4015, the current switch adds the received NCID to the call record associated with the call 3602. Steps 4010 and 4015 are described below in more detail. After step 4015, the current switch continues to step 4036 where it writes the call record associated with the call 3602 to the local database. The current switch then proceeds to step 4020 and transports the call 3602 out through the network with its associated NCID. Step 4020 is also described below in more detail.

Figure 41:
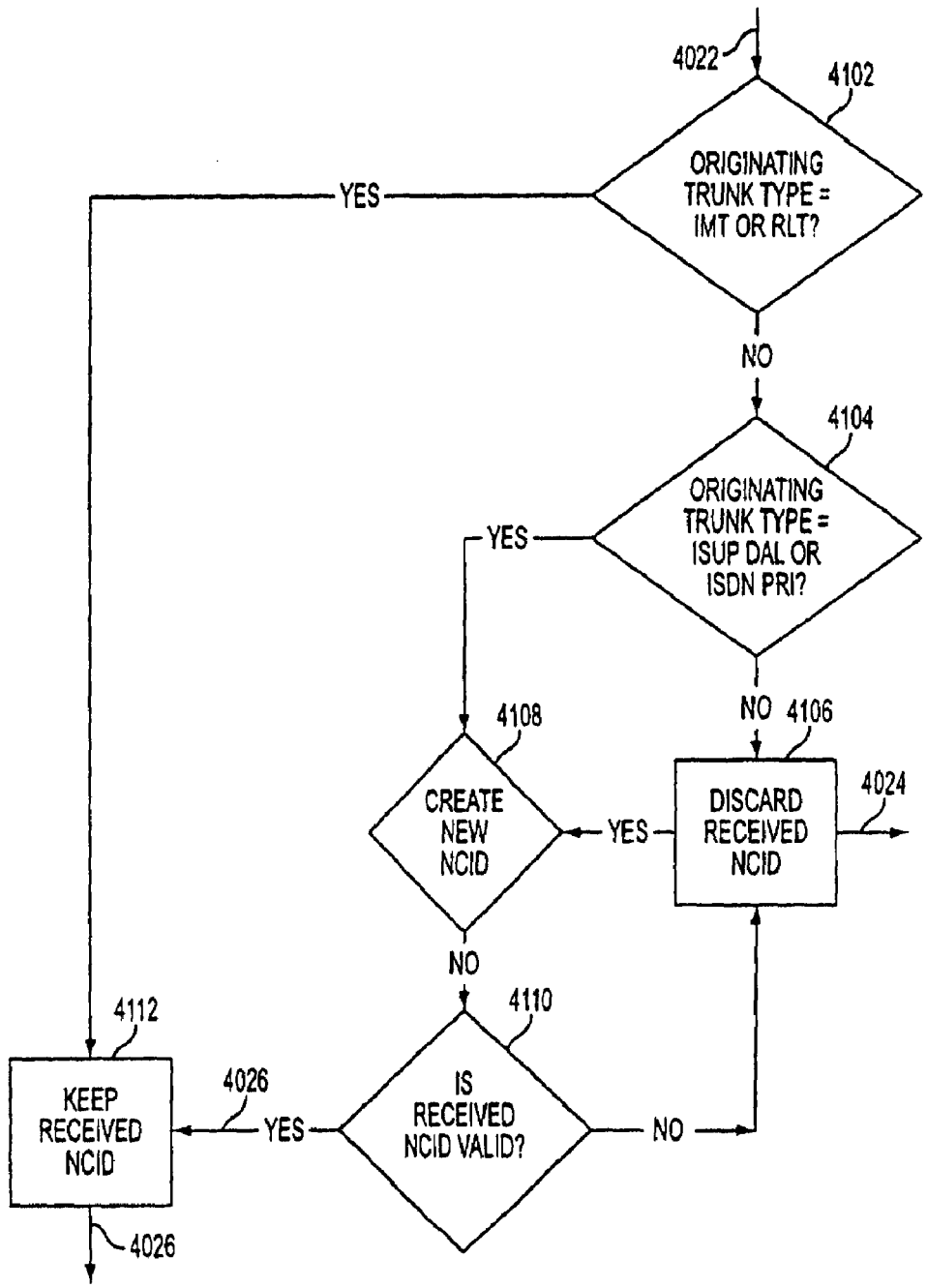
FIG. 41 is a control flow diagram illustrating the processing of a received Network Call Identifier in accordance with a preferred embodiment.

FIG. 41 illustrates the control logic for step 4010 which processes a received NCID. The current switch enters step 4102 of step 4010 when it determines that an NCID was received with the call 3602. In step 4102, the current switch analyzes the originating trunk group parameters to determine the originating trunk group type. If the originating trunk group type is an IMT or RLT, then the current switch proceeds to step 4112. When in step 4112, the current switch knows that it is not an originating switch and that it received an NCID for the call 3602. Therefore, in step 4112, the current switch keeps the received NCID and exits step 4010, thereby continuing to step 4015 in FIG. 40, after which the current switch will store the received NCID in the call record and transport the call.

Referring again to step 4102, if the originating trunk group type is not an IMT or RLT, the current switch proceeds to step 4104. In step 4104, the current switch determines if the originating trunk group type is an Integrated Services User Parts Direct Access Line (ISUP DAL) or an Integrated Services Digital Network Primary Rate Interface (ISDN PRI). ISUP is a signaling protocol which allows information to be sent from switch to switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 4104, if the current switch determines that the trunk group type is not an ISUP DAL or ISDN PRI, the current switch proceeds to step 4106. When in step 4106, the current switch knows that it received an NCID that was not generated by a switch that is part of the telecommunication network or by a switch that is a customer of the network. Therefore, in step 4106, the current switch discards the received NCID because it is an unreliable NCID. From step 4106, the current switch exits step 4010, thereby continuing to step 4014 in FIG. 40 where the current switch will create a new NCID and transport that NCID with the call 3602.

Referring back to step 4104, if the current switch determines that the originating trunk group type is an ISUP DAL or ISDN PRI, the current switch continues to step 4108. When in step 4108, the current switch knows that it received an NCID from a customer trunk group. Therefore, the current switch analyzes the originating trunk group parameters to determine whether it is authorized to create a new NCID for the call 3602. The current switch may be authorized to create a new NCID and overwrite the NCID provided by the customer to ensure that a valid NCID corresponds to the call 3602 and is sent through the network. In step 4108, if the current switch is not authorized to create a new NCID for the call 3602, the current switch proceeds to step 4110. In step 4110, the current switch checks the validity of the received NCID, for example, the NCID length. If the received NCID is invalid, the current switch proceeds to step 4106. In step 4106, the current switch discards the invalid NCID. From step 4106, the current switch exits step 4010, thereby continuing to step 4014 in FIG. 40 where the current switch will create a new NCID and transport that NCID with the call 3602.

Referring again to step 4110, if the current switch determines that the received NCID is valid, the current switch proceeds to step 4112. In step 4112 the current switch keeps the received NCID and exits step 4010, thereby continuing to step 4015 in FIG. 40 where the current switch will store the received NCID in the call record and transport the call.

Figure 42:
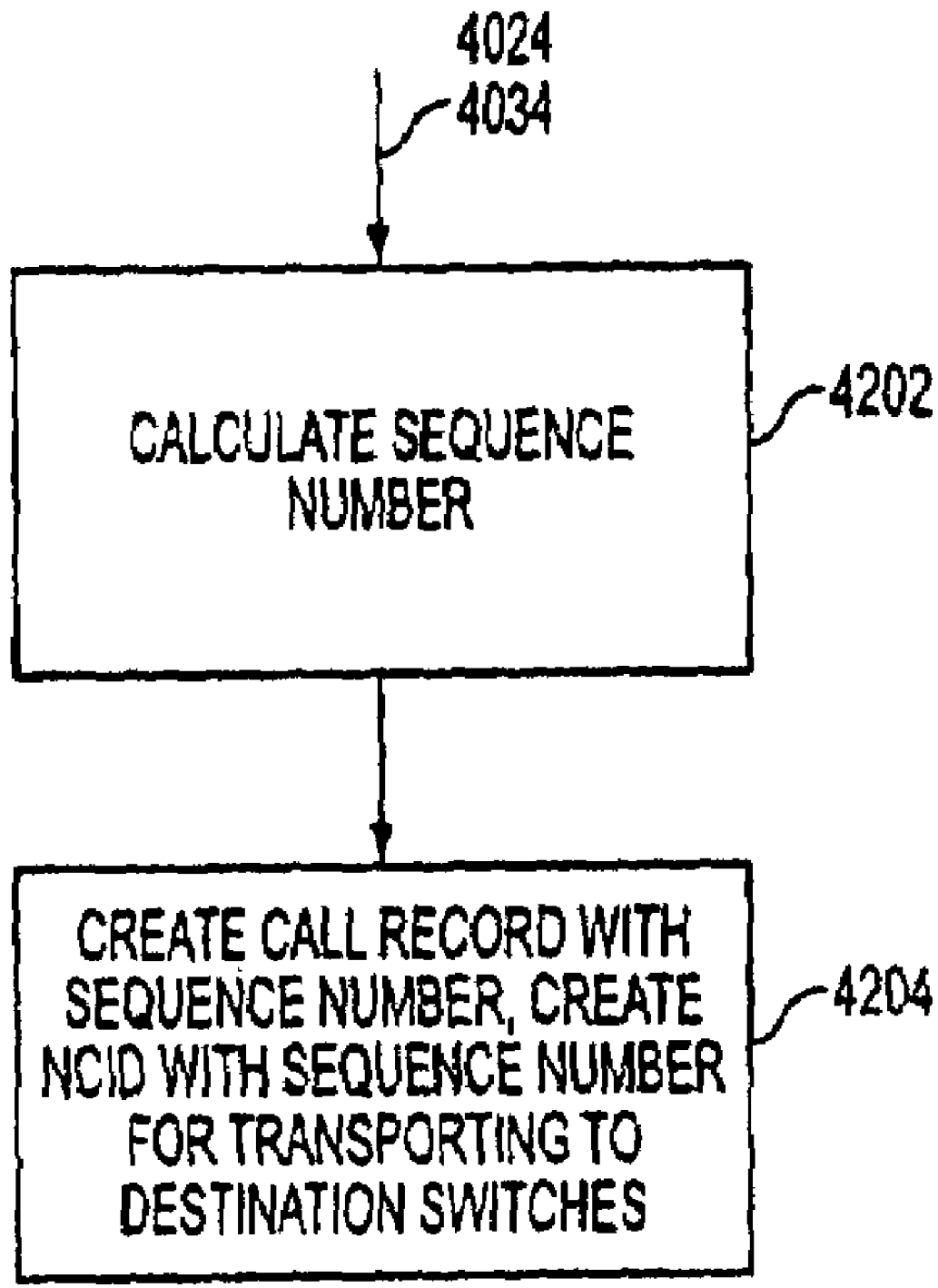
FIG. 42 is a control flow diagram illustrating the generation of a Network Call Identifier in accordance with a preferred embodiment.

FIG. 42 illustrates the control logic for step 4014 which generates an NCID. The current switch enters step 4202 when an NCID must be created. In step 4202, the current switch will calculate a sequence number. The sequence number represents the number of calls which have occurred on the same port number with the same Timepoint 1 value. The first call has a sequence number value of '0,' after which the sequence number will increase incrementally for each successive call that originates on the same port number with the same Timepoint 1 value. After creating the sequence number in step 4202, the current switch proceeds to step 4204. In step 4204, the current switch creates a call record for the call 3602, including in it the call's 3602 newly created NCID. After the call record has been created, the current switch exits step 4014 and proceeds to step 4036 in FIG. 40 where the current switch writes the call record to the local switch database.

Figure 43:
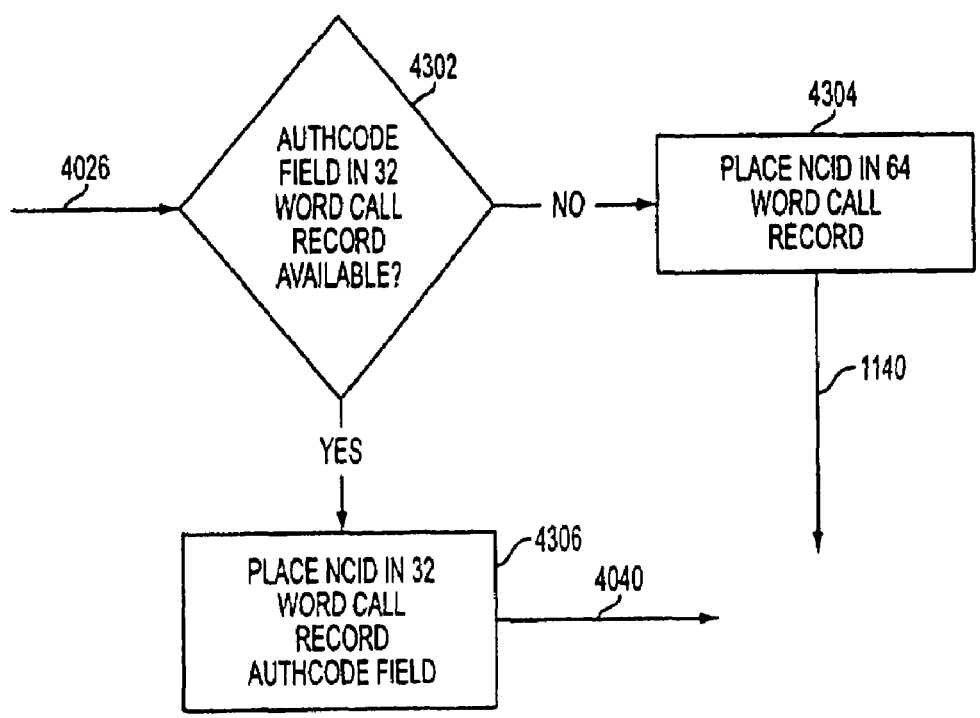
FIG. 43 is a control flow diagram illustrating the addition of a Network Call Identifier to a call record in accordance with a preferred embodiment.

FIG. 43 illustrates the control logic for step 4015 which adds a received NCID to the call record associated with the call 3602. Upon entering step 4015, the current switch enters step 4302. When in step 4302, the current switch knows that it has received a valid NCID from an intermediate or terminating switch, or from a customer switch. In step 4302, the current switch determines if the AuthCode field of the 32-word call record is available for storing the NCID. If the AuthCode field is available, the current switch proceeds to step 4306. In step 4306, the current switch stores the NCID in the AuthCode field of the 32-word call record. The current switch must also set the NCID Location field to the value '1' which indicates that the NCID is stored in the AuthCode field. After step 4306, the current switch exits step 4015 and continues to step 4036 in FIG. 40 where the current switch writes the call record to the local switch database.

Referring again to step 4302, if the AuthCode field is not available in the 32-word call record, the current switch proceeds to step 4304. In step 4304, the current switch stores the NCID in the NCID field of the 64-word call record. After step 4304, the current switch exits step 4015 and continues to step 4036 in FIG. 40 where the current switch writes the call record to the local switch database.

Figure 44:
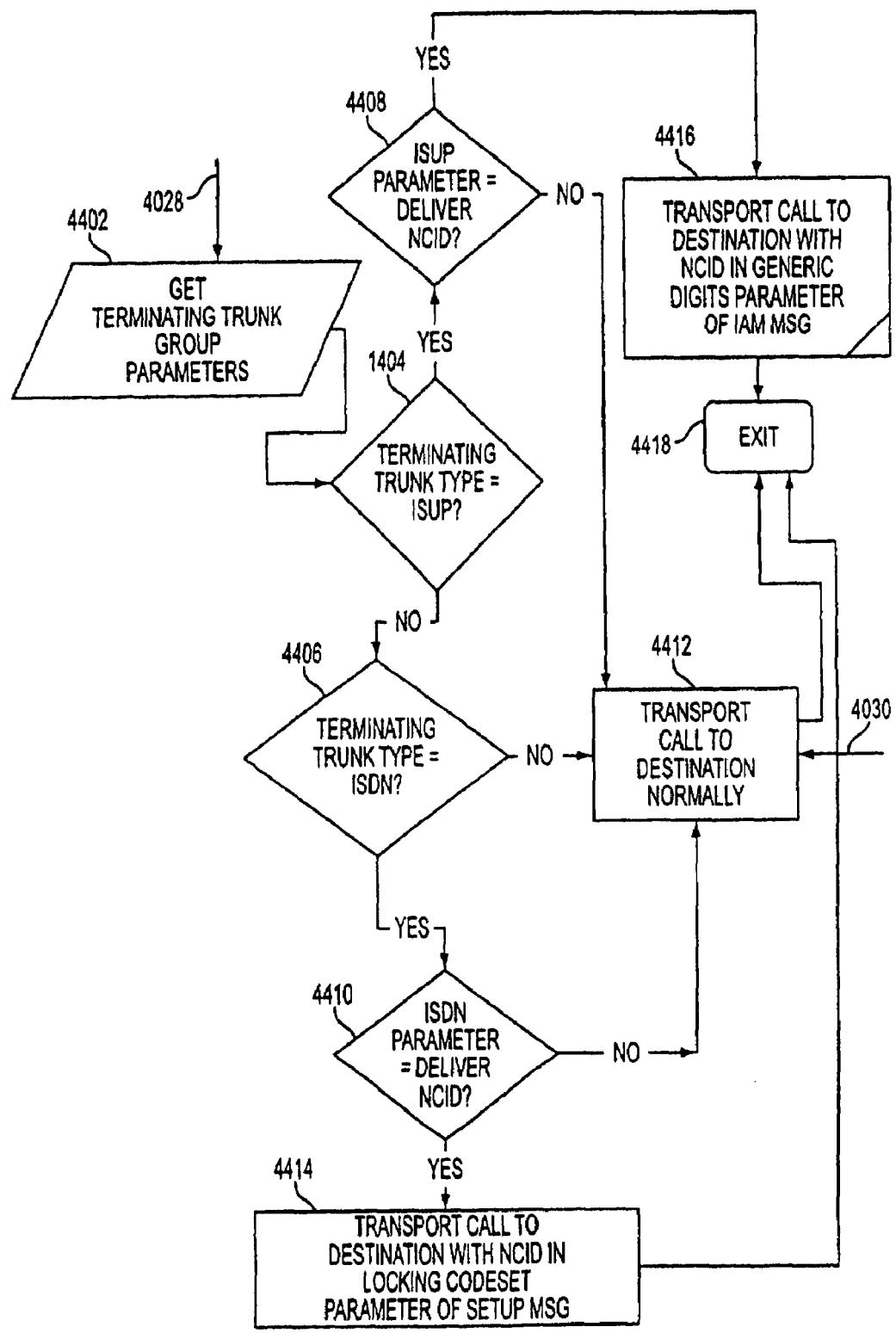
FIG. 44 is a control flow diagram illustrating the transport of a call in accordance with a preferred embodiment.

FIG. 44 illustrates the control logic for step 4020 which transports the call from the current switch. There are two entry points for this control logic: steps 4402 and 4412. Upon entering step 4402 from step 4036 on FIG. 40, the current switch knows that it has created an NCID or has received a valid NCID. In step 4402, the current switch accesses a local database and gets the trunk group parameters associated with the terminating trunk group for transporting the call 3602. After getting the parameters, the current switch proceeds to step 4404. In step 4404, the current switch determines the terminating trunk group type. If the terminating trunk is an ISUP trunk, the current switch proceeds to step 4408. In step 4408, the current switch analyzes the parameters associated with the ISUP trunk type to determine whether or not to deliver the NCID to the next switch. If the current switch is authorized to deliver the NCID, the current switch proceeds to step 4416. In step 4416, the current switch transports the call to the next switch along with a SS7 initial address message (LAM). The NCID is transported as part of the generic digits parameter of the LAM. The IAM contains setup information for the next switch which prepares the next switch to accept and complete the call 3602. The format of the generic digits parameter is shown below in Table 44A:

TABLE 44A

Generic Digits Parameter:
Code: 11000001
Type: 0

| Byte #, Bit # | Description |
| --- | --- |
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 3602 and the IAM, the current switch proceeds to step 4418, thereby exiting the switch processing. Referring again to step 4408, if the current switch is not authorized to deliver the NCID to the next switch in an IAM message, the current switch proceeds to step 4412. In step 4412, the current switch transports the call 3602 to the next switch under normal procedures which consists of sending an IAM message to the next switch without the NCID recorded as part of the generic digits parameter. After transporting the call 3602, the current switch proceeds to step 4418, thereby exiting the switch processing.

Referring again to step 4404, if the current switch determines that the terminating trunk is not an ISUP, the current switch proceeds to step 4406. In step 4406, the current switch determines if the terminating trunk group is an ISDN trunk (the terminating trunk group is dedicated to one network customer). If the terminating trunk group is an ISDN, the current switch proceeds to step 4410. In step 4410, the current switch analyzes the parameters associated with the ISDN trunk group type to determine whether or not to deliver the NCID to the next switch. If the current switch is authorized to deliver the NCID, the current switch proceeds to step 4114. In step 4114, the current switch transports the call to the next switch along with a setup message. The setup message contains setup information for the next switch which prepares the next switch to accept and complete the call 3602. The NCID is transported as part of the locking shift codeset 6 parameter of the setup message. The format of the locking shift codeset 6 parameter is shown below in Table 41B:

TABLE 44B

Locking Shift Codeset 6 Parameter:
Code: 11000001
Type: 0

| Byte #, Bit # | Description |
| --- | --- |
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 3602 and the setup message, the current switch proceeds to step 4418, thereby exiting the switch processing. Referring again to step 4410, if the current switch determines that it does not have authority to deliver the NCID to the next switch in a setup message, the current switch proceeds to step 4412. In step 4412, the current switch transports the call 3602 to the next switch under normal procedures which consists of sending a setup message to the next switch without the NCID recorded as part of the locking shift codeset 6 parameter. After transporting the call 3602, the current switch proceeds to step 4418, thereby exiting the switch processing.

Referring again to step 4412, this step is also entered from step 4018 on FIG. 40 when the current switch did not receive an NCID, is an intermediate or terminating switch, and is not authorized to create an NCID. In this case, in step 4412, the current switch also transports the call 3602 to the next switch under normal procedures which consists of sending an IAM or setup message to the next switch without the NCID recorded as part of the parameter. After transporting the call 3602, the current switch proceeds to step 4418, thereby exiting the switch processing.

A system and method for the switches of a telecommunications network to generate call records for telephone calls using a flexible and expandable record format. Upon receipt of a telephone call, a switch in the network analyzes the telephone call to determine whether the default call record is sufficiently large to store call record information pertaining to the telephone call, or whether the expanded call record must be used to store the call information pertaining to the telephone call. After determining which call record to use, the switch generates the default or expanded call record. The switch sends a billing block, comprised of completed call records, to a billing center upon filling an entire billing block.

Introduction to a Callback Telephony System in Accordance With a Preferred Embodiment In today's telephony environment, a caller must contact an operator to initiate a conference call and/or have all parties dial a common number to connect into a conference call. This requires the cost of a human operator and the inconvenience of dialing a predefined number to be carried as overhead of each conference call. It also makes it very inefficient to schedule a conference call and assure that all parties are available to participate. It also requires a dedicated number for all the parties to access to facilitate the call.

In accordance with a preferred embodiment, a callback system is facilitated by a caller accessing a display from a computer and filling out information describing the parameters of a call. Information such as the date and time the call should be initiated, billing information, and telephone numbers of parties to participate in the call could be captured. Then, based on the information entered, a central or distributed computing facility with access to the hybrid network transmits e-mail in a note to each party required for the call copying the other parties to verify participation and calendar the event. The e-mail would include any particulars, such as the password associated with the call and time the call would be commenced. The necessary network facilities would also be reserved to assure the appropriate Quality of Service (QOS) would be available, and when the date and time requested arrived, the call is initiated by contacting each of the participants whether they be utilizing a telephone attached to a PSTN or a voice capable apparatus (such as a computer or intelligent television) attached to the hybrid network. At any time during scheduling, initiation or duration of the call, any party could request operator assistance by selecting that service from the display associated with the call. Thus, a completely automated callback system is provided for call setup and control.

For callers that utilize the callback system on a regular basis a custom profile is provided as an extension to the users existing profile information. The custom profile allows a user to store frequent conference call participants information. The profile contains participant's telephone numbers (which could be DDD, IDDD, IP Address or Cellular phone number), E-mail address, paging service, fax number, secretary phone number, location, time zone, working hours and other pertinent information that will be useful for initiating a call. Default profiles based on company or organization needs are also enabled and can be tailored to meet the needs of a particular user based on more global information.

Billing information would also be provided online. A user could enter a pre-arranged billing number or the ability to bill to a credit card or telephone number. If billing to a telephone number, the system treats the call like a collect or third party call to verify billing.

If profile information were predefined for a particular call scenario, then another option would allow an immediate connection of a conference call or single call at the press of a button, much as speed dialing is performed today except that more than one caller could be joined without intervention of the calling party, Internet callers are supported and an operator can be joined as required.

Before describing this aspect of the present invention, a description of internet environment is presented.

Internet

The Internet is a method of interconnecting physical networks and a set of conventions for using networks that allow the computers they reach to interact.

Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352× 288 pixels and 176×144 pixels.

ITU H.263 Recommendation for Video Coder-Decoder for audiovisual services supporting video resolutions of 128×96 pixels, 176×144 pixels, 352×288 pixels, 704×576 pixels and 1408×1 152 pixels.

ITU H.320 Recommendation for Narrow Band ISDN visual telephone systems.

ITU H.321 Visual Telephone Terminals over ATM ITU H.322 Visual Telephone Terminals over Guaranteed Quality of Service LANs ITU H.323 ITU Recommendation for Visual Telephone Systems and Equipment for Local Area Networks which provide a non-guaranteed quality of service.

ITU H.324 Recommendation for Terminals and Systems for low bitrate (28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization (ISO), Recommendations for compression of digital Video and Audio including the bit stream but not the compression algorithms.

SLIP Serial Line Internet Protocol

RSVP Resource Reservation Setup Protocol

UDP User Datagram Protocol

The popularity of the TCP/IP protocols on the Internet grew rapidly because they met an important need for worldwide data communication and had several important characteristics that allowed them to meet this need. These characteristics, still in use today, include:

A common addressing scheme that allows any device running TCP/IP to uniquely address any other device on the Internet.

Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique.

Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice. However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communication for Smooth User Connection

In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of the internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks. ATM networks require modern hardware including:

High speed switches that can operate at gigabit (trillion bit) per second speeds to handle the traffic from many computers.

Optical fibers (versus copper wires) that provide high data transfer rates, with host-to-ATM switch connections running at 100 or 155 Mbps (million bits per second).

3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1) To provide an internationally accepted standard for voice, data and signaling;

2) To make all transmission circuits end-to-end digital;

3) To adopt a standard out-of-band signaling system; and

4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

Internet Service Potential

Real-time view of the status of each conference call participant, ANI and an alphanumeric representation to identify each participant entered by the initiator when a call is "reserved" can be displayed on screen as participants connect to conference. This information is captured as part of the call record set forth earlier and detailed in the appendix.

In an alternative embodiment, a conference call without callback leg is enabled. In this embodiment, a callback customer participates through a Voice Over Network (VON) application utilizing a computer with voice capability, and can initiate a video screen popup on the computer display for manual operator assistance as detailed above in the description of a video operator.

Self-Regulating System

An expert system monitors each call in accordance with a preferred embodiment. The system includes rules that define what logic to execute when an exception occurs. The rules include specialized processing based on whether the call is routed via a PSTN or the internet. In addition, the system includes a default connection to a manual operator if no other correction of the connection is available. For example, if a caller hangs up during a teleconference and other callers are still connected, an exception message is sent to each of the still connected callers informing them of the status change. Another aspect of the expert system is to ensure quality of service (QOS) and produce reports indicating both integrity and exceptions. Scheduling of resources is tied to this expert system, which regulates whether calls can be scheduled based on available or projected resources at the time of the proposed call. For example, since all calls used by this system are initiated by the callback switch, if there are insufficient outgoing trunk ports during the period of time that a callback subscriber requests, then the callback subscriber is prompted to select another time or denied access to the resources for that time. This is utilized to predict when additional ports and/or resources are required.

Fault Management

The NGN operations architecture specifies the points of insertion and collections for network wide events that feed the Fault Management systems. Since the components of the packet portion of the hybrid NGN infrastructure are in most cases manageable by SNMP or some other standard management protocol the major challenges are the following:

1. Correlation of the events from the packet infrastructure with the Core circuit-based network events to provide the operators with a seamless service oriented view of the overall health of the network;

2. Event gathering and interpretation from the Core circuit network elements; and 3. Mediation and standardization of the network messages to aid processing by the network management framework of the NGN.

The network management components of the NGN provide comprehensive solutions to address these challenges. Correlation is provided by the use of rules based inference engines. Event gathering and interpretation is typically performed by custom development of software interfaces which communicate directly with the network elements, process raw events and sort them by context prior to storing them.

For example, alarms versus command responses. The mediation and standardization challenge is addressed by using a comprehensive library of all possible message types and network events categorize the numerous messages that the NGN generates.

Figure 45:
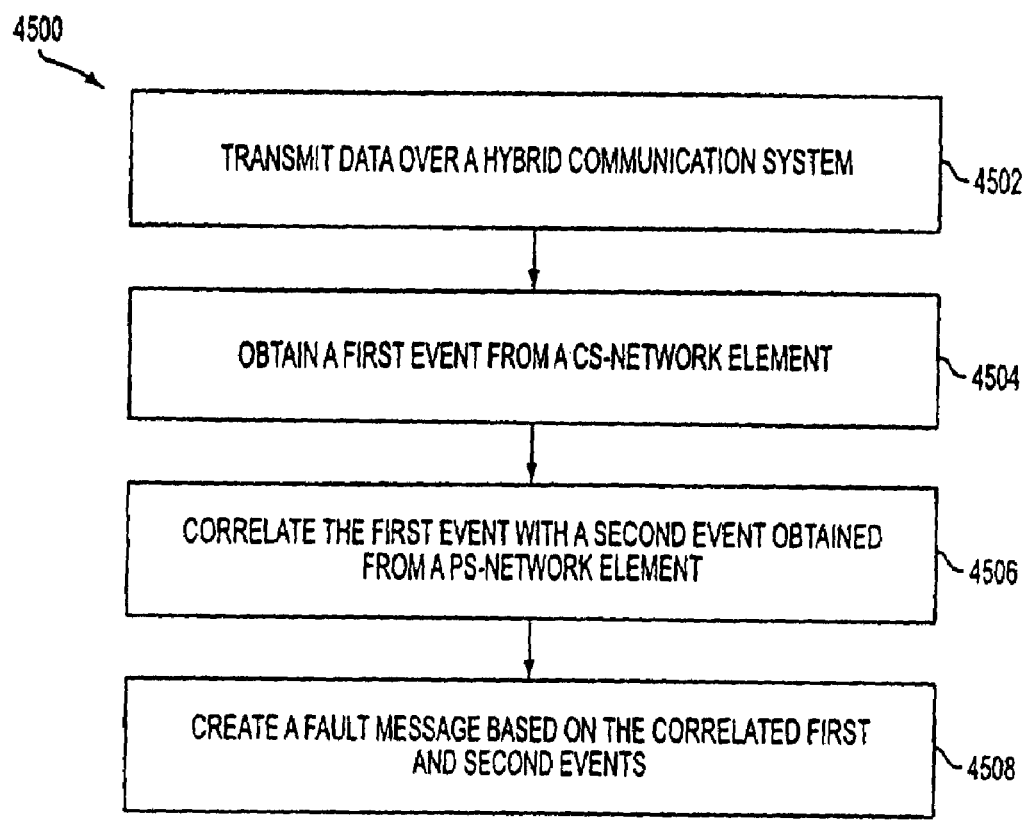
FIG. 45 is a flowchart showing a Fault Management Process in accordance with a preferred embodiment of the present invention.

FIG. 45 is a flowchart showing a Fault Management Process 4500 in accordance with a preferred embodiment of the present invention. The Fault Management Process 4500 begins with a transmitting step 4502. In step 4502, data is transmitted over the hybrid network, including video and mixed audio information. The data transmission generally makes full use of the hybrid networks mixed circuit-switched an packet-switched components. As discussed above, the hybrid network includes approximately all the advantages of a packet based network while still making use of the older circuit-switched components already in place. The system is able to do this by correlating events raised by both the circuit-switched and packet-switch network elements, as discussed later in relation to event and correlating steps 4504 and 4506.

In a circuit-switched event gathering step 4504, an event is obtained from a circuit-switched based network element. As discussed above, event gathering and interpretation is typically performed by custom developed software interfaces which communicate directly with the network elements, process raw network events, and sort the events by context prior to storing them. After obtaining the events, the events are correlated in a correlation step 4506.

In a correlation step 4506, the event gathered in step 4504 is correlated with a second event obtained from a packet-switched network element. As with circuit-switched network elements, packet-switched event gathering and interpretation is typically performed by custom developed software interfaces which communicate directly with the network elements, process raw network events, and sort the events by context prior to storing them. As discussed above, the correlation is preferably provided by a rules based inference engine. After the events are correlated, a fault message is created in a fault message step 4508.

In a fault message step 4508, a fault message is created based on the correlated first and second events obtained in steps 4504 and 4506. Preferably the fault message is created utilizing a comprehensive library of all possible message types and network events which categorizes the numerous messages that the hybrid network generates.

Figure 46:
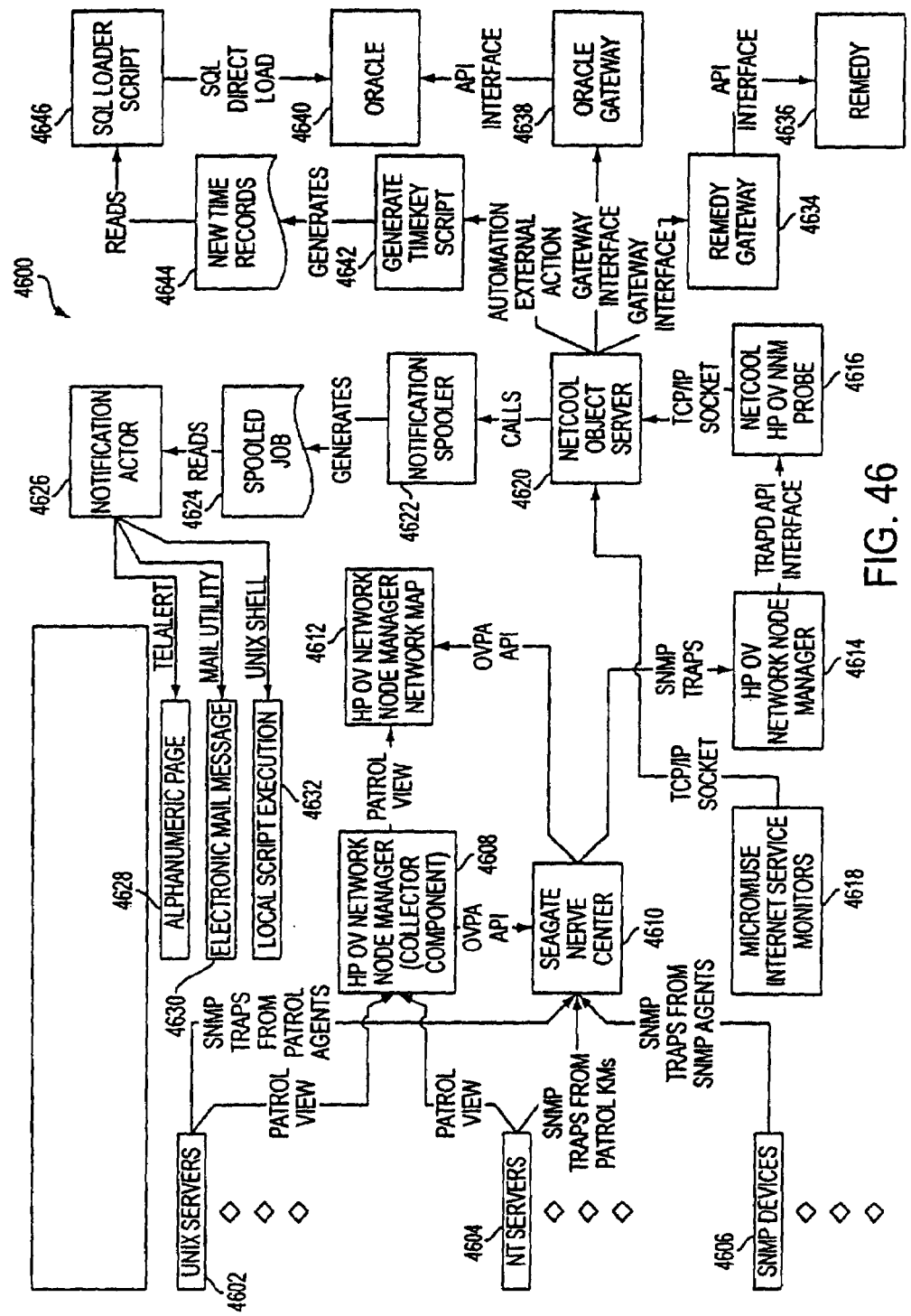
FIG. 46 is a block diagram showing a Fault Management component in accordance with a preferred embodiment of the present invention.

FIG. 46 is a block diagram showing a Fault Management component 4600 in accordance with a preferred embodiment of the present invention. The Fault Management component 4600 records failures and exceptions in network devices (e.g. network routers or UNIX servers) and performs the following operations:

1) performs root-cause correlation of the failures and exceptions;

2) immediately takes corrective and/or informative actions such as sending a page, logging a help desk ticket, sending an electronic mail message, or calling a resolution script;

3) stores the information into a Database Component for later analysis by the Reporting Component; and 4) allows real time viewing of faults in a network map and network event views.

The Fault Management component 4600 includes the following elements:

UNIX Servers 4602—Any UNIX Server with BMC Patrol clients loaded.

NT Servers 4604—Any NT Server with BMC Patrol clients loaded.

SNMP Devices 4606—Any SNMP manageable device.

HP OV Network Node Manager (Collector Component) 4608—HP OpenView Network Node Manager is one product which performs several functions. In this context it is it is responsible for receiving performance information from BMC Patrol clients via BMC Patrol View.

Seagate NerveCenter 4610—In a fault management context, Seagate NerveCenter performs root-cause correlation of faults and events across the network.

HP OV Network Node Manager Network Map 4612—HP OpenView Network Node Manager is one product which performs several functions. In this context it is responsible for maintaining and displaying the node level network map of the network the MNSIS architecture monitors.

HP OV Network Node Manager 4614—HP OpenView Network Node Manager is one product which performs several functions. In this context it is it is responsible for receiving and displaying all events, regardless of their source.

Netcool HP OV NNM Probe 4616—An Omnibus Netcool probe which is installed on the same system as HP OV Network Node Manager and forwards events to the Omnibus Netcool Object Server.

Micromuse Internet Service Monitors 4618—An Omnibus Netcool suite of active probes (monitors) which monitor internet services such as FTP, POP3, SMTP, NNTP, DNS, HTTP, and RADIUS. These monitors collect availability and performance data and forward the information as alerts to the Omnibus Netcool Object Server.

Netcool Object Server 4620—The Omnibus Netcool Object Server is a real-time memory resident database which stores all current events (alerts). The events are viewable by operations personnel using a number of event lists and views, all of which are highly customizable by each operator.

Notification Spooler 4622—A custom provided sub-component which spools job-files that specify which events have occurred for possible notifications.

Spooled Job 4624—Each spooled job represents a specific event that was received by the Netcool Object Server and may need to result in one or more notification actions. Each job is stored as a file in a special notification spool directory.

Notification Actor 4626—A custom provided sub-component which determines the alert time, source node, and alert type from the loaded spooled job and initiates notification actions based as specified in the configuration file. Notification actions include alphanumeric pages, trouble tickets, email, and resolution scripts. Multiple notification actions can be specified in the configuration files such that different actions are taken for different alert times, source nodes, and/or alert types. Default actions are also supported.

Alphanumeric Page 4628—An alphanumeric page sent using Telamon TelAlert via modem dialing the relevant paging provider. The alphanumeric page message provides contextual notification of actions to be performed. Context can include any information but frequently contains information such as the device name, problem description, and priority.

Electronic Mail Message 4630—An internet mail message send using the UNIX mail utility. The mail message is frequently used to provide non-urgent notification of situations or actions automatically performed by the MNSIS architecture along with detailed context.

Local Script Execution 4632—Initiates any local script on the machine, which may initiate scripts or applications on other machines.

Remedy Gateway 4634—The Omnibus Netcool Remedy Gateway automatically reads alerts in the Netcool Object Server and opens tickets within Remedy as customized by the user. The Remedy trouble ticket ID is returned to the Omnibus and can be viewed as further reference.

Remedy 4636—Remedy Action Request System, a trouble ticketing system.

Oracle Gateway 4638—The Omnibus Netcool Oracle Gateway automatically reads alerts in the Netcool Object Server and logs records within Oracle as customized by the user.

Oracle 4640—Oracle is a relational database management system.

Generate Time Key Script 4642—Script which generates New Time Records from alerts in the Netcool Object Server.

New Time Records 4644-Time records corresponding to new alerts in Netcool Object Server which need to be added to the Oracle time tables.

SQL Loader Script 4646—A custom script which automatically loads records into Oracle via SQL Loader Direct Load.

Proactive Threshold Manager

The Proactive Threshold Manager is an automated network manager that forewarns service providers of a chance that a service level agreement to maintain a certain level of service is in danger of being breached.

The Proactive Threshold Manager provides real-time threshold analysis (that is, it continuously monitors for plan thresholds that have been exceeded) using algorithms. It receives call detail records from the Server and returns alarms which may be retrieved and examined using an NGN workstation. The threshold manager resides on an NGN hybrid network computer.

A threshold generally is a number which, when exceeded, generates an alarm in the Proactive Threshold Manager indicating possible breach of a service level agreement. Thresholds may be specified for the time of day and/or the day of the week. Furthermore, a threshold may be applied to each category for which the Proactive threshold manager keeps counts, including the number of short-duration calls, long-duration calls, and cumulative minutes.

When an alarm is generated by the Proactive Threshold Manager, it is also prioritized. The priority is a multiple of the number of times a threshold has been exceeded. For example, if the threshold was 10 and the relevant count has reached 50, then the priority of the alarm is 5 (50.div.10).

Each alarm is available to an NGN hybrid network analyst via an NGN Workstation. The workstation is a PC with access to a Server and retrieves the next available alarm of the highest priority. The analyst investigates the alarm data and, if a service level agreement breach is suspected, notifies the provider and suggests appropriate actions to stop the breach.

Figure 47:
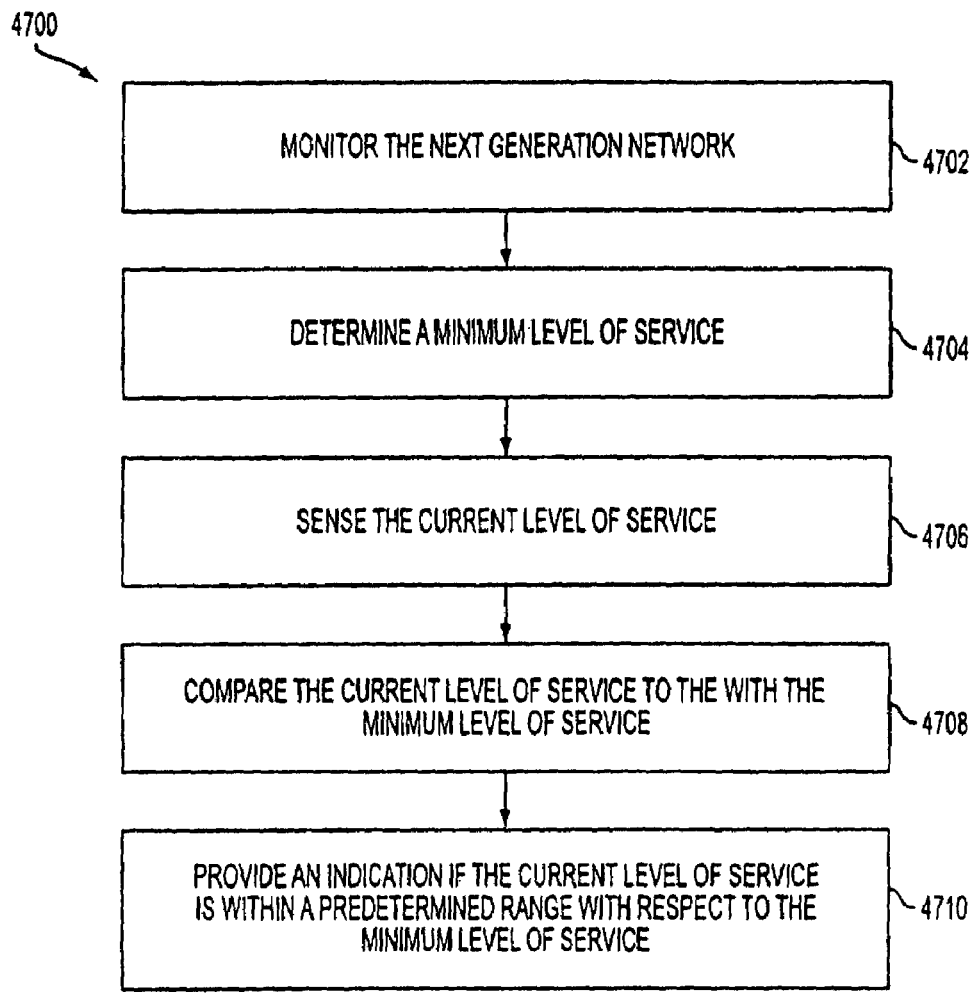
FIG. 47 is a flowchart showing a Proactive Threshold Management Process in accordance with a preferred embodiment of the present invention.

FIG. 47 is a flowchart showing a Proactive Threshold Management Process 4700 in accordance with a preferred embodiment of the present invention. The process begins with a monitoring step 4702. In step 4702, the Proactive Threshold Manager monitors the NGN hybrid network. The Proactive Threshold Manager generally monitors the network at all times to ensure proper service is provided to subscribers of the network, by assisting service providers in maintaining a proper level of service.

In a minimum level determination step 4704, the Proactive Threshold Manager determines the minimum level of service needed to avoid breaching subscriber service level agreements. Service level agreement information is generally provided to the Proactive Threshold Manager by the rules database which contains most pertinent subscriber information.

In a sensing step 4706, the Proactive Threshold Manager senses the current level of service which is being provided to customers. Protocol converters assist the Proactive Threshold Manager in communicating with various components of the system. Protocol converters are able to translate information between the packet-switched an circuit-switched system components, thus allowing the Proactive Threshold Manager to communicate with all the components of the hybrid system.

In a comparing step 4708, the Proactive Threshold Manager compares the current level of service, sensed in step 4706, with the minimum level of service, determined in step 4704, to determine where the current level of service is in relation to the minimum level service which needs to be provided to subscribers.

In an alarm step 4710, the Proactive Threshold Manager provides an indication or alarm to the service provider if the current level of service is within a predetermined range with respect to the minimum level of service. The threshold is preferably chosen such that the service provider is allowed enough time to cure the service level problem before the minimum service level is reached and the subscriber's service level agreement breached.

Figure 48:
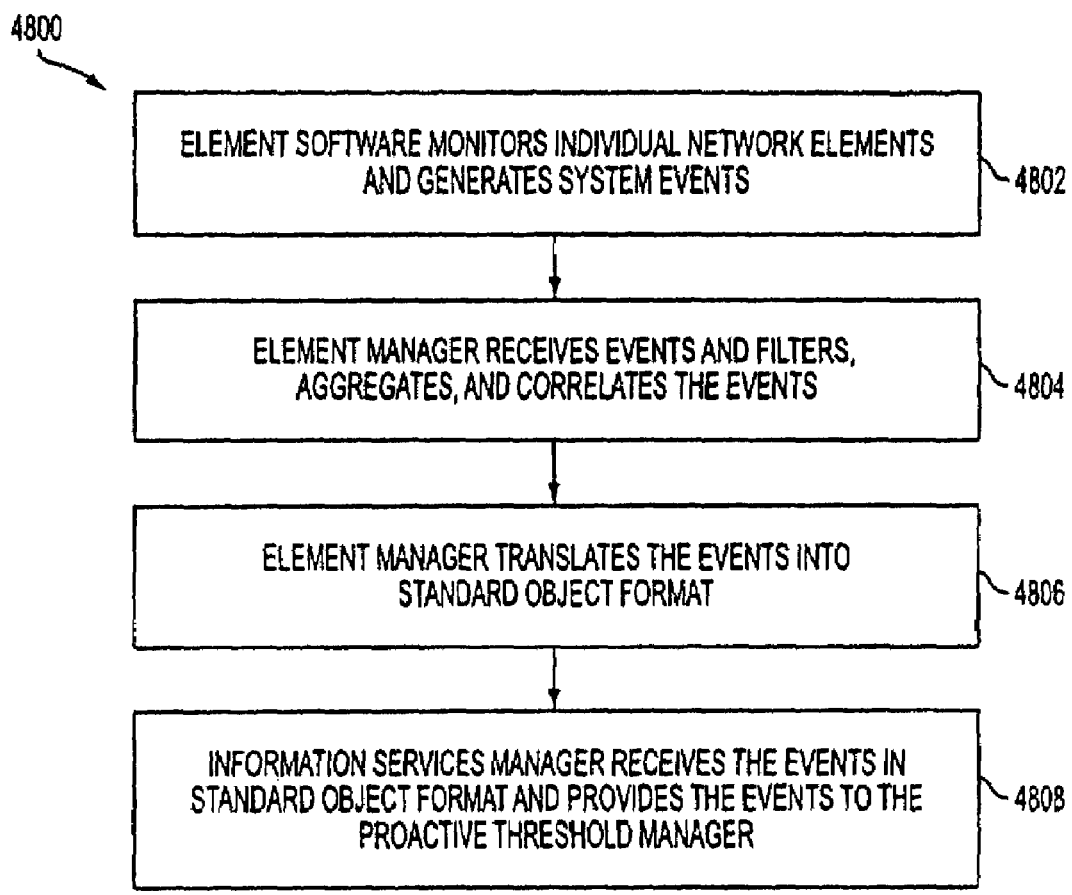
FIG. 48 is a flowchart showing a Network Sensing Process in accordance with one embodiment of the present invention.

FIG. 48 is a flowchart showing a Network Sensing Process 4800 in accordance with one embodiment of the present invention. The Network Sensing Process 4800 begins with an element monitoring step 4802. In step 4802, custom developed element software monitors the individual network elements and generates events based on hardware occurrences, such as switch failures. Typically, the various elements that make up the hybrid network are very different from one another. Thus, custom software is generally needed for each network element or group of related network elements. The custom developed software communicates directly with the hardware and generates events when various occurrences related to the individual hardware happens. For example, when a hardware element fails, the related element software senses the failure and generates an event indicating the hardware failure and the general nature of the failure. The events are then routed to an element manger to processed.

In an event processing step 4804, events generated in step 4802 are filtered, aggregated, and correlated by an element manager. The element manager is where the primary data reduction functions reside. The element manager filters, aggregates, and correlates the events to further isolate problems within the network. Any information that is deemed critical to monitor and manage the network is translated into standard object format in a translation step 4806.

In a translation step 4806, information from step 4804 that is deemed critical to monitor and manage the network is translated into a standard object format. Generally, typical operational events are only logged and not translated into standard object format. However, critical information, such as hardware failure, is translated and forwarded to the Information Services Manager in an information provisioning step 4808.

In an information provisioning step 4808, information from step 4806 is received by the Information Services Manager and forwarded to the Proactive Threshold Manager. The Information Services Manager provides the data management and data communications between the element manager and other system components. Generally, the Information Services Manager adheres to CORBA standards to provide universal information access by an object request broker. The object request broker allows the Information Services Manager to share management information stored in distributed databases. The Proactive Threshold Manager uses the information provided by the Information Services Manger to determine a current level of service and compare the current level of services with the minimum level of service that the service provider can provide without violating SLAs.

Element Management

As discussed above, the element manager works with the Information Services Manager and the Presentation Manager to assist in the management of the hybrid network system. The three components are briefly described below to provide context for the detailed discussion of the element manager that follows.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an object request broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second environment is potentially bandwidth poor where dial-up or wireless access may be used along with more traditional LAN access. This is also where browser technology is employed.

The Element Management Aspect of the present invention works in conjunction with other components of the system, such as Fault Management, to provide communication between the various network elements of the system.

Figure 49:
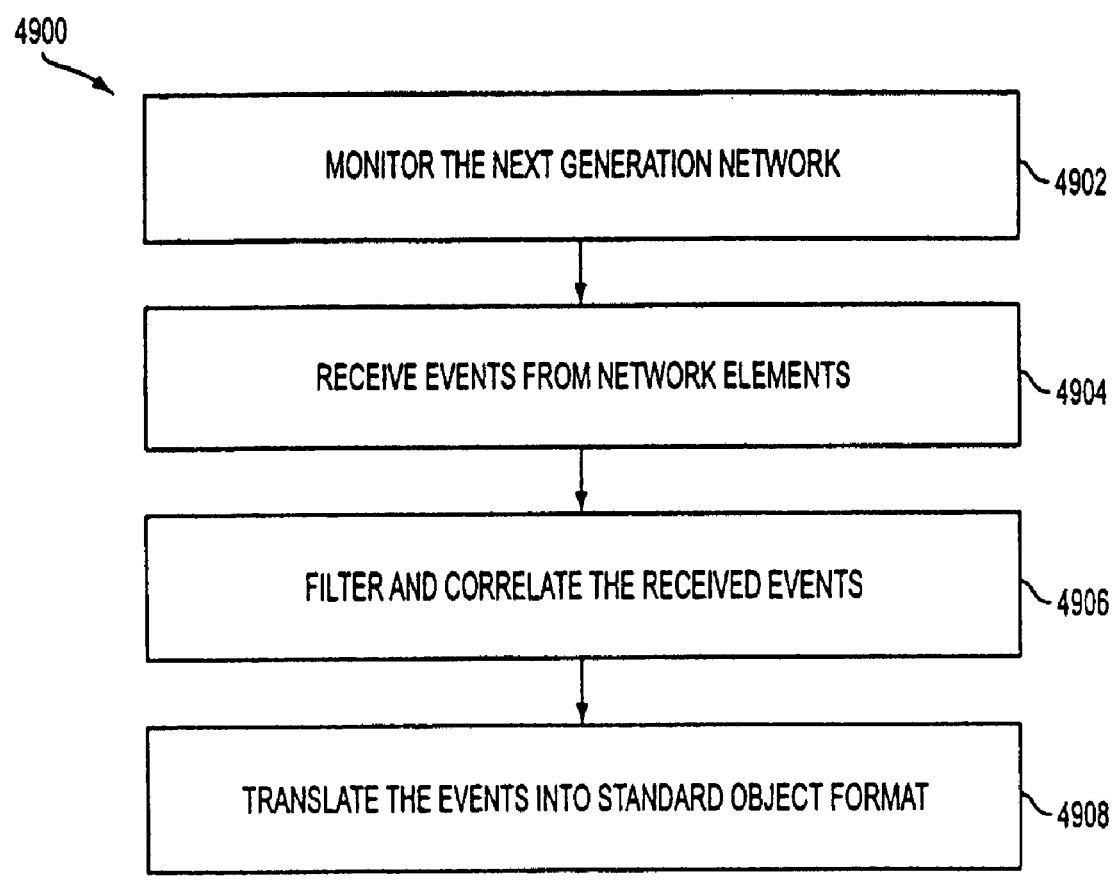
FIG. 49 is a flowchart showing an Element Management Process in accordance with a preferred embodiment of the present invention.

FIG. 49 is a flowchart showing an Element Management Process 4900 in accordance with a preferred embodiment of the present invention. The Element Management Process 4900 begins with a monitoring step 4902. In step 4902, the Element Manager monitors the system for events generated by network elements. Generally, the Element Manager continuously monitors the system to translate events for other system components, such as the Fault Management Component.

In an event receiving step 4904, the Element Manager receives events from various network elements. Preferably the events are provided by custom software interfaces which communicate directly with network elements. The software interfaces preferably process the raw network events and sort them by context prior to providing the events to the Element Manager.

In a filtering and correlating step 4906, the Element Manager filters and correlates the events received in step 4904. Preferably the correlation is provided by a rules based inference engine. After collecting and correlating the events, the Element Manager performs a translation step 4908. In step 4908, the events correlated in step 4906 are translated into standard object format. Generally a comprehensive library of all message types generated by the hybrid system is utilized to translate the correlated events into standard object format. Once the events are translated, they are ready for use by other system components, such as Fault Management or Billing.

Customer Support Structure

The organization model for customer service support in the NGN network provides a single point of contact that is customer focused. This single point of contact provides technical expertise in resolving customer incidents, troubles and requests. Generally a three tiered support structure is greatly increases customer satisfaction in service needs. Each tier, or level, possess an increased level of skill, with tasks and responsibilities distributed accordingly.

Figure 50:
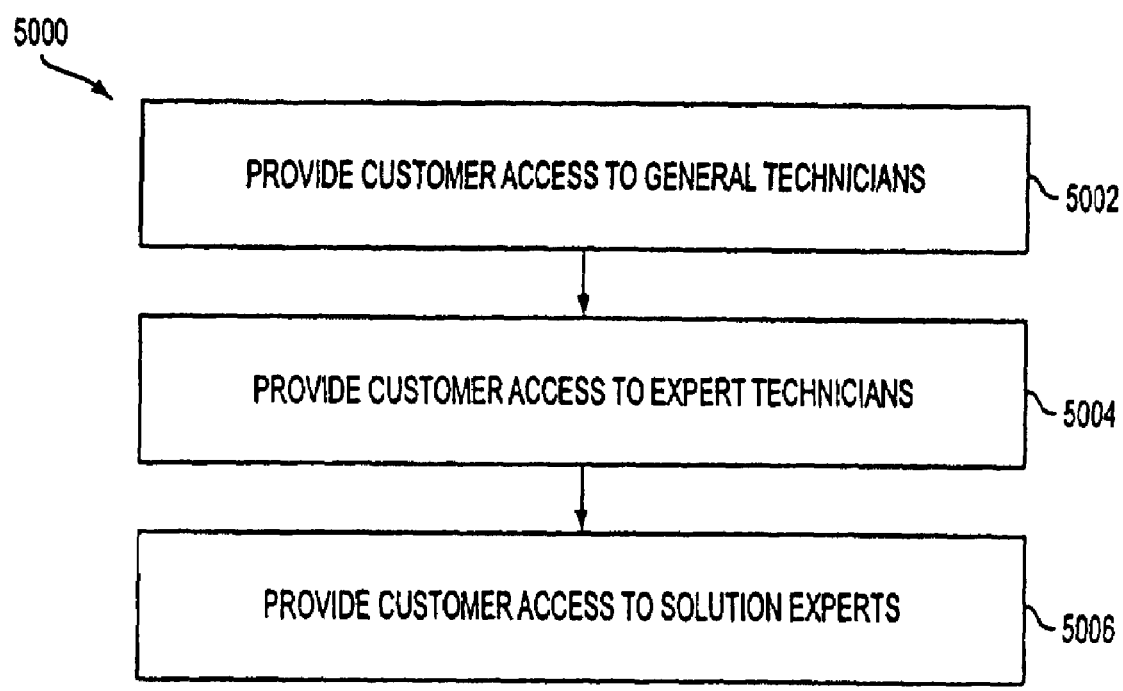
FIG. 50 is a flowchart showing a three tiered customer support process in accordance with a preferred embodiment of the present invention.

FIG. 50 is a flowchart showing a Three Tiered Customer Support Process 5000 in accordance with a preferred embodiment of the present invention. The Three Tiered Customer Support Process 5000 begins with a First Tier step 5002. In step 5002, a customer with a hybrid network problem is provided access to customer support personnel having a broad set of technical skills. The broad set of technical skills allows this group to solve about 60–70% of all hybrid network problems. If the customers network problem is solved at this stage, the process ends. However, if the customers network problem is not solved at this stage, the process continues to a Second Tier step 5004.

In the Second Tier step 5004, the customer is provided access to technical experts and field support personnel who may specialize in specific areas. The greater specialized nature of this group allows it to solve many problems the group in step 5002 could not solve. This group is generally responsible for solving 30–40% of all hybrid network problems. If the customers network problem is solved at this stage, the process ends. However, if the customers network problem is not solved at this stage, the process continues to a Third Tier step 5006.

In the Third Tier step 5006, the customer is provided access to solution experts who are often hardware vendors, software vendors, or customer application development and maintenance teems. Customer network problems that get this far in the customer support process 5000 need individuals possessing in-depth skills to investigate and resolve the difficult problems with there area of expertise. Solution experts are the last resort for solving the most difficult problems. Typically this group solves about 5% of all hybrid network problems.

The above model is generally referred to as the Skilled Model because personnel at all three tiers are highly skilled. This model generally creates a high percentage of calls resolved on the first call. Other approaches include a Functional Model, and a Bypass Model. In the Functional Model users are requested to contact different areas depending on the nature of the incident. Calls are routed to the customer support representative best able to handle the call. This model can easily be coupled with the Skill Model above. In the Bypass Model First Tier only logs calls, they do not resolve calls. One advantage of this model is that skilled resources don't have to waste time logging calls.

In more detail, a customer calling a customer support center in accordance with one embodiment of the present invention is first asked a series of questions by an interactive voice response (IVR) system or an live operator. The customer uses Touch-Tone keys on the telephone to respond to these queries from the IVR, or responds normally to a live operator.

When a product support engineer becomes available, the previously gathered information (both from the IVR query responses and the diagnostic information solicited from the system problem handlers and element managers) is available to the product support engineer.

After reviewing the situation with the customer, the product support engineer can query the customer's computer via support agents for additional information, if necessary.

In systems according to the preferred embodiment, the customer spends less time interacting with a product support engineer, and is relieved of many of the responsibilities in diagnosing and resolving problems. Automated diagnoses and shorter customer interactions save the product support center time, resources, and money. At the same time, the customer receives a better diagnosis and resolution of the problem than could usually be achieved with prior art product support techniques.

In addition, one embodiment of the present invention makes the Internet a viable alternative to telephone calls as a tool for providing consumer product support. Many online computer services, such as Prodigy and America On-Line, provide, for a fee as a part of their on-line service, software for connecting to and accessing the Internet.

The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time for on-line help services. Such a time period could be for a total time period such as 1 hour or more, or access to on-line help services can be unlimited for 90 days, 6 months, etc., for example, with the access time paid for by the sponsor/vendor. The first time a customer uses the on-line help service, the Internet Entry Server performs a registration process which includes a number of personal questions and custom data gathering in the form of queries provided by the sponsor/vendor for response by the user.

The pertinent answers are then immediately provided to the sponsor/vendor. The Internet Entry Server then "hot-links" the customer to the sponsor/vendor's Internet domain or Home Page for a mandatory "guided tour" where the user is exposed to any current product promotion by the sponsor/vendor and can download promotional coupons, product information, etc. After this mandatory guided tour is completed, the customer is allowed to enter queries for help in installing or using the sponsor/vendor's product. As an optional promotional service, upon termination of the on-line help session, access to other information on the Internet can be provided. Once the "free" on-line help service time or time period is up, the Internet Entry Server prompts the user with one or more of a plurality of options for extending the availability of on-line help. For example, the user can be prompted to enter a credit card number to which on-line help charges can be charged; he or she can be given the opportunity to answer additional survey information in return for additional "free" on-line help; or a 900 subscriber paid telephone access number can be provided through which additional on-line help will be billed via the normal telephone company 900 billing cycles.

Integrated IP Telephony User Interface

One embodiment of the present invention allows a user of a web application to communicate in an audio fashion in-band without having to pick up another telephone. Users can click a button and go to a call center through a hybrid network using IP telephony. The system invokes an IP telephony session simultaneously with the data session, and uses an active directory lookup whenever a person uses the system.

Figure 51:
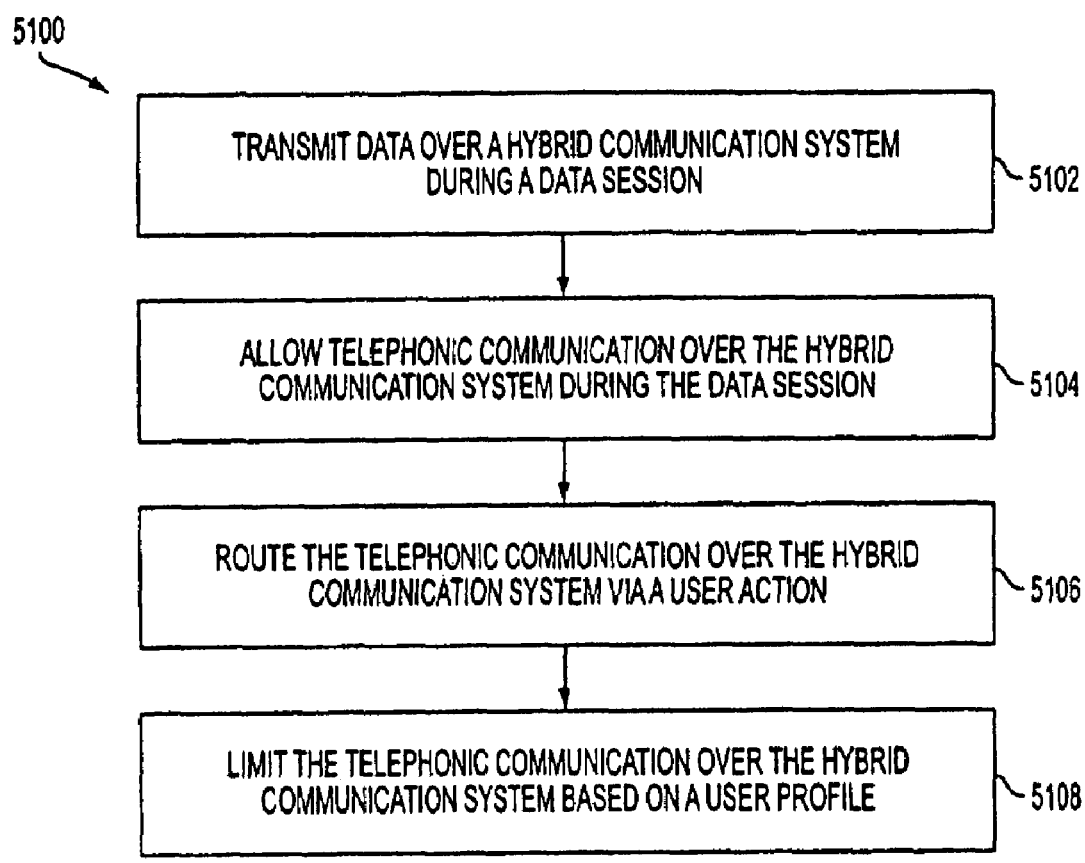
FIG. 51 is a flowchart showing an integrated IP telephony process in accordance with a preferred embodiment of the present invention.

FIG. 51 is a flowchart showing an integrated IP telephony process 5100 in accordance with a preferred embodiment of the present invention. The IP telephony process 5100 begins with a transmitting step 5102. In step 5102, data is transmitted over the hybrid network during a data session. This data session is typically a normal Internet browsing session, and is generally initiated by a web browser. Utilizing a web browser, users begin the data session by performing actions such as searching for web sites or downloading data from Internet sites. During the data session, the present invention allows users the option to initiate phone calls without the need to use another telephone.

In a telephony step 5104, the present invention allows users to initiate and continue telephonic communication. The telephonic is routed by a user action in step 5106, when a user selects a phone number to call. Telephone numbers are typically included in a telephone directory accessible on screen by the user. In addition, the directory may include icons which provide a highly recognizable visual mnemonic to allow users to easily recall the information included in a particular directory entry. The present invention utilizes the routing information to direct the call. Since both the original data from the data session and the new IP telephony data use Internet protocol, the present invention can provide a seamless integration of the two, to provide virtually simultaneous telephonic and non-telephonic data communication. The availability of packet switching elements in the hybrid network facilitate this process.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

In a lookup step 5108, the telephonic communication over the hybrid network is limited bases on a user profile. Preferably the user profile is included in a rules database. By locating the user profile within the rules database, the rules database can provide seamless cross-location registration without the need for duplicate databases located on different networks. Using a rules database, a user utilizing the Internet in Europe can get the same telephony service as provided in the United States, as described above. Preferably the computer used to interface with the Internet includes multimedia equipment such as speakers and a microphone. Utilizing a multimedia equipped computer allows a user to use telephonic communication with little or no disruption while interfacing with the Internet. Multimedia computer speakers are used to receive the telephony audio from the network and the microphone is used to transmit the telephony data to the network.

Data Mining

The present invention includes data mining capability that provides the capability to analyze network management data looking for patterns and correlations across multiple dimensions. The system also constructs models of the behavior of the data in order to predict future growth or problems and facilitate managing the network in a proactive, yet cost-effective manner.

A technique called data mining allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground.

Accurate forecasting relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures.

Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Figure 52:
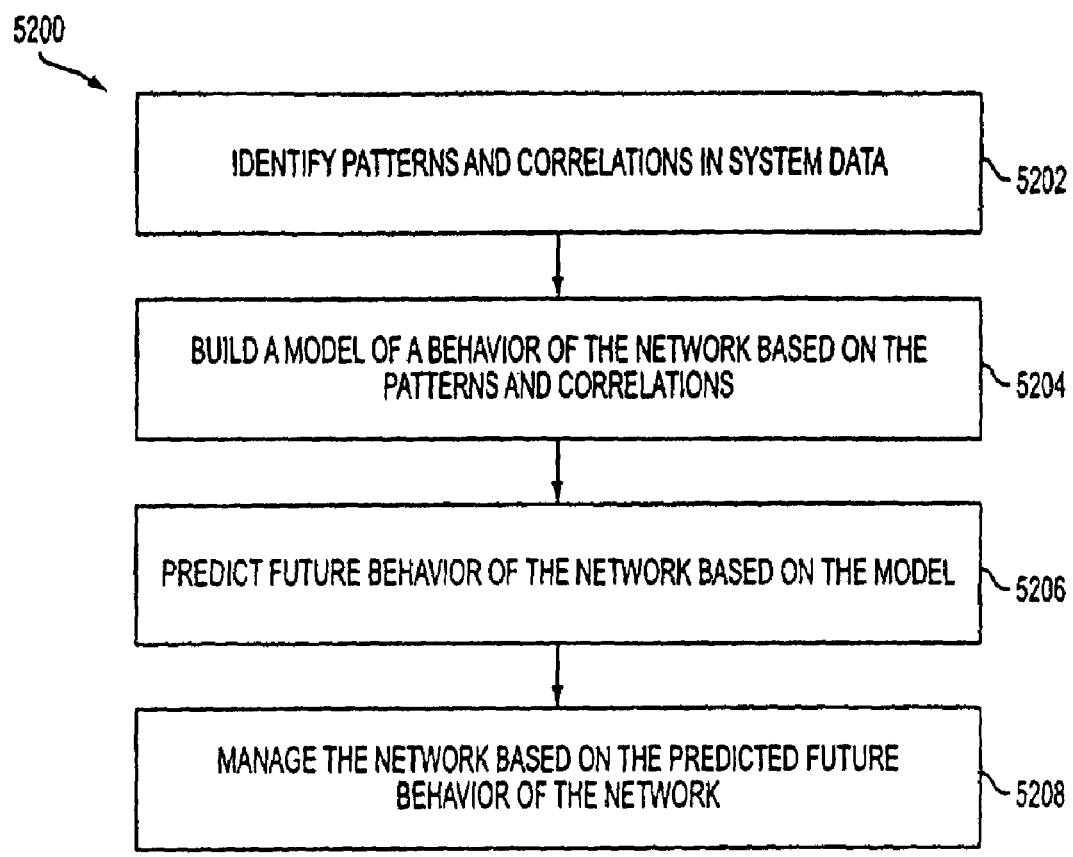
FIG. 52 is a flowchart showing a Data Mining Process in accordance with a preferred embodiment of the present invention.

FIG. 52 is a flowchart showing a Data Mining Process 5200 in accordance with a preferred embodiment of the present invention. The Data Mining Process 5200 begins with an identifying step 5202. In step 5202, the system identifies patterns and correlations in the system data over the hybrid communication system. Preferably the system data is analyzed across multiple dimensions to provide better future system behavior prediction.

In a model building step 5204, the system builds a model of the network behavior based on the patterns and correlations identified in step 5202. Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. Such a search system permits searching across multiple databases. The extracted patterns and relations can be: (1) used by the user, or data analyst, to form a prediction model; (2) used to refine an existing model; and/or (3) organized into a summary of the target database, as in predicting step 5206.

In a predicting step 5206, the system predicts future behavior of the network based on the model generated in step 5204. There are two existing forms of data mining: top-down; and bottom-up. Both forms are separately available on existing systems.

Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data.

Finally, in a managing step 5208, the network is managed based on the future behavior of the network. Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

Classification of the data records to extract useful information is an essential part of data mining. Of importance to the present invention is the construction of a classifier, from records of known classes, for use in classifying other records whose classes are unknown. As generally known in the prior art, a classifier is generated from input data, also called a training set, which consist of multiple records. Each record is identified with a class label. The input data is analyzed to develop an accurate description, or model, for each class of the records. Based on the class descriptions, the classifier can then classify future records, referred to as test data, for which the class labels are unknown.

As an example, consider the case where a credit card company which has a large database on its card holders and wants to develop a profile for each customer class that will be used for accepting or rejecting future credit applicants. Assuming that the card holders have been divided into two classes, good and bad customers, based on their credit history. The problem can be solved using classification.

First, a training set consisting of customer data with the assigned classes are provided to a classifier as input. The output from the classifier is a description of each class, i.e., good and bad, which then can be used to process future credit card applicants.

Similar applications of classification are also found in other fields such as target marketing, medical diagnosis, treatment effectiveness, and store location search.

In data mining applications of classification, very large training sets such as those having several million examples are common. Thus, it is critical in these applications to have a classifier that scales well and can handle training data of this magnitude. As an additional advantage, being able to classify large training data also leads to an improvement in the classification accuracy.

Another desirable characteristic for a data mining classifier is its short training time, i.e., the ability to construct the class descriptions from the training set quickly. As a result, the methods of the invention are based on a decision-tree classifier. Decision trees are highly developed techniques for partitioning data samples into a set of covering decision rules. They are compact and have the additional advantage that they can be converted into simple classification rules. In addition, they can be easily converted into Structured Query language (SQL) statements used for accessing databases, and achieve comparable or better classification accuracy than other classification methods.

Another data mining classifier technique solves the memory constraint problem and simultaneously improve execution time by partitioning the data into subsets that fit in the memory and developing classifiers for the subsets in parallel. The output of the classifiers are then combined using various algorithms to obtain the final classification. This approach reduces running time significantly. Another method classifies data in batches.

Web Architecture Framework According to One Embodiment of the Present Invention

Figure 53A:
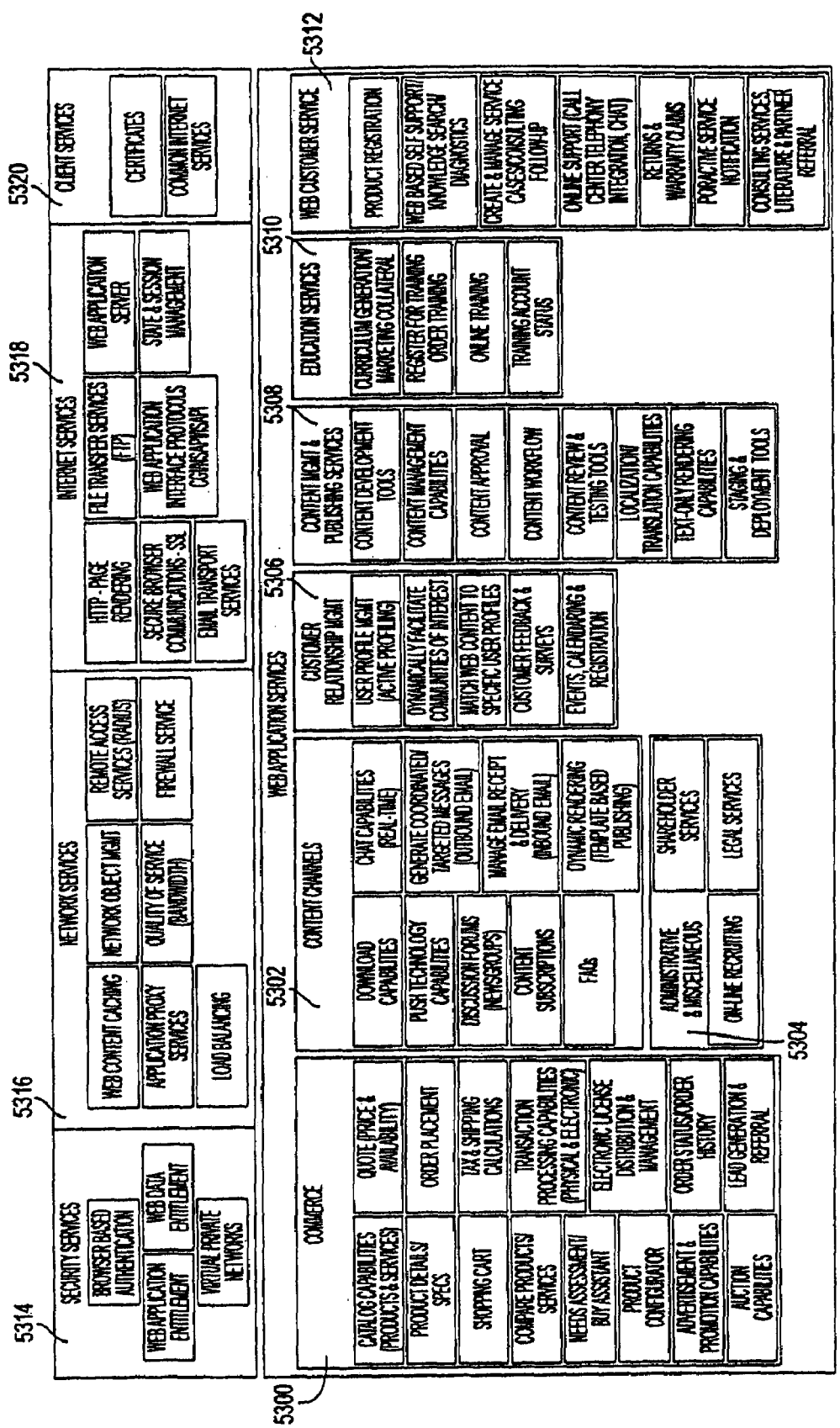
FIG. 53 is a block diagram of a Web Architecture Framework in accordance with one embodiment of the present invention.
Figure 53B:
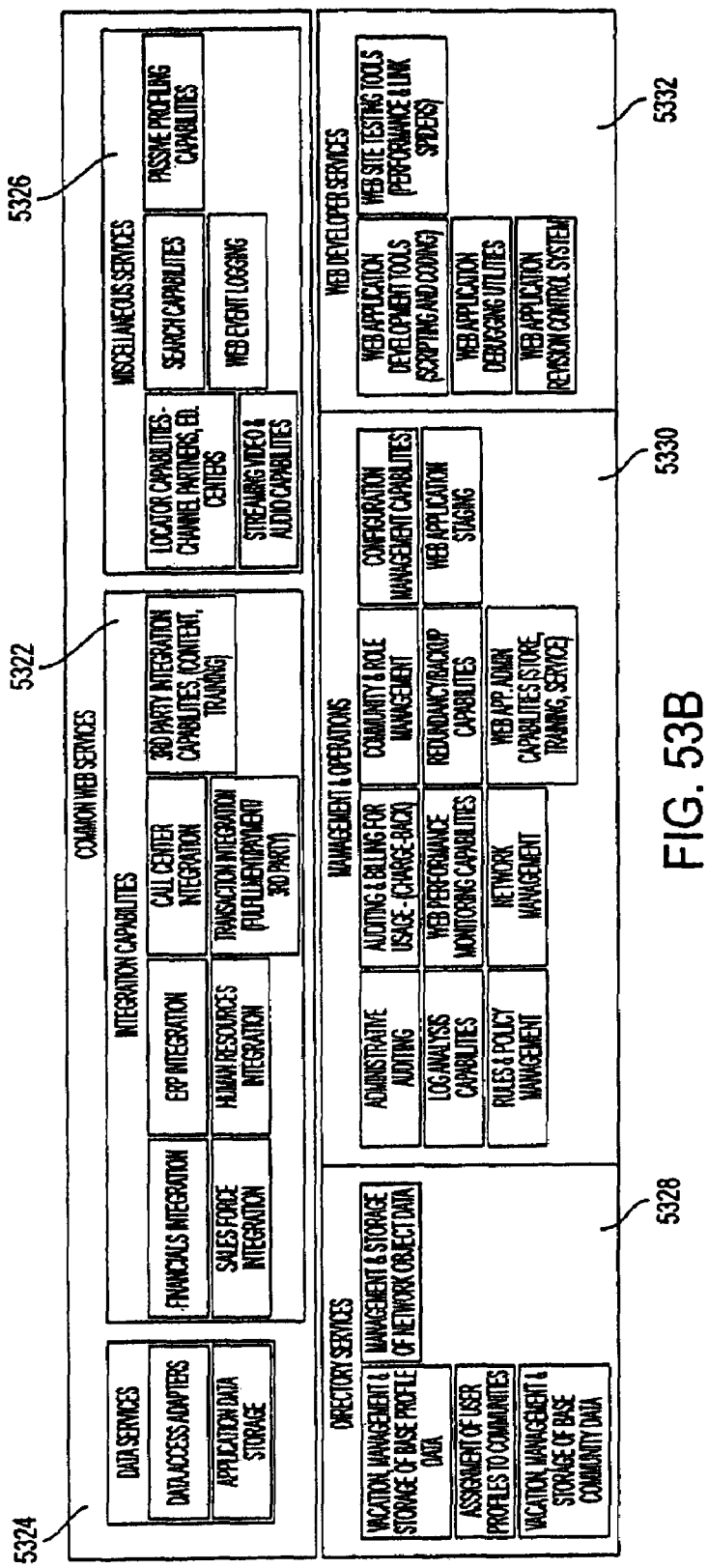

The foregoing embodiments of the present invention may be employed in the generation of an Internet architecture framework like the one shown in FIG. 53 to support various features such as an electronic commerce component 5300, a content channels component 5302, an administrative component 5304, a customer relationship management component 5306, a content management and publishing services component 5308, an education related services component 5310, or a web customer service component 5312.

The present invention provides a new kind of web architecture framework (called "WAF" in this document) that secures, administers, and audits electronic information use. WAF also features fundamentally important capabilities for managing content that travels "across" the "information highway." These capabilities comprise a rights protection solution that serves all electronic community members. These members include content creators and distributors, financial service providers, end-users, and others. WAF is the first general purpose, configurable, transaction control/rights protection solution for users of computers, other electronic appliances, networks, and the information highway.

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352× 288 pixels and 176×144 pixels.

ITU H.263 Recommendation for Video Coder-Decoder for audiovisual services supporting video resolutions of 128×96 pixels, 176×144 pixels, 352×288 pixels, 704×576 pixels and 1408×1 152 pixels.

ITU H.320 Recommendation for Narrow Band ISDN visual telephone systems.

ITU H.321 Visual Telephone Terminals over ATM

ITU H.322 Visual Telephone Terminals over Guaranteed Quality of Service LANs

ITU H.323 ITU Recommendation for Visual Telephone Systems and Equipment for Local Area Networks which provide a non-guaranteed quality of service.

ITU H.324 Recommendation for Terminals and Systems for low bitrate (28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization (ISO), Recommendations for compression of digital Video and Audio including the bit stream but not the compression algorithms.

SLIP Serial Line Internet Protocol

RSVP Resource Reservation Setup Protocol

UDP User Datagram Protocol

The popularity of the TCP/IP protocols on the Internet grew rapidly because they met an important need for worldwide data communication and had several important characteristics that allowed them to meet this need. These characteristics, still in use today, include:

A common addressing scheme that allows any device running TCP/IP to uniquely address any other device on the Internet.

Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique. Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice. However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communication for Smooth User Connection In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of the internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks. ATM networks require modern hardware including:

High speed switches that can operate at gigabit (trillion bit) per second speeds to handle the traffic from many computers.

Optical fibers (versus copper wires) that provide high data transfer rates, with host-to-ATM switch connections running at 100 or 155 Mbps (million bits per second).

3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1) To provide an internationally accepted standard for voice, data and signaling;

2) To make all transmission circuits end-to-end digital;

3) To adopt a standard out-of-band signaling system; and

4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

ATM (asynchronous transfer mode) pushes network control to the periphery of the network, obviating the trunk and switching models of traditional, circuit-based telephony. It is expected to be deployed widely to accommodate these high bandwidth services.

WAF supports a general purpose foundation for secure transaction management, including usage control, auditing, reporting, and/or payment. This general purpose foundation is called "WAF Functions" ("WAFFs"). WAF also supports a collection of "atomic" application elements (e.g., load modules) that can be selectively aggregated together to form various WAFF capabilities called control methods and which serve as WAFF applications and operating system functions. When a host operating environment of an electronic appliance includes WAFF capabilities, it is called a "Rights Operating System" (ROS). WAFF load modules, associated data, and methods form a body of information that for the purposes of the present invention are called "control information." WAFF control information may be specifically associated with one or more pieces of electronic content and/or it may be employed as a general component of the operating system capabilities of a WAF installation.

WAFF transaction control elements reflect and enact content specific and/or more generalized administrative (for example, general operating system) control information. WAFF capabilities which can generally take the form of applications (application models) that have more or less configurability which can be shaped by WAF participants, through the use, for example, of WAF templates, to employ specific capabilities, along, for example, with capability parameter data to reflect the elements of one or more express electronic agreements between WAF participants in regards to the use of electronic content such as commercially distributed products. These control capabilities manage the use of, and/or auditing of use of, electronic content, as well as reporting information based upon content use, and any payment for said use. WAFF capabilities may "evolve" to reflect the requirements of one or more successive parties who receive or otherwise contribute to a given set of control information. Frequently, for a WAF application for a given content model (such as distribution of entertainment on CD-ROM, content delivery from an Internet repository, or electronic catalog shopping and advertising, or some combination of the above) participants would be able to securely select from amongst available, alternative control methods and apply related parameter data, wherein such selection of control method and/or submission of data would constitute their "contribution" of control information. Alternatively, or in addition, certain control methods that have been expressly certified as securely interoperable and compatible with said application may be independently submitted by a participant as part of such a contribution. In the most general example, a generally certified load module (certified for a given WAF arrangement and/or content class) may be used with many or any WAF application that operates in nodes of said arrangement. These parties, to the extent they are allowed, can independently and securely add, delete, and/or otherwise modify the specification of load modules and methods, as well as add, delete or otherwise modify related information.

Normally the party who creates a WAF content container defines the general nature of the WAFF capabilities that will and/or may apply to certain electronic information. A WAF content container is an object that contains both content (for example, commercially distributed electronic information products such as computer software programs, movies, electronic publications or reference materials, etc.) and certain control information related to the use of the object's content. A creating party may make a WAF container available to other parties. Control information delivered by, and/or otherwise available for use with, WAF content containers comprise (for commercial content distribution purposes) WAFF control capabilities (and any associated parameter data) for electronic content. These capabilities may constitute one or more "proposed" electronic agreements (and/or agreement functions available for selection and/or use with parameter data) that manage the use and/or the consequences of use of such content and which can enact the terms and conditions of agreements involving multiple parties and their various rights and obligations.

A WAF electronic agreement may be explicit, through a user interface acceptance by one or more parties, for example by a "junior" party who has received control information from a "senior" party, or it may be a process amongst equal parties who individually assert their agreement. Agreement may also result from an automated electronic process during which terms and conditions are "evaluated" by certain WAF participant control information that assesses whether certain other electronic terms and conditions attached to content and/or submitted by another party are acceptable (do not violate acceptable control information criteria). Such an evaluation process may be quite simple, for example a comparison to ensure compatibility between a portion of, or all senior, control terms and conditions in a table of terms and conditions and the submitted control information of a subsequent participant in a pathway of content control information handling, or it may be a more elaborate process that evaluates the potential outcome of, and/or implements a negotiation process between, two or more sets of control information submitted by two or more parties. WAF also accommodates a semi-automated process during which one or more WAF participants directly, through user interface means, resolve "disagreements" between control information sets by accepting and/or proposing certain control information that may be acceptable to control information representing one or more other parties interests and/or responds to certain user interface queries for selection of certain alternative choices and/or for certain parameter information, the responses being adopted if acceptable to applicable senior control information.

When another party (other than the first applier of rules), perhaps through a negotiation process, accepts, and/or adds to and/or otherwise modifies, "in place" content control information, a WAF agreement between two or more parties related to the use of such electronic content may be created (so long as any modifications are consistent with senior control information). Acceptance of terms and conditions related to certain electronic content may be direct and express, or it may be implicit as a result of use of content (depending, for example, on legal requirements, previous exposure to such terms and conditions, and requirements of in place control information).

WAFF capabilities may be employed, and a WAF agreement may be entered into, by a plurality of parties without the WAFF capabilities being directly associated with the controlling of certain, specific electronic information. For example, certain one or more WAFF capabilities may be present at a WAF installation, and certain WAF agreements may have been entered into during the registration process for a content distribution application, to be used by such installation for securely controlling WAF content usage, auditing, reporting and/or payment. Similarly, a specific WAF participant may enter into a WAF user agreement with a WAF content or electronic appliance provider when the user and/or her appliance register with such provider as a WAF installation and/or user. In such events, WAFF in place control information available to the user WAF installation may require that certain WAFF methods are employed, for example in a certain sequence, in order to be able to use all and/or certain classes, of electronic content and/or WAF applications.

WAF ensures that certain prerequisites necessary for a given transaction to occur are met. This includes the secure execution of any required load modules and the availability of any required, associated data. For example, required load modules and data (e.g. in the form of a method) might specify that sufficient credit from an authorized source must be confirmed as available. It might further require certain one or more load modules execute as processes at an appropriate time to ensure that such credit will be used in order to pay for user use of the content. A certain content provider might, for example, require metering the number of copies made for distribution to employees of a given software program (a portion of the program might be maintained in encrypted form and require the presence of a WAF installation to run). This would require the execution of a metering method for copying of the property each time a copy was made for another employee. This same provider might also charge fees based on the total number of different properties licensed from them by the user and a metering history of their licensing of properties might be required to maintain this information.

Commerce-Related Web Application Services

Figure 54:
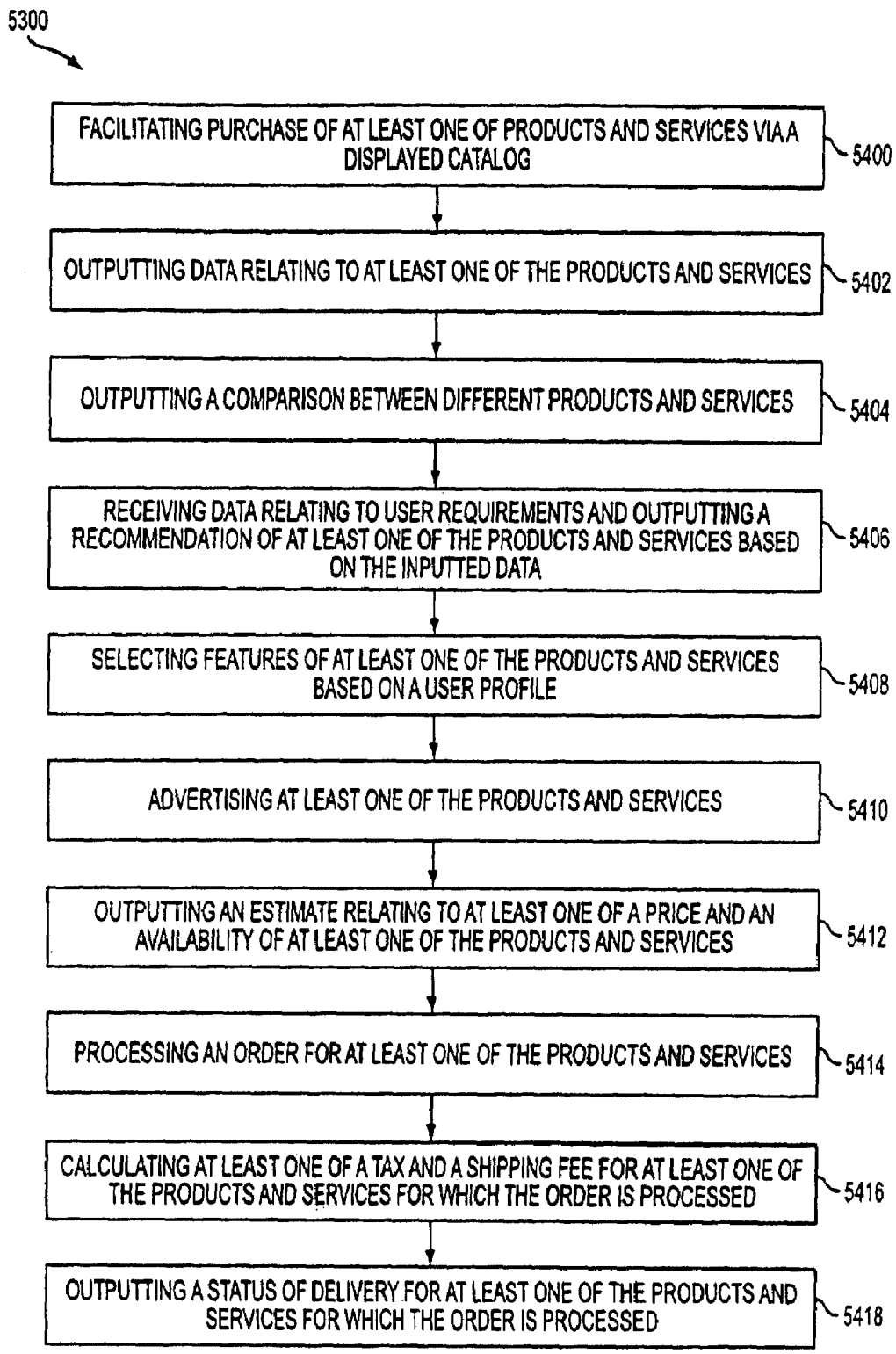
FIG. 54 is a flowchart illustrating the commerce-related web application services in accordance with one embodiment of the present invention.

One embodiment of the present invention, as shown in FIG. 54, is provided for affording a combination of commerce-related web application services. Various features are included such as allowing purchase of products and services via a displayed catalog in operation 5400. As an option, a virtual shopping cart environment may be provided. Further, in operations 5402 and 5404, data, i.e. specifications, details, etc., relating to the products and services are displayed along with a comparison between different products and services. Data relating to needs of a user may also be received for the purpose of outputting a recommendation of the products and services based on the inputted needs. See operation 5406. Optionally, features of the products and services may be selected in operation 5408 based on user profile in order to configure a specifically tailored product or service.

Alternatively, features of the products and services may be listed in order to allow the user to configure a specifically tailored product or service. Operation 5410 allows one or more of the products or services to be advertised. Yet another aspect of the present invention includes outputting an estimate relating to a price and/or availability of the products and services. Note operation 5412. Further, in operations 5414 and 5416, an order for the products and services may be received and processed, after which a tax and a shipping fee are calculated. A status of delivery for one or more of the ordered products and services may be provided in operation 5418.

Optionally, the displayed catalog may be customized based upon the user profile. Further, the data relating to at least one of the products and services may include a link to related data. The comparison between different products and services could include a comparison to a competitor's product. Alternatively, the comparison between different products and services could include identification of at least one advantage of the at least one of products and services. Optionally, the recommendation of at least one of the products and services includes a financial analysis of at least one of the products and services. The features of at least one of the products and services may be generated by a product configuration. The advertising could include customized advertising based upon the user profile. The step of calculating at least one of the tax and the shipping fee may further include calculating a plurality of taxes and shipping fees applicable to international transactions. These and other options will be discussed in more detail below.

Through use of WAF's control system, traditional content providers and users can create electronic relationships that reflect traditional, non-electronic relationships. They can shape and modify commercial relationships to accommodate the evolving needs of, and agreements among, themselves. WAF does not require electronic content providers and users to modify their business practices and personal preferences to conform to a metering and control application program that supports limited, largely fixed functionality. Furthermore, WAF permits participants to develop business models not feasible with non-electronic commerce, for example, involving detailed reporting of content usage information, large numbers of distinct transactions at hitherto infeasibly low price points, "pass-along" control information that is enforced without involvement or advance knowledge of the participants, etc.

The present invention allows content providers and users to formulate their transaction environment to accommodate:

(1) desired content models, content control models, and content usage information pathways, (2) a complete range of electronic media and distribution means, (3) a broad range of pricing, payment, and auditing strategies, (4) very flexible privacy and/or reporting models, (5) practical and effective security architectures, and (6) other administrative procedures that together with steps (1) through (5) can enable most "real world" electronic commerce and data security models, including models unique to the electronic world.

WAF's transaction management capabilities can enforce:

(1) privacy rights of users related to information regarding their usage of electronic information and/or appliances, (2) societal policy such as laws that protect rights of content users or require the collection of taxes derived from electronic transaction revenue, and (3) the proprietary and/or other rights of parties related to ownership of, distribution of, and/or other commercial rights related to, electronic information.

WAF can support "real" commerce in an electronic form, that is the progressive creation of commercial relationships that form, over time, a network of interrelated agreements representing a value chain business model. This is achieved in part by enabling content control information to develop through the interaction of (negotiation between) securely created and independently submitted sets of content and/or appliance control information. Different sets of content and/or appliance control information can be submitted by different parties in an electronic business value chain enabled by the present invention. These parties create control information sets through the use of their respective WAF installations. Independently, securely deliverable, component based control information allows efficient interaction among control information sets supplied by different parties.

WAF permits multiple, separate electronic arrangements to be formed between subsets of parties in a WAF supported electronic value chain model. These multiple agreements together comprise a WAF value chain "extended" agreement. WAF allows such constituent electronic agreements, and therefore overall WAF extended agreements, to evolve and reshape over time as additional WAF participants become involved in WAF content and/or appliance control information handling. WAF electronic agreements may also be extended as new control information is submitted by existing participants. With WAF, electronic commerce participants are free to structure and restructure their electronic commerce business activities and relationships. As a result, the present invention allows a competitive electronic commerce marketplace to develop since the use of WAF enables different, widely varying business models using the same or shared content.

A significant facet of the present invention's ability to broadly support electronic commerce is its ability to securely manage independently delivered WAF component objects containing control information (normally in the form of WAF objects containing one or more methods, data, or load module WAF components). This independently delivered control information can be integrated with senior and other pre-existing content control information to securely form derived control information using the negotiation mechanisms of the present invention. All requirements specified by this derived control information must be satisfied before WAF controlled content can be accessed or otherwise used. This means that, for example, all load modules and any mediating data which are listed by the derived control information as required must be available and securely perform their required function. In combination with other aspects of the present invention, securely, independently delivered control components allow electronic commerce participants to freely stipulate their business requirements and trade offs. As a result, much as with traditional, non-electronic commerce, the present invention allows electronic commerce (through a progressive stipulation of various control requirements by WAF participants) to evolve into forms of business that are the most efficient, competitive and useful.

WAF provides capabilities that rationalize the support of electronic commerce and electronic transaction management. This rationalization stems from the reusability of control structures and user interfaces for a wide variety of transaction management related activities. As a result, content usage control, data security, information auditing, and electronic financial activities, can be supported with tools that are reusable, convenient, consistent, and familiar. In addition, a rational approach—a transaction/distribution control standard—allows all participants in WAF the same foundation set of hardware control and security, authoring, administration, and management tools to support widely varying types of information, business market model, and/or personal objectives.

Employing WAF as a general purpose electronic transaction/distribution control system allows users to maintain a single transaction management control arrangement on each of their computers, networks, communication nodes, and/or other electronic appliances. Such a general purpose system can serve the needs of many electronic transaction management applications without requiring distinct, different installations for different purposes. As a result, users of WAF can avoid the confusion and expense and other inefficiencies of different, limited purpose transaction control applications for each different content and/or business model. For example, WAF allows content creators to use the same WAF foundation control arrangement for both content authoring and for licensing content from other content creators for inclusion into their products or for other use. Clearinghouses, distributors, content creators, and other WAF users can all interact, both with the applications running on their WAF installations, and with each other, in an entirely consistent manner, using and reusing (largely transparently) the same distributed tools, mechanisms, and consistent user interfaces, regardless of the type of WAF activity.

WAF participants in a commercial value chain can be "commercially" confident (that is, sufficiently confident for commercial purposes) that the direct (constituent) and/or "extended" electronic agreements they entered into through the use of WAF can be enforced reliably. These agreements may have both "dynamic" transaction management related aspects, such as content usage control information enforced through budgeting, metering, and/or reporting of electronic information and/or appliance use, and/or they may include "static" electronic assertions, such as an end-user using the system to assert his or her agreement to pay for services, not to pass to unauthorized parties electronic information derived from usage of content or systems, and/or agreeing to observe copyright laws. Not only can electronically reported transaction related information be trusted under the present invention, but payment may be automated by the passing of payment tokens through a pathway of payment (which may or may not be the same as a pathway for reporting). Such payment can be contained within a WAF container created automatically by a WAF installation in response to control information (located, in the preferred embodiment, in one or more permissions records) stipulating the "withdrawal" of credit or electronic currency (such as tokens) from an electronic account (for example, an account securely maintained by a user's WAF installation secure subsystem) based upon usage of WAF controlled electronic content and/or appliances (such as governments, financial credit providers, and users).

WAF allows the needs of electronic commerce participants to be served and it can bind such participants together in a universe wide, trusted commercial network that can be secure enough to support very large amounts of commerce. WAF's security and metering secure subsystem core will be present at all physical locations where WAF related content is (a) assigned usage related control information (rules and mediating data), and/or (b) used. This core can perform security and auditing functions (including metering) that operate within a "virtual black box," a collection of distributed, very secure WAF related hardware instances that are interconnected by secured information exchange (for example, telecommunication) processes and distributed database means. WAF further includes highly configurable transaction operating system technology, one or more associated libraries of load modules along with affiliated data, WAF related administration, data preparation, and analysis applications, as well as system software designed to enable WAF integration into host environments and applications. WAF's usage control information, for example, provide for property content and/or appliance related: usage authorization, usage auditing (which may include audit reduction), usage billing, usage payment, privacy filtering, reporting, and security related communication and encryption techniques.

WAF's fundamental configurability will allow a broad range of competitive electronic commerce business models to flourish. It allows business models to be shaped to maximize revenues sources, end-user product value, and operating efficiencies. WAF can be employed to support multiple, differing models, take advantage of new revenue opportunities, and deliver product configurations most desired by users. Electronic commerce technologies that do not, as the present invention does:

support a broad range of possible, complementary revenue activities, offer a flexible array of content usage features most desired by customers, and exploit opportunities for operating efficiencies, will result in products that are often intrinsically more costly and less appealing and therefore less competitive in the marketplace.

Some of the key factors contributing to the configurability intrinsic to the present invention include:

(a) integration into the fundamental control environment of a broad range of electronic appliances through portable API and programming language tools that efficiently support merging of control and auditing capabilities in nearly any electronic appliance environment while maintaining overall system security;

(b) modular data structures;

(c) generic content model;

(d) general modularity and independence of foundation architectural components;

(e) modular security structures;

(f) variable length and multiple branching chains of control; and (g) independent, modular control structures in the form of executable load modules that can be maintained in one or more libraries, and assembled into control methods and models, and where such model control schemes can "evolve" as control information passes through the WAF installations of participants of a pathway of WAF content control information handling.

Catalog Capabilities

Displays linkable pictures and text

Customizes rendering based on user preferences

Provides multiple ways to traverse the catalog (ease of navigation)

Shows Quick-buy link throughout catalog

Incorporates multiple languages and localized content

Integrates to centralized publishing for fresh content

Displays guest view of catalog (default set)

Creates personal catalog

Referring to operation 5400 of FIG. 54, one embodiment of the electronic commerce component of the present invention is provided for allowing purchase of products and services via a display catalog. The display catalog may display linkable pictures, such as visual representations of products for sale. The display catalog may also display linkable text which could represent a product or family of products, as well as services offered. Other linkable text or pictures could be implemented to provide multiple ways to traverse the display catalog to ease navigation along a page or between various pages. An exemplary link would include at least one textual or picture link displayed on each page of the display catalog that would permit a user to purchase the good or service shown on that page or associated with a particular good or service displayed on the page. Such link may resemble a shopping cart.

Preferably, the default setting of the display catalog would be preset, but the display format of the display catalog would be customizable based on user preference or automatically based on user profile. For example, the user may be permitted to customize the format of the display catalog for his or her particular session, or the customizations may be saved so that the user's personalized settings are used each time the display catalog is opened by that particular user. The display format may also be customized to display localized content, such as by being based on the location of the user. Text may also be displayed in a language selected by the viewer.

Product Details and Specifications

Links to all related documentation (datasheets, whitepapers)

Drills-down for additional detail

Integrates to centralized publishing for integrity

Downloads information

Tracks downloads for proactive notification (spec updates)

As shown in FIG. 54, operation 5402 outputs data relating to at least one of the products and services. Such data may include details of the products or services as well as specifications. The data and comparisons may be accessed through linking of pages containing the data with linkable pictures and text. For example, a more detailed picture of a particular product illustrating its most salient features may be linked to a smaller or more generic picture of the product on a page displaying various similar products. More links may be used on the page displaying the data to obtain additional detail.

Optionally, the data may be integrated to centralized publishing for integrity. In such case, updated data would be downloaded to ensure the correctness and currentness of the information. A proactive notification could also be made near the time of download, such as when updates to a specification are sent or received.

Shopping Cart

Stores items selected throughout shopping experience

Saves shopping carts to be retrieved at later point

Displays quantity, price, shipping info, total price

Modifies order information (add quantities, delete items)

Incorporates multiple languages and currency

Accessible easily throughout catalog

Figure 55:
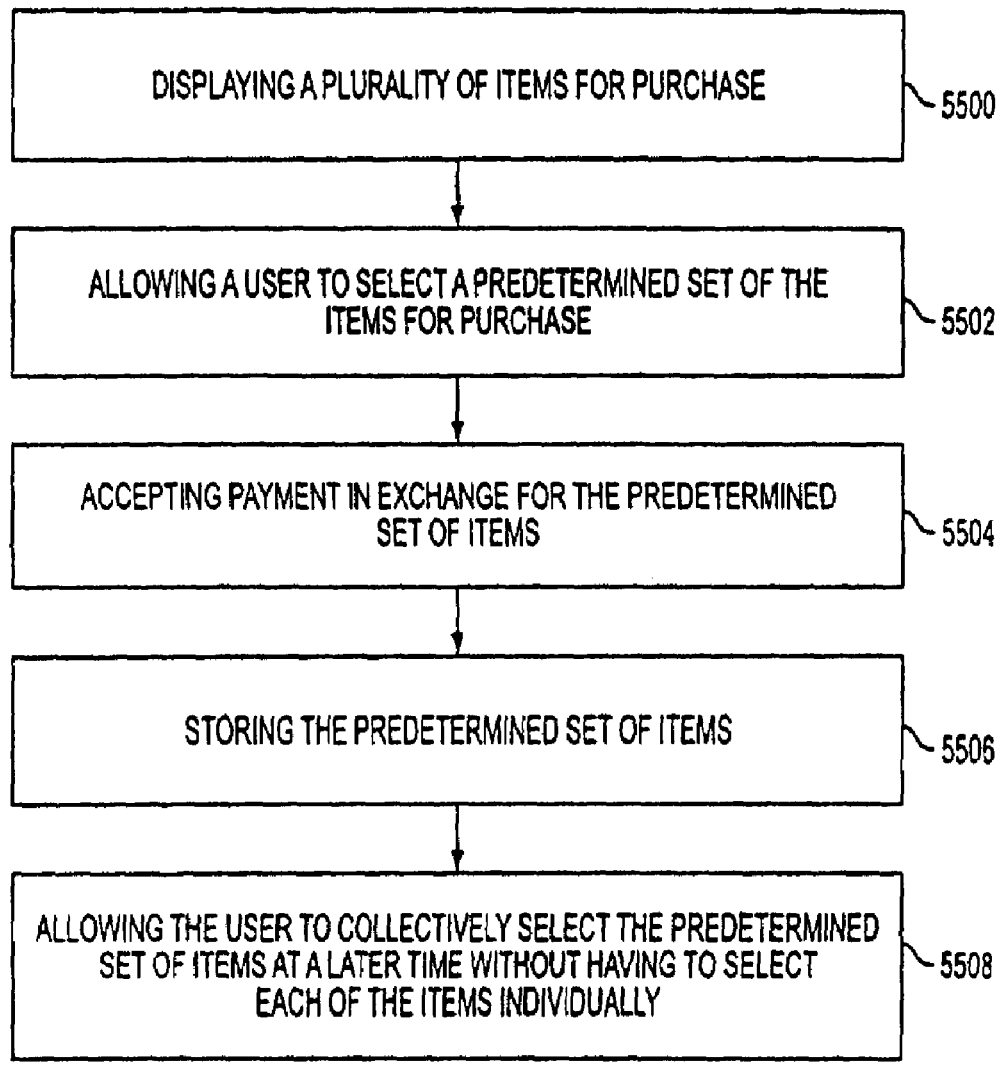
FIG. 55 is an illustration of one embodiment of the present invention for facilitating a virtual shopping transaction.

As shown in FIG. 55, one embodiment of the electronic commerce component of the present invention is provided for facilitating a virtual shopping transaction. First, a plurality of items, i.e. products or services, are selected from a database and displayed for purchase in operation 5500. Preferably, the items are displayed in an electronic catalog format. Next, in operation 5502, a user is allowed to select a predetermined set of the items for purchase. For example, each of the items could include a liked picture or text, which a user would then simply click on with a mouse pointer to select the items. Other options include scrollable menus, etc. In operation 5504, a payment is then accepted in exchange for the predetermined set of items. Such predetermined set of items is then stored in operation 5506, thereby allowing the user to collectively select the predetermined set of items at a later time without having to select each of the items individually. Note operation 5508. The selected items are preferably stored in a database unique to the user. The set of items selected during each shopping session should be stored in a separate listing or file so that the user can individually select particular sets of items. Optionally, the user may be allowed to name each stored set of items for easier identification later. The user may also be permitted to rate or rank the items of a selected set for purposes of refreshing the user's memory when the user later retrieves the set.

Ideally, a quantity and a price of each of the items that is selected is displayed during use of the present invention. Also displayed is a total price of the items that are selected along with shipping information. During use, the user is allowed to modify the predetermined set of items that are selected. Further, several sets of items may be separately stored for later review and modification. Retrieval of the set or sets of items should be easily accessible throughout the display catalog, such as through links.

Optionally, multiple languages may be incorporated into the present invention and payment for the predetermined set of items may be accepted in any one of a plurality of currencies such as electronic and foreign.

Recently, an online shopping system which allows examination, selection and order of items through a computer has been put into practice. In such an online shopping system, in order to supplement a disadvantage by a gap from ordinary shopping caused by the use of electronic means such as not capable of directly touching the item and not capable of getting assistance of a real salesman, various devices for a user interface have been made. As one of such devices, a so-called shopping basket function which has some analogy with shopping basket used in a shop such as supermarket is proposed. In this function, items on the online shopping are temporarily added to a purchase list and a process of order and purchase is conducted when all items to be purchased are registered on the list, as items to be purchased in the supermarket are once put into a shopping basket and lastly the account is settled at a counter. In this manner, by preparing the purchase list to order a plurality of items one time, a time required to purchase may be substantially saved. Further, the consumer may prevent the failure of shopping and stop the purchase of unnecessary items by checking the list once before the purchase. Further, because of feel of easiness that the items once added on the purchase list may be finally changed in any way before the purchase, there is a psychological effect that the consumer may proceed shopping readily.

The elements which constitute the shopping basket are a shopping basket main body (purchase list) and a function for taking in and out items for the shopping basket. As functions associated with the shopping basket, there are a function to take the items into the shopping basket (add to the purchase list), a function to check the contents of the shopping basket (display the purchase list), a function to return the item in the shopping basket (change the purchase list) and a function to purchase the items in the shopping basket. However, for the function to purchase the items, only the order is accepted because the delivery of the items is made later except a portion of items which can be downloaded as digital data and the shopping is not completed until the items are received and the account is settled.

As one of methods for proving the shopping basket to the consumer, there is a method of displaying a button for the shopping basket on the same display page as a catalog which the consumer watches as it is realized in the online shopping system mainly on the World Wide Web. As another method of proving the shopping basket, there is a method for separately displaying an item catalog area and a shopping basket area. Such a function is used in the shopping system provided by a CD-ROM.

A main stage of the online shopping is an item catalog screen on which information on the items is provided. The consumer examines the item on the screen and if he or she likes it, he or she takes it into the shopping basket. During the shopping, he or she examines the content of the shopping basket as required to check the item scheduled to purchase and the pay amount of the items. Accordingly, it is not necessary to always display the purchase list on the screen, but the functions to access to the shopping basket for taking in the items and to display the contents should be available to the consumer any time during the shopping.

As described above, when the button for the shopping basket is on the same page as the item catalog, the entire length of the page changes depending on the amount of item data described on the catalog, the page may not be accommodated on the display screen. In such a case, it is necessary for the consumer to scroll the page to press the button to display the button for the shopping basket in order to display the button. The same is true when the button is located at the top end of the page, and when the item of interest is at a lower portion of the page, the screen must be scrolled upward in order to take the item into the shopping basket after the confirmation. The state in which the necessary function is not displayed without scrolling not only imposes a burden to the operation of scroll, and when the consumer first uses the system, the operation to be conducted next is hard to understand and cause anxiety to the user. On the other hand, in the method of always displaying the button in a specified area by dividing the screen, the above problem is solved.

Further, as a feature of an application on the Internet such as the World Wide Web, high freedom of both information provider and user is pointed out. For example, the user cannot previously limit the length of one page of the contents prepared by the information provider. The environment of the user such as a resolution of the display, a type of browser software used and the setting of font varies from user to user and the information provider cannot know it. As a result, however the information provider devises the amount of information and the layout described on the page to accommodate it in the screen, the intended effect is not always achieved depending on the environment of the user. In the method of placing the button for the shopping basket on the same page as the catalog, some degree of scrolling is unavoidable. On the other hand, the method of dividing the screen and sharing the roles by the respective sub-areas restricts the method for preparing the contents. It may be good that the user interface is uniform in one online shop but when it is applied across a plurality of online shops of various items and scales, free design cannot be conducted. This forces to the user a specific environment such as to watch the window of the browser at a specified size and hence it does not conform to the Internet.

In accordance with the present invention, an interface for providing the shopping basket function is provided as a separate shopping basket window from a catalog window on which online shop item data is displayed. The shopping basket window is displayed on the catalog window and a display position is moved in linkage with the movement of a mouse pointer. The shopping basket includes a list of items to be purchased which is a main body of the shopping basket, a function to add the item data to the list, and a function to change the item data registered in the list. In one embodiment of the present invention, the shopping basket main body is not always displayed. Instead, an interface function to display the shopping basket contents on the screen is provided on the shopping basket window.

Compare Products and Services

Compares your products and services to competitors

Highlights advantages in across your products and services

One embodiment of the present invention provides for comparison shopping by utilizing the customer's profile to prioritize the features of a group of similar, competing products, as shown in operation 5404 of FIG. 54. The competing products may or may not have been manufactured by competing business entities.

Figure 56:
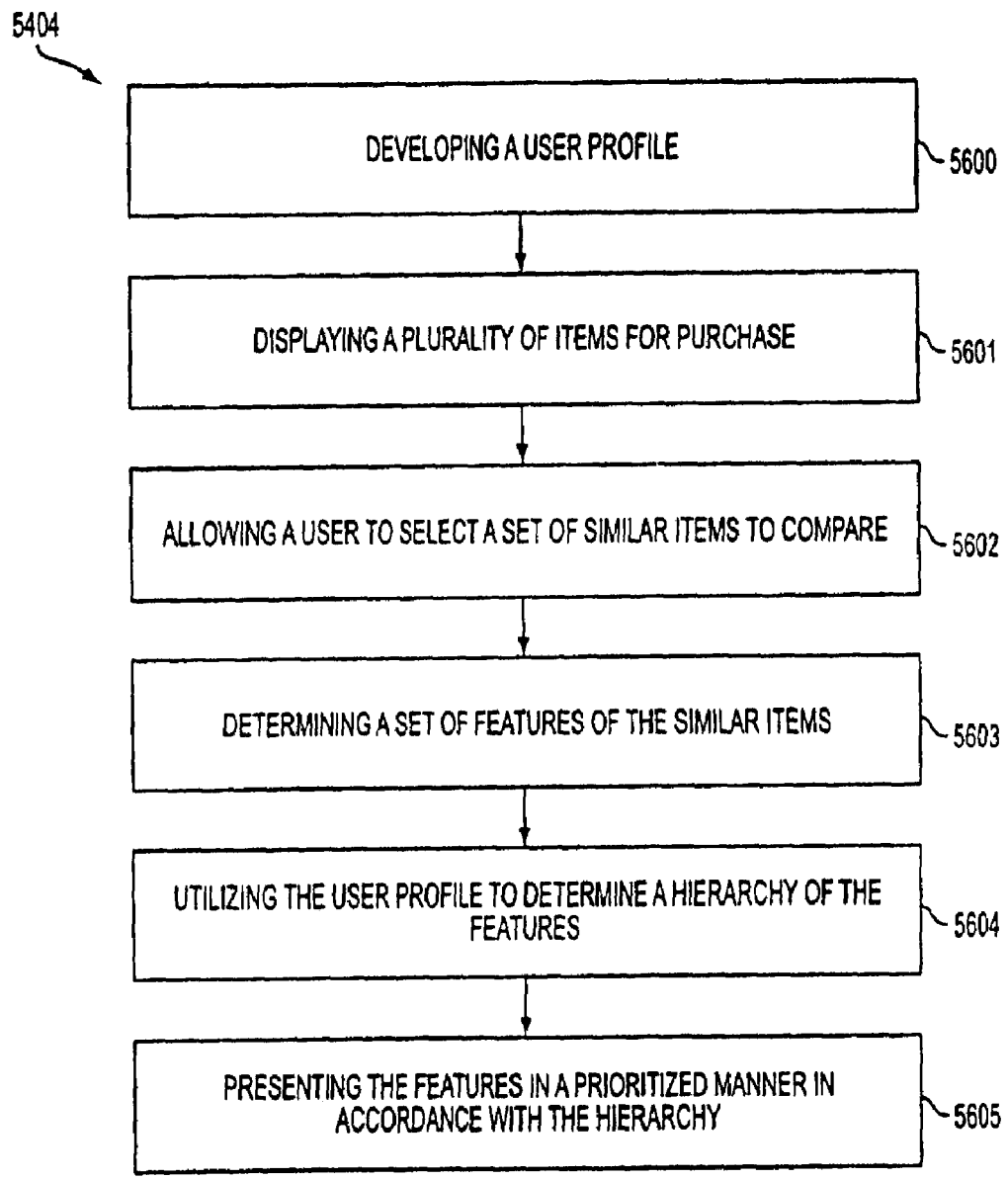
FIG. 56 is an illustration of one embodiment of the present invention for facilitating a virtual shopping transaction by comparing different products and services.
Figure 57:
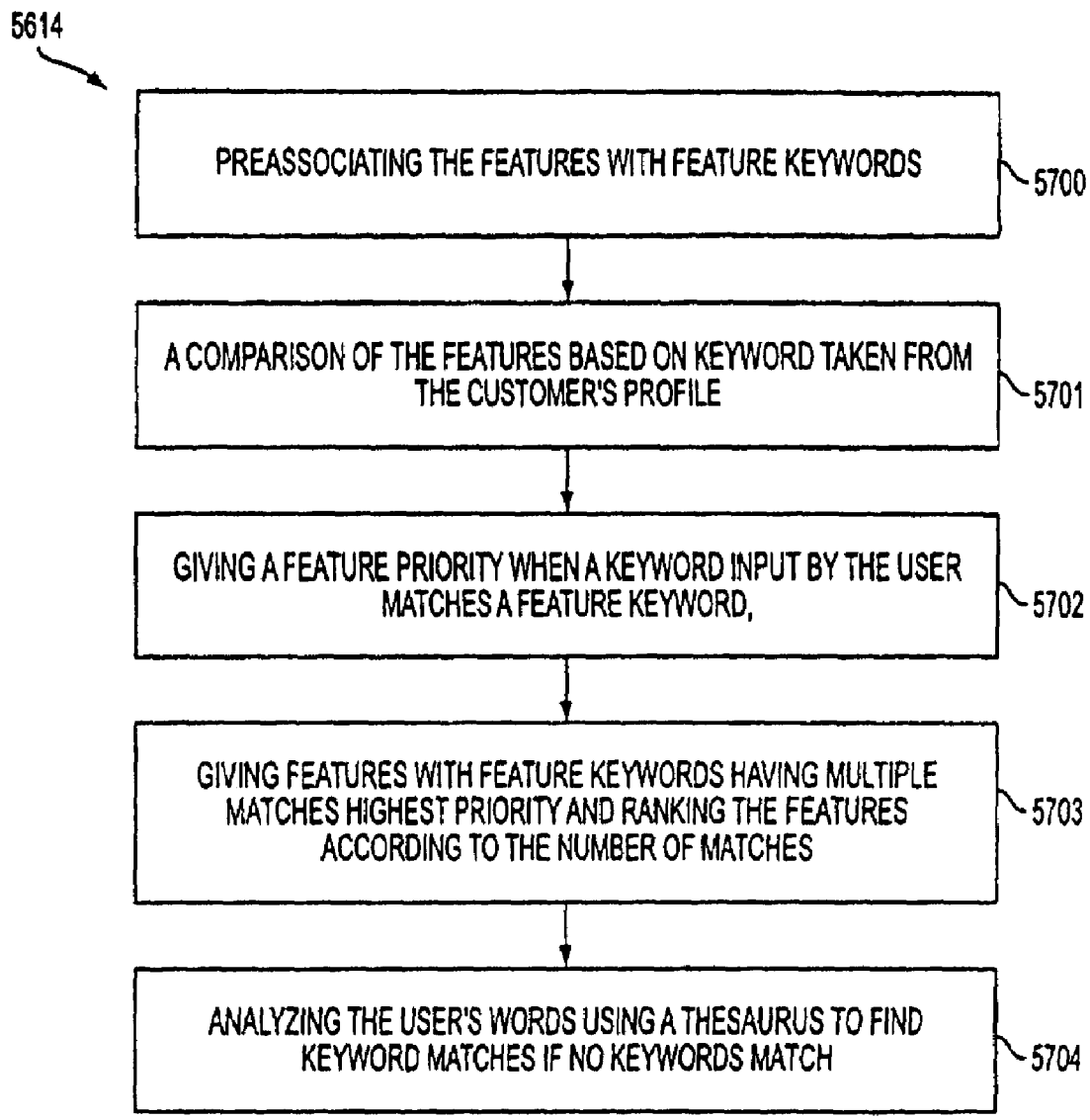
FIG. 57 is an illustration of one embodiment of the present invention for creating a hierarchy of the features of the items selected in accordance with the customer's profile.

More detail is provided in FIG. 56. First, in operation 5600, a customer's profile is developed. This profile may be developed from many sources including customer input, customer buying habits, customer income level, customer searching habits, customer profession, customer education level, customer's purpose of the pending sale, customer's shopping habits, etc. Such information may be input directly by the user, captured as a user uses the network, and may be downloaded periodically from a user's system. Next, in operation 5601, a plurality of items for purchase are displayed, from which the customer is allowed to select multiple, similar items, i.e. products or services to compare in operation 5602. Then, after a set of features of each item is determined in operation 5603, operation 5604 creates a hierarchy of the features of the items selected in accordance with the customer's profile. For example, as shown in FIG. 57, a comparison of features based on keywords taken from the customer's profile may be performed in operation 5701. The features would be preassociated with feature keywords in operation 5700. When a keyword input by the user matches a feature keyword, the feature is given priority in operation 5702. Features with feature keywords having multiple matches are given highest priority and ranked according to the number of matches in operation 5703. If no keywords match, the user's words could be analyzed using a thesaurus to find keyword matches, but these would be given lower priority in operation 5704. Then, in operation 5605 of FIG. 56, a comparison table is presented with the features organized in a prioritized manner in accordance with the hierarchy. A particular item may be chosen, and similar competing items would be compared to it. For example, the prices of a service may be compared to the prices of other similar services. The advantages of selected items could also be highlighted against similar competing and noncompeting items.

Needs Assessment/Buyer Assistant

Interacts with users to understand their needs

Provides solutions based on user needs (capacity, performance, cost)

Saves solutions to be retrieved at later point

Adds solutions to shopping cart

Provides online ROI tool to guide selection process

Provides web call-through for further user support

Figure 58:
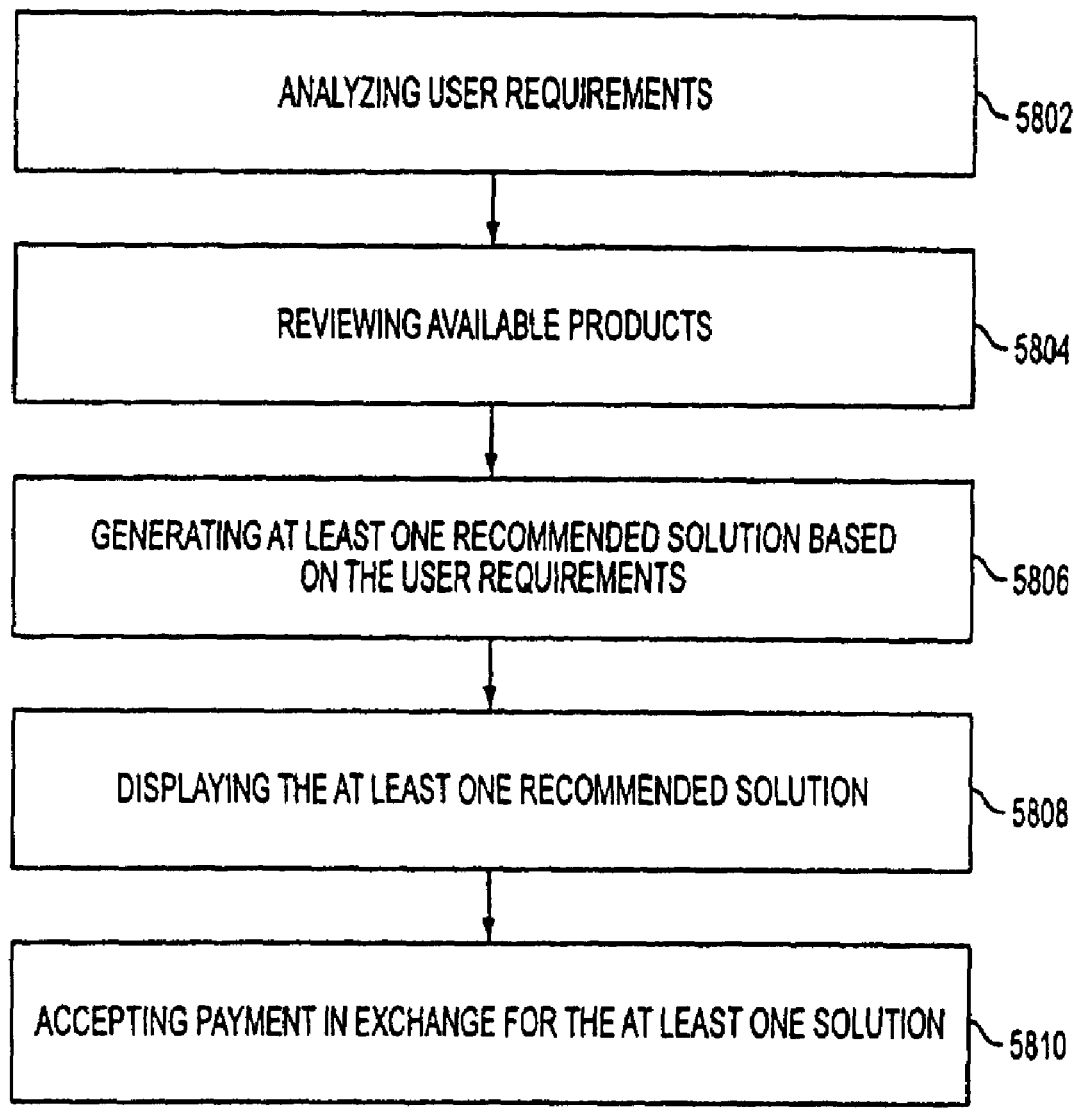
FIG. 58 is an illustration of one embodiment of the present invention for facilitating a virtual shopping transaction by ascertaining needs of a user.
Figure 59:
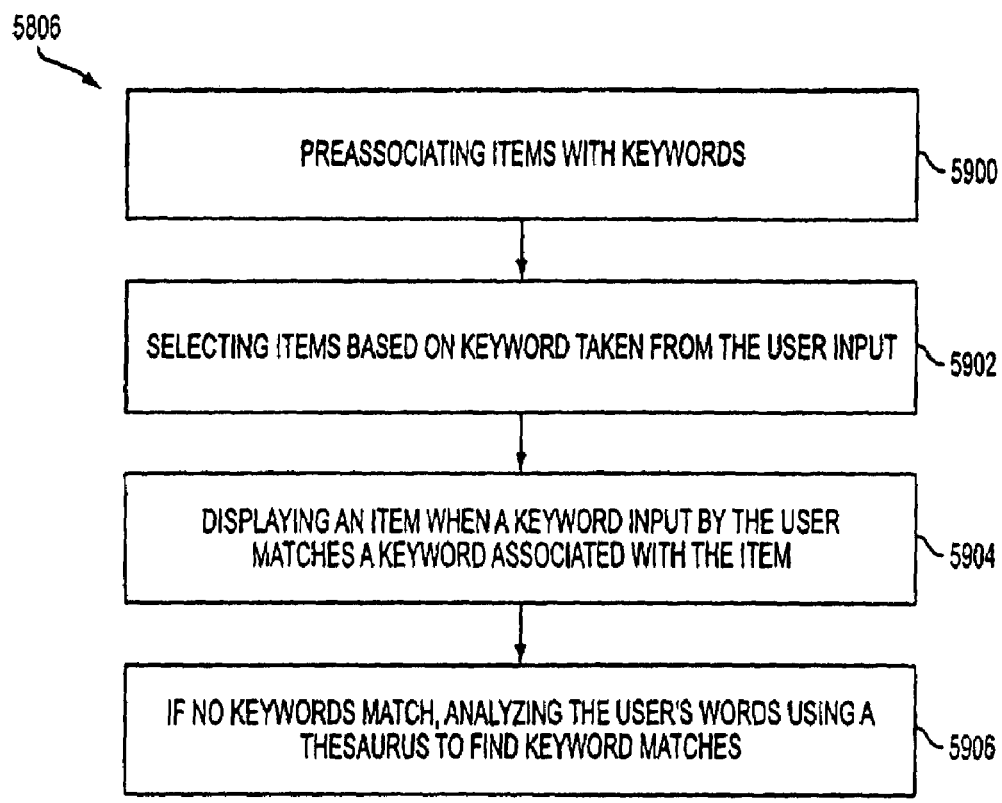
FIG. 59 is an illustration of one embodiment of the present invention for facilitating a virtual shopping transaction by generating a solution based on the requirements of the user.

With reference now to operation 5406 of FIG. 54, another embodiment of the electronic commerce component of the present invention is provided for facilitating a virtual shopping transaction by ascertaining needs of a user. A more detailed description is shown in FIG. 58. First, needs and requirements of a user are input by the user. Then the needs and requirements are analyzed in operation 5802. Available products are reviewed in FIG. 5804 and placed on a list from which one or more items will be selected based on the user input. Next, in operation 5806, a solution is generated based on the requirements of the user after which the solution is displayed, as indicated in operation 5808. FIG. 59 provides an example of operation 5806. The items would be preassociated with keywords in operation 5900. In operation 5902, selection of items based on keyword taken from the user input may be performed. When a keyword input by the user matches a keyword associated with an item, the item is displayed in operation 5904. If no keywords match, the user's words could be analyzed using a thesaurus to find keyword matches in operation 5906. A payment is then accepted in exchange for the solution in operation 5810 of FIG. 58, as will be discussed in more detail below. It should be noted that in the present description, the solution includes either a product or a service, or both.

As an option, the solution may be stored for allowing the purchase of the solution at a later time. Further, the solution may be grouped with a plurality of items selected for being purchased together. In the foregoing description, the needs of the user may refer to parameters including either capacity, performance, or cost. It should be noted that the needs of the user are assessed by receiving input from the user.

Product Configurator

Lists all the options related to a product or service

Allows users to piece together a single product/service or set of products/services Validates integrity of configurations and calculates prices/availability Only shows available options Adds configurations to shopping cart Saves configurations to be retrieved at later point Incorporates 3rd party products (partner products)

Figure 60:
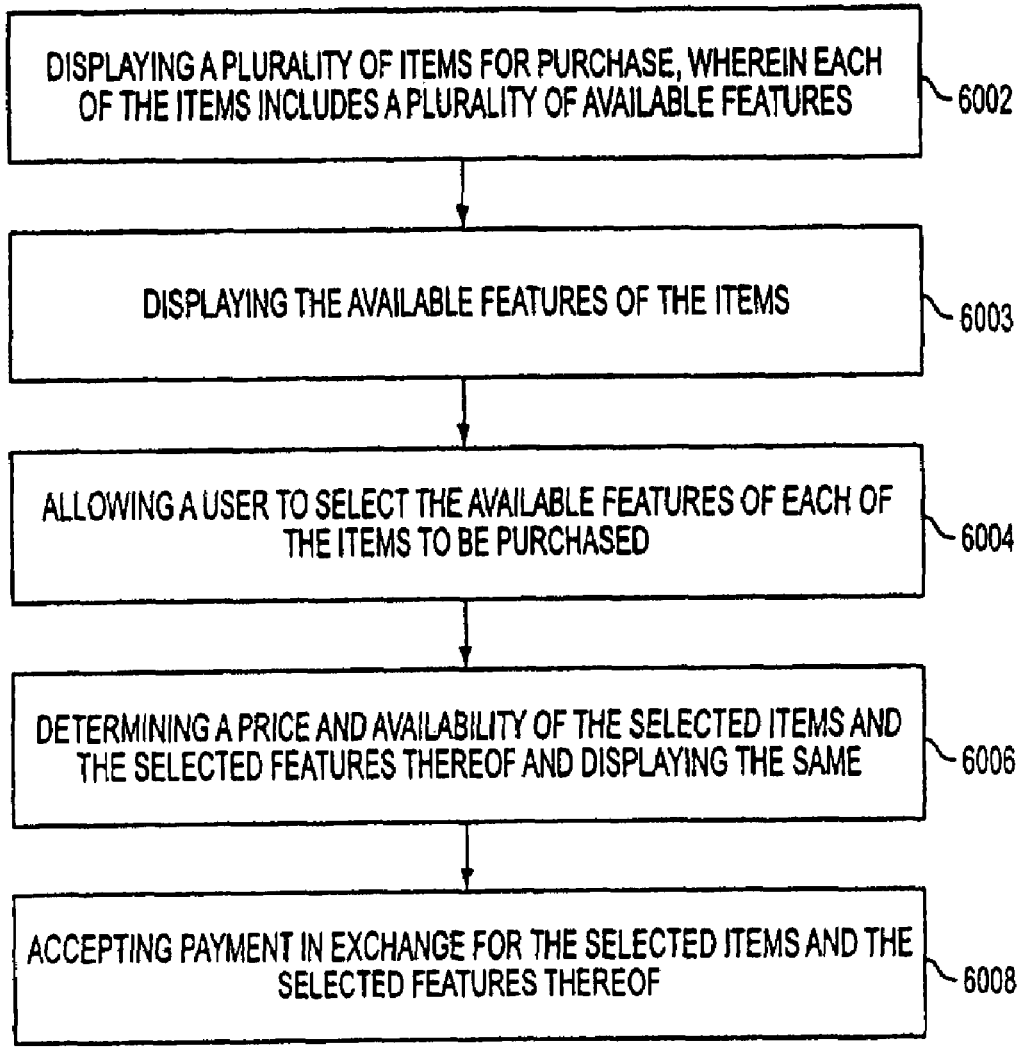
FIG. 60 is an illustration of one embodiment of the present invention for allowing a user to customize an item for purchase in a virtual shopping environment.

In still yet another embodiment, a method, system, and article of manufacture is provided for allowing a user to customize an item for purchase in a virtual shopping environment, as shown in FIG. 54, operation 5408. FIG. 60 provides more detail. Referring to FIG. 60, a plurality of items for purchase are first displayed in operation 6002, as discussed above. Each of the items includes a plurality of available features which are displayed in operation 6003, preferably with the price of each feature, including cost for adding the feature and cost savings for removing the feature. Next, a user is permitted to select the available features of each of the items to be purchased, as indicated in operation 6004. For example, a user may indicate which features of the item the user wants to be included with the item and which items the user wishes absent or removed. If the item is a product, an illustration or picture of the product with only the selected features should be made available so that the user can see the product in various configurations. As an option, a total price and availability may be determined with respect to the selected items and the selected features thereof for display purposes in operation 6006. Further, in operation 6008, payment is accepted in exchange for the selected items and the selected features thereof. It should be noted that in the foregoing description, the items each include either a product or a service or both, and may also include third party products and services.

While the available features which are displayed, the features of the items that are unavailable are hidden. Further, the selected features are stored for allowing the user to collectively select the selected features at a later time without having to select each of the features individually.

The present invention provides a system and method for conducting commerce via an electronic means, such as a computer network, cable television network, or direct dial modem. Previous attempts to provide electronic commerce subsystems have been custom tailored to an individual commerce offering, and have not been adaptable to be able to provide a versatile system capable of supporting a wide range of providers of goods and services.

To meet this need, several companies have developed computer architectures for online electronic catalog sales using, for example, the Internet as a transport mechanism to transmit data representing purchase requests between a proprietary browser and server product pair.

For example, Netscape Communications uses its Navigator/Netsite World Wide Web (WWW) browser/server pair. A buyer uses a Navigator to select a seller's Netsite server (sort of an electronic storefront), which is in turn coupled to standard application servers (back-end subsystems), e.g., a credit server or a member server for collecting demographic information on customers. These servers contain the business rules defined by the seller, e.g., what credit cards are accepted and what customer information is tracked during each sale. Some of these servers are connected to external, third-party services, e.g., the credit server to an external credit card processing network or the member server to an external demographics processing module. The actual applications e.g., on-line publishing or catalog sales, are represented as extensions of the application servers. Equivalently, the application servers are said to be instantiated in the applications. The net result of this approach is that the business rules (from the application servers) are embedded into the applications along with the application logic or presentation.

Another company, Open Market, is developing a similar electronic catalog system consisting of a HyperText Markup Language (HTML) authoring tool (called Storebuilder), and a server (called WebServer) connected to an integrated back-end commerce system (called TransactionLink). This system appears to share similar characteristics and disadvantages as the Netscape system.

Any of the foregoing types of browsers may employed to access various databases via the Internet in order to conduct electronic commerce-related business. Typical database or file-based shopping cart systems require that the user be uniquely identified in order to associate particular data stored on the server with a particular user. This requires the user to log-in or create an account, which is then stored in the server. Each subsequent request from the user must reference the unique identifier, either in the uniform resource locator (URL) or as hidden data passed back through a form submission. Either of these approaches require that the account or ID information of the user be stored on the remote server in the network for some definite period of time. Usually, the user must keep track of the account identifier in order that the prior session information can be retrieved.

It is desirable, to the extent possible, existing terminal hardware appropriately adapted and modified to incorporate the principles of the present invention. Hardware suitable for this purpose is sold by NCR. This equipment, a self-service terminal system identified as model NCR 5682, incorporates the data gathering and transaction processing capabilities of conventional automated teller machines with video, graphics, audio and printer operations. Interactivity with the customer is governed by a software system through the use, for example, of a keyboard or an infrared touch screen using prompts. Transactions may be completed through the use of a credit card reader and a PIN number entering means.

In one example of a related system, insurance agents at remote office on-line terminals communicate with a central processor which includes a data bank, storing data as to risks to be insured, client information, insurance premium information and predetermined text data for incorporation into insurance contracts. An agent at a terminal keys in information regarding a risk and other data needed to write insurance for that risk. To assist him, a "form" is displayed on his terminal by the central processor, and he merely enters the pertinent information in the blanks provided. The information is correlated in the central processor, from which a premium quotation is transmitted back and displayed at the agent's terminal and in which a client data base is established with the information from the form. Errors or omissions are detected and the agent or client is notified. If the policy is to be written, a formal contract is printed under the control of the central processor and electronically stored and displayed to underwriter personnel. Concurrently the insurance contract is mailed to the client. The underwriter can decide to cancel or alter the contract. Alternatively, the underwriting function is carried out before the contract is printed and mailed. In this system, the terminals operate on-line, underwriting is performed by a human underwriter, and the insurance contract is printed remotely from the client and mailed to him. The on-line terminals are not automatic self-service vending machines; the client must deal with the company through agents.

In another example of a related system, a terminal includes a CPU and is coupled to a memory unit which has data bases storing information. Certain elements are assigned weights. The system is used by underwriters to assist them in performing their underwriting functions.

Still yet another system is adapted for automatically dispensing information, goods and services to a customer on a self-service basis including a central data processing center in which information on services offered is stored. Self-service information sales terminals are remotely linked on-line to the central data processing center and are programmed to gather information from prospective customers on goods and services desired, to transmit to customers information on the desired goods or services from the central data processing center, to take orders for goods or services from customers and transmit them for processing to the central data processing center, to accept payment, and to deliver goods or services in the form of documents to the customer when orders are completed. The central data processing center is also remotely linked to institutions, such as insurance companies, serviced by the system to keep the institution updated on completed sales of services offered by that institution. As noted, the terminals in this system are on-line with the central data processing center.

Another system is provided using self-service terminals for dispensing voice and video information, printed documents, and goods and for accepting orders and payments therefor for travel related services by currency or credit card. The self-service terminals include a processor, printer, dispenser, data sources including a mass storage unit, a card reader, a coin box, and a communication device for communicating with a remote service center. The mass storage unit stores transitory information, such as flight schedules, ticket prices, weather information and other information useful in the planning of a business trip or vacation which is periodically updated via a communication link with the remote control center. The self-service terminal normally operates off-line.

Payment for items purchased over the Internet is also a concern. Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House ("ACH") where a user can enter a pre-authorized code and download information with billing occurring later, and a Point Of Sale (POS) system where a transaction is processed by connecting with a central computer for authorization the transaction granted or denied immediately are examples of EFT systems that are utilized by retail and commercial organizations.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems.

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

Such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Terisa Systems, Shen, Kerberos, Photuris, Pretty Good Privacy ("PGP") which meets the IPSEC criteria. One of ordinary skill in the art readily comprehends that any of the general-purpose secure communication protocols can be substituted for the SSL transmission protocol without undue experimentation.

Banks desire an Internet payment solution that emulates existing Point of Sale (POS) applications that are currently installed on their host computers, and require minimal changes to their host systems. This is a critical requirement since any downtime for a banks host computer system represents an enormous expense. Currently, VeriFone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, a plethora of report generation mechanisms and formats are utilized by merchants that banking organizations work with.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol, and by providing other value-added services that a merchant may not be able to obtain at another bank.

Internet-based payment solutions require additional security measures that are not found in conventional POS terminals. This additional requirement is necessitated because Internet communication is done over publicly-accessible, unsecured communication line in stark contrast to the private, secure, dedicated phone or leased line service utilized between a traditional merchant and an acquiring bank. Thus, it is critical that any solution utilizing the Internet for a communication backbone, employ some form of cryptography.

As discussed above, the current state-of-the-art in Internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

With the increasing popularity of computer communications, many companies are becoming interested in advertising and supporting their products using an online computer service that can be accessed by customers. However, creating a large online computer service is an extensive task. To develop a sophisticated online service, such as America Online™, CompuServe™, Genie™, or Prodigy™, a company must have a large mainframe computer and customized software. Developing the customized software requires a competent programming staff and a good deal of time. Most companies do not have the resources required to develop such systems, and thus cannot easily develop and maintain an online presence.

One way a company can contact millions of potential customers is to use the global Internet. The global Internet is a network of computer networks that links together millions of computer systems using the well defined TCP/IP protocol.

A new method of distributing and viewing information known as the World-Wide Web has recently become very popular on the global Internet. The World-Wide Web is a collection of servers connected to the Internet that provide multi-media information to users that request the information. The users access the information using client programs called "browsers" to display the multi-media information.

World-Wide Web servers store multi-media information in a document format known as HyperText Markup Language (HTML). The World-Wide Web servers distribute the HTML formatted documents using a specific communication protocol known as the HyperText Transfer Protocol (HTTP).

To access the multi-media information available on World-Wide Web servers, a user runs a client browser program that accesses the HTML formatted documents stored on the HTTP servers connected to the global Internet. The client browser program retrieves the formatted information and provides the information in an appropriate manner to the user. For example, the client browser program displays graphical image information as images on the user's graphical display screen; plays video information as video animation on the user's graphical display screen; displays text information as text on the user's screen; and plays sound samples using the speakers on the user's computer system. "Mosaic", one popular client browser program, is widely available to the users of the global Internet.

For a company that wishes to develop an online presence, creating a World-Wide Web Server would provide a feature rich online service available to customers and clients. A World-Wide Web Server can store images, text, animation, and sounds that provide information about the company. Furthermore, World-Wide Web Servers can be implemented on relatively simple computer systems, including personal computers.

Most World-Wide Web Servers are coupled to the global Internet. By deploying a World-Wide Web Server on the global Internet a company would create online service that is accessible to the millions of global Internet users.

Alternatively, a company can deploy a HTTP server that is available to customers through dial-up phone service. A dial-up HTTP server would be accessible to customers and clients that do not have Internet access. Thus, by creating a simple HTTP server, any organization or corporation can create an online presence.

However, quickly creating the HTML formatted documents required for a World-Wide Web Server is not a trivial task. Moreover, the standard HTTP server software, without any additional programming, is very limited. For example, without custom extensions, an HTTP server cannot accommodate complex transactions between a user and the HTTP server or integrate a database system into an online service. Although it is possible to write custom extensions to the HTTP server software using a conventional programming language, such custom extensions are difficult to write except by experienced programmers. Thus, to be able to quickly deploy full-featured HTTP servers, it would be desirable to have a development tool usable by non-programmers that allows a developer to quickly and easily create a full-featured online service based upon the HTTP and HTML standards.

Many programming development tools are known in the art. These programming development tools range from tools which are developed and marketed as general purpose programming development tools to sophisticated special purpose development tools for developing specific types of applications.

For example, the Information Exchange Facility (IEF) general development tool, which is available from Texas Instruments, is used by professional programmers to develop application programs. Essentially, IEF provides a facility that allows a programmer to write "pseudo code" and IEF generates an intermediate source code program in a high level programming language (such as COBOL or C code) based on the "pseudo code". IEF is an example of what will be referred to herein as a "general purpose development tool" because it allows development of programs for essentially any purpose or application dependent on the input provided by the programmer.

In contrast to general purpose software development tools, many application programs themselves provide special purpose "development tool" capability. An example is the Paradox™ database program available from Borland International of Scotts Valley, Calif. The Paradox™ database allows end users to develop sophisticated database applications which would have been developed by professional programmers a few years ago. The Paradox™ database is but one example of a special purpose development tool.

Another example of a special purpose development tool is the Application Development Environment of Lotus Notes™ which is available from Lotus Development Corporation of Cambridge, Mass. The Application Development Environment of Lotus Notes provides features which are said to allow for rapid development of workgroup applications such as sharing of documents between users over a network. Generally, Lotus Notes and, thus, its Application Development Environment, is directed at sharing of documents among persons in an authorized work group.

The Lotus Notes Application Development Environment provides for such features as (i) application design templates which are said to allow sophisticated applications to be built by customizing pre-built applications such as document libraries, form-based approval systems, project tracking applications and status reporting systems; (ii) security; (iii) database access; and (iv) discussion groups.

The ability to perform commercial transactions that involve order entry systems would allow an online system to sell goods and services to computer users. It is now recognized that many functions such as traditional order entry systems and the like will someday be carried out over computer networks by allowing a customer to place orders for goods and services directly with an online service. By way of example, even today, food orders can be placed with restaurants over computer networks; videos can be reserved at the local video store; and banking transactions can be carried out simply by logging onto a computer network.

Four different types of commercial transactions might commonly occur in a commercial online service. First, a user may be charged for the right to access all or parts of a useful publicly accessible online system. Second, the online service may pay the user for performing some type of action such as winning a contest or completing a marketing survey. Third, an online service may charge a content provider for placing certain information on the online service. For example, a content provider can be charged for placing an advertisement on the online service. Finally, a content provider can be paid by the online service for providing information that users may wish to access, can be can be provided on a for-fee basis. Conversely, an online service provider may wish to pay third party content providers for placing useful material on the online service.

Thus, when creating a publicly accessible online system, it is desirable to include the ability to define fee structures for accessing parts of the online system and/or ordering other goods or services. However, creating a sophisticated commercial online service with such features usually requires specialized programming.

Advertisement and Promotion Capabilities

Provides cross-selling and up-selling based on on a product/service

Provides cross-selling and up-selling based on on a user

Provides advertisements or promotions based on a product/service

Provides advertisements or promotions based on a user

Figure 61:
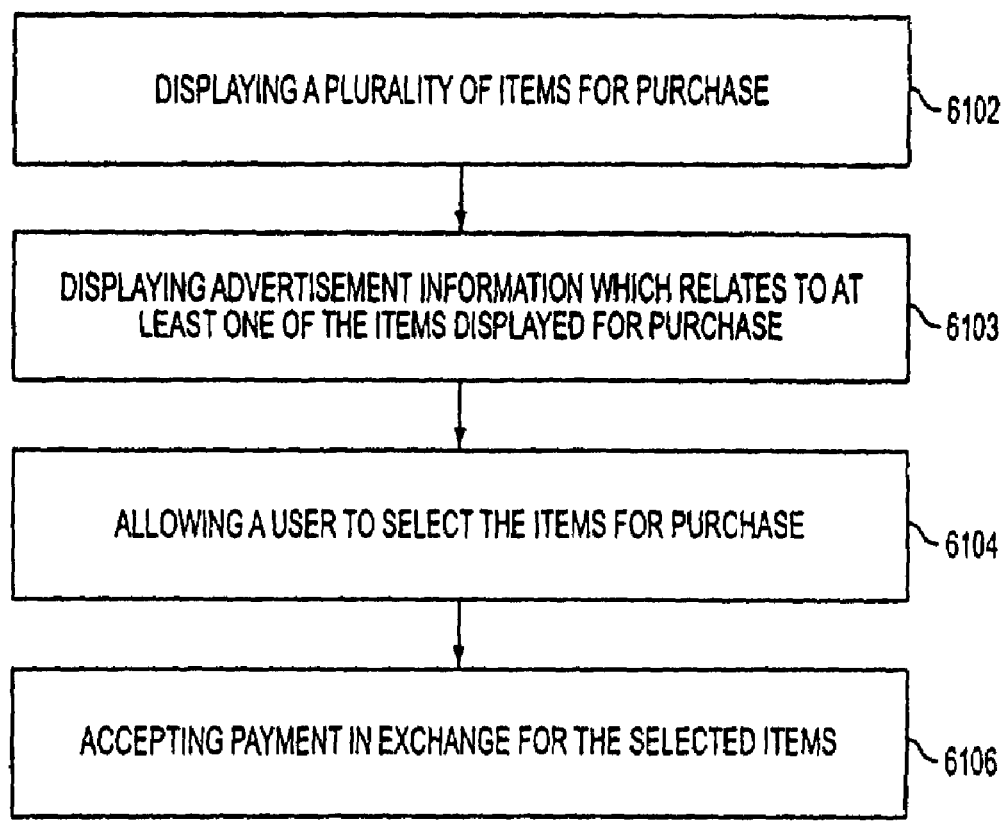
FIG. 61 is an illustration of one embodiment of the present invention for advertising in a virtual shopping environment.
Figure 62:
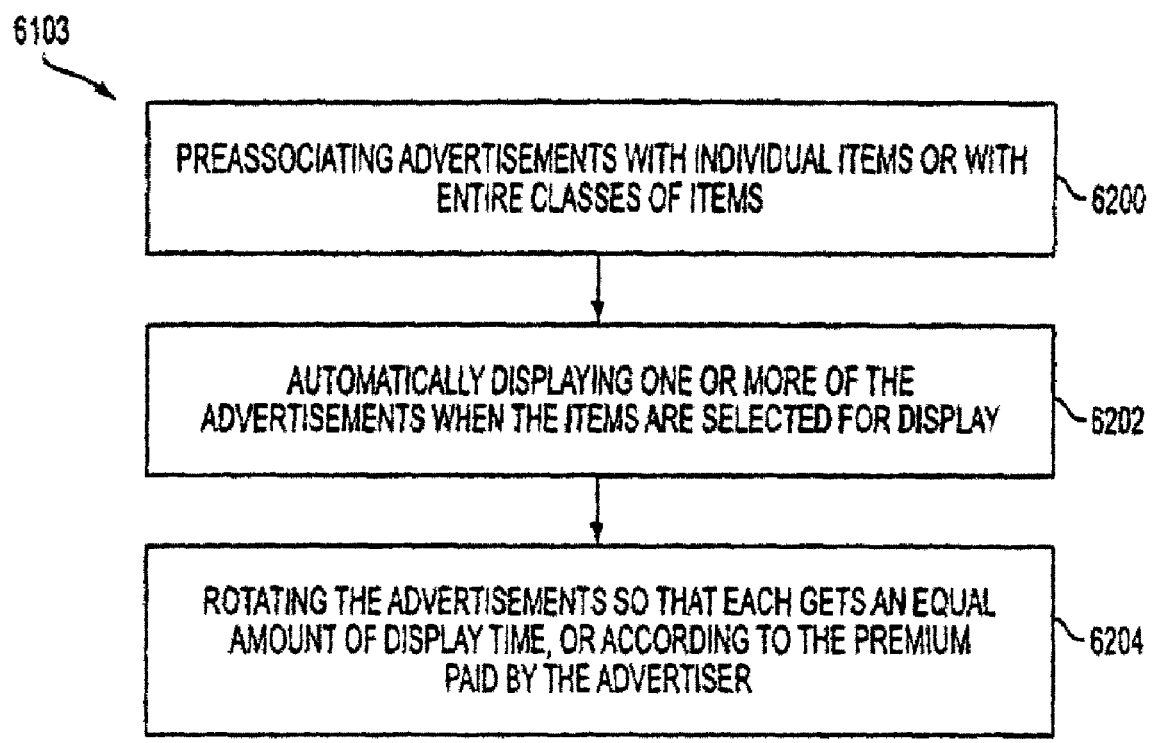
FIG. 62 is an illustration of one embodiment of the present invention for advertising in a virtual shopping environment.

Links all cross-selling, up-selling, advertisements, promotions to further detail or purchasing ability One embodiment of the electronic commerce component of the present invention is adapted for advertising in a virtual shopping environment in operation 5410 of FIG. 54. FIG. 61 illustrates the operation in more detail. In operation 6102, a plurality of items, i.e. products or services, are displayed for purchase. Along with the items being displayed for purchase, or on a subsequent page or pages, advertisement information which relates to at least one of the items displayed for purchase are displayed in operation 6103. FIG. 62 provides more detail of operation 6103. The advertisements are preferably preassociated with individual items or may be associated with an entire classes of items in operation 6200. When the items are selected for display, one or more of the advertisements is automatically displayed as well in operation 6202. In operation 6204, if there are many advertisements, the advertisements are rotated so that each gets an equal amount of display time, or according to the premium paid by the advertiser. A user is permitted to select the items for purchase, as indicated by operation 6104. Payment is then accepted in exchange for the selected items in operation 6105. While the virtual shopping environment is being used, advertisement information may be displayed which relates to at least one of the items for purchase and also relates to the user based on the profile of the user. This is particularly useful where the advertisements are being rotated. Then the advertiser would be billed based upon the number of times its advertisement was shown Note that the items each include at least one of a product and a service.

As an option, the advertisement information may further include promotion information or advertise another item separate from the item to which the advertisement information is related. As yet another option, the advertisement information is specifically tailored for the user based on a profile of the user. Further, cross-selling and up-selling based on a product or service, as well as of the user, may be provided. Ideally, all cross-selling, up-selling, advertisements, and promotions are linked to pages containing greater detail or to a purchasing area. The use of advertising revenues to pay for information dissemination is well established in domains such as television and radio in which end users are tuned to a continuous signal over a lengthy period of time. In such systems, due to the continuous nature of the signal being monitored by the end users, the end users are sufficiently similar to a "captive audience" that many or most end users remain tuned to the same signal even when the main program to which they are listening or viewing is interrupted by advertisements.

Another example of advertising mixed with information dissemination is the use of scrolled text at the bottom of a television of computer screen, where the main program occupies most of the end user's visual field and a smaller portion is occupied by advertisements and the like on a "scroll bar" or similar visual device along the periphery of the screen. In some contexts, such as cable television channels that display a "stock ticker tape," this relationship is reversed: the information portion of the screen occupies a small part of the screen, such as horizontally scrolling image region at the top or bottom of the display and the remainder of the screen is occupied by advertisements, "infomercials" and the like.

Yet another example of mixing advertisements with information dissemination are newspapers and magazines.

Most, and perhaps all such examples of mixing advertisements with information content are based on systems in which the end user has actively elected to view or listen to a program or to otherwise receive information. Furthermore, in virtually all such systems or media, the juxtaposition or placement of advertisements and information content is explicitly programmed or determined by human beings working as "editors" or in a similar content and/or presentation editing capacity.

Distributing information via the Internet or other publicly accessible computer communication networks has been largely unsupported by advertising revenues due to the lack of good mechanisms for mixing advertising and information content in such a way as to be acceptable to both end users and advertisers. There are, of course, some exceptions where advertising/content mixtures from other contexts, such as newspapers and television, have been simply replicated on the Internet. For instance, some newspapers have been "published" at least in part on the Internet, and include advertisements along with information content. In fact, some newspapers sell advertising space on an associated World Wide Web (WWW) site, which often includes extensive listings of certain types of advertisements such as real estate advertisements, personal advertisements, and so on. Similarly, the scroll bar type advertisement at the bottom of a computer screen is based on similar advertising techniques used in cable television and other television contexts.

There are also examples of computer programs which contain advertisements. In all such examples known to the inventors, the advertisements are either permanently embedded in the computer programs or reside permanently with computer programs such that they cannot be easily updated.

Quote of Price and Availability

Displays list price

Displays promotional pricing based on product

Displays promotional pricing based on user

Displays user specific pricing

Handles multiple currency

Provides general availability

Provides user specific availability

Saves quote to be retrieved and maintained at later point

Adapts pricing for geographic markets

Passes quotes to channel partners

Determines credit available and terms

Provides web call-through for non-standard pricing

Figure 63:
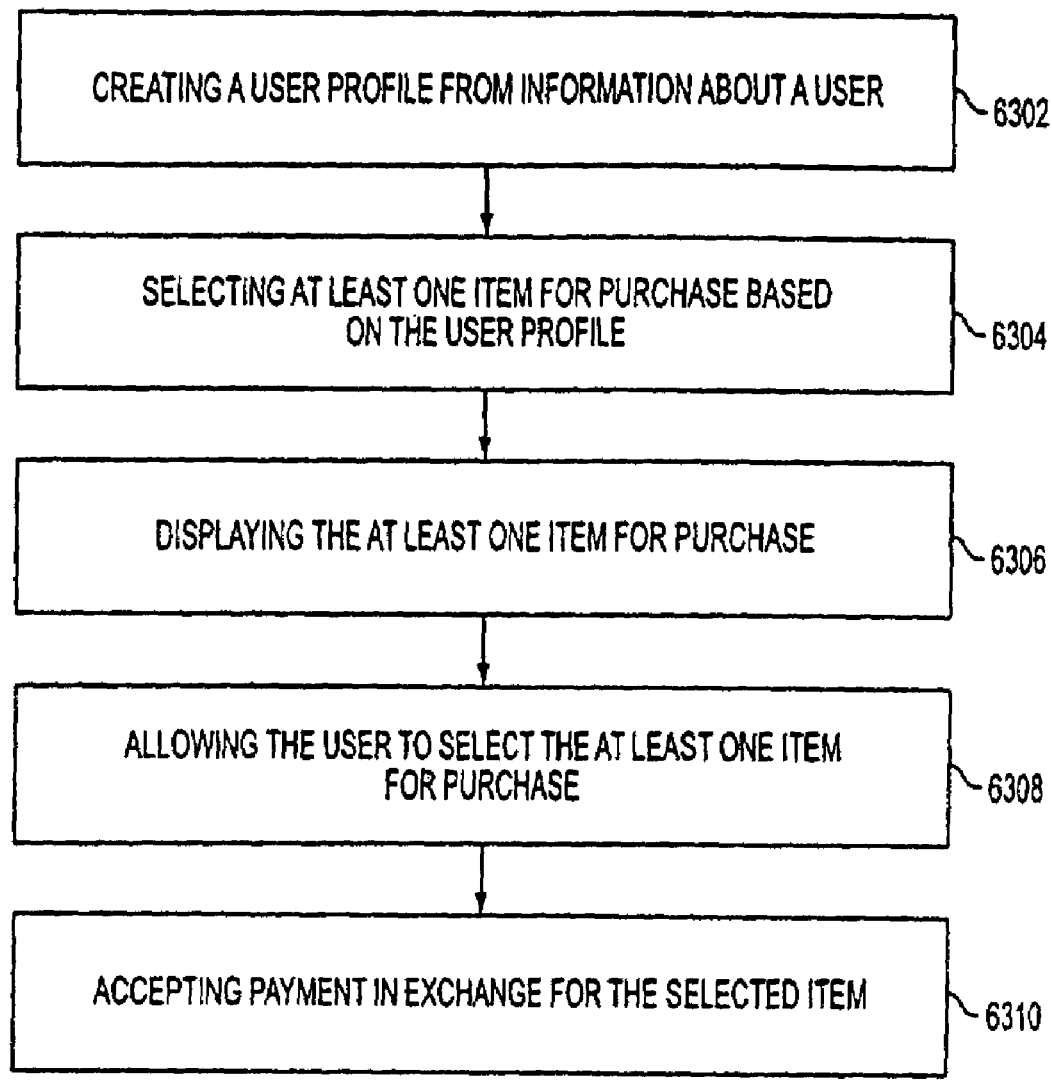
FIG. 63 is an illustration of yet another embodiment of the present invention.

Next provided is a method, system, and article of manufacture for selectively determining prices and availability of items, i.e. products or services, for purchase in a virtual shopping environment based on a user profile, as performed by operation 5412 of FIG. 54. FIG. 63 illustrates the operation in more detail. As shown in FIG. 63, in operation 6302, a user profile is created from input about a user. The user profile is preferably created in a manner that predicts buying tendencies. The virtual shopping environment is tailored automatically based on the user profile. A plurality of items (i.e., products or services) for purchase are displayed, as discussed above. One example would be selecting at least one item for purchase based on the profile of the user in operation 6304 and displaying those items before other items in operation 6306. For example, the items may be placed in groups, the groups being based on estimated buying tendencies. Then, items from the group most closely matching the user's buying tendency, as determined above, are displayed. Further, the user is allowed to select the items for purchase in operation 6308. Factors that are tailored include price and availability of the items. Payment is then accepted in exchange for the selected items in operation 6310, as discussed in more detail below.

The virtual shopping environment may be tailored by generating prices associated with the items based on the profile of the user. As an option, some or all of the prices may be promotional prices. The promotional prices may be offered based on the particular product or on the profile of the user. Further, available credit and the terms of receiving that credit may be produced based on the profile of the user.

The virtual shopping environment is further tailored by generating prices associated with the items based on a geographic location of the user, and may be designed to handle multiple types of currency. At least one of the prices that is generated may be stored and subsequently displayed during a subsequent use of the virtual shopping environment by the user. The virtual shopping environment may also be tailored by varying availability of the items based on the profile of the user.

The tremendous number of product types available to consumers at the retail level, e.g., in food and grocery, personal care, hardware and appliances, means that a retailer may have thousands of models or varieties of goods in inventory, each, of course, with a concomitant price. The result of this multitude of consumer products is that the control and consistency of pricing has assumed increasing importance, especially where retailing is highly competitive and price management is essential for a merchant to keep pace with competitors.

One area that has produced such a multitude of products and that has become a highly competitive selling environment is consumer appliances and electronics. Each type of product, e.g., a television set, is typically available from several different manufacturers, and each manufacturer typically produces several models of the same type product. The prices of products vary from manufacturer to manufacturer as well as within the same manufacturer's range of models, depending upon the particular specifications and features of each model within the product type. Moreover, each manufacturer sells its products through a large number of distributors and, ultimately, to retail stores, with the result that the pricing of the same product can differ from distributor to distributor, from retailer to retailer and from geographic market to geographic market. Even within a single merchant's inventory, price variations on an individual product occur, e.g., an advertised special versus the "regular" price.

To keep pace with competitors, a merchant may obtain pricing information by reviewing competitors' advertisements, printed or otherwise, by actual shopping of competitors and viewing of price tags in a competitor's store or outlet, or from a customer at the point of sale who claims that a certain product can be purchased from a competitor for a certain (i.e., lower) price. "Sale" prices are particularly problematic as such prices are typically only valid for a defined period, after which the "sale" price reverts to the "regular" price. If a merchant wishes to change prices in response to a competitor's price, usually special effort is required to change price tags at points of sale to meet or "beat" the competitor's price. The manual nature of the process does not permit prices to change frequently, such as once or twice per day. Such frequency is prohibitive, and thus, a merchant cannot respond daily to market price changes involving hundreds to thousands of products. Moreover, keeping track of the valid period for "sale" prices adds yet another layer of complexity. Further, if a competitor's pricing becomes known at the point of sale, the salesperson must determine if he or she is willing to sell the product for a lower or the same price, (i.e., in accordance with the merchant's pricing policy).

Various pricing systems are known, although virtually none implement complex pricing policies. Many systems, especially in the stock brokerage area, will provide market pricing of stocks. While these systems can accommodate a continually changing price situation, the actual pricing, of course, is independent of the system, i.e., pricing is controlled by the stock market.

The current wide-ranging use of computer systems provides a relatively large potential market to providers of electronic content or information. These providers may include, for example, advertisers and other information publishers such as newspaper and magazine publishers. A cost, however is involved with providing electronic information to individual consumers. For example, hardware and maintenance costs are involved in establishing and maintaining information servers and networks. In addition, labor costs are involved in keeping the information in the servers current.

One source which can be accessed to provide the monetary resources necessary to establish and maintain such an electronic information network is the individual end users which consume the electronic information. This electronic information, however, has different value to different users. For example, some users will be very accepting of advertising as part of the electronic information, whereas others will be opposed to receiving advertisements. Thus, it would be beneficial to provide a system which allows individual users to control the amount of electronic advertising they receive with their electronic content.

In addition, providers of electronic advertisements would be able to subsidize the cost of electronic content for end users. The amount of this subsidy would be dependent on the amount of electronic advertising which is consumed by the end users and the perceived quality of these consumers. Thus, it would be beneficial to provide a system which allows the providers of electronic advertisements to provide advertising-based subsidization of electronic content consumption, based upon the perceived quality of consumers who have specifically chosen to consume these advertisements, cognizant of the fact that consuming these advertisements will subsidize their electronic content consumption fees.

Order Placement

Collects user information for order processing (shipping, billing)

Recaps order for confirmation (shipping, price, availability)

Allows for order maintenance (qty, product, shipping)

Referring to operation 5414 of FIG. 54, another embodiment of the electronic commerce component of the present invention receives an order for at least one of the products and services. User information is collected for order processing, including an address for delivery and billing. In the alternative, a user may enter an alphanumeric code representative of a source of currency, such as a credit card number or bank account number. Optionally, the user may be allowed to select a shipping provider other than a default provider. The availability of the desired product is confirmed, as are the price and shipping arrangements. As an option, the invention may require the user to confirm that the desired product or service has been ordered, that the price is satisfactory, and that the desired shipping provider is selected.

Tax and Shipping Calculations

Provides tax cost on associated order

Provides shipping cost on associated order

Handles multiple tax laws within US

Handles multiple tax implication globally

As shown in FIG. 54, operation 5416 calculates at least one of a tax and a shipping fee for at least one of the items, i.e., products and services, for which the order is received. The tax cost for each order is calculated, and may include a listing of the tax per item. The shipping costs for each item or order may also be calculated, such as by taking into account handling costs, the total weight of the items, the distance to final destination of the items, and the corresponding charges of the shipping provider. An estimate of the delivery date may also be given. It should be noted that mileage and the like could be calculated where services are to be rendered at a location remote to the provider.

Optionally, mathematical formulas based on multiple applicable tax laws may be used in the calculation of the tax. Such applicable tax laws may include only domestic taxes for domestic delivery, and may include applicable foreign tax laws for imported and exported items.

Transaction Processing Capabilities

Processes credit card transactions

Processes purchase order transactions on backend systems

Places actual order with fulfillment house for physical shipping

Sends electronic fulfillment to the user

Provides order confirmation and tracking number

Supports micropayment processing

Another embodiment of the invention processes transactions pertinent to the purchase of items. For example, credit card transactions are processed, as are purchase order transactions. A structured payment plan may also be created. The actual order is placed with a fulfillment house for physical shipping of a product, or the order is placed with a provider of an ordered service. Optionally, notification may be sent to the user to notify the user that the transaction is being completed or confirmation that the order has been completed. Also optionally, a tracking number may be sent to the user for assisting a user to determine the shipping status of a product.

Also envisioned is a quick-stop mass retail system which enables purchasers to order and purchase articles from a remote location for pickup at an article pickup area at an automated store.

In accordance with the above, the present invention may provide a quick-stop mass retail system for ordering and purchasing articles from a remote location for pickup at an article pickup area at an automated store, comprising: an interactive system for communicating a customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving; a system for retrieving identification information from the customer, the system for retrieving identification information communicating with the host computer, whereby the host computer enables the system for retrieving the article to provide the article to the article pickup area upon obtaining the identification information and comparing the identification with the customer's purchase order.

The quick-stop mass retail system may further include a system to enable a plurality of articles stored in a plurality of storage locations associated with the automated store to be retrieved, including a network of dispensing stations interconnected by at least one device for transporting the articles from the storage locations to the article pickup area. The quick-stop mass retail system may also have a system for detecting when inventory is to be restocked including, the system for detecting communicating with the host computer such that the host computer initiates a purchase of additional inventory in response to the low inventory detection, The quick-stop mass retail system may have the host computer track inventory of the articles to enable restocking of the respective storage locations when detecting inventory below a certain level.

In accordance with a specific embodiment of the invention, a quick-stop mass retail system for ordering and purchasing articles from a remote location for pickup at an article pickup area at an automated store includes an interactive system for communicating purchase information to the customer and communicating the customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving, wherein a plurality of articles are stored in a plurality of storage locations associated with the automated store and the system for retrieving the articles includes a network of dispensing stations interconnected by at least one apparatus for transporting the articles from the storage locations to the article pickup area; a system for retrieving identification information from an identification card or code associated with the customer, the system for retrieving identification information communicating with the host computer, wherein the storage locations include a system for detecting when inventory is to be restocked, the system for detecting communicating with the host computer such that the host computer initiates a purchase of additional inventory in response to the low inventory detection, whereby the host computer enables the system for retrieving the article to provide the article to the article pickup area upon obtaining the identification information and comparing the identification with the customer's purchase order.

The present invention also encompasses a method for ordering and purchasing articles from a remote location for pickup at an article pickup area at an automated store, including the following steps:

(a) communicating a customer's purchase order for at least one article via an interactive electronic network;

(b) receiving the customer's purchase order at a host computer in communication with the interactive electronic network;

(c) processing the customer's purchase order and storing the purchase order in a database;

(d) retrieving identification information from an identification card or code associated with the customer with a system for retrieving information communicating with the host computer; and (e) retrieving the article ordered by the customer from a storage location for the article at the automated store by a system for retrieving articles communicating with the host computer and delivering the article to the article pickup area.

The method can further comprise the step of the host computer detecting an inventory level threshold below which inventory of the article is to be restocked.

Electronic License Distribution and Management

Tracks user license entitlements

Creates an electronic license entry on backend systems

Sends electronic license to user

Figure 64:
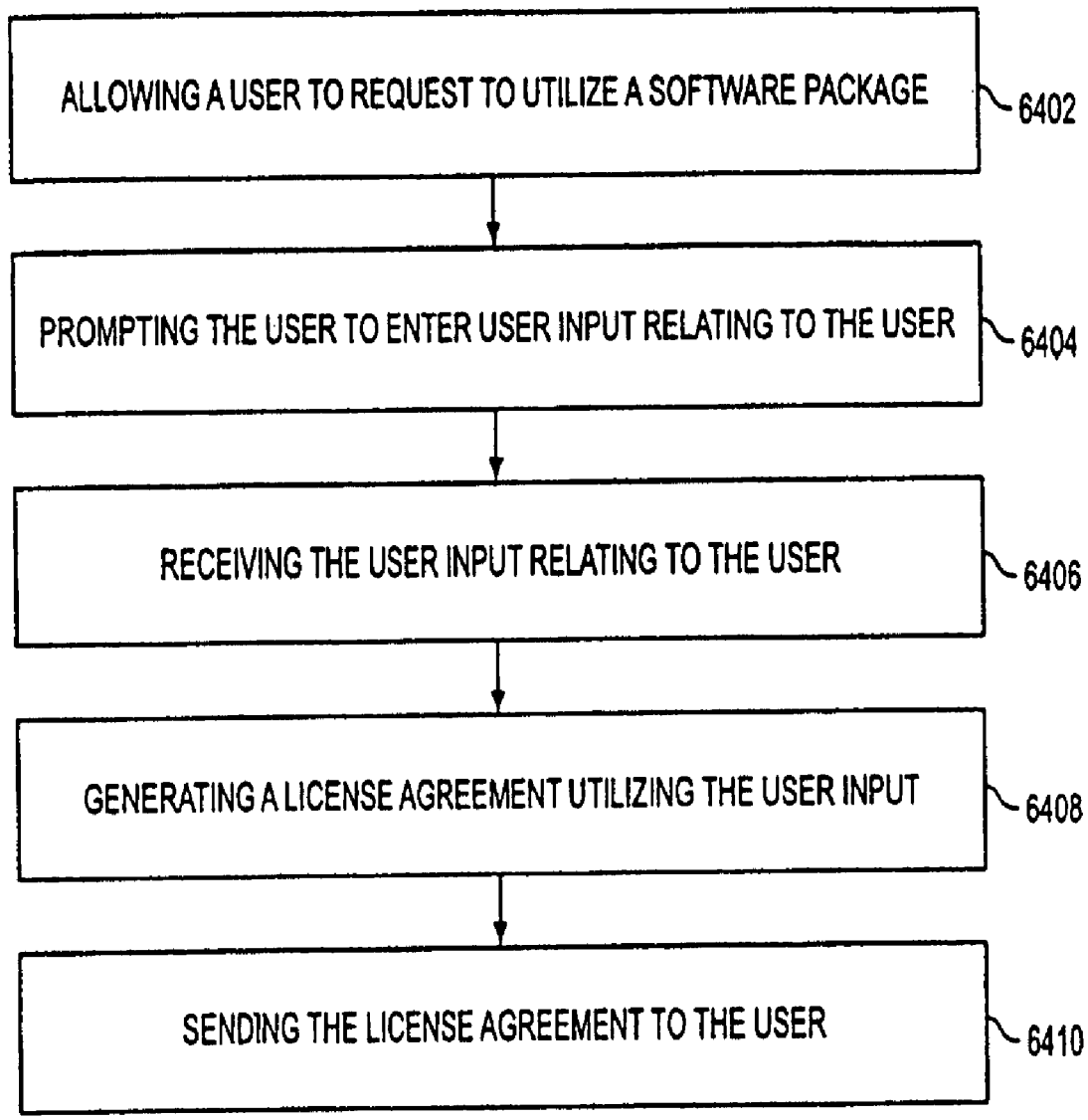
FIG. 64 is an illustration of one embodiment of the present invention for automatically generating a contract between an owner of software and a user of the software.
Figure 65:
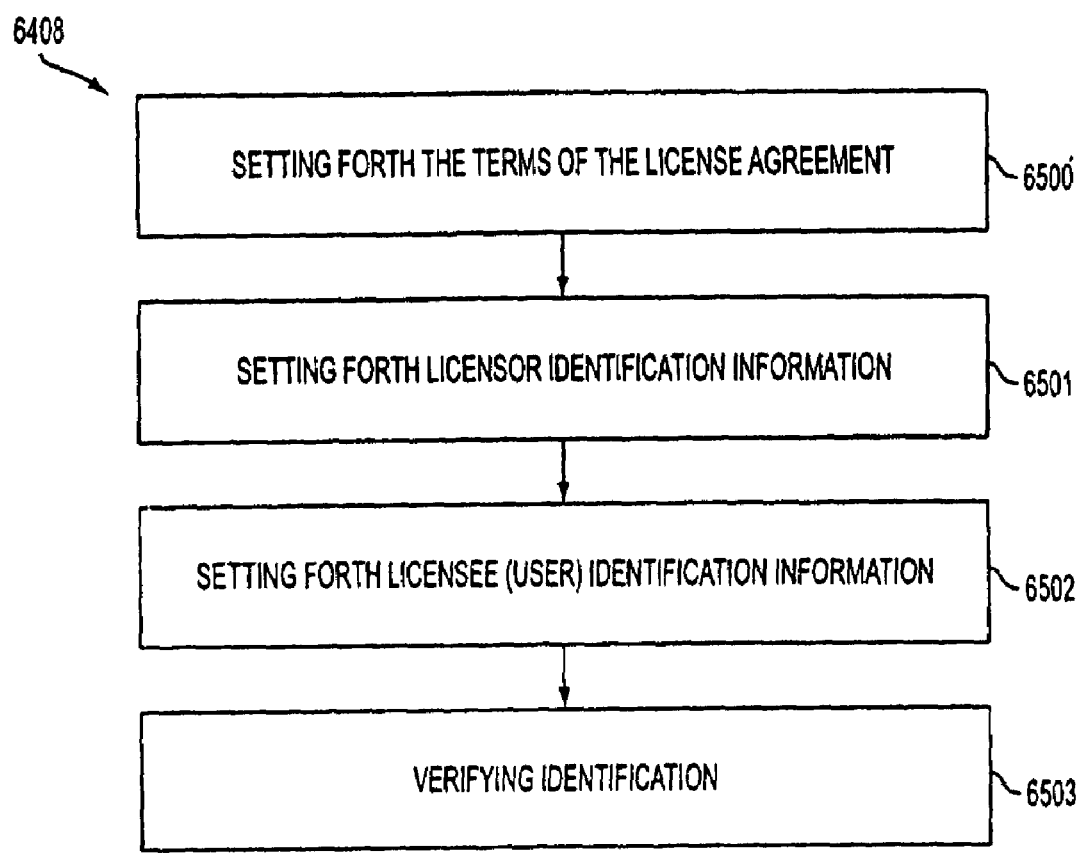
FIG. 65 is an illustration of one embodiment of the present invention for automatically generating a contract between an owner of software and a user of the software

As shown in FIG. 64, a method, system, and article of manufacture is provided for automatically generating a contract between an owner of software and a user of the software. First, in operation 6402, a user is allowed to request to utilize a software package after which user input relating to the user is requested and received. See operation 6404 and 6406, respectively. Such information may include identification information such as name, address, etc. In operation 6408, a tailored license agreement is then generated by utilizing the user input. FIG. 65 illustrates a procedure for performing operation 6408. In operation 6500, the terms of the license agreement are set forth. Licensor identification information is included in operation 6501. Licensee (user) identification information is set forth in operation 6502. Optionally, verification of identification may be performed in operation 6503, such as prompting a user to enter his or her telephone number and cross referencing the input number with telephone listings.

As an option, the license agreement may be sent to the user via electronic mail or the like in operation 6500. The present invention may further track entitlements of the user granted under the license agreement. The user may even be prevented from utilizing the software until the license agreement is generated.

Most software vendors currently favor licensing as the preferred method of distributing software. Licensing software provides the vendor with a certain amount of control over the distributed software which may be used to the vendor's advantage. For example, licensing software allows the vendor to prohibit unauthorized usage of the software that might facilitate unauthorized copying. In addition, licensing provides an advantageous method of providing and billing for software. Through licensing, the vendor may sell several identical copies of the same software and charge the buyer for each copy.

Licensing schemes have adapted to the network environment as well as the individual personal computer. In a network environment, such as a client-server network, multiple users may access the same copy of a particular application. Consequently, the vendor can charge the network owner not for the number of copies installed on the network, but for the number of users having access to the software.

Software is conventionally licensed using an agreement between the vendor and the user or administrator. The agreement is typically either a conventionally signed contract or a "shrink wrap" agreement attached to the packaging for the software, to which the licensee acknowledges agreement by opening the package.

Although traditional licensing and shrink wrap licensing are more or less applicable to licensing for individual systems, they are not well-suited to the network environment. Both traditional and shrink wrap licensing schemes are difficult to enforce on a network where several users have access to the software. Consequently, various electronic systems have been devised for controlling access to software on a network.

Electronic licensing typically comprises providing a set of criteria under which a request for an application from the server should be granted. One licensing system uses a fixed set of licenses controlled by a license server. The license information is maintained in a license database, along with information regarding which applications are in use and how many units are still available. The information in the database may be encrypted to prevent forgeries. When an application is desired, the application commences running. Code embedded in the application initially requests a license from the server to facilitate the execution of the application. The server checks the database of licenses, and if the appropriate licenses are available, grants the request. As requests are received and licenses granted, the relevant information is logged into a file to track usage of the various applications.

If a license is not available, the client contacts another server to find the appropriate license. The client in the conventional system has the responsibility to obtain licenses from the various servers, and the individual servers provide resources at the client's request. To facilitate such licensing, the application typically includes a library of programs designed to contact the server, request a license, and track the resulting license.

When a call is made to a server, all of the execution occurs on each individual server for any particular call. Similarly, if a license is located on a particular machine, all execution necessary to operate on that license occurs on that machine. Consequently, a central server containing most of the licenses available on a particular network is mainly responsible for maintaining the licenses.

In addition, conventional licensing systems rely on code embedded in the application to establish the licensing attributes. Code is placed in the application which interprets information received from the server to establish licensing parameters. Because the behavior of the license is not established until after the request has been made and the license obtained, the user cannot read the license terms prior to the request. In addition, this system lacks flexibility. To change the licensing terms, the code in the application must be revised.

Recently, generation and sales of software programs have become significant businesses both for companies which are primarily vendors of hardware, as well as for companies which vend software alone. Software is typically sold under license, that is, vendors transfer copies of software to users under a license which governs how the users may use the software. Typically, software costs are predicated on some belief as to the amount of usage which the software program may provide and the economic benefits, such as cost saving which may otherwise be incurred, which the software may provide to the users. Thus, license fees may be based on the power of the processor or the number of processors in the system, or the number of individual nodes in a network, since these factors provide measures of the number of users which may use the software at any give time.

In many cases, however, it may also be desirable, for example, to have licenses and license fees more closely relate to the actual numbers of users which can use the program at any given time or on the actual use to which a program may be put. Furthermore, it may be desirable to limit the use of the program to specified time periods. A problem arises particularly in digital data processing systems which have multiple users and/or multiple processors, namely, managing use of licensed software to ensure that the use is within the terms of the license, that is, to ensure that the software is only used on identified processors or by the numbers of users permitted by the license.

A network environment for computers permits several computers or terminals to use or have access to one or more programs. Traditionally, an end user would have to obtain a license from a software vendor to authorize use of the vendor's software on terminals or workstations within the network.

One method for providing access to software is known as the single-CPU or single processor license, wherein a software program is locked to a specific CPU and access to that software is only permitted from the particular licensed computer. A single-CPU license may create instances where software is unavailable to all users because the computer is not functioning or because several users want to use the software at the same time. To assure wide access, end users frequently must obtain unneeded CPU-locked software to assure availability and convenience. Companies with but a few users of a particular software program generally choose a CPU-locked system because it is, in effect, priced proportionately to the number of users.

The second general method to provide access to software is known as site-licensing. With this method, a software program is available for all the computers at an installation. The number of users who may run a software package concurrently under a site license is theoretically limited only by the number of users in the computing environment. Although site-licensing may ease administrative and operational problems for an end user, it normally does so at a premium price which takes into account the lack of accountability that such flexible licensing provides. A site license imposes unneeded costs where only a few users of a company actually need the software.

In the instance where a software vendor offers a choice between CPU-locked and site licensed software, it is the number of expected users at a purchasing company which affects the purchasing choice. If many of the end users at a company intend to use the software, for example, then a site license may be the most appropriate distribution system because it may be the low-cost option. If the software only will be used by a few workers, however, then a CPU-locked distribution system may be more appropriate. The trade-off point is determined by the relative pricing between the two distribution systems.

For environments where many users need the software but only spend a portion of their time using it, neither a dedicated CPU-locked license nor a site license may be cost effective. In such a case, a user who needs more than a single copy of the software may not buy it, thus depriving a vendor of potential revenue. Similarly, vendors lose potential revenue when they permit a company with a very large number of users to use software over an entire site, due to a general lack of accountability.

As computers have proliferated in availability, the investment in computer software has also grown, and there have been developed various methods for charging the computer user for use of computer software products. Typically computer software products are licensed, rather than sold, to the computer user under various arrangements. The simplest common license arrangement gives the user the right to use a software product on a single computer, i.e., to employ only one central processing unit (CPU) in connection with operation of the software product.

Although many such licenses are for indefinite periods of time, a license may also be for a limited duration and extendable, so that the entity marketing the product can charge a periodic fee (for example, annually) for use of the software product. Or use may be absolutely time-limited (for example, one-day), so that the user may evaluate the software product for possible purchase of a regular license. Since software can be copied and moved easily from one like machine to another, companies have invented methods to prevent unauthorized use of their software products. Some licensors require passwords to activate software on a particular machine. The password may be keyed to the hardware's identification number as a condition for operation of the software. Such systems can effectively lock software to a particular machine, but do not address software that is licensed for concurrent or simultaneous use. Some licensors use hardware locks that attach to a parallel printer port or a serial port on a machine; each time the software is activated, it looks for a specified code, in the hardware lock, as a condition for operation of the software. Using hardware locks resolves the problem of unauthorized moving of software among machines; however, hardware locks do not handle multiple software products on a single machine, and they require time and expense to deliver to the end user.

When computer software products are used in a network environment (which may include computers running in various roles as workstations and servers of various types linked together over a data path), additional licensing challenges are present. For example, a network may permit a user at one node (which may be a terminal or workstation, for instance) to utilize a software product running at another node (which may be the network server or even another workstation). Consequently, the terms of the single-computer type of software license might not cover the usage of the software product on the network, or worse still (from the point of view of the licensor) might actually permit such a usage without additional compensation to the licensor. One approach to network licensing is to grant permission to use the program based on all of the nodes on the network, and to require a license for each node. Then typically the license fee may be increased as the number of nodes on the network increases. Another approach bases the license fee for a software product running on a network on the total number of individual users who might actually run the software, regardless of the number of nodes either on the network or running the software product at a given time. These approaches, however, have usually required the cooperation of the licensee, because additional nodes may be added to the network, or additional users may utilize the software, without the knowledge of the licensor, who is typically not present on the premises of the licensee. The licensor may reserve the right to audit the licensee's site, but such an audit is intrusive, expensive, and may alienate potential or actual customers for licenses. Although other approaches exist under which one might charge a single fee per server or per site or per entity, often on an individually negotiated basis, these approaches are often impractical or inflexible, in that they also typically do not take into account the possible wide variation over time in the number of nodes or users and also require reliance on licensee cooperation.

Recently it has become practical in some network environments to determine and limit the number of nodes that may access a software product at a given time, and to charge a license fee based on the maximum number of nodes that are permitted to use the software product concurrently. This is called "concurrent licensing". In these environments, a computer program, acting as "librarian" and running on a computer node designated as a license server, is typically used to distribute license keys (sometimes called "tokens") over the network to nodes requesting access to run a software product; the number of keys is tracked by the librarian; and if at a given time, the permitted maximum number of keys would be exceeded by usage of the software product on a requesting node, the node can be denied, at such time, access to invoke the software product.

Examples of software-based concurrent licensing arrangements may be found in Unix applications running in connection with software products sold under the trademarks NetLS (available from Gradient Technologies, Inc., 577 Main Street, Suite 4, Hudson, Mass. 01749), and SunLic (available from Sun Microsystems, Inc., Mountain View, Calif.), and Flexible License Manager (available from Highland Software, Inc., 1001 Elwell Court, Palo Alto, Calif. 94303).

WAF can securely manage the integration of control information provided by two or more parties. As a result, WAF can construct an electronic agreement between WAF participants that represent a "negotiation" between, the control requirements of, two or more parties and enacts terms and conditions of a resulting agreement. WAF ensures the rights of each party to an electronic agreement regarding a wide range of electronic activities related to electronic information and/or appliance usage.

Electronic Agreements and Rights Protection

An important feature of WAF is that it can be used to assure the administration of, and adequacy of security and rights protection for, electronic agreements implemented through the use of the present invention. Such agreements may involve one or more of:

(1) creators, publishers, and other distributors, of electronic information, (2) financial service (e.g. credit) providers, (3) users of (other than financial service providers) information arising from content usage such as content specific demographic information and user specific descriptive information. Such users may include market analysts, marketing list compilers for direct and directed marketing, and government agencies, (4) end users of content, (5) infrastructure service and device providers such as telecommunication companies and hardware manufacturers (semiconductor and electronic appliance and/or other computer system manufacturers) who receive compensation based upon the use of their services and/or devices, and (6) certain parties described by electronic information.

WAF supports commercially secure "extended" value chain electronic agreements. WAF can be configured to support the various underlying agreements between parties that comprise this extended agreement. These agreements can define important electronic commerce considerations including:

(1) security, (2) content use control, including electronic distribution, (3) privacy (regarding, for example, information concerning parties described by medical, credit, tax, personal, and/or of other forms of confidential information), (4) management of financial processes, and (5) pathways of handling for electronic content, content and/or appliance control information, electronic content and/or appliance usage information and payment and/or credit.

WAF agreements may define the electronic commerce relationship of two or more parties of a value chain, but such agreements may, at times, not directly obligate or otherwise directly involve other WAF value chain participants. For example, an electronic agreement between a content creator and a distributor may establish both the price to the distributor for a creator's content (such as for a property distributed in a WAF container object) and the number of copies of this object that this distributor may distribute to end-users over a given period of time. In a second agreement, a value chain end-user may be involved in a three party agreement in which the end-user agrees to certain requirements for using the distributed product such as accepting distributor charges for content use and agreeing to observe the copyright rights of the creator. A third agreement might exist between the distributor and a financial clearinghouse that allows the distributor to employ the clearinghouse's credit for payment for the product if the end-user has a separate (fourth) agreement directly with the clearinghouse extending credit to the end-user. A fifth, evolving agreement may develop between all value chain participants as content control information passes along its chain of handling. This evolving agreement can establish the rights of all parties to content usage information, including, for example, the nature of information to be received by each party and the pathway of handling of content usage information and related procedures. A sixth agreement in this example, may involve all parties to the agreement and establishes certain general assumptions, such as security techniques and degree of trustedness (for example, commercial integrity of the system may require each WAF installation secure subsystem to electronically warrant that their WAF node meets certain interoperability requirements). In the above example, these six agreements could comprise agreements of an extended agreement for this commercial value chain instance.

WAF agreements support evolving ("living") electronic agreement arrangements that can be modified by current and/or new participants through very simple to sophisticated "negotiations" between newly proposed content control information interacting with control information already in place and/or by negotiation between concurrently proposed content control information submitted by a plurality of parties. A given model may be asynchronously and progressively modified over time in accordance with existing senior rules and such modification may be applied to all, to classes of, and/or to specific content, and/or to classes and/or specific users and/or user nodes. A given piece of content may be subject to different control information at different times or places of handling, depending on the evolution of its content control information (and/or on differing, applicable WAF installation content control information). The evolution of control information can occur during the passing along of one or more WAF control information containing objects, that is control information may be modified at one or more points along a chain of control information handling, so long as such modification is allowed. As a result, WAF managed content may have different control information applied at both different "locations" in a chain of content handling and at similar locations in differing chains of the handling of such content. Such different application of control information may also result from content control information specifying that a certain party or group of parties shall be subject to content control information that differs from another party or group of parties. For example, content control information for a given piece of content may be stipulated as senior information and therefore not changeable, might be put in place by a content creator and might stipulate that national distributors of a given piece of their content may be permitted to make 100,000 copies per calendar quarter, so long as such copies are provided to boni fide end-users, but may pass only a single copy of such content to a local retailers and the control information limits such a retailer to making no more than 1,000 copies per month for retail sales to end-users. In addition, for example, an end-user of such content might be limited by the same content control information to making three copies of such content, one for each of three different computers he or she uses (one desktop computer at work, one for a desktop computer at home, and one for a portable computer).

Electronic agreements supported by the preferred embodiment of the present invention can vary from very simple to very elaborate. They can support widely diverse information management models that provide for electronic information security, usage administration, and communication and may support:

(a) secure electronic distribution of information, for example commercial literary properties, (b) secure electronic information usage monitoring and reporting, (c) secure financial transaction capabilities related to both electronic information and/or appliance usage and other electronic credit and/or currency usage and administration capabilities, (d) privacy protection for usage information a user does not wish to release, and (e) "living" electronic information content dissemination models that flexibly accommodate:

(1) a breadth of participants, (2) one or more pathways (chains) for: the handling of content, content and/or appliance control information, reporting of content and/or appliance usage related information, and/or payment, (3) supporting an evolution of terms and conditions incorporated into content control information, including use of electronic negotiation capabilities, (4) support the combination of multiple pieces of content to form new content aggregations, and (5) multiple concurrent models.

Order Status and History

Provides real-time order status (backorders)

Provides real-time shipping status

Provides real-time invoice status

Provides history of previous orders and delivery information

Ensures proactive notification of order/shipping problems

Referring to operation 5418 of FIG. 54, a status of delivery is output for at least one of the products and services for which the order is received. The order status of a desired order may be checked in real time, especially useful when products are backordered or services have been delayed. Once the items have been shipped, the shipping status may be provided, such as by requesting that the user input a tracking number and retrieving data concerning that number from the shipping provider and displaying the result. Further, the status of an invoice may be checked in real time for, for example, permitting a user to determine whether a payment has been received and the like.

Any problems encountered relating to the order or shipping of the order are result in proactive notification of the problem to the user. As an option, the history of previous orders and related delivery information may be provided.

Lead Generation and Referral

Captures interest in a product or promotion

Sends leads to sales effectiveness systems

Updates database of leads

Another aspect of the electronic commerce component of the present invention has the purpose of capturing interest in a product, service, or promotion. The invention sends leads, notices, and advertisements to sales effectiveness systems where the leads are displayed or disseminated to users. A database of the leads may be kept and updated as desired.

Auction Capabilities

Facilitates dynamic auction creation

Allows private and public auctions

Supports multiple auction formats (e.g. Dutch, Reserve)

Allows tracking and analysis of auction histories

The electronic commerce component of the present invention may include an auction component for permitting a user to bid on an item against competing bidders. The auction component would permit private and public auctions, and could even permit users to create their own auctions. The auction component should permit selection of an auction format from several different formats, including, for example, Dutch and Reserve auctions. Further, tracking and analysis of auction histories could also be provided.

Economic activity has at its centerpiece the buyer-seller transaction for all goods and services produced and consumed in a market economy. It is the fundamental mechanism to which resources are allocated to producers and output to consumers. The operation of the buyer-seller mechanism can and often is a critical determination of economic efficiency and when operated properly, will substantially enhance market performance.

Through history, there have been many different approaches adopted to fairly bring buyers and sellers together, each with the key objective of permitting transactions at or as close as possible to the "market" price of the goods. By definition, the market price is the price (in given currency terms) that a fully educated market, given full access will transact select goods. This can only be accomplished by permitting full access to the transaction by essentially all potential buyers and sellers. However, the buyer-seller transaction must be structured to operate at very low costs—or it will distort the market price of goods with the artificially high transactions costs. Thus, as can be seen, the two keys to effective buyer/seller transactions—full access and knowledge coupled with low costs—can be and are often conflicting, necessitating trade-offs between trading efficiency and market knowledge.

One well-known and particularly successful trading system is known as the "open outcry auction". This involves a process wherein buyers and sellers collect in one location and prices for select goods are presented to the group through a broker, via simple vocal offerings. This approach has been used for almost all kinds of goods, but is particularly useful where there are no established trading locations or markets for the selected items. It is the dominate trading forum for exotic items such as rare pieces of art and the like. Although successful in bringing interested parties to the transaction, the overall process can be very expensive, adding significantly to the market-distorting transaction costs.

Open outcry auction techniques, modified over time, have also found successful application in many commodity trading activities, including the buying and selling of farm produce and livestock, oil and commodities contracts, future contracts on a variety of items and—particularly germane to the present invention—fixed income securities. These trading activities focus on the buying and selling of essentially fungible items, that is, items that are without meaningful differentiation from like items on the market. For example, a bushel of wheat for February delivery is considered for sale and delivery at a price independent from its source. Similarly, a 30-year treasury bond paying a coupon rate of 8 percent and having a July 1996 issue date is indistinguishable from other 30-year treasuries having the same properties. Accordingly, the price buyers are willing to pay and sellers willing to accept defines the market price of all 30-year treasury bonds of that same vintage, allowing a source transparent application of open outcry auction trading.

The fixed income securities issued by the United States Government are known as U.S. treasuries. These instruments typically span maturity terms at issue of 13 to 52 weeks (T-bills), one to ten years (notes), and up to 30 years (bonds). The T-bills are pure discount securities having no coupons. Almost all other treasuries having longer terms are coupon notes or bonds, with a defined payment cycle of semi-annual payments to the holder.

Treasuries have characteristic properties that make them especially useful for the purpose of the present invention and, therefore, are used exclusively in the following discussions with the fundamental tenant that the principles may be applied to other types of fixed income securities without departing from the inventive concepts. One important attribute of treasuries, in the context of the present invention, is the minimal and uniform default risk; the issuance of U.S. government paper removes the default risk as a defining criteria in the relative pricing of treasuries in the market place when they are backed by the full faith and credit of the U.S. government.

New treasury securities are auctioned by the U.S. government at preestablished auction dates. The auction prices for the treasuries having a face value with a set coupon rate will define the issuance yields of the security. After the auction, the treasuries enter the secondary market and are traded typically "over the counter", i.e., without a defined exchange. As inflation expectations and supply and demand conditions change, the prices of the recently auctioned treasuries fluctuate on the secondary market. These new prices are reflected by competing bid and ask prices communicated among institutions, banks, brokers, and dealers in the secondary market. For example, the yield of a treasury note increases as its price drops in the market, typically reflecting an overall increase in the interest rates for that term of security.

The newly auctioned securities are traded with and in conjunction with the securities issued in earlier auctions. In this context, some securities are traded more often than others and are called the "actives"; the actives usually correspond to the recently issued securities as opposed to the older securities in the market. Indeed, some older securities are infrequently traded, creating an illiquid market that may or may not reflect the current market-determined interest rate for that maturity length security.

As can be realized by the foregoing description, the very size and diversity of the treasury market implicates an unprecedented level of sophistication by market participants in the bidding, offering, buying, and selling transactions involving these securities. The very complexity associated with the transactions and the scale of trading undertaken by banks, brokers, dealers and institutional participants necessitates a rigidly structured approach to trading.

In the past, open outcry auction bond brokering has served its customers well, providing highly efficient executions at near perfect market pricing. The open outcry auction applied to bond trading was implemented by a broker working with a collection of customers to create and manage a market. Typical customer representatives—both buyers and sellers—at a common location (e.g., a single room) where the representatives of the customers would communicate with each other to develop pricing and confirm transactions. This process employed the expression by the representatives of various bid and offer prices for the fixed income security at select volumes (i.e., how many million dollars of bonds at a given maturity). This expression would involve the loud oral "cry" of a customer-proposed bid or offer and the coordination with the fellow representatives regarding the extraction of complimentary positions—until a transaction match is made and a deal is done. This "trade capture" process relies on after-the-fact reporting of what just transpired through the oral outcry trade.

Recently, the trade capture process was performed by having designated clerks input data into electronic input devices. An input clerk would attempt to interpret the open outcry of many individual brokers simultaneously who sequentially are making verbally known their trading instructions of their customers. The quality of the data capture was a function of the interpretative skill of the input clerk, and the volume and the volatility of customer orders. A significant drawback to this type of auction data capture process is the difficulty in discerning the distinct trading instructions verbalized in rapid succession during a quickly moving market, so that an accurate sequence of data can be captured by brokers and a set of inputters.

The many permutations of this process will be discussed in some detail below. At this juncture, suffice to say that at the volumes of business transactions existing at the time of its development, and the lack of suitable alternatives, left this process as the dominate trading mechanism for decades. However successful, this approach was not perfect. Indeed, in recent years, some of the problems in a open outcry auction forum have been amplified by the vastly increased level of trading now undertaken in the fixed income field. Without attempting to be comprehensive, difficulties would occur by the injection of trader personalities into the open outcry auction process. For example, an aggressive—highly vocal representative may in fact dominate trading—and transaction flow—even though he/she may only represent a smaller and less critical collection of customers. Although such aggressive actions at open outcry auction may be beneficial to those particular customers in the short run, overall, such dominance of the trading can and will distort pricing away from the actual market conditions.

Other problems exist in open outcry auction that deplete efficient trading. The speed at which trading flows and the oral nature of the auction process injects a potential for human error that often translates into many millions of dollars committed to trades unrelated to customer objectives. As such, the broker is left at the end of each trading day with a reconciliation process that may, under certain market conditions, wipe out all associated profit from that day's trading. Also, customers may quickly change direction regarding trading, based on new information available to the market. Shifting position or backing out of previously committed transactions on very short notice is often very difficult in the traditional open outcry auction process.

First, in brief overview, the present invention is directed to a data processing system for implementing complex trading rules in support of select transactions. The first aspect of the invention relates to a particular hardware arrangement that provides a specifically tailored platform for processor enhanced and supported trading. This hardware arrangement encompasses a plurality of custom designed workstations linked together for communication. Each workstation is linked to a central server that orchestrates the trading processes in accordance with program controlled logic. The workstation includes a display for presentation of the particulars of trading activity. A customized keypad permits enhanced data/position entry by the broker.

The second aspect of the invention is the governing logic for controlling system dynamics. This logic is stored in system memory and provides the sequence of protocols and rules that allocate trading priority, and the system responses to operative commands entered by the brokers at the workstations. The system logic is critical on two levels. First, it is important as the guiding principles underlying the system and thus performance is tied directly thereto. On a second level, system logic must be known to all customers and traders as the rules dictating market access and response—to eliminate any confusion and to place participants on as close to an equal footing as possible. It is a fundamental precept of the present system to provide fair and complete access to the trading process to all registered participants.

To better appreciate the following details, a review of the nomenclature employed is recommended. The illustrative examples herein all focus on fixed income instruments and trading of these instruments in large volumes—with the volume of a given transaction delineated in dollars (e.g., $25 million of 10-year treasuries).

The following terms are used with the associated definition:

TABLE 65A

| | |
|---|---|
| Bid | Dollar amount offered to buy a security-issue. |
| Offer | Dollar amount offered to sell a security-issue. |
| Spread | Difference between best bid(s) and offer(s) on market. |
| Issue | A common class of fixed rate treasuries. |
| Hit | Accepting a pending bid. |
| Lift | Accepting a pending offer. |
| Size | The volume in dollars of a particular Bid/Offer. |
| Makers | Customers with pending offers and bids-making a market. |
| Uncleared Entry | Current bids/offers that lack a counterparty, i.e., have not been lifted or hit. |
| Traders | After a trade is initiated; all customers involved in transactions (as buyer or seller). |
| Trade | A string of transactions at one price initiated by a hit or lift and continuing until timed out or done. |
| Aggressor | A customer who initializes a trade. |
| Active Side | Group of Makers on same side of market as the Aggressor. |
| Passive Side | Group of customers on opposite side of market from the Aggressor. |

The general context of system operation is based on the repetitive operation of several functions, and, in its preferred embodiment, implements these functions through a specially designed keypad. Generally, the process begins when customers contact the brokers and place bids and offers for a defined class of instruments. These various positions are displayed on the computer terminal in specific ways to reflect priority, etc. A customer can establish trading priority by placing a bid or offer at a select price and volume; bids at the same price are displayed on the screen in time order in which they enter the system (as are offers). As such a "queue" of bids and offers develops, with place in line set by time at the same price. This queue is displayed on screen at the broker's workstation. Typically, there is a small difference between the bid price and offer price—the "spread". If no difference exists, this is known as a "locked" market.

Importantly, a bid and offer are commitments—once placed, a bid can be "hit" and an offer can be "lifted" by a customer willing to trade the instrument at the set price.

To control trading between many participating customers, some level of hierarchy is set. A customer who hits on a bid or lifts an offer is promoted to a new level known as the "aggressor". By acting on a bid or offer, the aggressor defines (and thus establishes) the active side of the trade. For example, if the customer hits a bid, selling becomes the active side of the trade and buying turns passive. However, if the customer lifts an offer, buying is active. This is an important practical consideration, as by convention the active side pays commissions on the ensuing transactions. This allocation of commissions is premised on the notion that the active customers are taking advantage of liquidity while the passive side is supplying liquidity to the market.

For controlled implementation, the above-noted delineation between active and passive sides is important and carries more significance in processing transactions than the different sides of the transaction, i.e., the bid and offer.

Focusing further on the nomenclature for the system logic, a "trade" is considered a sequence of trading events, triggered by the initial hit or lift that defines the aggressor, and continues for all such transactions until the trade "clears". During a trade, the aggressor side remains active and all transactions take place at the price set by the initial hit or lift—regardless of the number of following transactions. To properly track activity, a trade generates a (virtual and/or real) single trade ticket—with associated, and screen-displayed, reference number.

Content Channel-Related Web Application Services

As illustrated in FIG. 53 and denoted by reference numeral 5302, another embodiment of the present invention is provided for affording a combination of content channel-related web application services. More detail is given in FIG. 66. Various features are included such as downloading data in operation 6600 and transmitting data, such as push-technology data, based on user specifications in operation 6602. In operation 6604, a plurality of newsgroups are also provided to which users may subscribe. Content subscriptions are also available. Answers are provided to frequently asked questions (FAQ's) relating to the content-related web application services. See operation 6606. Further, in operation 6608, real time communications are enabled between a plurality of users. In use, the transmission of outgoing electronic mail is coordinated and targeted in operation 6610 while incoming electronic mail is manage and organized in operation 6612. A plurality of templates are provided for publishing data in various forms in operation 6614.

Options include monitoring a success rate of the downloading data and automatically transmitting the data that is transmitted based on the user profile. The answers to the frequently asked questions could include answers automatically generated from a dynamic knowledge base or a knowledge expert. Also optionally, the step of coordinating the transmission of electronic mail includes providing an automatic response based upon an external event. The step of organizing received electronic mail could include organizing the received electronic mail based on a text pattern. The received electronic mail could be stored in a dynamic customer interaction database. The plurality of templates for publishing data in various forms may include templates generated based on the user profile. These options and others will be discussed in more detail below.

Download Capabilities

Provides common process for all downloads

Downloads selected files securely

Tracks success of file downloads

Restarts download if an error occurs

Facilitates transactional dependent downloads

The present invention includes several download capabilities. See operation 6600 of FIG. 66. A common process is used for all downloads. Selected files may be downloaded securely and the success of file downloads are tracked. If an error occurs during downloading, the download is restarted. These features greatly facilitate transactional dependent downloads.

Push Technology Capabilities

Sends messages or content to customers proactively

Allows for delivery and receipt of custom applications developed in all major languages (i.e. Visual Basic, C++, Java)

Figure 66:
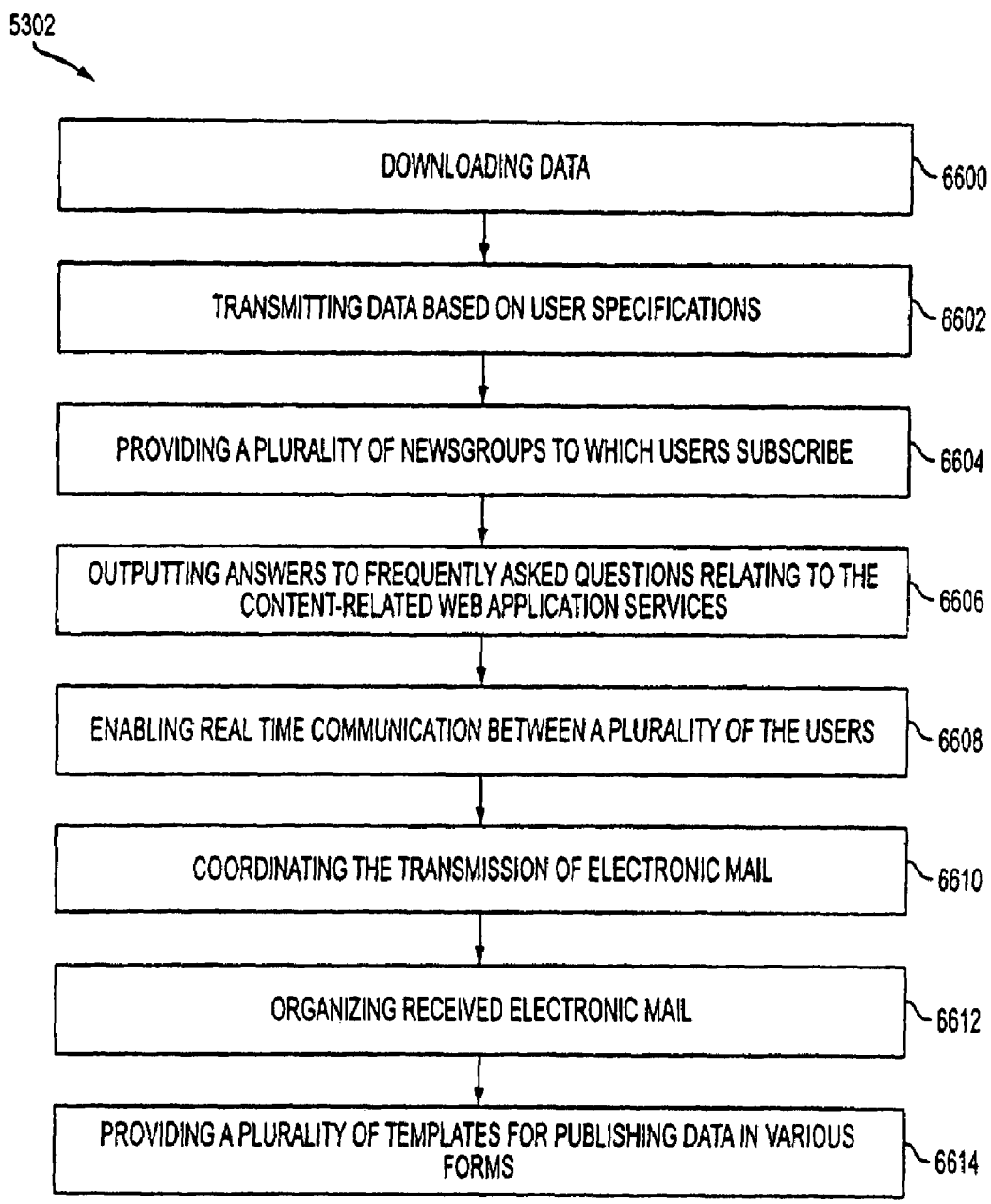
FIG. 66 is a flowchart illustrating the content channels-related web application services in accordance with one embodiment of the present invention.

Receives, installs, and launches applications automatically without user intervention Utilizes plug-ins allowing developers to personalize applications and content Performs informal hardware and software audits Delivers self-updating applications Referring to operation 6602 of FIG. 66, push-technology data is transmitted based on user specifications. Preselected messages and content may be sent to customers proactively. Furthermore, applications could be received, installed, and launched automatically without user intervention. For example, a software update could be automatically sent to a user's computer and installed immediately when it becomes available. Also, informal hardware and software audits could be performed automatically or at predetermined intervals.

Ideally, delivery and receipt of applications developed in a variety of programming languages, such as VISUAL BASIC, C++, and JAVA, is allowed. Plug-ins may also be utilized to allow developers to personalize applications and content.

Discussion Forums and Newsgroups

Securely handles all media types (e.g. graphics, audio, etc.)

Links to web pages for easy access to published documents

Facilitates discussions across multiple discussion groups

Finds information with search and notification tools

Allows participation in discussions via email

Allows forum moderation by users and administrators

Allows group membership control by users and administrators

Operation 6604 of FIG. 66 provides for a plurality of newsgroups to which users can subscribe. Sending and receipt of all media types, including graphics, audio, streaming video, and the like is permitted. A user may also participate in discussions via email. Selected users or an administrator may also be allowed to moderate a forum discussion as well as limit and control membership in a group.

An interface could be provided that permits discussions across multiple discussion groups. Optionally, links to web pages may be selected to access related sites and published documents. Also, search capabilities could be provided to search for information. Notification tools may inform a user of various events, such as when a particular discussion is going to occur.

Content Subscriptions

Allows users to subscribe and unsubscribe for different services

Allows subscribers to set up content preferences (e.g. topics)

Allows users to subscribe third parties for services

The content channels component of the present invention allows users to subscribe and unsubscribe to different services such as, for example, newsletters, travel clubs, and the like. Users would also be allowed to limit the content of the materials received to their particular preference. For example, a user would select several topics from a list of topics and would later receive information on the selected topics. Optionally, the invention could permit a user to subscribe third parties to selected services.

Frequently Asked Questions

Displays static answers to popular questions

Dynamically generates questions and answers from a knowledge base

Tracks knowledge experts based on content authors and discussion forum participation Referring to operation 6606 of FIG. 66, the content channels component of the present invention would also include a component for displaying static answers to popular questions. The questions and answers could be dynamically generated from a knowledge base. Optionally, the questions and answers could be ranked in order from the most to the least viewed or vice versa or could be organized by topic. Also optionally, a search engine could select relevant questions based on a user's input criteria.

Chat Capabilities in Real Time

Provides public and private messages

Provides Collaborative Web touring, URL pasting

Allows dynamic (public/private) room creation

Notifies users if another user is on-line

Provides free form discussion area

Allows for moderated chat sessions

Chat capabilities could be included in the content channels component of the present invention. Note operation 6608 of FIG. 66. Such capabilities would permit collaborative web touring and URL pasting, for such things as permitting two or more users to simultaneously navigate the web. The invention may notify a user when another user is online. Further, chat rooms could be dynamically created which could restrict access to known users or could permit open public access. Moderated chat sessions would also be allowed. Optionally, the chat capabilities could permit posting and retrieving of public and private messages, such as on electronic bulletin boards.

Generate Coordinated and Targeted Messages (Outbound E-Mail)

Targets e-mails to visitors based on profile and category system

Logs and tracks outbound messages

Automates regular communication triggered by events

Tracks email responses for campaign management statistics

In operation 6610, shown in FIG. 66, the content channels component of the present invention also permits generation of messages which may be sent to selected users at predetermined times or automatically upon occurrence of a particular event. The users may sign up to receive the messages, or they may be selected based on user profiles or a category system. All outbound messages are logged and tracked, as are any responses to those messages.

Manage E-Mail Receipt and Delivery (Inbound E-Mail)

Offers automated responses to consumer's questions

Logs and tracks incoming messages

Classifies messages based on text patterns and routes them to the appropriate departments Stores messages to build customer interaction histories Queues messages in mailboxes for response Facilitates review and response process Inbound e-mail is managed in operation 6612 of FIG. 66. All incoming messages are logged, tracked, sorted based on text patterns, and routed to the appropriate destination. For some messages, automated responses may be sent. Other messages would be queued in mailboxes for response. All or selected messages may be stored to build a customer interaction history.

Dynamic Rendering

Displays content and applications based on profile

Pulls content from multiple data sources: static, database, third party site

Matches content to users via configurable business rules

Allows custom template based publishing

The content channels component of the present invention also provides for generic and custom template based publishing by displaying selected content and applications based on the profile of a user. Note operation 6614 of FIG. 66. Content is obtained from multiple data sources, including static, database, and third party sites. Optionally, the content may be matched to particular users via configurable business rules.

Administrative and Financial Web Application Services

Another embodiment of the present invention is provided for affording a combination of web application services to manage administration of the web application services. See component 5304 of FIG. 53. To accomplish this, information on employment opportunities is managed and organized. Further, information relating to the stock markets and corporate financial information is output. Information on legal services is also provided.

Online Recruiting

Displays job listings and contact numbers

Provides forms to enter resources

Accepts and stores resumes submitted

Routes resumes to appropriate department

Lists job interviews and campus recruiting dates

Describes open opportunities and facilitates matching potential employees to positions The administrative component of the present invention provides for online recruiting and job searching. Job listings and contact information are provided, as are forms to enter resources. Also listed are interview times and locations as well as campus recruiting dates. Resumes are accepted and stored to be later accessed by potential employers, or are routed to an appropriate destination. The resumes may be sorted based on keyword search or area of expertise, or may only be routed to certain destinations selected by the users submitting the resumes.

Shareholder Services

Provides personalized stock tickers

Displays corporate financial information

The content channels component of the present invention provides a customizable display including personalized stock tickers, links to corporate financial information, and an online brokerage service. Other shareholder services could include historical graphing of the performance of stocks over time.

Legal Services

Lists legal policies and notifications (privacy policy)

Accepts notification of legal questions or issues

Provides media kits

Allows users to register for branding usage

Legal notices and policies are displayed by the content channels component of the present invention. Legal questions and issues are accepted and stored for later reply. A user is also allowed to register for branding usage. Media kits may be provided.

Web Application Services to Manage Customer Relationships

Figure 67:
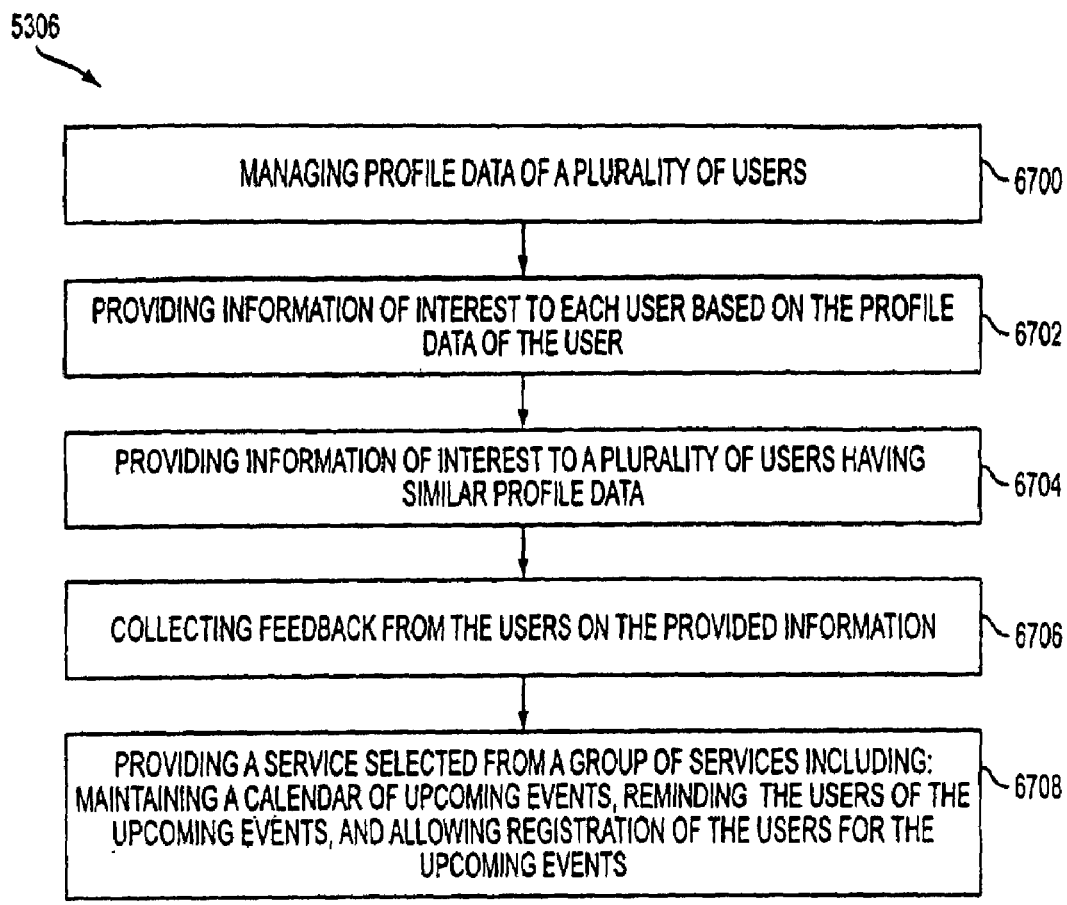
FIG. 67 is a flowchart illustrating the customer relationship management-related web application services in accordance with one embodiment of the present invention.

As shown in component 5306 of FIG. 53, one embodiment of the present invention is provided for affording a combination of web application services to manage customer relationships. FIG. 67 illustrates component 5306 in more detail. As shown in FIG. 67, profile data of a plurality of users is managed and organized in operation 6700. Static and dynamic information of interest is provided to each user based on profile data of that user in operation 6704. Further, static and dynamic information of interest is provided to a plurality of users having similar profile data in operation 6704. Information is also located on a network of databases, i.e. the Internet, as a function of the profile data. Feedback is also collected from the users by way of electronic forms and surveys Note operation 6706. Various event, calendaring and registration services are further provided. For example, operation 6708 reminds the users of upcoming events, a calendar of events is maintained, and the users are permitted to register for the events.

User Profile Management (Active Profiling)

Displays and maintains user information and preferences

Integrates with centralized source for profiles

Allows users or administrators to modify profiles

One embodiment of the present invention is provided for utilizing all user indicia for the purpose of customizing a user interface. Note operation 6700 of FIG. 67. In use, a user profile is developed in operation 6800 of FIG. 68. Such user indicia may include any of search requests, products purchased, products looked at but not purchased, products purchased and returned, reasons for returning products, customer stated profile including income level, education level, stated profession, etc. as well as preferences of the user. FIG. 69 illustrates one method for developing a user profile. In operation 6900, user information such as search requests, shopping events, and browsing habits may be collected by the system or by the user's computer for periodic download to the system. All of the user information would be placed in a database in operation 6901 for retrieval when necessary. Thus, a user's buying pattern for a particular type of item can be readily estimated with relative surety in operation 6902 each time a user uses the system. Further, the user's current activities can be logged and entered into the database in operation 6903, thereby ensuring up to the minute accuracy. In operation 6801, an item for purchase with a set of features is selected based on the user profile and is displayed. The item may be selected from a group of items having characteristics that corresponds to a predicted buying pattern of the user. The presentation of the set of features is customized based on the user profile in operation 6802. The user is allowed to select the item for purchase. See operation 6803.

For example, the present system is capable of telling that the user was on the IT staff for an accounting firm and was reviewing software for purchase such that, when he drills down through product details on an ecommerce website, it would highlight first the software and hardware performance/requirements specs and next the return on investment. At a higher level, with the same customer, if he were searching for a word processor software, then the profile would present a review of the best software for accounting firms as written up in some accounting magazine. It might also compare what similar IT professionals from accounting firms purchased.

Dynamically Facilitate Communities of Interest

Provides static content and applications to people with similar preferences or business needs Provides dynamic content and applications to people with similar preferences or business needs Communities can be created by configurable business rules The customer relationship management component of the present invention, in operation 6702, provides static content and applications to people with similar preferences and business needs. Dynamic content is provided, as are applications, to people with similar preferences and business needs.

Match Web Content to Specific User Profiles

Permits cross- and up-sell of products to customers based on user profile

Offers personalized recommendations based on an individual's profile

Targets content and advertisements based on an individual's profile

Relates legacy databases and information to personal profile information

Content matching rules are defined by configurable business rules

Uses metadata and business rules to match content to profiles

The customer relationship management component of the present invention permits matching of web content and advertisements to specific user profiles. Note operation 6704 of FIG. 67. Personalized recommendations are made based on the profile of a user. Cross- and up-selling of products to users based on their profiles is also permitted. Optionally, content matching rules are defined by configurable business rules. In the alternative, metadata and business rules match content to profiles. Also optionally, legacy databases and information may be related to personal profile information.

Customer Feedback and Surveys

Automates creation and administration of online feedback forms

Allows internal users to access results from web browsers

Builds and maintains multiple feedback forms and surveys

Delivers and automatically processes interactive online forms

Displays and analyzes real time survey reports in text and graphic format

Downloads collected information for offline needs

The customer relationship management component of the present invention also receives customer feedback and takes surveys in operation 6706. Creation, administration, and maintenance of multiple online feedback forms and surveys is automated, as is delivery and processing of the forms and surveys. Internal users are allowed to access results from web browsers. Survey results are analyzed and displayed in text and graphic format. Optionally, users may be permitted to view current survey results, such as reprots. Finally, collected information may be downloaded for offline needs.

Events, Calendaring, and Registration

Offers user the ability to view upcoming events and register for them online

Checks identity of user to authorize registration

Checks for relevant events based on user profiles and notifies users

Sends out notices to remind users of upcoming events for which user has registered Maintains calendar of events and administration of calendar Integrates with commerce functions to provide fee-based registration capabilities (e.g. online registration via credit card)

Figure 68:
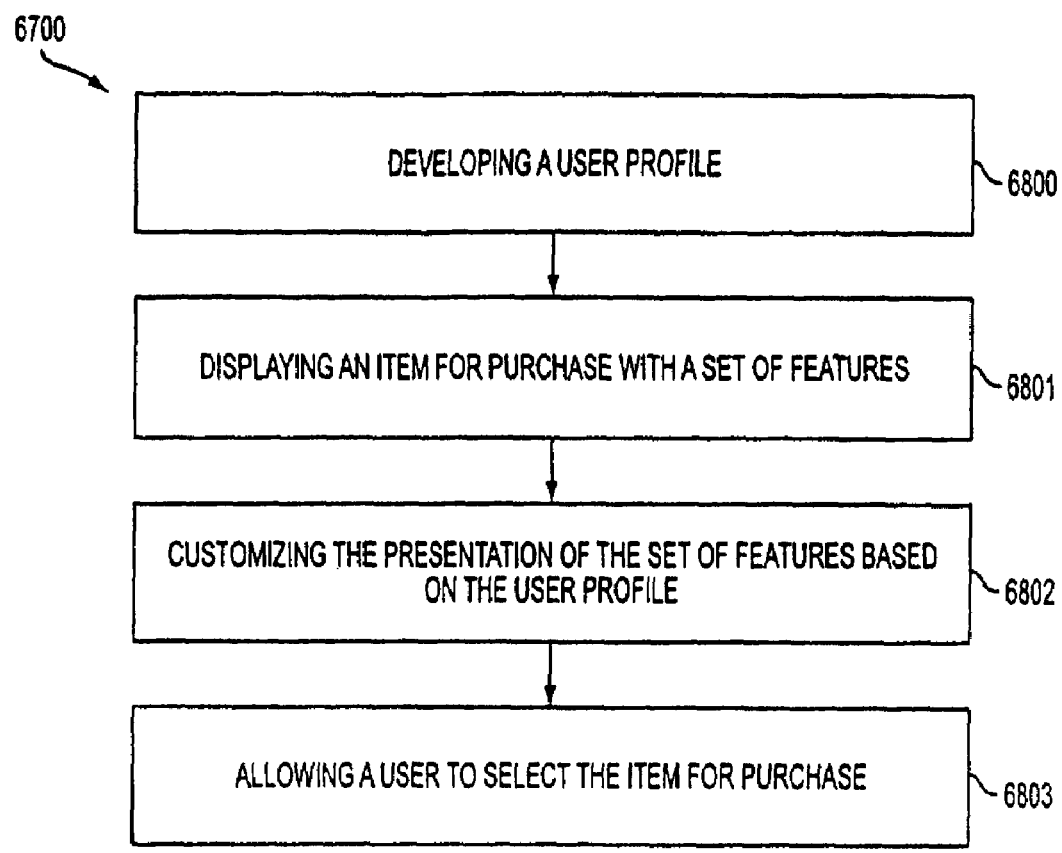
FIG. 68 is a flowchart illustrating a profile management service of the customer relationship management-related web application services in accordance with one embodiment of the present invention.
Figure 69:
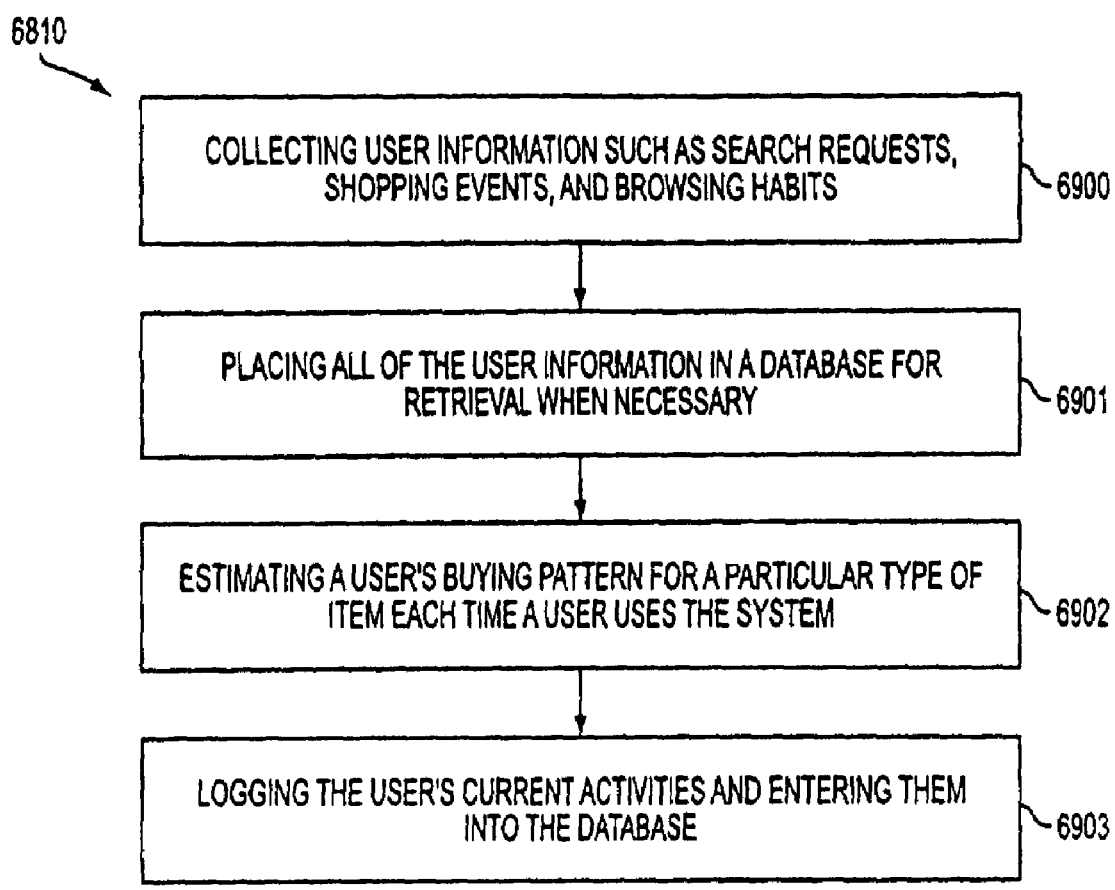
FIG. 69 is a flowchart illustrating a profile management service of the customer relationship management-related web application services in accordance with one embodiment of the present invention.

Referring to operations 6708, 6800, and 6802 of FIGS. 67 and 68, the customer relationship management component of the present invention includes a calendar of events, a notification service, and a way to register for upcoming events. Relevant events are selected based on the profile of a user and the user is notified of the time and place of the event. Once the identity of a user has been verified, the registration of the user is accepted. A notice is sent to a user to remind the user of the event for which he or she has registered. The registration function is integrated with commerce functions to permit fee-based registration capabilities, such as permitting online registration via credit card.

Content Management and Publishing-Related Web Application Services

Figure 70:
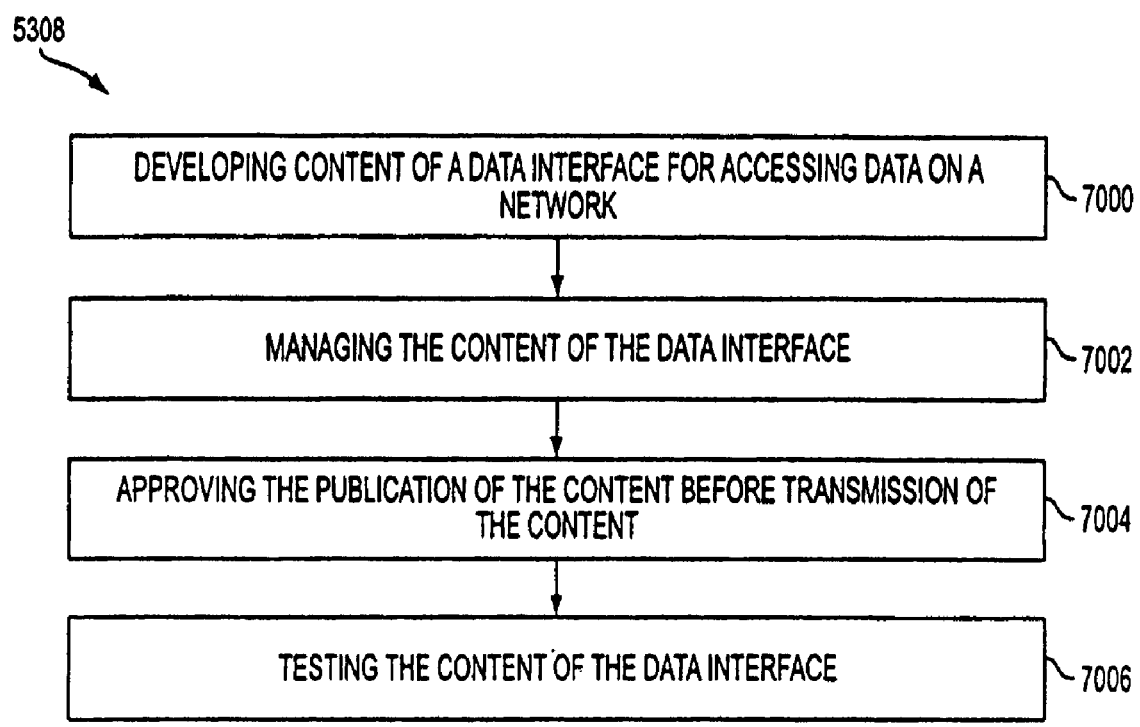
FIG. 70 is a flowchart illustrating the content management and publishing-related web application services in accordance with one embodiment of the present invention.

Stores current files along with past changes to documents, source code, and Web content Assigns user-specific and project specific authorization for secure administration Reconciles file changes from multiple users and prevents accidental code overwriting Generates site maps Maintains metadata for content One embodiment of the present invention, illustrated in FIG. 53 as component 5308, is provided for affording a combination of content management and publishing-related web application services. In use, referring to FIG. 70, content of a data interface, i.e. a web-site, may be developed for accessing data on a network, i.e. the Internet, after which such content is managed in operation. Note operations 7000 and 7002, respectively. Publishing of the content of the data interface is controlled by precluding transmission or publication of the content until approval in operation 7004. The content of the data interface may also be tested in operation 7006. For example, this may be accomplished by creating a staging and deployment environment in which the data interface is analyzed. Further features include "text-only" rendering and content workflow control.

As an option, the step of developing content of a data interface may be carried out by a data version controller. A content developer may be automatically notified of a work assignment. Managing the content may include assigning a secure access for specific users and specific projects. Meta data could be maintained and language translation tools could be utilized. Approving the publication of the content may include assigning use and access restrictions on the content. Testing the content of the data interface may include comparing versions of the data interface and utilizing remote and automatic testing capabilities.

Controlling Electronic Content

A fundamental problem for electronic content providers is extending their ability to control the use of proprietary information. Content providers often need to limit use to authorized activities and amounts. Participants in a business model involving, for example, provision of movies and advertising on optical discs may include actors, directors, script and other writers, musicians, studios, publishers, distributors, retailers, advertisers, credit card services, and content end-users. These participants need the ability to embody their range of agreements and requirements, including use limitations, into an "extended" agreement comprising an overall electronic business model. This extended agreement is represented by electronic content control information that can automatically enforce agreed upon rights and obligations. Under WAF, such an extended agreement may comprise an electronic contract involving all business model participants. Such an agreement may alternatively, or in addition, be made up of electronic agreements between subsets of the business model participants. Through the use of WAF, electronic commerce can function in the same way as traditional commerce—that is commercial relationships regarding products and services can be shaped through the negotiation of one or more agreements between a variety of parties.

Commercial content providers are concerned with ensuring proper compensation for the use of their electronic information. Electronic digital information, for example a CD recording, can today be copied relatively easily and inexpensively. Similarly, unauthorized copying and use of software programs deprives rightful owners of billions of dollars in annual revenue according to the International Intellectual Property Alliance. Content providers and distributors have devised a number of limited function rights protection mechanisms to protect their rights. Authorization passwords and protocols, license servers, "lock/unlock" distribution methods, and non-electronic contractual limitations imposed on users of shrink-wrapped software are a few of the more prevalent content protection schemes. In a commercial context, these efforts are inefficient and limited solutions.

Providers of "electronic currency" have also created protections for their type of content. These systems are not sufficiently adaptable, efficient, nor flexible enough to support the generalized use of electronic currency. Furthermore, they do not provide sophisticated auditing and control configuration capabilities. This means that current electronic currency tools lack the sophistication needed for many real-world financial business models. WAF provides means for anonymous currency and for "conditionally" anonymous currency, wherein currency related activities remain anonymous except under special circumstances.

WAF Control Capabilities

WAF allows the owners and distributors of electronic digital information to reliably bill for, and securely control, audit, and budget the use of, electronic information. It can reliably detect and monitor the use of commercial information products. WAF uses a wide variety of different electronic information delivery means: including, for example, digital networks, digital broadcast, and physical storage media such as optical and magnetic disks. WAF can be used by major network providers, hardware manufacturers, owners of electronic information, providers of such information, and clearinghouses that gather usage information regarding, and bill for the use of, electronic information.

WAF provides comprehensive and configurable transaction management, metering and monitoring technology. It can change how electronic information products are protected, marketed, packaged, and distributed. When used, WAF should result in higher revenues for information providers and greater user satisfaction and value. Use of WAF will normally result in lower usage costs, decreased transaction costs, more efficient access to electronic information, re-usability of rights protection and other transaction management implementations, greatly improved flexibility in the use of secured information, and greater standardization of tools and processes for electronic transaction management. WAF can be used to create an adaptable environment that fulfills the needs of electronic information owners, distributors, and users; financial clearing houses; and usage information analyzers and resellers.

WAF provides a secure, distributed electronic transaction management system for controlling the distribution and/or other usage of electronically provided and/or stored information. WAF controls auditing and reporting of electronic content and/or appliance usage. Users of WAF may include content creators who apply content usage, usage reporting, and/or usage payment related control information to electronic content and/or appliances for users such as end-user organizations, individuals, and content and/or appliance distributors. WAF also securely supports the payment of money owed (including money owed for content and/or appliance usage) by one or more parties to one or more other parties, in the form of electronic credit and/or currency.

WAF may be used to migrate most non-electronic, traditional information delivery models (including entertainment, reference materials, catalog shopping, etc.) into an adequately secure digital distributors and usage management and payment context. The distribution and financial pathways managed by a WAF arrangement may include:

content creator(s), distributor(s), redistributor(s), client administrator(s), client user(s), financial and/or other clearinghouse(s), and/or government agencies.

These distribution and financial pathways may also include:

advertisers, market survey organizations, and/or other parties interested in the user usage of information securely delivered and/or stored using WAF.

Normally, participants in a WAF arrangement will employ the same secure WAF foundation. Alternate embodiments support WAF arrangements employing differing WAF foundations. Such alternate embodiments may employ procedures to ensure certain interoperability requirements are met.

Because of the breadth of issues resolved by the present invention, it can provide the emerging "electronic highway" with a single transaction/distribution control system that can, for a very broad range of commercial and data security models, ensure against unauthorized use of confidential and/or proprietary information and commercial electronic transactions. WAF's electronic transaction management mechanisms can enforce the electronic rights and agreements of all parties participating in widely varying business and data security models, and this can be efficiently achieved through a single WAF implementation within each WAF participant's electronic appliance. WAF supports widely varying business and/or data security models that can involve a broad range of participants at various "levels" of WAF content and/or content control information pathways of handling. Different content control and/or auditing models and agreements may be available on the same WAF installation. These models and agreements may control content in relationship to, for example, WAF installations and/or users in general; certain specific users, installations, classes and/or other groupings of installations and/or users; as well as to electronic content generally on a given installation, to specific properties, property portions, classes and/or other groupings of content.

Distribution using WAF may package both the electronic content and control information into the same WAF container, and/or may involve the delivery to an end-user site of different pieces of the same WAF managed property from plural separate remote locations and/or in plural separate WAF content containers and/or employing plural different delivery means. Content control information may be partially or fully delivered separately from its associated content to a user WAF installation in one or more WAF administrative objects. Portions of said control information may be delivered from one or more sources. Control information may also be available for use by access from a user's WAF installation secure sub-system to one or more remote WAF secure sub-systems and/or WAF compatible, certified secure remote locations. WAF control processes such as metering, budgeting, decrypting and/or fingerprinting, may as relates to a certain user content usage activity, be performed in a user's local WAF installation secure subsystem, or said processes may be divided amongst plural secure subsystems which may be located in the same user WAF installations and/or in a network server and in the user installation. For example, a local WAF installation may perform decryption and save any, or all of, usage metering information related to content and/or electronic appliance usage at such user installation could be performed at the server employing secure (e.g., encrypted) communications between said secure subsystems. Said server location may also be used for near real time, frequent, or more periodic secure receipt of content usage information from said user installation, with, for example, metered information being maintained only temporarily at a local user installation.

Delivery means for WAF managed content may include electronic data storage means such as optical disks for delivering one portion of said information and broadcasting and/or telecommunicating means for other portions of said information. Electronic data storage means may include magnetic media, optical media, combined magneto-optical systems, flash RAM memory, bubble memory, and/or other memory storage means such as huge capacity optical storage systems employing holographic, frequency, and/or polarity data storage techniques. Data storage means may also employ layered disc techniques, such as the use of generally transparent and/or translucent materials that pass light through layers of data carrying discs which themselves are physically packaged together as one thicker disc. Data carrying locations on such discs may be, at least in part, opaque.

WAF control information (e.g., methods) that collectively control use of WAF managed properties (database, document, individual commercial product), are either shipped with the content itself (for example, in a content container) and/or one or more portions of such control information is shipped to distributors and/or other users in separably deliverable "administrative objects." A subset of the methods for a property may in part be delivered with each property while one or more other subsets of methods can be delivered separately to a user or otherwise made available for use (such as being available remotely by telecommunication means). Required methods (methods listed as required for property and/or appliance use) must be available as specified if WAF controlled content (such as intellectual property distributed within a WAF content container) is to be used. Methods that control content may apply to a plurality of WAF container objects, such as a class or other grouping of such objects. Methods may also be required by certain users or classes of users and/or WAF installations and/or classes of installations for such parties to use one or more specific, or classes of, objects.

A feature of WAF provided by the present invention is that certain one or more methods can be specified as required in order for a WAF installation and/or user to be able to use certain and/or all content. For example, a distributor of a certain type of content might be allowed by "senior" participants (by content creators, for example) to require a method which prohibits end-users from electronically saving decrypted content, a provider of credit for WAF transactions might require an audit method that records the time of an electronic purchase, and/or a user might require a method that summarizes usage information for reporting to a clearinghouse (e.g. billing information) in a way that does not convey confidential, personal information regarding detailed usage behavior.

A further feature of WAF provided by the present invention is that creators, distributors, and users of content can select from among a set of predefined methods (if available) to control container content usage and distribution functions and/or they may have the right to provide new customized methods to control at least certain usage functions (such "new" methods may be required to be certified for trustedness and interoperability to the WAF installation and/or for of a group of WAF applications). As a result, WAF provides a very high degree of configurability with respect to how the distribution and other usage of each property or object (or one or more portions of objects or properties as desired and/or applicable) will be controlled. Each WAF participant in a WAF pathway of content control information may set methods for some or all of the content in a WAF container, so long as such control information does not conflict with senior control information already in place with respect to:

(1) certain or all WAF managed content, (2) certain one or more WAF users and/or groupings of users, (3) certain one or more WAF nodes and/or groupings of nodes, and/or (4) certain one or more WAF applications and/or arrangements.

For example, a content creator's WAF control information for certain content can take precedence over other submitted WAF participant control information and, for example, if allowed by senior control information, a content distributor's control information may itself take precedence over a client administrator's control information, which may take precedence over an end-user's control information. A path of distribution participant's ability to set such electronic content control information can be limited to certain control information (for example, method mediating data such as pricing and/or sales dates) or it may be limited only to the extent that one or more of the participant's proposed control information conflicts with control information set by senior control information submitted previously by participants in a chain of handling of the property, or managed in said participant's WAF secure subsystem.

WAF control information may, in part or in full, (a) represent control information directly put in place by WAF content control information pathway participants, and/or (b) comprise control information put in place by such a participant on behalf of a party who does not directly handle electronic content (or electronic appliance) permissions records information (for example control information inserted by a participant on behalf of a financial clearinghouse or government agency). Such control information methods (and/or load modules and/or mediating data and/or component assemblies) may also be put in place by either an electronic automated, or a semi-automated and human assisted, control information (control set) negotiating process that assesses whether the use of one or more pieces of submitted control information will be integrated into and/or replace existing control information (and/or chooses between alternative control information based upon interaction with in-place control information) and how such control information may be used.

Control information may be provided by a party who does not directly participate in the handling of electronic content (and/or appliance) and/or control information for such content (and/or appliance). Such control information may be provided in secure form using WAF installation secure sub-system managed communications (including, for example, authenticating the deliverer of at least in part encrypted control information) between such not directly participating one or more parties' WAF installation secure subsystems, and a pathway of WAF content control information participant's WAF installation secure subsystem. This control information may relate to, for example, the right to access credit supplied by a financial services provider, the enforcement of regulations or laws enacted by a government agency, or the requirements of a customer of WAF managed content usage information (reflecting usage of content by one or more parties other than such customer) relating to the creation, handling and/or manner of reporting of usage information received by such customer. Such control information may, for example, enforce societal requirements such as laws related to electronic commerce.

WAF content control information may apply differently to different pathway of content and/or control information handling participants. Furthermore, permissions records rights may be added, altered, and/or removed by a WAF participant if they are allowed to take such action. Rights of WAF participants may be defined in relation to specific parties and/or categories of parties and/or other groups of parties in a chain of handling of content and/or content control information (e.g., permissions records). Modifications to control information that may be made by a given, eligible party or parties, may be limited in the number of modifications, and/or degree of modification, they may make.

At least one secure subsystem in electronic appliances of creators, distributors, auditors, clearinghouses, client administrators, and end-users (understanding that two or more of the above classifications may describe a single user) provides a "sufficiently" secure (for the intended applications) environment for:

1. Decrypting properties and control information;

2. Storing control and metering related information;

3. Managing communications;

4. Processing core control programs, along with associated data, that constitute control information for electronic content and/or appliance rights protection, including the enforcing of preferences and requirements of WAF participants.

Normally, most usage, audit, reporting, payment, and distribution control methods are themselves at least in part encrypted and are executed by the secure subsystem of a WAF installation. Thus, for example, billing and metering records can be securely generated and updated, and encryption and decryption keys are securely utilized, within a secure subsystem. Since WAF also employs secure (e.g. encrypted and authenticated) communications when passing information between the participant location (nodes) secure subsystems of a WAF arrangement, important components of a WAF electronic agreement can be reliably enforced with sufficient security (sufficiently trusted) for the intended commercial purposes. A WAF electronic agreement for a value chain can be composed, at least in part, of one or more subagreements between one or more subsets of the value chain participants. These subagreements are comprised of one or more electronic contract "compliance" elements (methods including associated parameter data) that ensure the protection of the rights of WAF participants.

The degree of trustedness of a WAF arrangement will be primarily based on whether hardware SPUs are employed at participant location secure subsystems and the effectiveness of the SPU hardware security architecture, software security techniques when an SPU is emulated in software, and the encryption algorithm(s) and keys that are employed for securing content, control information, communications, and access to WAF node (WAF installation) secure subsystems. Physical facility and user identity authentication security procedures may be used instead of hardware SPUs at certain nodes, such as at an established financial clearinghouse, where such procedures may provide sufficient security for trusted interoperability with a WAF arrangement employing hardware SPUs at user nodes.

The updating of property management files at each location of a WAF arrangement, to accommodate new or modified control information, is performed in the WAF secure subsystem and under the control of secure management file updating programs executed by the protected subsystem. Since all secure communications are at least in part encrypted and the processing inside the secure subsystem is concealed from outside observation and interference, the present invention ensures that content control information can be enforced. As a result, the creator and/or distributor and/or client administrator and/or other contributor of secure control information for each property (for example, an end-user restricting the kind of audit information he or she will allow to be reported and/or a financial clearinghouse establishing certain criteria for use of its credit for payment for use of distributed content) can be confident that their contributed and accepted control information will be enforced (within the security limitations of a given WAF security implementation design). This control information can determine, for example:

(1) How and/or to whom electronic content can be provided, for example, how an electronic property can be distributed;

(2) How one or more objects and/or properties, or portions of an object or property, can be directly used, such as decrypted, displayed, printed, etc;

(3) How payment for usage of such content and/or content portions may or must be handled; and (4) How audit information about usage information related to at least a portion of a property should be collected, reported, and/or used.

Seniority of contributed control information, including resolution of conflicts between content control information submitted by multiple parties, is normally established by:

(1) the sequence in which control information is put in place by various parties (in place control information normally takes precedence over subsequently submitted control information), (2) the specifics of WAF content and/or appliance control information. For example, in-place control information can stipulate which subsequent one or more piece of control from one or more parties or class of parties will take precedence over control information submitted by one or more yet different parties and/or classes of parties, and/or (3) negotiation between control information sets from plural parties, which negotiation establishes what control information shall constitute the resulting control information set for a given piece of WAF managed content and/or WAF installation.

Content Development Tools

Shows view of site's navigational structure, directories of information, hyperlinks, hyperlink status, or all files at once Provides automatic hyperlink maintenance Creates WYSIWYG frames pages and draws HTML tables Supports editing of graphics Generates web sites and pages from predefined formats Imports existing files or folders into web site Integrates with version control tools Allows metadata editing and definition Operation 7000 of the content management and publishing services component of the present invention provides tools for developing content of a data interface for accessing data on a network. In particular, a view of the navigational structure, directories of information, hyperlinks, hyperlink status, or all files of the site is shown. Hyperlinks may be maintained automatically. Graphics editing is supported. Predefined formats may be provided to assist in generating web sites and pages. Optionally, WYSIWYG frames pages may be created and HTML tables may be drawn. Also optionally, metadata editing and definition may be allowed. Existing files or folders may be imported into a web site. Ideally, the content management and publishing services component of the present invention integrates with version control tools.

Content Management Capabilities

The content management and publishing services component of the present invention also manages the content and security of the data interface. Note operation 7002 of FIG. 70. Current files are stored along with past changes to documents, source code, and web content. User specific and project specific authorization is assigned to ensure secure administration. File changes among multiple users are reconciled so that accidental code overwriting is avoided. Site maps are generated and metadata is maintained for content.

Content Approval

Controls access to content publishing

Permits publishing of material only after approval

Notifies approver of material to review

Describes the business rules for syndication, including who can have it, when, for how long, and any restrictions on use or reuse of the digital asset Operation 7004 of the content management and publishing services component of the present invention precludes publishing of the content of the data interface until approval so that access to content publishing is controlled. The administrator who approves the content is notified of the new content so that he or she may review the content. Optionally, the business rules for syndication are set forth, including proprietary rights, beginning date and duration of those rights, and any restrictions on use and reuse.

Content Workflow

Generates site maps based on collection of stored web pages

Provides content workflow view to all developers

Allows content managers to change content workflow

Provides change request and change notification routing

Alerts developers of changes in content workflow

Manages large numbers of sub-projects and organizes them into groups

Allows sub-projects to automatically and remotely download available digital assets and remotely change them over time Allows developers to group content for particular sub-projects Alerts developers of content in work queue Allows routing of content to multiple parties The content management and publishing services component of the present invention controls the content workflow. Site maps are generated based on a collection of stored web pages which, along with content workflow view, is provided to developers. Content managers are allowed to change content workflow and group content for particular sub projects. Change requests may also be submitted and change notifications are routed to appropriate destinations. Developers are alerted to changes in content workflow as well as the contents of the work queue.

Large numbers of sub-projects are managed and organized into groups. The sub-projects are then allowed to automatically and remotely download available digital assets and remotely change them over time.

Content Review and Testing Tools

Provides ability to preview content

Compares the differences in a project against another project, or in two different folders Provides data-driven testing capabilities Allows script maintenance and reuse Reports where errors are found Enables remote and timed testing capabilities Supports multiple source and destination environments The content of the data interface is tested in operation 7006. The content is able to be previewed so that any errors or inconsistencies can be fixed. Also provided are data-driven testing capabilities. Further, remote testing, periodic testing, and durational testing may be performed. When an error is found, a report is output.

Optionally, two or more projects may be compared to determine the differences between the two. Likewise, data stored in two or more different folders may also be compared. Also optionally, scripts are tested and maintained, and can be reused. Further, support is provided for multiple source and destination environments.

Localization and Translation Capabilities

Provides translation services from single to entire web sites, text-embedded in images, Java and Javascript source code and parameters, CGI scripts, Database files, Email, Adobe PDF files Enables site update and maintenance procedures for localization Alerts local web site content managers to changes in web site Tracks localization process The content management and publishing services component also includes localization and translation capabilities in operation 7008. Site updates and maintenance procedures for localization are enabled, and the localization process is tracked. The local web site content manager is alerted to any change in the web site. Also, translation services are provided for single pages to entire web sites. For example, the translation services translate text embedded in images, JAVA, JAVASCRIPT source code and parameters, CGI scripts, database files, email, and ADOBE PDF files to and from each other.

Text Only Rendering Capabilities

Facilitates "text-only" site rendering based on business rules

Allows modification/customization of text-only pages

The content management and publishing services component facilitates "text-only" site rendering based on business rules, particularly useful for users with low end systems or without graphics displaying capabilities. This also simplifies modification and customization of text-only pages.

Staging and Deployment Tools

Creates staging and deployment environments to test content in a mirrored production environment prior to deployment Provides ability to release content based on time Allows the ability to roll-back to a previous production version Integrates with content approval process Provides load, regression and performance testing capabilities The content management and publishing services component of the present invention creates an environment in which the content of the data is tested. This testing may be carried out by creating a staging and deployment environment in a mirrored production environment prior to deployment. Exemplary testing capabilities include load, regression, and performance testing capabilities. If a problem arises, a previous production version may be put back into use. Further, content may be released over time. Optionally, the testing environment may be integrated with the content approval process to ensure compliance with content guidelines before actual deployment of the content.

Education-Related Web Application Services

Figure 71:
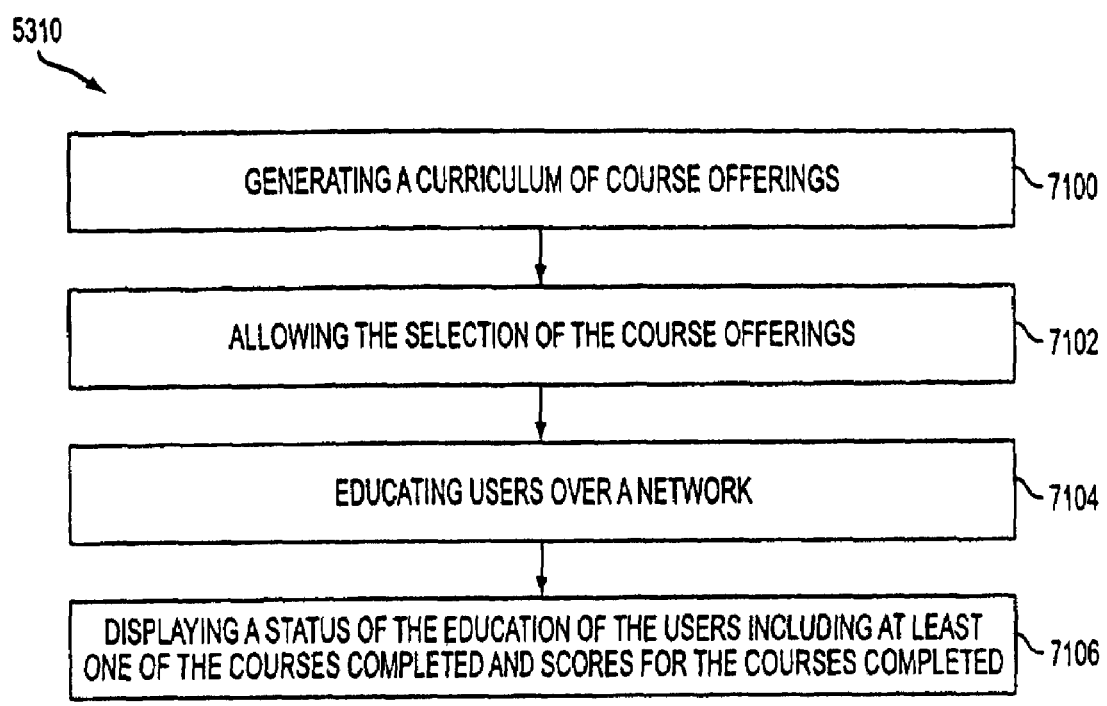
FIG. 71 is a flowchart illustrating the education-related web application services in accordance with one embodiment of the present invention.

One embodiment of the present invention is provided for affording a combination of education-related web application services, illustrated as component 5310 of FIG. 53. FIG. 71 provides more detail. In operations 7100 and 7102 respectively, a curriculum of course offerings is generated from which users are permitted to select, i.e. order, register, etc. Education such as training or the like is carried out over a network such as the Internet in operation 7104. At any given time, a status of the education may be provided, including such things as a listing of the courses completed, scores for the courses completed, a listing of courses for which currently enrolled and the current scores in those courses, a listing of courses required to matriculate, etc. Note operation 7106.

Many school systems have become highly centralized. Large schools have evolved, which serve wide geographic areas. The geographic area covered by some schools is so wide that certain students must make a round trip of one hundred miles, or more, to attend classes.

One benefit of a large, centralized school is that a vast, diverse curriculum can be offered. It is desirable to offer the diverse curriculum, without imposing the long-distance travel on students.

In one form of the invention, a system of computers store lessons which are transmitted to computers used by students. At intervals, the invention assess the students' progress, and selects appropriate lessons for the student at the time.

Highly Simplified Overview

REPOSITORIES hold educational computer programs. Students obtain access to the programs needed, via the NETWORK indicated. The programs instruct the students in an interactive manner.

The students need not be present at the REPOSITORIES, but station themselves at convenient locations, such as their homes, thereby eliminating the need to travel to a physical facility to attend classes.

The Educational Programs

The teaching programs themselves are commercially available, and new programs will be developed as systems such as the present invention become more widely implemented.

Programs which test students, in order to determine the students' master of material, are also commercially available.

The invention provides several highly innovative features which significantly enhance the effectiveness of these teaching programs and testing programs.

Profiles

One is that a PROFILE is generated for each student. PROFILES are discussed in the Related Applications. As adapted to the present invention, the PROFILE is, in simple terms, a description of (a) the present educational status, (b) the educational needs and (c) the educational capabilities, of the student.

Educational Status

Educational status refers to the student's present position in the student's educational career. For example, third-month, secondary-school freshman is one status.

The invention uses the educational status in deciding what material to present the student at a given time, as discussed more fully below.

Educational Needs

Educational needs refer to the instruction needed by the student at the time, which is largely determined by the student's curriculum. For example, the lessons needed by a college sophomore having a curriculum of college chemistry, with emphasis on organic synthesis, are known.

Educational Characteristics

Educational characteristics refer to the manner of teaching to which the student best responds. That is, the invention identifies learning characteristics of each student, and presents material in a manner compatible with the characteristics.

As a simple example, some students can understand the Pythagorean Theorem directly from its mathematical statement, namely, $$hypotenuse^2 = side1^2 + side2^2.$$

Other students do not obtain information from such an abstract statement, and must see the Theorem applied to specific examples before they understand it.

The preferred learning styles are ascertained by a combination of student-counselor interviews, computer-assisted examination of the student, and standard psychological assessment.

The invention uses the PROFILES to select material to present to the student during each session. The PROFILE is updated, if required, at each students' learning session, to indicate progress made during the session. This updating is automatic, and done non-intrusively.

Different Presentation of Given Lesson

The invention includes educational programs which present a given lesson in different ways, in order to accommodate the fact that different students assimilate material in different ways. This collection of different presentations allows implementation of two teaching approaches.

1. Different Presentations of SAME Lesson for DIFFERENT Students

As discussed immediately above, because different students have different learning characteristics, the invention selects a suitable manner of presentation from the collection, based on the learning characteristics of the student. The selection is made based on the PROFILE.

2. Different Presentations of SAME Lesson for SAME Student

The collection of presentations can be used to offer different presentations to a given student, if the student fails to master a lesson when presented the first time. Three reasons exist which indicate that this approach may be desirable.

One, it is expected that a given student does not maintain constant learning characteristics at all times.

Two, the characterization of learning style of a student is not a perfect science. Thus, even if the learning characteristics never change, it is not clear that a perfect match can always be made between a style of presentation and the learning characteristics of the student.

Three, even if the classification of learning style becomes perfected, the subject matter of some lessons may not be amenable to the learning style preferred by the student. For example, there exists a "left-brain, right-brain" conception of human thinking, wherein the left-brain is believed to manage logic, and the right-brain manages creativity and imagery.

For a "right-brain" student, there may exist no directly compatible teaching strategy for explaining "left-brain" subject matter. For instance, there may be no perfectly compatible teaching strategy to explain the principles of artistic color theory to a right-brain student undertaking a curriculum of nuclear physics.

Therefore, the invention presents a given lesson in successive, different ways, if the student does not master the lesson the first time.

Subject Matter Expert

If a student fails to demonstrate mastery of a lesson after a prescribed number of attempts, the invention establishes a video conference between the student and a SUBJECT MATTER EXPERT. The SUBJECT MATTER EXPERT is a consultant who is expert in the subject matter of the lesson causing difficulty. The video conference allows the SUBJECT MATTER EXPERT to identify the difficulties encountered by the student, and to offer coaching.

Establishment of the video conference is allowed by commercially available systems, such as the CLS system described below, and also described in the Related Applications.

CLS places no geographic restriction on the location of the SUBJECT MATTER EXPERT, except that the expert must be able to establish a communication link with the system. With no such restrictions, the SUBJECT MATTER EXPERT can be located anywhere in the world. This feature allows Subject Matter Experts of the highest caliber to be obtained, because such experts are a rare species, and not easily located.

Intelligent Administrator

An INTELLIGENT ADMINISTRATOR, IA, taking the form of a system of programs and computer objects, organizes the instructional activity. The IA does the following: examines the PROFILE of each student, selects the proper lessons for each session, administers examinations to the students, updates the PROFILE, and patches up the student with a SUBJECT MATTER EXPERT when necessary. In addition, the IA assesses the performance of the student, in a continual and non-intrusive manner.

The IA itself can call upon its own SUBJECT MATTER EXPERTS when it encounters a condition which its programming and organization cannot handle.

Greater Detail Concerning Invention

Invention Utilizes Commercially Available Equipment

The invention can be utilized in conjunction with the information management system sold under the trade name "Continuous Learning System" (CLS) and available from AT&T Global Information Solutions Company, Dayton, Ohio. CLS provides the systems to allow the remote access and video conferencing described above.

This discussion will explain some of the relevant features of CLS, and will then consider in greater detail the PROFILES and the IA.

1. CLS Uses Multiple, Linked Computers. In CLS, users interact with micro-computers, such as the well-known, highly advanced, and inexpensive Personal Computer (PC). The micro-computers are located at locations of the users' preference, such as their homes, offices, or vehicles. The micro-computers connect with CLS by data links, such as private or public data networks, or by commercially available telephone channels.

The links can take the form of traditional, hard-wired telephone channels, or wireless links, such as provided by cellular telephone service.

2. CLS Has Vast Storage Capability. Entire Curriculum can be Stored. CLS acts as a storage facility for materials which are generically called RESOURCES. RESOURCES can be classified into two types, namely (a) those which are downloadable and (b) those which are not. Two examples of downloadable RESOURCES are (a) a computer program, and (b) a file stored on a mass storage medium, such as a disc- or tape drive. Two examples of RESOURCES which are NOT downloadable are (a) a 35 mm film and (b) a book, in paper format.

Static and Dynamic Resources

RESOURCES consist of anything which has potential value in terms of recovering knowledge. RESOURCEs include, for example, information which can be downloaded, such as data, files, computer applications, computer-managed instruction. RESOURCES also include SYSTEMS, such as the commercially available information services known as CompuServe and Prodigy, because these SYSTEMS allow recovery of knowledge. Subject Matter Experts are also RESOURCES. RESOURCES can be classified in a different way, namely, as either static or dynamic. The RESOURCES discussed above are of the static type, because, at the time of recovery, they are pre-existing.

Dynamic RESOURCES are not pre-existing at the time of recovery, but come into existence at the time of recovery. For example, when television news media cover an event in real time, such as the State-of-the-Union Address of the President of the United States, information contained in the Address becomes available for recovery (if the news media is linkable to CLS or an equivalent). The information was not pre-existing, but came into existence at the time recovery became possible. (Of course, there is an extremely short time delay between the time of the Address and time recovery becomes possible. This time is considered negligible, and does not render the Address pre-existing.)

Non-Downloadable RESOURCES Can be Used

In general, it is expected that the invention will utilize downloadable RESOURCES primarily. However, because the vast storage ability allows the invention to hold a curriculum of truly immense proportions, it is expected that many educational courses will refer to materials which cannot be rendered into downloadable format, for reasons such as copyright laws. For such courses, the automated retrieval capabilities of CLS become significant. These features are described in the Related Applications.

Storage facilities in CLS are called REPOSITORIES. A REPOSITORY includes one micro-computer, or a group of micro-computers at a single location. (REPOSITORIES can also contain more advanced computers, such as main-frames and mini-computers.) The REPOSITORIES themselves can be distributed over an extremely wide geographic area; they can be spread world-wide. As a result, the RESOURCES will likewise be widely distributed, because they are stored in the REPOSITORIES.

However, despite this geographically distributed storage of RESOURCES, and despite the vast total storage capability of the overall system, CLS allows the user to deal with all downloadable RESOURCES as though physically present on the user's computer. That is, in effect, the user sees all RESOURCES, no matter where located, as though located in the storage devices of the user's own computer.

Therefore, several school districts can maintain their own REPOSITORIES. However, because the REPOSITORIES are linked by CLS, to the student, all RESOURCES appear to be located at a single, convenient location. (Of course, under CLS the student can, if desired, ascertain the fact that the RESOURCES reside in different REPOSITORIES, and are not, in fact, located at a single place.)

3. CLS Has Database Characteristics. CLS can be viewed as a type of database, but with several distinguishing features. One, the storage capacity of CLS is, for practical purposes, without limitation. One reason is that the architecture of CLS centers upon the PC. Expansion of storage in PCs is simple and inexpensive. Further, additional PCs can be added to CLS with little or no software modification: CLS is designed to accommodate this expansion. Stated in other words, the PCs are directly concatenable. In principle, there is no practical limit to the amount of storage available.

A second feature is that CLS allows a user to see a list of RESOURCES, to which the user is allowed access, and allows the user to select a RESOURCE. If the RESOURCE is a computer program, or other object that runs on a processor, CLS retrieves the selected RESOURCE, and launches it.

In the present context, this feature is important, because the RESOURCES include educational computer programs, as discussed below. When the student, or the INTELLIGENT ADMINISTRATOR, selects a RESOURCE, CLS automatically launches it, if possible.

4. CUSTODIAN of Each REPOSITORY Controls Contents (ie, Resources) of REPOSITORY, and Controls Access to RESOURCES Contained within the REPOSITORY. The person, or agency, having physical custody of each REPOSITORY has the power to load RESOURCES into storage within the computers of the REPOSITORY. Thus, the CUSTODIAN controls the contents of the REPOSITORY. Further, CLS allows the CUSTODIAN to designate the parties who shall be granted access to each RESOURCE.

Under the present invention, a local school district, for example, will control the RESOURCES, which contain the curriculum for the students. This school district will control access to the RESOURCES, and can grant access to students of other districts, if desired.

5. Each RESOURCE Has a PROFILE. A "RESOURCE PROFILE" is a collection of information which describes a RESOURCE. The PROFILE contains, for example, a) a descriptive title;

b) the REPOSITORY containing the RESOURCE;

c) information about physical characteristics of the RESOURCE (media type, such as computer disc, video tape, paper book, etc.);

d) relevant dates, such as date of loading into the REPOSITORY;

e) security-related information;

f) and so on.

The PROFILEs are somewhat analogous to the cards of the card catalog of a library. In a library, the books, and other media, such as film and video tape, constitute RESOURCEs. In CLS, the RESOURCEs include a more diverse array of media types than a library, but the PROFILEs serve a function similar to that of the cards.

Adaption of CLS to Education

A LEARNING PROFILE is generated for each student, in a manner discussed in greater detail below, and these are called LEARNING PROFILES, to distinguish them from RESOURCE PROFILES, which describe RESOURCES, and not students. The LEARNING PROFILEs conform to the PROFILEs used by CLS for RESOURCEs generally. The student-PROFILEs contain information about the student which is relevant to the INTELLIGENT ADMINISTRATOR. The LEARNING PROFILES can be arranged to follow the students through their entire careers, subject to legislation regarding privacy of the content of the LEARNING PROFILES.

LEARNING PROFILE Creation

The LEARNING PROFILE can be created in numerous different ways. For example, standard psychological testing techniques and personal interviews can allow a counsellor to generate a LEARNING PROFILE, which is loaded into CLS.

As another example, CLS itself can administer known, standard tests, and develop the LEARNING PROFILEs without intervention of a counsellor. In practice, the LEARNING PROFILE generation will probably be undertaken in a procedure which is a hybrid of these two examples. At the end of the Specification, a discussion is given regarding learning strategies, and contains additional material relevant to LEARNING PROFILE generation.

PROFILE Content

The LEARNING PROFILES contain information such as the following:

1. Student's curriculum, or "major." One benefit of the invention is that all students, at all levels, can be given individualized attention. Even very young students can be given a "major" if desirable.

That is, in present educational systems, younger students, such as those in the earlier years of primary education, are usually not given specific curricula. For these students, education tends to be non-specialized and generic; all students tend to be given similar courses.

The invention allows education to be tailored to individual needs, at all educational levels. One reason is reduction in cost: the invention contains the vast array of lessons needed to provide individual attention. There is very little added cost in making the individual attention available to additional students.

2. Preferred teaching strategies. At the end of the Specification, teaching strategies are discussed. In general, different teaching strategies are available for most, if not all, subjects. As an example, the Suzuki method of teaching piano illustrates one teaching strategy.

Under this strategy, students listen to recordings of piano music played by a master, and then imitate the master by playing the music themselves, while reading sheet scores of the music. While the student plays, a teacher coaches the student. Right from the start, the student plays complete (though simple) songs.

In contrast, under another method, the student does not initially study complete songs, but instead studies the components of songs, namely, single notes, their duration, their intensity, and so on.

Both methods have their advocates and critics. Without considering the debate itself, it seems reasonable to assume that neither method is perfectly suited to all students.

The invention, if called upon to teach piano, would recognize this fact. Under the invention, each student's PROFILE contains an indication of the student's preference, such as for the Suzuki method, or another approach, and the student is instructed accordingly.

3. Student's present standing. The PROFILEs contain a statement of the student's previous accomplishments, which indicate the student's present standing, or status.

From a lifetime viewpoint, the present standing refers to the present educational level of the student, such as fifth grade, or college sophomore.

From a more focused viewpoint, the present standing refers to the courses presently being taken, and the progress made in each. For example, in a high-school course in algebra containing 60 lessons, the present standing will indicate the number of lessons successfully completed.

The present standing provides specific information for CLS to use in determining what material to present to a student during a given session.

The present standing is preferably ascertained in a non-intrusive, transparent manner, based on a demonstration of level of competency by the student. Level of competency can be determined, in many, if not most, subjects, by assessment in a hierarchical fashion. For example, assume that a given student is undertaking a course in calculus. Calculus textbooks present material in a sequential manner, in the sense that mastery of earlier material is required as a prerequisite to understanding later material. A simple assessment of level of competency of a student can be done by determining in which chapter of the textbook the student's mastery ends.

As another example, assume that the student is undertaking a course in gas turbine engine maintenance. Many maintenance procedures involve sequences of events, wherein the order cannot be changed. A student's level of competency can be assessed by determining how much of a given sequence the student has mastered.

It is significant that the source of a student's knowledge which determine the level of competence is not germane to the assessment process. The assessment process seeks to determine a level of performance, or level of competency, because the goal of the overall education process is to enhance ability to perform.

4. Significant personalized information. This is perhaps a sub-class of preferred teaching strategies. This section contains information about unique attributes of the student which either present difficulties in teaching the student, or facilitate teaching.

For example, a student who has a hearing impairment may require special lessons, as compared with a student having hearing abilities within the norm of a standard population. As another example, a student who has a photographic memory may find that learning the vocabulary of a foreign language is an extremely simple task.

The PROFILEs, in general, facilitate the IA's matching of the students' needs with the RESOURCEs which are suited to those needs. The PROFILEs contain information such as that described above, plus additional information required, to accomplish this goal.

RESOURCEs

In general, RESOURCEs include all materials made available by CLS. In the context of education, RESOURCEs include a significant number of computer programs which teach. There are numerous types of such programs, and hundreds, and perhaps thousands, are commercially available today.

Intelligent Administrator

The Intelligent Administrator (IA) is a system of computer programs, which can operate alone, or in conjunction with an SME or other consultant. The IA does the following:

1. Based on PROFILEs, the IA assesses a student's current standing within a curriculum, and determines the skills required for the student's present advancement.

For example, the IA may determine that a given student stands at the beginning of the junior year in high school, and that the student has successfully completed 12 of 60 lessons in analytic geometry. Based on this assessment, the IA decides that lesson number 13 should be given next.

2. The IA locates the RESOURCEs necessary for the required lessons. In this example, the IA would locate lesson 13, identified above. Lesson 13 will probably reside in the local school district's REPOSITORY, but, because of the capabilities of CLS, lesson 13 can reside anywhere within the overall CLS system.

Since multiple teaching strategies are available, and are used if the first-chosen strategy does not produce results, the IA locates the multiple RESOURCEs which represent the multiple strategies. (In the general case, these RESOURCEs will not be located in the same REPOSITORY, although they can be.)

3. The IA assesses whether the RESOURCEs are successfully imparting the knowledge desired to the students. This assessment can be done by using known, standardized testing approaches, given by computer.

Additional Considerations and Characterizations

1. Different presentation of a given lesson was discussed above. In the section entitled "Teaching Strategies Generally," located below, references are discussed which elaborate on the concept of different learning behavior of different students. These references provide the general principles of creating different presentations.

A more rote-minded approach would be based on the fact that different teachers themselves probably make different presentations of a given topic. Therefore, one approach to generating the different presentations is to assign a number of teachers, say ten, the task of each writing a lesson explaining a topic. The ten different lessons will provide ten different presentations for the collection of presentations.

2. The invention measures the rate of learning of the student, and prompt the student to end a lesson when the rate is seen to significantly falter. For example, suppose that a student is studying a subject which is memorization-intensive, such as biology. The lessons can be arranged such that learning is presented in groups of twenty concepts. After each group of twenty is presented, an assessment of the student is done.

The IA logs the time required by the student to learn each group. When the time falls below the best time by a predetermined amount, say thirty percent, the IA attempts a different teaching strategy. If that fails, after a predetermined number of attempts, then the IA patches the student into a Subject Matter Expert.

3. One form of the invention includes the following components:

a) CLS.

b) The educational programs, including the different presentations of a given subject, which are commercially available, or can be developed based on known principles.

c) PROFILES, which are developed according to the teachings of this Specification.

d) The INTELLIGENT ADMINISTRATOR, which primarily i) selects different teaching strategies, based on A) profile of student and B) success of previous lessons.

The details concerning implementation of the INTELLIGENT ADMINISTRATOR are known, given the mission of the IA as described herein.

e) The SUBJECT MATTER EXPERTS.

4. The video conferencing feature of CLS allows a SUBJECT MATTER EXPERT to teach small groups of students, and the students to confer with each other. As an example, after students in an ordinary school take an examination, many of them congregate and compare opinions on the exam. Under the invention, similar behavior is possible, but by way of video conferencing.

5. The distributed aspect of learning is important. A student can undertake learning at any location, provided a Communicator is available to link with CLS, or an equivalent.

For example, a newly hired business person must learn certain internal procedures followed within the hiring organization, such as filling out expense account forms. It is known in the art how to write a program which explains how to fill out such a form. (In a highly simplistic sense, the program can merely repeat the text of written instructions which undoubtedly have been written.)

This instructional program is made available via CLS. The business person can now learn how to fill out the expense "form," using a Communicator, such as a PC and a modem, at any desired location, such as in a waiting lounge at an airport. Then, having mastered the procedure, the person can fill out needed "forms" at any location whatsoever, provided a link to CLS, or to an equivalent, is available.

6. Two learning styles are discussed herein, namely, "holistic" and "linear." There exist other distinctions in approaches to explaining subject matter to a student. Three examples are the following.

A. Some students prefer to read material; others prefer to hear an explanation of material spoken by a teacher.

B. Some students prefer to have material presented in a verbal format, either in writing (which is read) or in speech (which is heard). Other students prefer to have material presented in graphical format. A good example of this distinction is found in Gray's Anatomy. Two versions exist: there is a version which is primarily textual, and contains few pictures. There is another version which is primarily graphical, and is replete with pictures.

C. When technique is being taught, some students prefer to see a demonstration; others prefer to hear a description of the principles of that demonstration.

Profiles and Learning Strategies

One Approach to Developing a Learning Profile

The invention obtains necessary data from the student, such as name, age, and previous learning completed in school. This information allows the AI to place the student in the proper grade.

The invention then ascertains the student's preferred learning style through an entry adventure. (Different adventures will be given to students of different age, so the age, or last grade completed, will influence the choice of entry adventure presented to the student.)

Each student can take a new entry adventure every year, to ascertain whether the learning characteristics have changed. Also, since girls and boys differ in their intellectual and social development, and since the entry adventure should catch their interest and create enthusiasm for the coming year's studies, different versions will be used for boys and girls.

In this adventure students solve a problem, or pursue an adventure. The choices made indicate their comprehension speed and favored style of learning.

Learning Speed

The student's learning speed can be measured by how long it takes a student to solve a given problem, or to perform an assigned task. Several problems will be embedded in the adventure; the problems will provide information and then require the student to apply it in situations which require different levels of complexity and integration. The invention can tally the total time elapsed for the student to solve the problems, and compare the total to the norm for that grade in the student's school district or region. (This learning speed measure is different from IQ measurement; research has shown that even above-average students differ in their learning speed.)

Physiology can Correlate with Learning Speed

There has been some research pioneered by W. C. Sheldon at Harvard in the 1930's and 40's, on the correlation between body type and learning characteristics. (Smith, 1949, pp. 310–320). Sheldon delineated three body types, based on the embryonic source of tissue: ectomorph (tall and skinny), mesomorph (compact and muscular) and endomorph (large and or overweight).

More recently, Chopra has pointed out that a particular traditional medical system, of interest to him, also defines three basic physiological types in a manner similar to Sheldon's. (Chopra 1990, pp. 33–41).

According to Chopra, some students (endomorphs) learn slowly but retain knowledge quite well, and others who learn quickly tend to forget just as quickly (ectomorphs).

Therefore, physical examination of students may provide data indicative of learning characteristics. Further, the invention can be used to validate, or derive, correlations between measured physiological parameters and learning behavior. When correlations are found, the identification of learning characteristics can be made based on the physiological parameters, which are presumably easier to ascertain.

For example, a standard set of physiological parameters of students are measured and placed into the PROFILES. Known medical and public health techniques list these standard parameters. Then, over time, the INTELLIGENT ADMINISTRATOR looks for correlations between learning speed, preferred learning style, etc., and the parameters. Known statistical techniques provide the correlation.

When correlations are found, then the measured physical parameters are used to indicate the learning characteristics of subsequent students, rather than testing for the characteristics themselves.

Preferred Style of Learning

There is much written in educational psychology about learning styles, usually referred to as "cognitive styles." Cognitive style, or learning style, refers to the way in which a student prefers to organize his or her thought processes—his or her preferred mode of thinking. There are a few different approaches which could be used, but by far the largest body of research shows that learning style preferences usually fall into one of two groups, stereotyped as artistic or scientific thinking.

Hunter Breland, a research psychologist for the U.S. national Educational Testing Service, asserts that "the most widely examined" cognitive style is the continuum of field dependence/independence (Breland, 1981, p. 38). The basic difference between field dependent and field independent problem-solver is that the former tend to depend on cues from the environment to solve the problem, and the latter tend to rely more on internal cues. He quotes a study by Witkin et al. (1977) which indicates that field-independent college students tend to major in the sciences while the more field-dependent students gravitate toward majors in education (p. 38).

Entwistle (1981) writes about Pask's research categorizing students as "holist" or "serialist." The holist learning style, called comprehension learning, involves "building descriptions of what is known." The serialist style is called operation learning, "the facet of the learning process concerned with mastering procedural details." (p. 93)

When Pask assigned students to either a matched or mismatched learning situation, the results were notable: the matched students were able to answer most of the questions regarding the lesson, while the mismatched students generally scored less than 50% correct. Entwistle's conclusion is that although teachers will never provide as extreme an example of mismatching, there is evidence in primary education to support the fact that different teaching methods are effective to different degrees for students with different personality characteristics.

There has been other research indicating that students differ in their preference of inductive or deductive reasoning. Another area of research has been whether students prefer to use what are commonly considered "right brain" skills (creativity, association, imagery, analogies, spatial relationships, feelings) or "left brain" skills (logic, sequence, organization, structure, procedure).

All of these approaches have the same theme: the basic question is whether a student prefers to use logical, procedural, linear thought processes or holistic creative (associative), spatial processes. Most authors point out that many learners are flexible and can move relatively easily between the two cognitive styles. And, as most every author points out, everyone must use both approaches at different stages in the solution of a problem, and the ideal is to be able to function well in both (e.g., an architect must think creatively to plan a house, but then he must also know clearly the sequence of building, or the house will not materialize).

This computer program can assess whether one of these learning styles is preferred on the basis of choices made in the context of the entry adventure. If a student is reasonably comfortable with both, then he or she will be branched into the standard curriculum, which is a mix of both styles. If, however, a student displays a dear preference for one style, he/she will be branched into a curriculum which favors explanations and examples in that style.

Delivering the Content and Mastery of the Material

The curriculum must also be structured from sound learning principles. There are a few different schemes for classifying the necessary conditions for learning but Gagne's learning outcomes and conditions of learning are the most thoroughly developed and therefore the most useful in developing computer-based instruction.

Gagne classified all possible learning outcomes into five performance categories: intellectual skills, cognitive strategies, verbal information, motor skills, and attitudes. Examples of these, along with their subcategories, are shown in Table 3.1, below, taken from Gagne's Essentials of Learning for Instruction (1975, p. 68). These are useful for design purposes in that they describe capabilities which apply across all subject matter areas. According to Gagne, certain conditions are necessary for learning each of these types of outcomes. Some conditions are "internal" and some are "external."

The internal conditions define prerequisite knowledge or skills, and external conditions define certain aspects of the instruction; the invention should be concerned with both. The following descriptions of internal and external conditions required are derived from Gagne's The Conditions of Learning (1977, pp. 25–49).

For the learning of intellectual skills, the primary internal condition is that the student have prerequisite skills which provide the components of the new skill being teamed. External conditions are often in the form of verbal directions which guide the combination of simpler skills into a new integrated whole.

In terms of verbal information, internal requirements are that the learner have a good mastery of linguistic rules and vocabulary in order to understand statements presented, and he or she must also have previously existing "cognitive structures" (p. 40), or structures of meaningfully organized information which will give meaning and context to the new material presented.

One external condition is stimulation of the appropriate cognitive structure (usually in the form of an advance organizer). Another is informing the learner of the objective of the learning; this focuses the learner's attention. A third may be repeated hearing or reading of an informational passage; most modern theories concur that more information is assimilated with each repetition (p. 40).

Cognitive strategies refer to how the learner organizes his or her own thought processes (attention, learning, remembering, thinking). The internal conditions required are memory of intellectual skills and verbal information previously learned which relate to the new task presented. The most effective external condition is evidently frequent opportunities to practice strategizing. According to Gagne, practice refines and improves the strategies.

TABLE 71A

Five Major Categories of Human Capabilities, Representing the Outcomes of Learning with Examples of Each

| Learning Outcome | Example of Human Performance Made Possible by the Capability |
|---|---|
| Verbal Information | Stating the provisions of the First Amendment to the U.S. Constitution |
| Intellectual Skill | Showing how to do the following: |
| Discrimination | Distinguishing printed b's from d's |
| Concrete Concept | Identifying the spatial relation "be low" |
| Defined Concept | Classifying a "city" by using a definition |
| Rule | Demonstrating that water changes state at 100 C. |
| Higher-order Rule | Generating a rule for predicting rainfall, given conditions of location and terrain |
| Cognitive Strategy | Originating a novel plan for disposing of fallen leaves |
| Attitude | Choosing swimming as a preferred exercise |
| Motor Skill | Executing the performance of planing the edge of a board |

The learning of motor skills (e.g., courses in drafting, carpentry, etc. in the curriculum) requires the student to master in overall sequence and pattern of movements. Especially in the case of a complicated procedure (e.g., constructing a chair) sometimes the sequence must be learned in parts, which are then put together. The main external condition required is repeated practice, which makes performance more and more smooth and predictable.

Attitudes are expressed behaviorally; therefore one internal condition for learning new attitudes is that the learner must have mastered whatever skills or knowledge the behavior requires (e.g., knowledge of the rules in order to enjoy playing chess, etc.) Another internal condition is that the learner must have admiration and respect for people who are seen doing the behavior; this is called "human modelling" (p. 46.) The only external conditions which seem to be effective are that either the learner himself or a human model experiences the effects of an action as "good" or "bad."

A summary of the external conditions which facilitate learning is shown in Table 4.2, from Essentials of Learning for Instruction (Gagne, 1975, p. 93). One way the invention will ensure mastery will be that the entire curriculum will be designed in accordance with these sound and widely accepted learning conditions of Gagne.

The invention has two ways to help a student who demonstrates through his or her score that internal conditions of learning are deficient (e.g., prerequisite skills or knowledge are lacking). The first is that a HELP screen is always available at the student's request. To avoid boredom or frustration, a student will be able to access a HELP screen at any point during an instructional unit. This first level HELP screen will allow the student to:

change skill levels (learning speeds)

change learning styles request another explanation request review of any previous material request a conference with a teacher Depending on the option chosen, the invention will then adjust a student's learning speed up or down, give another explanation and examples (one in the same learning style and one in a different learning style), review specific sections in the unit (or all previous information in the unit), or connect the student to a live video teleconference with a teacher. Access to this HELP screen is optional, and a student may choose it once, several times, or not at all during a unit of instruction.

TABLE 71B

A Summary of External Conditions Which Can Critically Influence the Processes of Learning Class of Learning

| Objective | Critical Learning Conditions |
|---|---|
| Verbal Information | 1. Activating attention by variations in print or speech<br>2. Presenting a meaningful context (including imagery) for effective coding |
| Intellectual Skill | 1. Stimulating the retrieval of previously learned component skills<br>2. Presenting verbal cues to the ordering of the combination of component skills |

TABLE 71B-continued

A Summary of External Conditions Which Can Critically Influence the Processes of Learning Class of Learning

| Objective | Critical Learning Conditions |
|---|---|
| | 3. Scheduling occasions for spaced reviews<br>4. Using a variety of contexts to promote transfer |
| Cognitive Strategy | 1. Verbal description of strategy.<br>2. Providing a frequent variety of occasions for the exercise of strategies, by posing novel problems to be solved. |
| Attitude | 1. Reminding learner of success experiences following choice-of particular action; alternatively, insuring identification with an admired "human model"<br>2. Performing the chosen action; or observing its performance by the human model<br>3. Giving feedback for successful performance; or observing feedback in the human model |
| Motor Skill | 1. Presenting verbal or other guidance to cue the learning of the executive subroutine<br>2. Arranging repeated practice<br>3. Furnishing feedback with immediacy and accuracy |

Students who score average or above average will be able to:

go to the next unit change subjects

Request a live conference with teacher

Log off for now.

The conference option with SUBJECT MATTER EXPERTS makes it possible for a student who has mastered the unit but who is curious about tangential or deeper levels of the material to ask questions while his or her interest is still fresh. If a teacher needs to research the answer, the student could find the answer on the system at log on the next day, or CLS can page the student with a notice of the answer's availability.

A student who scores below average on the unit would automatically be given a diagnostic check. This is the second way in which the system can assess lack of prerequisite skills, as well as other problems. The diagnostic check will be in the form of a question (Did you use the HELP screen during the unit?) and a menu for the student to choose from:

Too easy

Too hard

Not straightforward enough (linear-biased learners will tend to think this about a curriculum that is too holistic)

Explanations seem incomplete (holistic-biased learners will tend to think this about a curriculum that is too linear).

Other (Re-wording may be necessary for younger learners, but the idea will be the same.)

The computer system will automatically process the diagnostic results and adjust the curriculum accordingly. If the student requests, or checks "Other" he/she will be connected with a teacher for a live teleconference. After this diagnostic step, the student will then be given a menu screen with the choices:

further study change subjects log off

If the student chooses to either change subjects or log off, the computer will automatically place him at the beginning of customized remediation for this unit the next time this subject is requested. If the student chooses further study, he will begin the customized remedial content for the unit. This will include new explanations, examples, and practice situations.

When the remedial unit is complete, the score is displayed, and the above loop is repeated. If the student's score is still below average, he should automatically be connected with a teacher for a conference.

The teachers who work with this system will need to have Teachers' Guides containing all the content and resources in the system; there will be one of these for each grade level. They will need to know these well so that they can give assignments within the system to cover different problems that may arise.

The invention can be designed to provide many options, and the student's preferences can lead him through the curriculum to some extent; but the teachers' role will be critical in guiding the student through any rough spots, and being sure that the entire year's curriculum is completed on time.

Evaluation and revision must be built into the implementation of the system, especially for the first two years of use. Both the student and teacher should evaluate each unit of instruction as it is completed. The student could have a very short on-screen questionnaire immediately after the unit score is displayed, and the teacher could have the option of recording any comments about the content or design of the unit in the light of that student's experience.

Sample Lesson

Johnny, age 10, logs on to the system for the first time. The screen asks him to type his name, age, and assesses Johnny's last grade completed in school, which in this case was fourth grade.

The computer automatically branches Johnny into the fifth grade entry adventure for boys—the world of ancient Welsh legends, brought to life again through a time warp caused by the bizarre collision of incompatible electromagnetic fields on the exact spot where the Lord of Death was vanquished centuries ago. Death and his forces are abroad again, causing terrible damage. The challenge is to find him and trap him into returning to this spot, where the quantum mechanical laws of nature are normally strong enough to hold him fast.

To help Johnny solve this challenge, two guides provide assistance: one explains things using analogies and associations, and the other uses logical, linear, no-frills explanations. Johnny is frequently asked which of these guides he wants to ask for advice; in this way, the system can determine whether Johnny has a preferred learning style.

Johnny is given information of varying complexity at different points in the adventure. He is then asked to apply it in a number of situations. The computer tracks how many choices it takes Johnny to solve the problem, and compares this number to the norm. Assume that Johnny falls into the lower range.

Having finished the entry adventure, CLS identifies Unit 1 of the science curriculum. He first sees a short video clip of the science teacher, who introduces himself, explains how the unit is structured, and reminds Johnny that the HELP screen is available at any time, and that Johnny call talk with him in person by choosing that option. Then Johnny begins Unit 1.

The testing indicated that Johnny is a slower learner who is more comfortable with a holistic learning style, so he is branched into the holistic-dominant curriculum at the slower learning speed. First he sees and hears the story which acts as the advance organizer for the year's science study: there is a benevolent extraterrestrial messenger who has been given one year to convince his superiors that the earth should be spared from destruction.

Johnny's lessons examine selected features of the earth. At the end of each lesson, Johnny must provide information to the messenger which indicates whether the features studied have value, and should be preserved, so that the messenger can relay the information. The learning objectives for the year will be listed in this context.

Then Johnny will see the tasks (learning objectives) that he must master for Unit 1 on Geology.

The learning outcomes expected in Unit 1 also verbal information, intellectual skills (all levels) and cognitive strategies. Gagne's critical learning conditions (e.g., presenting important ideas in context or building in occasional reviews of what has been learned) from Table 4.2 provide the structure for the stories, games, and adventures which comprise the unit of instruction.

Johnny works along in this highly—but transparently structured—learning environment until he doesn't understand something. At that point, he remembers that he can use the HELP screen. He chooses the HELP screen and indicates that he wants a further explanation. He is given two more explanations (one in each learning style) with examples and two practice questions at the end. His answer indicate that he understands, and he is branched back into the unit.

Later in the unit, he isn't sure that he understands something and he chooses "practice questions" under HELP 1. Still confused after those he asks for further explanation, which still doesn't clear up the problem. He is automatically branched into a live teleconference with the teacher, who sets him back on track, and tells Johnny how he can get more information on the subject if he wants, but tells him that now he can also go on if he prefers.

Johnny continues work in the unit until he has another question; he calls up the HELP screen and selects "further explanation." This time he understands well enough after the explanations to answer the two practice questions correctly, and he is then branched back into the unit.

Johnny finishes the unit with a test of his mastery of the learning objectives for the unit. Rather than calling it a test, the system presents it as his report for the extraterrestrial; it includes geological reasons why the earth, and the study of its geology, is important.

Johnny finishes the unit with an average score. He is asked to answer three short questions ("What did you like best about this unit?" "What did you like least . . . ?" "Any ideas for making it better?") regarding the appeal and effectiveness of the unit. Then he is given the options of going on to the next unit, changing subjects, talking with the teacher, or logging off.

Curriculum Generation and Marketing Collateral

Provides a review of standard course descriptions and objectives

Provides ability to review and define a custom curriculum

Offers a course catalog with descriptions of course-ware and curriculum planners Provides previews of training courses Allows download of educational collateral The education related services component of the present invention generates a curriculum of course offerings in operation 7100. A review of standard course descriptions and objectives is provided. Also provided is the ability to customize the curriculum. Course information and dates are described in a course catalog, which is displayed or made available for download. The course catalog may also describe course-ware and suggest curriculum. Also available for download is educational collateral. Optionally, previews of training courses may provided for example as promotional material or to help a user prepare for the first class.

Figure 72:
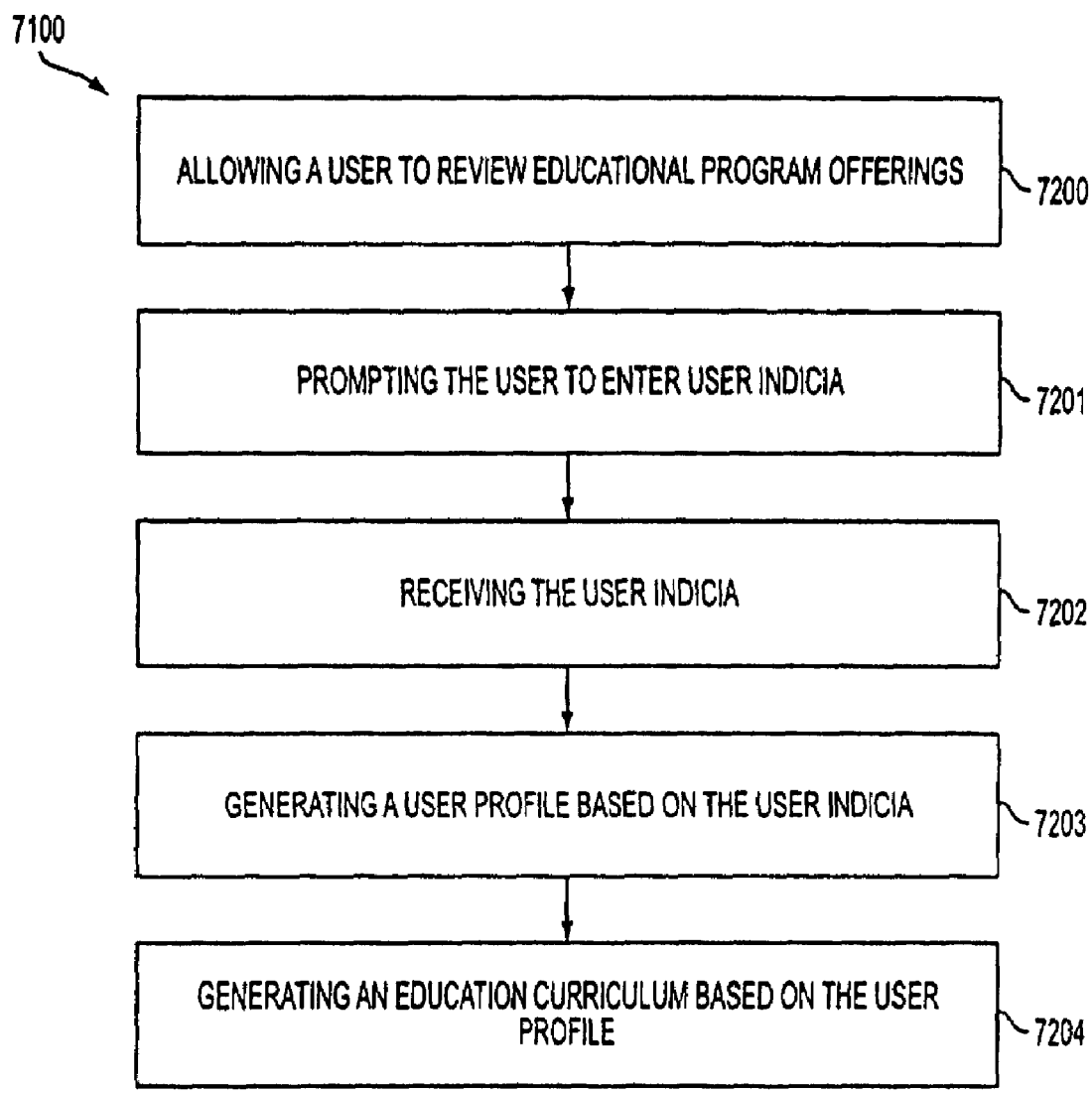
FIG. 72 is a flowchart illustrating one manner of generating an educational curriculum in the education-related web application services in accordance with one embodiment of the present invention.
Figure 73:
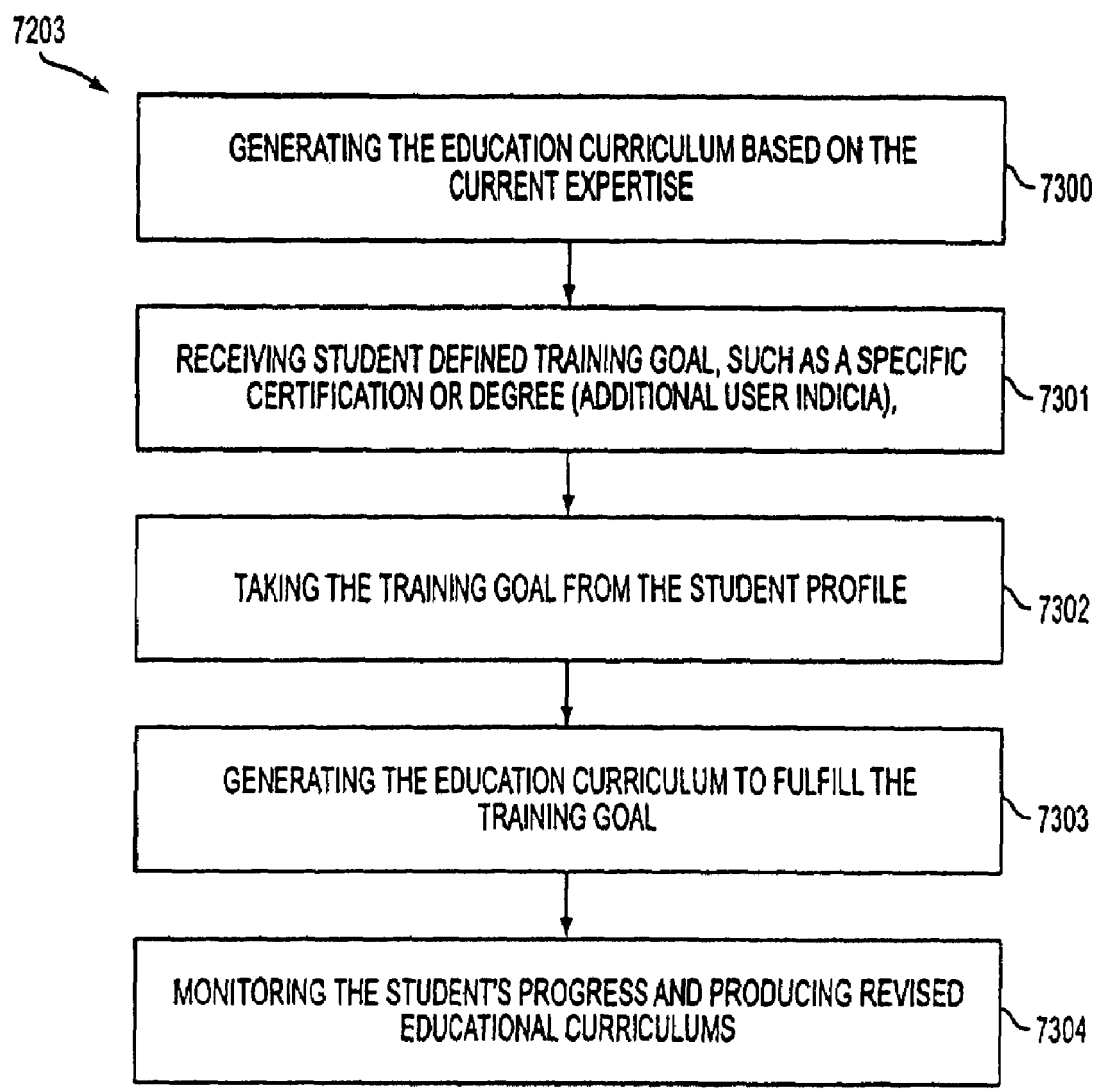
FIG. 73 is a flowchart illustrating one manner of generating an educational curriculum in the education-related web application services in accordance with one embodiment of the present invention.

One embodiment of the present invention is provided for automatically generating a student educational curriculum. See FIG. 72. First, in operation 7200, educational program offerings are displayed, which a student is allowed to review. Next, in operation 7201, the student is prompted to define his current expertise by completing a student profile (user Indicia), which is received by the invention in operation 7202 and used to generate a user profile in operation 7203. Referring to FIG. 73, for example, the student profile may define a current expertise. The education curriculum would be generated based on the current expertise in operation 7300. Then, the student defines his training goal, such as a specific certification or degree (additional user indicia), which is received in operation 7301. Or the training goal may be taken from the student profile in operation 7302. The education curriculum is generated to fulfill the training goal in operation 7303. The student's progress is monitored and revised educational curriculums are produced, when necessary, in operation 7304 based on the monitored progress. Finally, an education curriculum based on the user profile is generated in operation 7204 of FIG. 72.

The student may also opt to follow the original educational curriculum or the revised curriculum. Incentives and disincentives may be utilized to influence the student's curriculum choices.

Register for Training and Order Training

Provides an interactive interface to register for all offerings

Integrates with commerce functions to provide order placement and transaction processing (e.g. Takes orders online by credit card)

Allows users to register for third party training

Allows users to register for online training

Supports multiple payment options

Integrates with third party systems

Users may order and register for any educational offering on an interactive interface through operation 7102 of FIG. 71. Examples of offerings may include third party training and online training. The interactive interface may be integrated with the commerce component to permit transactional processing when placing an order. For example, a user may sign up for an offered course and pay the tuition by credit card. Alternatively, the commerce component could create a payment schedule which requires that payments be made periodically. Optionally, the registration and ordering components are able to integrate with third party service providers' systems.

Online Training

Courses can be deployed over a variety of environments (e.g. LANs, WANs, intranets, internet, etc.)

Offers tests over individual courses as well as entire curriculum

Offers courses that can be taken live, directly from the web server or downloaded to learner's workstation Provides ability for administrators to post bulletins announcing new course-ware The education related services component of the present invention educates users over a network such as a LAN, WAN, an intranet, the internet, etc. Note operation 7104 of FIG. 71. Courses may be taken live, directly from a server, or downloaded to the workstation of a user. Bulletins relating to the courses could be posted on electronic bulleting boards or electronically mailed to individual students. Tests may also be offered over individual courses as well as entire curriculum.

Training Account Status

Provides ability to check progress in individual courses or entire curriculum

Provides ability to match their completed courses against vendor certification program requirements Provides ability for administrators to track training library usage Provides ability to send in status reports to administrators via various media Integrates with third party training centers to update training status The status of the education of the user may be checked at any time in operation 7106, including checking progress in individual courses or the entire curriculum. A user is also able to match completed courses to certification program requirements. Administrators are permitted to track training library usage as well as receive status reports of individual students or all students in a course. Optionally, the education related services component of the present invention integrates with third party training centers to update the training status of a user, particularly useful for users who wish to take courses of another program.

Customer-Related Web Application Services

Referring to component 5312 of FIG. 53, one embodiment of the present invention is provided for affording a combination of customer-related web application services to support a product. More detail is provided in FIG. 74. In operation 7400, a user is allowed to register the product. Further, on-line support information is provided about the product. Such support information is provided based on queries. Note operation 7402. As an option, this information may also be afforded by way of a specially managed call center. In addition, in operation 7404, claims may be handled relating to the product. During operation 7406, the users are automatically notified of upgrades and/or problems relating to the product. Consulting services may also be made available.

Product Registration

Allows customers to register products online

Automatically sends users confirmation of registration

Notifies users of upgrades or other product-related information

Maintains database on user's purchases to create profiles

Operation 7400 of the web customer service component of the present invention allows the registration of a product, preferably online. Upon registration of a product, confirmation that the registration has been received is automatically sent to the user, such as by email. Notices of upgrades, promotions, and other product-related information is sent to registered users. A database stores the purchases of each user to create profiles, which may be used statistically for marketing purposes.

Web Based Self-Support/Knowledge Search/Diagnostics Search
Accepts queries in natural language format
Responds with additional questions to facilitate issue resolution
Provides solutions over several mediums (e.g. links to web pages, graphics, illustrations, software updates, etc.)
Offers an online technical library for quick troubleshooting
Provides downloads of software fixes/updates
Refers users to create service cases for unresolved issues Referring to operation 7402 of FIG. 74, support information on a product may be searched for based on queries input by a user. Queries may be accepted in natural language format as well as by keyword. The support component may respond with additional questions relating to the matter at hand in an effort to better identify the problem. Solutions may be provided over several mediums, including links to web pages, graphics, illustrations, animations, downloadable software updates and fixes, etc. Also provided may be an online technical library with answers to common questions for quick troubleshooting. For unresolved issues, the user may be asked to create a service case which will be followed up on later by a technician.

In a traditional case, where goods are introduced to a customer in a traditional way, that is, through a catalog sent via traditional mail (not electronic mail) and so forth, or through other media, without using an online communication system, If the customer has a question about the introduced goods, the customer may directly call a company or the like which handles the goods and inquire thereof about the goods. In such a case, the customer tells the company the trade names, article identification numbers, and so forth, of the goods. Then, the customer may obtain an answer as to how to use the goods, a payment method when buying the goods, and so forth, from a person in the customer service division in the company.

However, in an online mail-order case, goods information is transmitted to a customer from the center (the sales company) via the online communication system. In response thereto, the customer may make an order for an article and transmit this information to the center via the online communication system. Therefore, in such a case, it is not possible to perform direct conversation between the customer and the center (the sales company). A database has been considered for explaining goods and answering possible customer's questions. However, the contents of the customer's questions may vary for each particular customer. Therefore, the database which can answer various possible questions of the customer needs to have a very large amount of data and thus may be inefficient. Further, when assuming all possible customer's questions about the goods and preparing answers thereto, it is not possible that customers actually ask all the assumed possible questions. Therefore, a database may not be an efficient way to prepare all the answers for all the assumed possible customer's questions.

The present invention has been developed in consideration of the above-described problems. The present invention provides an answering method and system in online shopping which enables, in an online communication system, easy production of data for answering customer's questions and preparation of answers to general questions. Further, the answering method and system, in online shopping, enables, in a case where complete answers could not be prepared for all the possible questions, an answer to be transmitted to the customer when the answer has been prepared for a particular question given by the customer via electronic mail.

According to a first aspect of the present invention, in online shopping in which a mail-order business is conducted between a center and a terminal via an online communication system, for answering a question of a customer, necessary but minimum answers to questions are prepared in a database; the database is searched when the customer asks a question A, and, when an answer A to the question A is present in the database, transmits the answer A to the customer via the online communication system; an answer B is prepared when an answer to the question A is not present in the database, and the answer B is stored in the database; and the answer B is transmitted to the customer via electronic mail.

According to a second aspect of the present invention, the question A is stored as inquiring screen image information to be transmitted to customers, when an answer to the question A is not present in the database.

According to a third aspect of the present invention, the customer is able to input any other question when the customer wishes to ask a question other than predetermined questions previously stored in an inquiring screen image information; any other question asked by the customer is temporarily stored when receiving any other question; any other question and an answer thereto are stored as a question and answer set, when the answer thereto is prepared; and, at an any point of time, the database and the inquiring screen image information are updated using the question and answer set.

According to a fourth aspect of the present invention, in online shopping in which a mail-order business is performed between a center and a terminal via an online communication system, for answering a question asked by a customer, there is provided an answer database for previously storing necessary but minimum answers to questions; question item determination means for receiving a question A from the customer and determining whether or not the question A is included in predetermined question items; search means for searching the answer database when the question item determination means has determined that the question A is included in the predetermined question items; online transmission means for transmitting to the terminal, via an online communication system, an answer A obtained by the search means; answer requesting means for requesting an answer when the question item determination means has determined that the question A is not included in the predetermined questions; updating means for updating the answer database using an answer B after the answer B is obtained through the answer requesting means; and electronic mail transmission means for transmitting the answer B to the terminal via electronic mail after the answer B is obtained through the answer requesting means.

According to a fifth aspect of the present invention, the updating means includes goods master file updating means for adding a question type code representing the question A to at least one predetermined question type of a goods master file when the question A has received the answer B. The goods master file stores the at least one predetermined question type corresponding to a question item relevant to an article code of an article that the customer selected.

According to a sixth aspect of the present invention, the updating means comprises inquiring screen image information updating means for adding the question A to the inquiring screen image information to be displayed to the customer, when the question A has not been included in the inquiring screen image information yet.

According to a seventh aspect of the present invention, the electronic mail transmission means transmits the answer B only to the terminal that asked the question A.

In the first and fourth aspects of the present invention, answers to all possible questions are not prepared in the database. Only necessary but minimum answers for goods which can be obtained in regular patterns are prepared in the database. Then, when the customer gives a new question, an answer to which is not included in the database, an answer is transmitted to the customer via electronic mail and also the answer is additionally stored in the database. Thus, answers are automatically accumulated in the database. The thus-accumulated answers can also be provided for other customers when receiving questions from other customers. Further, because answers to all possible questions are not prepared, it is possible to reduce manpower costs and also to reduce otherwise necessary data storage capacity.

In the second and sixth aspects of the present invention, similar to the accumulation of answers in the database, all expected question items are included in the inquiring screen image information to be displayed to the customer. New question items that customers input are automatically additionally included in the inquiring screen image information. Thus, question items are automatically accumulated in the inquiring screen image information. Similar to the above-described first and fourth aspects, it is possible to reduce manpower costs and also to reduce otherwise necessary data storage capacity.

In the third aspect of the present invention, when the customer inputs a question item which has not been stored yet, the input question is stored in a predetermined file. Then, after an answer to that question is obtained, the answer is stored together with the question as a set. Thereby, it is possible to update the database and inquiring screen image information at any point of time using the stored answer and question set. Therefore, it is possible to perform the updating operation when periodically updating general information. It is also possible to perform the updating operation immediately after the answer is obtained. Thus, the updating operation is free from any time condition.

In the fifth aspect of the present invention, each inquiring screen image information is provided for a respective article code stored in the goods master file. Further, a type code is given in the goods master file for each question item. When a question is asked by the customer and a type code of the given question item has not been stored in the goods master file, a new type code is additionally stored in the goods master file similar to updating of the database and inquiring screen image information. Thereby, it is possible to keep consistency between the data stored in the goods master file, database and inquiring screen image information. Thereby, it is possible to prevent the amount of data transfer between the center and terminals from unnecessarily increasing.

In the seventh aspect of the present invention, when a customer asks a new question, an answer that is prepared for the question afterward is then transmitted only to that customer. That is, it is not necessary to transmit the answer to other customers because the other customer do not need that answer. Thereby, it is possible to prevent the amount of data transfer between the center and terminals from unnecessarily increasing.

Thus, according to the present invention, when an answer does not exist in the database, the answer is obtained from sales staff, the obtained answer is sent only to a customer who requested the answer, and a database and so forth are appropriately updated using the obtained answer. Thereby, after the updating, other customers can obtain the same answer by an easy regular question-item selection operation.

Create and Manage Service Cases/Consultation Follow Up

Analyzes problem and routes to appropriate resources

Facilitates consulting group follow-up

Integrates with issue tracking tools (e.g. Vantive)

Allows users to track status of a submitted service case

The web customer service component of the present invention provides for creating and managing service cases and following up on those service cases. The problems set forth in the service cases are analyzed and are routed to the appropriate resources. Optionally, the service case component may integrate with issue tracking tools such as Vantive to identify problem areas. Also a user may be allowed to track the status of a submitted service case.

Online Support

Handles conversation-based telephone inquiries for automated customer support

Provides intelligent call routing

Offers "call-through" abilities from web link

Provides real-time private chat sessions

Provides real-time public chat sessions

Provides ability for user to enter online questions

Offers live agents to guide customer to solution

Offers ability to send follow-up questions, Web pages, files, graphics to customers Has ability to handle multiple customers simultaneously Online support is provided by the web customer service component of the present invention, and is designed to handle multiple users simultaneously. A knowledge base would store support information. Conversation based telephone inquiries are handled for automated support. For example, a user may verbally ask a question and voice recognition software would choose an appropriate automated response based on recognized words in the question of the user. Further, calls may be automatically routed to the appropriate resource based on user input. Call-through capabilities from a web link may be offered.

A user may also enter online questions. Email would be a popular means of entering online questions. Real time public and private chat sessions could also take place. Live agents could be kept on hand to answer any questions that the automated responses did not adequately respond to. Also, follow up questions, web pages, links, files, graphics, animations, and the like could also be sent to users.

Returns and Warranty Claims

Lists warranties

Automatically checks user identity to validate user is registered

Checks claim to see if it matches warranty criteria

Request automatically routed to appropriate agent

Figure 74:
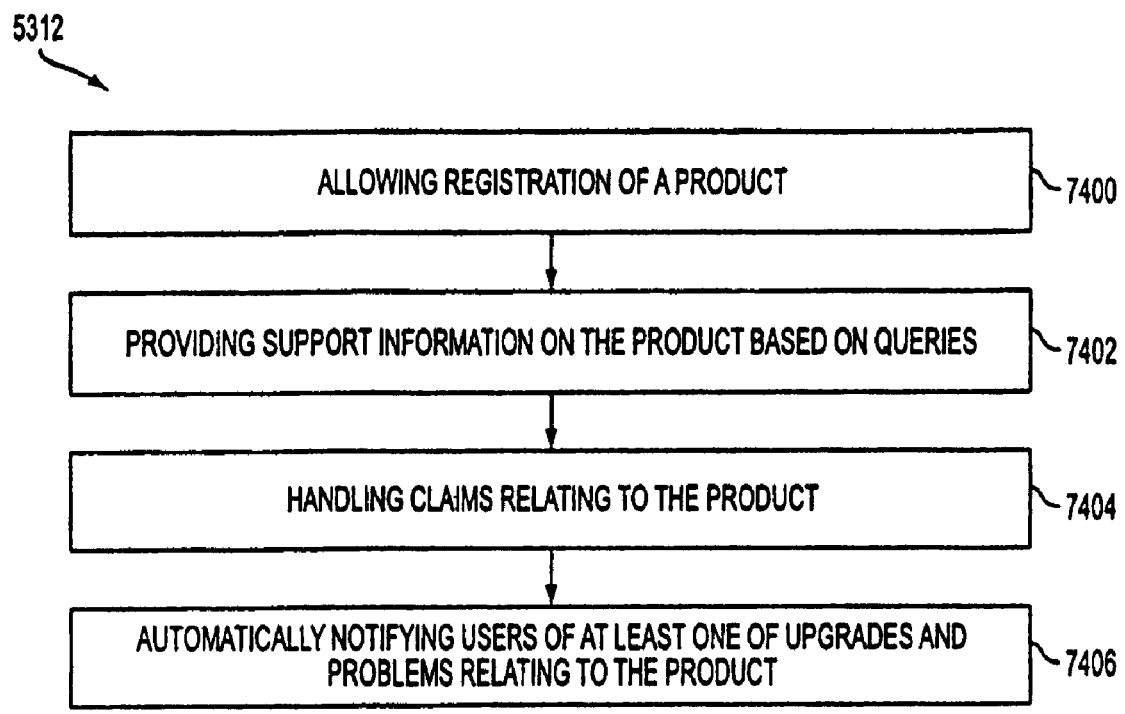
FIG. 74 is a flowchart illustrating the web customer-related web application services in accordance with one embodiment of the present invention.

The web customer service component of the present invention lists warranties for view by a user in operation 7404 of FIG. 74. When a user has a product that requires service or return under the warranty, the identity of the user is checked to ensure that the user has registered. The claim made by the user is then checked and compared to the warranty to ensure that the claim meet warranty criteria for the requested service or replacement. Once validated, the claim is routed to the appropriate agent.

The web customer service component of the present invention may also provide a method and apparatus for handling complaints that allows complainants to lodge anonymous complaints against subjects, informs the subjects of the complaints, permits the subjects to respond to the complaints, encourages settlements of the complaints and holds the parties to the complaints accountable for their conduct while attempting to resolve the complaints.

The method of the present invention is preferably implemented with a programmed central computer, a plurality of access terminals, and a communications network coupling the central computer with the access terminals. The central computer is programmed to receive complaints and responses, store the complaints and responses in individual data records, and negotiate settlements to the complaints by several means described in the Detailed Description below. Once the disputes are resolved, the settlements or judgments are stored along with their respective complaints and responses in the data records.

The central computer is also programmed to provide public access to the data records to permit viewing of the corresponding complaints, responses, and settlements for allowing other users to gauge the conduct of the subjects and to encourage the subjects to respond to the complaints in a timely and satisfactory manner. Moreover, the central computer is programmed to monitor and rate the conduct and performance of both the complainants and the subjects during the course of the disputes. The ratings can be used to affect the outcome of the disputes and for other purposes to hold the parties accountable for their conduct during the attempted resolution of the disputes to encourage good conduct and cooperation between the parties during the course of the disputes.

Proactive Service Notification

Automatically notifies registered customers about needed and optional upgrades

Automatically notifies registered customers about possible bugs or problems and suggested solutions One embodiment of the present invention is provided for affording proactive customer support. Registered users are automatically notified about necessary and optional upgrades. See operation 7406 of FIG. 74. Optionally, a description of the upgrade may be included with the notification, along with recommendations about whether or not to install the upgrade. Further, registered users are automatically notified of possible problems or bugs and solutions are suggested, such as configuration changes or downloads.

Figure 75:
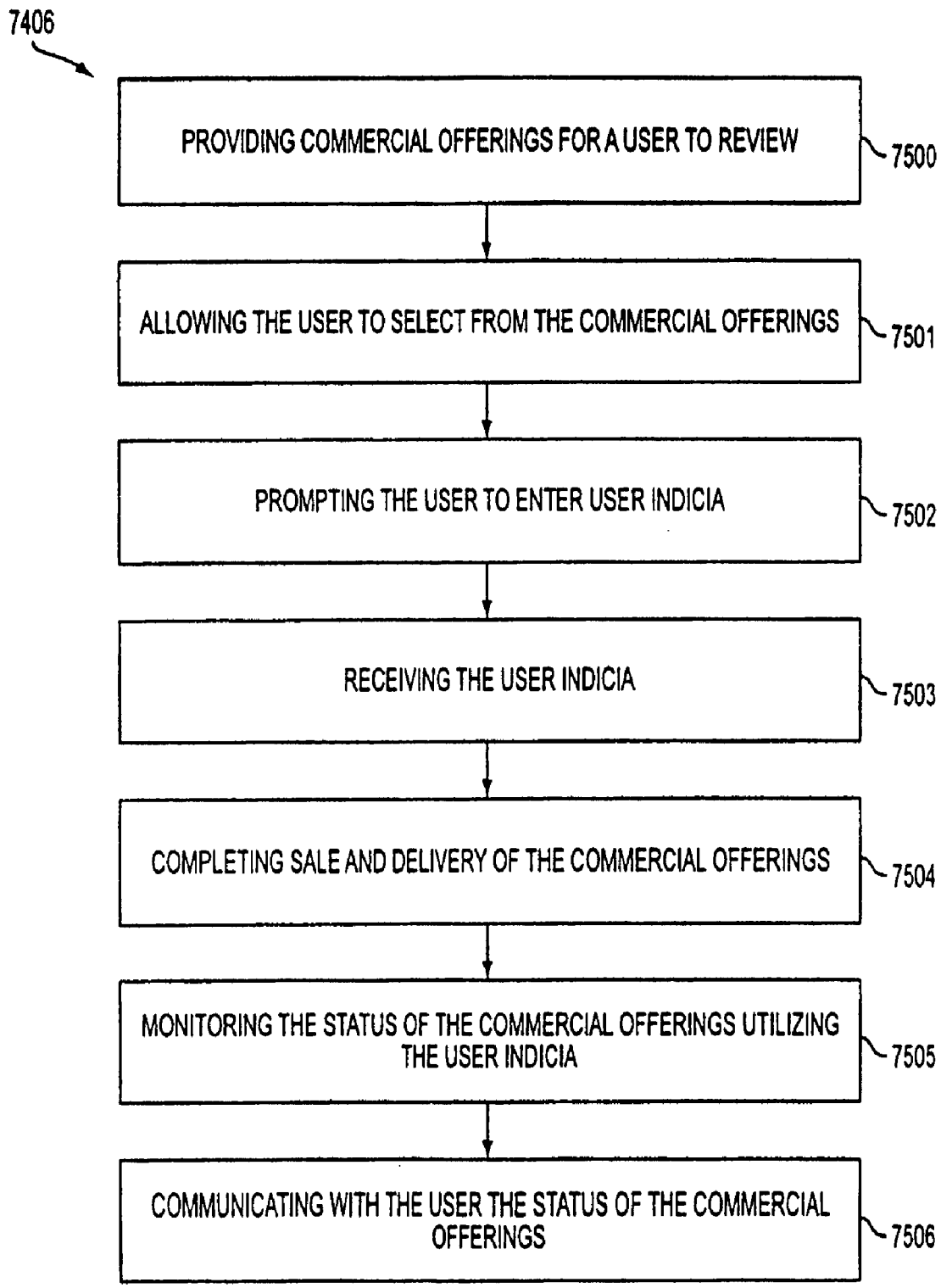
FIG. 75 is a flowchart illustrating one component of the web customer-related web application services in accordance with one embodiment of the present invention.

Referring to FIG. 75, commercial offerings are displayed for a user to review in operation 7500. The user is allowed to select from the commercial offerings in operation 7501. In operation 7502, the user is prompted to enter user indicia, which is received in operation 7503. The sale is completed and the commercial offerings are delivered to the user in operation 7504. The status of the commercial offerings are monitored utilizing the user indicia in operation 7505. In operation 7506, the user is notified of the status of the commercial offerings. The commercial offerings include at least one of products and services In use, a user enters the system by purchasing products and/or services through a website. As part of the purchase transaction or product registration, the user defines the products and services which the user currently possesses or purchases by completing a user profile (user indicia). Incentives and disincentives may be used to influence the user indicia that is entered. Then, the user defines his specific desires for support including: levels of support, support channel, methods of use of the products and services and future purchasing plans (additional user indicia), which are received in operation 7503. The products and services which the user identified and/or purchased are monitored through the internet and other means in operation 7504. For example, search engines may scan provider websites for updates and patches, reduced price offerings, etc. Further, a dedicated email address corresponding to the user may be used when registering the product with the manufacturer, thereby providing a central location to receive notices and promotional material. If an issue with a product is found in operation 7505 such as a software bug, a factory recall or a reduced price offering, then the user is notified utilizing his defined channel such as mail, email, fax, telephone in operation 7506. If the user encounters an issue and requests support, the support will be provided utilizing the user's preferred channel and at the support level purchased by the user.

Consulting Services, Literature, and Partner Referral

Lists literature for follow-up consulting

Provides referrals to match customer-entered needs (internal or third party)

Routes consulting leads to external systems

The web customer service component of the present invention lists literature for follow-up consulting. Further, referrals are provided to match user-entered needs, whether the referrals are internal or from a third party. Also, consulting leads are routed to external systems.

Security Services

As shown in component 5314 of FIG. 53, one embodiment of the present invention is provided for affording a combination of security-related services. Various features are included, such as permitting remote log in as well as restricting access to various resources to authorized users only. As an option, permission may need to be granted before certain activities are performed by a user or users.

Figure 76:
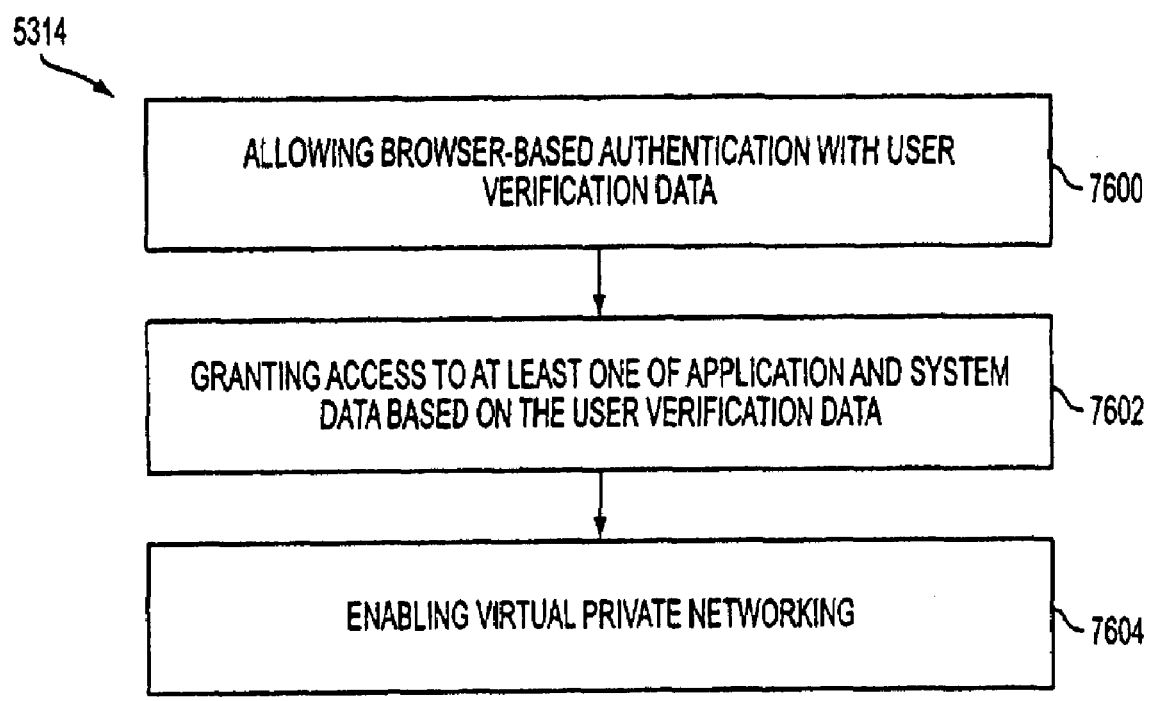
FIG. 76 is a flowchart illustrating the security services in accordance with one embodiment of the present invention.

Referring to FIG. 76, operation 7600 allows browser-based authentication with user verification data. In operation 7602, access is granted to application and/or system data based on the user verification data, which may be stored in a user's browser. Virtual private networking is provided in operation 7604.

Rights and Control Information

In general, the present invention can be used to protect the rights of parties who have:

(a) proprietary or confidentiality interests in electronic information. It can, for example, help ensure that information is used only in authorized ways;

(b) financial interests resulting from the use of electronically distributed information. It can help ensure that content providers will be paid for use of distributed information; and (c) interests in electronic credit and electronic currency storage, communication, and/or use including electronic cash, banking, and purchasing.

Protecting the rights of electronic community members involves a broad range of technologies. WAF combines these technologies in a way that creates a "distributed" electronic rights protection "environment." This environment secures and protects transactions and other processes important for rights protection. WAF, for example, provides the ability to prevent, or impede, interference with and/or observation of, important rights related transactions and processes. WAF, in its preferred embodiment, uses special purpose tamper resistant Secure Processing Units (SPUs) to help provide a high level of security for WAF processes and information storage and communication.

The rights protection problems solved by the present invention are electronic versions of basic societal issues. These issues include protecting property rights, protecting privacy rights, properly compensating people and organizations for their work and risk, protecting money and credit, and generally protecting the security of information. WAF employs a system that uses a common set of processes to manage rights issues in an efficient, trusted, and cost-effective way.

WAF can be used to protect the rights of parties who create electronic content such as, for example: records, games, movies, newspapers, electronic books and reference materials, personal electronic mail, and confidential records and communications. The invention can also be used to protect the rights of parties who provide electronic products, such as publishers and distributors; the rights of parties who provide electronic credit and currency to pay for use of products, for example, credit clearinghouses and banks; the rights to privacy of parties who use electronic content (such as consumers, business people, governments); and the privacy rights of parties described by electronic information, such as privacy rights related to information contained in a medical record, tax record, or personnel record.

In general, the present invention can protect the rights of parties who have:

(a) commercial interests in electronically distributed information—the present invention can help ensure, for example, that parties, will be paid for use of distributed information in a manner consistent with their agreement;

(b) proprietary and/or confidentiality interests in electronic information—the present invention can, for example, help ensure that data is used only in authorized ways;

(c) interests in electronic credit and electronic currency storage, communication, and/or use—this can include electronic cash, banking, and purchasing; and (d) interests in electronic information derived, at least in part, from use of other electronic information.

WAF Functional Properties

WAF is a cost-effective and efficient rights protection solution that provides a unified, consistent system for securing and managing transaction processing. WAF can:

(a) audit and analyze the use of content, (b) ensure that content is used only in authorized ways, and (c) allow information regarding content usage to be used only in ways approved by content users.

In addition, WAF:

(a) is very configurable, modifiable, and re-usable;

(b) supports a wide range of useful capabilities that may be combined in different ways to accommodate most potential applications;

(c) operates on a wide variety of electronic appliances ranging from hand-held inexpensive devices to large mainframe computers;

(d) is able to ensure the various rights of a number of different parties, and a number of different rights protection schemes, simultaneously;

(e) is able to preserve the rights of parties through a series of transactions that may occur at different times and different locations;

(f) is able to flexibly accommodate different ways of securely delivering information and reporting usage; and (g) provides for electronic analogues to "real" money and credit, including anonymous electronic cash, to pay for products and services and to support personal (including home) banking and other financial activities.

WAF economically and efficiently fulfills the rights protection needs of electronic community members. Users of WAF will not require additional rights protection systems for different information highway products and rights problems—nor will they be required to install and learn a new system for each new information highway application.

WAF provides a unified solution that allows all content creators, providers, and users to employ the same electronic rights protection solution. Under authorized circumstances, the participants can freely exchange content and associated content control sets. This means that a user of WAF may, if allowed, use the same electronic system to work with different kinds of content having different sets of content control information. The content and control information supplied by one group can be used by people who normally use content and control information supplied by a different group. WAF can allow content to be exchanged "universally" and users of an implementation of the present invention can interact electronically without fear of incompatibilities in content control, violation of rights, or the need to get, install, or learn a new content control system.

The WAF securely administers transactions that specify protection of rights. It can protect electronic rights including, for example:

(a) the property rights of authors of electronic content, (b) the commercial rights of distributors of content, (c) the rights of any parties who facilitated the distribution of content, (d) the privacy rights of users of content, (e) the privacy rights of parties portrayed by stored and/or distributed content, and (f) any other rights regarding enforcement of electronic agreements WAF can enable a very broad variety of electronically enforced commercial and societal agreements. These agreements can include electronically implemented contracts, licenses, laws, regulations, and tax collection.

Contrast with Traditional Solutions

Traditional content control mechanisms often require users to purchase more electronic information than the user needs or desires. For example; infrequent users of shrink-wrapped software are required to purchase a program at the same price as frequent users, even though they may receive much less value from their less frequent use. Traditional systems do not scale cost according to the extent or character of usage and traditional systems can not attract potential customers who find that a fixed price is too high. Systems using traditional mechanisms are also not normally particularly secure. For example, shrink-wrapping does not prevent the constant illegal pirating of software once removed from either its physical or electronic package.

Traditional electronic information rights protection systems are often inflexible and inefficient and may cause a content provider to choose costly distribution channels that increase a product's price. In general these mechanisms restrict product pricing, configuration, and marketing flexibility. These compromises are the result of techniques for controlling information which cannot accommodate both different content models and content models which reflect the many, varied requirements, such as content delivery strategies, of the model participants. This can limit a provider's ability to deliver sufficient overall value to justify a given product's cost in the eyes of many potential users. WAF allows content providers and distributors to create applications and distribution networks that reflect content providers' and users' preferred business models. It offers users a uniquely cost effective and feature rich system that supports the ways providers want to distribute information and the ways users want to use such information. WAF supports content control models that ensure rights and allow content delivery strategies to be shaped for maximum commercial results.

Chain of Handling and Control

WAF can protect a collection of rights belonging to various parties having in rights in, or to, electronic information. This information may be at one location or dispersed across (and/or moving between) multiple locations. The information may pass through a "chain" of distributors and a "chain" of users. Usage information may also be reported through one or more "chains" of parties. In general, WAF enables parties that (a) have rights in electronic information, and/or (b) act as direct or indirect agents for parties who have rights in electronic information, to ensure that the moving, accessing, modifying, or otherwise using of information can be securely controlled by rules regarding how, when, where, and by whom such activities can be performed.

WAF Applications and Software

WAF is a secure system for regulating electronic conduct and commerce. Regulation is ensured by control information put in place by one or more parties. These parties may include content providers, electronic hardware manufacturers, financial service providers, or electronic "infrastructure" companies such as cable or telecommunications companies. The control information implements "Rights Applications." Rights applications "run on" the "base software" of the preferred embodiment. This base software serves as a secure, flexible, general purpose foundation that can accommodate many different rights applications, that is, many different business models and their respective participant requirements.

A rights application under WAF is made up of special purpose pieces, each of which can correspond to one or more basic electronic processes needed for a rights protection environment. These processes can be combined together like building blocks to create electronic agreements that can protect the rights, and may enforce fulfillment of the obligations, of electronic information users and providers. One or more providers of electronic information can easily combine selected building blocks to create a rights application that is unique to a specific content distribution model. A group of these pieces can represent the capabilities needed to fulfill the agreement(s) between users and providers. These pieces accommodate many requirements of electronic commerce including:

the distribution of permissions to use electronic information;

the persistence of the control information and sets of control information managing these permissions;

configurable control set information that can be selected by users for use with such information;

data security and usage auditing of electronic information; and a secure system for currency, compensation and debit management.

For electronic commerce, a rights application, under the preferred embodiment of the present invention, can provide electronic enforcement of the business agreements between all participants. Since different groups of components can be put together for different applications, the present invention can provide electronic control information for a wide variety of different products and markets. This means the present invention can provide a "unified," efficient, secure, and cost-effective system for electronic commerce and data security. This allows WAF to serve as a single standard for electronic rights protection, data security, and electronic currency and banking.

In a WAF, the separation between a rights application and its foundation permits the efficient selection of sets of control information that are appropriate for each of many different types of applications and uses. These control sets can reflect both rights of electronic community members, as well as obligations (such as providing a history of one's use of a product or paying taxes on one's electronic purchases) WAF flexibility allows its users to electronically implement and enforce common social and commercial ethics and practices. By providing a unified control system, the present invention supports a vast range of possible transaction related interests and concerns of individuals, communities, businesses, and governments. Due to its open design, WAF allows (normally under securely controlled circumstances) applications using technology independently created by users to be "added" to the system and used in conjunction with the foundation of the invention. In sum, WAF provides a system that can fairly reflect and enforce agreements among parties. It is a broad ranging and systematic solution that answers the pressing need for a secure, cost-effective, and fair electronic environment.

WAF prevents many forms of unauthorized use of electronic information, by controlling and auditing (and other administration of use) electronically stored and/or disseminated information. This includes, for example, commercially distributed content, electronic currency, electronic credit, business transactions (such as EDI), confidential communications, and the like. WAF can further be used to enable commercially provided electronic content to be made available to users in user defined portions, rather than constraining the user to use portions of content that were "predetermined" by a content creator and/or other provider for billing purposes.

WAF, for example, can employ:

(1) Secure metering means for budgeting and/or auditing electronic content and/or appliance usage;

(2) Secure flexible means for enabling compensation and/or billing rates for content and/or appliance usage, including electronic credit and/or currency mechanisms for payment means;

(3) Secure distributed database means for storing control and usage related information (and employing validated compartmentalization and tagging schemes);

(4) Secure electronic appliance control means;

(5) A distributed, secure, "virtual black box" comprised of nodes located at every user (including WAF content container creators, other content providers, client users, and recipients of secure WAF content usage information) site. The nodes of said virtual black box normally include a secure subsystem having at least one secure hardware element (a semiconductor element or other hardware module for securely executing WAF control processes), said secure subsystems being distributed at nodes along a pathway of information storage, distribution, payment, usage, and/or auditing. In some embodiments, the functions of said hardware element, for certain or all nodes, may be performed by software, for example, in host processing environments of electronic appliances;

(6) Encryption and decryption means;

(7) Secure communications means employing authentication, digital signaturing, and encrypted transmissions. The secure subsystems at said user nodes utilize a protocol that establishes and authenticates each node's and/or participant's identity, and establishes one or more secure host-to-host encryption keys for communications between the secure subsystems; and (8) Secure control means that can allow each WAF installation to perform WAF content authoring (placing content into WAF containers with associated control information), content distribution, and content usage; as well as clearinghouse and other administrative and analysis activities employing content usage information.

WAF extensively employs methods in the form of software objects to augment configurability, portability, and security of the WAF environment. It also employs a software object architecture for WAF content containers that carries protected content and may also carry both freely available information (e.g, summary, table of contents) and secured content control information which ensures the performance of control information. Content control information governs content usage according to criteria set by holders of rights to an object's contents and/or according to parties who otherwise have rights associated with distributing such content (such as governments, financial credit providers, and users).

In part, security is enhanced by object methods employed by the present invention because the encryption schemes used to protect an object can efficiently be further used to protect the associated content control information (software control information and relevant data) from modification. Said object techniques also enhance portability between various computer and/or other appliance environments because electronic information in the form of content can be inserted along with (for example, in the same object container as) content control information (for said content) to produce a "published" object. As a result, various portions of said control information may be specifically adapted for different environments, such as for diverse computer platforms and operating systems, and said various portions may all be carried by a WAF container.

An objective of WAF is supporting a transaction/distribution control standard. Development of such a standard has many obstacles, given the security requirements and related hardware and communications issues, widely differing environments, information types, types of information usage, business and/or data security goals, varieties of participants, and properties of delivered information. A significant feature of WAF accommodates the many, varying distribution and other transaction variables by, in part, decomposing electronic commerce and data security functions into generalized capability modules executable within a secure hardware SPU and/or corresponding software subsystem and further allowing extensive flexibility in assembling, modifying, and/or replacing, such modules (e.g. load modules and/or methods) in applications run on a WAF installation foundation. This configurability and reconfigurability allows electronic commerce and data security participants to reflect their priorities and requirements through a process of iteratively shaping an evolving extended electronic agreement (electronic control model). This shaping can occur as content control information passes from one WAF participant to another and to the extent allowed by "in place" content control information. This process allows users of WAF to recast existing control information and/or add new control information as necessary (including the elimination of no longer required elements).

WAF supports trusted (sufficiently secure) electronic information distribution and usage control models for both commercial electronic content distribution and data security applications. It can be configured to meet the diverse requirements of a network of interrelated participants that may include content creators, content distributors, client administrators, end users, and/or clearinghouses and/or other content usage information users. These parties may constitute a network of participants involved in simple to complex electronic content dissemination, usage control, usage reporting, and/or usage payment. Disseminated content may include both originally provided and WAF generated information (such as content usage information) and content control information may persist through both chains (one or more pathways) of content and content control information handling, as well as the direct usage of content. The configurability provided by the present invention is particularly critical for supporting electronic commerce, that is enabling businesses to create relationships and evolve strategies that offer competitive value. Electronic commerce tools that are not inherently configurable and interoperable will ultimately fail to produce products (and services) that meet both basic requirements and evolving needs of most commerce applications.

Browser Based Authentication

Verifies user identity using built-in browser functionality

Maintains authentication information throughout sessions

Utilizes centralized directory of profiles

Provides LDAP compatibility

Provides NDS compatibility

The security component of the present invention verifies user identity using built-in browser functionality, allowing for immediate access to a user without requiring installation of additional software. Authentication information may be maintained throughout selected or all sessions to prevent unauthorized users from accessing resources through a registered user's connection.

Optionally, a centralized directory of profiles may be used, which can be updated regularly as new user information is gathered. The centralized directory could also track user movement from page to page or site to site. Also provided are LDAP and NDS compatibility.

Web Application Entitlement

Restricts access to specific web applications based upon user privileges

Determines if a user or group of users have permission to perform an operation in a specific application Utilizes centralized directory of profiles for entitlement data Provides LDAP compatibility Provides NDS compatibility The security component of the present invention also determines who has access to which resources. One function may be to restrict access to specific web applications based upon user privileges, which may be earned or purchased, or which may be granted because of administrative or other duties. Further, the security component may determine if a user or group of users have permission to perform an operation in a specific application. Again, a centralized directory of profiles may be used for entitlement data. Also included could be LDAP and NDS compatibility.

Web Data Entitlement

Restricts access to web content and data based upon user privileges

Determines if a user or group of users have permission to manipulate web data (create, read, update, delete)

Utilizes centralized directory of profiles for entitlement data

Provides LDAP compatibility

Provides NDS compatibility

The security component of the present invention may also restrict access to web content and data based upon user privileges, which may be earned or purchased, or which may be granted because of administrative or other duties. The security component also determines if a user or group of users have permission to manipulate web data such as to create, read, update, or delete such data. Again, a centralized directory of profiles may be used for entitlement data. Also included could be LDAP and NDS compatibility.

Virtual Private Networks

Offers guaranteed secure data transfer

Allows remote login

Provides ability to grant varying levels of access based on user identity

The security component of the present invention may also permit users to create secure virtual networks between their systems. One example would be two branches of a business in two different cities being connected by a virtual network. Guaranteed secure data transfer may be offered. Further, remote login is allowed. As an option, the ability to grant varying levels of access based on user identity may be granted. This could include both access to the virtual network, and to any individual resources shared through the network.

Network Services

Figure 77:
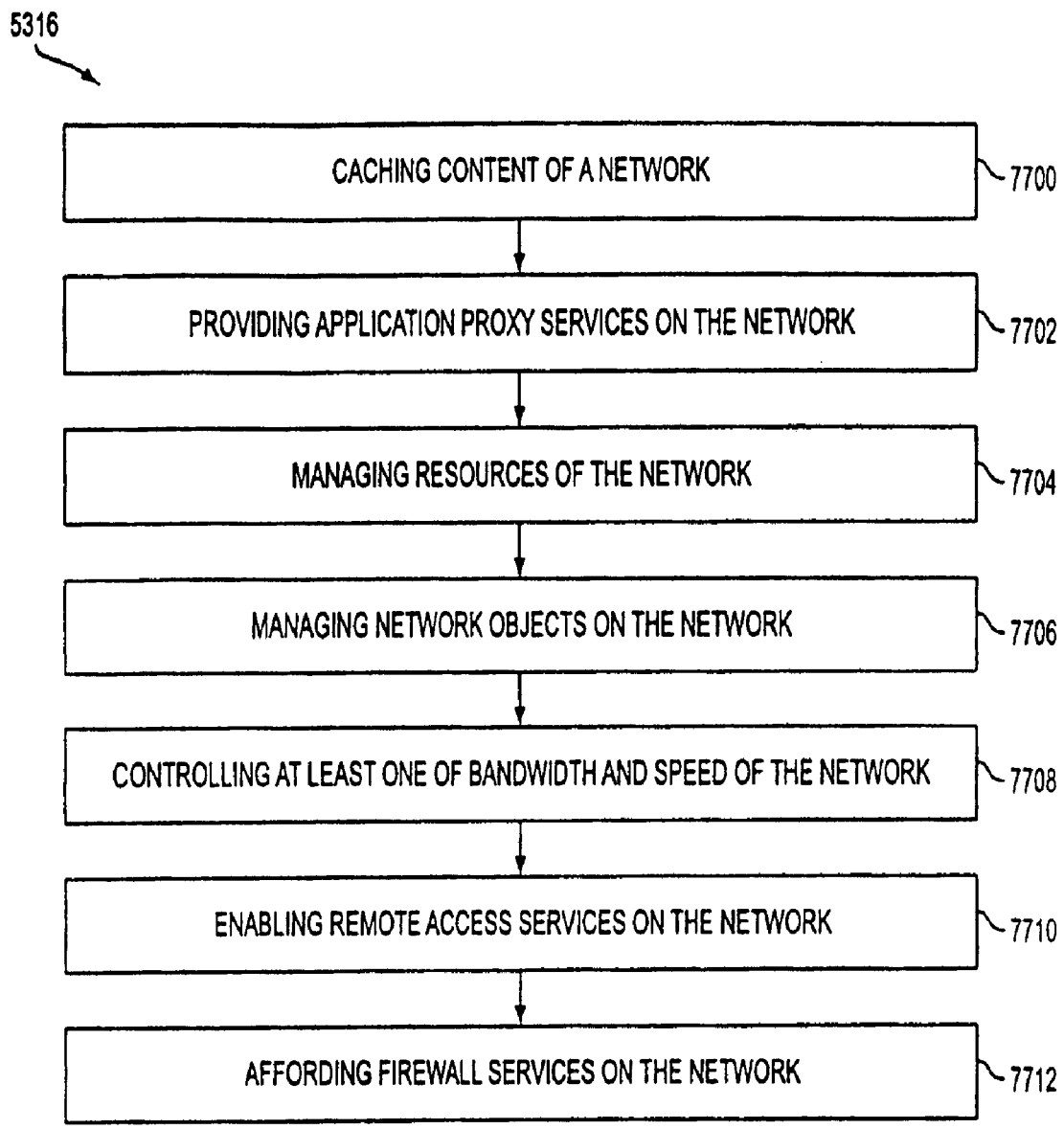
FIG. 77 is a flowchart illustrating the network services in accordance with one embodiment of the present invention.

As shown in component 5316 of FIG. 53, one embodiment of the present invention is provided for controlling the network and managing resources. More detail is provided in FIG. 77. Features include caching of network content in operation 7700, providing application proxy services the network in operation 7702, managing resources and load balancing such as spreading tasks among servers and rerouting around problems in operation 7704, and managing network objects in operation 7706. Operation 7708 controls at least one of bandwidth and speed of the network. Remote log in and access is provided in operation 7710, and affording firewall services on the network in operation 7712.

Web Content Caching

Stores frequently requested web pages and graphics in a temporary location Serves up previously cached content without accessing original source Updates cache automatically to ensure integrity of content The network services component of the present invention may store frequently requested web pages and graphics in a temporary location. In use, previously cached content can be accessed without accessing original source. This dramatically reduces the time required to output the requests web pages and graphics. Preferably, the cache is automatically updated to ensure the integrity of the content stored in the cache.

Application Proxy Services

Passes requests from external clients to internal web servers and returns results Serves as trusted agent to access machines on the behalf of clients Hides IP Addresses of machines from external clients Provides configuration control over access permissions Provides reverse proxy services The network services component of the present invention passes requests from external clients to internal web servers and returns results. This component may also serve as trusted agent to access machines on the behalf of clients, particularly useful for automatic upgrades or information downloading for offline use. Optionally, IP Addresses of machines may be hidden from external clients. Further, configuration control may be provided over access permissions. As another option, reverse proxy services could be provided.

Load Balancing

Spreads tasks among application servers using an intelligent load-balance scheme (e.g., CPU utilization)

Provides a centralized task distribution mechanism for routing services

Identifies servers that are off-line and re-routes traffic

Tasks may be spread among application servers using an intelligent load-balance scheme (e.g., CPU utilization) by the network services component of the present invention. A centralized task distribution mechanism would route services. Further, servers that are off-line are identified and traffic is re-routed around them, such as to a parallel or secondary server.

Network Object Management

Provides centralized directory to facilitate network object interactions

Provides ability to administer network objects (e.g. printers, routers)

The network services component of the present invention provides a centralized directory to facilitate network object interactions as well as provides the ability to administer network objects (e.g. printers, routers, and other peripherals).

Quality of Service (Bandwidth)

Offers range of speed and bandwidth based on customer profile (e.g., larger, higher profile customers get faster service upon request)

The network services component of the present invention also offers selected range of speed and bandwidth based on a user profile. For example, larger, higher profile users get faster service upon request.

Remote Access Services (Radius)

Enables high density modem pooling

Provides a single dial-in number for ISDN or Analog calls and an automatic back-up number if first one does not work Creates an Integrated Firewall/authentication Allows remote authenticated access to intranet High density modem pooling is performed by the network services component of the present invention. Also provided are a single dial-in number for ISDN or Analog calls and an automatic back-up number if the first number does not work or returns a busy signal. Optionally, an integrated firewall may be created or authorization may be verified through authentication. Also optionally, remote authenticated access to intranet may be allowed.

Firewall Service

Protects resources on a private network from users of other networks

Filters network traffic based on security rules

Provides alarm notification of attacks

Provides logging and reporting functions

Provides port and traffic control

Firewall services are also provided by the network services component of the present invention. These services protect resources on a private network from users of other networks. Further, network traffic may be filtered based on security rules. An alarm notification may be provided in case of an attack on the system. Also, logging and reporting functions may be provided, allowing administrators to track movement and operations throughout the network as well as being useful for gathering statistics. Port and traffic control would also be provided.

Web and Internet Services

As illustrated in component 5318 of FIG. 53, one embodiment of the present invention is provided for affording a plurality of internet-related services. Among the features included are the actual uploading of web pages to users' computers, encrypting data for secure transmission, storing and transmitting files, processing requests and executing programs, and routing email.

Figure 78:
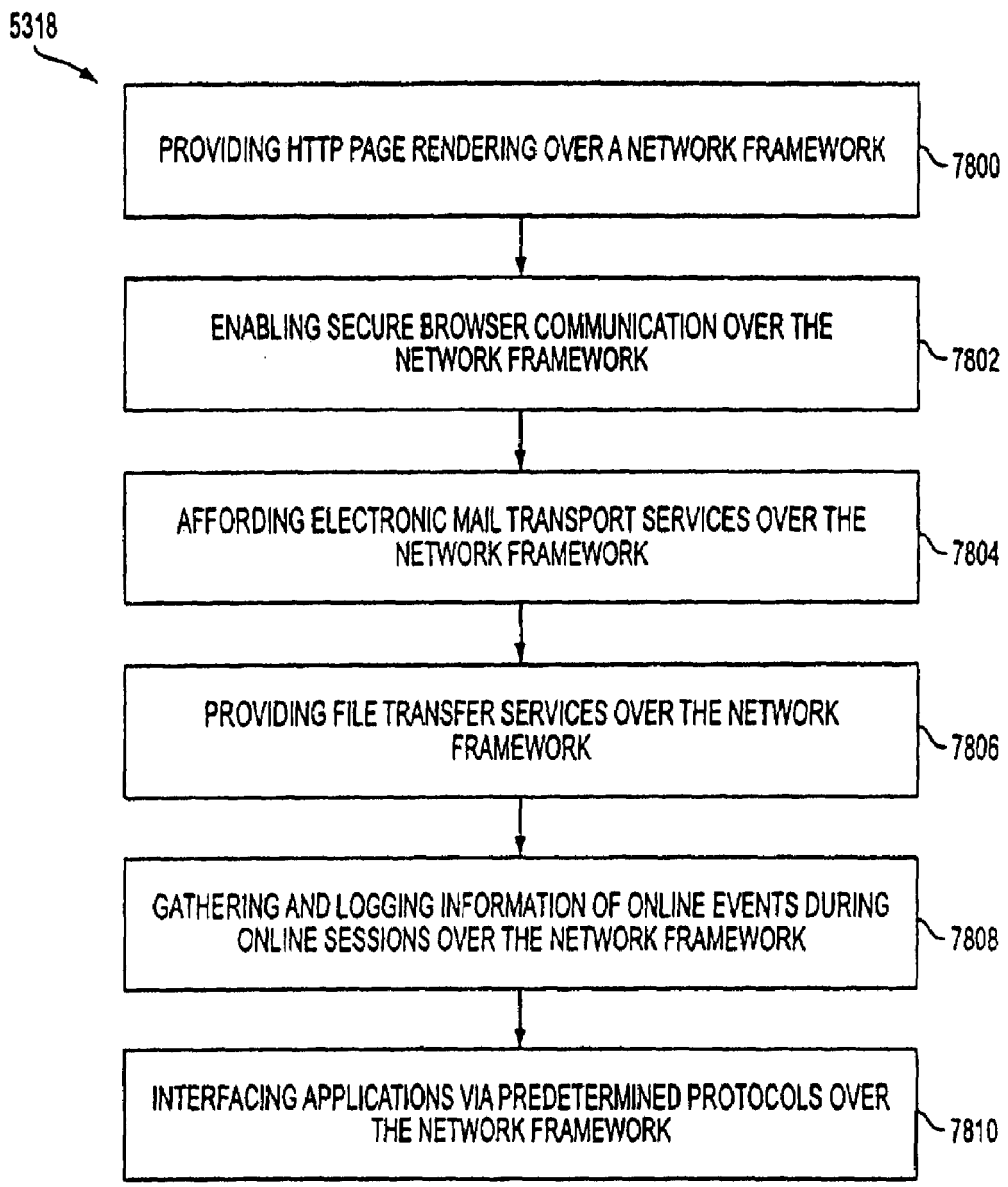
FIG. 78 is a flowchart illustrating the internet services in accordance with one embodiment of the present invention.

In more detail, it is seen in FIG. 78 that operation 7800 provides HTTP page rendering over a network framework. In operation 7802, secure browser communication over the network framework is enabled. Electronic mail transport services over the network framework are afforded in operation 7804. In operation 7806, file transfer services over the network framework are provided. Information of online events is gathered and logged during online sessions over the network framework in operation 7808. Applications may also be interfaced via predetermined protocols over the network framework. See operation 7810.

Secure WAF hardware (also known as SPUs for Secure Processing Units), or WAF installations that use software to substitute for, or complement, said hardware (provided by Host Processing Environments (HPEs)), operate in conjunction with secure communications, systems integration software, and distributed software control information and support structures, to achieve the electronic contract/rights protection environment of the present invention. Together, these WAF components comprise a secure, virtual, distributed content and/or appliance control, auditing (and other administration), reporting, and payment environment. In some embodiments and where commercially acceptable, certain WAF participants, such as clearinghouses that normally maintain sufficiently physically secure non-WAF processing environments, may be allowed to employ HPEs rather WAF hardware elements and interoperate, for example, with WAF end-users and content providers. WAF components together comprise a configurable, consistent, secure and "trusted" architecture for distributed, asynchronous control of electronic content and/or appliance usage. WAF supports a "universe wide" environment for electronic content delivery, broad dissemination, usage reporting, and usage related payment activities.

WAF provides generalized configurability. This results, in part, from decomposition of generalized requirements for supporting electronic commerce and data security into a broad range of constituent "atomic" and higher level components (such as load modules, data elements, and methods) that may be variously aggregated together to form control methods for electronic commerce applications, commercial electronic agreements, and data security arrangements. WAF provides a secure operating environment employing WAF foundation elements along with secure independently deliverable WAF components that enable electronic commerce models and relationships to develop. WAF specifically supports the unfolding of distribution models in which content providers, over time, can expressly agree to, or allow, subsequent content providers and/or users to participate in shaping the control information for, and consequences of, use of electronic content and/or appliances. A very broad range of the functional attributes important for supporting simple to very complex electronic commerce and data security activities are supported by capabilities of the present invention. As a result, WAF supports most types of electronic information and/or appliance: usage control (including distribution), security, usage auditing, reporting, other administration, and payment arrangements.

WAF, in its preferred embodiment, employs object software technology and uses object technology to form "containers" for delivery of information that is (at least in part) encrypted or otherwise secured. These containers may contain electronic content products or other electronic information and some or all of their associated permissions (control) information. These container objects may be distributed along pathways involving content providers and/or content users. They may be securely moved among nodes of a Virtual Distribution Environment (WAF) arrangement, which nodes operate WAF foundation software and execute control methods to enact electronic information usage control and/or administration models. The containers delivered through use of the preferred embodiment of the present invention may be employed both for distributing WAF control instructions (information) and/or to encapsulate and electronically distribute content that has been at least partially secured.

Content providers who employ the present invention may include, for example, software application and game publishers, database publishers, cable, television, and radio broadcasters, electronic shopping vendors, and distributors of information in electronic document, book, periodical, e-mail and/or other forms. Corporations, government agencies, and/or individual "end-users" who act as storers of, and/or distributors of, electronic information, may also be WAF content providers (in a restricted model, a user provides content only to himself and employs WAF to secure his own confidential information against unauthorized use by other parties). Electronic information may include proprietary and/or confidential information for personal or internal organization use, as well as information, such as software applications, documents, entertainment materials, and/or reference information, which may be provided to other parties. Distribution may be by, for example, physical media delivery, broadcast and/or telecommunication means, and in the form of "static" files and/or streams of data. WAF may also be used, for example, for multi-site "real-time" interaction such as teleconferencing, interactive games, or on-line bulletin boards, where restrictions on, and/or auditing of, the use of all or portions of communicated information is enforced.

WAF provides important mechanisms for both enforcing commercial agreements and enabling the protection of privacy rights. WAF can securely deliver information from one party to another concerning the use of commercially distributed electronic content. Even if parties are separated by several "steps" in a chain (pathway) of handling for such content usage information, such information is protected by WAF through encryption and/or other secure processing. Because of that protection, the accuracy of such information is guaranteed by WAF, and the information can be trusted by all parties to whom it is delivered. Furthermore, WAF guarantees that all parties can trust that such information cannot be received by anyone other than the intended, authorized, party(ies) because it is encrypted such that only an authorized party, or her agents, can decrypt it. Such information may also be derived through a secure WAF process at a previous pathway-of-handling location to produce secure WAF reporting information that is then communicated securely to its intended recipient's WAF secure subsystem. Because WAF can deliver such information securely, parties to an electronic agreement need not trust the accuracy of commercial usage and/or other information delivered through means other than those under control of WAF.

HTTP-PAGE Rendering

Serves requested web pages and graphics from web servers to client web browsers

Supports page rendering for multiple languages

Supports multiple content sources (file system, databases, scripts)

The internet services component of the present invention serves requested web pages and graphics from web servers to client web browsers. Page rendering for multiple languages may be supported, as may transmission of data to and from multiple content sources such as file systems, databases, and scripts.

Secure Browser Communications—SSL

Provides encrypted communication with common web browsers

Supports the Secure Sockets Layer protocol 2.0

Supports the Secure Sockets Layer protocol 3.0

The internet services component of the present invention provides encrypted communication with common web browsers, essential for commercial transactions and when transmitting confidential memoranda. The Secure Sockets Layer protocol 2.0 is supported, as is the Secure Sockets Layer protocol 3.0.

File Transfer Services (FTP)

Transfers files between computers on the Internet using the standard File Transfer Protocol (FTP)

Stores files on a file system or database

Provides mechanism to manage access control for files on a FTP server

The internet services component of the present invention may permit files to be transferred between computers on the Internet using the standard File Transfer Protocol (FTP). Such files would be stored on a file system or database. Security would also be provided by managing access control for files on a FTP server.

Web Application Interface Protocols CGI/NSAPI/ISAPI

Supports Common Gateway Interface (CGI) protocol

Supports Netscape' API (NSAPI) protocol

Supports Microsoft's API (ISAPI) protocol

Provides alternative to the interface mechanism that may be used

The internet services component of the present invention would support a multitude of interface protocols. Examples of protocols supported are Common Gateway Interface (CGI) protocol, Netscape' API (NSAPI) protocol, and Microsoft's API (ISAPI) protocol. Further, alternative interface mechanisms may be provided for use instead of the default mechanism.

Web Application Server

Executes web application logic

Utilizes user session information to support interactive applications

Provides scalability features

Provides fail-over features

Provides application programming logic

The internet services component of the present invention also executes web application logic. User session information is utilized to support interactive applications as well as for statistical purposes. Scalability features may be provided, as may fail-over features. Application programming logic may also be provided.

State and Session Management

Provides mechanism to note and remember one or more preceding events in a given sequence of interactions with the user or application program Tracks state and session information Manages multiple independent user sessions that are simultaneously active Supports Client Cookies Supports Client URL Encoding Supports Server Information with Client Cookies Supports Server Information with URL Session Identifiers The internet services component of the present invention may provide a mechanism to note and remember one or more preceding events in a given sequence of interactions with the user or application program. State and session information may be tracked. Multiple independent user sessions that are simultaneously active may be managed. Support is provided for user cookies, server information with user cookies, client URL encoding, and server information with URL session identifiers.

Email Transport Services

Routes inbound and outbound email messages to the appropriate email servers

Filters incoming messages and blocks junk mail

Queues messages for delivery

Provides backup and restore capabilities for stored email

The internet services component of the present invention routes inbound and outbound email messages to the appropriate email servers, where they are queued for delivery. Optional features could include filtering of incoming messages and blocking junk mail, as well as providing backup and restore capabilities for stored email.

Client Services

Figure 79:
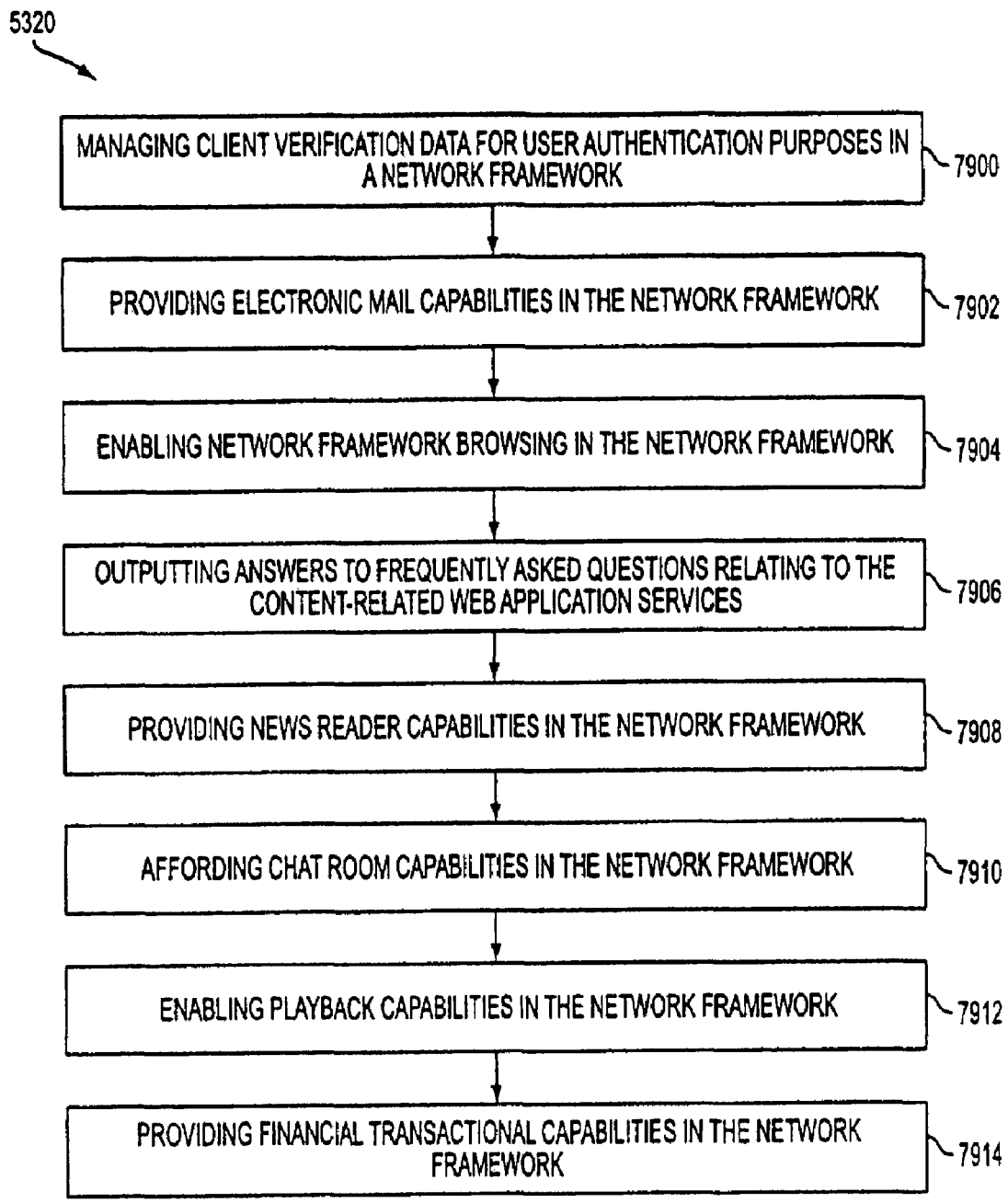
FIG. 79 is a flowchart illustrating the client services in accordance with one embodiment of the present invention.

As shown in component 5320 of FIG. 53, one embodiment of the present invention is provided for affording a plurality of client service-related services. Referring to FIG. 79, among the features included are managing client verification data for user authentication purposes in a network framework in operation 7900. In operation 7902, electronic mail capabilities in the network framework are provided. Network framework browsing in the network framework is provided in operation 7904. File transfer capabilities in the network framework, news reader capabilities in the network framework, and chat room capabilities in the network framework are provided in operations 7906, 7908, and 7910, respectively. Playback capabilities in the network framework are enabled in operation 7912. Financial transactional capabilities in the network framework are also provided. Note operation 7914.

Certificates

Manages client certificates for user authentication

The client services component of the present invention manages client certificates used for user authentication. These include certificates used to identify a user during automatic log on.

Plug-Ins and Network Utilities

Provides email capabilities

Provides Internet browser

Provides telnet capabilities

Provides FTP capabilities

Provides news reader

Provides chat capabilities

Provides specialized plug-ins for specific functions (e.g., video)

Provides audio playback capabilities

Supports Java

Provides electronic wallet capabilities

The client services component of the present invention provides several services.

These services may include email capabilities, access to an Internet browser, telnet capabilities, and FTP capabilities. A news reader could be provided, as could chat capabilities. Specialized plug-ins could be offered for specific functions such as audio and video. Support for JAVA may be included. Optionally, electronic wallet capabilities could be provided as well.

Data Services

Figure 80:
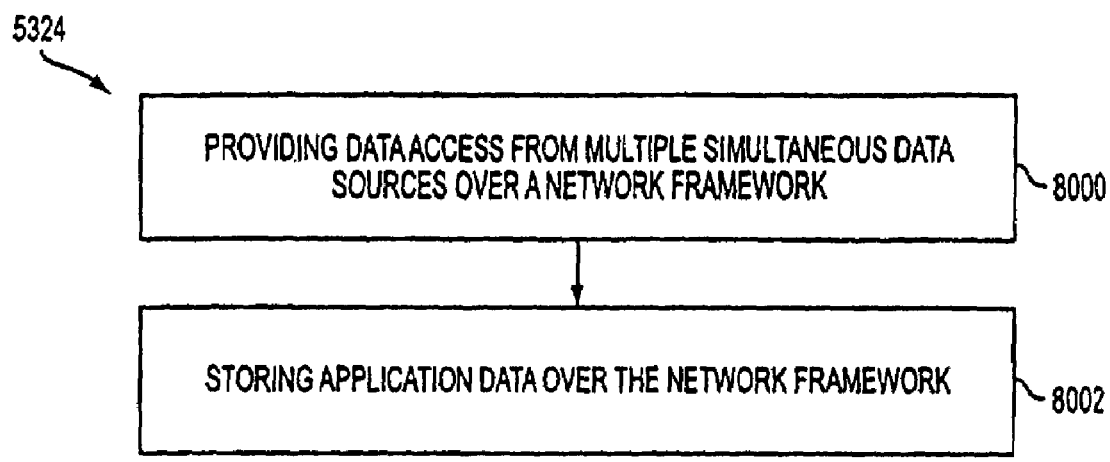
FIG. 80 is a flowchart illustrating the data services in accordance with one embodiment of the present invention.

As illustrated in component 5324 of FIG. 53, one embodiment of the present invention is provided for affording a combination of data-related services. Several features are included such as sorting, storing, and transferring data. As shown in FIG. 80, in operation 8000 data access from multiple simultaneous data sources over a network framework is provided. Application data is stored over the network framework in operation 8002.

Data Access Adapters

Supports native database access: Oracle, Informix, Sybase, MS SQL Server

Supports ODBC

Supports JDBC

Provides mechanism to import and export data from external systems

Supports data transfer in multiple languages

Supports multiple simultaneous data sources

Provides data connection pooling

Provides a common data access language across all data sources

Provides reporting and logging functions to detect communication errors

The data service component of the present invention supports native database access such as Oracle, Informix, Sybase, and MS SQL Server, as well as ODBC and JDBC. A mechanism is also provided to import and export data from external systems. Data transfer in multiple languages is supported. Multiple simultaneous data sources may be used. Data connection pooling may be provided. A common data access language may be used across all data sources. Reporting and logging functions may also be provided to detect communication errors.

Application Data Storage

Supports storage of application specific data

Maintains and verifies integrity of application data

Provides methods for administrators and user to manage data

Provides replication and synchronization capabilities

Supports ODBC

The data service component of the present invention supports storage of application specific data as well as maintains and verifies the integrity of application data. Several different methods to manage data may be provided, allowing administrators and users to choose their preferred method. Replication and synchronization capabilities may be included. Preferably, ODBC is supported.

Data delivery means may include electronic data storage means such as optical disks for delivering one portion of said information and broadcasting and/or telecommunicating means for other portions of said information. Electronic data storage means may include magnetic media, optical media, combined magneto-optical systems, flash RAM memory, bubble memory, and/or other memory storage means such as huge capacity optical storage systems employing holographic, frequency, and/or polarity data storage techniques. Data storage means may also employ layered disc techniques, such as the use of generally transparent and/or translucent materials that pass light through layers of data carrying discs which themselves are physically packaged together as one thicker disc. Data carrying locations on such discs may be, at least in part, opaque.

Integration Capabilities

Figure 81:
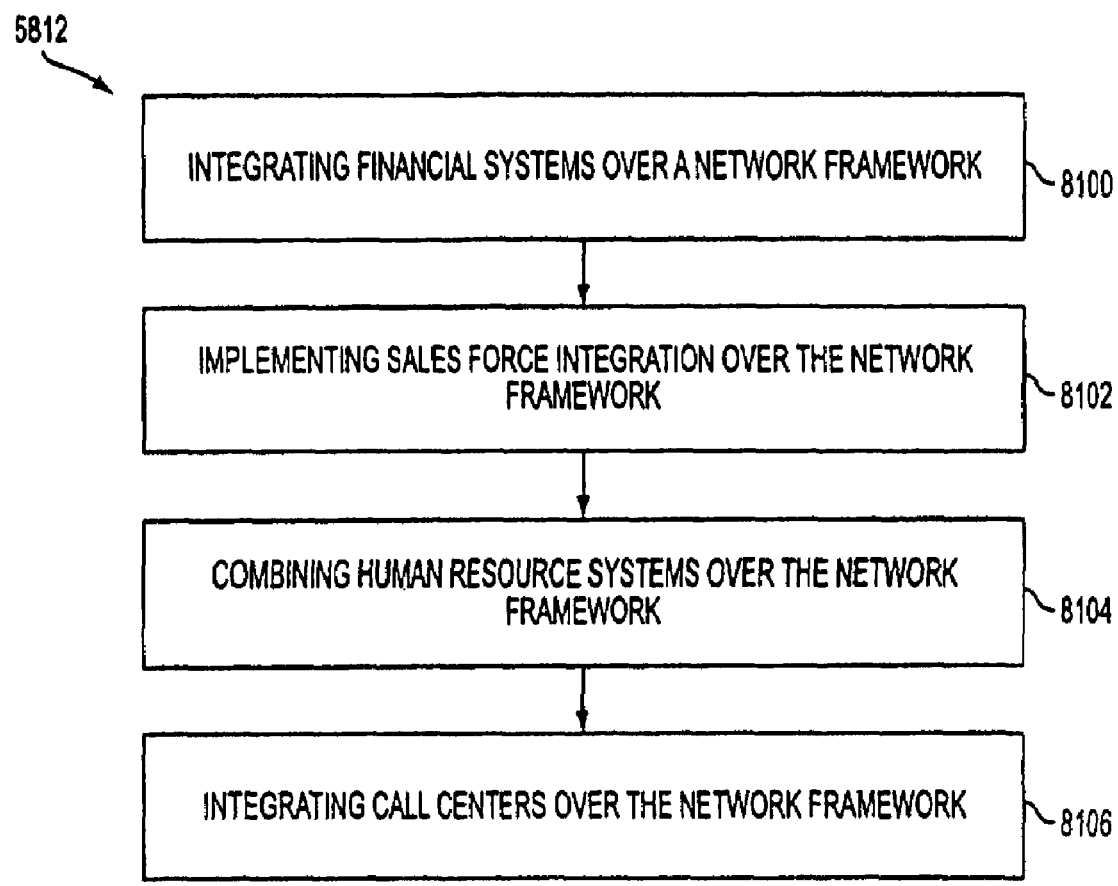
FIG. 81 is a flowchart illustrating the integration capabilities in accordance with one embodiment of the present invention.

As shown in component 5322 of FIG. 53, one embodiment of the present invention is provided for affording a combination of integration capabilities-related services. Referring to FIG. 81, it is seen that many features are provided, including integration with financial and sales systems. See operations 8100 and 8102. Also, human resource systems may be combined over the network framework in operation 8104. Further, integration with call centers, as in operation 8106, and third party systems may also be included.

Financials Integration

Provides adapter or mechanism to communicate and transfer data at the functional level with Financial systems via real-time API's Provides adapter or mechanism to communicate and transfer data at the functional level with Financial systems via batch API's Supports API's for external integration Supports Data Access Adapter capabilities The integration capabilities component of the present invention may provide an adapter or mechanism to communicate and transfer data at the functional level with financial systems via real-time API's. Further provided may be an adapter or mechanism to communicate and transfer data at the functional level with financial systems via batch API's. Preferably, API's for external integration are supported. Data Access Adapter capabilities may also be supported.

Sales Force Integration

Provides adapter or mechanism to communicate and transfer data at the functional level with Sales Force systems via real-time API's Provides adapter or mechanism to communicate and transfer data at the functional level with Sales Force systems via batch API's Supports API's for external integration Supports Data Access Adapter capabilities The integration capabilities component of the present invention provides an adapter or mechanism to communicate and transfer data at the functional level with sales force systems via real-time API's as well as via batch API's. API's for external integration may be supported. Data Access Adapter capabilities may also be supported.

ERP Integration

Provides adapter or mechanism to communicate and transfer data at the functional level with ERP systems via real-time API's Provides adapter or mechanism to communicate and transfer data at the functional level with ERP systems via batch API's Supports API's for external integration Supports Data Access Adapter capabilities The integration capabilities component of the present invention provides an adapter or mechanism to communicate and transfer data at the functional level with ERP systems via real-time API's as well as via batch API's. Preferably, API's for external integration are supported. Data Access Adapter capabilities may also be supported.

Human Resources Integration

Provides adapter or mechanism to communicate and transfer data at the functional level with Human Resources systems via real-time API's Provides adapter or mechanism to communicate and transfer data at the functional level with Human Resources systems via batch API's Supports API's for external integration Supports Data Access Adapter capabilities The integration capabilities component of the present invention may provide an adapter or mechanism to communicate and transfer data at the functional level with human resources systems via real-time API's. Further provided may be an adapter or mechanism to communicate and transfer data at the functional level with human resources systems via batch API's. API's for external integration may be supported. Data Access Adapter capabilities may also be supported.

Call Center Integration

Supports CTI integration from the web

Provides adapter or mechanism to communicate and transfer data at the functional level with Call Center systems via real-time API's Provides adapter or mechanism to communicate and transfer data at the functional level with Call Center systems via batch API's Supports API's for external integration Supports Data Access Adapter capabilities CTI integration from the web is supported by the integration capabilities component of the present invention. An adapter or mechanism to communicate and transfer data at the functional level with call center systems via real-time API's may be provided. An adapter or mechanism to communicate and transfer data at the functional level with call center systems via batch API's may also be provided. Preferably, API's for external integration are supported. Data Access Adapter capabilities may also be supported.

Transaction Integration (Fulfillment/Payment/3rd Party)

Provides adapter or mechanism to transfer transactional information to a fulfillment house, payment processing center or other third party Provides reporting and logging functions to detect communication errors The integration capabilities component of the present invention may provide an adapter or mechanism to transfer transactional information to a fulfillment house, payment processing center, or a third party. As an option, reporting and logging functions may be used to detect communication errors.

3rd Party Integration Capabilities (Content, Training)

Provides adapter or mechanism to communicate with external systems that provide additional content such as catalog information Provides reporting and logging functions to detect communication errors The integration capabilities component of the present invention may also provide an adapter or mechanism to communicate with external systems that provide additional content such as catalog information. Again, reporting and logging functions may be used to detect communication errors.

Miscellaneous Services

Figure 82:
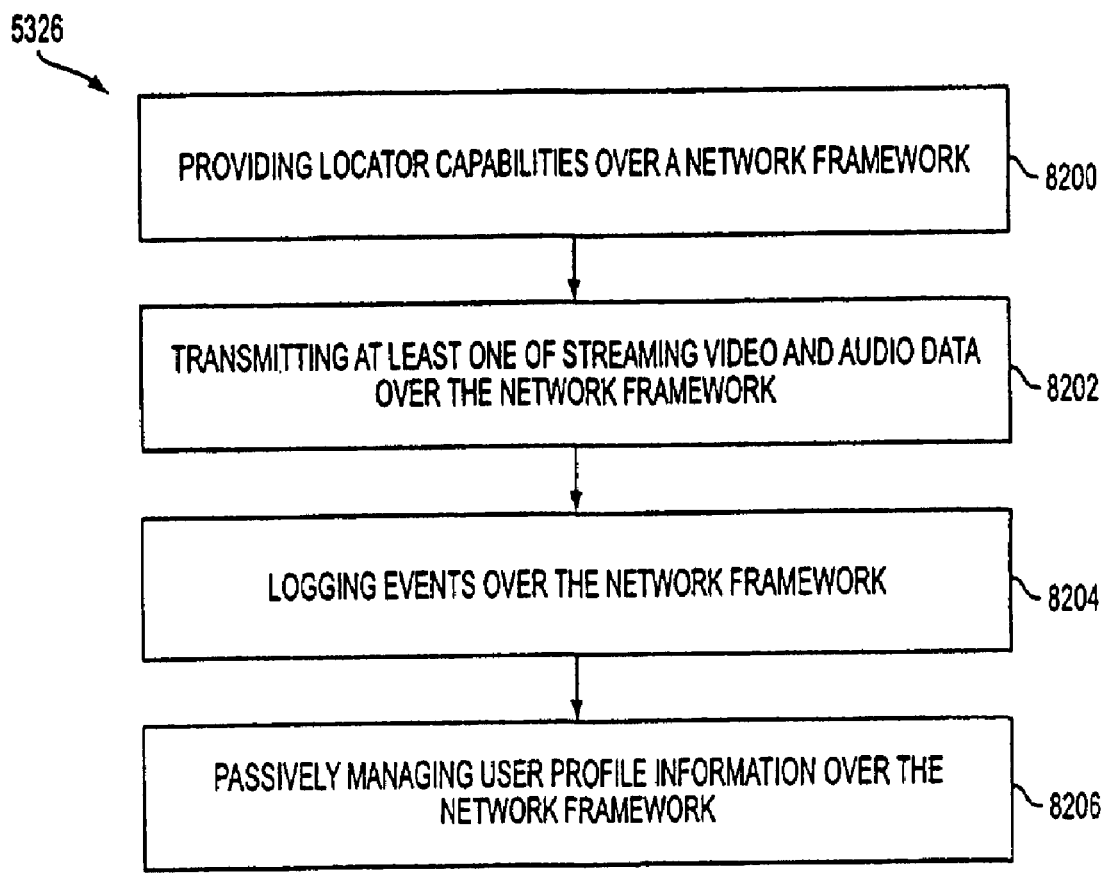
FIG. 82 is a flowchart illustrating the miscellaneous services in accordance with one embodiment of the present invention.

As shown in component 5326 of FIG. 53, one embodiment of the present invention is provided for affording a combination of miscellaneous capabilities in a web architecture framework. See FIG. 82. Steps included are providing locator capabilities and streaming data over the network framework in operation 200.

Further, searching capabilities are provided over the network framework in addition to logging events and passive profiling. In operation 8202, streaming video and/or audio data is transmitted over the network framework. Various events may be logged over the network framework. Note operation 8204. User profile information is passively managed over the network framework in operation 8206.

Locator Capabilities—Channel Partners, ed. Centers

Provides proximity-based mapping

Enables control of search parameters

Creates interactive maps

Provides multi-criteria proximity search

Enables dynamic map navigation

Permits customizable page design

Displays table of query results

Allows user to print maps by one click

Mapping functions may be provided by the present invention, including proximity-based mapping and interactive mapping. Controls of search parameters would be provided, and could include multi-criteria proximity searching. Dynamic map navigation may be enabled. A table of query results would be displayed. The maps displayed would be printable. Optionally, customizable page design could be permitted, such as allowing a user to personalize mapping based on his or her favorite destinations.

Streaming Video & Audio Capabilities

Provides streaming video download

Provides content creation capabilities (e.g. recording, video transfer)

Provides stereo audio

Delivers end-user multimedia across all bandwidths

Offers customizable web-based server administration and reporting to aid business management Provides enhanced security for sensitive or pay-per-view content Integrates with existing back office applications Develops customized applications and leverages content in existing formats Offers ability to scale with additional hardware Supports multiple concurrent users Streaming audio and video downloads may be available. Examples could include live radio and television programs, as well as previously generated or recorded video and audio clips. Ideally, audio would be produced in stereo. Optional features could include content creation capabilities, e.g., recording, video transfer, etc.

End-user multimedia may be delivered across all bandwidths. As an option, customizable web-based server administration and reporting could be offered to aid business management. Enhanced security would be used for sensitive or pay-per-view content. Ideally, multimedia capabilities would integrate with existing back office applications. Customized applications and leveraged content could be created in existing formats. Also offered could be the ability to scale with additional hardware. Ideally, the multimedia components support multiple concurrent users.

Search Capabilities

Indexes file-based content

Indexes database content

Indexes 3rd party content

Supports multiple indices and multiple content sources

Provides basic search options (product number, name)

Provides keyword searching

Provides question-based searching

Provides advanced flexible searching tools (parametric)

Support searching using multiple languages

Supports programmable filters

Supports multiple languages

The present invention may index various types of system content, including file-based content, database content, and 3rd party content. Preferably, multiple indices and multiple content sources are supported. Many modes of searching may be offered. Basic search options could include product number or name. Keyword searching may be allowed, as may question-based searching. Advanced flexible searching tools, such as parametric tools, may be used. Examples include searching using multiple languages. Ideally, programmable filters may be used to filter out unwanted content. Also ideally, the user interface supports multiple languages.

Web Event Logging

Makes observation logs and event histories available for structured and ad-hoc reporting and analysis Provides log management and archiving functions The present invention may make observation logs and event histories available for structured and ad-hoc reporting and analysis. This information would also be useful for tracking unauthorized access to restricted content. Also provided may be log management and archiving functions.

Passive Profiling Capabilities

Manages and leverages profile information

Maintains identity and state for each user

Adds preference and interest information for each customer's personal profile

The present invention may manage and leverage profile information. The identity and state for each user would be maintained. Preference and interest information for each customer's personal profile may also be added.

Directory Services

Figure 83:
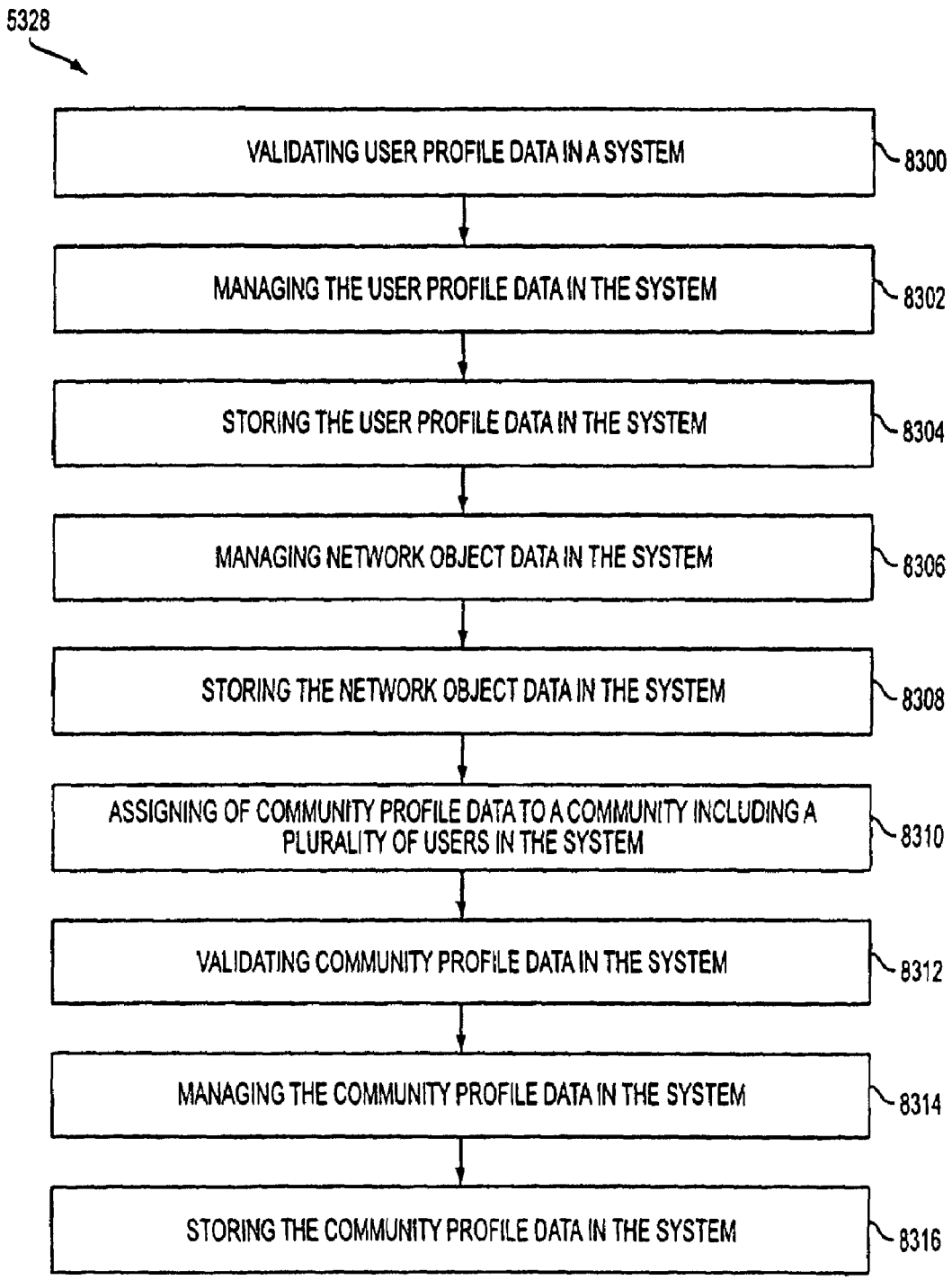
FIG. 83 is a flowchart illustrating the directory services in accordance with one embodiment of the present invention.

As shown in component 5328 of FIG. 53, one embodiment of the present invention is provided for affording a combination of directory-related services. In operation 8300 of FIG. 83 user profile data is validated in a system. The user profile data in the system is managed in operation 8302 and stored in operation 8304, while network object data in the system is managed in operation 8306 and stored in operation 8308. Community profile data may be assigned to a community including a plurality of users in the system. See operation 8310. Community profile data is validated in the system in operation 8312, managed in the system in operation 8314, and stored in the system in operation 8316.

Validation Management & Storage of Base Profile Data

Maintains and verifies integrity of user profile information such as username, password, user groups Provides methods for administrators and users to manage user profile information Organizes and stores user profile data in permanent storage space Provides replication and synchronization capabilities
Supports LDAP
Supports NDS
Supports ODBC The directory services component of the present invention maintains and verifies integrity of user profile information such as username, password, user groups, and the like. Several methods may be provided for administrators and users to manage user profile information, which is organized and stored in permanent storage space. Optionally, replication and synchronization capabilities may be provided. Ideally, support is provided for LDAP, NDS, ODBC, and others.

Assignment of User Profiles to Communities
Adds site-specific information to each person's profile provided the individual gives consent
Allows user to choose to belong to a particular community
Allows user to be remove himself from a particular community or change community The directory services component of the present invention may add site-specific information to each user's profile provided the user gives consent. Further, each user may be allowed to choose to belong to a particular community made up of other users. A user would also be able remove himself or herself from a particular community as well as change to a different community.

Validation, Management, & Storage of Base Community Data
Maintains and verifies integrity of community data information such as users assigned to a specific community
Provides methods for administrators to manage community information
Organizes and stores community data in permanent storage space The integrity of community data information such as users assigned to a specific community would be maintained and verified by the directory services component of the present invention. Administrators would also be provided with methods to manage community information. Ideally, community data is organized and stored in permanent storage space.

Management & Storage of Network Object Data

Organizes and stores network object data in permanent storage space

Provides replication and synchronization capabilities

Supports LDAP

Supports NDS

The directory services component of the present invention organizes and stores network object data in permanent storage space as well as provides replication and synchronization capabilities. Ideally, support is offered for LDAP and NDS, among others.

Management And Operations

As illustrated in component 5330 of FIG. 53, one embodiment of the present invention is provided for affording a combination of management and operation-related services. Features include billing for usage of particular sites, monitoring site performance, creating and managing user profiles, and scheduling of operations and functions such as software updates.

Figure 84:
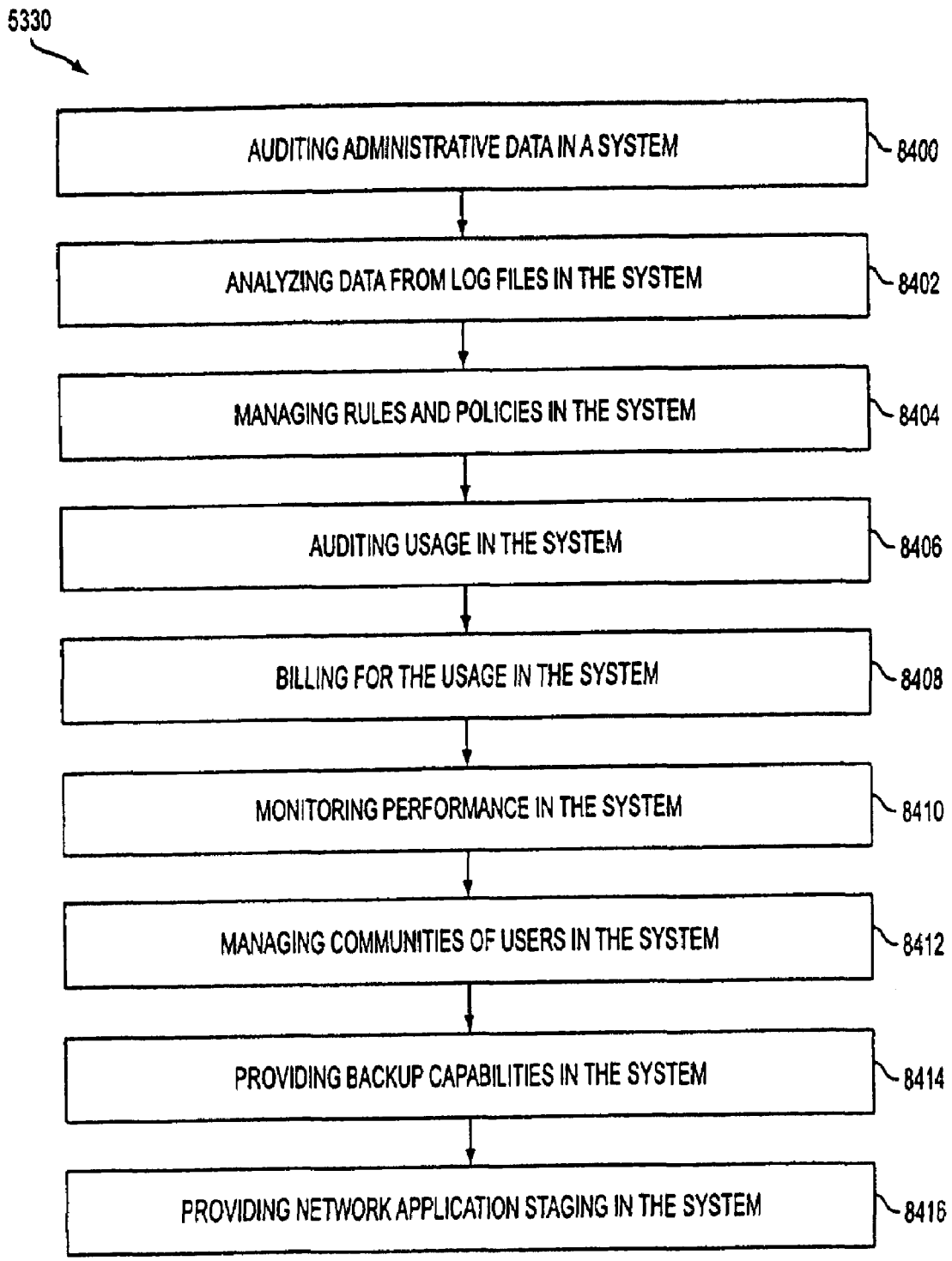
FIG. 84 is a flowchart illustrating the management and operations services in accordance with one embodiment of the present invention.

Referring to FIG. 84, auditing of administrative data in a system is performed in operation 8400. Data from log files in the system is analyzed in operation 8402. In operation 8404, rules and policies are managed in the system. Usage in the system is audited in operation 8406 while billing for the usage in the system is performed in operation 8408. Performance in the system is monitored in operation 8410. Communities of users may be managed in the system. See operation 8412. In operation 8414, backup capabilities are provided in the system, as is network application staging in operation 8416.

Administrative Auditing
Provides ability to track frequency of usage for specific functions on site (e.g. shopping cart, etc.)
Provides ability to track frequency of usage by specific users
Provides ability to track custom metrics The management and operations component of the present invention provides the ability to track frequency of usage for specific functions on a site. One example includes the frequency of usage of the shopping cart, etc. Ideally, the frequency of usage by specific users can be tracked. Also ideally, custom metrics can also be tracked.

Log Analysis Capabilities

Extracts and analyzes data from log files and other sources

Generates predefined and ad-hoc reports based upon log and data analysis

Identifies trends and forecast performance based upon analysis

Provides advanced data analysis and report programming tools

The management and operations component of the present invention may be used to extract and analyzes data from log files and other sources. Predefined and ad-hoc reports may be generated based upon log and data analysis. Trends may be identified and performance forecast based upon analysis of preselected factors. Ideally, advanced data analysis and report programming tools are available.

Rules & Policy Management
Manages rules for common capabilities such as advertisements and promotions
Manages policies for operations such as authorization and access control for user groups and content
Logs policy changes The management and operations component of the present invention manages rules for common capabilities such as advertisements and promotions. Also managed are policies for operations such as authorization and access control for user groups and content. Policy changes are logged.

Auditing And Billing For Usage (Charge-Back)

Provides Ability to Track Usage of Site to Specific Users and Bill for that Usage The ability to track usage of a site to specific users and bill for that users is provided by the management and operations component of the present invention. For example, a user would be billed for belonging to a site requiring a monthly fee for viewing.

Web Performance Monitoring Capabilities

Monitors production web site performance and traffic

Provides automatic alarm for performance thresholds

Generates reports based upon past performance

The management and operations component of the present invention may monitor production web site performance and traffic. An automatic alarm may be set to go off when performance thresholds are being approached or exceeded. As an option, reports may be generated based upon past performance.

Network Management creates and manages policies and user profiles

Centrally creates hardware inventories for workstations automatically

Centrally configures printers

Offers centralized application installation

Assigns application rights to groups or individuals

Creates standard desktop environment for some or all users

Offers load balancing

Offers automatic transparent transfer across multiple servers

Provides remote help desk utilities for software-related problems

The management and operations component of the present invention centrally creates and manages policies and user profiles. Hardware inventories for workstations may also be automatically centrally created. Printers are centrally configured and loads are balanced. Centralized application installation may be offered. As an option, particular application rights may be assigned to groups or individuals and a standard desktop environment may be offered to some or all users. Ideally, automatic transparent transfer across multiple servers is permitted. Optionally, remote help desk utilities for software-related problems are provided.

Community & Role Management

Defines communities of visitors based on common characteristics and preferences

Dynamically assigns user to community based on profile

Updates community attributes

The management and operations component of the present invention may define communities of visitors based on common characteristics and preferences. Users may be dynamically assigned to particular communities based on their profiles. Ideally, community attributes are periodically updated.

Redundancy/Backup Capabilities

Restores deleted application files an corrupted files/settings automatically

Provides component failover capabilities

The management and operations component of the present invention may restore deleted application files as well as corrupted files and setting automatically. Also provided may be component failure capabilities.

Web App. Admin Capabilities (Store, Training, Service)

Provides catalog administrative capabilities (add products, change prices)

Provides application administration tools (restart application)

The management and operations component of the present invention may provide catalog administrative capabilities. Such capabilities could add products, change prices, etc. Application administration tools could be provided as well. For example, such administration tools could restart an application when necessary, such as after an automatic software update or where the application has stopped responding.

Configuration Management Capabilities

Provides centralized application installation

Schedules software updates to occur at a specific time (e.g. certain days, off-peak hours)

Creates standard environment for applications

Assigns application rights to groups or individuals

Blocks unauthorized deletion of network-installed applications

Integrates with web applications revision control system

Provides logging mechanism to track configuration change requests

Centralized application installation may be provided by the management and operations component of the present invention. Software updates may be scheduled to occur at a specific time, such as on certain days or during off-peak hours. Application rights may be assigned to groups or individuals, and unauthorized deletion of network-installed applications would be blocked. Ideally, the management and operations component of the present invention integrates with the revision control systems of web applications. Optionally, a logging mechanism may be provided for tracking configuration change requests. As another option, standard environments for applications may be created.

Web Application Staging

Provides ability to preview, test and change applications before production stage Provides ability to schedule releases (e.g. time-based batch release, individual immediate release, etc.)

The ability to preview, test and change applications before production stage may be provided by the management and operations component of the present invention, as may the ability to schedule releases, such as time-based batch releases, individual immediate releases, and the like.

Web Developer Services

Figure 85:
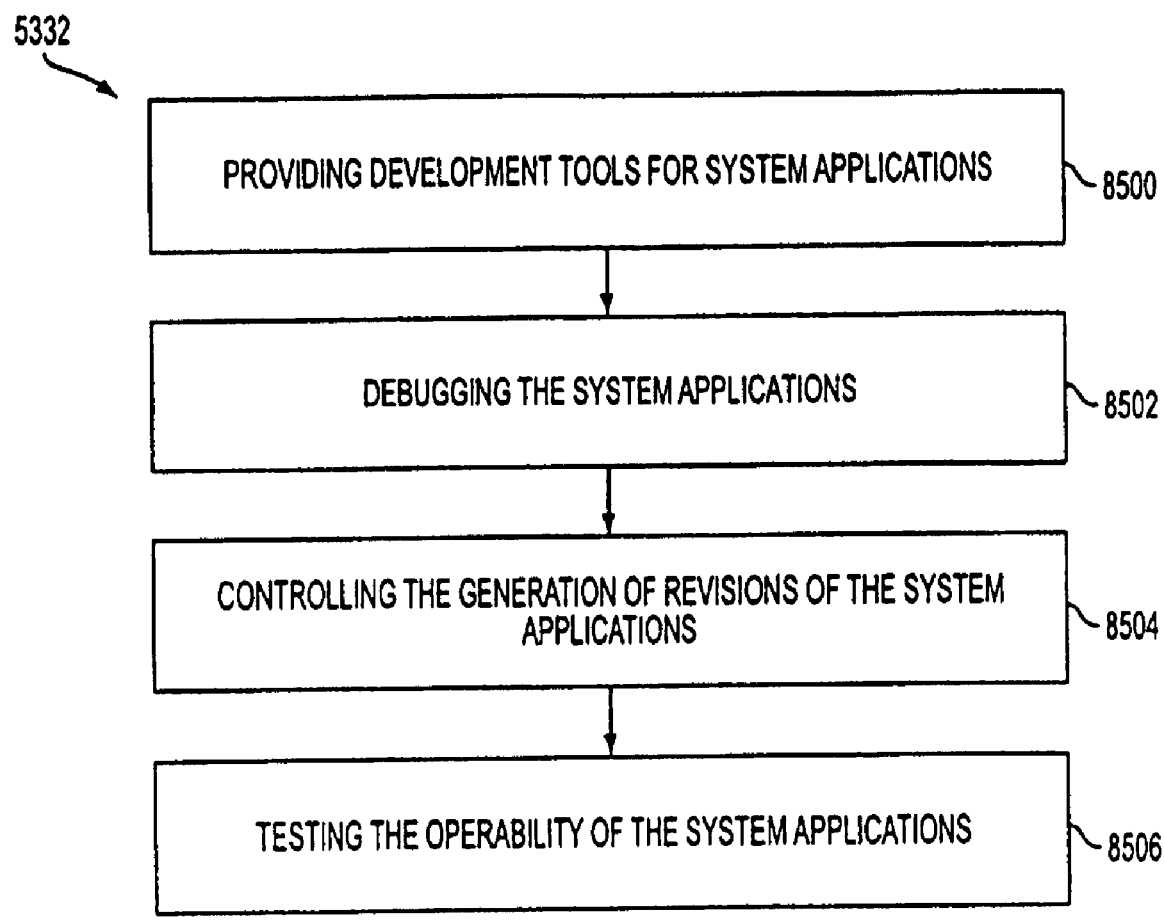
FIG. 85 is a flowchart illustrating the web developer services in accordance with one embodiment of the present invention.

As shown in component 5332 of FIG. 53, one embodiment of the present invention is provided for affording a combination of web development-related services. Various features may be included, such as development tools, utilities, and testing tools, as are provided in operation 8500 of FIG. 85. System applications are debugged in operation 8502. In operation 8504, the generation of revisions of the system applications is controlled, and in operation 8506, the operability of the system applications are tested.

Web Application Development Tools

Provides application languages, tools, and utilities

Automatically generates site maps for user's collection of pages

Automatically tests local and remote hyperlinks

Coordinates file reuse among projects

Integrates with revision control system

The web development component of the present invention may provide application languages, tools, and utilities. A site maps of a collection of pages of a particular user may be automatically generated. Further, local and remote hyperlinks may be automatically tested. As an option, file reuse among projects may be coordinated. Ideally, the management and operations component of the present invention integrates with a revision control system.

Web Application Debugging Utilities

Offers step-through debugging tool

Automatically compiles finished code to test technical correctness

Offers auto-correction for common errors

Automatically checks all links off of site for validity

Provides ability to set variable watches

Provides ability to set program break points

Provides ability to log to a debugging file

The web development component of the present invention may offer a step-through debugging tool, which could guide a user through a series of diagnostic tests aimed at identifying and resolving problems causing errors. Preferably, finished code is automatically compiled to test its technical correctness. Optionally, auto-correction of common errors may be a feature. Also optionally, all links off of a site may be automatically checked for validity. The ability to set variable watches may be provided, as may the ability to set program break points and log to a debugging file.

Web Application Revision Control

Stores current files along with past changes to docs to allow easy recreation of previous versions Allows user to set various access levels to assign user- and project-specific authorization Allows user to tailor custom file access rights Reconciles file changes from multiple users to prevent accidental code overwriting Speeds up performance by allowing direct access to most recent files, leaving delta storage for previous versions Ensures each user kept in sync with rest of the team by comparing the user's personal working directory with the corresponding shared project Allows specific versions of files to be grouped to identify application builds The web development component of the present invention may store current files along with past changes to docs to allow easy re-creation of previous versions. Users may be allowed to set various access levels to assign user- and project-specific authorization. Preferably, users are allowed to tailor custom file access rights.

Optionally, file changes from multiple users may be reconciled to prevent accidental code overwriting as well as for speeding up performance by allowing direct access to most recent files, leaving delta storage for previous versions. The web development component of the present invention ensures each user is kept in sync with the rest of the team by comparing the user's personal working directory with the corresponding shared project. Specific versions of files may be allowed to be grouped to identify application builds.

Web Site Testing Tools (Performance & Link Spiders)

Simulates multiple users on web site

Allows pages to be retrieved and programmatically navigated by simulated clients Logs error messages Records performance statistics Enables programmatic control of load generation Allows tests to be scheduled and load to be varied over time The web development component of the present invention may test a web site, such as by simulating multiple users on web site. Pages may be retrieved and programmatically navigated by simulated clients. Error messages are logged and performance statistics are recorded. Programmatic control of load generation may be enabled. Tests can be scheduled and loaded to be varied over time.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

WAF provides organization, community, and/or universe wide secure environments whose integrity is assured by processes securely controlled in WAF participant user installations (nodes). WAF installations, in the preferred embodiment, may include both software and tamper resistant hardware semiconductor elements. Such a semiconductor arrangement comprises, at least in part, special purpose circuitry that has been designed to protect against tampering with, or unauthorized observation of, the information and functions used in performing the WAF's control functions. The special purpose secure circuitry provided by the present invention includes at least one of: a dedicated semiconductor arrangement known as a Secure Processing Unit (SPU) and/or a standard microprocessor, microcontroller, and/or other processing logic that accommodates the requirements of the present invention and functions as an SPU. WAF's secure hardware may be found incorporated into, for example, a fax/modem chip or chip pack, I/O controller, video display controller, and/or other available digital processing arrangements. It is anticipated that portions of the present invention's WAF secure hardware capabilities may ultimately be standard design elements of central processing units (CPUs) for computers and various other electronic devices.

Designing WAF capabilities into one or more standard microprocessor, microcontroller and/or other digital processing components may materially reduce WAF related hardware costs by employing the same hardware resources for both the transaction management uses contemplated by the present invention and for other, host electronic appliance functions. This means that a WAF SPU can employ (share) circuitry elements of a "standard" CPU. For example, if a "standard" processor can operate in protected mode and can execute WAF related instructions as a protected activity, then such an embodiment may provide sufficient hardware security for a variety of applications and the expense of a special purpose processor might be avoided. Under one preferred embodiment of the present invention, certain memory (e.g., RAM, ROM, NVRAM) is maintained during WAF related instruction processing in a protected mode (for example, as supported by protected mode microprocessors). This memory is located in the same package as the processing logic (e.g. processor). Desirably, the packaging and memory of such a processor would be designed using security techniques that enhance its resistance to tampering.

The degree of overall security of the WAF system is primarily dependent on the degree of tamper resistance and concealment of WAF control process execution and related data storage activities. Employing special purpose semiconductor packaging techniques can significantly contribute to the degree of security. Concealment and tamper-resistance in semiconductor memory (e.g., RAM, ROM, NVRAM) can be achieved, in part, by employing such memory within an SPU package, by encrypting data before it is sent to external memory (such as an external RAM package) and decrypting encrypted data within the CPU/RAM package before it is executed. This process is used for important WAF related data when such data is stored on unprotected media, for example, standard host storage, such as random access memory, mass storage, etc. In that event, a WAF SPU would encrypt data that results from a secure WAF execution before such data was stored in external memory.

Summary of Some Important Features Provided by WAF in Accordance With the Present Invention WAF employs a variety of capabilities that serve as a foundation for a general purpose, sufficiently secure distributed electronic commerce solution. WAF enables an electronic commerce marketplace that supports divergent, competitive business partnerships, agreements, and evolving overall business models. For example, WAF includes features that:

"sufficiently" impede unauthorized and/or uncompensated use of electronic information and/or appliances through the use of secure communication, storage, and transaction management technologies. WAF supports a model wide, distributed security implementation which creates a single secure "virtual" transaction processing and information storage environment. WAF enables distributed WAF installations to securely store and communicate information and remotely control the execution processes and the character of use of electronic information at other WAF installations and in a wide variety of ways;

support low-cost, efficient, and effective security architectures for transaction control, auditing, reporting, and related communications and information storage. WAF may employ tagging related security techniques, the time-ageing of encryption keys, the compartmentalization of both stored control information (including differentially tagging such stored information to ensure against substitution and tampering) and distributed content (to, for many content applications, employ one or more content encryption keys that are unique to the specific WAF installation and/or user), private key techniques such as triple DES to encrypt content, public key techniques such as RSA to protect communications and to provide the benefits of digital signature and authentication to securely bind together the nodes of a WAF arrangement, secure processing of important transaction management executable code, and a combining of a small amount of highly secure, hardware protected storage space with a much larger "exposed" mass media storage space storing secured (normally encrypted and tagged) control and audit information. WAF employs special purpose hardware distributed throughout some or all locations of a WAF implementation: a) said hardware controlling important elements of: content preparation (such as causing such content to be placed in a WAF content container and associating content control information with said content), content and/or electronic appliance usage auditing, content usage analysis, as well as content usage control; and b) said hardware having been designed to securely handle processing load module control activities, wherein said control processing activities may involve a sequence of required control factors;

support dynamic user selection of information subsets of a WAF electronic information product (WAF controlled content). This contrasts with the constraints of having to use a few high level individual, pre-defined content provider information increments such as being required to select a whole information product or product section in order to acquire or otherwise use a portion of such product or section.

WAF supports metering and usage control over a variety of increments (including "atomic" increments, and combinations of different increment types) that are selected ad hoc by a user and represent a collection of pre-identified one or more increments (such as one or more blocks of a preidentified nature, e.g., bytes, images, logically related blocks) that form a generally arbitrary, but logical to a user, content "deliverable." WAF control information (including budgeting, pricing and metering) can be configured so that it can specifically apply, as appropriate, to ad hoc selection of different, unanticipated variable user selected aggregations of information increments and pricing levels can be, at least in part, based on quantities and/or nature of mixed increment selections (for example, a certain quantity of certain text could mean associated images might be discounted by 15%; a greater quantity of text in the "mixed" increment selection might mean the images are discounted 20%). Such user selected aggregated information increments can reflect the actual requirements of a user for information and is more flexible than being limited to a single, or a few, high level, (e.g. product, document, database record) predetermined increments. Such high level increments may include quantities of information not desired by the user and as a result be more costly than the subset of information needed by the user if such a subset was available. In sum, the present invention allows information contained in electronic information products to be supplied according to user specification. Tailoring to user specification allows the present invention to provide the greatest value to users, which in turn will generate the greatest amount of electronic commerce activity. The user, for example, would be able to define an aggregation of content derived from various portions of an available content product, but which, as a deliverable for use by the user, is an entirely unique aggregated increment. The user may, for example, select certain numbers of bytes of information from various portions of an information product, such as a reference work, and copy them to disc in unencrypted form and be billed based on total number of bytes plus a surcharge on the number of "articles" that provided the bytes. A content provider might reasonably charge less for such a user defined information increment since the user does not require all of the content from all of the articles that contained desired information. This process of defining a user desired information increment may involve artificial intelligence database search tools that contribute to the location of the most relevant portions of information from an information product and cause the automatic display to the user of information describing search criteria hits for user selection or the automatic extraction and delivery of such portions to the user. WAF further supports a wide variety of predefined increment types including:

bytes, images, content over time for audio or video, or any other increment that can be identified by content provider data mapping efforts, such as:

sentences, paragraphs, articles, database records, and byte offsets representing increments of logically related information.

WAF supports as many simultaneous predefined increment types as may be practical for a given type of content and business model.

securely store at a user's site potentially highly detailed information reflective of a user's usage of a variety of different content segment types and employing both inexpensive "exposed" host mass storage for maintaining detailed information in the form of encrypted data and maintaining summary information for security testing in highly secure special purpose WAF installation nonvolatile memory (if available).

support trusted chain of handling capabilities for pathways of distributed electronic information and/or for content usage related information. Such chains may extend, for example, from a content creator, to a distributor, a redistributor, a client user, and then may provide a pathway for securely reporting the same and/or differing usage information to one or more auditors, such as to one or more independent clearinghouses and then back to the content providers, including content creators. The same and/or different pathways employed for certain content handling, and related content control information and reporting information handling, may also be employed as one or more pathways for electronic payment handling (payment is characterized in the present invention as administrative content) for electronic content and/or appliance usage. These pathways are used for conveyance of all or portions of content, and/or content related control information. Content creators and other providers can specify the pathways that, partially or fully, must be used to disseminate commercially distributed property content, content control information, payment administrative content, and/or associated usage reporting information.

Control information specified by content providers may also specify which specific parties must or may (including, for example, a group of eligible parties from which a selection may be made) handle conveyed information. It may also specify what transmission means (for example telecommunication carriers or media types) and transmission hubs must or may be used.

support flexible auditing mechanisms, such as employing "bitmap meters," that achieve a high degree of efficiency of operation and throughput and allow, in a practical manner, the retention and ready recall of information related to previous usage activities and related patterns. This flexibility is adaptable to a wide variety of billing and security control strategies such as:

upgrade pricing (e.g. suite purchases), pricing discounts (including quantity discounts), billing related time duration variables such as discounting new purchases based on the timing of past purchases, and security budgets based on quantity of different, logically related units of electronic information used over an interval of time.

Use of bitmap meters (including "regular" and "wide" bitmap meters) to record usage and/or purchase of information, in conjunction with other elements of the preferred embodiment of the present invention, uniquely supports efficient maintenance of usage history for: (a) rental, (b) flat fee licensing or purchase, (c) licensing or purchase discounts based upon historical usage variables, and (d) reporting to users in a manner enabling users to determine whether a certain item was acquired, or acquired within a certain time period (without requiring the use of conventional database mechanisms, which are highly inefficient for these applications). Bitmap meter methods record activities associated with electronic appliances, properties, objects, or portions thereof, and/or administrative activities that are independent of specific properties, objects, etc., performed by a user and/or electronic appliance such that a content and/or appliance provider and/or controller of an administrative activity can determine whether a certain activity has occurred at some point, or during a certain period, in the past (for example, certain use of a commercial electronic content product and/or appliance). Such determinations can then be used as part of pricing and/or control strategies of a content and/or appliance provider, and/or controller of an administrative activity. For example, the content provider may choose to charge only once for access to a portion of a property, regardless of the number of times that portion of the property is accessed by a user.

support "launchable" content, that is content that can be provided by a content provider to an end-user, who can then copy or pass along the content to other end-user parties without requiring the direct participation of a content provider to register and/or otherwise initialize the content for use. This content goes "out of (the traditional distribution) channel" in the form of a "traveling object." Traveling objects are containers that securely carry at least some permissions information and/or methods that are required for their use (such methods need not be carried by traveling objects if the required methods will be available at, or directly available to a destination WAF installation). Certain travelling objects may be used at some or all WAF installations of a given WAF arrangement since they can make available the content control information necessary for content use without requiring the involvement of a commercial WAF value chain participant or data security administrator (e.g. a control officer or network administrator). As long as traveling object control information requirements are available at the user WAF installation secure subsystem (such as the presence of a sufficient quantity of financial credit from an authorized credit provider), at least some travelling object content may be used by a receiving party without the need to establish a connection with a remote WAF authority (until, for example, budgets are exhausted or a time content usage reporting interval has occurred). Traveling objects can travel "out-of-channel," allowing, for example, a user to give a copy of a traveling object whose content is a software program, a movie or a game, to a neighbor, the neighbor being able to use the traveling object if appropriate credit (e.g. an electronic clearinghouse account from a clearinghouse such as VISA or AT&T) is available. Similarly, electronic information that is generally available on an Internet, or a similar network, repository might be provided in the form of a travelling object that can be downloaded and subsequently copied by the initial downloader and then passed along to other parties who may pass the object on to additional parties.

provide very flexible and extensible user identification according to individuals, installations, by groups such as classes, and by function and hierarchical identification employing a hierarchy of levels of client identification (for example, client organization ID, client department ID, client network ID, client project ID, and client employee ID, or any appropriate subset of the above).

provide a general purpose, secure, component based content control and distribution system that functions as a foundation transaction operating system environment that employs executable code pieces crafted for transaction control and auditing. These code pieces can be reused to optimize efficiency in creation and operation of trusted, distributed transaction management arrangements. WAF supports providing such executable code in the form of "atomic" load modules and associated data. Many such load modules are inherently configurable, aggregatable, portable, and extensible and singularly, or in combination (along with associated data), run as control methods under the WAF transaction operating environment. WAF can satisfy the requirements of widely differing electronic commerce and data security applications by, in part, employing this general purpose transaction management foundation to securely process WAF transaction related control methods. Control methods are created primarily through the use of one or more of said executable, reusable load module code pieces (normally in the form of executable object components) and associated data. The component nature of control methods allows the present invention to efficiently operate as a highly configurable content control system. Under the present invention, content control models can be iteratively and asynchronously shaped, and otherwise updated to accommodate the needs of WAF participants to the extent that such shaping and otherwise updating conforms to constraints applied by a WAF application, if any (e.g., whether new component assemblies are accepted and, if so, what certification requirements exist for such component assemblies or whether any or certain participants may shape any or certain control information by selection amongst optional control information (permissions record) control methods. This iterative (or concurrent) multiple participant process occurs as a result of the submission and use of secure, control information components (executable code such as load modules and/or methods, and/or associated data). These components may be contributed independently by secure communication between each control information influencing WAF participant's WAF installation and may require certification for use with a given application, where such certification was provided by a certification service manager for the WAF arrangement who ensures secure interoperability and/or reliability (e.g., bug control resulting from interaction) between appliances and submitted control methods. The transaction management control functions of a WAF electronic appliance transaction operating environment interact with non-secure transaction management operating system functions to properly direct transaction processes and data related to electronic information security, usage control, auditing, and usage reporting. WAF provides the capability to manages resources related to secure WAF content and/or appliance control information execution and data storage.

facilitate creation of application and/or system functionality under WAF and to facilitate integration into electronic appliance environments of load modules and methods created under the present invention. To achieve this, WAF employs an Application Programmer's Interface (API) and/or a transaction operating system (such as a ROS) programming language with incorporated functions, both of which support the use of capabilities and can be used to efficiently and tightly integrate WAF functionality into commercial and user applications.

support user interaction through: (a) "Pop-Up" applications which, for example, provide messages to users and enable users to take specific actions such as approving a transaction, (b) stand-alone WAF applications that provide administrative environments for user activities such as: end-user preference specifications for limiting the price per transaction, unit of time, and/or session, for accessing history information concerning previous transactions, for reviewing financial information such as budgets, expenditures (e.g. detailed and/or summary) and usage analysis information, and (c) WAF aware applications which, as a result of the use of a WAF API and/or a transaction management (for example, ROS based) programming language embeds WAF "awareness" into commercial or internal software (application programs, games, etc.) so that WAF user control information and services are seamlessly integrated into such software and can be directly accessed by a user since the underlying functionality has been integrated into the commercial software's native design. For example, in a WAF aware word processor application, a user may be able to "print" a document into a WAF content container object, applying specific control information by selecting from amongst a series of different menu templates for different purposes (for example, a confidential memo template for internal organization purposes may restrict the ability to "keep," that is to make an electronic copy of the memo).

employ "templates" to ease the process of configuring capabilities of the present invention as they relate to specific industries or businesses. Templates are applications or application add-ons under the present invention. Templates support the efficient specification and/or manipulation of criteria related to specific content types, distribution approaches, pricing mechanisms, user interactions with content and/or administrative activities, and/or the like. Given the very large range of capabilities and configurations supported by the present invention, reducing the range of configuration opportunities to a manageable subset particularly appropriate for a given business model allows the full configurable power of the present invention to be easily employed by "typical" users who would be otherwise burdened with complex programming and/or configuration design responsibilities template applications can also help ensure that WAF related processes are secure and optimally bug free by reducing the risks associated with the contribution of independently developed load modules, including unpredictable aspects of code interaction between independent modules and applications, as well as security risks associated with possible presence of viruses in such modules. WAF, through the use of templates, reduces typical user configuration responsibilities to an appropriately focused set of activities including selection of method types (e.g. functionality) through menu choices such as multiple choice, icon selection, and/or prompting for method parameter data (such as identification information, prices, budget limits, dates, periods of time, access rights to specific content, etc.) that supply appropriate and/or necessary data for control information purposes. By limiting the typical (non-programming) user to a limited subset of configuration activities whose general configuration environment (template) has been pre-set to reflect general requirements corresponding to that user, or a content or other business model can very substantially limit difficulties associated with content containerization (including placing initial control information on content), distribution, client administration, electronic agreement implementation, end-user interaction, and clearinghouse activities, including associated interoperability problems (such as conflicts resulting from security, operating system, and/or certification incompatibilities). Use of appropriate WAF templates can assure users that their activities related to content WAF containerization, contribution of other control information, communications, encryption techniques and/or keys, etc. will be in compliance with specifications for their distributed WAF arrangement. WAF templates constitute preset configurations that can normally be reconfigurable to allow for new and/or modified templates that reflect adaptation into new industries as they evolve or to reflect the evolution or other change of an existing industry. For example, the template concept may be used to provide individual, overall frameworks for organizations and individuals that create, modify, market, distribute, consume, and/or otherwise use movies, audio recordings and live performances, magazines, telephony based retail sales, catalogs, computer software, information data bases, multimedia, commercial communications, advertisements, market surveys, infomercials, games, CAD/CAM services for numerically controlled machines, and the like. As the context surrounding these templates changes or evolves, template applications provided under the present invention may be modified to meet these changes for broad use, or for more focused activities. A given WAF participant may have a plurality of templates available for different tasks. A party that places content in its initial WAF container may have a variety of different, configurable templates depending on the type of content and/or business model related to the content. An end-user may have different configurable templates that can be applied to different document types (e-mail, secure internal documents, database records, etc.) and/or subsets of users (applying differing general sets of control information to different bodies of users, for example, selecting a list of users who may, under certain preset criteria, use a certain document). Of course, templates may, under certain circumstances have fixed control information and not provide for user selections or parameter data entry.

support plural, different control models regulating the use and/or auditing of either the same specific copy of electronic information content and/or differently regulating different copies (occurrences) of the same electronic information content. Differing models for billing, auditing, and security can be applied to the same piece of electronic information content and such differing sets of control information may employ, for control purposes, the same, or differing, granularities of electronic information control increments. This includes supporting variable control information for budgeting and auditing usage as applied to a variety of predefined increments of electronic information, including employing a variety of different budgets and/or metering increments for a given electronic information deliverable for: billing units of measure, credit limit, security budget limit and security content metering increments, and/or market surveying and customer profiling content metering increments. For example, a CD-ROM disk with a database of scientific articles might be in part billed according to a formula based on the number of bytes decrypted, number of articles containing said bytes decrypted, while a security budget might limit the use of said database to no more than 5% of the database per month for users on the wide area network it is installed on.

provide mechanisms to persistently maintain trusted content usage and reporting control information through both a sufficiently secure chain of handling of content and content control information and through various forms of usage of such content wherein said persistence of control may survive such use. Persistence of control includes the ability to extract information from a WAF container object by creating a new container whose contents are at least in part secured and that contains both the extracted content and at least a portion of the control information which control information of the original container and/or are at least in part produced by control information of the original container for this purpose and/or WAF installation control information stipulates should persist and/or control usage of content in the newly formed container. Such control information can continue to manage usage of container content if the container is "embedded" into another WAF managed object, such as an object which contains plural embedded WAF containers, each of which contains content derived (extracted) from a different source.

enables users, other value chain participants (such as clearinghouses and government agencies), and/or user organizations, to specify preferences or requirements related to their use of electronic content and/or appliances. Content users, such as end-user customers using commercially distributed content (games, information resources, software programs, etc.), can define, if allowed by senior control information, budgets, and/or other control information, to manage their own internal use of content. Uses include, for example, a user setting a limit on the price for electronic documents that the user is willing to pay without prior express user authorization, and the user establishing the character of metering information he or she is willing to allow to be collected (privacy protection). This includes providing the means for content users to protect the privacy of information derived from their use of a WAF installation and content and/or appliance usage auditing. In particular, WAF can prevent information related to a participant's usage of electronic content from being provided to other parties without the participant's tacit or explicit agreement.

provide mechanisms that allow control information to "evolve" and be modified according, at least in part, to independently, securely delivered further control information. Said control information may include executable code (e.g., load modules) that has been certified as acceptable (e.g., reliable and trusted) for use with a specific WAF application, class of applications, and/or a WAF distributed arrangement. This modification (evolution) of control information can occur upon content control information (load modules and any associated data) circulating to one or more WAF participants in a pathway of handling of control information, or it may occur upon control information being received from a WAF participant. Handlers in a pathway of handling of content control information, to the extent each is authorized, can establish, modify, and/or contribute to, permission, auditing, payment, and reporting control information related to controlling, analyzing, paying for, and/or reporting usage of, electronic content and/or appliances (for example, as related to usage of WAF controlled property content). Independently delivered (from an independent source which is independent except in regards to certification), at least in part secure, control information can be employed to securely modify content control information when content control information has flowed from one party to another party in a sequence of WAF content control information handling. This modification employs, for example, one or more WAF component assemblies being securely processed in a WAF secure subsystem. In an alternate embodiment, control information may be modified by a senior party through use of their WAF installation secure sub-system after receiving submitted, at least in part secured, control information from a "junior" party, normally in the form of a WAF administrative object. Control information passing along WAF pathways can represent a mixed control set, in that it may include: control information that persisted through a sequence of control information handlers, other control information that was allowed to be modified, and further control information representing new control information and/or mediating data. Such a control set represents an evolution of control information for disseminated content. In this example the overall content control set for a WAF content container is "evolving" as it securely (e.g. communicated in encrypted form and using authentication and digital signaturing techniques) passes, at least in part, to a new participant's WAF installation where the proposed control information is securely received and handled. The received control information may be integrated (through use of the receiving parties' WAF installation secure sub-system) with in-place control information through a negotiation process involving both control information sets. For example, the modification, within the secure sub-system of a content provider's WAF installation, of content control information for a certain WAF content container may have occurred as a result of the incorporation of required control information provided by a financial credit provider. Said credit provider may have employed their WAF installation to prepare and securely communicate (directly or indirectly) said required control information to said content provider. Incorporating said required control information enables a content provider to allow the credit provider's credit to be employed by a content end-user to compensate for the end-user's use of WAF controlled content and/or appliances, so long as said end-user has a credit account with said financial credit provider and said credit account has sufficient credit available. Similarly, control information requiring the payment of taxes and/or the provision of revenue information resulting from electronic commerce activities may be securely received by a content provider. This control information may be received, for example, from a government agency. Content providers might be required by law to incorporate such control information into the control information for commercially distributed content and/or services related to appliance usage. Proposed control information is used to an extent allowed by senior control information and as determined by any negotiation trade-offs that satisfy priorities stipulated by each set (the received set and the proposed set). WAF also accommodates different control schemes specifically applying to different participants (e.g., individual participants and/or participant classes (types)) in a network of WAF content handling participants.

support multiple simultaneous control models for the same content property and/or property portion. This allows, for example, for concurrent business activities which are dependent on electronic commercial product content distribution, such as acquiring detailed market survey information and/or supporting advertising, both of which can increase revenue and result in lower content costs to users and greater value to content providers. Such control information and/or overall control models may be applied, as determined or allowed by control information, in differing manners to different participants in a pathway of content, reporting, payment, and/or related control information handling. WAF supports applying different content control information to the same and/or different content and/or appliance usage related activities, and/or to different parties in a content and/or appliance usage model, such that different parties (or classes of WAF users, for example) are subject to differing control information managing their use of electronic information content. For example, differing control models based on the category of a user as a distributor of a WAF controlled content object or an end-user of such content may result in different budgets being applied. Alternatively, for example, a one distributor may have the right to distribute a different array of properties than another distributor (from a common content collection provided, for example, on optical disc). An individual, and/or a class or other grouping of end-users, may have different costs (for example, a student, senior citizen, and/or poor citizen user of content who may be provided with the same or differing discounts) than a "typical" content user.

support provider revenue information resulting from customer use of content and/or appliances, and/or provider and/or end-user payment of taxes, through the transfer of credit and/or electronic currency from said end-user and/or provider to a government agency, might occur "automatically" as a result of such received control information causing the generation of a WAF content container whose content includes customer content usage information reflecting secure, trusted revenue summary information and/or detailed user transaction listings (level of detail might depend, for example on type or size of transaction—information regarding a bank interest payment to a customer or a transfer of a large (e.g. over $10,000) might be, by law, automatically reported to the government). Such summary and/or detailed information related to taxable events and/or currency, and/or creditor currency transfer, may be passed along a pathway of reporting and/or payment to the government in a WAF container. Such a container may also be used for other WAF related content usage reporting information.

support the flowing of content control information through different "branches" of content control information handling so as to accommodate, under the present invention's preferred embodiment, diverse controlled distributions of WAF controlled content. This allows different parties to employ the same initial electronic content with differing (perhaps competitive) control strategies. In this instance, a party who first placed control information on content can make certain control assumptions and these assumptions would evolve into more specific and/or extensive control assumptions. These control assumptions can evolve during the branching sequence upon content model participants submitting control information changes, for example, for use in "negotiating" with "in place" content control information. This can result in new or modified content control information and/or it might involve the selection of certain one or more already "in-place" content usage control methods over in-place alternative methods, as well as the submission of relevant control information parameter data. This form of evolution of different control information sets applied to different copies of the same electronic property content and/or appliance results from WAF control information flowing "down" through different branches in an overall pathway of handling and control and being modified differently as it diverges down these different pathway branches. This ability of the present invention to support multiple pathway branches for the flow of both WAF content control information and WAF managed content enables an electronic commerce marketplace which supports diverging, competitive business partnerships, agreements, and evolving overall business models which can employ the same content properties combined, for example, in differing collections of content representing differing at least in part competitive products.

enable a user to securely extract, through the use of the secure subsystem at the user's WAF installation, at least a portion of the content included within a WAF content container to produce a new, secure object (content container), such that the extracted information is maintained in a continually secure manner through the extraction process. Formation of the new WAF container containing such extracted content shall result in control information consistent with, or specified by, the source WAF content container, and/or local WAF installation secure subsystem as appropriate, content control information. Relevant control information, such as security and administrative information, derived, at least in part, from the parent (source) object's control information, will normally be automatically inserted into a new WAF content container object containing extracted WAF content. This process typically occurs under the control framework of a parent object and/or WAF installation control information executing at the user's WAF installation secure subsystem (with, for example, at least a portion of this inserted control information being stored securely in encrypted form in one or more permissions records). In an alternative embodiment, the derived content control information applied to extracted content may be in part or whole derived from, or employ, content control information stored remotely from the WAF installation that performed the secure extraction such as at a remote server location. As with the content control information for most WAF managed content, features of the present invention allows the content's control information to:

(a) "evolve," for example, the extractor of content may add new control methods and/or modify control parameter data, such as WAF application compliant methods, to the extent allowed by the content's in-place control information. Such new control information might specify, for example, who may use at least a portion of the new object, and/or how said at least a portion of said extracted content may be used (e.g. when at least a portion may be used, or what portion or quantity of portions may be used);

(b) allow a user to combine additional content with at least a portion of said extracted content, such as material authored by the extractor and/or content (for example, images, video, audio, and/or text) extracted from one or more other WAF container objects for placement directly into the new container;

(c) allow a user to securely edit at least a portion of said content while maintaining said content in a secure form within said WAF content container;

(d) append extracted content to a pre-existing WAF content container object and attach associated control information—in these cases, user added information may be secured, e.g., encrypted, in part or as a whole, and may be subject to usage and/or auditing control information that differs from the those applied to previously in place object content;

(e) preserve WAF control over one or more portions of extracted content after various forms of usage of said portions, for example, maintain content in securely stored form while allowing "temporary" on screen display of content or allowing a software program to be maintained in secure form but transiently decrypt any encrypted executing portion of said program (all, or only a portion, of said program may be encrypted to secure the program).

Generally, the extraction features of the present invention allow users to aggregate and/or disseminate and/or otherwise use protected electronic content information extracted from content container sources while maintaining secure WAF capabilities thus preserving the rights of providers in said content information after various content usage processes.

support the aggregation of portions of WAF controlled content, such portions being subject to differing WAF content container control information, wherein various of said portions may have been provided by independent, different content providers from one or more different locations remote to the user performing the aggregation.

Such aggregation, in the preferred embodiment of the present invention, may involve preserving at least a portion of the control information (e.g., executable code such as load modules) for each of various of said portions by, for example, embedding some or all of such portions individually as WAF content container objects within an overall WAF content container and/or embedding some or all of such portions directly into a WAF content container. In the latter case, content control information of said content container may apply differing control information sets to various of such portions based upon said portions original control information requirements before aggregation. Each of such embedded WAF content containers may have its own control information in the form of one or more permissions records. Alternatively, a negotiation between control information associated with various aggregated portions of electronic content, may produce a control information set that would govern some or all of the aggregated content portions. The WAF content control information produced by the negotiation may be uniform (such as having the same load modules and/or component assemblies, and/or it may apply differing such content control information to two or more portions that constitute an aggregation of WAF controlled content such as differing metering, budgeting, billing and/or payment models. For example, content usage payment may be automatically made, either through a clearinghouse, or directly, to different content providers for different potions.

enable flexible metering of, or other collection of information related to, use of electronic content and/or electronic appliances. A feature of the present invention enables such flexibility of metering control mechanisms to accommodate a simultaneous, broad array of: (a) different parameters related to electronic information content use; (b) different increment units (bytes, documents, properties, paragraphs, images, etc.) and/or other organizations of such electronic content; and/or (c) different categories of user and/or WAF installation types, such as client organizations, departments, projects, networks, and/or individual users, etc. This feature of the present invention can be employed for content security, usage analysis (for example, market surveying), and/or compensation based upon the use and/or exposure to WAF managed content. Such metering is a flexible basis for ensuring payment for content royalties, licensing, purchasing, and/or advertising. A feature of the present invention provides for payment means supporting flexible electronic currency and credit mechanisms, including the ability to securely maintain audit trails reflecting information related to use of such currency or credit. WAF supports multiple differing hierarchies of client organization control information wherein an organization client administrator distributes control information specifying the usage rights of departments, users, and/or projects. Likewise, a department (division) network manager can function as a distributor (budgets, access rights, etc.) for department networks, projects, and/or users, etc.

provide scalable, integratable, standardized control means for use on electronic appliances ranging from inexpensive consumer (for example, television set-top appliances) and professional devices (and hand-held PDAs) to servers, mainframes, communication switches, etc. The scalable transaction management/auditing technology of the present invention will result in more efficient and reliable interoperability amongst devices functioning in electronic commerce and/or data security environments. As standardized physical containers have become essential to the shipping of physical goods around the world, allowing these physical containers to universally "fit" unloading equipment, efficiently use truck and train space, and accommodate known arrays of objects (for example, boxes) in an efficient manner, so WAF electronic content containers may, as provided by the present invention, be able to efficiently move electronic information content (such as commercially published properties, electronic currency and credit, and content audit information), and associated content control information, around the world. Interoperability is fundamental to efficient electronic commerce. The design of the WAF foundation, WAF load modules, and WAF containers, are important features that enable the WAF node operating environment to be compatible with a very broad range of electronic appliances. The ability, for example, for control methods based on load modules to execute in very "small" and inexpensive secure sub-system environments, such as environments with very little read/write memory, while also being able to execute in large memory sub-systems that may be used in more expensive electronic appliances, supports consistency across many machines. This consistent WAF operating environment, including its control structures and container architecture, enables the use of standardized WAF content containers across a broad range of device types and host operating environments. Since WAF capabilities can be seamlessly integrated as extensions, additions, and/or modifications to fundamental capabilities of electronic appliances and host operating systems, WAF containers, content control information, and the WAF foundation will be able to work with many device types and these device types will be able to consistently and efficiently interpret and enforce WAF control information. Through this integration users can also benefit from a transparent interaction with many of the capabilities of WAF. WAF integration with software operating on a host electronic appliance supports a variety of capabilities that would be unavailable or less secure without such integration. Through integration with one or more device applications and/or device operating environments, many capabilities of the present invention can be presented as inherent capabilities of a given electronic appliance, operating system, or appliance application. For example, features of the present invention include: (a) WAF system software to in part extend and/or modify host operating systems such that they possesses WAF capabilities, such as enabling secure transaction processing and electronic information storage; (b) one or more application programs that in part represent tools associated with WAF operation; and/or (c) code to be integrated into application programs, wherein such code incorporates references into WAF system software to integrate WAF capabilities and makes such applications WAF aware (for example, word processors, database retrieval applications, spreadsheets, multimedia presentation authoring tools, film editing software, music editing software such as MIDI applications and the like, robotics control systems such as those associated with CAD/CAM environments and NCM software and the like, electronic mail systems, teleconferencing software, and other data authoring, creating, handling, and/or usage applications including combinations of the above). These one or more features (which may also be implemented in firmware or hardware) may be employed in conjunction with a WAF node secure hardware processing capability, such as a microcontroller(s), microprocessor(s), other CPU(s) or other digital processing logic.

employ audit reconciliation and usage pattern evaluation processes that assess, through certain, normally network based, transaction processing reconciliation and threshold checking activities, whether certain violations of security of a WAF arrangement have occurred. These processes are performed remote to WAF controlled content end-user WAF locations by assessing, for example, purchases, and/or requests, for electronic properties by a given WAF installation. Applications for such reconciliation activities include assessing whether the quantity of remotely delivered WAF controlled content corresponds to the amount of financial credit and/or electronic currency employed for the use of such content. A trusted organization can acquire information from content providers concerning the cost for content provided to a given WAF installation and/or user and compare this cost for content with the credit and/or electronic currency disbursements for that installation and/or user. Inconsistencies in the amount of content delivered versus the amount of disbursement can prove, and/or indicate, depending on the circumstances, whether the local WAF installation has been, at least to some degree, compromised (for example, certain important system security functions, such as breaking encryption for at least some portion of the secure subsystem and/or WAF controlled content by uncovering one or more keys). Determining whether irregular patterns (e.g. unusually high demand) of content usage, or requests for delivery of certain kinds of WAF controlled information during a certain time period by one or more WAF installations and/or users (including, for example, groups of related users whose aggregate pattern of usage is suspicious) may also be useful in determining whether security at such one or more installations, and/or by such one or more users, has been compromised, particularly when used in combination with an assessment of electronic credit and/or currency provided to one or more WAF users and/or installations, by some or all of their credit and/or currency suppliers, compared with the disbursements made by such users and/or installations.

support security techniques that materially increase the time required to "break" a system's integrity. This includes using a collection of techniques that minimizes the damage resulting from comprising some aspect of the security features of the present inventions.

provide a family of authoring, administrative, reporting, payment, and billing tool user applications that comprise components of the present invention's trusted/secure, universe wide, distributed transaction control and administration system. These components support WAF related: object creation (including placing control information on content), secure object distribution and management (including distribution control information, financial related, and other usage analysis), client internal WAF activities administration and control, security management, user interfaces, payment disbursement, and clearinghouse related functions. These components are designed to support highly secure, uniform, consistent, and standardized: electronic commerce and/or data security pathway(s) of handling, reporting, and/or payment; content control and administration; and human factors (e.g. user interfaces).

support the operation of a plurality of clearinghouses, including, for example, both financial and user clearinghouse activities, such as those performed by a client administrator in a large organization to assist in the organization's use of a WAF arrangement, including usage information analysis, and control of WAF activities by individuals and groups of employees such as specifying budgets and the character of usage rights available under WAF for certain groups of and/or individual, client personnel, subject to control information series to control information submitted by the client administrator. At a clearinghouse, one or more WAF installations may operate together with a trusted distributed database environment (which may include concurrent database processing means). A financial clearinghouse normally receives at its location securely delivered content usage information, and user requests (such as requests for further credit, electronic currency, and/or higher credit limit). Reporting of usage information and user requests can be used for supporting electronic currency, billing, payment and credit related activities, and/or for user profile analysis and/or broader market survey analysis and marketing (consolidated) list generation or other information derived, at least in part, from said usage information. this information can be provided to content providers or other parties, through secure, authenticated encrypted communication to the WAF installation secure subsystems. Clearinghouse processing means would normally be connected to specialized I/O means, which may include high speed telecommunication switching means that may be used for secure communications between a clearinghouse and other WAF pathway participants.

securely support electronic currency and credit usage control, storage, and communication at, and between, WAF installations. WAF further supports automated passing of electronic currency and/or credit information, including payment tokens (such as in the form of electronic currency or credit) or other payment information, through a pathway of payment, which said pathway may or may not be the same as a pathway for content usage information reporting. Such payment may be placed into a WAF container created automatically by a WAF installation in response to control information stipulating the "withdrawal" of credit or electronic currency from an electronic credit or currency account based upon an amount owed resulting from usage of WAF controlled electronic content and/or appliances. Payment credit or currency may then be automatically communicated in protected (at least in part encrypted) form through telecommunication of a WAF container to an appropriate party such as a clearinghouse, provider of original property content or appliance, or an agent for such provider (other than a clearinghouse). Payment information may be packaged in said WAF content container with, or without, related content usage information, such as metering information. An aspect of the present invention further enables certain information regarding currency use to be specified as unavailable to certain, some, or all WAF parties ("conditionally" to fully anonymous currency) and/or further can regulate certain content information, such as currency and/or credit use related information (and/or other electronic information usage data) to be available only under certain strict circumstances, such as a court order (which may itself require authorization through the use of a court controlled WAF installation that may be required to securely access "conditionally" anonymous information). Currency and credit information, under the preferred embodiment of the present invention, is treated as administrative content;

support fingerprinting (also known as watermarking) for embedding in content such that when content protected under the present invention is released in clear form from a WAF object (displayed, printed, communicated, extracted, and/or saved), information representing the identification of the user and/or WAF installation responsible for transforming the content into clear form is embedded into the released content. Fingerprinting is useful in providing an ability to identify who extracted information in clear form a WAF container, or who made a copy of a WAF object or a portion of its contents. Since the identity of the user and/or other identifying information may be embedded in an obscure or generally concealed manner, in WAF container content and/or control information, potential copyright violators may be deterred from unauthorized extraction or copying. Fingerprinting normally is embedded into unencrypted electronic content or control information, though it can be embedded into encrypted content and later placed in unencrypted content in a secure WAF installation sub-system as the encrypted content carrying the fingerprinting information is decrypted. Electronic information, such as the content of a WAF container, may be fingerprinted as it leaves a network (such as Internet) location bound for a receiving party. Such repository information may be maintained in unencrypted form prior to communication and be encrypted as it leaves the repository. Fingerprinting would preferably take place as the content leaves the repository, but before the encryption step. Encrypted repository content can be decrypted, for example in a secure WAF sub-system, fingerprint information can be inserted, and then the content can be re-encrypted for transmission. Embedding identification information of the intended recipient user and/or WAF installation into content as it leaves, for example, an Internet repository, would provide important information that would identify or assist in identifying any party that managed to compromise the security of a WAF installation or the delivered content. If a party produces an authorized clear form copy of WAF controlled content, including making unauthorized copies of an authorized clear form copy, fingerprint information would point back to that individual and/or his or her WAF installation. Such hidden information will act as a strong disincentive that should dissuade a substantial portion of potential content "pirates" from stealing other parties electronic information. Fingerprint information identifying a receiving party and/or WAF installation can be embedded into a WAF object before, or during, decryption, replication, or communication of WAF content objects to receivers. Fingerprinting electronic content before it is encrypted for transfer to a customer or other user provides information that can be very useful for identifying who received certain content which may have then been distributed or made available in unencrypted form. This information would be useful in tracking who may have "broken" the security of a WAF installation and was illegally making certain electronic content available to others. Fingerprinting may provide additional, available information such as time and/or date of the release (for example extraction) of said content information. Locations for inserting fingerprints may be specified by WAF installation and/or content container control information. This information may specify that certain areas and/or precise locations within properties should be used for fingerprinting, such as one or more certain fields of information or information types. Fingerprinting information may be incorporated into a property by modifying in a normally undetectable way color frequency and/or the brightness of certain image pixels, by slightly modifying certain audio signals as to frequency, by modifying font character formation, etc. Fingerprint information, itself, should be encrypted so as to make it particularly difficult for tampered fingerprints to be interpreted as valid. Variations in fingerprint locations for different copies of the same property; "false" fingerprint information; and multiple copies of fingerprint information within a specific property or other content which copies employ different fingerprinting techniques such as information distribution patterns, frequency and/or brightness manipulation, and encryption related techniques, are features of the present invention for increasing the difficulty of an unauthorized individual identifying fingerprint locations and erasing and/or modifying fingerprint information.

provide smart object agents that can carry requests, data, and/or methods, including budgets, authorizations, credit or currency, and content. For example, smart objects may travel to and/or from remote information resource locations and fulfill requests for electronic information content. Smart objects can, for example, be transmitted to a remote location to perform a specified database search on behalf of a user or otherwise "intelligently" search remote one or more repositories of information for user desired information. After identifying desired information at one or more remote locations, by for example, performing one or more database searches, a smart object may return via communication to the user in the form of a secure "return object" containing retrieved information. A user may be charged for the remote retrieving of information, the returning of information to the user's WAF installation, and/or the use of such information. In the latter case, a user may be charged only for the information in the return object that the user actually uses.

Smart objects may have the means to request use of one or more services and/or resources. Services include locating other services and/or resources such as information resources, language or format translation, processing, credit (or additional credit) authorization, etc. Resources include reference databases, networks, high powered or specialized computing resources (the smart object may carry information to another computer to be efficiently processed and then return the information to the sending WAF installation), remote object repositories, etc. Smart objects can make efficient use of remote resources (e.g. centralized databases, super computers, etc.) while providing a secure means for charging users based on information and/or resources actually used.

support both "translations" of WAF electronic agreements elements into modern language printed agreement elements (such as English language agreements) and translations of electronic rights protection/transaction management modern language agreement elements to electronic WAF agreement elements. This feature requires maintaining a library of textual language that corresponds to WAF load modules and/or methods and/or component assemblies. As WAF methods are proposed and/or employed for WAF agreements, a listing of textual terms and conditions can be produced by a WAF user application which, in a preferred embodiment, provides phrases, sentences and/or paragraphs that have been stored and correspond to said methods and/or assemblies. This feature preferably employs artificial intelligence capabilities to analyze and automatically determine, and/or assist one or more users to determine, the proper order and relationship between the library elements corresponding to the chosen methods and/or assemblies so as to compose some or all portions of a legal or descriptive document. One or more users, and/or preferably an attorney (if the document a legal, binding agreement), would review the generated document material upon completion and employ such additional textual information and/or editing as necessary to describe non electronic transaction elements of the agreement and make any other improvements that may be necessary. These features further support employing modern language tools that allow one or more users to make selections from choices and provide answers to questions and to produce a WAF electronic agreement from such a process. This process can be interactive and the WAF agreement formulation process may employ artificial intelligence expert system technology that learns from responses and, where appropriate and based at least in part on said responses, provides further choices and/or questions which "evolves" the desired WAF electronic agreement.

support the use of multiple WAF secure subsystems in a single WAF installation.

Various security and/or performance advantages may be realized by employing a distributed WAF design within a single WAF installation. For example, designing a hardware based WAF secure subsystem into an electronic appliance WAF display device, and designing said subsystem's integration with said display device so that it is as close as possible to the point of display, will increase the security for video materials by making it materially more difficult to "steal" decrypted video information as it moves from outside to inside the video system. Ideally, for example, a WAF secure hardware module would be in the same physical package as the actual display monitor, such as within the packaging of a video monitor or other display device, and such device would be designed, to the extent commercially practical, to be as tamper resistant as reasonable. As another example, embedding a WAF hardware module into an I/O peripheral may have certain advantages from the standpoint of overall system throughput. If multiple WAF instances are employed within the same WAF installation, these instances will ideally share resources to the extent practical, such as WAF instances storing certain control information and content and/or appliance usage information on the same mass storage device and in the same WAF management database.

requiring reporting and payment compliance by employing exhaustion of budgets and time ageing of keys. For example, a WAF commercial arrangement and associated content control information may involve a content provider's content and the use of clearinghouse credit for payment for end-user usage of said content. Control information regarding said arrangement may be delivered to a user's (of said content) WAF installation and/or said financial clearinghouse's WAF installation. Said control information might require said clearinghouse to prepare and telecommunicate to said content provider both content usage based information in a certain form, and content usage payment in the form of electronic credit (such credit might be "owned" by the provider after receipt and used in lieu of the availability or adequacy of electronic currency) and/or electronic currency. This delivery of information and payment may employ trusted WAF installation secure subsystems to securely, and in some embodiments, automatically, provide in the manner specified by said control information, said usage information and payment content. Features of the present invention help ensure that a requirement that a clearinghouse report such usage information and payment content will be observed. For example, if one participant to a WAF electronic agreement fails to observe such information reporting and/or paying obligation, another participant can stop the delinquent party from successfully participating in WAF activities related to such agreement. For example, if required usage information and payment was not reported as specified by content control information, the "injured" party can fail to provide, through failing to securely communicate from his WAF installation secure subsystem, one or more pieces of secure information necessary for the continuance of one or more critical processes. For example, failure to report information and/or payment from a clearinghouse to a content provider (as well as any security failures or other disturbing irregularities) can result in the content provider not providing key and/or budget refresh information to the clearinghouse, which information can be necessary to authorize use of the clearinghouse's credit for usage of the provider's content and which the clearinghouse would communicate to end-user's during a content usage reporting communication between the clearinghouse and end-user. As another example, a distributor that failed to make payments and/or report usage information to a content provider might find that their budget for creating permissions records to distribute the content provider's content to users, and/or a security budget limiting one or more other aspect of their use of the provider's content, are not being refreshed by the content provider, once exhausted or timed-out (for example, at a predetermined date). In these and other cases, the offended party might decide not to refresh time ageing keys that had "aged out." Such a use of time aged keys has a similar impact as failing to refresh budgets or time-aged authorizations.

support smart card implementations of the present invention in the form of portable electronic appliances, including cards that can be employed as secure credit, banking, and/or money cards. A feature of the present invention is the use of portable WAFs as transaction cards at retail and other establishments, wherein such cards can "dock" with an establishment terminal that has a WAF secure sub-system and/or an online connection to a WAF secure and/or otherwise secure and compatible subsystem, such as a "trusted" financial clearinghouse (e.g., VISA, Mastercard). The WAF card and the terminal (and/or online connection) can securely exchange information related to a transaction, with credit and/or electronic currency being transferred to a merchant and/or clearinghouse and transaction information flowing back to the card. Such a card can be used for transaction activities of all sorts. A docking station, such as a PCMCIA connector on an electronic appliance, such as a personal computer, can receive a consumer's WAF card at home. Such a station/card combination can be used for on-line transactions in the same manner as a WAF installation that is permanently installed in such an electronic appliance. The card can be used as an "electronic wallet" and contain electronic currency as well as credit provided by a clearinghouse. The card can act as a convergence point for financial activities of a consumer regarding many, if not all, merchant, banking, and on-line financial transactions, including supporting home banking activities. A consumer can receive his paycheck and/or investment earnings and/or "authentic" WAF content container secured detailed information on such receipts, through on-line connections. A user can send digital currency to another party with a WAF arrangement, including giving away such currency. A WAF card can retain details of transactions in a highly secure and database organized fashion so that financially related information is both consolidated and very easily retrieved and/or analyzed. Because of the WAF security, including use of effective encryption, authentication, digital signaturing, and secure database structures, the records contained within a WAF card arrangement may be accepted as valid transaction records for government and/or corporate recordkeeping requirements. In some embodiments of the present invention a WAF card may employ docking station and/or electronic appliance storage means and/or share other WAF arrangement means local to said appliance and/or available across a network, to augment the information storage capacity of the WAF card, by for example, storing dated, and/or archived, backup information. Taxes relating to some or all of an individual's financial activities may be automatically computed based on "authentic" information securely stored and available to said WAF card. Said information may be stored in said card, in said docking station, in an associated electronic appliance, and/or other device operatively attached thereto, and/or remotely, such as at a remote server site. A card's data, e.g. transaction history, can be backed up to an individual's personal computer or other electronic appliance and such an appliance may have an integrated WAF installation of its own. A current transaction, recent transactions (for redundancy), or all or other selected card data may be backed up to a remote backup repository, such a WAF compatible repository at a financial clearinghouse, during each or periodic docking for a financial transaction and/or information communication such as a user/merchant transaction. Backing up at least the current transaction during a connection with another party's WAF installation (for example a WAF installation that is also on a financial or general purpose electronic network), by posting transaction information to a remote clearinghouse and/or bank, can ensure that sufficient backup is conducted to enable complete reconstruction of WAF card internal information in the event of a card failure or loss.

support certification processes that ensure authorized interoperability between various WAF installations so as to prevent WAF arrangements and/or installations that unacceptably deviate in specification protocols from other WAF arrangements and/or installations from interoperating in a manner that may introduce security (integrity and/or confidentiality of WAF secured information), process control, and/or software compatibility problems. Certification validates the identity of WAF installations and/or their components, as well as WAF users. Certification data can also serve as information that contributes to determining the decommissioning or other change related to WAF sites.

support the separation of fundamental transaction control processes through the use of event (triggered) based method control mechanisms. These event methods trigger one or more other WAF methods (which are available to a secure WAF sub-system) and are used to carry out WAF managed transaction related processing. These triggered methods include independently (separably) and securely processable component billing management methods, budgeting management methods, metering management methods, and related auditing management processes. As a result of this feature of the present invention, independent triggering of metering, auditing, billing, and budgeting methods, the present invention is able to efficiently, concurrently support multiple financial currencies (e.g. dollars, marks, yen) and content related budgets, and/or billing increments as well as very flexible content distribution models.

support, complete, modular separation of the control structures related to (1) content event triggering, (2) auditing, (3) budgeting (including specifying no right of use or unlimited right of use), (4) billing, and (5) user identity (WAF installation, client name, department, network, and/or user, etc.). The independence of these WAF control structures provides a flexible system which allows plural relationships between two or more of these structures, for example, the ability to associate a financial budget with different event trigger structures (that are put in place to enable controlling content based on its logical portions). Without such separation between these basic WAF capabilities, it would be more difficult to efficiently maintain separate metering, budgeting, identification, and/or billing activities which involve the same, differing (including overlapping), or entirely different, portions of content for metering, billing, budgeting, and user identification, for example, paying fees associated with usage of content, performing home banking, managing advertising services, etc. WAF modular separation of these basic capabilities supports the programming of plural, "arbitrary" relationships between one or differing content portions (and/or portion units) and budgeting, auditing, and/or billing control information. For example, under WAF, a budget limit of $200 dollars or 300 German Marks a month may be enforced for decryption of a certain database and 2 U.S. Dollars or 3 German Marks may be charged for each record of said database decrypted (depending on user selected currency). Such usage can be metered while an additional audit for user profile purposes can be prepared recording the identity of each filed displayed. Additionally, further metering can be conducted regarding the number of said database bytes that have been decrypted, and a related security budget may prevent the decrypting of more than 5% of the total bytes of said database per year. The user may also, under WAF (if allowed by senior control information), collect audit information reflecting usage of database fields by different individuals and client organization departments and ensure that differing rights of access and differing budgets limiting database usage can be applied to these client individuals and groups. Enabling content providers and users to practically employ such diverse sets of user identification, metering, budgeting, and billing control information results, in part, from the use of such independent control capabilities. As a result, WAF can support great configurability in creation of plural control models applied to the same electronic property and the same and/or plural control models applied to differing or entirely different content models (for example, home banking versus electronic shopping).

Secure Processing Units

An important part of WAF provided by the present invention is the core secure transaction control arrangement, herein called an SPU (or SPUs), that typically must be present in each user's computer, other electronic appliance, or network. SPUs provide a trusted environment for generating decryption keys, encrypting and decrypting information, managing the secure communication of keys and other information between electronic appliances (i.e. between WAF installations and/or between plural WAF instances within a single WAF installation), securely accumulating and managing audit trail, reporting, and budget information in secure and/or non-secure non-volatile memory, maintaining a secure database of control information management instructions, and providing a secure environment for performing certain other control and administrative functions.

A hardware SPU (rather than a software emulation) within a WAF node is necessary if a highly trusted environment for performing certain WAF activities is required. Such a trusted environment may be created through the use of certain control software, one or more tamper resistant hardware modules such as a semiconductor or semiconductor chipset (including, for example, a tamper resistant hardware electronic appliance peripheral device), for use within, and/or operatively connected to, an electronic appliance. With the present invention, the trustedness of a hardware SPU can be enhanced by enclosing some or all of its hardware elements within tamper resistant packaging and/or by employing other tamper resisting techniques (e.g. microfusing and/or thin wire detection techniques). A trusted environment of the present invention implemented, in part, through the use of tamper resistant semiconductor design, contains control logic, such as a microprocessor, that securely executes WAF processes.

A WAF node's hardware SPU is a core component of a WAF secure subsystem and may employ some or all of an electronic appliance's primary control logic, such as a microcontroller, microcomputer or other CPU arrangement. This primary control logic may be otherwise employed for non WAF purposes such as the control of some or all of an electronic appliance's non-WAF functions. When operating in a hardware SPU mode, said primary control logic must be sufficiently secure so as to protect and conceal important WAF processes. For example, a hardware SPU may employ a host electronic appliance microcomputer operating in protected mode while performing WAF related activities, thus allowing portions of WAF processes to execute with a certain degree of security. This alternate embodiment is in contrast to the preferred embodiment wherein a trusted environment is created using a combination of one or more tamper resistant semiconductors that are not part of said primary control logic. In either embodiment, certain control information (software and parameter data) must be securely maintained within the SPU, and further control information can be stored externally and securely (e.g. in encrypted and tagged form) and loaded into said hardware SPU when needed. In many cases, and in particular with microcomputers, the preferred embodiment approach of employing special purpose secure hardware for executing said WAF processes, rather than using said primary control logic, may be more secure and efficient. The level of security and tamper resistance required for trusted SPU hardware processes depends on the commercial requirements of particular markets or market niches, and may vary widely.

Delivery Framework

The Delivery Vehicle Framework presents a way to organize technology architecture information. When presenting this type of content to clients, one will need to tailor the information one presents based on the client's background and the terminology they are familiar with. Some of the features of the Delivery Framework include:

Promotes focus toward business solutions and away from technology issues.

Assists linkage of architecture planning deliverables to delivering.

Create an enterprise-wide view of the business capabilities enabled by technologies.

Provide new architecture frameworks needed today to meet specific needs.

Provide guidance to define what architecture best meets those needs.

Provide development architecture frameworks and best practices to build these architectures.

During a high-level architecture design, one can identify architecture services to be addressed, by providing a logical level discussion to assess types of base services and products needed for a specific situation.

When Delivery Vehicles are implemented, they reduce time to implement business solutions by providing "Starter Kits" architectures.

When Delivery Vehicles are implemented, they leverages technology across the business by:

reducing operations and maintenance costs by limiting the number of different technologies and skills required to support these technologies.

reducing technology costs for execution & development.

Technology Generation Selection

Introduction

Figure 86:
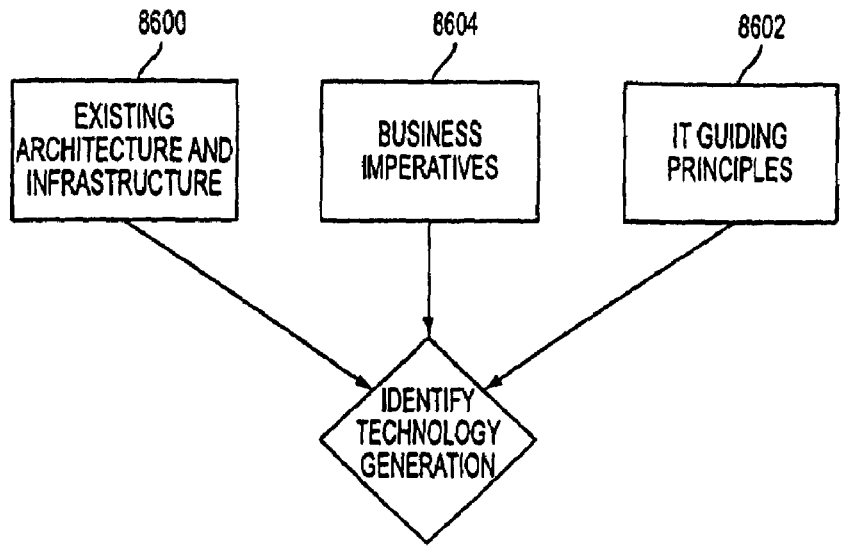
FIG. 86 is a flow diagram depicting considerations to be taken into consideration when identifying the core technologies to be used in an architecture.

This section should assist an architect in understanding the characteristics of, and the implications from selecting, a specific technology generation. The strengths and weaknesses of each technology generation should be understood when planning and designing a system. When identifying the core technologies to be used in an architecture, a view of the client's existing IT architecture 8600, guiding principles 8602 and business imperatives 8604 should be taken into consideration, as depicted in FIG. 86.

It is important to realize that a distinct, static division does not exist between the different technology generations. It is possible that an architecture will consist of components from more than one generation.

The goal should be to understand the pros and cons of the different technology options available for each component and to select the most appropriate one based on the client's requirements.

It is becoming more important to leverage existing systems and integrate them with new applications. A typical scenario can involve mainframe legacy systems acting as servers in a client server architecture, application servers being accessed from both traditional GUI clients built in Powerbuilder and Visual Basic and from Web-based front ends accessing the application servers via a Web-server.

General Considerations

From a technology point of view a new custom-made application should generally use the most recent Architecture Generation to assure that the application will live longer by better being able to adapt to future changes.

This implies that all new applications should ideally be based on a Netcentric Architecture, rather than on a traditional client/server or a host-based architecture.

However choosing a generation is not just a technical decision. Often key technology architecture decisions are made as a result of factors which are completely non-technical in nature, such as financial factors, internal and client politics, and implementation/operational considerations.

When deciding whether to employ a Netcentric solution, i.e. incorporating Web-based user interfaces and Internet application styles, one must keep in mind that these technologies are not a panacea and should be used only when there is solid business reason. They require new investments in skills, tools, development and operations processes. Due to the relative immaturity of tools and products, they also represent additional risks both in technical terms, such as performance and reliability, and in strategic terms, such as vendor and product quality and stability.

Regardless, today each project should always consider the prospect of utilizing Netcentric technologies. It is important to evaluate whether the application can benefit from a Netcentric style implementation immediately or in the future.

Even if a traditional client/server approach (e.g. using Visual Basic or PowerBuilder) is decided upon, the use of Netcentric concepts to produce significant reductions in software packaging and distribution costs should be considered. Such concepts include three- or multi-tier architectures with more business logic residing on server, flexible security architecture, and user interface concepts that can be ported to a Web Browser at a later stage.

A Netcentric architecture will usually still support development of client/server applications. The opposite is not often true since traditional client/server systems usually keep a substantial portion of the business logic on a fat client, while Netcentric architectures still favor keeping most business logic at the server side. Also Netcentric architectures tend to be more loosely coupled than (the still dominant two-tier) client/server systems.

The following sections identify the main characteristics associated with a Netcentric, Client Server or Host based technology generation. This list should in no way be considered complete and exhaustive but is included as a starting point from which the identification process may begin.

Network Centric Architecture Generation

Figure 87:
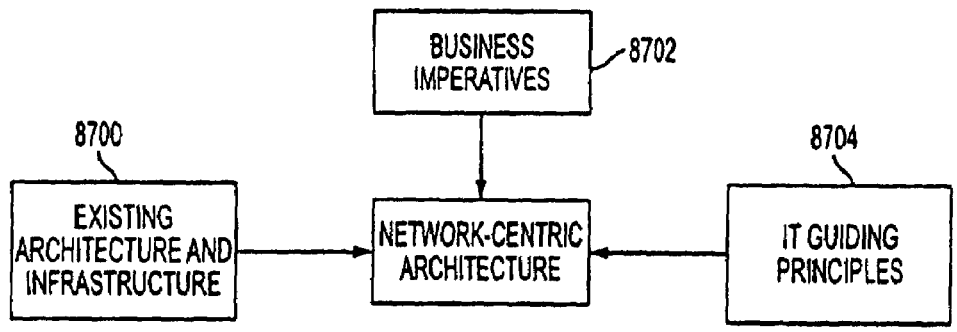
FIG. 87 is a chart that can be utilized to determine whether to use Netcentric technology.

If most of the statements in FIG. 87 are true, one should consider an application based upon the Netcentric technology generation.

The following details the importance of each of the statements in FIG. 87 and should assist in identifying the appropriate answer for specific client engagement.

Existing architecture and infrastructure 8700

E1. Other Netcentric Applications Been Developed and Placed in Production.

The user community is often less resistant to accept the use of new technology to address changing business drivers if they are not completely unfamiliar with the characteristics of the technology. If an application based on a Netcentric architecture has already been successfully piloted or deployed, acceptance of additional systems will be eased.

E2. The Client has Significant Technology Skills within its IT Department.

This is especially important if the client plans on developing or operating the application themselves. A significant investment in training and changes to internal organizations may be necessary for successful deployment of this type of system. The client must have a culture that supports change. Some organizations are very conservative and strong, making it difficult to deliver a successful project using new technology.

E3. The Client has Multiple Hardware/Operating System Configurations for their Client Machines.

In traditional client/server environments, distributing an application internally or externally for an enterprise requires that the application be ported, recompiled and tested for all specific workstation operating systems. Use of a Universal Client or web-browser may eliminate many of these problems by providing a consistent and familiar user interface on many different operating systems and hardware platforms.

E4. The Application Will Run on a Device Other than a PC.

The momentum of the Internet is putting a lot of pressure on vendors of various devices to be web-enabled. Having the Internet infrastructure in place makes it more feasible for vendors to create new physical devices from which electronic information can be accessed. For example, Web televisions are gaining momentum. Now users can access the Internet from a television set. Network Computers, thin-client devices that download and run applications from a centrally maintained server are generating a lot of interest. Also, users want to have access to the same information from multiple physical devices. For example, a user might want to have access to his/her e-mail from a cellular phone, from a Web TV or their portable PC.

E5. The Current Legacy Systems can Scale to Serve a Potentially Large New Audience.

Expanding the user community of a legacy host or client/server system by including an audience which is external to the company can result in dramatic increases in system usage. The additional demand and increased usage placed on existing legacy systems is often difficult to estimate or predict. Analysis must be conducted to ensure existing legacy systems and infrastructure can absorb this increase.

Business Imperatives 8702

B1. The Client Needs to Reach a New External Audience with this Application.

This is probably the main reason for selecting a Netcentric architecture. Through appropriate use of a Netcentric architecture it is often possible to gain exposure to new customers and markets. The client can often achieve significant competitive advantage by providing new services and products to its customers. Also this new channel makes it technically possible to develop a new generation of "market-of-one" products, where each customer can repeatedly and easily customize a product according to own preferences.

B2. The Client Needs to Reach a Large or Diverse Internal Audience with this Application.

Configuration management of traditional client/server applications, which tend to be physically distributed across both the client and server, is a major issue for many corporations. The software distribution of such applications which are packaged as one large or a combination of a few large executables makes minor updates difficult for even a small scale user population. Every time an update is made, a process must be initiated to distribute new code to all client machines. The browser-centric application style offers an alternative to this traditional problem of distributing functionality to both internal and external users.

IT Guiding Principles 8704

G1. The Client is an Early Adopter of New Technology.

Implementation of a Netcentric architecture can help the client realize a number of business benefits. However, the introduction of new technology into an organization does have inherent risks and can result in a significant amount of change. The client should have a culture which can embrace these necessary changes.

G2. Applications Should be Developed to Handle Non-Dedicated or Occasional Users.

Non-expert users need a simple to use and familiar interface in order to be able to use the application. As people grow accustomed to Web-browsers, this will be their preferred user-interface. The consistent interface provided by the Web-browsers will help reduce the learning curve necessary for becoming familiar with new applications.

G3. Where Appropriate, Applications Should be Developed with Multi-Media Capabilities for the Presentation of Data (Text, Sound, Video, Etc.).

The ability to digitize, organize, and deliver textual, graphical and other information (e.g., video, audio, etc.) in addition to traditional data to a broader audience, enables new methods for people and enterprises to work together. Netcentric technologies (e.g., HTML documents, plug-ins, Java, etc.) and standardization of media information formats enable support for these types of complex documents and applications. Network bandwidth remains a performance issue. However advances in network technologies and compression techniques continue to make richer media-enabled documents and applications more feasible on the Web.

G4. The Execution, Operation and Development Architectures Will be Designed to Support Frequent Releases of Enhancements/Modifications to Production Applications.

It is imperative that companies in the current market place be able to quickly modify their business processes in order to address changes in the industry. A Netcentric architecture simplifies frequent software releases for both internal and external users of the systems.

Client/Server Network Generation

Figure 88:
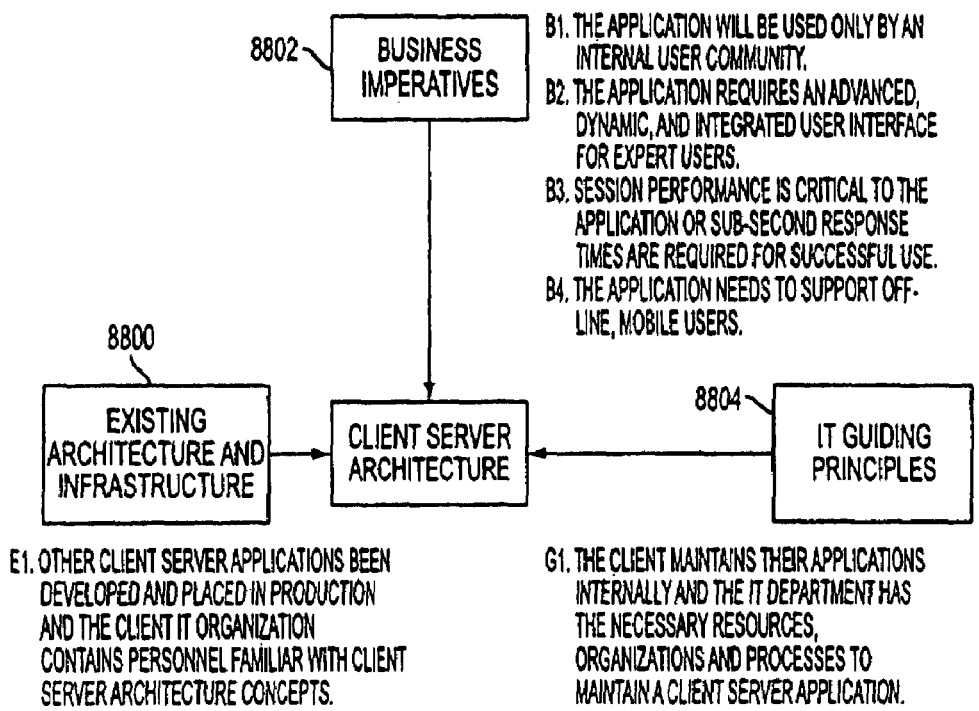
FIG. 88 is a chart that can be utilized to determine whether to use Client Server technology.

If, based upon the client's requirements, most of the statements of FIG. 88 are true, one should consider an application based upon the Client Server technology generation.

The following section details the importance of each of the statements found in FIG. 88 and should assist in identifying the appropriate answer for a specific client engagement.

Existing Architecture and Infrastructure 8800

E1. Other Client Server applications been developed and placed in production and the client IT organization contains personnel familiar with client server architecture concepts.

As with any new technology, there is a learning curve related to attaining client server development skills. The development process is often much more efficient when familiar tools and environments are used. The introduction of new technology can also create instability in the operations environment. Client/server systems still represent a new technology to many IT departments.

Business Imperatives 8802

B1. The application will be used only by an internal user community.

Software distribution is a concern for traditional client server computing environments due to the fact that executable and data files need to reside on the client hard drive. Distribution to a user community outside of the client's organization is even more difficult to implement and manage and will probably be limited to a few key business partners.

B2. The application requires an advanced, dynamic, and integrated user interface for expert users.

State of the art 4GL and 3GL development languages will support advanced user interfaces which require a significant degree of context management between fields and windows. Web-based user interfaces do not support such interfaces well yet.

B3. Session performance is critical to the application or sub-second response times are required for successful use.

Client server applications can provide response times necessary to support transaction intensive mission critical systems. Application logic and business data can be distributed between the client and server for optimal efficiency. Web-based interfaces still have an inherent overhead due to the connectionless communication and constant downloading of data, formatting information and applet code.

B4. The application needs to support off-line mobile users.

Mobile computing is becoming more prevalent in the work place, therefore, connectivity to a server can not be assumed for all user classes. A client server architecture allows for the distribution of application logic and/or data between the server and client. Replication of data and logic is usually necessary for applications that are run on portable computers.

IT Guiding Principles 8804

G1. The client maintains their applications internally and the IT department has the necessary resources, organizations and processes to maintain a Client Server application.

Introduction of a Client Server application to a company's production environment can require a great deal of change to the Execution, Operations and Development architectures required to develop, run and support the production systems. Before a Client Server application is developed, it is important that the client identify how a system of this type will fit within the company's strategic technology plan.

Host Architecture Generation

If the clients business and technical requirements meet the following system characteristics, consideration should be given to an application based upon the Host technology generation.

Figure 89:
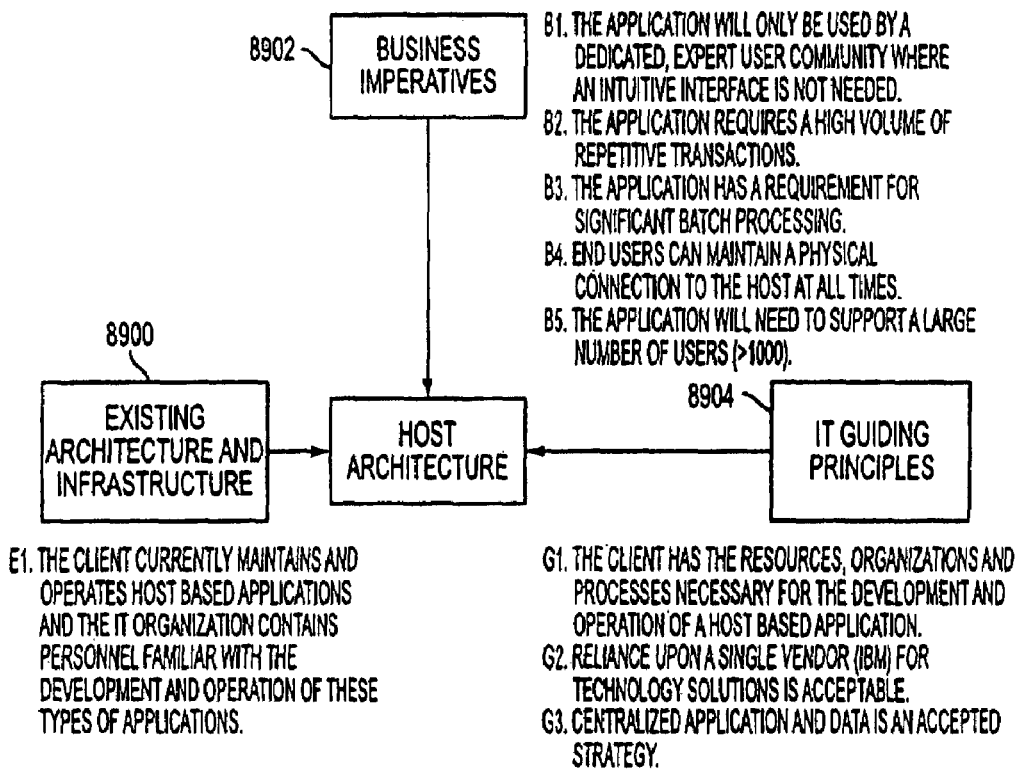
FIG. 89 is a chart that can be utilized to determine whether to use Host technology.

The following section details the importance of each of the statements found in FIG. 89 and should assist in identifying the appropriate answer for a specific client engagement.

Existing architecture and infrastructure 8900

E1. The client currently maintains and operates host based applications and the IT organization contains personnel familiar with the development and operation of these types of applications.

Few organizations introduce solely host based production systems. Usually the infrastructure for this type of systems already exists. New development is uncommon, typically existing legacy systems need to be extended.

Host systems usually have a mature and stable operations environment. Note that mainframe expertise is currently expensive and in high demand Business Imperatives 8902

B1. The application will only be used by a dedicated, expert user community where a GUI is not needed.

A dedicated work force with low turnaround, skilled in the use of character based 3270 applications, eliminates the need for a GUI interface.

B2. The application requires a high volume of repetitive transactions.

The high degree of processing power provided by mainframes allows for the development of applications with very high performance requirements.

B3. The application has a requirement for significant batch processing.

Mainframes are probably still the most powerful platforms for large scale batch processing. Mature tools exist for scheduling, recovery/restart, sorting, merging, and moving large sets of data.

B4. End users can maintain a physical connection to the host at all times.

Physical connection to the host is required for use of the applications. Methods of mobile computing with distribution of data or business logic is not possible.

B5. The application will need to support a large number of users (>1000).

The processing power of today's mainframe lends itself well to the development of large scale, mission critical applications with a large user base.

IP Guiding Principles 8904

G1. The Client has the resources, organizations and processes necessary for the development and operation of a Host based application.

Before a Host based application is developed, it is important that the client identify how a system of this type will fit within the company's strategic technology plan.

G2. Reliance upon a single vendor (IBM) for technology solutions is acceptable.

Selection of a host based architecture inherently locks the client into dependence upon one vendor for its technology solutions. While IBM® is a reputable, stable company it is important to ensure that the client's long term business strategy will be supported by IBM's technology vision and direction.

G3. Centralized application and data is an acceptable strategy.

A pure host based architecture eliminates the possibility of distributing data or business logic to the client. This removes some of the application performance benefits which can be seen by a distribution strategy, however, centralized access to the business logic and business data can improve operational stability and lower costs.

A current trend is to transform mainframe based legacy systems into data-and application servers in a multi-tiered client/server or Netcentric architecture.

Overview of the Frameworks

The following should be born in mind when considering what framework to use:

when the various frameworks in DAF can be useful how the frameworks are related

Frameworks Related to Delivery Vehicles

Most of the frameworks in DAF address various aspects of Delivery Vehicle architectures.

DAF provides access to a thought process regarding leadership and architecture frameworks for Execution, Development and Operations environments. Very briefly, DAF covers:

The Core Execution Architecture frameworks for the different architecture generations (Host, Client/Server and Netcentric). Most users will primarily use the Netcentric framework.

The Execution Architecture Extensions. This is a collection of common delivery vehicles. These frameworks extend the core frameworks with services specific for a particular delivery vehicle.

The Development Architecture Framework should help with the establishment and operation of a high-quality development environment.

The Operations Architecture Framework should help with the establishment and operation of a high-quality operations environment.

eCommerce Application Framework

Framework Overview

The eCommerce market is rapidly emerging. This is evidenced by the growing numbers of new eCommerce transactional sites, the increasing number of 'exchange of value' transactions performed daily, the emergence of new entities and businesses focusing on the electronic marketplace, the convergence and partnering of existing businesses on the electronic marketplace, and the empowerment of the everyday user to satisfy their needs within the evolving electronic marketplace.

One definition of eCommerce is: 'A commercial exchange of value between an enterprise and an external entity—either an upstream supplier, a partner, or a down-stream customer—over a universal, ubiquitous electronic medium.'

Figure 90:
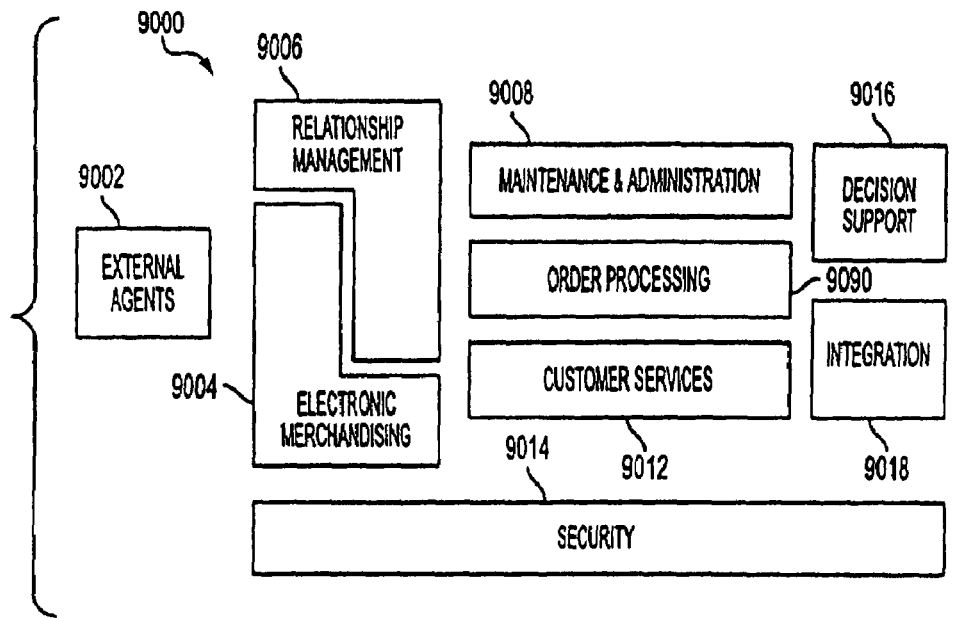
FIG. 90 illustrates an eCommerce Application Framework in a Development Architecture Framework.

The eCommerce Application Framework 9000 in DAF is illustrated in FIG. 90. The eCommerce Application Framework (eCaf) identifies and describes the application capabilities useful or necessary to implementing eCommerce business solutions. It provides a framework to tie business process, application, and technology aspects of eCommerce together, and a basis for mapping and assessing the capabilities of the eCommerce packaged solutions. This framework should be used as a vehicle for communicating, and designing eCommerce business solutions.

Figure 91:
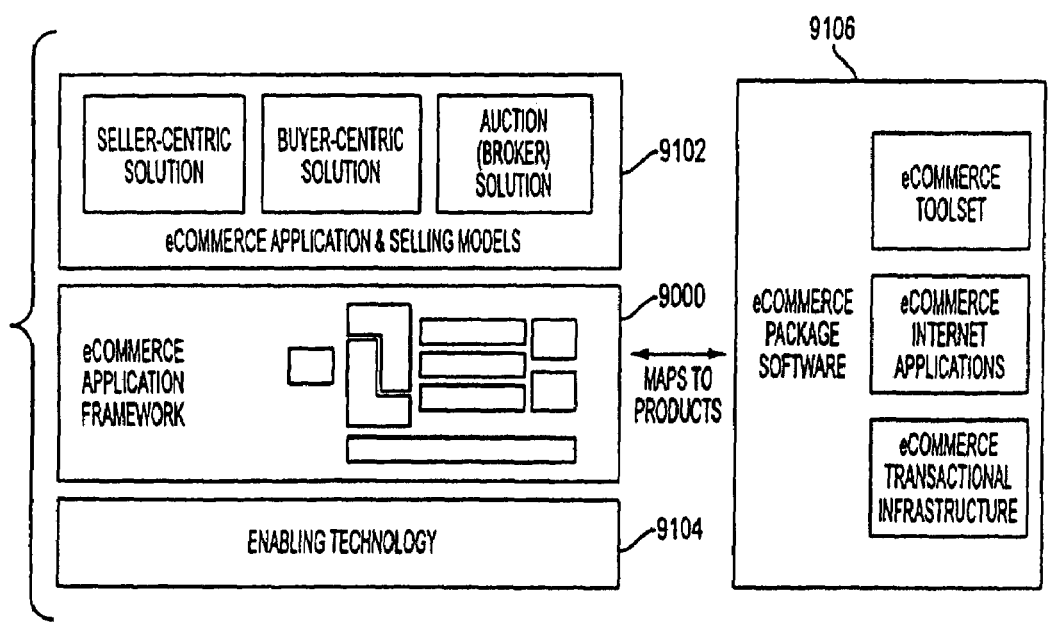
FIG. 91 illustrates the relationship between the eCommerce Application Framework, possible eCommerce Selling Models, enabling technology, and enabling eCommerce Software Packages.

The eCommerce Application Framework has been created to provide an understanding of the types of services and applications needed to implement an eCommerce solution. FIG. 91 illustrates the relationship between the eCommerce Application Framework 9000, the possible eCommerce Selling Models 9102, enabling technology 9104, and enabling eCommerce Software Packages 9106.

The eCaf defines a supporting middle layer between basic Internet or Netcentric enabled products (eCommerce Package Software) and the technical infrastructure (Enabling Technology) needed to develop eCommerce-enabled web sites based on a business-specific selling model (eCommerce Selling Models). Note that eCaf just covers the middle layer.

Each solution or site may have a different selling approach, architecture, utilization of technology, or applications. The eCaf includes the concepts, applications, and services common across the different solutions and has organized them into application capabilities.

Technologically eCommerce business capability requires a logical grouping of services enabling a specific eCommerce functionality. The functionality may be a single technical service within the underlying architecture or an entire application.

The capabilities have been derived from surveying multiple eCommerce software packages and eCommerce implementations. As eCommerce evolves, the categories and capabilities are apt to change.

eCommerce Application Framework in DAF

In DAF the capabilities are presented as framework components and subcomponents. The eCommerce capabilities illustrate the highest level categories of eCommerce capabilities: External Agents, Electronic Merchandising, Relationship Management, Maintenance & Administration, Order Processing, Customer Services, Security, Decision Support, Integration.

The capabilities within a given category may cover the full range of potential selling models. Some components may be specific only to a business-to-business buyer-centric implementation. Additional components may emerge as this technology matures.

It should be borne in mind that the eCaf documentation in DAF focuses on the eCaf capabilities. The enabling technology is discussed elsewhere in DAF (see below).

The selling models and eCommerce Package Software are discussed only briefly.

eCommerce Enabling Technology

The enabling technology for an eCommerce implementation is the same underlying technology used to enable most Netcentric (and in some cases client server) implementations. In general, most implementations will utilize the Netcentric technologies. An understanding of the Netcentric framework will act as a building block for understanding the technology aspects of an eCommerce solution. Information on the Netcentric framework is found in the patent application entitled A SYSTEM, METHOD AND ARTICLE OF MANUFACTURE FOR BASE SERVICES PATTERNS IN A NETCENTRIC ENVIRONMENT, Ser. No. 09/387,653, filed Aug. 31, 1999 and which is herein incorporated by reference in its entirety.

eCommerce Selling Models

A wide variety of eCommerce solutions fall under the broad umbrella term of "eCommerce." The vague definition of eCommerce lends itself to a range of implementations and possibilities. A survey of the sites within the current electronic marketplace reveals the majority of the transactional 'exchange of value' solutions concentrate on selling 'products.' Products can be further divided into physical and electronic.

Physical—Any tangible product the buyer can touch or feel (for example, cars, refrigerators, food, or furniture). This would include retail and durable goods.

Electronic—Any product delivered over an electronic medium. This may include content, information, audio and video, or software (for example, music, or financial products such as insurance or mutual finds).

Across the many 'exchange of value' sites, there are three prevalent selling models: seller-centric, buyer-centric, and auction.

Seller-Centric Selling Model

The seller-centric model is the most common. In its simplest form, a company typically provides information about their products and gives the customer the ability to place orders. More advanced implementations use electronic means for supporting the entire sales and support process including: marketing, product display, merchandizing, customer needs assessment, order processing, and many other activities. In most seller-centric solutions, the infrastructure is created and maintained by the merchant. The customer needs nothing more than a browser and/or access to the site.

Buyer-Centric Selling Model

In a buyer-centric solution, the main focus is on customer or buyer trying to fulfill a need for a product. In contrast to Seller-Centric sites which offer products, a buyer-centric site displays items the buyer would like to purchase—in effect trying to lure sellers. Many of the same capabilities as seller-centric sites are needed such as order management and payment capabilities. In this case, the customer joins or creates an infrastructure focused on fulfilling his needs. The infrastructure typically provides an environment between the trading partners which promotes browsing and comparing products, ordering products, fulfillment, payment, and any needed customer support services. A concentration should be placed on the ease of transactions and information flow. For this reason, sellers may customize their product line to the buyers' specific needs.

In most buyer-centric cases, the buyer or often a consortium of buyers, provides the bulk of the eCommerce infrastructure. Additional integration and setup may or may not be required for each of the trading partners who wishes to participate. Implementations requiring sellers to specially configure or integrate their own systems in order to participate are usually only successful where the buyer has substantial market power in the relationship, as in GM® or Ford® buying parts from their suppliers. In such cases, agreements must be made as to what information is to be shared, how to model the information, the standards for messaging and communication, and what technologies will be used. Besides the technical hurdle of integrating multiple systems and the somewhat immature state of the software products to date, convincing trading partners to adopt an Internet commerce approach can also be very difficult. If one is not a particularly big or powerful buyer, it can be difficult to attract potential sellers to come to one's site and spend the time necessary to learn about one's needs. This requires sellers to engage in a very different activity than they have traditionally performed and many are not eager to change their way of doing business for a relatively small customer.

This section of the market has been slower to emerge. As mentioned above, trading partner maintenance is a key issue. Companies at the end of the hub must buy into the hub's practices and vision. Future vision and direction are also important. As changes are implemented, all trading partners have to move together. Getting buy in from all partners has the potential to slow down the adoption of new technologies and process innovations which over time can lead to a lack luster lowest common denominator approach.

Broker Selling Model

Broker or auction type solutions are also emerging, albeit more slowly. Broker implementations don't typically sell their own goods, but rather provide an eCommerce environment to facilitate bringing multiple buyers and sellers together. Both buyers and sellers can utilize the broker's site and infrastructure rather than developing and maintaining their own eCommerce capabilities. In this case, a broker has set up the infrastructure needed to buy and sell goods. The infrastructure will be very similar to a seller-centric solution with the addition of components needed to register goods to be sold (or in a buyer-centric twist—register RFQ's 'request for quote'), price negotiation and bidding, and reconciliation services.

A Trading Network (TN) is an excellent business example of a broker site. Users of the TN can issue Request For Quote's (RFQ'S) on the trading network. The request could be for raw materials, components, or finished items. Suppliers are free to answer an RFQ providing they meet some basic guidelines and requirements. The network provides a true win-win relationship. Since the network can be global, suppliers the purchaser may never have known about are free to participate.

Another example on the consumer side is a sales website. Such a site offers a variety of computer, electronic and fitness goods as well as a general merchandise auction. Customers can browse items in order to view product information and their current bid prices. Interested buyers can place a bid online and see how their bid price compares with others. The auctions are time based and follow a detailed bidding process. As customers are out bid, they are notified via email and have the option to reply with a counter bid.

Packaged eCommerce Software

In relation to packaged eCommerce Software, the eCaf framework provides a basis for understanding and assessing the capabilities of the eCommerce packages.

If a package is used to implement part of the eCommerce solution, an analysis of its underlying technology and business requirements with respect to the Netcentric Framework and the selling models should be conducted. It is important to understand the underlying architecture and any inherent application limitations due to the package's choice of technology used to implement its architecture. In short, it is important to understand what comes 'out of the box.' Be sure to understand each of the main components described by the Netcentric Framework (e.g. Web Browser, Web Server), how the components communicate, and any limitations of the package and architecture of the component.

A multitude of different packages are emerging usually with the name sounding something similar to 'eCommerce Server.' Each package may boast to be different in the problem it is addressing, the architecture, or the underlying processes and technology. In addition, it may claim to provide an 'end-to-end solution' for businesses wishing to transact on the Internet. It is currently very difficult to differentiate between the products. The eCAF provides a basis for understanding and assessing the capabilities of existing eCommerce packages as well as those emerging.

The current eCommerce software packages can be classified in the following categories:

eCommerce Toolset This category would includes any set of tools or components with which an eCommerce application can be built. Examples include the multitude of 'CyberWallets' or electronic cash components.

eCommerce Internet Applications This category includes software geared toward providing an application for specific eCommerce business functions or processes. This product would be a template or is in itself a specific eCommerce-enabled application. An example would include products providing the ability for cataloging or help desk functions. This is often referred to as vertical solutions.

eCommerce Transactional Infrastructure This category includes software packages providing the infrastructure to support multiple transactional eCommerce applications. These types of solutions provide the transactional infrastructure used for multiple sites.

A complex eCommerce solution potentially may utilize software from all three of these categories in addition to any custom code needed to integrate them.

External Agents 1002

Figure 92:
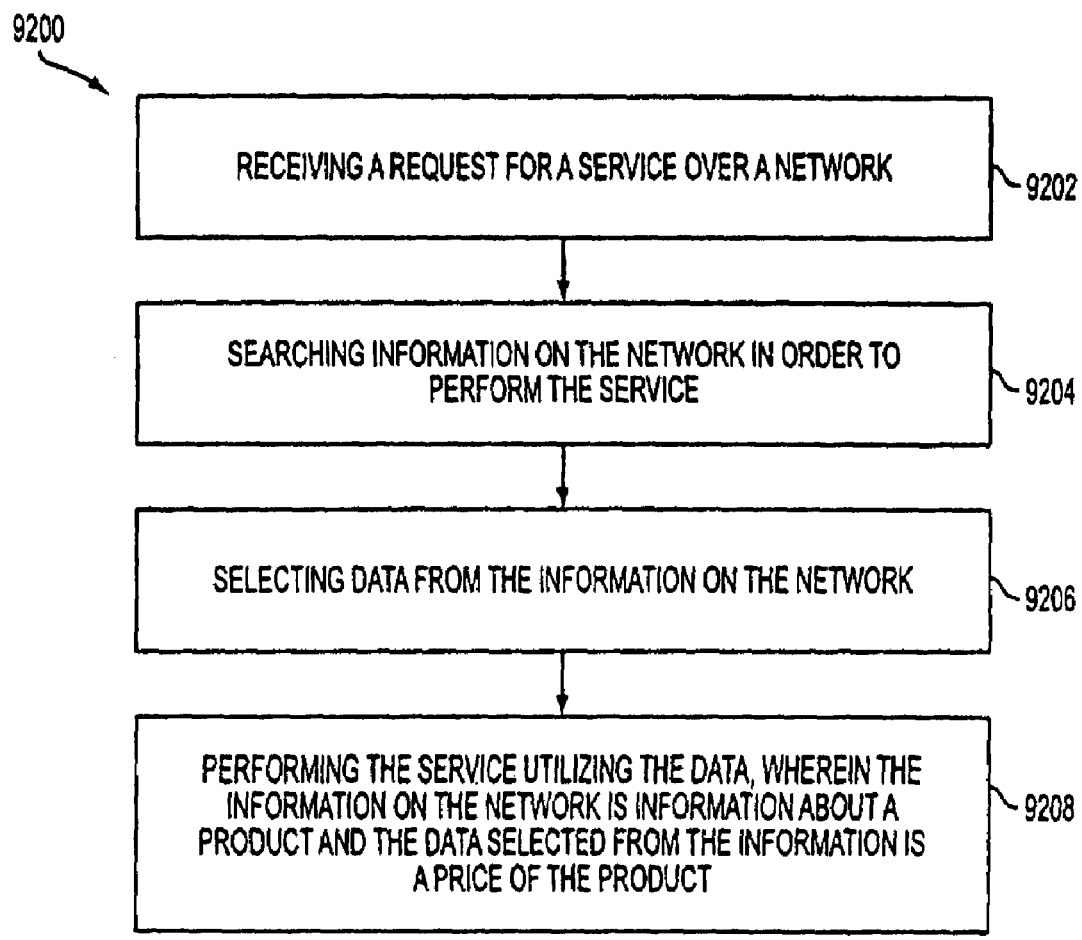
FIG. 92 illustrates a flowchart for a method for automated performance of services on a network in accordance with an embodiment of the present invention.

FIG. 92 illustrates a flowchart for a method 9200 for automated performance of services on a network. When a request for a service is received over a network in operation 9202, information about a product on the network is searched in operation 9204 in order to perform the service. Data including the price of the product is selected from the information on the network and the service is performed utilizing the data in operations 9206 and 9208.

The service may include making suggestions based on a user's profile and history. The service requested may also include retrieval of data. Thirdly, the service requested may include a product comparison. As an option, the data may further include detailed product attributes. As another option, the services of other agents may also be used to perform the service.

Figure 93:
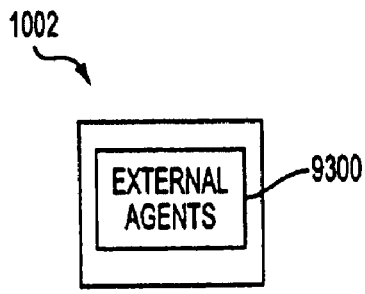
FIG. 93 shows an agent of the eCommerce Application Framework in accordance with one embodiment of the present invention.

On the Internet, an agent 9300 (also called an intelligent agent) is a program that gathers information or performs some other service without the immediate of a user. See FIGS. 90 and 93. Typically, an agent, using parameters provided by the user, searches all or some part of the Internet, gathers the requested information, and presents it back to the requesting user. Intelligent external agent technology will continue to grow as the eCommerce market develops. As the market saturates with products and information, the need for techniques or agents to filter this information will grow.

Business Drivers

Despite the vast amount of information and tools available on the Internet, it is still passive, requiring the user to browse through tremendous amounts of information in order to obtain what they need. The introduction of advanced intelligent agent technology will potentially transform the Internet into an active network through which users can delegate tasks to computer programs to complete on their behalf. An agent in accordance with an embodiment of the present invention has the ability to transport itself from one place in the network to another, filtering through relevant information in order to perform its task. The software can be designed to make suggestions based on the user's profile and history, and change its behavior as it learns from experience and interactions with other agents.

Intelligent Agents may have the following characteristics:
Mobility—the ability to move around an electronic network;
Autonomy—agents operate without the direct intervention of humans or others, and have some kind of control over their actions and internal state;
Adaptability—an agent may be able to adjust itself to the habits, working methods and preferences of its user.

An exemplary agent is a Bargain Finder. The Bargain Finder agent is an intelligent agent used for comparative shopping for music CDs. A user can request the agent to search based on a specific artist and album. The agent would search its known sources, gather the needed information, and return a comparison list with prices and specifications to the requester. If this concept is applied to the business world, the potential value increases dramatically.

A business may utilize a similar concept but on a much grander scale, allowing the user to take advantage of the lowest available price. Providing there are ample suppliers, a business may create an agent to search for the best prices on construction materials or assembly components. In this case, the agent could provide substantial savings in material costs and personnel.

Inbound vs. Outbound Agents

From a site's perspective, there are inbound and outbound agents. An outbound agent would be an agent a site sends out to gather information. For example, a site selling digital goods may embed a specific digital watermark within its digital goods. It could then create an agent to search the Web for this digital watermark to determine if unauthorized uses exist. Another example would be competitive analysis. A site may create an agent for polling competing sites for current prices and product list in order to price the site's own items competitively.

On the other hand, the site may deal with inbound agents. The emergence of the comprehensive intelligent shopping assistant is a prime example of inbound agents. Agents may enter a site in an attempt to gather information about products, availability and prices. For example, an Internet shopper may use a 'shopping agent' to submit a request for a particular product. The shopping agent determines which sites may contain relevant information, interacts with the site in order to gather any needed information, and prepares a report for the user including detailed product information, product comparisons, and pricing lists. From the site selling goods, the agent may be viewed as in inbound customer.

In essence, an agent is both inbound and outbound, depending on the perspective of the site. If the site is the initiator of the agent, the agent is viewed as outbound. This same agent is viewed as inbound to the sites it interacts with to gather information.

Agent Technology

The technology behind agents is continually evolving. Agents generally require more distributed processing and communication capabilities than are currently offered by networking and computing standards such as TCP/IP and CORBA. These standards cannot accommodate the flexibility and variety of interaction needed among agents, users, and other agents and systems. As it is available now, middleware support to inter-process communication is quite primitive. TCP/IP fulfills the necessary transport function; Remote Procedure Call (RPC) and socket libraries allow for the basic exchange of information and invocation of procedures on top of TCP/IP; and CORBA adds routing, names services and data type translation.

Flexible, tailorable interactions among agents, users, and other agents and systems require a language and protocols for specifying or customizing the behavior of agents, regardless of their mobility. Some statements of the language will allow flexible interactions with a specific component of the agent-interface to services. These service mediators will allow incoming agents to query for the nature of provided services and conditions of their usage. Research is underway on such languages, their semantics, their syntax and how they should be integrated with agent systems.

Peer-to-peer computing allows work stations to concurrently send and host multiple requests for services. Security, reliability and integrity issues need to be explored, especially because the market has high expectations for these areas in client/server environments. Asynchronous distributed computing is best handled with mobile agents. Rather than coding a long-lasting, complex exchange of messages between a client and possibly multiple servers, a mobile agent carries a compact program with all the required procedures for the interaction to be executed remotely.

Electronic Merchandising 1004

Figure 94:
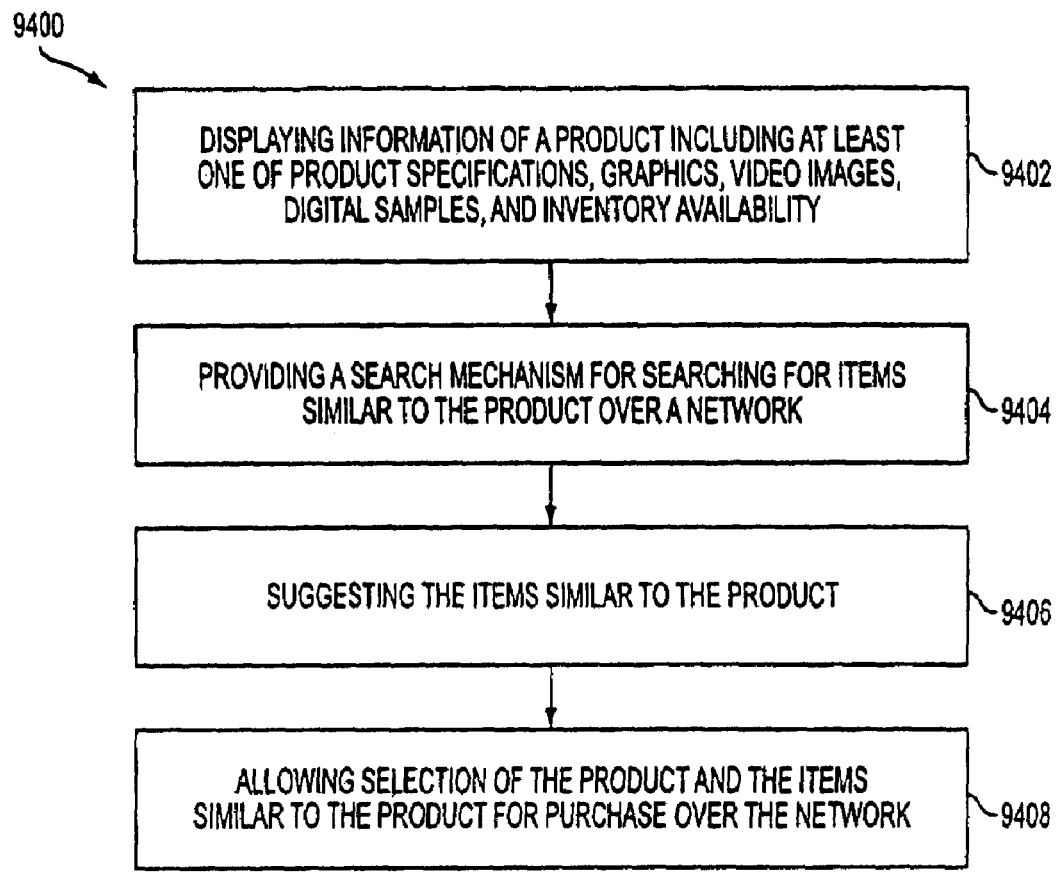
FIG. 94 illustrates a flowchart for a method for suggesting products over a network in accordance with an embodiment of the present invention.

FIG. 94 illustrates a flowchart for a method 9400 for suggesting products over a network. Information of a product is displayed in operation 9402. The product information includes product specifications, graphics, video images, digital samples, and/or inventory availability. In operation 9404, a search mechanism is provided for searching for items similar to the product over a network. Items found during the search similar to the product are suggested in operation 9406. Selection of the product and the items similar to the product is allowed for purchase over the network in operation 9408.

As an option, a downloadable sample of the product may also be provided. As another option, user-created customization of the product may also be allowed. Also, compatibility and/or equivalence of the product may be evaluated with regards to the items similar to the product.

Optionally, a price of the product or the items similar to the product may be generated based on a customer profile, a customer type, and/or a geographic location. Additionally, one or more of a special offering and a sale of the product or the items similar to the product may be generated for a customer based on a customer profile, a customer type, and/or a geographic location.

Figure 95:
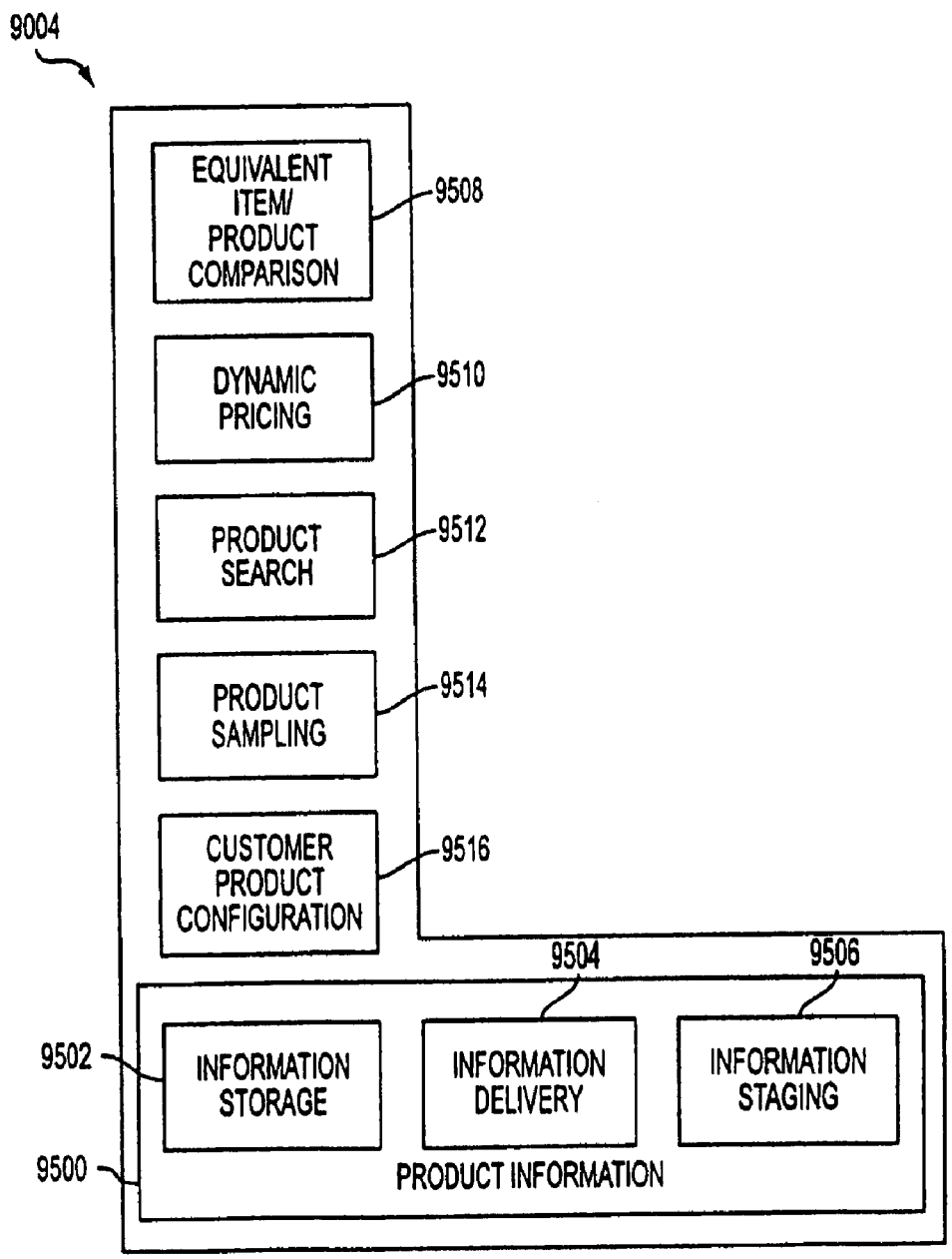
FIG. 95 illustrates the merchandising component of the eCommerce Application Framework of the present invention.

Electronic merchandising introduces a new medium, the Internet, for merchants to sell their products. As shown in FIG. 95, the merchandising component consists of services needed to deliver product, pricing, and inventory information. These services may directly interact with the personalization services in order to deliver the information in a customized format. A traditional example of this would be window-shopping, merchandise browsing, or any informative interaction with the sales clerk.

There are tremendous benefits in adapting electronic (or dynamic) merchandising. Listed below are some of the benefits.

Amount of Information—The Internet is an excellent medium for selling information-intensive products. In addition, the information can be updated as needed. Customers will no longer worry about outdated catalogs and information.

Location—The Internet is geographically independent. A single site can potentially serve the global community.

Availability—In addition, the merchant does not need to worry about store hours. The site can be open for business 24×7.

Catalog Sales Model—The catalog sales model migrates naturally to the Internet.

Shoppers can click on a product to see a larger picture and more detailed information. An intelligent agent can suggest similar items or others matching the tastes of the individual. Special offerings and sales can be generated dynamically for each customer at the time of the visit. Catalogs could even be sent as email attachments once per month, with links back to the main site for more information.

Convenience Services—Convenience services, such as grocery shopping and virtual flower shops, are successful on the Internet. Busy consumers can choose a greeting card from a huge online catalog, add a personal message, and have it sent on any day they specify.

Digital Goods—Digital goods, such as news, research, or data and graphic media like art and photography, are ideal for eCommerce. Buyers can take immediate delivery at the time of purchase, providing instant gratification and peace of mind. The seller does not receive payment until the goods are received.

Large Selection of Goods—Online stores can have "virtual inventories" with a depth that would be impossible or prohibitively expensive to duplicate in the physical world.

Product Information (Catalog Services) 9500

There are many different styles and metaphors for electronic merchandising. The basic underlying concept is providing product information to the end user. Product information may include product specifications, graphics or video images, digital samples, or even inventory availability. The approach for displaying this information may differ based on a Business-to-Consumer or Business-to-Business implementation. The most common implementation is to use the catalog approach.

Information Storage (Data Model) 9502

The actual storage of the content is important. Product information stored using static HTML aside, the most common method is in an object or relational database. Many vendors even provide data models for a product database. Vendor-provided data models often will need to be modified in order to meet the specific product detail the system requires. It is important to understand the robustness of the data model as well as the impacts to the system if changes need to be introduced. The system may involve storage and access to many non-discrete data types.

Information Delivery 9504

In more complex merchandising implementations, the content may consist of non-discrete data types such as audio and video. The delivery mechanism will need to be able to deliver the data to different access devices. Systems will encounter the need to manage non-discrete data types such as audio and video data and alternative content in case the access type cannot handle the data types.

Information Staging 9506

The ability to deliver new products and information may be critical to stay ahead or match the competition. The speed at which the information can be updated and migrated to production is critical. Be sure to understand the relationship between the content changes and the correct procedures to migrate the changes to the production system. The ability to maintain and grow the site may prove to be key factors in the site's success.

In most cases, a content staging process should be put in place. In the simplest format, the procedures for modifying and adding content, testing, validation of content and subject matter, authorization and migration to production should be documented.

Equivalent Item Identification and Product Comparison 9508

Buyer-Centric solutions may need to implement a method of evaluating compatibility and equivalence of products. If the buy site deals with multiple trading partners, these functions may provide additional cost savings. Getting buy-in from all the trading partners to agree upon a common model for product information is key for this to be successful.

Dynamic Pricing 9510

Dynamic pricing is the ability to display a different product price based on a customer profile, customer type, or any other logical possibility. Ties to personalization may be needed to handle pricing schemes based on relationships, terms, volumes, or other potential customer profile items. It is a good practice to base the information on database technologies that allow for quick retrieval and calculation (Note: This is definitely a performance-conscious area).

In addition, the pricing mechanism should be tied to any sort of discounting or promotional incentives. For Business-to-Business implementations, contracts and agreements may be in place to drive the specific pricing. Discounts may be applied on an incremental or time-oriented basis. A common concept used are electronic coupons or other types of discounts. The customers may have earned or acquired a coupon or other form of discount earlier in the interaction with the site. The coupon, usually stored on the user's machine, may be applied to the purchased products.

Product Search 9512

In addition to catalog navigation, the ability to search for specific products is crucial.

Assuming the site is a seller-centric site, there are numerous methods of implementing a product search Product Sampling 9514

Product Sampling—Products able to be sampled over the Internet will sell well there. Music is one example. A shopper can listen to pieces of songs on a CD before deciding to order it.

Custom Product Configuration 9516

Some applications may require the ability for custom part creation or the combination of individual components the user can combine to fulfill a specific, hard-to-manage, need. Part compatibility and pricing can become very complex and unmanageable.

Implementation Consideration

International Considerations

It is important to keep in mind international considerations when designing the merchandising component. The obvious considerations are related to converting currency and linguistics. In addition to these, there are hidden pitfalls of specific customs that may unknowingly be violated. Sales of some goods may also be banned in certain countries.

Site Design Considerations

As with designing any site, the layout, design, and navigation aspects are extremely important. The home page or entrance to the site is crucial. There is often a debate as to what level of clutter and organization is desirable. It is a good practice to research a potential user's current standard practices for site design and layout.

Relationship Management 9006

Figure 96:
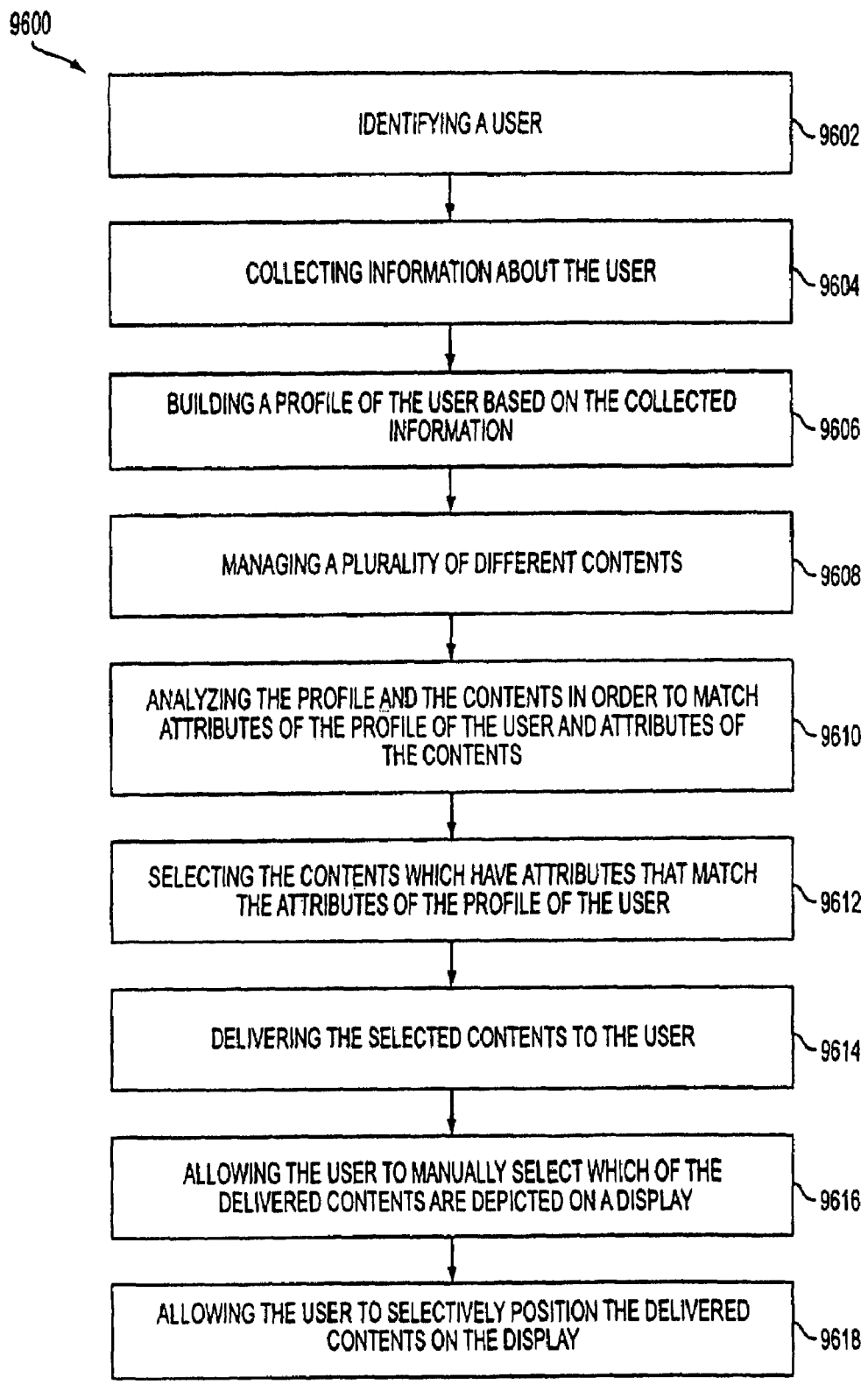
FIG. 96 illustrates a flowchart for a method for interacting with a user over a network for personalizing a website in accordance with an embodiment of the present invention.

FIG. 96 illustrates a flowchart for a method 9600 for interacting with a user over a network for personalizing a website. A user is identified and information about the user is collected in operations 9602 and 9604. A profile of the user is built based on the collected information and a plurality of different contents are managed in operations 9606 and 9608. The profile and the contents are analyzed in order to match attributes of the profile of the user and attributes of the contents in operation 9610. The contents which have attributes that match the attributes of the profile of the user are then selected and delivered to the user in operations 9612 and 9614. The user is allowed to manually select which of the delivered contents are depicted on a display in operation 9616. The user is also allowed in operation 9618 to selectively position the delivered contents on the display.

The analysis of the profile may occur in real time. The user may also be identified by using a cookie, receiving user input, and digital certificates. As an option, a time when the user last viewed the contents may also be identified with portions of the contents that have been modified or added since the time when the user last viewed the contents being indicated. As another option, the user may also be allowed to rate the contents.

Further, a potential customer may be selected from a plurality of users and an act may be performed to entice the potential customer to become a real customer. Also, an activity may further be conducted to retain a current customer and a demand generating application may be provided.

Enterprises must respond by capitalizing on the new potential the interactive mediums offer; to reach, communicate, and interact with customers. The way enterprises interact with their customers continues to change due to demand for increased convenience, better access, higher levels of interactivity, and faster fulfillment. As a result, more customer interactions are done through electronic means (e.g., home PCs, automated teller machines, automated voice response, 800-numbers, and the Internet). Regardless of the particular medium the customer chooses, it is clear future communications will be increasingly technology-enabled and information-intensive and will provide the foundation for a continuous, two-way dialogue with customers.

The benefits of new media and communications technologies to interact are numerous, enabling enterprises to provide better customer service, to capture valuable information about customer behavior and product use, and to allow greater differentiation at the point of contact. However, most next-generation customer interfaces continue to be designed to be high tech rather than high touch.

Figure 97:
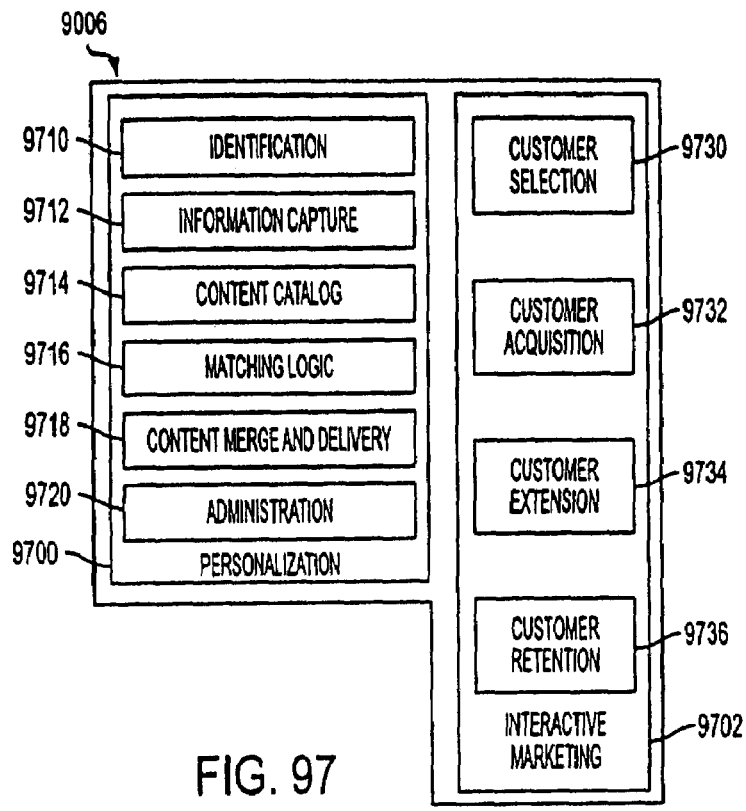
FIG. 97 depicts the Relationship Management section of the eCommerce Application Framework in accordance with one embodiment of the present invention.

The Relationship Management section of the Ecaf, shown in FIG. 97, covers applications and architecture components geared toward capitalizing on the interaction with the customer. Within relationship management, there are two main driving forces: Interactive Marketing 9702 and Personalization 9700.

Personalization 9700

Personalization is the continuous process of collecting, analyzing, and using information about the end-user in order to improve the productivity and value of their interaction with the organization.

The purpose of personalization is to interact with the customer/user with the hopes of establishing and building a relationship, increasing sales by catering to the individual customer's needs, cross selling or up selling, and enticing users to return to the site. Unlike any other broadcast medium, the Internet was designed for two-way interaction, hence providing the ability to narrow-cast or customize the interaction to the individual user.

Generating demand for a site's products or services and building customer relationships are crucial for any eCommerce implementation. This is even more evident in seller-centric implementations and hype or marketing driven implementations. The customization can occur in many forms. The services and infrastructure can vary drastically depending on the extent of personalization desired. Each eCommerce package may approach personalization using different services and infrastructure.

The enterprise complexity of the personalization approach will drive the architecture components and application required to implement and deliver this strategy. It is critical for the enterprise success to understand how the personalization strategy will affect the entire enterprise.

Conceptual Personalization Architecture

Figure 98:
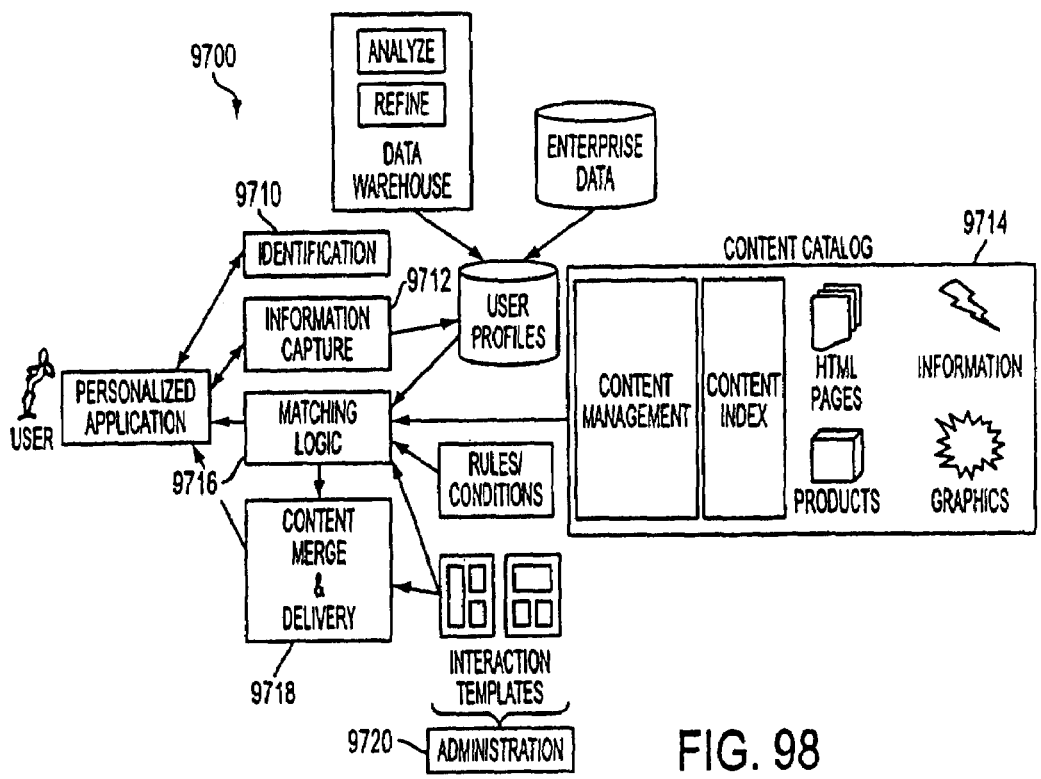
FIG. 98 illustrates a conceptual personalization architecture for implementing the Relationship Management section of the eCommerce Application Framework.

The conceptual personalization architecture is independent of enterprise or industry. Implementing a personalization strategy into an existing system or a new one requires the design and development of personalization architecture components. These components are essential to the success of the personalization strategy. They include an Identification component 9710 to identify the user, Information Capture component 9712 to capture information about the user, Content Catalog component 9714 to manage the different contents in the system, Matching component 9716 to match the user's profile attributes with the correct content, Merge & Deliver component 9718 to deliver the content to the user and an Optimization & Administration component 9720 to continuously optimize the personalization interaction and administrate the rules and content as they change or added. See FIG. 97. By way of example, the conceptual personalization architecture components illustrated in FIG. 98 will be discussed in detail in the subcomponents of this component.

Personalization Techniques

There is currently a lot of hype and press attention centered on the idea of "personalization". Given the wide variety of products and ideas being labeled "personalization", it is apparent that a variety of different personalization delivery techniques and technologies are evolving. As with most emerging concepts, the initial techniques cover a wide range of complexity in both infrastructure and approach. Most personalized sites use a combination of techniques. Samplings of personalization techniques are presented below:

User Acknowledgement

This is acknowledging the user or greeting them with a personalized statement. The statement may be a simple 'Welcome back <user name>!' message or it may be more complex, drawing on information from the last interaction.

Personalized Interface

In this approach, the application or web site's user interface is customized for the individual. The actual page layout or page design is altered based on the individual interacting with the system. This category can be sub-divided based on who (the site or the user) controls how the interface is altered.

Site Morphing. Site morphing is when the site alters the user's interface. The site may alter the page's layout, the subjects or types of content and information, or the site capabilities based on what is known about the user. A variety of different user attributes or algorithms can be used to customize the user's interface.

Customer Strategy. The site's interface may alter based on a customer status or customer strategy. A customer strategy might attempt to interact with new site visitors with an interface geared toward selection (what is the potential value of this customer?) and acquisition (how do we acquire this customer?) while gearing the interface and interaction for an existing customer to retention and extension (selling additional products, allowing the customer to be self serving, or making it easier to do business with the company).

Customer Status. The site's interface can be altered based on the status of the customer. For example, a United Airline® site could be customized based on the user's Mileage Plus® status. Non-members would have a very generic site where they can perform the basic site functions. Mileage Plus members would have additional capabilities (such as flight history, mileage status or customer service chat) as well as different site layouts and attributes based on their exact status.

Intent Determination. This technique attempts to pre-determine the purpose of the user's visit to the site and customize the navigation and user interface to help the user quickly perform these actions. Based on the user's information and past actions, it can often be determined the most likely reason the user is logging on and thus make those functions or information immediately available—front and center. Assume the United Airline site used intent determination to create a personalized interface. Over time, the site learns that the user regularly check their mileage status, the in-flight movie listings, food service listing, and airport maps. The site also notices that the last two interactions, the user has called to upgrade to First Class. The next time the user logs in, realizing the customer has an upcoming flight reservation to Chicago, an O'Hare terminal map, the in-flight movie, and dinner menu is automatically displayed as well as a prompt asking the user if they would like to upgrade to first class. The power of this concept becomes increasingly important as more functional web-sites are deployed that allow the user to do possibly hundreds of different things. Users are already complaining about the ability to navigate even relatively simple sites. Personalized intent determination seeks to "de-clutter" the company's site and demonstrate to the user that the company "knows" them and what is important to them. Good intent determination is not easy to implement, but holds real power for making customer-based applications easier, and more likely to be used.

User Configured Interface. The user controls the site's configuration. In this case, the site provides a facility that allows the user to configure the page layout, and the subjects, links or content that the page will contain. Once configured, the user has a customized page configured to their specification. When the user enters the site, the user-configured interface is loaded. Within the user-configured site, the user has the ability to configure their own site by selecting the layout, topics and content details that will be displayed by selecting items from defined menu of configuration options.

Content Filtering

This technique filters the information or content displayed to the user based on what is entered by, or known about the user. Many personalized sites use some form of content filtering. A variety of different filtering techniques have emerged. Some are adaptations of traditional client/server techniques adapted to the Web. In the first grouping of techniques presented here, the user controls how the information is filtered.

User-controlled, explicit content filtering. Techniques in this category enable the user to filter data or content.

Personalized Information. Allows the user to see information specific to them. The content in this case may be information about the user's profile, about products they have or a past order history. This technique allows the user to filter the data by building 'where clause' statement or execute 'canned' queries. It is often used when the user is familiar with the data and wishes to organize or filter it in multiple ways.

User-controlled, implicit content filtering.

Collaborative filtering. Collaborative filtering determines clusters of users with similar interests, either by asking users explicitly or by observing user selections and actions to determine those interests implicitly. This is an effective technique for creating recommendations for products.

Site controlled content filtering.

Contextual Inferences. Contextual inference uses human-determined rules to select content based on behavior, interest or other profile attributes.

What's New. Based on knowing when the user last visited, the site determines what content has changed since the last time the user has interacted with the site and display a list of changes. A personalized "what's new" is far more effective than a generic "what's new" that is shown to all users—obviously what's new is different for the user who was here yesterday versus the one who hasn't used the site in six months. The content that is marked as new may be further constrained to only contain the areas that the user has interacted with in the past.

Configure Process or Fastpath

This technique simplifies a complex process or repetitive task by storing the user's preferences and inputs required to complete the process. In most cases a series of pre-defined questions and preferences have to be set up in order to use this functionality. 1-Click purchasing can be offered which allows a user to select an item with a single click and purchase the item—by-passing the order selection, order form, shipping and payment pages. A Fastpath approach can be used where the user has performed the function before and allowed the application or web site to retain more static information like shipping address.

Pre-Filled Forms and Information

In situations where user data is required to complete an action, the site can use information that it currently has about the user to pre-fill the form. For example, the site may fill out the order form with the user's last address and order information or the site may fill out the list of items ordered last. This approach differs from Fastpathing in that the user still sees the pre-filled form and has the opportunity to change the data.

Personal Assistant

The site provides an interactive assistant to deliver 'personalized help and assistance'. Its purpose is to help the user with difficult actions and site functionality. Based on observing and recording how often (if ever) the user has used a give function within the site, tips, suggestions, and other forms of assistance can be fine tuned to the user's level of experience.

Non-Interactive Delivery Techniques

Most of the personalization techniques described above are interactive personalization techniques. Content and information is personalized for the user in real time—while the user interacts with the application or site. Some forms of personalization can also be used in a non-interactive, or "push" mode "Push" (or "server-push") is where the delivery of information to a user on the Web is triggered and initiated by the information server rather than by the user.

In fact, the information pushed from a server to a user actually comes as the result of a subscription-like standing request created by the user and either stored on the server or on their local machine. This program captures and stores the user's profile locally and then periodically initiates requests for information on the user's behalf from the server.

Push technologies enable an enterprise to reach and provide value to their customer outside of the traditional interactions. Of the personalization techniques described above, content filtering doesn't require that it be delivered though an interactive session. Keep in mind that push does not necessarily mean personalized. A site may simple push the same information to all users or subscribers. Personalized push refers to information that is filtered based on a specific user's request or profile or where the delivery is scheduled for a specific user. There are a variety of different legitimate business reasons to push a users information. The following are some examples of personalized push:

Information Delivery. A user subscribes to receive information on a scheduled basis. The information that is pushed is either determined through user selection—the user selects the subjects and type of information that they wish to receive, or the site determines what information the user may be interested in receiving based on their profile information. For example, at an investment web site, users are allowed to subscribe to investment information feeds. The user decided to receive a daily feed of the stock quotes for the commodities they hold. The site pushes this information and additionally pushes news articles and stock recommendations based on the user's portfolio holdings.

Event Reminders. The user subscribes to receive event reminders from the web site. An event reminder might remind the user of specific dates of interest such as a birthday or anniversary, a bill reminder or that an action is required in the near future.

Information Update. A site may also push updates to a user. For example, Microsoft's Expedia allows users to request fare updates. A user can choose a specific destination of interest. If the fare to this location changes, the user is notified of the fare update.

Don't be a junk e-mailer. The push medium is powerful and potentially less costly than conventional mail. This doesn't justify its use as junk mail. It does not work because everyone receives junk mail, and junk mail that ends up in the trash is failed target marketing efforts. Personalize it. Deliver valuable information that the customer is interested in. Allow them to select the topics, how to filter the content and the frequency.

Personalization Process

Personalization is actually a catchall for several underlying technology capabilities needed to create a personalized interaction between an organization and a user. By breaking the underlying technology and logic into simpler components, one can build an understanding of the processes and technology needed to deliver personalized applications.

Personalization is the continuous process of collecting, analyzing, and using end-user information in order to improve the productivity and value of their interaction with the organization. Implicit in this definition is the need to do a number of basic things. Simply put, there needs to be some method for identifying the user, collecting (or detecting) and storing user information, analyzing it, assessing what content or functionality is appropriate, and present it to the user.

Figure 99:
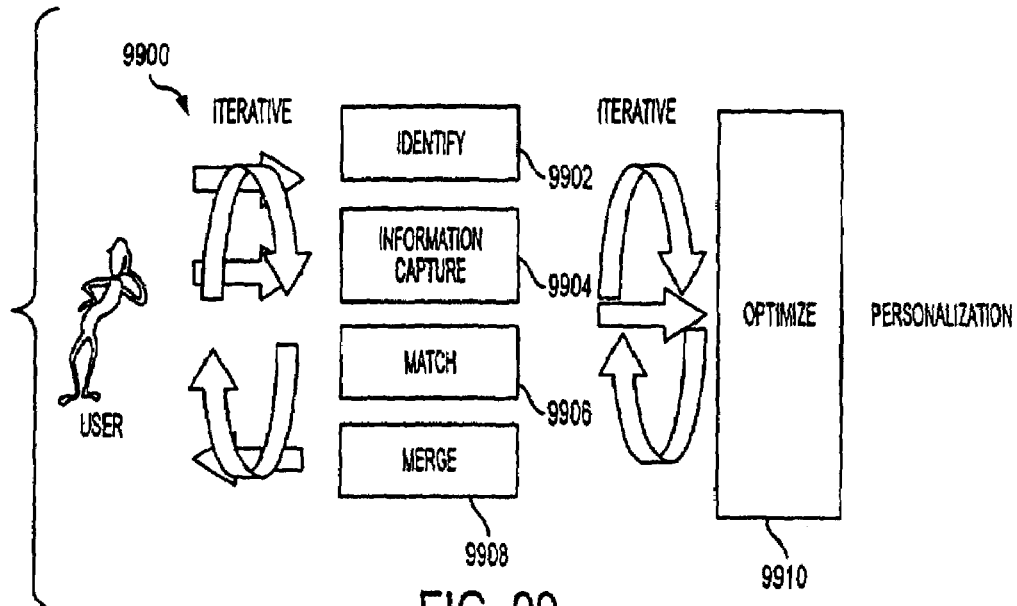
FIG. 99 illustrates a simple personalization process.

FIG. 99 illustrates a simple personalization process 9900. Most personalization techniques utilize this process in some fashion or another. The complexity and the details of the process may vary based on the technique. The following is a description of the different personalization process components.

Identification 9902—The first step is to identify the user. This enables the rest of the personalization process components. One must know whom one is talking to, in order to personalize "personalize" the experience.

Information Capture 9904—The next step is to collect information about the user. This may be done with implicit or explicit techniques at the direction of the user, or controlled by the system. The goal is to capture information that will assist in determining and delivering a valuable interaction.

Analysis and Refinement—Once the data is captured, it may need to be refined before it is usable. The system needs the ability to analyze the data and draw insight or conclusions about the information and interaction. The refinement may transform the data from questionnaires or implicit observation to be usable with the matching rules and content indexing strategy.

Match 9906—When the personalization strategy is developed, a base of 'Personalization Matching Factor' and rules (based on who, what, where, when, why . . . ) are created. These matching factors and rules are necessary to determine the content, navigation, and layout appropriate for the user.

Merge and Delivery 9908—Upon determining the appropriate information and format, the information needs to be merged and deliverer to the user. This may be through an interactive interface or through a push mechanism.

Personalization Optimization 9910—Personalization is a complex and evolutionary process. The ability to gather metrics and measurements on the personalization process in order to perform rule or data translations, model tuning and reporting is essential to maximizing the concept's potential.

Personalization Strategy

Personalization will continue to be adopted by the market place. Numerous sites have incorporated personalization techniques into their sites and the marketplace is full of independent software vendors creating personalization related software.

Each enterprise must assess their personalization opportunities from their own perspective and develop their own personalization strategy. The personalization strategy must be integrated with the enterprise's existing customer relationship, technology and eCommerce strategies.

Developing a Personalization Strategy

Using the Opportunity matrix given below, the opportunities where personalization typically delivers the most value in within the Interact domain. This area consists of opportunities where the organization is interacting with the user or the user is attempting to engage in a dialog. The publishing slice and Knowledge Management aspects of the Interact slice are the areas which are typically the secondary areas of personalization opportunity with the transact slice being last.

| Process | Publish | Interact | Transact |
| --- | --- | --- | --- |
| Develop products and services | Research and product information | Capture customer feedback; co-design products | Integrated design Systems |
| Generate Demand | Product information; advertising | Interactive marketing; Market of One | Demand-generated Pricing |
| Fulfill Demand | Product availability information | Customer relationship management | Order/deliver/pay; loyalty programs |
| Plan and Manage Enterprise | Publish policies and procedures; HR & Finance info | Knowledge management | Internal purchasing; HR & Benefits systems |

When evaluating what opportunities exists, all areas should be considered. The value of the personalized interaction will be dependent on many factors such as the type of products and services (can they be personalized?) or the type of relationship with the customer or consumer and the ability to capture user information.

A formal personalization strategy should be established that included the near term goals and future vision. Many companies jump right in without any guidance or realization on how they are growing or enhancing the enterprise. The strategy should begin with the big picture. Perform an examination of the critical forces affecting the enterprise and how these forces affect the business process. What are the drivers? Society, marketing, technology, business/industry? With the personalization market emerging, there are still with many unproven business cases and unproven technology. Firms should not engage in personalization simple because they can, nor should they fall prey to the unproven expectations generated by vendors or marketing hype. Firms considering personalization must frame personalization in the context of true enterprise goals (increasing customer retention or increase customer extension), then determine how personalization will help accomplish these goals.

The personalization strategy should evaluate the complexity of the personalization, the cost and time to implement and the potential business impact. In many cases, a true one-to-one personalized site may not make sense. Creating millions of varieties of a product will only complicate the interaction to the point that the user is overwhelmed. In some cases engaging in simple personalized dialogues may be the best near and midterm solutions.

Figure 100:
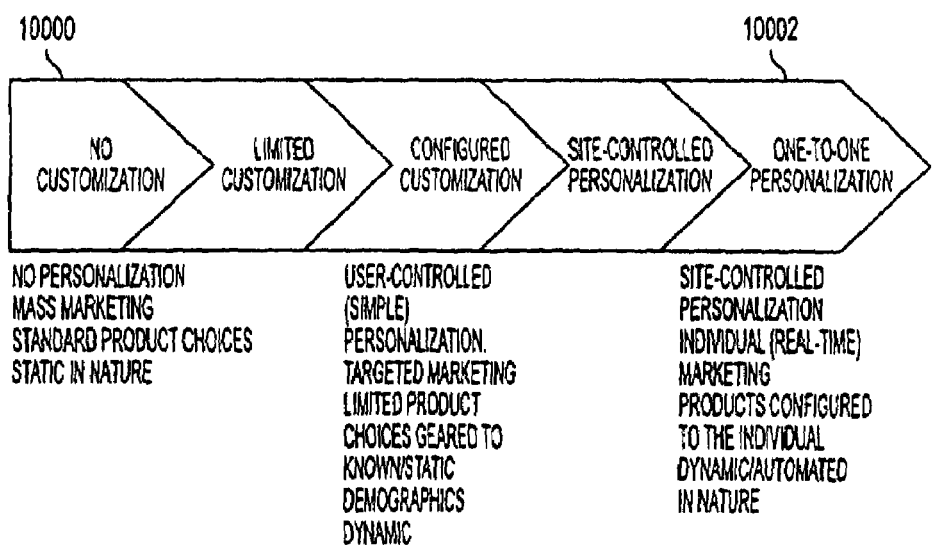
FIG. 100 is a graphical depiction of extents of personalization.

Since different users may wish to interact differently, there may be many right answers to the personalization strategy. Some users are self serving and want to have the tools to explore or make choices on their own, others want immediacy, others may want intimacy such that their feed back and options register with the company. See FIG. 100 for a graphical depiction of personalization from no customization at 10000 to one-on-one personalization at 10002.

The type of dialog that the site engages with the user may vary based on the user. In some cases no personalization or customization should be performed. As more information is captured on the user, the correct type of dialog should be assessed. Determining the correct touch points and level of complexity of the personalization techniques is an important part of the enterprise's personalization strategy.

Common Impediments to Personalization

Listed below are some of the common impediments to personalization.

Cost—The cost of implementing sophisticated personalization is very high. The annual cost of maintaining a highly personalized Web site will likely be even greater than the implementation cost.

Software Immaturity—Several of the Web measurement and analytic techniques used to segment users based on behavior and preferences come straight from academia and have not been adequately tested in the real world yet.

Vendor Immaturity—Many of the vendors offering the most sophisticated personalization software are small start-ups founded by academics. These companies are still developing their strategies and growth plans, and are liable to change course over the next few years.

Content Management—Content must be created and stored in such a way that it can be flexibly combined and frequently modified.

Integration with marketing databases—To be more than a novelty, personalization will require tight integration with marketing databases. This presents a serious integration challenge, and may necessitate the creation of an enterprise wide strategy for the collection, normalization and analysis of customer data.

Required Maintenance—Personalization requires dedicated maintenance. While much of the process of personalization can be automated, the construction of the business rules used to match content to visitors and the creation of the metadata tags required to classify all content still require a tremendous amount of human oversight. The need for such oversight is only compounded by the fact that personalization becomes exponentially more complex as the number of visitors and amount of available content increases. The net result is that firms that decide to engage in personalization without ramping up staff adequately will fail.

Personalization Failure—If the personalization technique fails to deliver the correct message or product, the result may be devastating. The last thing a personalization technique should do is destroy or damage relationships.

Iniplementation Considerations

The architecture components and processes will differ depending on the type of personalization technique implemented. For each technique, there are important considerations and differences that should be understood. Each technique will vary in approach, information required, and delivery. The following items should be considered:

Triggering the Personalization Process—What triggers the personalization process? Does the user control the process or does the site? Is the process triggered when the user requests a page or DCA within a page or is it triggered by a background process based on implicit information capture?

User Profile Information—What information does the personalization process require? What is the data source or where is the information stored? How and when is it captured?

Matching Logic—What drives the matching logic? How is the rule defined? Can the user configure the rule? Does the rule optimize and learn by itself? What happens if the information needed does not exist, does the site attempt to capture it?

Content—What is the potential content? How is it stored? How is the content merged and displayed? What is the extent of content management?

Definition and Maintenance—Who is responsible for configuring and maintaining the rule, matching logic, or Personalization technique? What are the metrics that will measure its ROI? How are these metrics captured?

These questions can be answered in many ways. The impact the answers have is dependent on the enterprise and its personalization strategy.

A few specific techniques to consider are detailed here:

Personal Acknowledgment—In the case of a personal acknowledgment, the rule set may be well defined and the user is not even aware that it exists. There is also no way for the user to alter or customize the content. An example of the personal acknowledgment would be a simple greeting that says "Hello <User>, Good Afternoon". The rule is based on time of day, as determined by the system time. Once the user enters the site, the rule is executed. Based on the result to the system would greet the user with a 'Good Morning, Good Afternoon, or Good Evening'. In this case, the rule is set and does not get altered.

Content Filtering—Content Filtering works very similar to personal acknowledgment, but it allows the user to alter the content they wish to see. The rule set is not as clearly defined as personal acknowledgment, rather a shell of the rules is in place and the user has the ability to customize the attributes to the rules. Content Filtering allows the user to define what it is they wish to see on their page. On a site, the user is able to select what information is important for them to view. Users can select whether or not they want to see information about sports, weather, U.S. news, World News, states, and many more. Whichever options the user selects, are the types of stories that will be displayed on their personalized page. The user should also be given the option to change their options at any time. In this case, the rule shell is defined, however the attributes are changeable by the user at any time.

Custom Interface—The Custom Interface example takes the concepts of Content Filtering one step farther. In this case, the user not only has the option of setting the content attributes, but they are also able to set the page attributes as well. By giving the user the ability to set the page attributes, they set up the layout of their page so the items are what they want to see, and where they want to see them. Here, the same form of the rule shell is used, but the user also gets many other options that allow them to set up the page as they desire.

Personal Assistant—The idea of a personal assistant has been popularized by Microsoft in their addition of the personal assistant to Microsoft Office. If one begins to have trouble or is unable to figure out what to do, the Personal Assistant is there to help. This type of interface is different from that of the other types mentioned. In this example, the system is designed to be a learning system and is situation based. That is, it is designed to monitor what actions the user is performing and trying to determine if the user is lost. If the system notices the user is continually returning to the section of the site designed to change their address, but has not been successful in getting their address changed, then the personal assistant would be launched. The assistant would try to help the user follow the needed steps to change their address successfully. This type of site is not built upon hard-set rules, but rather is designed to learn as much as possible about the user as it goes.

Identification 9710

The first task of the personalization engine is to identify the user. Unlike the everyday person to person interactions where a person relies on recognizing the another's face, voice or other attributes to identify the other person, identifying a user on-line can be a difficult process. The simple task of identifying users does not prove to be a simple task at all. A system may personalize an interaction based on the information captured during a single session or information gathered over the entire duration of the relationship. Regardless, the information that is captured needs to be associated with the user. In order to track a user, an identification or tracking mechanism needs to be created.

Identification Techniques

A variety of techniques can be used to identify the user. The technique may depend on the site's security requirement and privacy concerns. Today, the most common approaches are to either create a cookie on the client machine or to have an identification system on the server, such as a user login. In the future, digital certificates will be more prevalent, and should become the dominant identification method.

Client Side Storage—Cookie

A Cookie is a small text file placed on the client machine's hard drive by a Web server. It is essentially a user's identification card, and cannot execute code or deliver viruses. It is unique to the user and can only be used by the server that issued it. Although this is a common method for identifying a user, there are many risks associated with it.

Cookie may expire or be deleted by the user.

Multiple people may use the same client machine. Identifying what user is on the machine may be very complex. This may result in multiple cookies or a complex cookie that can identify multiple users. Regardless, the cookie may not be able to determine what user is currently on the system.

A user may use multiple machines. In this case, the new/other machine may not have the user's cookie and will not be able to identify the user.

The user has the ability to disable the use of cookies within their browser. There is an option that the user can set that will tell their browser to reject all cookies. If the user does this, then he or she will be unidentifiable.

Server Side Application Logic

This technique requires the user to log-in or sign on to the site. This requires the creation of a user ID and password to utilize the system and the resources needed to validate and store the ID and password. With this technique, the user must remember their log-in name and password. Additional services to lookup log-in names or request new passwords should also be provided.

Certificates and Digital ID's

In every day life people carry different forms of identification; a person's on-line identity may be no different. Modern cryptographic technology offers certificates or digital IDs that will serve as electronic forms of identification. Digital certificates are still evolving and the key players and details on how the pieces tie together are still falling into place.

One example of an effective use of a certificate is Firefly Passport. There the certificate is tied to a list of user profile information. (Microsoft purchased Firefly for this technology. The name is apt to change over time.) The Firefly Passport gives users an application with which to control their personal information and payment details. The information can be dispensed selectively to third parties to use.

A combination of techniques may also be used. The cookie may be used for the initial identification or the default ID for the Log-in process, while the server side log-in process would then be used to verify the identity of the user. It is important to make this process seamless and unobtrusive. The identification process should fade in the background. It should be present yet invisible and unobtrusive.

Relating Multiple ID's

Creating a log-in or sign-in process introduces the traditional problem of multiple log-ins, (or ID's) from a site or enterprise perspective. If a user forgets their login, they may simply create a new one. This may result in multiple logins for the user, and any information related to the previous login is not associated to the user's new one. To prevent this, a facility to look up existing login names or request a new password should be provided.

As in the client/server world, a single or universal log-in is advised, especially for systems that wish to personalize their site's interaction. If the enterprise already has an existing user base, pushing out IDs to users or allowing the ability to re-use the existing ID should be encouraged. For example, United Airlines created a PIN (Personal Identification Number) for each of their Mileage Plus members that provided access to the Mileage Plus section of their Web site and pushed (physically mailed) this out to the respective user. The PIN was their mileage plus number with a password associated with it. By doing this, they were able to reuse their existing identification process and login IDs.

Information Capture 9712

The personalization process is data intensive and is driven by the information collected about the system's users. The more information the site collects and retains about a user, the more likely it can add value and interact on a personalized level. With out this crucial data, there is no basis to shape the interaction or drive the personalization techniques.

Personalization Profile

The information collected about a user is considered the user's profile. Logically, this is everything the enterprise (site) knows about the user. Attributes from the user's profile will be the input to the personalization process and the driving data for the different personalization techniques. A profiling strategy should be developed by the enterprise that addresses what information to capture, the sources of this information, the methods to capture it, and how this information will be stored. If the customer is to be treated the same at all points of interaction, a common profile should be developed that is shared by all departments and applications.

Determining what information to capture or what attributes make up the user's profile can be a difficult process. In most cases, the profile will be based on the enterprise's personalization strategy, the personalization techniques to be implemented, the data required to implement them and a mix of any user information deemed usable that can be captured. In general, the site needs to capture the information required to perform the analysis aspect of the personalization process for each of the personalization technique to be implemented. This information might include:

Basic user information such as name and address.

User demographics, psychographics, and sociographics such as gender, height or age.

User transaction or enterprise data such as purchase history.

User's specified configuration information such as the attribute's of the user's personal home page.

Interaction information such as content viewed or duration of content displayed to the user.

Each personalization technique may require a different set of attributes from the user's profile. The information needed to deliver a 'Site Controlled Contextual Inferences' will be very different than the information needed for 'pre-filled forms.' Site Controlled Contextual Inferences Content Filtering requires the creation of rules and the necessary user information that satisfy the rules or 'Contextual Inferences'. (The information required to satisfy a rule is referred to as Personalization Matching Factors (PMFs) and will be discussed in more detail in the Matching Logic component.) For instance, the rule may be based on gender, age, purchase history or customer demographics. On the other hand, the information that is used to Pre-Fill forms may be a different set of user profile attributes. For example, this might be name, address, shipping information and payment information. Another personalization technique may use the same set of user information or may require another subset of user data.

Physically, this data may come from many sources within the enterprise. Information may be gathered directly from the user's interaction with the personalized site through implicit or explicit information gathering techniques.

Information may be used from other data sources such as existing application's transactional data, the enterprises' data warehouse, or from other internal or external data sources.

The situation should be analyzed to determine if the 'profile data' should be replicated and stored in additional profile tables or if it should remain within the existing data source. Some personalization techniques will require additional tables to store the user's profile attributes needed to deliver the personalization technique.

This will be discussed in more detail within the Matching section of the paper.

Profiling Standards

The industry has recognized the importance of personalization and the requirement of a user profile information to deliver personalization. To date, a profiling standard or definition of a common 'User Profile' does not exist. This means that each site will be required to capture and retain its own set of profile information. From a user's perspective, this introduces additional annoyance since they will be prompted by personalized sites for the same basic information. The Open Profiling Standard has been proposed to address this issue.

Platform for Privacy Preferences and Open Profiling Standards

The Internet Privacy Working Group (IPWG) began to develop the Platform for Privacy Preferences (P3P). P3P extends the Platform for Internet Content Selection (PICS) standard with notice and consent capabilities to enable automatic negotiation of preferences, policies, and information exchange. If P3P settings are accurate, Web surfers should be able to surf at will and only see P3P notices when they stray out of bounds of what is already approved in the profile.

Netscape, FireFly Network Inc. and VeriSign have introduced Open Profiling Standard (OPS), a proposed standard that helps to address the issues of multiple profiles. This proposed standard would provide Internet site developers with a uniform way of getting users' Personal Profile information in order to personalize interaction. The OPS is a standard being worked on as part of the World Wide Web Consortium's Platform for Privacy Preferences (http://www.w3c.org). It is compatible with the existing vCard and X.509 digital certificate technology standards, which allow for user identification and authentication over the Web.

Individuals will have a Personal Profile that contains their personal information, including their names, e-mail address, mailing address, and any other information they wish to provide. This profile will be stored on their personal computer (or securely stored in a corporate-wide or global directory). The first time that an individual visits a Web site that supports OPS, the Web site will request information from the Personal Profile. To protect their privacy, users can decide whether they want all or part of the information to be given to publishers, and which ones can see it. In addition, if the Web site collects additional information about the individual's preferences, it can (with the individual's permission) store that information in the Personal Profile for future use.

Some of the benefits to the user are as follows:
Convenience of maintaining only one set of personal information for many Web sites, which can save time and the inconvenience of giving the same information to multiple Web sites.
Enhances personal privacy by allowing users, instead of Web sites, to have control over releasing this private information to Web sites
The security that can be offered by possibly encrypting the locally stored information or the transmission of this information to Web sites.
Users have the ability to selectively release or withhold information in their Personal Profiles, rather than the "all or nothing" process of accepting or rejecting cookies that the user cannot examine. OPS gives individuals both more flexibility and more control over personal information than cookies can.

P3P and OPS have common goals and have unified their projects. The governing term is now P3P.

Information Capture Techniques

Once the profile strategy has been defined and the sources have been identified, the next step is capturing the information. In many cases, the information comes from existing data sources. In these cases the data may require refinement or replication.

The remaining information can be captured directly from the user's interaction with the site.

In most cases, the user will control the personalization process or technique. In these cases the user is aware of the personalization technique and chooses to use the interface that will deliver it. For example, a configured interface such as My Yahoo! requires the user to select the layout and topics they wish to display on the personalized page. The configuration (or setup) interface captures the needed information and adds this to the user's logical profile.

On the other end of the spectrum are information capture techniques that the site controls. The site collects information about the interaction. The interactive information capture techniques can be categorized as explicit or implicit.

Explicit Information Capture

Explicit information capture usually provides an interface to collect profile information. The site explicitly asks the user to provide the information. Examples of explicit information capture techniques are:
Registration Forms. A form that the user fills out to register to the site. This may include interests, demographics or any other profile attributes that site has defined and the user may be willing to provide.
Static or Dynamic Questionnaires. During the interaction, the site may prompt the user to answer questions. The questions may be based on the answer to the previous question. (Note: The registration form or a rating interface may also be an example of a questionnaire.) The site might ask a user a question if there is a Personalization Knowledge Gap. (A Personalization Knowledge Gap is the difference between the data required to deliver a specific personalized interaction and the amount of information the site has collected on the user.) Another example might be a need assessment questionnaire. For example Progressive Insurance's site provides a list of questions used to analyze the user's insurance needs.
Rating Interface. The site may provide an interface that allows the user to rate content or products. A rating interface is often used with collaborative filtering.
Filter or Query Interface. An interface that allows the user to directly manipulate or filter the content that is displayed.
Configuration Interface. An interface that allows the user to configure the site or select the content to be displayed.

Implicit Information Capture

Implicit Techniques gather information about the interaction without directly asking the user. In essence, the site is recording the interaction in search of useful information. The user may be unaware that the site is capturing information. The most common implicit technique is clickstream analysis. The site records the user's actions, what they clicked on or where they navigated to, the content displayed, time spent or the duration a graphic was displayed. The information gathered is then analyzed for patterns and trends.

Information Capture Concerns

The goal of a personalized site is to increase the value of the interaction of the user with the organization. Unfortunately, the site has the potential to do the opposite. The personalization aspects of the site could actually offend or deter customers. The approach the site uses for information capture will play a large part in the personalized site's success. The following are some items to be aware of when capturing user profile information:
Provide Value. In general, people do not like to give away personal information. To overcome this, the site needs to offer value for the information capture or provide a win-win situation. If the information capture results in something benefiting the user, they are more likely to provide the information. A good example is the grocery-preferred card. For instance Jewel Food Stores offered a preferred card where users receive discounts off of selected groceries each week. The user must present their card to receive the discount. Jewel obtains valuable user profile attributes such as purchase history and trends while the customer receives tangible discounts. The same analogy can be applied to the explicit information capture techniques used by the personalized site.

Small Appropriate Questions. Filling out long forms or questionnaires can also be an instant turn off. Users don't want to be burdened by information capture techniques. They have their own goals and agendas and if the site distracts them from accomplishing this, the site risks losing a customer. If the information capture is not directly tied to some value that the user will instantly see, break it into to small units or single questions. In addition, ask only what is needed and when it is appropriate. If the user is required to fill out a long questionnaire at the start of the interaction or when they first visit the site, they are likely to leave. By gathering the information only when it is needed and tied to tangible value, the user is more likely to provide accurate information and remain at the site.

Accuracy Issues. There is nothing that stops the users from lying or providing false information. Although there is no sure-fire way to prevent this, the site can reduce the possibilities of this occurring. As mentioned above, users are more likely to be truthful if when answering questions that are tied to perceived value or in small amounts. The site should explain the benefit of accurate information and how it will benefit the user by serving them better.

Information may also change over time. The user's interests or their marital status may change over time. It may be necessary to occasionally verify information. If derived information is stored, these may also become inaccurate over time. For example, driver status may change over time due to the occurrence of moving violations or a change in marital status. The same risks apply to information captured implicitly.

Privacy Issues. The fine line of a user's personal space and their legal rights is another possible area for concern.

Regulatory Compliance. The details of a user's legal rights are still not clear. In the near future, legal regulations will require all companies to place privacy statements on their Web sites and to provide customers with a mechanism to examine and challenge personal data collected about them. Customer access to personal information will be difficult to implement due to user authentication requirements, and the unpredictable nature of data requests and alterations. In either case, failure to comply with a site's stated privacy policy or failure to provide customers with a copy of their personal information will mean legal prosecution of organizations under national regulations.

Defining Preferences or Personality. The definition of "private" information is open to debate. For example, the European Data Protection Directive defines a number of areas (e.g., political affiliation) that are considered particularly private and, therefore, subject to enhanced controls. However, the ability of the Web to follow users' search patterns and to customize content provided by certain sites (e.g., most current-affairs sites) will offer the de facto ability to identify users' viewing preferences without the explicit authorization that the law would require if they were identifying their own characteristics. This issue will cause the most friction between U.S. and European regulators, as the United States tends to assess privacy on the basis of context and usage, while Europe bases it on an absolute measure of the data's perceived privacy (see Note 1). The collection of data that could be used to derive sensitive information will be subject (in each jurisdiction) to the equivalent privacy regulations as that level of sensitive information (0.7 probability).

Children. Vendors whose Web sites are designed for children will be subject to greater public scrutiny for violations of privacy regulations and conventions. It will be politically sensitive for children's Web sites to perform customization of content or context across multiple visits.

Selling information to third party providers. General data privacy guidelines state that information cannot be used in ways not explained to the subject at the time of collection. The problem results from the fact that the most personal information (e.g., a stock portfolio) is also the most valuable when sharing information with other application providers. This can cause tension between the value that the Web site provides its visitors (in terms of the degree of personalization that it is offering) compared with the value it can extract from the service that it provides (by sharing the information with advertisers or third-party organizations). Managing the conflicting requirements of personalization and information sharing will become a key element in determining the success of a Web site.

Content Catalog 9714

Today, the Web content of most sites is unmanaged. The enterprise does not utilize a method of tracking the content or the attributes of the content. Instead, the enterprise has a pool of content that may span multiple directories, departments and web servers. When content is created it is added to this pool of content by simply adding it to the Web server's directory and adding the necessary link required to display it. The content within this pool may be duplicated, outdated or unused. In short, the enterprise has no idea of the extent of the content or information about the attributes of the content.

Unmanaged content may be an obstacle for personalization. In order to deliver personalized content or filtered content the system must know what content exists and the attributes of this content. A content catalog 10100 or content management system should be used to manage the enterprise's content. A simple definition of a content catalog is given below.

Figure 101:
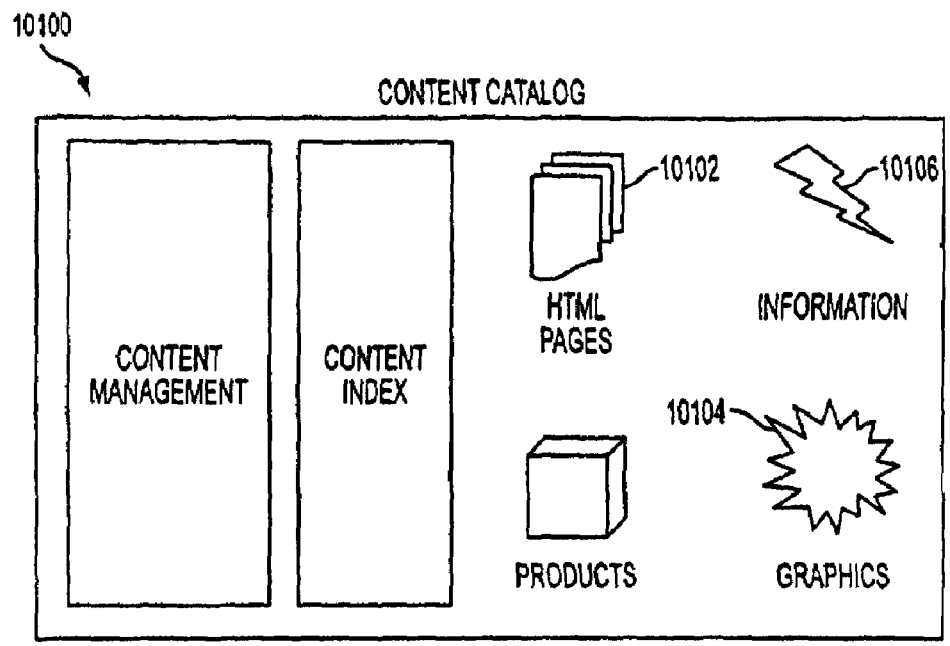
FIG. 101 illustrates a content catalog that can be used to manage an enterprise's content.

What is deemed as content can take many forms. As illustrated in FIG. 101, content may be Web pages (HTML pages) 10102, graphics (images) 10104, audio, video, or even information 10106 and messages. How this content is stored may also take many forms; it may be stored in table, files or directories. The content catalog needs to be aware of what content exists and where it is stored. This can be achieved by retaining attributes of the content and providing indexing to the content. Content attributes might be physical properties such as what type of content it is (HTML page, graphic, audio file, video file or textual message) or the size of the content. The difficulty is attempting to store the heuristic or analytical attributes and making these attributes available for personalization techniques. The indexing strategy should include full text and attribute indexing which provides efficient access for the enterprise's users and potentially any integrated members of the enterprise's value chain.

Matching Logic 9716

This personalization component needs to provide the intelligence to match the user's profile attributes with the correct content and deliver this content to the user. Bridging the profile information to the content is truly the heart of the personalization architecture. A variety of different approaches can be implemented to accomplish this task. The complexity of this matching logic is directly proportional to how flexible, robust and dynamic the personalization aspects of the site are.

The Match concept is the process of analyzing the information that is known about the user and determining the correct content to display to them. Once the user profile attributes have been identified, they must be applied against the rules or matching logic defined within the site in order to determine the appropriate content to display. Three inputs are required in order to complete the Match process:

User Profile Information—This information consists of what is known about the user. The processes used to gather this information are explained earlier in this section.

Content Available—The content on the system includes any information displayed to the user. In this case, content includes; Images, Text, Personalized Statements, Applets, and Digital Information.

System Defined Rules or Matching Logic—In order to use the user profile information effectively, one must have a clear set of rules defined against which to evaluate each user. The rules are defined to match the user information with the content A simple example of this matching logic is a defined query. The site may provide the logic for a user to view their account information. In this case the profile information is their user ID or account number, the rule is the defined query (SELECT account_info FROM Account where Acct_Id=: User_Acct_Id) and the content is the user's account information stored in Account table. If the content is stored in a relational or object database, SQL queries are an effective method of accessing this data. In this case the 'defined rule' takes the form of a SQL statement. Unfortunately, most of the content is not stored in relational databases or is not directly related to something as simple as a user's account ID. Instead the content is web pages or massive amounts of news feeds and textual information. These situations require a different and possibly more complex approach and infrastructure to perform the matching logic. In this environment, the rules are usually composed of Personalization Matching Factors (PMFs).

Personalization Matching Factor (PMFs)

A Personalization Matching Factor (PMF) is the building block for a rule. It is the information required to perform the matching aspect of the personalization process. This is the demographic/psychographic/sociographic or any other information that will be needed to drive the personalization process. A PMF might be as simple as the user's gender or a complex attribute such as driver type that is derived from a group of data. Included in the definition of the PMF should be the definition necessary to create it.

Developing PMFs will require involvement of the Marketing department and other business entities that understand the customer strategy and the enterprise's customers. It is important to understand the customer needs, what the customer expects, and what makes a difference to them when determining and creating PMFs.

PMFs should be restricted to information that can be realistically captured by the site as well as information that is reliable and accurate. Conceptually, a PMF can be any piece of derived or any conceived information. For example, a PMF could be the user's gender, age, marital status, number of children, the number of years they have been a customer, their profession, driving record, interests such as sports, travel or other leisure activities, favorite color, a personality trait such as if they are detail oriented or pessimistic in nature, or any otherdemographic/psychographic/ sociographic piece of information. How would this information be captured? What are the attributes that would be used to derive this? What is the accuracy of this information? Why is this PMF used to personalize? These are the types of questions that need to be asked when determining possible PMFs.

A PMF needs to have a clear definition and a finite list of possibilities. For example, a site may create a PMF called 'Age Classification'. The site would need to define what it means by the PMF 'Age Classification'. For this example, age classification is simple a logical group of users based on their age. The values would be:

| Age | Age Classification |
|---|---|
| 0–12 | Child |
| 13–19 | Teenager |
| 20–40 | Young Adult |
| 41–64 | Middle Aged |
| 65–125 | Senior Citizen |
| 125–200 | Ancient |

A PMF may also be a combination of low level data. If a PMF of 'Insurance Risk' were created, the required data would be far more than age. It would need to include age, driving history, vehicle, region and potentially other data.

Rules and Matching Logic

The PMFs are the building blocks for rules and matching logic. Unlike SQL extensions, there is no industry standard method for accessing 'Web' content and creating rules. Some approaches are detailed below.

Simple Conditional Rules—The simplest process is to define a clear-cut set of rules against which to evaluate the PMFs. These rules are generally simple and have only a few conditions to evaluate. A simple rule would follow this structure:

$$\text{User Variable} + \text{Comparison Operator} +$$

$$\text{Predetermined Value (or PMF)}$$

$$\text{Age} = \text{Young Adult (20–40)}$$

The user variable is a specific user's profile attribute or value for the rule's PMF. In this case it is the user's age which may be derived from the user's birth date and the current date. The next element in the structure is a comparison operator. The final element is the PMF or the group or data the rule is based on. Based on the user's age and the granularity of the PMF the rule may have numerous results. Each result may point to a different set of defined content. The entire age rule may be something like this:

$$\text{User's age} = \text{Child } (<12) \quad \text{deliver content } ABC$$

$$= \text{Teenager (13–19)} \quad \text{deliver content } DEF$$

$$= \text{Young Adult (20–40)} \quad \text{deliver content } GHI$$

$$= \text{Middle Age (41–64)} \quad \text{deliver content } JKL$$

$$= \text{Senior } (>64) \quad \text{deliver content } MNO$$

A rule will be made more complex with the addition of a logical operator that allows a rule to have multiple PMFs. For example a rule may simply be 'AND' multiple PMFs together. In this example, the rule would look like this:

> User Variable $A$ + Comparison Operator + Predetermined Value (or PMF) $A$
>
> AND
>
> User Variable $B$ + Comparison Operator + Predetermined Value (or PMF) $B$ A piece of the actual rule would look like:

> Age = Young Adult (20–40)
>
> AND Gender = M (Male)

This rule would now be the age-gender rule. It evaluates the user's age classification and gender. If the users age classification is 'Young Adult' and male, then statement evaluates to be true and action is taken or the specified content is delivered.

At first glance, this may appear to be hard coded. If directly placed in a script this would be a true statement. Instead, the infrastructure should be created that can define rules, evaluate rules, assign a rule to a dynamic content area or page, and assign content to specific rule results. Instead of hard coding this with in the application or script, the rule component or dynamic content area (DCA) is placed in the script. When the DCA is encountered, the architecture handles evaluating the rule and matching the defined profile attributes to the rule in order to deliver the appropriate content.

Conceptually this is easy, but creating this infrastructure is very difficult. For this reason a rule engine or personalization vendor will be brought in. Numerous independent software vendors (ISVs) are capitalizing on this niche and creating their own proprietary personalization infrastructure. These vendors are covered in more detail in the accompanying Vendor document.

Forward Chaining Rules—Forward chaining still uses the fundamentals of simple rules, but facilitates building upon whatever user information may be available at the time. In this case, if only a small amount of information about the user is available, then the rules are determined based only upon that data. Once more information is gathered, the rules allow for more complex conditions to be evaluated against. The rules are set similar to this:

> User Variable + Comparison Operator + Predetermined Value (or PMF)
>
> AND if the following is known
>
> User Variable + Comparison Operator + Predetermined Value (or PMF)
>
> Age = 20–40
>
> AND if
>
> Gender is known to be = M The above rule will be evaluated differently according to the amount of information known about the user. For instance, If all that is known about the user is his/her age the rule will evaluate in one way, if his/her gender is known, then the rule will be evaluated in another way.

Learning System (Neural Network)—The premise behind the learning system is that it will monitor the user's actions and perform differently depending upon what the system learns from the user actions. This technique is a complex combination of rules and relationships using the user's interactions with the site to increase the knowledge of the enterprise about the customer. The best way to describe this is with a definition of neural networks. A neural network is a system of programs and data structures approximating the operation of the human brain. Typically, a neural network is initially "trained" or fed large amounts of data and rules about data relationships (for example, A grandfather is older than a person's father is). A program can then instruct the network how to behave in response to an external stimulus, or it can initiate activity on its own based on the user's actions.

Inductive reasoning/Collaborative Filtering—Firefly defines collaborative filtering as a technology that emulate the social processes of people making recommendations based on an understanding of one another's preferences. Individual agents track and choose items based on individuals' tastes and preferences.

The core technology personalizes both the delivery of content and the knowledge of related people within a defined networked environment, or "taste space." Firefly tools correlate individual users' preferences for specific items based on either explicit or implicit ratings of comparable items in other situations. These ratings may be stored entirely within a single Web site or compiled on the fly from information assembled from individual clients and shared servers.

Collaborative Filtering assesses a single set of user preferences to identify an individual community of interest. Collaborative Filtering correlates the tastes on an individual user with the preferences of comparable users to develop a list of personalized recommendations. It is some times referred to as People-to-people matching, and is aimed at automating word-of-mouth kind of information.

Canned Queries—A system of canned queries allows the user to choose only certain actions that have been pre-determined for the user. The queries only give the user the options listed, and do not change over time.

The examples above are mainly site controlled. The site either has a pre-defined rule or matching logic that will execute. The site is responsible for determining what has been learned from the interaction, what is enabled based on the knowledge gained, what additional information will provide additional insight. Where possible, the users should be allowed to define the rules and matching logic or the content they wish to view. Provide the user the structure to create a rule or define a query.

Defining legitimate business rules and models is as important as the infrastructure to evaluate them. The rule may execute and content may be delivered but if the rule doesn't make good business sense the effort is wasted. Business and marketing personnel should be involved in defining the rules and verifying that they are correctly translated and technically implemented. This is another reason that the personalization team should include individuals from IT, the business and marking departments. The team needs to understand their existing and potential customer, the content available, and when and why to display it.

Merge and Deliver Content 9718

The rules for matching logic should be defined as stand alone entities so that they may be reused in multiple situations. Each situation may associate the same rule to a different interaction and a different set of content. The matching logic should be associated with a template or interaction and content should be associated with a rule result or condition of the matching logic.

One possible method of associating a rule and content to an interaction is by using a Dynamic Content Area (DCA). A DCA is embedded with a template and points to a specific rule, and a rule results set will be associated with specific content. For example a page may be explaining a particular service to a current user. The site may wish to display on the page a graphic that the user can relate to along with a list of benefits that are personalized to the user and finally list discounts that the user might be qualified for.

Figure 102:
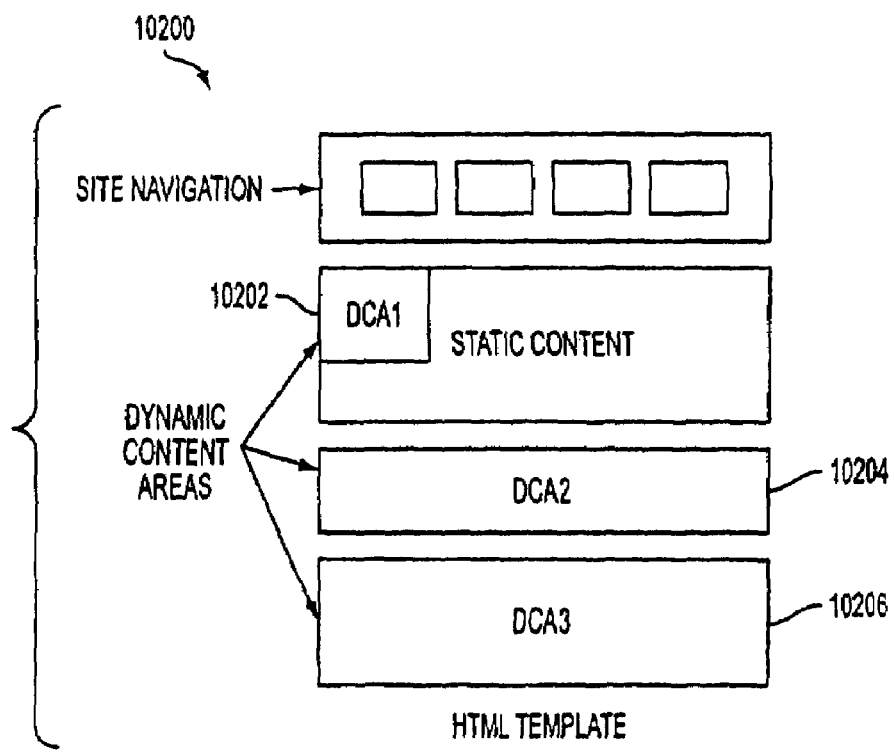
FIG. 102 illustrates an exemplary template with three Dynamic Content Areas (DCAs) embedded within the template in accordance with a method of associating a rule and content to an interaction.

A separate DCA would be used for each set of data. FIG. 102 illustrates an exemplary template 10200 with three DCAs embedded within the template.

DCA1 10202 might be a place holder for the graphic. The rule associated with DCA might be bases on a set of PMFs such as Age and Gender. Depending on how the rule is evaluated, a different graphic might be displayed. (In this case a graphic is the content.)

DCA2 10204 might represent a place holder for a list of benefits the user may receive from the service. This rule may be associated with different PMFs. For example, the PMFs for this rule might be marital status, number and ages of children and income level. Different benefits would be displayed based on how this rule is evaluated. In this case a textual statement about benefits is considered the content.

DCA3 10206 might represent a place holder for discounts. This area may reuse the rule created for DCA 2 but the content is different. In this case, the content is a list of discount based on the rule evaluation.

During the design of the site, a decision must be made to determine which areas of the site will provide personalized content to the user, the rules to use and matching logic associated with it, and what content should be displayed for each rule result. Since there is no face-to-face interaction with the user, identifying the content to use is very important. The web site must make the users feel as though they are being communicated directly. Once the page is requested or encountered by the user, the page is generated, and each DCA will request that a rule be executed and the content should be generated according to the user profile.

The normal delivery method of the content is through the use of HTTP. This method will be used to deliver the majority of the content. There are other methods of delivery that may be considered depending upon the content to be delivered. Other delivery methods includes e-mail, FTP, Push or Channels and streaming video. Since timing of the delivery is very important, consideration must be given to developing a method of delivery that provides the most impact to the user and does so in a timely manner.

Administration 9720

Personalization is difficult for a number of reasons, but the biggest "gotcha" is that, above all, it requires dedicated maintenance staff. While much of the process of personalization can be automated, the construction of the business rules used to match content to visitors and the creation of the metadata tags required to classify all content still require a tremendous amount of human oversight. The need for such oversight is only compounded by the fact that personalization becomes exponentially more complex as the number of visitors and amount of available content increases. The net result is that firms that decide to engage in personalization without ramping up staff adequately will fail.

Personalization is a continuous process. It is not an application that is delivered and then left unmonitored or forgotten about. Personalization techniques will need to be added, removed and modified. Rules, content, and messages will change. Most enterprises fail to measure their return on investments, or to directly attribute customer behavior to certain initiatives. As a result, the enterprise often invests in initiatives, promotions and campaigns without understanding how they will affect product or customer profitability. Procedures, measurement and reporting devices, and metrics need to be created to allow for the enterprise to evaluate and improve their personalized interactions and deliver their customer strategy. The site may provide the customer a chance to make a purchasing decision. If they decide not to make this purchase, what is the reason why? The enterprise should attempt to gather information on why this result occurs and seek to prevent it in the future. The following optimization and administration components should be considered for a personalized site:

Content Rating and User Feedback. Allow the users to directly rate the interaction and the content. The Internet is an interactive medium, but unlike a face to face interaction one can not read the user's face or inflections in their voice to determine if their needs are being met. This type of feedback needs to be built into the site. The interface should be simple where the user can provide feedback with a single click.

Metrics Return On Investment/Information. How can one determine if the personalization process is helping the enterprise? Metrics should be defined to measure the ROI. This might include reporting facilities to capture the information needed to provide these metrics.

Administration Facilities. When designing a personalization site, maintenance of the rules and content should be considered. The people most likely driving this information will not be technology oriented, and may require simple interfaces for altering rules for personalized content. An IS staff member should not be needed to change rules. The same holds true for content. As content is added, this information will need to be indexed and integrated with the search technology implemented at the site.

Interactive Marketing 9702

With the emergence of interactive mediums and the inherent capability to gather real time information about the customer interacting with the medium, enterprise's marketing strategies and systems are becoming more customer-centric. With the move from mass (or targeted) marketing to a form of customer-centric marketing, enterprises must evaluate their customer relationship model.

Traditionally, marketing models tended to focus exclusively on customer acquisition (mass marketing) and then on customer selection (micromarketing and target marketing). However, several studies have shown it costs between four and 10 times as much to acquire a profitable customer as it does to retain one. This awareness has resulted in a heightened emphasis on customer retention and extension and has been the driving force of relationship marketing.

However, customer retention and extension are less dependent on traditional marketing and are more tied to the value perceived by the customer during every interaction with the enterprise. In addition, these strategies require a different marketing infrastructure that is information- and customer-driven, rather than product- and creative-driven. Thus, relationship marketing is somewhat of a misnomer, as adding value to the customer relationship is not simply a marketing challenge, but rather a challenge involving every function within the enterprise. This business model calls for enterprises to differentiate themselves by consistently providing superior service at every point of contact with the customer.

The ShARE Model

Figure 103:
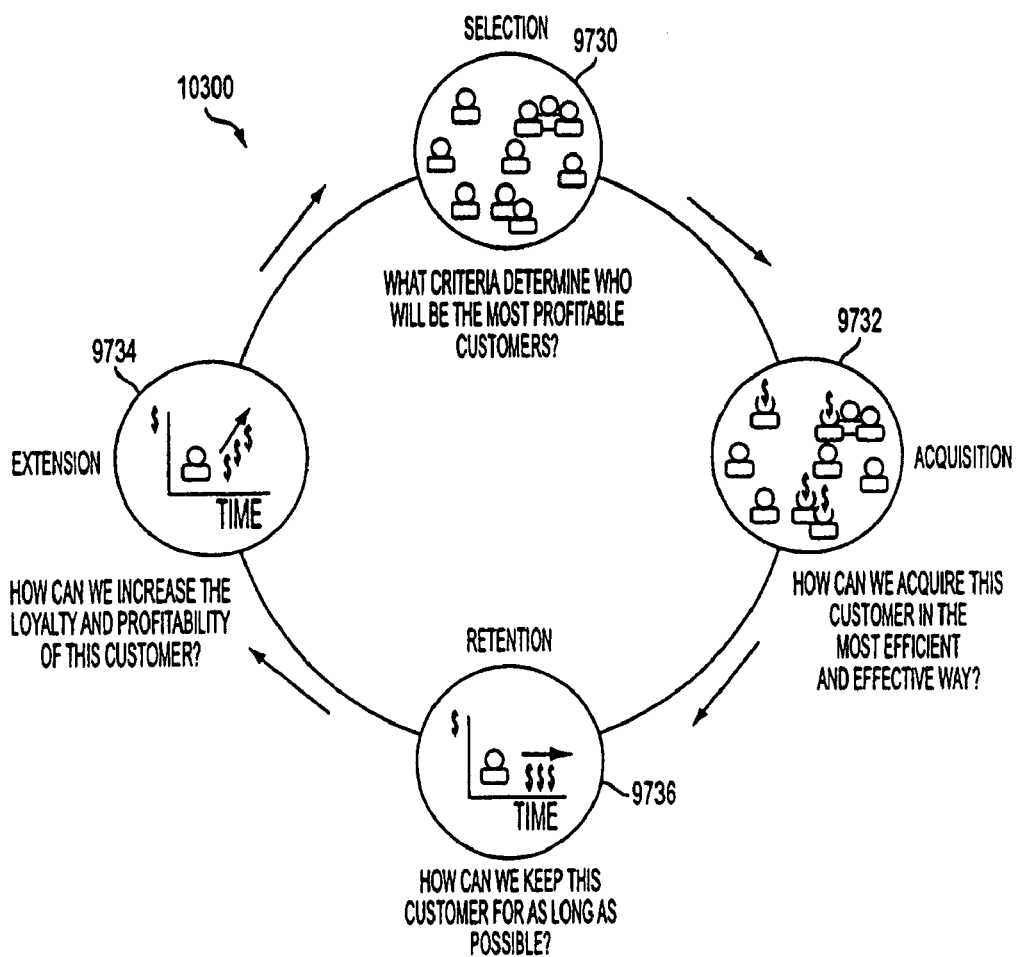
FIG. 103 depicts a ShARE (Selection, Acquisition, Retention, and Extension) customer relationship model which addresses the changes in a shift to interactive marketing.

The ShARE (Selection 9730, Acquisition 9732, Retention 9736, and Extension 9734) customer relationship model 10300 is detailed in FIG. 103. See also FIG. 97. This model addresses the changes in the shift to interactive marketing. Due to the emergence of interactive mediums, today's systems now have the ability to address all areas of the ShARE model.

Selection 9730

The selection portion of the ShARE model deals with determining who within the general population will be a company's most profitable customers. Selection deals with determining who makes up a product's target audience, and allows a company to focus their attention more accurately. This is the area where demographic information, such as age, geography, and income are applied to produce a more finite list of likely customers. The selection process allows businesses to make strategic decisions such as NOT to market a snow shovel in Ecuador.

Acquisition 9732

Acquisition focuses on getting a potential customer to use one's service or buy one's product in the most efficient way. This area has traditionally focused on mass marketing and measuring a business' cost per thousands of consumers reached. The classic example of acquisition is Proctor & Gamble's use of daytime television dramas in the United States to sell soap, creating what is now called the soap opera. Other methods of acquisition include direct mailings, telephone solicitation, toll free order numbers, and, more recently, Internet advertising and online businesses.

Advertising

Capitalizing on the two-way interaction and an audience of the general public, advertising is often utilized on applications deployed on the Internet. In a browser-based implementation, the use of frames or banners creates the possibility to dedicate a section of the display to advertising. With most of marketing capabilities, the advertising model (services) can vary from simple static advertisements to a robust advertising integrated with the personalized system. The implementation methods may range from an advertisement Applet to advertising services integrated with the personalization system. Detailed below are possible services included in a complex advertising implementation.

Storage. Storage of the advertising content should be performed in the same fashion as the product and electronic merchandising content. The content should be so it integrates well with the personalization services and user profiles.

Integration with Personalization. Ideally, the personalization services are separated and can be utilized by multiple applications. For personalized advertising, profile information will be gathered and the advertising content filtered based on the profiles. A separate process will handle the merging and delivery of the content as well as changing the advertisements as the user navigates through the site. The advertising content may include rich content such as graphics and video.

Buy Now Services. Microsoft and others are currently working on technology to allow a user to click on the advertisement and purchase the item without leaving the site. These technologies are emerging and may require a client-side wallet to perform the transaction. The push is to provide the ability to quickly purchase items of interest without leaving the site of interest to make the purchase. Microsoft currently provides this ability using an ActiveX control integrated with a Microsoft wallet. Others are sure to follow this trend.

Usage Metering and Reconciliation. There are different methods for billing for advertising space. The most common billing methods are usage which may include: the number of times displayed, the length the add is displayed or the number of users to which the ad is displayed. Services are needed to record the usage information in order to reconcile with the advertisement providers. Since many sites are funded by ad revenue, the accuracy of these services is crucial.

As online advertising and its supporting technology matures, new advertising methods will emerge. For example, the use of 'intermercial' (sometimes referred to as interstitial—meaning intertwined) ads that automatically pop up between pages may prove to be the next method of choice. It is important to ensure the advertising services remain flexible and are able to address the evolving technology used to implement advertising.

Retention 9736

Now that companies know it is cheaper to hang on to existing customers than to find new ones, more and more emphasis is being placed on customer retention. Retention focuses on keeping customers for as long as possible. The most effective way to do this, is to provide excellent customer service at each and every interaction with the customer. Since electronic business don't provide traditional customer service, it is important web-based businesses have sites with appropriate support functionality. The support should be easy to use, and meet the specific needs of that product's consumers.

Recommendation Services

Recommendation functions may take up multiple formats. The most common format are simple services to allow the site's users to provide direct feedback, positive or negative, and recommendations about the content or products on the site. By providing these services, the site may create a community where users can interact with each other, furthering the site's worth. For example, a site could allow for users to submit book reviews. The information is then available for consumption by the general public. While the technology to implement this is rather simple, the process may prove to be a little more complex. The process includes receiving input, reviewing recommendations, filtering and approving content, and then posting the review or recommendations. The lack of a filtration or review process could be devastating to a site.

Another type of recommendation service makes suggestions to its user base. These services can range from simple to complex. A more complex recommendation service may utilize collaborative filtering. Collaborative filtering is the technique of using content or product ratings from the site's user base to predict the interest other potential users will have in the content or products. Correlation algorithms use the profile information, history, and/or input preferences to construct a correlation group of users whose ratings are effective predictors for the new user. Prediction algorithms then use the ratings and profile information of the users to make predictions of the content they most likely will find interesting. (Note: The collaborative filtering technique could be implemented within the personalization system.)

Site Announcements and Event Reminders

Additional relationship building techniques are site announcements and reminders. The underlying services are again personalized. The site has created content which may range from new product announcements based on the customer's last visit or reminders of an upcoming event important to the specific customer. For example, an event reminder could point out an upcoming wedding, personal anniversary or holiday. The user, once reminded, may then utilize the site to act on the event. If the site implements complex event reminders, additional services may be needed to provide calendar and scheduling functionality. These services may also be incorporated with the off-site subscription services to provide reminders to users not logged into the site.

Loyalty and Return Customer Programs

Creating an environment that promotes customers to return to the site is critical for the longevity of the site. Many of the seller-centric implementations will utilize membership services and other incentive programs to try and promote customers to return. For example, site members would receive discounts and additional privileges, thus building a better relationship with the site. Incentives like frequent shopper points or access to member only information are other common methods. The loyalty programs may require additional logic for permissions and content filtering. Most of this may be implemented by gathering and using profiles and integration with a complex personalization system.

Return Programs are services geared toward enticing the customer to return to the site. The Internet eliminates two main factors affecting customer loyalty. The first is proximity. In the brick and mortar medium, customers tend to shop (or browse) close to where they live or work. The second factor is time or how long a store is open. With the Internet being 7 by 24 and geographically independent, these items are no longer relevant. For this reason, considerable effort may be geared toward creating return programs. The most common forms are electronic version of current methods, although they may be more effective due to personalization and real-time delivery.

Push and Off-Site Subscription Services

This section includes merchandising using email to push information to a user. (Note: Subscriptions to sites and information are covered in the Order Processing—Fulfillment component.) Many of the common services for storage, filtering, formatting and approving content would be utilized. Additional services would be needed to push the content to the desired mailing list. Details and considerations for using push technology is included in application discussing the Netcentric Framework, referenced above. Below are some basic services.

Subscription Management. Due to the Internet community frowning on junk email and spamming, most sites have distributed their push marketing using a subscription-oriented approach. Services should be provided to allow users to subscribe and un-subscribe from the site marketing distributions.

Distribution Management. As the user base of the site grows, the actual distribution mechanism needs to be robust enough to scale to handle the growing user base. Methods of distributing the information in a fashion that does not impact the already increasing network traffic should be researched.

Extension 9734

Extension asks businesses to answer the question, "How can one increase the loyalty and profitability of this customer?"

Cross Selling and Up Selling

Cross Selling and Up Selling are similar to recommendation services. Cross selling uses some knowledge of the consumer to suggest complimentary or similar products in which the consumer may be interested— "Would you like fries with that?" Up selling is an effort to sell more of the same thing, or a better version of what the consumer may currently be considering— "Would you like that Super Sized?"

Cross selling and up selling are considered an application or service enabled by complex personalization. Although very important from a marketing perspective, once the underlying services for complex personalization are in place, many of the demand generating applications are now possible. Cross selling or up selling could be implemented by product relationships in a database.

Maintenance and Administration 9008

Figure 104:
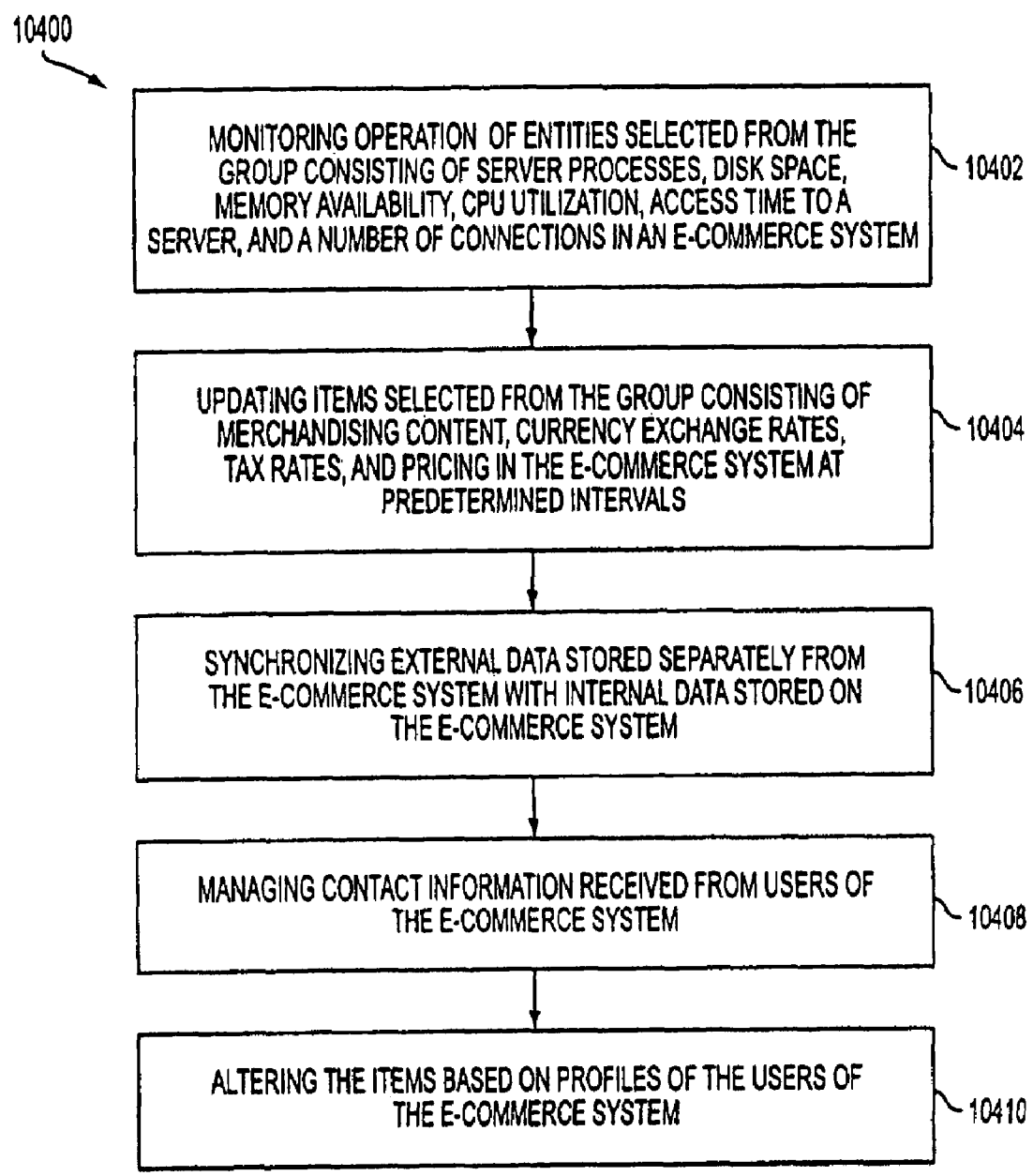
FIG. 104 illustrates a flowchart for a method for administrating an e-Commerce system on a network in accordance with an embodiment of the present invention.

FIG. 104 illustrates a flowchart for a method 10400 for administrating an e-Commerce system on a network. Operation of entities is monitored in operation 10402. Entities include server processes, disk space, memory availability, CPU utilization, access time to a server, and/or a number of connections in an e-Commerce system. In operation 10404, items including merchandising content, currency exchange rates, tax rates, and/or pricing in the e-Commerce system are updated at predetermined intervals. In addition, external data stored separately from the e-Commerce system is synchronized in operation 10406 with internal data stored on the e-Commerce system. Contact information received from users of the e-Commerce system is also managed in operation 10408. The items are altered based on profiles of the users of the e-Commerce system in operation 10410.

One of the items altered based on the profiles of the users may include price, which may be altered to reflect a discount assigned to the user. A search may also be performed for the internal data in the e-Commerce system prior to the synchronization of the external data.

As an option, load balancing services may also be performed that initiate and stop processes as utilization levels vary in the e-Commerce system. As another option, managing of the contact information may further include tracking responses to the users of the e-Commerce system.

Figure 105:
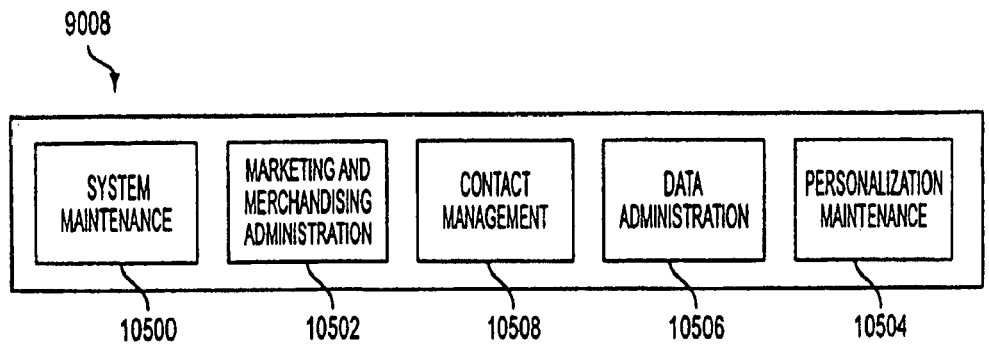
FIG. 105 illustrates components of the maintenance and administration portion of the of the eCommerce Application Framework in accordance with one embodiment of the present invention.

As with any system, a support, administration, and maintenance facility and procedures need to be put in place to remain operational as well as efficient. In general, packaged implementations will only provide minimal maintenance and administration facilities leaving the bulk of the burden to the integrator. The underlying technology for the facilities may be basic batch download/uploads, simple server processes and applications or even browser based. It is important to understand the system administration and maintenance needs, develop a plan, and stick with it. Some of the areas to consider are listed below. FIG. 105 illustrates high-level concepts of maintenance and administration of the framework.

System Monitoring Facilities 10500

The health of a system can be easily maintained by putting in place monitoring facilities and procedures for capturing the system's electronic vital signs. Far too often the users of a system are the first to know of system problems while the administrators are the last to know. This can be prevented by creating automated monitoring facilities for server processes, disk space, memory, CPU utilization, access time, number of connections, and other electronic vital signs. The complexity of these facilities is open for debate. In addition to online monitoring facilities, robust logging, audit trails, and archiving capabilities should be included. These will aid in analysis and forecasting of system needs.

System Administration

The term system administration is a vague term used to categorize the actions needed to support a system. This may include starting, stopping, or restarting servers or processes, scheduling backups and loads of databases or files, recovery procedures or anything else needed to maintain the system. Traditional system administration also includes updates to system software, packages, and operating systems. Listed below are additional system administration considerations an eCommerce system may encounter.

Merchandise Administration 10502

The merchandising aspect may introduce additional administration and maintenance. Procedures should be put in place to handle sold out merchandise and back order items. Updating merchandising content, currency, tax, and pricing may need to be performed on a regular basis. The merchandise administration facility should be able to handle pricing and discount items and have the ability to allow automatic updating and manual override capabilities for authorized administrators.

Personalization Maintenance Facility 10504

The biggest challenges in personalization are determining matching rules for the business's market plans, categorization of the profiles, gathering profile information, and then developing robust content with adequate content indexing. Once these have been established, they should be easily maintained. When designing the personalization services, maintenance of the rules and content should be considered. The people most likely driving this information will not be technology oriented, and may require simple interfaces for altering rules for marketing, advertising, or other personalized content.

Content Administration

As content is added, this information will need to be indexed and integrated with the search technology implemented at the site. Other items such as customer service chat discussions or review would also need to be purged on a regular basis.

Data Administration 10506

Many times, utilizing packages to implement an eCommerce solution will introduce a proprietary data model for customer and product information. In order to make this information accessible to the rest of the organization, the information will need to be synchronized with the enterprise data. Services may be required to determine changes and synchronize the data. This would be true for any information the site gathers not integrated into the enterprise data.

Load Balancing

In addition to the monitoring and maintenance facilities, services should be considered to stabilize performance. Providing the system is scalable, load balancing services would aid in initiating and stopping extra processes as utilization levels vary. Processes could be started to handle additional requests during peek periods providing the user with a consistent level of performance. This is extremely important in periods of peak usage. A good example is the fluctuation of the average response times of some of the current electronic trading systems during market surges. Times during a market surge were 2–3 minutes above their average 6–10 second response time.

Contact Maintenance 10508

Internet users are quick to point out mistakes and opinions for improvements. Sites will receive sporadic emails from users experiencing a variety of emotions about the site. Users may sour quickly if actions are not taken or noted to items pointed out. Responses to user feedback should be monitored to ensure that each message from a user is responded to in some manner.

Maintenance and Administration of the system is often wrongfully overlooked. It is a key component in improving customer satisfaction and building customer relationships. Having robust maintenance and administration facilities should increase the system's overall stability by reducing the time and cost to identify and fix issues, automating processes, and enabling system administers.

Implementation Considerations

Information Staging

The ability to deliver new products and information may be critical to stay ahead or match the competition. The speed at which the information can be updated and migrated to production is critical. Be sure to understand the relationship between the content changes and the correct procedures to migrate the changes to the production system. The ability to maintain and grow the site may prove to be key factors in the site's success.

In most cases, a content staging process should be put in place. In the simplest format, the procedures for modifying and adding content, testing, validation of content and subject matter, authorization and migration to production should be documented.

Order Processing 1010

Figure 106:
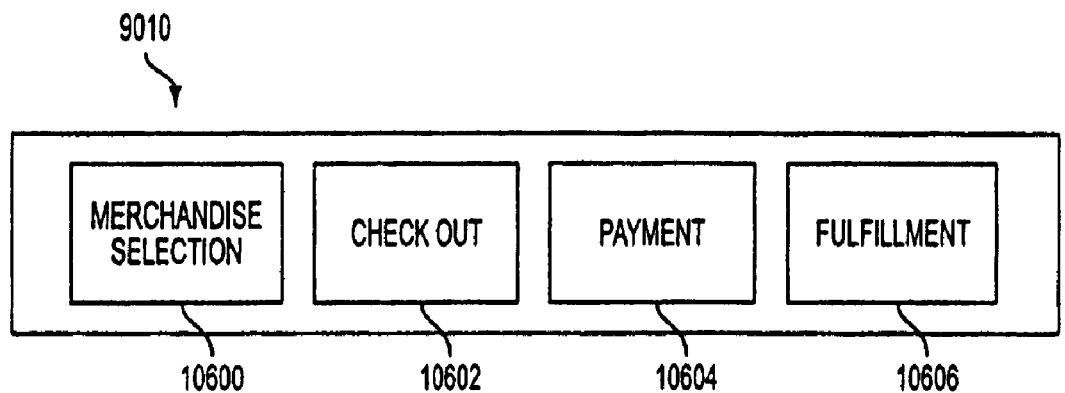
FIG. 106 illustrates the Order Processing portion of the eCommerce Application Framework of the present invention.

FIG. 106 illustrates the Order Processing portion 9010 of the eCommerce Application Framework 9000. Subsections include Merchandise Selection 10600, Check Out 10602, Payment 10604, and Fulfillment 10606.

Figure 107:
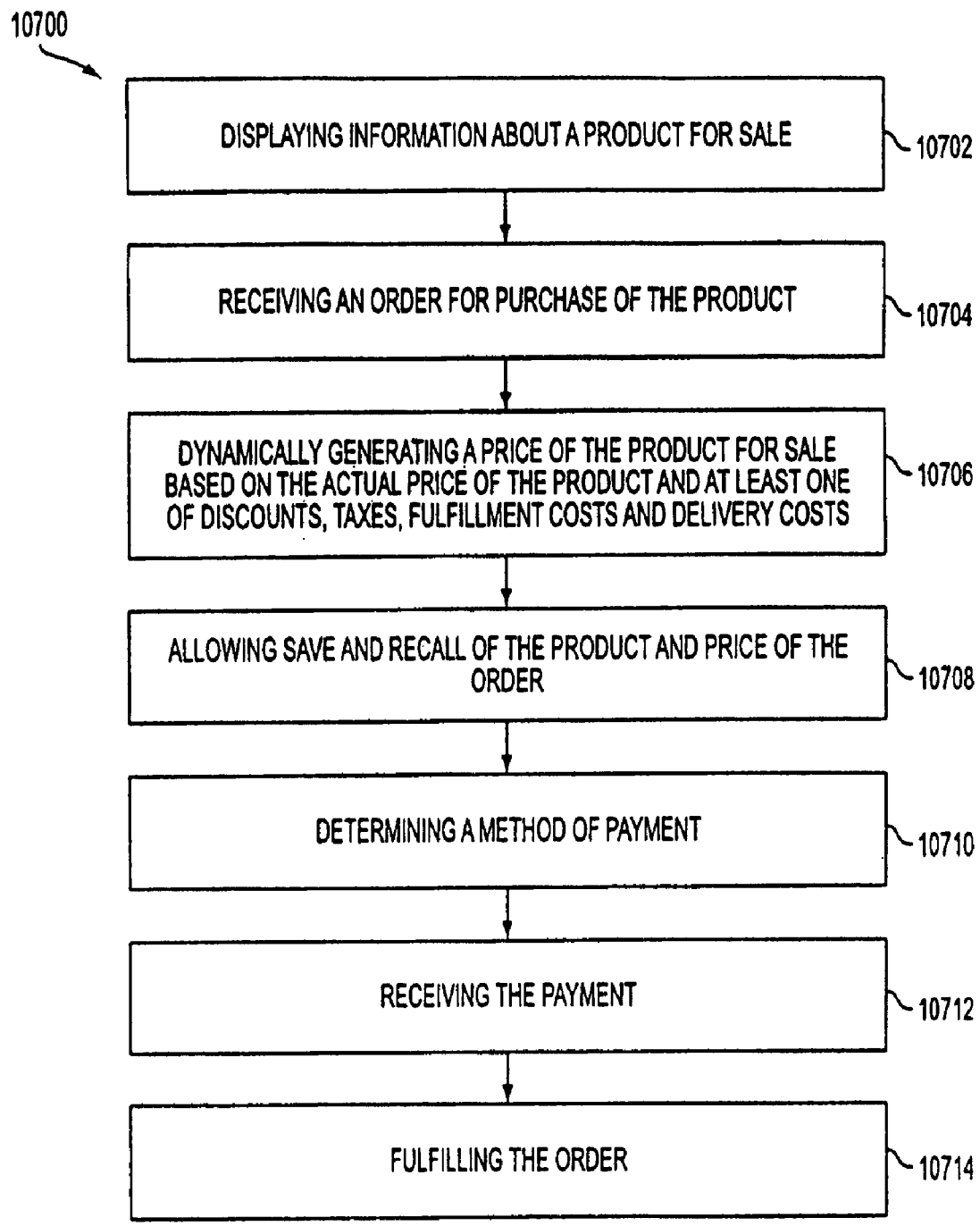
FIG. 107 illustrates a flowchart for a method for completing a transaction over a network in accordance with an embodiment of the present invention.

FIG. 107 illustrates a flowchart for a method 10700 for completing a transaction over a network. Information is displayed information about a product for sale in operation 10702. Upon receiving an order for purchase of the product in operation 10704, a price of the product for sale is dynamically generated in operation 10706 based on the actual price of the product and discounts, taxes, fulfillment costs and/or delivery costs. Save and recall of the product and price of the order are also allowed in operation 10708. A method of payment is determined in operation 10710. When payment is received, the order is fulfilled (see operations 10712 and 10714).

A medium for receiving the payment may be via credit based payment, debit based payment, and/or electronic cash. Additionally, verification of export restrictions with respect to a selected product may also be allowed.

As an option, the ability to review, update, and cancel the order at any time may be allowed. As another option, electronic rights may also be managed. In even a further option, order tracking information about a status of the order may also be provided.

Allowing customers the ability to not just browse and interact but complete the purchased is crucial for a successful eCommerce solution. This section includes many of the capabilities needed to negotiate and perform the entire transaction. The transaction begins when the user takes action to purchase the item(s). From a seller-centric view, the transaction is initiated once the 'purchase' button is selected. The 'buy transaction' may include sub-transactions such as totaling, payment selection, inventory management and purchase authorization.

It is important to recognize some commerce packages specialize in the transaction processing portion of an eCommerce solution. For example, Open Market's OM-Transact, does not provide a catalog interface or any of the infrastructure for interaction with the potential customer. Instead, it will provide an interface for communicating with its transactional infrastructure.

Figure 108:
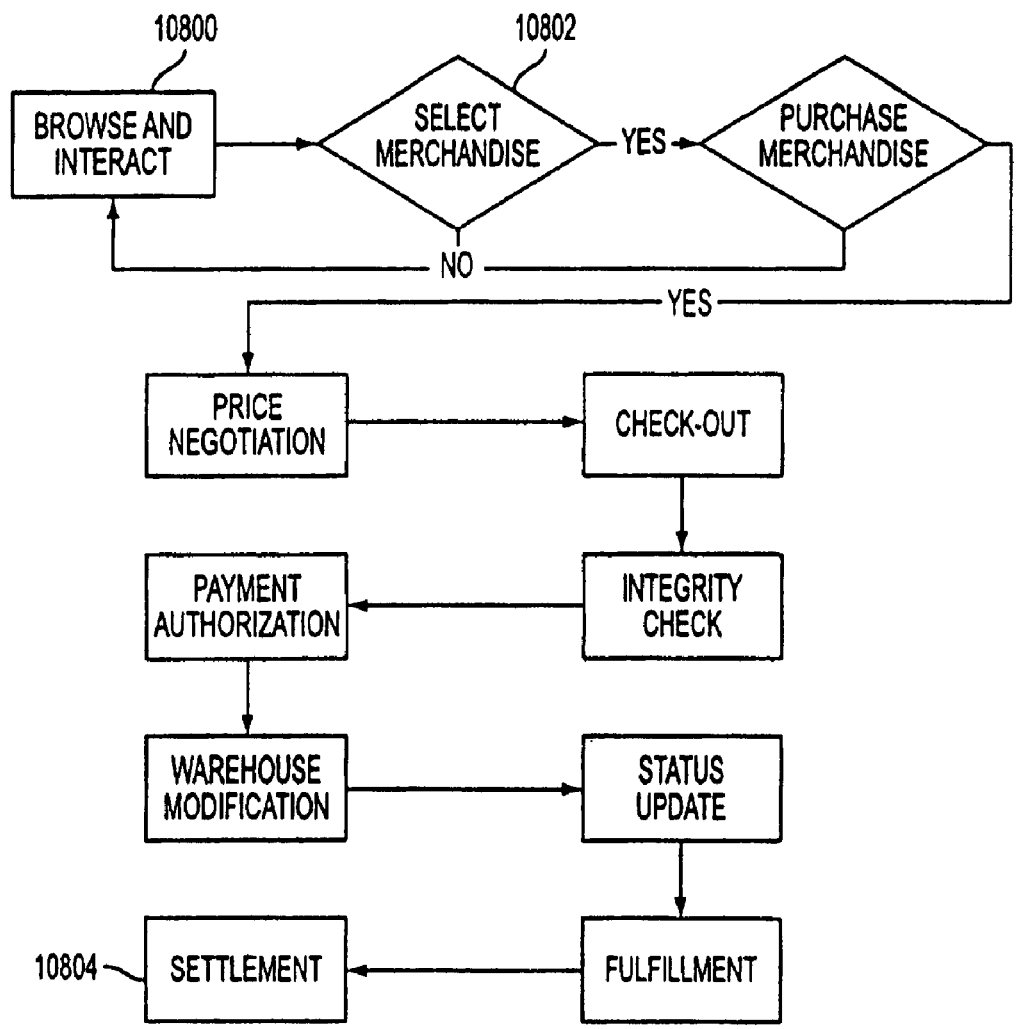
FIG. 108 depicts an example flow of business capabilities needed for complete order processing on an eCommerce implementation.

Each implementation will require specific flow and business logic. The commerce packages available today provide generic order processing business capabilities that will need to be customized to achieve the specific needs of the business. Illustrated in FIG. 108 is an example flow of business capabilities needed for complete order processing on an eCommerce implementation. The process begins with operation 10800 which allows browsing and interacting in order to permit selection of merchandise in operation 10802. The process ends in operation 10804 with settlement.

Merchandise Selection 10600

Some sort of merchandise collection facility is needed. All items of interest should be gathered and organized so they can be reviewed prior to purchase. The most common approaches are an order form or a metaphor such as a shopping cart or basket.

Shopping Cart Metaphor—The user is enabled to select items and add them to his online shopping cart. The items selected will be tracked. The user has the ability to add or remove items, review item details, and check out and total the items. In addition, the shopping cart should allow the user to exit and reenter the store without losing the items he has selected.

Independent of the medium, the following capabilities should be considered:

Order list and information should be consistent with the merchandising mechanism. If possible, display the merchandise in the same format so it is as appealing as when they order it.

The customer should be able to save and recall items, pricing, and other order details for the current and previous orders.

Allow for additional sales and impulse buying. The checkout process is ideal for cross selling or any other form of impulse buying. These capabilities should be integrated to the merchandise selection facility.

Allow for the ability to review, update or even cancel the order at any point of the selection purchasing flow. The customer should not feel confined or forced to make the purchase.

Check Out 10602

The check out phase begins once the user has decided to purchase or order the items gathered. A variety of capabilities may be required or may affect this process. Listed below are some of the services to consider during the check out processing.

Price Verification

Given the geographically independent environment and multitude of potential customer relationships, many factors may affect the actual pricing. The first step in the transaction is determining the price. The price in most cases will be dynamically generated based on the actual price of the items, taxes, fulfillment or delivery costs, and any other item affecting the price. Ideally, product prices, shipping and handling charges and other charges should be maintained separately. This functionality should include the ability to handle tax-exempt customers and transactions. Sales tax and value added tax logging and auditing capabilities should also be included.

Discounting

In general, pricing is calculated dynamically. Discounts may be applied for many reasons either to specific items or to the entire order. Additional discounts may be given for using a preferred payment mechanism. Other implementations may provide discounts at the end of month based on total sales.

Taxes and Tariffs

The tax issues related to the buying and selling of tangible personal property or services through the Internet, are numerous and complex. Questions include what products and services are subject to tax, when and where to impose a tax on the retail transaction, and what tax (sales or use) the merchant is required to collect. Tax calculation functions with an integrated sales tax or value-added tax (VAT) engine, able to perform real-time calculations based on customer-specified product codes, order point of origin, shipper's address or recipient's address should be considered.

Due to these complexities, most solutions interface with a tax engine to reduce the risk and legalities involved with taxes. Most of the commerce packages available today interface with the leading tax engines.

Shipping Charges

Shipping charges may be applicable for items not fulfilled directly by the site. In some cases, the customer's shipping location may be used to determine their taxes and shipping charges. There are a variety of mechanisms for determining shipping charges. They include:

Price Threshold—Shipping charges will vary according to set price tiers.

Weight—Shipping charges may be determined based on gross shipping weight.

Quantity—Charges may vary dependent on the quantity of items ordered. Items may be free up to a given number or shipping may be free after a given quantity.

Line Item—Designating a specific shipping charge for each line item on the order.

Order Information

Other basic order information may be gathered during the check out processing. The most common method is an order form. The form should be easily customizable and may contain a variety of information.

Order Form Standard online form with the usual questions: Name, Address, shipping location, credit card number, email address, etc. The user usually has the ability to submit or decline the order at this point. Submitted orders should be encrypted automatically by the commerce server.

Customer Information (Establishing Customer Location.) If the basic customer information has not been gathered earlier in the process, it should be gathered before the payment phase. For some implementations, customers may wish to remain anonymous, but this is rare.

Shipping/Billing Address Applications should be capable of supporting ship-to addresses independent of and different from the bill-to address. This allows billing for a product or service to be sent to one location, and the actual product to be delivered to another.

Automated Inventory Management. In some cases, trading partners may set up Automatic Ordering based on usage or schedule. If inventory is used on a regular basis, the re-ordering process may be automated.

Order Validation Inventory checks and verification of export restrictions can be done before the order is placed. Depending on when and how the information is gathered this may be done anywhere along the process flow or as a background event concurrent with the other processes.

Purchase Order Creation If the commerce implementation integrates with an existing system, it may need to generate unique purchase orders. Services to integrate and manage this functionality may be required.

Determine Payment Mechanism Interaction with the user may be required for determining the payment mechanism. Research is currently underway to determine if this may also be automated.

Payment 10604

After a total has been established, a payment method must be determined. A variety of mediums can handle the transfer of money. The methods, flow, technology, and potentially messaging, will vary by implementation. Issues concerning security, liability, and relationship to fulfillment need to be worked out.

Listed below are some considerations for determining the payment flow and mediums to be utilized.

Anonymity. If there is a need to allow the users to remain anonymous, an anonymous medium may need to be implemented. Implementations such as a silent bidding site may require strict standards and mediums for anonymity. In general, anonymity is not a concern for most implementations.

Monetary Transaction Size. If the site will be handling very small or very large monetary transactions additional considerations will be required. Sites accepting micro value transactions will need to plan a process to collect and verify the payment. To make low-value transactions cost effective, solutions may sacrifice security. In some implementations, it is assumed "some" fraud will occur but in such small denominations as to be negligible.

Transaction Cost. Depending on the payment method, there are numerous potential associated costs. Most mediums have either transaction costs or may involve a broker requiring additional fees. Understanding the costs associated is important when planning an efficient payment system.

Audit Trail. Some implementations may record each transaction with a unique identifier used to track funds if necessary.

Security. In the past, eCommerce has been hampered by the absence of secure and robust transaction options. Recent development of secure online payment options over the Internet have been a primary enabler. Strongly-encrypted online purchase transaction protocols have been developed and integrated into software for consumers, merchants, and banks to enable secure credit card transactions.

Consumer Type. The types of flow and payment medium will vary greatly depending on the consumer or purchaser. B-C implementations require payment (or at least authorization) once the order is placed. For the buyer-centric, trading partner relationship, the established infrastructure may handle payments using traditional invoicing or an Internet-enabled form of EDI or EFT (Electronic Funds Transfer).

Electronic Authentication. Some sort of digital signature strategy would need to be in place between trading partners and potentially the financial institution.

Message Standards. Payment instructions must be recognizable to all parties involved.

Payment Methods

There are a multitude of different vendors and technologies available for handling electronic payments. The infrastructure, process, and technology may vary dramatically from vendor to vendor. The actual mediums for the current payment options fall into these categories:

Credit-Based Payment. Today, the most widely-used electronic payment option is the credit card. With the new transaction protocols and security features, credit cards can be used on the Internet just as they are in the real world. Consumer confidence is higher with the already familiar standard. Current overhead for clearing, settlement and fraud makes credit card based solutions uneconomical for transactions of small dollar amounts.

Debit-Based Payment. Payment utilizing this method will directly debit and credit accounts. These may take the form of debit cards, electronic checks or messages utilizing EDI or EFT.

Electronic Cash. Electronic cash is the electronic equivalent of real paper cash. It is usually implemented using public-key cryptography, digital signatures and blind signatures. Electronic cash is "digital" money on the computer's hard disk. Theoretically, the money could be spent in very small increments, such as tenths of a cent (U.S.) or less. In an electronic cash system there is usually a bank, responsible for issuing currency, consumers that obtain cash from either banks or brokers and merchants who will accept the digital cash for goods and services. In short, the bank, merchant and consumer each own a public and private key which is used to encrypt and digitally sign the electronic cash.

Smartcards. A smartcard is a programmable storage device the same in size and appearance as a normal credit card. It contains a microchip to store and process information. Some of these cards can contain stored value in the form of digital coins. A lost card means lost value, just like cash. The person holding the card can spend the value stored on it at any merchant accepting smartcards. This technology is particularly useful for online shopping, and is far less vulnerable than systems storing value on a hard disk. Transaction costs for this form of payment are very low, enabling the user to conduct micro-transactions of one penny or less. Microsoft and several computer manufacturers are pushing for standards to incorporate smartcard readers into PC keyboards, and most TV set-top Internet access devices already have them Digital Wallets. Digital wallet software facilitates secure, online transactions between the consumer and the merchant, and between the merchant and the bank. For the consumer, there will soon be literally hundreds of software "digital wallets" available. They will likely be free and similar in function, running within a web browser.

Payment Authorization. In many cases, consumer sites which implement a credit card payment method will require payment authorization. In some cases the actual settlement process can not occur until the items are shipped.

JEPI, being developed by W3C and CommerceNet in cooperation with many large technology companies, is a standard mechanism for Web clients and servers to find out what payment capabilities they have in common, and negotiate the payment instrument, protocol, and transport between one another. This will be transparent to the user; they will simply be told by the wallet software what payment options are available at this merchant (along with any available discounts for payment type or membership affiliations), and asked to choose.

Fulfillment 10606

The fulfillment process can be complex and will vary depending on the type of goods being delivered. Integration to existing systems as well as communication of invoices and orders to distributors or trading partners will play an important role.

A tremendous amount of communication and back end processing will be needed. Often implementing an eCommerce environment opens the doors to review the underlying systems and processes. Potential areas include warehouse notifications and P.O. delivery. Print, fax, or sneaker net systems may be upgraded to EDI, email, or another electronic medium. Updating and improving these processes will be critical for providing customer support. Users will come to expect the ability to see the progress of their order as it moves from the site to warehouse to their desktop.

Electronic Distribution

Soft goods may take the form of information, software, graphics, music or any other digital content. Many traditional content providers have imported their content to the Internet. Although the revenue generation is less than what they achieve through their traditional channels of distribution, publishers and other entertainment providers have found the Internet offers a richer, more interactive environment to present their content. The Internet provides consumers the ability to search, evaluate, transact and personalize the content. The Internet will continue to be adopted as an effective distribution channel.

Site Subscription

A very simplistic form of soft goods fulfillment may be achieved by allowing the user access to the site. Functions to handle permissions and access would be required to prevent unauthorized users or actions.

A site subscription may be based on different metering technologies. Internet metering technologies can be divided into two categories: observational metering and usage metering. Observation metering measures site activity while usage metering measures the usage of items such as files, bytes or time.

Electronic Rights Management

Owners of digital content, including authors and publishers, have been searching for a method to protect against the unauthorized distribution of their works over the Internet. Most content available on the Internet today is freely distributed, often without consideration of the content owner's copyrights and appropriate royalties. Protecting Web content is a difficult task. Items such as copyrighted words, images and other 'digital' objects need to be protected from unauthorized (and endless) duplication. Currently, copyright notices can easily be stripped away. There are a few recent developments aimed at tracking rights violations.

Some rights management methods are geared toward identifying legal and illegal uses of a document or digital object. These concepts still require actively searching the Web for signs of abuse. In essence, the methods still allow the content to be extracted and used, basing the majority of the security on trust. Other approaches place a 'security wrapper' around the content so it can only be accessed by authorized users.

Digital Watermark—The most common method is to add a digital 'watermarks'. The watermark is embedded in the background of the image without changing the overall appearance of the image. An agent, sometimes called a "spider" because of the way it crawls the web, can be used to scan the Internet for the presence of the image or identifier and report unauthorized URL's. The watermark will stay with the image, even if it is downloaded.

Digital Object Identifier (DOI)— This method would associate a unique identifier with the digital content. The identifier would be permanently associated and could potentially be as low level as a paragraph. The DOI concept is only a building block and would still need to be incorporated into a rights management system.

Digital Fingerprints—A digital fingerprint is an invisible record of who "touched" an electronic document. Services would be needed to determine who first misused the document (such as by improperly copying or distributing it). Fingerprinting electronic documents is content-dependent and is easiest for document types with a large number of bits.

Secure Packaging—This concept prevents the use of the information by placing the item in a logical security envelope. The user may gain access to the information based on the requirements of the security envelope. The security will allow the user to see the abstract, price, rules for use, and other pertinent information. Upon agreement of payment and/or rules by the end user, the user will obtain a key to unlock the document contained within the security envelope.

Customer Services 9012

Figure 109:
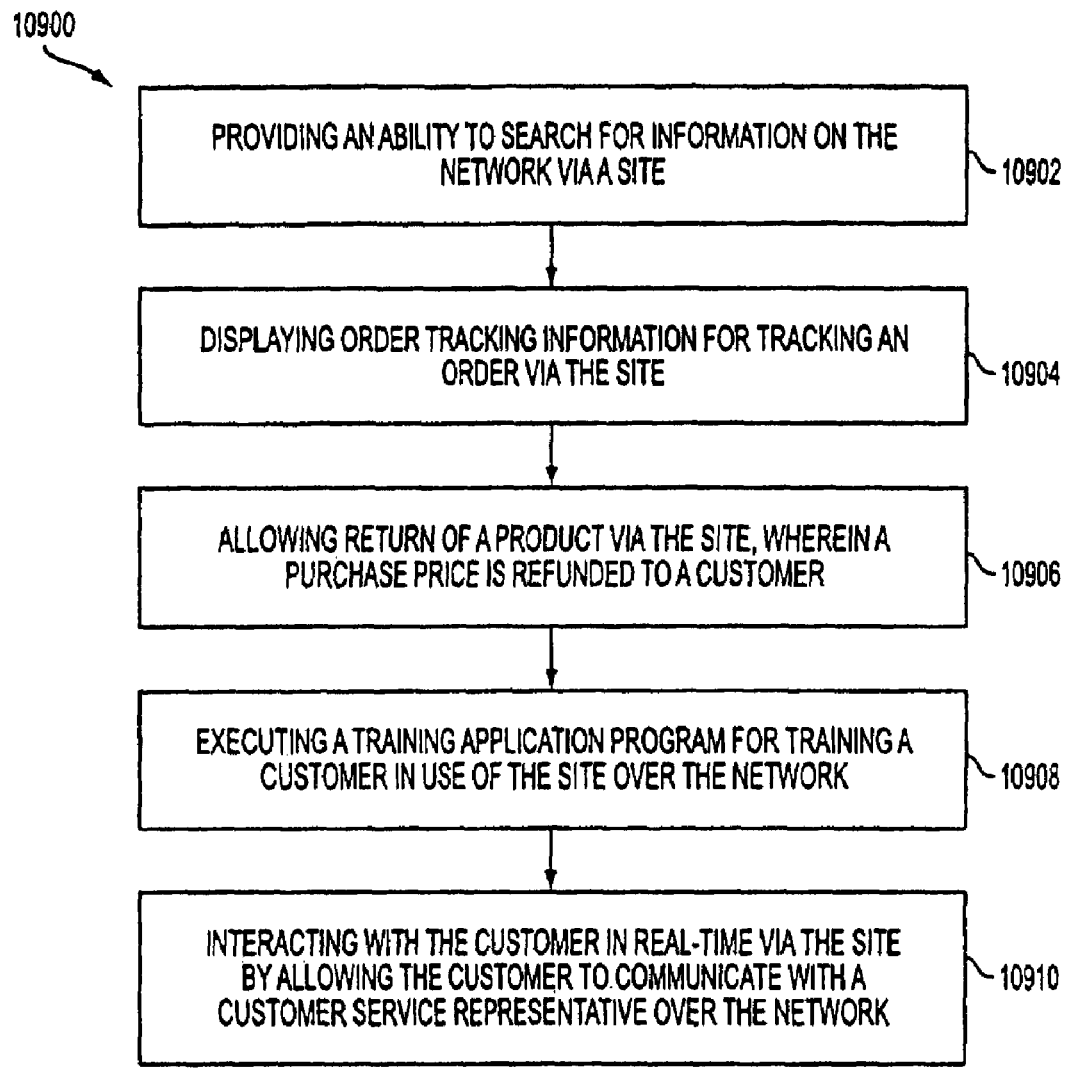
FIG. 109 illustrates a flowchart for a method for electronically serving a customer over a network in accordance with an embodiment of the present invention.

FIG. 109 illustrates a flowchart for a method 10900 for electronically serving a customer over a network. An ability to search for information on the network is provided via a site in operation 10902. Order tracking information for tracking an order is displayed via the site in operation 10904. Return of a product is allowed via the site with a purchase price refunded to a customer in operation 10906. A training application program is executed in operation 10908 for training a customer in use of the site over the network. Interaction with the customer occurs in real-time via the site by allowing the customer to communicate with a customer service representative over the network in operation 10910.

The information capable of being searched may include product information and also a status of the order. Also, the customer may communicate with the customer service representative by way of a chat room.

As an option, the purchase history information may also be compiled and displayed. As another option, information including policy documentation may also be provided. As an additional option, an on-line bulletin board may be provided for allowing input from a plurality of customers.

This category includes any component of the solution meeting a user's need normally filled by a human customer service representative. These services fall across the marketing, merchandising, order processing, and other categories. The customer service aspect of eCommerce is as important as selling the actual products. Just as in the world of the paper bill, a lack of customer service, or poor customer service, can destroy any relationship the user has established with the electronic business.

The business drivers for customer service are:
increased customer satisfaction
reduction of support personnel
increased functionality
timely information and service Conducting commerce on the Internet means allowing direct access to the system and its data. New users may have a much lower tolerance for hard to understand interfaces and site layout and may require considerable help understanding what information exists on the site and how to find it. Customer service will continue to be a key component in maintaining customer relationships.

Figure 110:
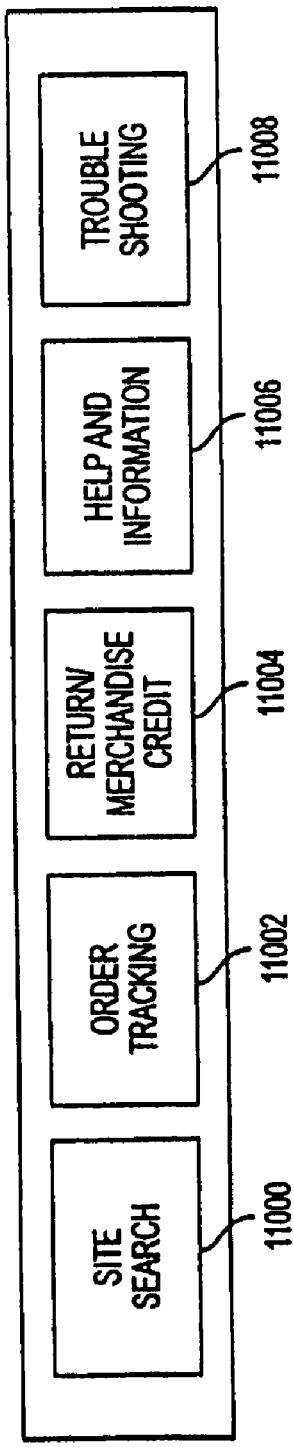
FIG. 110 illustrates key customer services of the Customer Services portion of the eCommerce Application Framework.

There are a variety of different services to enhance customer service. Which services should be implemented are dependent on the goals and characteristics of the site. Below are listed the key customer services, which are also found in FIG. 110.

Site Search 11000

Search engines have become a popular component of any information-intensive site. The ability to lead a user to the type of information he is looking for will not only make the interaction more efficient but enhance the customer relationships. "Search" is a generic term and may be used for searching for a specific product or may be implemented to search for a specific customer's order or other information.

Order Tracking (Order Management) 11002

Providing customers the ability to track their orders can provide tremendous benefits in reduction of support personnel and building customer relationships. Applications of this nature can range from simple to complex depending on the level of detail. The order tracking system should be integrated within the order processing's innate workflow system. Purchase history functions may also be provided.

Return Merchandise/Credit 11004

If the site sells goods, there is always the possibility of the customer returning the merchandise. As with most exception processing, this can create numerous problems, though the return should be allowed. Actually crediting a smartcard or replacing digital currency may be very difficult. The legalities and procedures should be thought out and documentation provided.

Help & Information 11006 and Troubleshooting 11008

There is a tremendous amount of help and information features a site may provide. Listed below are some of the more common examples.

Policy Documents—Documentation stating the policies of the site. In some cases this is required for legal reasons. In general it is important to layout the site's policies and procedures.

Email/Comments/Contact Merchant—Providing mechanisms where the user can easily contact the site is a good practice. Valuable input and comments can be gained from the actual users. Some implementations may allow users to rate site content. This functionality can be thought of as a virtual suggestion box.

Online Help and Training (Site navigation)—Whether the site is Intranet or Internet, the users should have the ability to gain help on navigation and usage of the site. In more robust cases, interactive training may be offered if it will improve site performance and utilization.

Store Locator—Many customers may use a site for pricing and product research and may not be comfortable purchasing items over an electronic medium. If the site has brick and mortar store locations, provide a facility for the tentative consumer to find them.

Trouble Help Desk—Most help desk functions can be provided through a web site. These services can range from simple documents, such as trouble shouting guides and FAQs, to complex applications.

Collaboration Services

Behind security, one of the leading reasons a customer will not 'transact' online is the lack of human contact. Although unbelievable to most technologists, there is still an underlying fear of computers hidden in a large percentage of the potential consumer base. Currently, most seller-centric sites do not provide a truly two-way, interactive, or collaborative environment. The site may have a complex form of personalization which will filter and deliver content geared to the specific user, but in most cases will not provide real-time customer interaction. Interaction may be delivered in the following methods:
- Customer Service Chat—Service provided to interact directly with the customers through the site. In the simplest form this may be a real time, textual chat function letting hesitant shoppers ask questions to either a service or sales representative. Technology and bandwidth considerations would have to be reviewed before audio or video type solutions could be considered.
- Community—An online community of interest for customers. The purpose of a community is to build an interest in the site so the customers will return simply to interact and gain information (and potentially purchase items). This may include additional information about the products or industry not normally included in the traditional merchandising approach.

For additional detail on collaboration services, please refer to the Collaboration Delivery Vehicle in DAF, found above.

Security 9014

Figure 111:
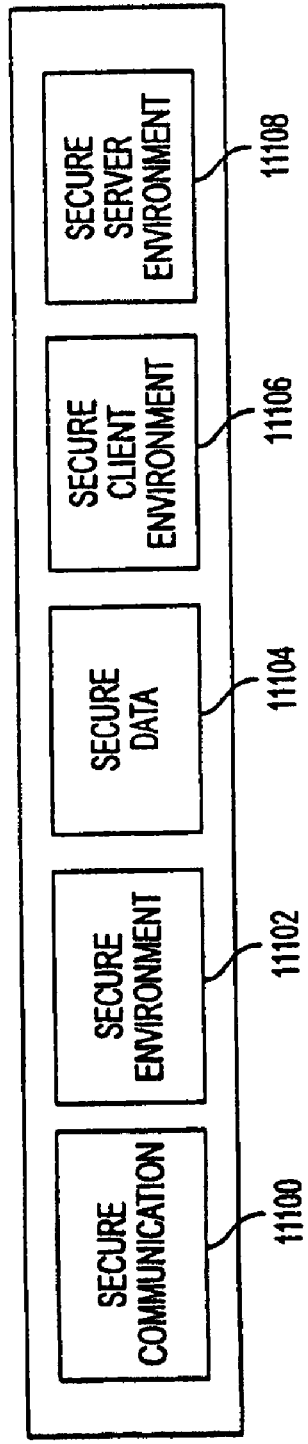
FIG. 111 illustrates the Security component of the eCommerce Application Framework in accordance with one embodiment of the present invention.

FIG. 111 illustrates the Security component 9014 of the eCommerce Application Framework in accordance with one embodiment of the present invention. Its various subcomponents are discussed below.

Figure 112:
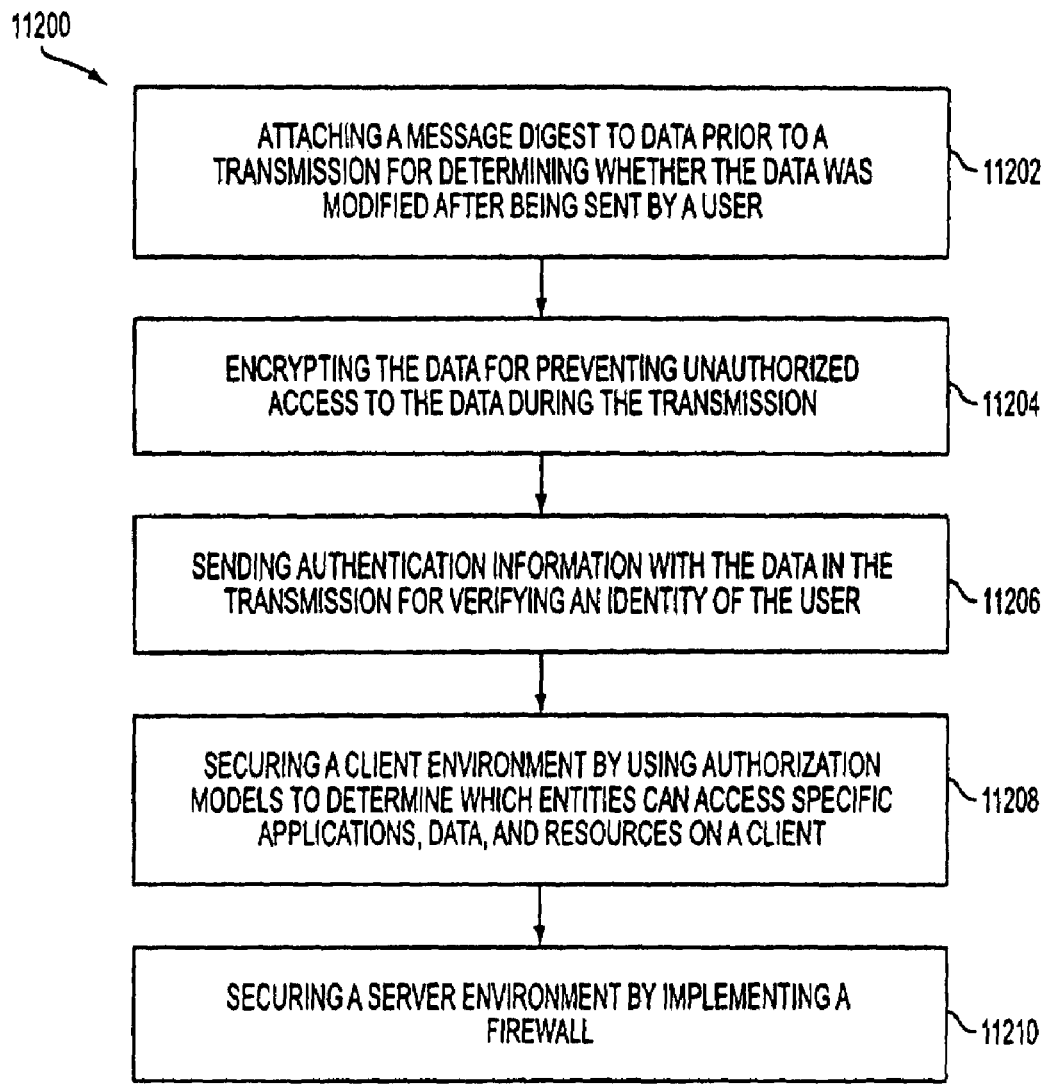
FIG. 112 illustrates a flowchart for a method for ensuring security of an e-Commerce system on a network in accordance with an embodiment of the present invention.

FIG. 112 illustrates a flowchart for a method 11200 for ensuring security of an e-Commerce system on a network. In operation 11202, a message digest is attached to data prior to a transmission for determining whether the data was modified after being sent by a user. The data is also encrypted in operation 11204 for preventing unauthorized access to the data during the transmission. Authentication information is sent with the data in the transmission for verifying an identity of the user in operation 11206. A client environment is secured by using authorization models to determine which entities can access specific applications, data, and resources on a client in operation 11208. A server environment is secured by implementing a firewall in operation 11210.

The message digest may include a log of times when modifications to the data occurred. The authentication information may also include a digital signature. In addition, the authentication information may further include a certification. Further, the certification may include a user identifier, a service identifier, a public key which is used to verify the digital signature, a name of an issuer of the certification, a period which the certification is valid, and an email address.

In the last few years, computer crimes have exploded—hackers have defaced the web site of the CIA, stolen information and software from NASA and the Pentagon, and made unauthorized wire transfers causing banks to lose millions. According to WarRoom Research, financial losses from computer crime run at $10 billion a year. Historically, 80% of security problems have been internal ones—either from employees exceeding their level of authorization or ones that are disgruntled. Netcentric computing and eCommerce are increasing the risks due to rapidly evolving technology infrastructures. As access to corporate systems is extended virtually and new security holes are discovered daily, security issues become complex.

eCommerce, while providing immense potential business advantages, may also expose businesses to significant risks. If their systems are broken into, they are at risk to financial loss, embarrassment, lost customers, and potential legal liability. Businesses often hesitate to take advantage of eCommerce because they fear security problems. Although security technologies are continually evolving to mitigate these eCommerce security risks, security breeches occur because businesses fail to implement an appropriate mixture of security solutions.

The problems associated with connecting the network to the vast Internet are widely published. Hackers abound, and new methods for compromising networks are published almost daily. However, what about connecting the network to a partner for project collaboration, or perhaps a supplier for automatic inventory control? One might trust their supplier, however, does one really know how well their network is secured? Contracts and Service Levels can and should deal with many of these issues, however, technology can also be used to enforce security policies.

Once the correct mixture of security solutions has been implemented, the company will experience many benefits besides peace of mind that their site is secure. Security also allows people to conduct business functions over the Internet which previously could only be done in person or with a more private connection. This allows expansion into new markets and new business capabilities, increases efficiency, and reduces the cost of doing business. For example, in the typical electronic storefront scenario, security is enabling an unknown buyer and seller to exchange goods with a reasonable assurance that the transaction will be honored on both ends. Security can also be a selling point for a company's eCommerce services. By demonstrating an increased level of trust and reduced exposure to fraud, a customer may choose one merchant's services over another's. Furthermore, eCommerce technologies rely on electronic automated security rather than imprecise procedural security. This can result in more reliable processing and fewer errors.

Unless customers and users feel the system is secure and there is little to no risk involved with using the system, the implementation will not be successful. Depending on the system, the amount of security in the different security areas will vary. By securing all aspects of the site, it will make it extremely difficult for an intruder to work their way into the system without being detected. There are a number of different approaches which can be employed to provide system security. Among the most common, are firewalling, encryption, and authentication. Each provides a particular type and degree of security, and in many instances it makes sense to use multiple technologies together to achieve the desired result. Security must be built into a system extremely carefully in order to be effective.

The details of security in eCommerce will be discussed in terms of five eCommerce cross-component application types. The five application types discussed are:
- Advertise Product Online
- Collaboration
- Interactive Customer Service
- Internet Home Banking
- Online Storefront/Product Sales FIGS. 113–122 illustrate these five application types. The Figures are grouped in consecutive pairs in which a sample architecture will be shown in a first Figure and the following Figure will be a security architecture that may or may not be created by modifying the immediately previous sample architecture. The organization of the pairs of Figures is as follows: FIGS. 113–114, 115–116, 117–118, 119–120, 121–122.

Secure Communication 11100.
- Visa® and MasterCard® (have jointly developed the Secure Electronic Transaction (SET) protocol to allow secure, cost-effective bank-card transactions over open networks. SET includes facilities for:

Purchasing goods and services electronically

Requesting payment authorization

Requesting certificates for authentication

Consumers get their encryption keys using a specific program integrated into their browser. This program automatically converts a consumer's credit card number into a certificate given by Visa or MasterCard. This certificate contains a key and will be attached permanently to the browser of the consumer.

Then, for every transaction the consumer asks the merchant to send his certificate, and the merchant can ask the consumer's bank for authentication with the customer's certificate.

Full implementation of SET requires certificates be issued for each credit card a consumer wishes to use on the Internet. This raises enormous administrative challenges, as well as the problems involved in achieving this level of universal adoption.

Secure Environment 11102

There are different technical approaches for Internet security. The end goal of the security technologies is the same. It is important to pay attention to the approach and questions that they try to answer. For example Secure Socket Layer (SSL) and Secure HTTP (SHTTP) have been viewed as competing technology. SSL uses the TCPI/IP protocol to provide transaction security at the transport level. Security properties are linked to the channel of communication between the two parties. The issue they are addressing is channel privacy for a conversation or transaction. SHTTP provides transaction security at the document level. Each document is designated as private by the sender. This approach is addressing the question of authentication and authorization of web transactions.

Secure Data 11104

The first area to secure is data. It has to be ensured information is protected from unauthorized access. This is mostly important when sensitive data, such as credit card numbers or business figures, are transmitted. Data usually passes a long way before reaching its final destination and can easily be read by a third party. Data, therefore, has to be encrypted before transmission. Today several encryption techniques are used which ensure the data is unusable if intercepted.

In addition to encrypting the data, the parties involved in an electronic transaction need to know that the data received or sent is secure. Authentication techniques require the identities of the sender and receiver are known and the information sent arrives unaltered. Authentication can be accomplished with both the use of a message digest and a digital signature. Details on some of these techniques are discussed below.

Cryptography

Cryptography is an essential component in securing data. In the most basic sense, cryptography is encrypting and decrypting data using an algorithm(s) or key of some sort. Encrypted data is useless without the key to decrypt it. Today several encryption standards exist utilizing a wide variety of algorithms and keys. Details on some of the different methods can be found in the Security for Internet Electronic Commerce Security Technology Handbook.

Message Digest

A message digest is used to make sure no one has altered the message between transmission and reception. It is used to provide data-integrity. A digest is associated with a sent message. The recipient can re-compute the digest and compare the new one with the sent one. If they match, the message has not been tampered during transmission. The algorithm used to compute digest must be the same for the sender and the recipient. A message digest is a short, fixed-length digital code derived in a one-way fashion from a longer variable-length message. As a result, it is impossible to determine the original message on the basis of the digest or to find a different message with the same digest.

Digital Signature

Digital signatures ensure the message recipient only the sender of the message could have sent it. The sender signs a message by encrypting a digest of the message with their private key. No one but the particular sender could have generated the digest corresponding to the message. This provides authentication of the sender as well as non-repudiation of the origin. Encrypting a message digest also links the signature with the message content. The sender can't claim they did not send the message or the message is not the one they sent.

Certification

Some security techniques may require the use of a public key for encrypting data. When using a public keys, issues may arise with key management and verification. Often a trusted third party will be needed to issue a Certification Authority (CA) for keys and signatures. Certification Authority declares which public key and signatures belongs to which users and services. Because a user needs the CA public key to check validity of certificates, CA must provide a way to safely deliver its own public key.

A certificate typically contains:

User and service identifier

Actual public keys

A public key, which can be used to verify the digital signature of a message sender The name of the issuer, or Certification Authority The certificate's validity period Other identifying information such as email address Secure Client Environment 11106

The client environment should also be secured. Since systems may be open to public use, and accessible to a large audience, it could be subject to new types of attacks. An environment must have security mechanisms in place to control who can access it as well as controls on the actions these users may perform. This may be achieved using authorization models. Authorization models are used to determine which entities (for example, people or applications) can access specific applications, data, or resources.

With the onset on Netcentric computing, entire applications or other forms of executable content may be downloaded across a network. This style of computing introduces a variety of security concerns. Downloads may come in the form of applications, applets, ActiveX controls, scripts and a variety of other software. It is important to understand the different security concerns with the downloads.

Java Applets

Java is designed for developing programs to run on many different kinds of computers connected together in a network. A Java Applet is a special kind of Java program attached to a Web page. Applets are embedded into a Web page's HTML definition and interpreted by Java-enabled browser. It is possible to have users download the applet from the Web and run the program locally.

Running some unknown person's untrusted code is also inherently dangerous. For this reason, Java restricts the behavior of Applets to a set of safe actions (Safe applets are labeled as trusted applets). The Java security model restricts an Applet as follows:

Applets cannot make direct system calls

Applets are forbidden to:
 access the file system
 open sockets (except on the originating server)
 interfere with other applets
 spy on the local environment Because of its built-in security model, Java addresses these risks head-on. Unfortunately, there are still holes in Java's security model which allow some risks. For example, applets could be created to perform various harmful acts:

Denial of service; This kind of hostile applet takes all the available system resources of the user's machine Invasion of privacy; These Applets can publicize private information.

Annoyance; These types of Applets play sound files, display graphics, or create endless windows.

ActiveX

ActiveX is a technology developed by the Microsoft Corporation for distributing software over the Internet. Like Java Applets, an ActiveX "control" can be embedded in a Web page, where it typically appears as a smart interactive graphic. Unlike Java, which is a platform-independent programming language, ActiveX controls are distributed as executable binaries, and must be separately compiled for each target machine and operating system.

The ActiveX security model is considerably different from Java Applets. ActiveX places no restrictions on what a control can do. Instead, each ActiveX control can be digitally "signed" by its author in such a way that the signature cannot be altered or repudiated. The digital signatures can then be certified by a trusted "certifying authority", such as VeriSign, to create the equivalent of a shrink-wrapped software package. If downloading a signed ActiveX control causes a machine to crash, the responsible party will be identifiable.

This security model places the responsibility for the computer system's security on the user. Before the browser downloads an ActiveX control that has not been signed at all, or has been signed but certified by an unknown certifying authority, the browser presents a dialog box warning the user this action may not be safe. The user can abort the transfer, or may continue the transfer and take his chances.

Scripting Languages

Internet scripting languages are programming languages embedded in HTML pages and are interpreted by the user's browser (for example, Netscape Navigator or Microsoft Explorer). Typically, they are dedicated to control the user's interaction with an HTML document, for example when:
 Processing mouse events
 Opening new windows
 Checking forms
 Interacting with other active content As scripts are pieces of code from a foreign source executed on the user system, they raise security issues. Indeed, a user must be sure a downloaded script will not perform malicious actions against his system. Scripting languages designers have to manage the balance between security achieved through restriction, and language capabilities.

Secure Server Environment 11108

Securing the server environment will depend upon the technology and architecture of the implementation. Techniques and security models exist for the different methods of server-side computing. Included below is basic security information for some of the different technologies.

Internet Firewall

A firewall is used to protect a trusted network from an untrusted network. Typically, the two networks in question are an organization's internal network (trusted) and the Internet (untrusted). A firewall is a system or group of systems that enforces an access control policy between two networks. A firewall is a collection of components or a system placed between two networks and possesses the following properties:

All traffic from inside to outside, and vice-versa, must pass through it;

Only authorized traffic, as defined by the local security policy, is allowed to pass through it;

The system itself is immune to penetration.

Common Gateway Interface (CGI)

Common Gateway Interface (CGI) scripts are a way of processing information submitted to the web server using a form. A CGI script can be written in any language able to use standard IN and OUT streams (usually Perl or C shell). To process a form, the client first submits the information content to the server. On the server, a CGI script reads the form contents, then uses it to write a new HTML page, which is sent back from the server to the client. Security problems with CGI scripts occur on both the client and the server sides.

CGI Client Side

Submitting a form to a CGI script, which is located on a server, implies the sending of the contents of this form over the Network. If the channel used is not safe, form content can easily be read and perverted. Any way of securing the channel, such as SSL, PCT, or S-HTTP, can be used to achieve confidentiality of submitted information. As these protocols must be implemented by both client and server, a user must check the server is able to secure the channel. Current popular browsers are able to warn the user if information is being submitted in an unsafe fashion.

CGI Server Side

Processing a form on the server, using server resources, such as system commands, can lead to security holes. Indeed, forms can be full of malicious content causing the server to perform confidential information delivery, server crashes, or unauthorized accesses.

The only way to protect a server from attacks through CGI script is to be very careful when writing, testing, and using CGI scripts. As far as possible, CGI scripts should avoid executing system commands. Each submitting entry should be checked and analyzed before being processed. Script sources must be hidden as analyzing the source of a script is the best way to find an efficient attack through it. On multiple user systems, the right to install CGI scripts should only be granted to the administrator or trustworthy users.

Common Object Request Broker (CORBA)

The Common Object Request Broker architecture is an open distributed object computing infrastructure standardized by the Object Management Group. CORBA specifies the interfaces, structures and policies used by distributed objects (components) to communicate independently of the language, operating systems, machine, or network.

The CORBA 2.0 specification presents a good set of security policies which provide authentication, data integrity, confidentiality and non-repudiation. The standard leaves to the applications the problem of handling the non-repudiation policies without conforming to the ISO specifications. The standard does not thoroughly solve the problem of interoperability between different security domains.

Distributed Component Object Model (DCOM)

The Microsoft Component Object Model (COM) provides a model based on Object Technology, to manage inter-process communication on a local computer. Microsoft's Distributed Component Object Model is an extension of COM, supporting the distribution of collaborative processes over a network.

Security issues in DCOM concern:
  Security for communication; Inter-process communication messages are sent on potentially unsecured networks like the Internet.
  System administration considerations; Using a DCOM-aware application involves the possibility for a user to manage processes on others systems. This must not conflict with the user's rights on each system.

Remote Method Invocation (RMI)

The Remote Method Invocation allows a programmer to create distributed Java-to-Java applications. This allows remote Java objects to be invoked from other Java virtual machines, even those on different hosts. A Java program can call a remote object only when it has obtained a reference to that remote object. This can be done by:
  Searching for the remote object using the bootstrap naming service provided by RMI.
  Receiving the reference as an argument or a return value.
A client can call a remote object on a server, and that server can also act as a client when calling other remote objects. As RMI both implies execution of foreign code and communication over a network, deploying RMI requires a secured environment and secured communication.

The RMI specification does not define any security features for distributed transactions. In order to secure the transfer of information between hosts located in different address spaces, some security features need to be added to the specification.

Advertise Products Online

Figure 113:
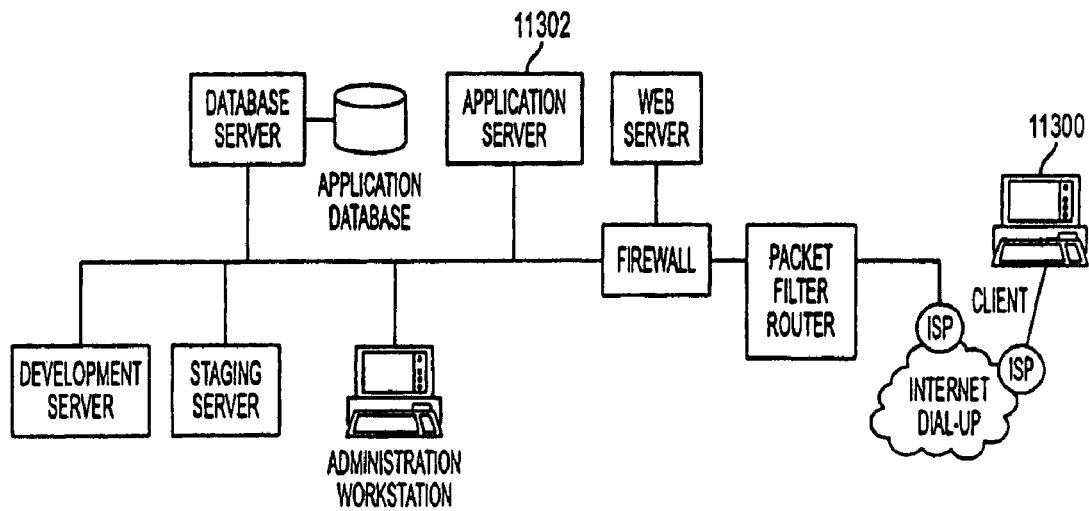
FIG. 113 shows a sample architecture in an online advertising scenario.

In the sample architecture shown in FIG. 113, a potential customer 11300 will access a corporate web site for some sales information. This is an information source only, no transactions (exchanges of value) can be performed. Internet users will surf to the advertising site, and click on various links within the page to get more information on particular products. The web server can make requests from the application server to serve dynamic pages to the user. The application server can pull information from the database if detailed product information is requested. Site administrators develop content on the development server and test it on the staging server.

Functional Description

Customer launches a web browser and goes to the retail venue's web site.
With a cookie, the retailer's application server 11302 can identify the customer and choose a merchant to display on the front page. In addition it can tailor the merchant's interactive catalog of products to highlight those products which would be of interest to the customer
Customer selects items and gets a detailed description of the item including its price and nearest store location or a phone number to order online.

Security Business Priorities

Figure 114:
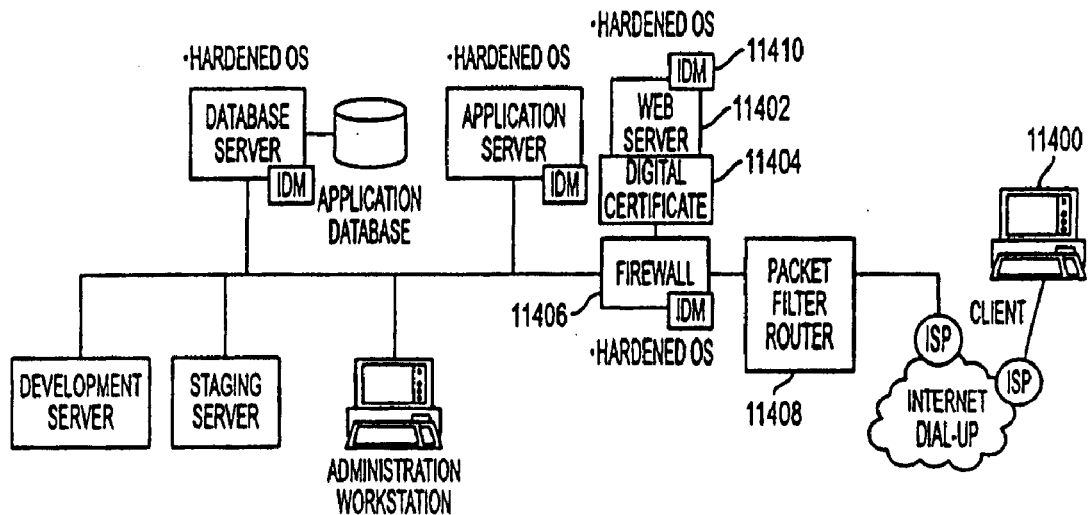
FIG. 114 illustrates an exemplary security architecture in an online advertising scenario.

Preventing the web site from being vandalized
Assuring the web site is available to potential customers at all times
Public perception that the company and web site is providing proper and effective security
An exemplary security architecture is illustrated in FIG. 114. This architecture is superior to the architecture of FIG. 113.

Security Technical Description

Encryption services are not implemented in this architecture because no confidential information is sent between the customer 11400 and the web site.
Authentication services are provided at the company's web server 11402 with a server side certificate 11404 signed by a leading CA provider. Customers are not authenticated. Internal users (i.e. administrators) are authenticated with their NT domain logon.
Access control is provided by a firewall 11406 at the entry point into the company's internal network. A packet filter router 11408 is located before the web resources to limit traffic to HTTP only. In addition all sensitive servers in the architecture (firewall, web, application, database) have hardened operating systems implemented either with a specific secure server or an add on software package.
Auditing services are provided in real time with Intrusion Detection Modules (IDM) 11410 on all critical services. Off line auditing is provided with operating system security scanning tools to identify vulnerabilities.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)
A security policy is necessary to provide direction on what assets should be secured and what threats are of most concern.
Security standards are necessary to assure a consistent, secure configuration across multiple platforms and applications.
Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the site.

Collaboration

Figure 115:
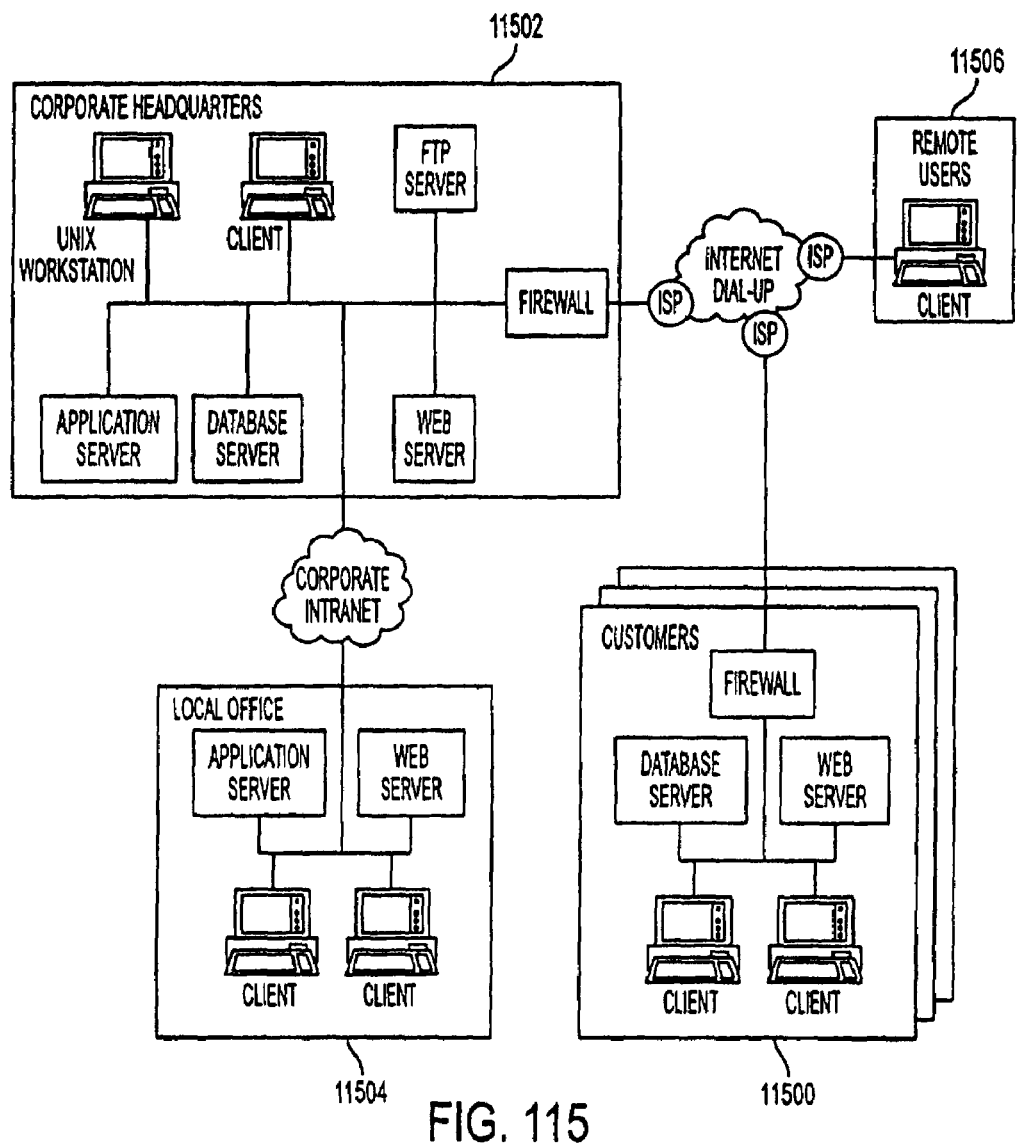
FIG. 115 depicts a sample architecture providing direct network access to several of customers in order to share specifications, distribute engineering designs, and collaborate on works in progress.

In the sample architecture shown in FIG. 115, a silicon chip designer wishes to have direct network access to several of their customers 11500 in order to share specifications, distribute engineering designs, and collaborate on works in progress. Corporate employees from headquarters 11502, local offices 11504, or from a remote location 11506 can access information stored on the web server or the back end database server. Employees also have the ability to access the simulation application which is web enabled. Customers may access design information that is posted on the web server, but cannot access back end systems. The customer may also post information on their own web server or database server to provide detailed specifications or information to the chip manufacturer.

Security Business Priorities

Figure 116:
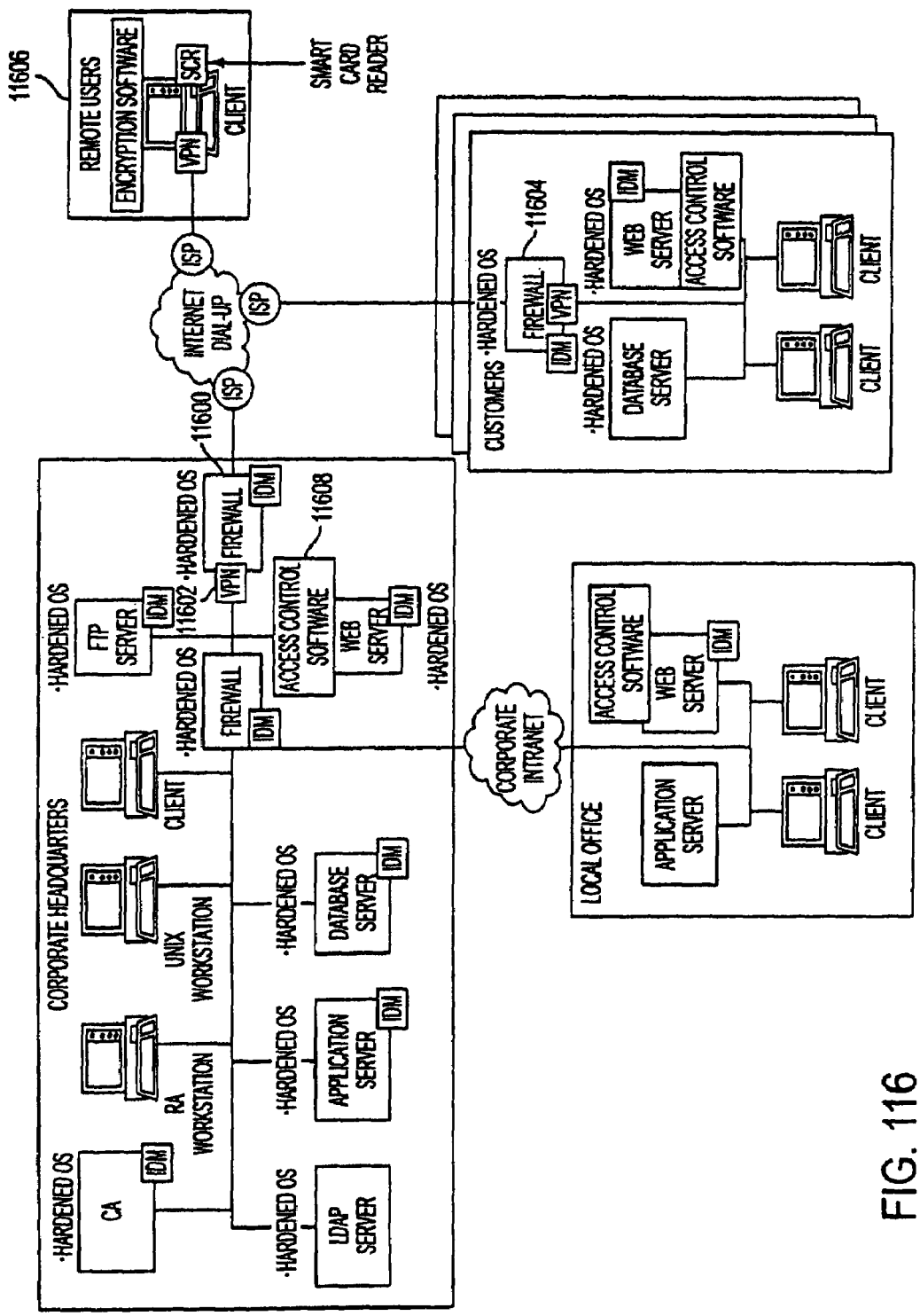
FIG. 116 depicts another exemplary Security Architecture in the scenario of FIG. 115.

Protecting sensitive resources on the internal network from unauthorized external access Protecting customer design information from access by hackers or competitors Allowing a customer to access only their own information, not another customer's information Assuring design information maintains proper integrity FIG. 116 depicts another exemplary Security Architecture which is superior to the security architecture of FIG. 115.

Security Technical Description

Encryption services are provided in the security architecture of FIG. 116 with Virtual Private Networking (VPN). The central corporate firewall 11600 has a server VPN module 11602, and all remote customer locations are required to implement a VPN module on their firewall 11604 as well. Remote users 11606 will need client VPN software installed on their PCs. Remote users should also implement a local encrypting application that will encrypt the contents of sensitive directories on their hard drive.

Authentication services are provided to users at customer locations with digital certificates. The central corporate headquarters will maintain a CA (Certificate Authority) to administer the certificates. The CA is integrated with an LDAP server to store directory information. An RA (Registration Authority) is used to process certificate requests. For users at customer locations, the authentication occurs at the corporate web server and is managed by the web server access control software. Stronger authentication is required for remote users because they have increased access in the internal network. Remote users therefore will be issued smart cards on which they will store their private key. Each remote user will need a smart card reader for their PC.

Access control is provided by firewalls at entry points into both the corporate headquarters network and the customer location. A secondary firewall is located behind the web server at corporate headquarters to further restrict access to more sensitive servers on the internal network. An access control software package 11608 is used on the web servers to restrict access to specific web pages, files, and directories. In addition, all sensitive servers at corporate headquarters (database, ftp, application, firewall, web) have hardened operating systems implemented either with a specific secure server or an add on software package.

Integrity is provided with digital fingerprint technology at the ftp server. As a user downloads a file to their PC, it is stamped with a digital fingerprint which uniquely identifies the time and the user that downloaded that file.

Auditing services are provided in real time with Intrusion Detection Modules (IDM) on all critical services. Off line auditing is provided with operating system security scanning tools to identify vulnerabilities.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner.

Interactive Customer Service

Figure 117:
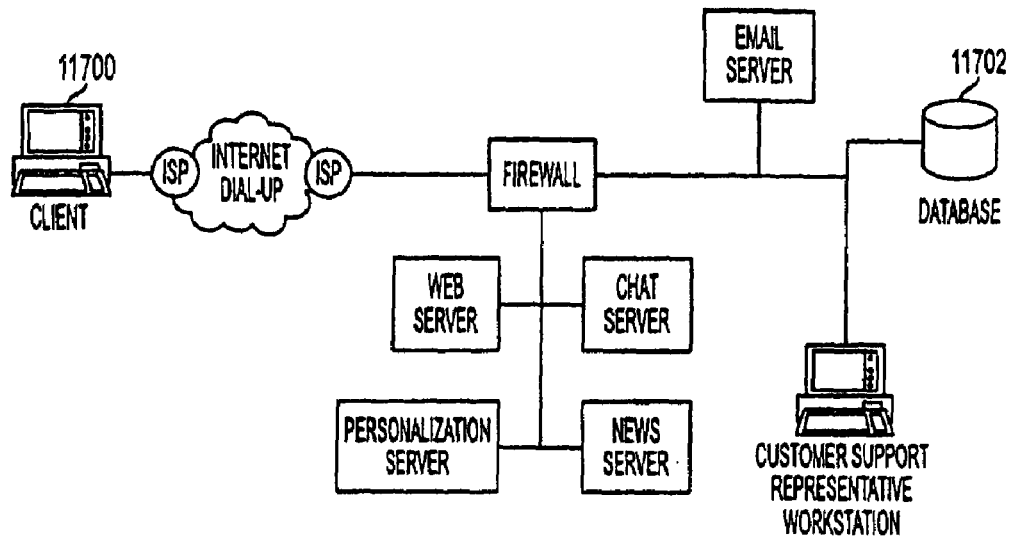
FIG. 117 shows a sample architecture in an interactive customer support scenario.

In the sample architecture shown in FIG. 117, customers 11700 of a software vendor are able to access the vendor's web site and attempt to solve their technical problems without directly burdening the vendor customer support personnel. If an answer is not found, the customer can send an email to the support organization, which can be responded to by a support representative. This architecture serves three different applications: 1) a customer client application, which produces a web interface for accessing personalized and product specific online help resources, including email, chat rooms, news groups, and full text searches, 2) a customer support representative application which can be used to respond to a client user's request via email, chat, or news, and 3) an administration application which enables the corporate web master to easily change the look and feel of the support site for a company.

Functional Description

Customer launches a web browser and goes to the company's web site and clicks on customer service Web page has a menu of options including online technical support, chat room and upgrades/patches.

Online technical support consists of the ability to email a technical support representative and get a reply by email or access an interactive database 11702 of problems and solutions.

When the user clicks on the interactive support he will be asked a series of questions to pinpoint the problem.

Another option at this point is for the user to enter the serial number of the product and for the web server to customize the help page based on what product the user has.

If the user is not satisfied with the help he receives there is a chat room and or newsgroup to talk to a live customer support representative and other customers.

Security Business Priorities

Figure 118:
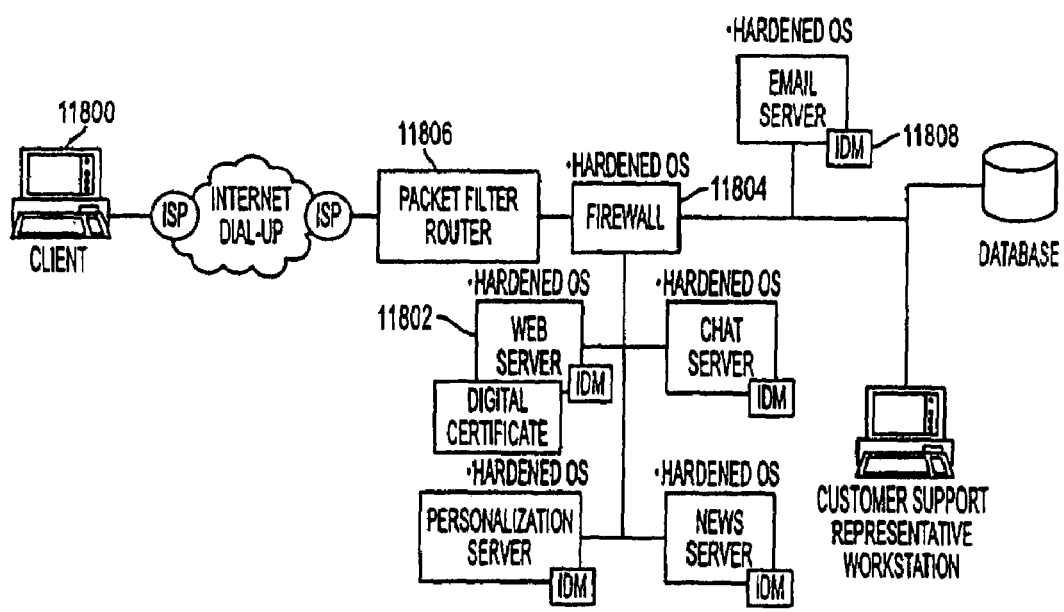
FIG. 118 illustrates an exemplary security architecture in a customer support scenario.

Public perception that the company and web site is providing proper and effective security Protecting access to any information on the internal network, specifically customer-related information Protecting the integrity of their web site and ensuring that it is not vandalized An exemplary security architecture is illustrated in FIG. 118. This architecture provides more security than the architecture of FIG. 117.

Security Technical Description

Encryption services are not implemented in this architecture because no confidential information is sent between the customer 11800 and the web site.

Authentication services are provided at the company's web server 11802 with a server side certificate signed by a leading CA provider. Customers are not authenticated. Internal users (i.e. administrators) are authenticated with their NT domain logon.

Access control is provided by a firewall 11804 at the entry point into the company's internal network. A packet filter router 11806 is located before the web resources to limit traffic to HTTP and NNTP only. In addition all sensitive servers in the architecture (firewall, web, personalization, news, chat, email) have hardened operating systems implemented either with a specific secure server or an add on software package.

Auditing services are provided in real time with Intrusion Detection Modules (IDM) 11808 on all critical services. Off line auditing is provided with operating system security scanning tools to identify vulnerabilities.

Content filtering is provided at the chat server and the news server in software. This software will filter posted content based on a pre-defined rule base to prohibit inappropriate material.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individual fulfilling security roles in the architecture. User training information should also be developed and distributed in an easy to read and implement manner. Special attention should be paid to the legal requirements for any disclaimer or policy statements which must be presented to the customer when accessing the service.

Internet Home Banking

Figure 119:
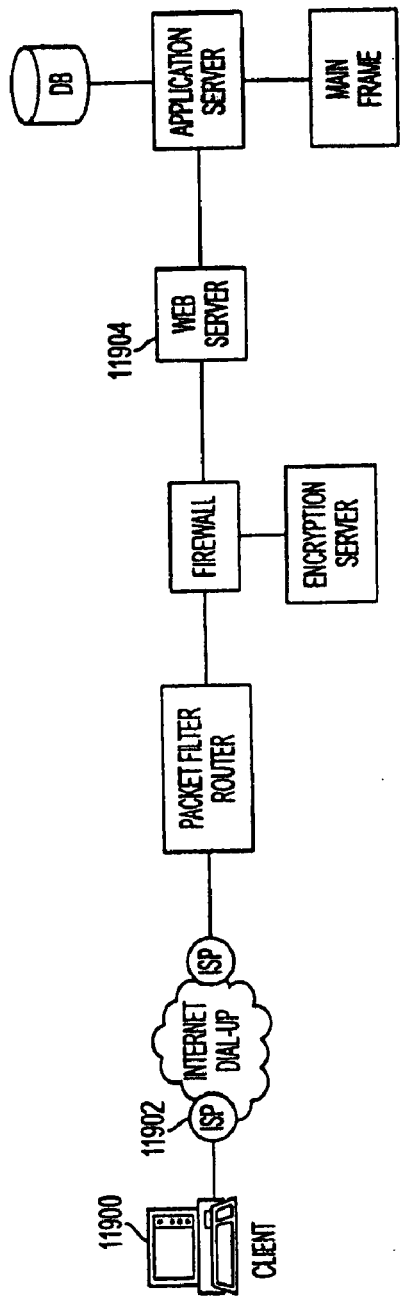
FIG. 119 depicts a sample architecture in an online banking scenario.

FIG. 119 illustrates an exemplary architecture. In this sample architecture, customers 11900 are provided with the capability to access account information, pay bills, order checks, and transfer funds between their multiple accounts. The customer will use a PC to dial their ISP 11902 and access the bank's web site. The client PC will be equipped with standard HTML browser software, and HTTP communications capability for connectivity to the server 11904 at the bank. An encrypted session is established between the client and the server using SSLv3. Once a connection is established, the customer can request a service from the bank's web site. This request consists of the recall of an ASP or HTML page, using a secure SSL3/PCT session over TCP/IP.

Upon arrival of the request at the web server, VB Scripts or JScripts are run as requested in the Active Server Pages. These scripts interact with OLE/COM objects which reside on the application server. These objects run application services to handle the information requested by the user. The application services are in turn handled by transaction services, which control object operations and data transactions on local and remote databases. The answer to the request is then sent back to the client where it is translated from ASP to HTML, or handled by ActiveX.

Functional Description

Customer launches a web browser and goes to the bank's web site.

The encryption server creates a secure SSL session and requests a login name and password.

Authentication is passed to the application server and verified.

The main page provides user with different options such as account information, funds transfer, bill payments, portfolio management and a loan service center.

Customer wants to pay bills but first clicks on account information to check his balance.

The web server requests the account information from the application server which accesses the mainframe for the data.

Account information including balance, recent deposits and cleared checks are returned to the web server and displayed on the user's computer.

User decides to pay bills and clicks on bill payment User enters the name of the payee and the application server queries the mainframe for the payee's address and information about previous checks written to this payee by the user.

User enters an amount and the date it should be paid.

Data is transferred to the application server and executed on the assigned date.

Money is then transferred out of the user's account and cleared with the payee's bank through the banks clearing house.

User logs out and the SSL session ends.

Security Business Priorities

Figure 120:
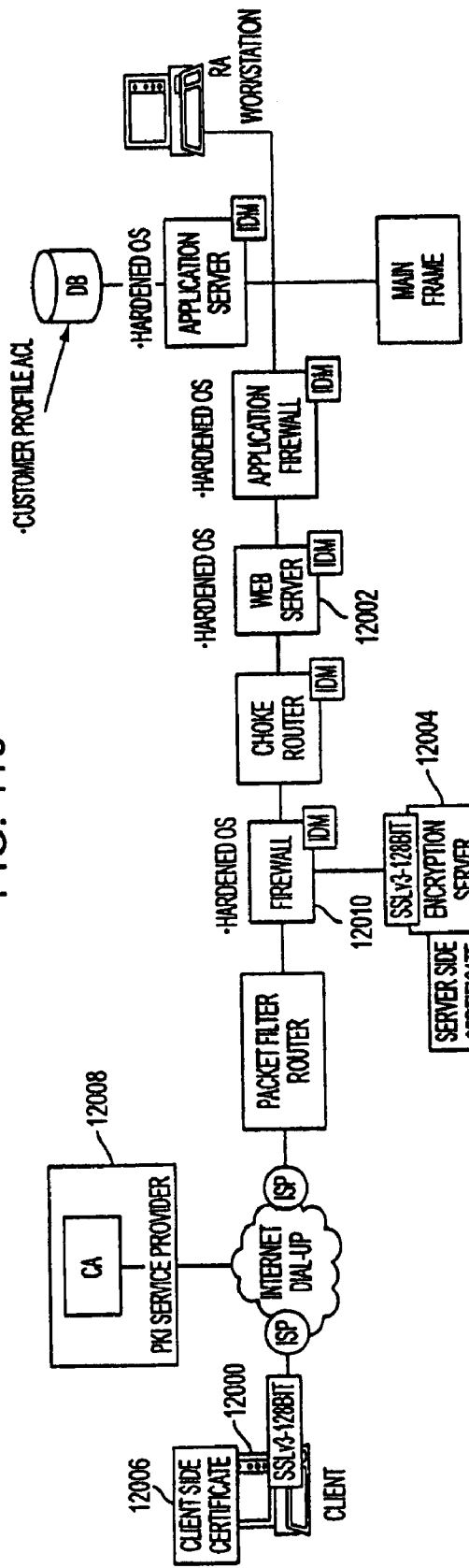
FIG. 120 shows an exemplary security architecture in an online banking scenario.

Public perception that the company and web site is secure and their money is safe Protecting access to any financial information on the internal network, specifically account and customer information Preventing major financial losses involving multiple customer accounts FIG. 120 depicts another exemplary Security Architecture which is superior to the security architecture of FIG. 119.

Security Technical Description

Encryption services are provided between the client 12000 and the server 12002 with SSLv3 using 128 bit session keys. The encrypted session is between the client PC and the encryption server 12004. Note that this requires clients to have browsers which support SSLv3.

Authentication services are provided with digital certificates. Customers will be issued personal digital certificates 12006, signed by the root key for the bank. The encryption server will have a server side certificate signed by a leading PKI provider. Certificate management services will be outsourced, so that the bank will approve and deny certificate requests at the RA (Registration Authority), but certificate revocation and management services will be provided by a PKI service vendor 12008.

Access control is provided by a firewall 12010 at the entry point into the bank's network. A packet filter router is placed in front of the firewall server, and a choke router is placed behind the firewall in order to provide some redundancy at this critical juncture. The firewall should implement Network Address Translation (NAT) to protect configuration information of the bank's internal network. Customer profiles which limit customer's access to the application and the mainframe are maintained on a database off of the application server. Users are given unique IDs and privileges to access the application and the mainframe. In addition all sensitive servers at the bank (firewall, encryption, application, web) have hardened operating systems implemented either with a specific secure server or an add on software package.

Integrity is provided with digital signatures on the transaction messages sent from the client PC to the application server.

Auditing services are provided in real time with Intrusion Detection Modules (IDM) on all critical services. Off line auditing is provided with operating system security scanning tools to identify vulnerabilities. In addition, a single transaction ID is logged at each point in the architecture to provide the ability to trace a single transaction through multiple audit logs.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the home banking site.

Online Storefront/Product Sales

Figure 121:
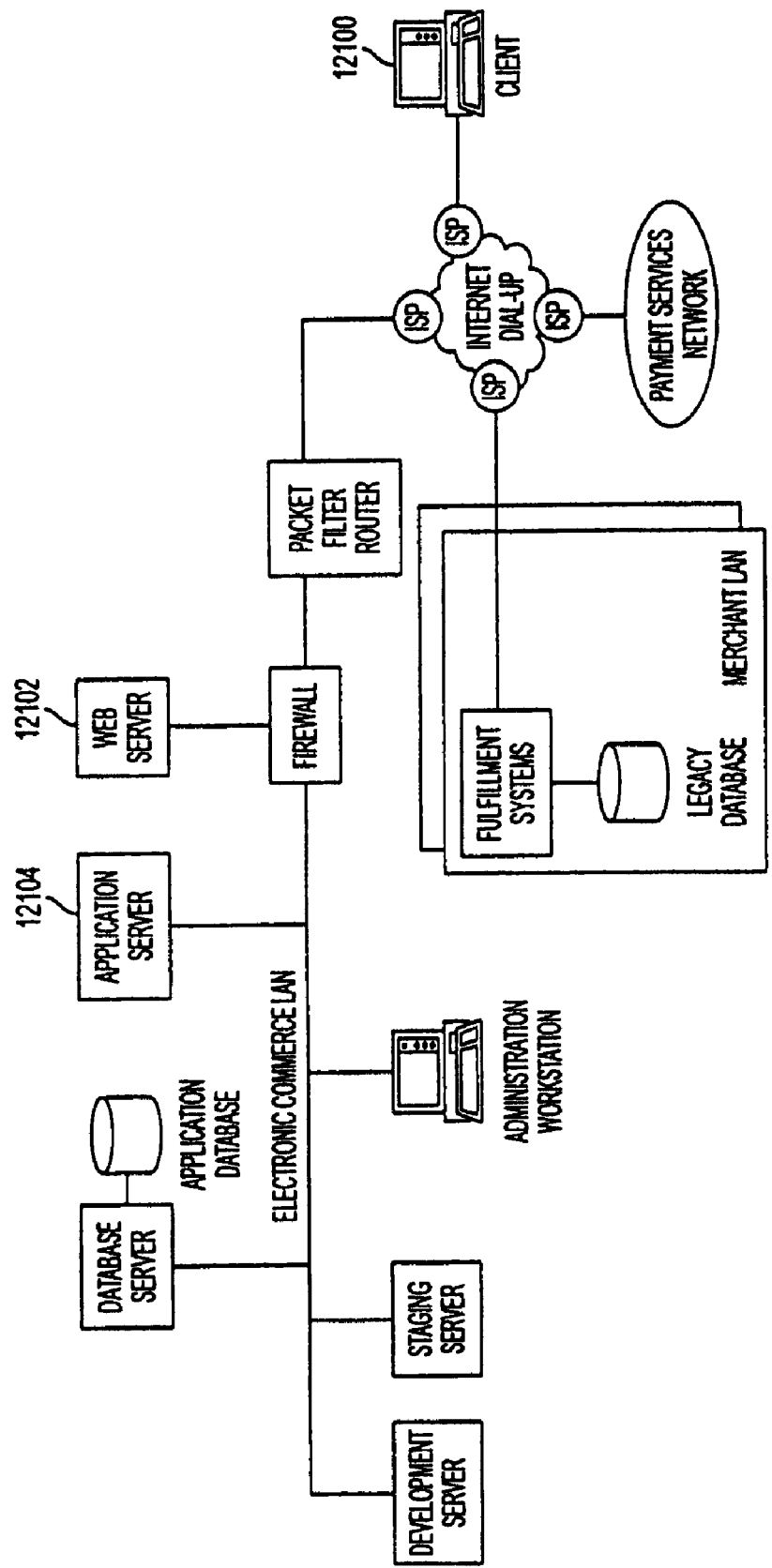
FIG. 121 illustrates a sample architecture in an online shopping scenario.

In the sample architecture illustrated in FIG. 121, all visitors 12100 will be provided access to a retail venue selling a variety of goods encompassing many merchants. Users will see a different default store depending on their particular interests and corresponding profiles. The customer is able to view all products in an encapsulated format where limited product information is shown. When a product is selected, descriptions, pricing, incentives, and other details can be shown. The customer can place items in a shopping basket, as well as viewing and deleting items already in the basket. To purchase all the items in a basket, the users shipping and billing information, credit card information, and an email address.

In a sample transaction, the customer will dial into their ISP and surf to the shopping mall site. The web server 12102 will then request a cookie from the user's web browser to determine if they have used the service before, and if they have a personalization profile. If the user has a cookie, the web server will request the personalization profile from the application server 12104 and present it to the user. The user then can browse through the site, selecting different objects from each merchant's page and placing those objects in a shopping cart. The shopping cart is maintained at the application server. If the user decides to purchase the items in the shopping cart, he will click the Buy Now button, and will be prompted for shipping and payment information. This information is gathered by the web server and sent back to the application server. The application server then routes it to the payment services function at the bottom of the picture. Payment services will validate the credit card, and send back a positive or negative response. Once the payment has been approved, an entry is made in a payment file for each merchant whose goods were purchased. This payment file is transferred hourly to each merchant for order processing.

Functional Description

Customer launches a web browser and goes to the retail venue's web site

With a cookie, the retailer's application server can identify the customer and choose a merchant to display on the front page. In addition it can tailor the merchant's interactive catalog of products to highlight those products which would be of interest to the customer Customer selects items and gets a detailed description of the item including its price.

When customer likes an item a button is pressed and it is added to a virtual shopping cart Customer clicks on check out which transfers the customer to a secure web server and asks for a password or the creation of one for a first time shopper Secure web server authenticates user and displays order and credit card information Customer has the opportunity to change order, credit card or shipping information then accepts the order.

Information is passed from the web server to the application server which then routes it to a payment services function.

When the purchase is approved the web server sends an email to the customer to confirm the order.

The application server now routes the order/payment information to the merchant's fulfillment system for shipment.
Another email is sent to the customer when the product is shipped.

Security Business Priorities

Figure 122:
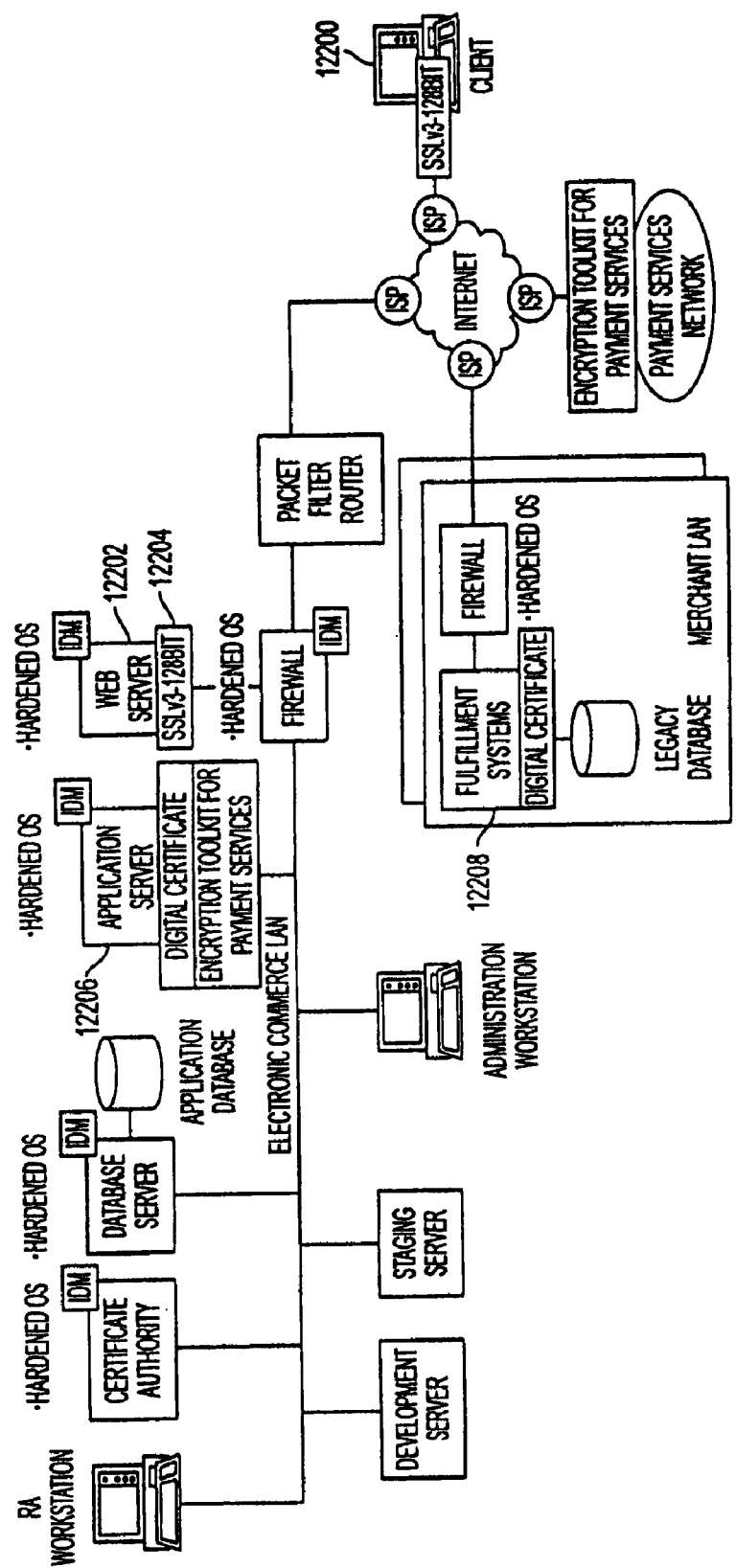
FIG. 122 shows an exemplary security architecture in an online shopping scenario.

Public perception that the company and web site is providing proper and effective security Protecting their customer transactions and profile information from being captured or read Preventing fraudulent transactions Providing timely, confidential order files to member merchants An exemplary security architecture is illustrated in FIG. 122. Though having a similar function, this architecture is superior to the architecture of FIG. 121.

Security Technical Description

Encryption services are provided between the client 12200 and the web server 12202 at the storefront with SSLv3 using 128 bit session keys 12204. Note that this requires clients to have browsers which support SSLv3. To secure file transfer between the storefront and the merchants, a toolkit is used to implement encryption services at application server 12206 (storefront) and the fulfillment server 12208 (merchant).

Authentication services are provided between the merchant and storefront with digital certificates, implemented with the same security toolkit as the encryption services. Certificate management will be performed by the storefront with a leading CA (Certificate Authority) product. An RA (Registration Authority) is used to process certificate requests. Customers will not be uniquely authenticated. The storefront web server will have a server side certificate signed by a leading CA provider to authenticate itself to customers.

Access control is provided by a firewall at the entry point into the storefront network. A packet filter router is located before the web server to limit traffic to the web server to HTTP only. In addition all sensitive servers at the storefront (firewall, database, application, web) have hardened operating systems implemented either with a specific secure server or an add on software package.

Integrity is provided on the file transfer between the merchant and storefront with digital signatures implemented at the application server and fulfillment server.

Auditing services are provided in real time with Intrusion Detection Modules (IDM) on all critical services. Off line auditing is provided with operating system security scanning tools to identify vulnerabilities.

Fraud Services are provided by a separate company that specializes in secure payment technologies. The storefront will collect order and payment information from the customers, and will pass this information to the payment/fraud services company to check the credit card numbers for fraud attempts, and to approve and process the transactions. An encryption toolkit is used between the application server and the payment services architecture to secure the transactions between the two networks.

Implementation Considerations

Separation of duties is necessary to assure proper controls are both implemented and monitored. Security administration (adding/deleting users, updating system configurations, etc.) should be performed by a different person than security auditing (review of logs, running OS security scans, etc.)

A security policy is necessary to provide direction on what assets should be secured and what threats are of most concern.

Security standards are necessary to assure a consistent, secure configuration across multiple platforms and applications.

Administration procedures should be developed and implemented that clearly outline the procedures administrators must follow for user administration and system/security administration. Appropriate guidelines should be included with each procedure on the time required to perform it, and that time should be agreed to by the administrator and their manager.

Testing procedures and guidelines should be created for developing and maintaining application code and architecture configuration.

Training programs should be outlined for those individuals fulfilling security roles in the architecture. User training information should also be developed and distributed in an easy to read and implement manner. Special attention should be paid to the legal requirements for any disclaimer or policy statements which must be presented to the customer when accessing the storefront.

Decision Support 1016

Figure 123:
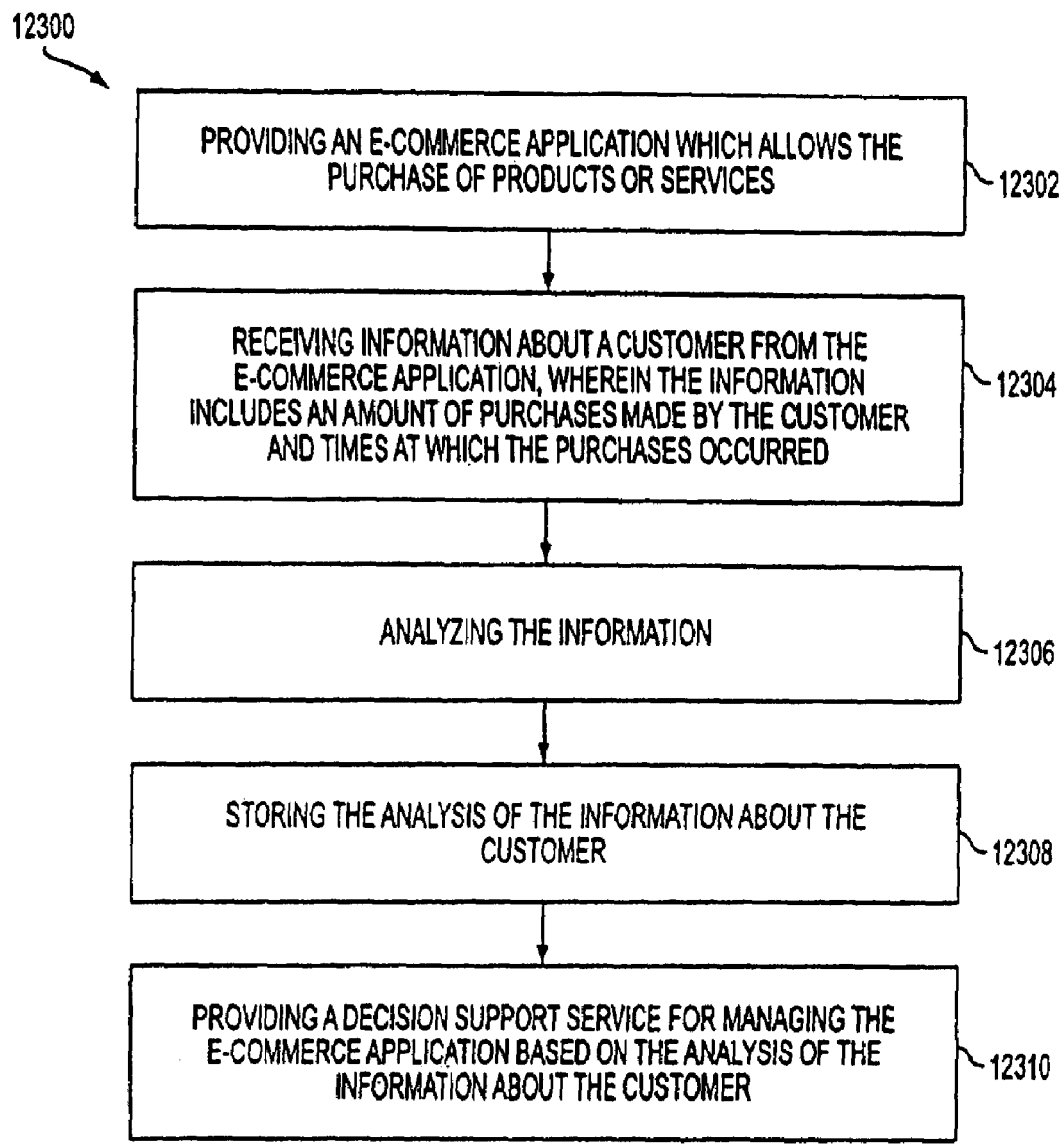
FIG. 123 illustrates a flowchart for a method for manipulating data about a customer in an e-Commerce environment in accordance with an embodiment of the present invention.

FIG. 123 illustrates a flowchart for a method 12300 for manipulating data about a customer in an e-Commerce environment. In operation 12302, an e-Commerce application is provided which allows the purchase of products or services. Information about a customer is received from the e-Commerce application and analyzed (see operations 12304 and 12306). This information includes an amount of purchases made by the customer and times at which the purchases occurred. The analysis of the information about the customer is stored in operation 12308 and a decision support service for managing the e-Commerce application is provided in operation 12310 based on the analysis of the information about the customer.

The information about the customer may be analyzed to identify a frequency and magnitude of purchases made by the customer. The decision support service may be designed to manage advertisements included with the e-Commerce application.

As an option, the decision support service may be designed to manage promotions included with the e-Commerce application. As an additional option, the information may also include demographics of the customer. Further, reporting tools may also be provided for reporting unfulfilled merchandise, sales tax, goods sold, back order items, sales forecasting, and activity on the e-Commerce application.

Figure 124:
FIG. 124 illustrates the Decision Support component of the eCommerce Application Framework in accordance with one embodiment of the present invention.

An optimized eCommerce implementation will allow the integration of eCommerce-related data to be used by a company's decision support system, shown in FIG. 124. ECommerce applications will generate an enormous amount of data about customer spending habits and other customer information. To leverage this information to its fullest extent, information systems should be integrated to allow the manipulation and evaluation of this data by the appropriate user groups.

The decision support services for an eCommerce solution are consistent with any other implementation. Listed below are some specific decision support services to consider in the context of an eCommerce application.

Customer Data Services

Services can be designed for capturing, analyzing, and storing customer behaviors.

The information gathered would be very similar to a profiling services described in complex personalization.

Market Data Services

Market Data Services are designed to analyze customer data. This data is used to accurately target promotions and advertising to the appropriate user groups. For example, marketing may be interested to know the demographics of the people browsing the eCommerce site to more effectively sell advertising.

Site Reporting

Site reports may enhance the overall efficiency of the site. Reporting tools and procedures should be put in place to at least cover the basic site needs. Some basic reporting needs may include transaction report, unfulfilled merchandise, sales tax, goods sold, back order items, sales forecasting and site activity.

Integration 1018

Figure 125:
FIG. 125 illustrates the Integration component of the eCommerce Application Framework in accordance with one embodiment of the present invention.

FIG. 125 illustrates the Integration component 9018 of the eCommerce Application Framework in accordance with one embodiment of the present invention. Integration will be a critical factor in the success and advancement of eCommerce. The topic of integration may be related to many aspects of eCommerce, each of which should be considered when assessing the enterprise's overall strategy.

Figure 126:
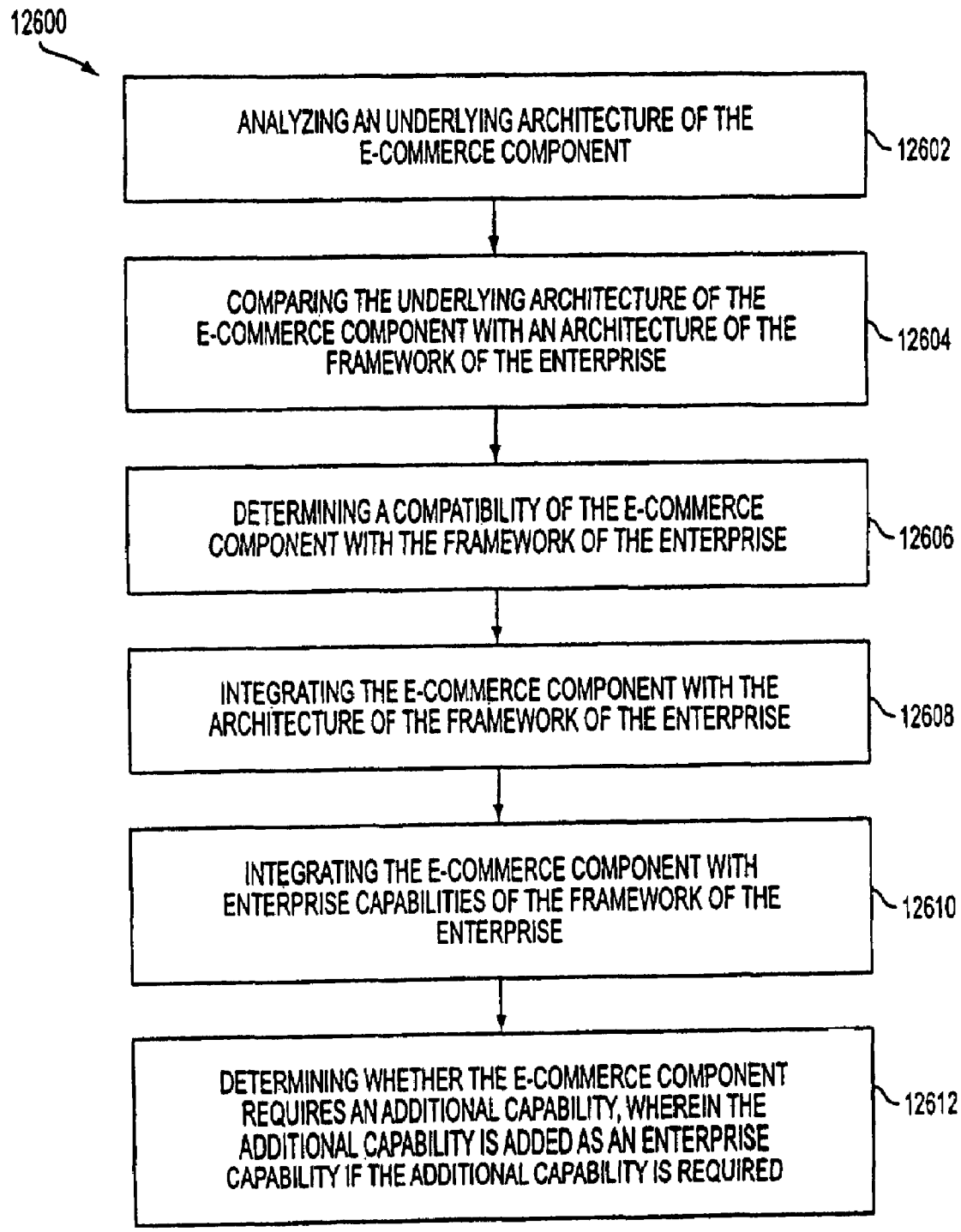
FIG. 126 illustrates a flowchart for a method for integrating an e-Commerce component into an existing framework of an enterprise in accordance with an embodiment of the present invention.

FIG. 126 illustrates a flowchart for a method 12600 for integrating an e-Commerce component into an existing framework of an enterprise. An underlying architecture of the e-Commerce component is analyzed and compared with an architecture of the framework of the enterprise in operations 12602 and 12604. A determination is made in operation 12606 as to whether the e-Commerce component is compatible with the framework of the enterprise. The e-Commerce component is integrated with both the architecture of the framework of the enterprise and with capabilities of the framework of the enterprise in operations 12608 and 12610. A determination is also made as to whether the e-Commerce component requires an additional capability in operation 12612. If so, the additional capability is added as an enterprise capability. Preferably, other applications of the framework of the enterprise can utilize the additional capability.

Custom HTML tags may be provided for enhancing a presentation of the e-Commerce component. Also, templates and/or wizards may be provided for creating e-Commerce applications and/or interfaces. Preferably, an integration of the e-Commerce component with data of the framework of the enterprise is performed.

Ideally, a business's eCommerce strategy should integrate into the business's enterprise strategy. Following the same logic, the eCommerce systems should also be integrated into the enterprise's architecture and systems. In most cases, eCommerce implementations are a separate entity, added in a furious haste with little consideration of integration with the enterprise. As a result, numerous integration patches need to be implemented to synch data (such as order, customer, and product) with the enterprise. Furthermore, this will result in additional maintenance as the enterprise strategy and eCommerce evolve. If the eCommerce strategy requires an immediate presence, a concurrent effort should be made to understand how the eCommerce systems should be integrated into the enterprise's overall strategy.

Ideally, the eCommerce strategy should be implemented as an enterprise system, integrated with the existing enterprise architecture, capabilities, and data. If the eCommerce system needs additional capabilities, these should be assessed and potentially added as enterprise capabilities. For example, if the enterprise does not support complex personalization, these capabilities should be introduced as an enterprise capability rather than just an eCommerce capability. Other enterprise applications could utilize these capabilities in the future.

External Enterprise Integration

In many cases the eCommerce implementation will span multiple enterprises.

Implementing a buyer-centric or trading partner type solution will involve multiple enterprises. In these cases, the integration aspect will often prove to be the key factor to the success of the implementation. Some of the key hurdles for a multi-enterprise system are:

Data model compatibility

Technical infrastructure

Messaging formats

Adoption hurdle; The addition of new trading partners should be a quick and easy process Collaborative environment promoting interactivity Implementation Considerations An eCommerce system can be added as a package or one component at a time. Here are some key considerations concerning package integration.

Underlying Architecture

The package's underlying architecture should be analyzed and compared with the enterprise's system.

Data Model

Does the package introduce a proprietary data model?

Commerce Capabilities

How much of the commerce capabilities does it provide? For example, in merchandising and transaction processing, how different are the commerce capabilities offered from those desired? Does it provide open API's?

Component Integration

The commerce package itself may need to integrate components such as payment systems, tax software or other components. Research on what options can be integrated may be important. Some packages may not be compatible with any other components and require use of their proprietary components.

Custom HTML Tags

Some packages will provide custom HTML tags in order to enhance the presentation. Utilization of these tags may result in a less open and more proprietary system. Be sure to understand the impacts using these tags may have (Will they work with all browsers? How will these be changed in future release?).

Templates and Wizards

Many of the eCommerce packages provide templates and wizards to create some of the basic eCommerce applications and interfaces. The templates and wizards may reduce some development time by providing this base. They should only be considered a starting point for the development of robust eCommerce applications. In most cases, creating an interface to the implementation's specific needs will require considerable additional customization.

The following portion of the specification discusses a bandwidth market according to an embodiment of the present invention. This embodiment is particularly applicable to the demand and supply planning aspect of the eCommerce Market Space. In the discussion, the bandwidth provider is the "manufacturer" as set forth above while the bandwidth distributor is the "service provider" as set forth above.

Bandwidth Market

Objectives of a Bandwidth Market

Four important trends seem to dominate the future of data networking. First, customers will have a growing number of options when selecting a network vendor and technology. New higher bandwidth network technologies are being introduced to take advantage of existing carrier infrastructures. Second, as vendors continue to build out their network infrastructure, bandwidth is becoming increasingly available and at lower costs. As more bandwidth becomes available, competition among vendors to capture market share will result in dramatically lower prices. This increase in competition among network vendors will undoubtedly change the market significantly. Third, vendors will start to shift to usage-based pricing structures. As competition increases, they will not be able to continue to reap profits from flat rate pricing schemes. Fourth, the popularity of the Internet is driving a trend in internetworking. As the technology moves forward, more and more networks will be joined to one another, resulting in seamless transport between networks.

One objective of the instant bandwidth market is to provide a more efficient mechanism for buying and selling network bandwidth. By providing a market in which distributors can trade bandwidth, the fundamental forces of supply and demand drive the appropriate prices for the bandwidth providers' services.

Place to Buy and Sell Bandwidth

Without a bandwidth market, if a customer subscribes to a distributor who offers a service that typically requires lower data rates, such as Internet access, the distributor may not have purchased enough bandwidth for other, more bandwidth intensive applications. If a customer decides that they want to use a bandwidth provider for higher bandwidth or more demanding QoS applications such as video conferencing, their distributor may not be able to provide high enough access rates or guaranteed service levels within the customer's Location Area Code (LAC). Without knowing all possible services that its customers may use, a distributor is unable to purchase appropriate bandwidth and service levels to satisfy all requests.

In a similar situation, if a consumer in a first location wants to make a video call to someone in a second location and pay for the call, unless their Distributed Virtual Network Service (DVNS) has purchased bandwidth in the LAC of the second location, a bandwidth provider can not complete the call. This limitation has serious implications. First, many applications can not to traverse DVNS boundaries, forcing a customer to only communicate with others who share their same distributor. Second, as most distributors are probably be focused on offering a single service (e.g. DSS TV or Internet access), their customers can not access other services on a bandwidth provider's network. The bandwidth provider can become a network dedicated to singular functions. People who wish to access multiple services may need to subscribe to more than one distributor, and may require additional Customer Premise Equipment (CPE).

In order to allow customers to access any location or service on bandwidth providers' networks, it is necessary for distributors to be able to buy and sell bandwidth. If a customer wants to make a video call to a location in which its distributor does not have bandwidth, the DVNS should be able to purchase bandwidth from another distributor who has excess capacity. Ideally, this could be done on a real-time basis so that customers can immediately access the location or service. Not only does this provide a mechanism for customers to cross DVNS geographic and service boundaries, but it also provides a way for distributors to sell off their excess bandwidth. As distributors can now sell off unused bandwidth in a secondary market, they are more likely to purchase additional wholesale capacity. Like other commodities, bandwidth could be traded among distributors, ultimately resulting in an efficient market.

In addition to reducing risk for distributors, a bandwidth provider could also use the market to post excess wholesale capacity.

Efficiently Priced Bandwidth

Another major benefit of a bandwidth market is its ability to efficiently price bandwidth. As distributors buy and sell capacity, the price of the bandwidth moves towards a market equilibrium where supply hits demand.

As bandwidth is traded by service level guarantees and LAC, this eliminates some of the complex analysis that distributors need to perform in order to determine fair market prices. In addition, by analyzing sales in the bandwidth market, a bandwidth provider is able to accurately gauge demand and price bandwidth in each location. Taken a step further, a bandwidth provider could post all of its bandwidth on a wholesale market instead of negotiating directly with each distributor. Distributors could then bid for this bandwidth, resulting in efficient wholesale pricing in which the bandwidth provider maximizes its revenues.

A market for trading bandwidth virtually eliminates the difficult pricing problems faced by a bandwidth provider's marketing department. In addition, distributors have the ability to sell off excess bandwidth, reducing their risk significantly. To further reduce risk, a futures market could be established allowing distributors to hedge bandwidth purchases. This would allow distributors who are mainly interested in selling value added service to their customers to avoid fluctuations in bandwidth prices.

Assists with Roaming

The ability of a DVNS to purchase another distributor's bandwidth has an additional impact for roaming, which is sometimes referred to as "nomadicity." One of the goals of a bandwidth provider may be to allow a customer to take their Subscriber Identifier Module, or SIM card, and plug it into another CPE when they are on the road. This would allow a business traveler to plug his or her SIM card into a hotel's CPE to access the bandwidth provider's network. However, if the hotel CPE does not have enough bandwidth available to support the business traveler's application, its DVNS could purchase the extra capacity on the bandwidth market.

Avoid Expensive Bilateral Agreements

Without the instant bandwidth market, distributors have to negotiate independent contracts with each DVNS that manages CPEs with content that their customers access. This may require hundreds of bilateral agreements among distributors. As these bilateral agreements may be difficult and costly to negotiate, many distributors would not allow their customers to access certain services unless their is enough critical mass to warrant a contract.

In addition, distributors would have to negotiate with other distributors every time that they want to resell their excess capacity. This too could result in hundreds of bilateral agreements, and could be costly to negotiate and administer. Dispute resolution could also present a major problem.

With the bandwidth market, distributors can avoid costly bilateral agreements. The market provides an efficient means of trading bandwidth among distributors. As distributors would enter into a contract with the market, they do not have to negotiate with each DVNS that they ultimately trade with. The bandwidth market also serves as an equalizer, giving small distributors the same ability to purchase bandwidth as larger providers. By allowing a smaller DVNS to purchase bandwidth, it could provide its customers with the same access as larger distributors. A bandwidth provider could benefit by selling wholesale capacity on the bandwidth market, avoiding periodic negotiations with hundreds of distributors.

Establish Bandwidth Contracts

Another benefit of the bandwidth market is its handling of contracts. To allow the market to operate efficiently, bandwidth could be packaged and traded as contracts. In order to package bandwidth, it may be necessary for the bandwidth market to define products. These products are based on a combination of bandwidth (or cell counts), location, service level guarantees, time of day, duration, and other factors. Although establishing these structures is a complex task, it is much easier for the bandwidth market to go through the steps of defining these packages once, rather than distributors worrying about them every time that they negotiate with other providers. This simplifies the sales process dramatically.

Once a contract has been purchased, the DVNS issues a Contract ID to its customer's CPE during call setup. In addition to defining bandwidth, service level guarantees, and duration, the contract also determines who pays for the call (e.g. calling party pays, collect call, etc.). As the contract is purchased at an agreed upon price, this price provides rating information that can be used for billing purposes. When the contract is executed, the CPE reports usage data back to the DVNS. This usage data includes the Contract ID, allowing the DVNS or a settlements process to correlate the call back to the original transaction. As the contract is recorded at the time of the transaction, this information could be forwarded to the distributors, the bandwidth provider, and a clearinghouse for processing. This simplifies the revenue allocation process, by providing clear information for rating, billing, and settling the call.

One advantage of having call setup based on contracts is that the CPE is given a well defined call duration and total cell or bit count. As the DVNS steps out of the picture after call setup, the CPE is responsible for making sure that it does not exceed these agreed upon thresholds. If the CPE reaches the maximum duration or cell count, it automatically terminates the call. While ATM does require the CPE to shape its traffic to conform with the Peak and Sustainable Cell Rates and the transfer capabilities agreed upon during call setup, it does not define the call duration or maximum traffic transfer. The bandwidth contract does a nice job in filling this gap, and is ideal for supporting pre-paid calling structures (e.g. credit or debit card).

Another benefit of the bandwidth contract is that it specifies agreed upon service levels for call setup. After the call has been completed, usage data can be analyzed to see if these service levels have been met. This allows a bandwidth provider and its distributors to provide customers with Service Level Agreements that may have penalty clauses for violations.

Bandwidth Market Structure

The following is a discussion of exemplary embodiments of the bandwidth markets.

Bandwidth provider vs. External secondary market

Even if a bandwidth provider is not willing to develop and operate a bandwidth market for buying and selling its services, it is very possible that a third party may fill the gap. If a bandwidth provider is unable to accurately price bandwidth, inefficiencies in pricing bandwidth result in arbitrage opportunities. Like airline ticket aggregators, speculative distributors could start buying up under priced bandwidth and selling it to other distributors. These transactions are initially handled by bilateral agreements. As transaction volumes increase, distributors start to form groups of trading partners. Applications are developed to streamline the process of trading bandwidth. Eventually, a bandwidth market for a bandwidth provider's services will evolve out of these alliances.

If a bandwidth provider decides not to develop the bandwidth market, the alternative market that develops may have some negative aspects. First, the larger the number of bilateral trading agreements, the greater the likelihood for error. If two distributors misunderstand one another, it is possible that each DVNS may assign the same bandwidth allocation to different customers. This could result in an oversubscription of services.

Second, trading alliances may exclude smaller or less political DVNSs, ending up with an "Old Boys Network" of distributors dominating the market. This could result in a small oligopoly dictating bandwidth pricing, potentially forcing other distributors out of business. As one would expect, losing control of pricing for a bandwidth provider's services could have dangerous consequences.

Rather than let another organization establish a market for trading bandwidth, a bandwidth provider could develop the bandwidth market itself. In addition to keeping control of bandwidth pricing, the bandwidth provider could earn additional revenue by charging trading transaction fees. When coupled with clearing functions, this market could prove an important selling point for attracting distributors. By offering a simple and controlled mechanism for reselling excess bandwidth, the bandwidth provider reduces the risk faced by distributors of purchasing too much bandwidth. A distributor may be more likely to offer the bandwidth provider's services if they know that a bandwidth market is available to buy and sell excess capacity, and it is managed and operated by the wholesale provider.

Open and Closed Markets

The most efficient way to trade bandwidth is to have one market for all participants. However, in order to encourage "Charter Customers," bandwidth providers may need to offer special rate structures and benefits to potential distributors. Once the bandwidth market is established, many of the benefits, such as bandwidth contracts and CPE traffic shaping, will be useful even for distributors who have large discount structures. Rather than create custom purchasing mechanisms for these customers, they could use the same processes and applications that the market uses for buying and selling bandwidth, even if they are dealing exclusively with only one bandwidth provider. Because of the standardized process for selling bandwidth, a bandwidth provider can avoid having to develop custom interfaces for each of its large distributors.

There may still be a need for the establishment of bilateral agreements between a bandwidth provider and its "Charter Customers." In addition, many distributors who specialize in the same value added services but in different regions, may want to establish private trading blocks. For example, as video conferencing providers have similar bandwidth needs, they may want to establish a closed market for trading among themselves. This would allow them to focus on similar type bandwidth contracts in different regions of the world, and is somewhat analogous to cellular roaming agreements.

Figure 127:
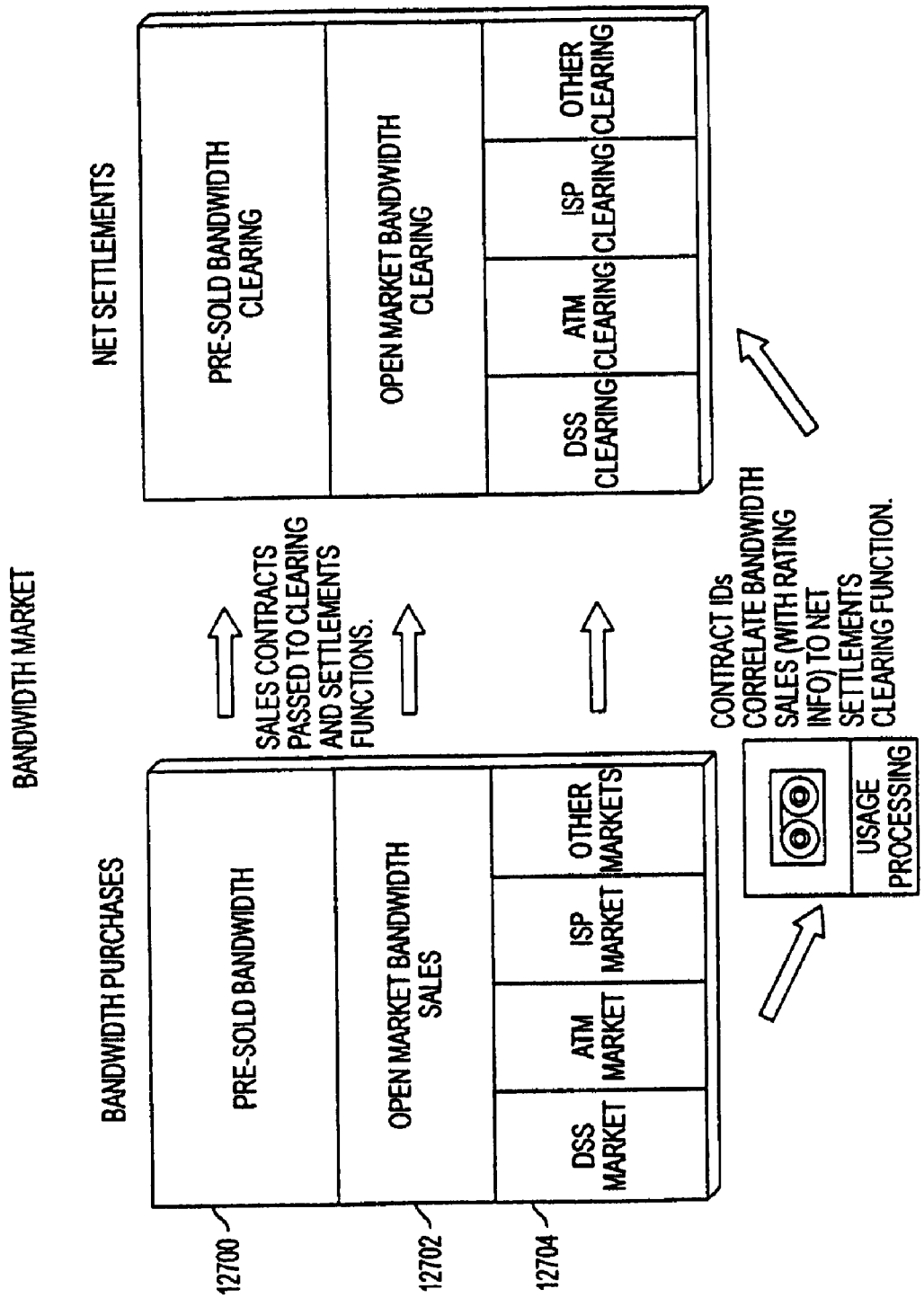

For these reasons, the bandwidth market may be segmented into multiple trading floors or markets. As shown in FIG. 127, the top level segment would be a Pre-Sold bandwidth market 12700. This would be the vehicle that a bandwidth provider could use to privately sell long term contracts to larger distributors. Bandwidth sales in this market can be pre-negotiated between the bandwidth provider and the distributor. The market would be used to record and track these transactions.

The next segment would be the Open Market Bandwidth Sales 12702. This market would be used by distributors to post the excess bandwidth that they wish to sell. In addition, any bandwidth that a bandwidth provider has not sold under pre-negotiated agreements could be posted to this market. As this market segment is open to all of the distributors, it should be an efficient market in which pricing is established at the point where supply hits demand.

Figure 128:
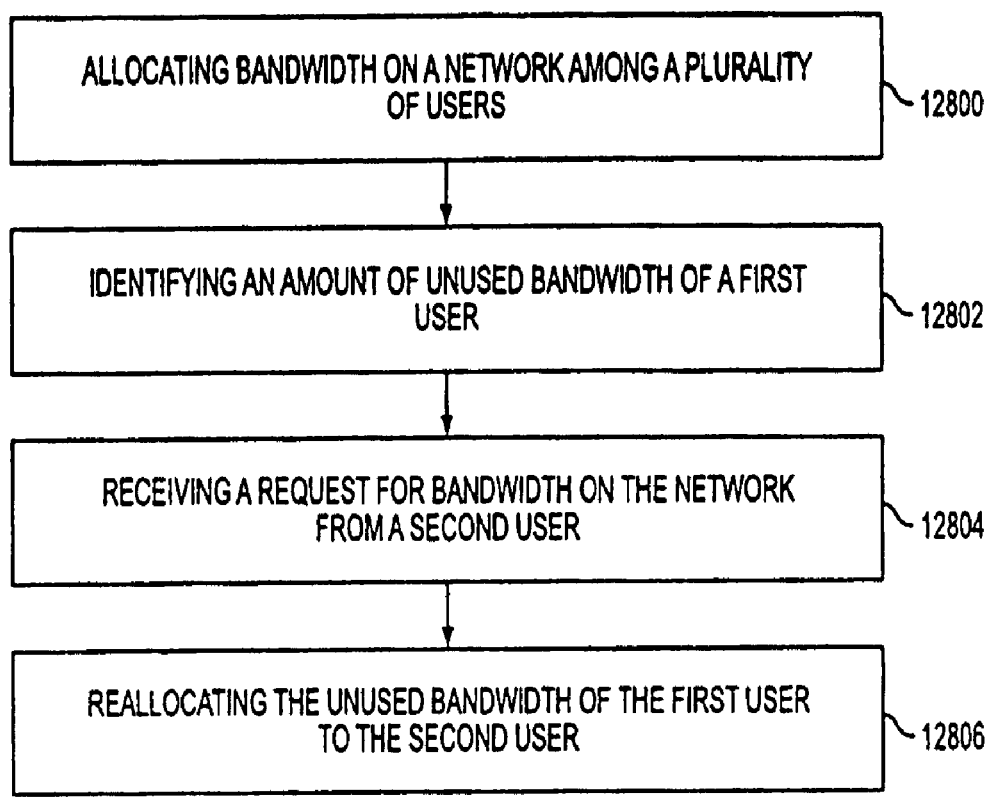

FIG. 128 illustrates one method of providing an open market environment in accordance with the principles set forth hereinabove. In operation 12800, bandwidth is allocated on a network among a plurality of users, i.e., distributors. For example, bandwidth could be allocated based on an amount of bandwidth the users purchase. Or bandwidth could be allocated based on a contract, such as an allotment of a predetermined amount of bandwidth per period, e.g., month, year, etc.

Figure 129:
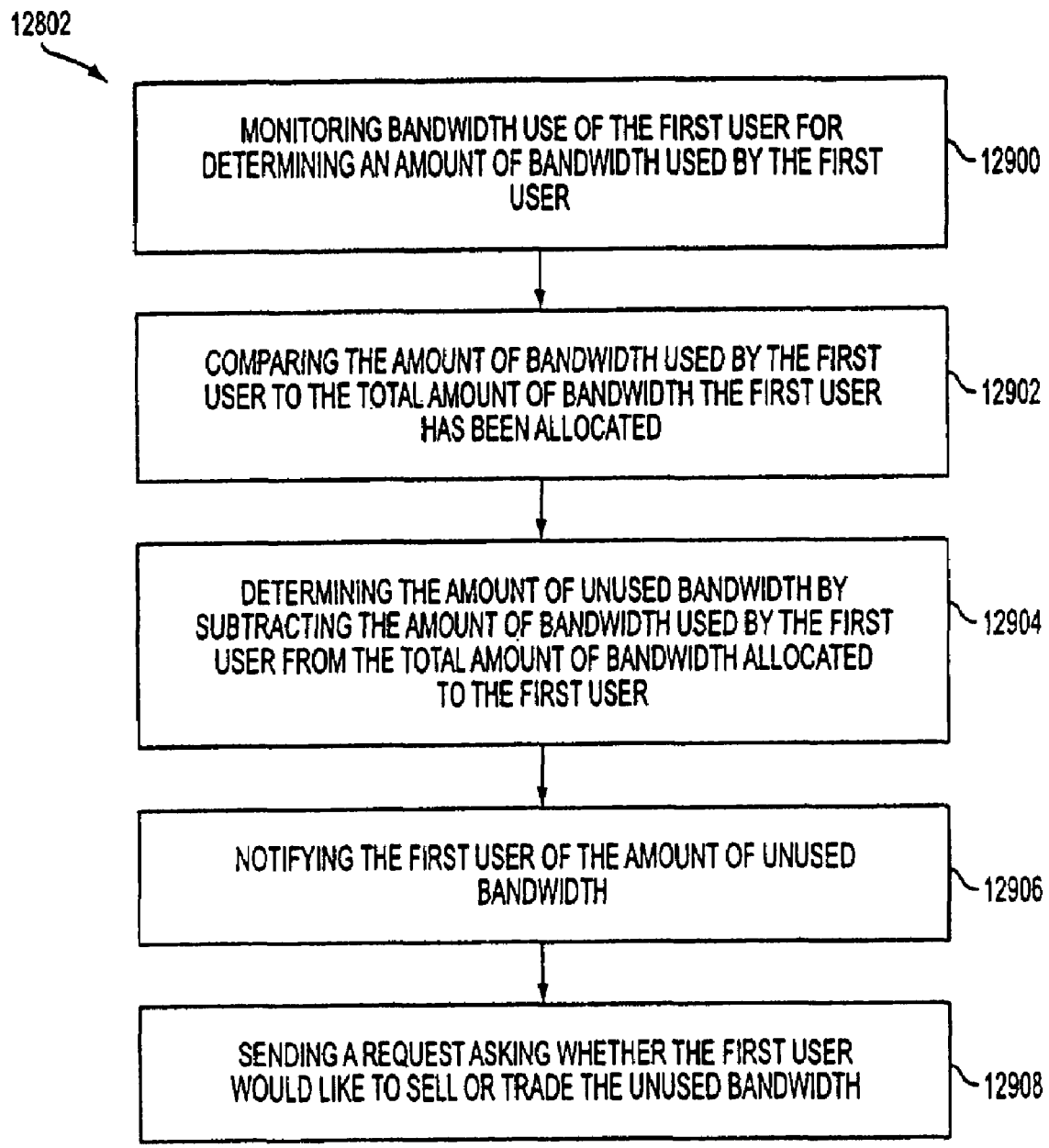

In operation 12802, an amount of unused bandwidth of a first user is identified. FIG. 129 illustrates a method of automatically identifying the first user's unused bandwidth. In this example, unused bandwidth is identified by monitoring bandwidth use of the first user to determine an amount of bandwidth used by the first user in operation 12900. In operation 12902, the amount of bandwidth used by the first user is compared to the total amount of bandwidth the first user has been allocated. The amount of unused bandwidth is determined in operation 12904 by subtracting the amount of bandwidth used by the first user from the total amount of bandwidth allocated to the first user. The first user would then be notified of the amount of unused bandwidth in operation 12906 and sent a request in operation 12908 asking whether the first user would like to sell or trade the unused bandwidth.

Figure 130:
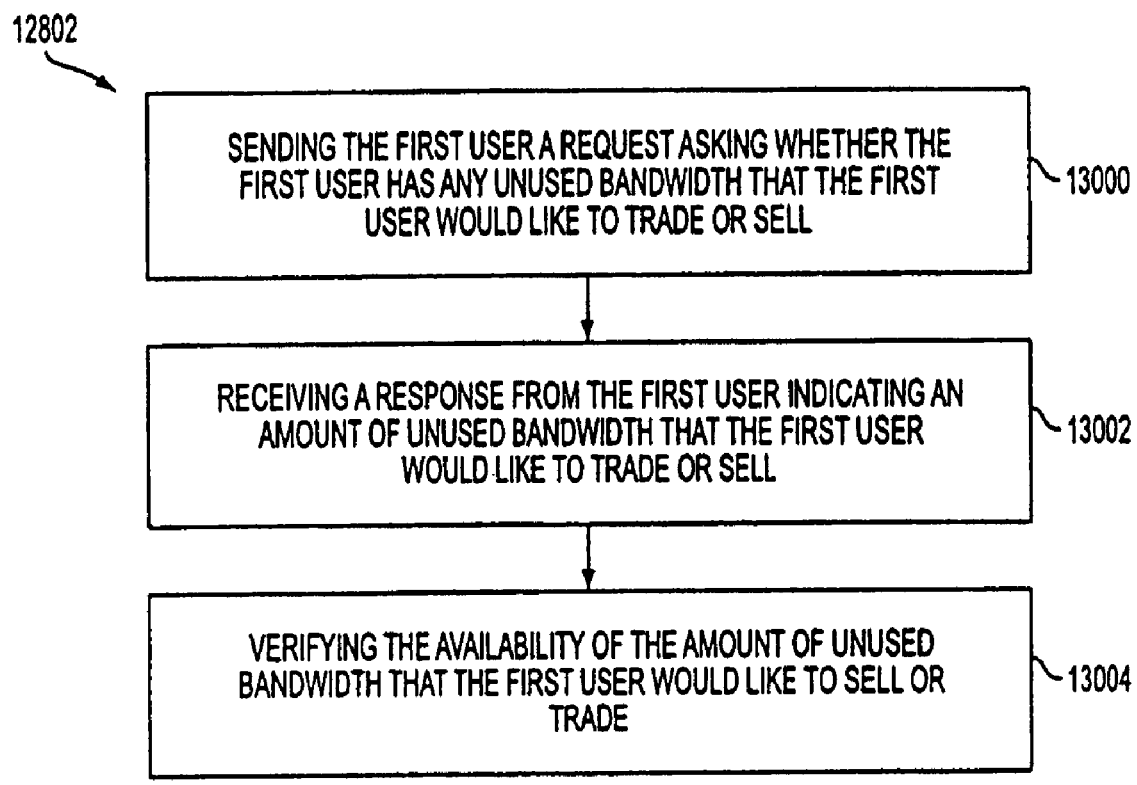

FIG. 130 illustrates another exemplary method of identifying the amount of bandwidth of the first user, as set forth in operation 12802 of FIG. 128. In operation 13000, the first user is sent a request asking whether the first user has any unused bandwidth that the first user would like to trade or sell. A response from the first user indicating an amount of unused bandwidth that the first user would like to trade or sell is received in operation 13002. The availability of the amount of unused bandwidth that the first user would like to sell or trade is verified in operation 13004.

Referring again to FIG. 128, a request for bandwidth on the network is received from a second user in operation 12804. The request may be received before or after the amount of unused bandwidth is identified in operation 12802, above. The request may be directly received from the second user or an agent of the second user. Alternatively, the second user, or all of the users, may be notified of the amount of unused bandwidth available. The second user may be notified in any of a multitude of ways. For example, a listing of available unused bandwidth that is for sale or trade by any number of users may be compiled and displayed or sent to some or all of the users of bandwidth. The listing could be complex or as simple as a listing on a web site with the price and name and contact information of the first user. Once the user is notified, a response from the second user as to the amount of unused bandwidth the second user would like to purchase or trade for would be awaited and received.

In operation 12806, the unused bandwidth of the first user is reallocated to the second user. In other words, the second user is given control of the unused bandwidth to use, reserve, or trade or sell. The bandwidth provider may be contacted and told to reallocate the bandwidth by terminating the first user's access to the unused bandwidth and giving the second user access to the bandwidth. Alternatively, access codes that would have been used by the first user to access predetermined amounts of bandwidth corresponding to the unused bandwidth being reallocated may be turned over to the second user to permit the second user to access the bandwidth.

Figure 131:
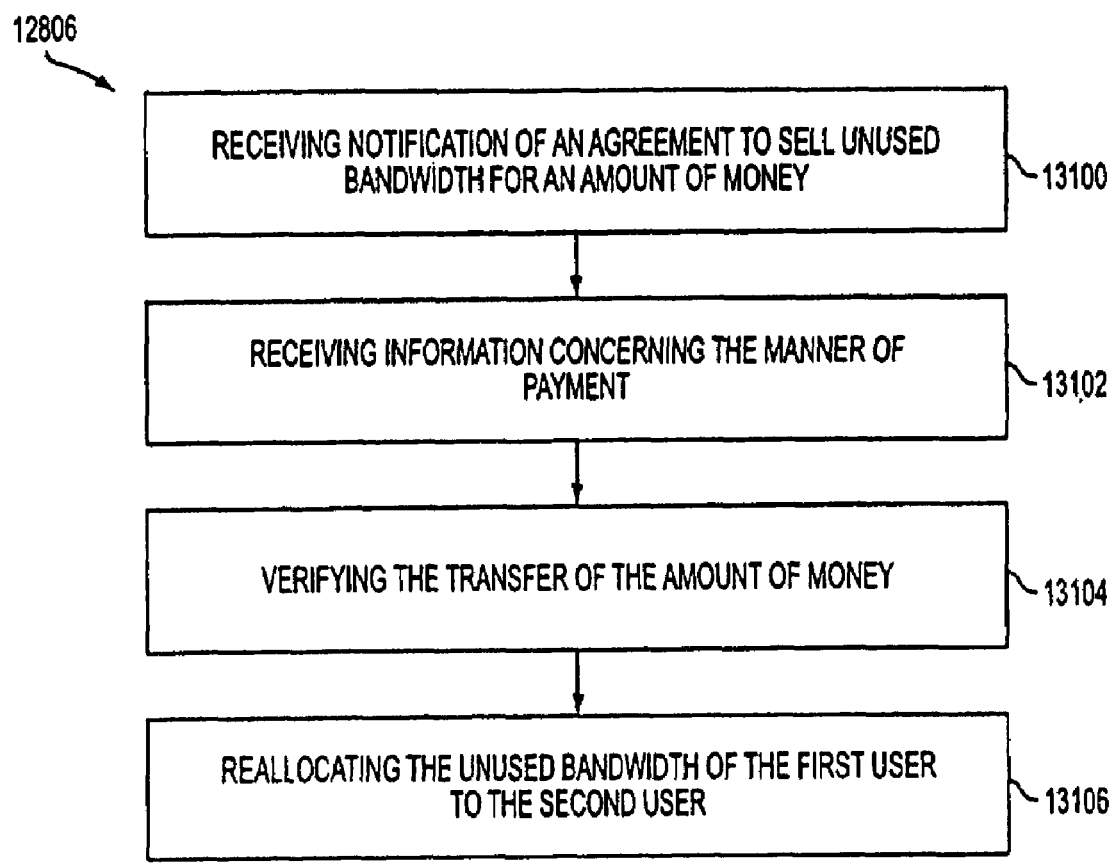

In one embodiment of the present invention, the unused bandwidth that is reallocated to the second user in operation 1280131 of FIG. 128 is done so in exchange for money paid by the second user to the first user. In FIG. 131, a method of exchanging money for bandwidth is illustrated. In operation 13100, notification of an agreement to sell bandwidth for an amount of money is received. Information concerning the manner of payment is received in operation 13102. This information includes how the second user is going to pay for the bandwidth. For example, access information of a bank account or of a credit line could be received from the second user, which would be used to perform an electronic transaction of money from the second user's account to the first user. In operation 13104, the transfer of money is verified such as by receiving an electronic receipt from the bank of the first user which acknowledges a deposit of the money. In operation 13106, the unused bandwidth of the first user is reallocated to the second user.

Further, a transaction fee may be charged for reallocating the unused bandwidth. The transaction fee may be a percentage of the total value of the bandwidth traded or sold, a flat fee charged per transaction, or a flat fee charged per unit of bandwidth.

In another embodiment of the present invention, the unused bandwidth of the first user is packaged with unused bandwidth of another user and reallocated to the second user under the terms of a contract, as discussed above in the "Establish Bandwidth Contracts" section hereinabove. This would allow a second user who requires more unused bandwidth than the first user has available to satisfy the second user's requirements.

Looking again to FIG. 127, the remaining segments at the lowest level are the Closed Markets 12704. These markets would be established to allow vendors who offer similar services (e.g. DSS TV, ISPs, etc.) to trade among themselves. In some instances, a bandwidth provider may be given the right to post excess bandwidth that fits predefined contract profiles to some of these markets. The bandwidth market could be modeled on either an auction concept or as commodities markets.

All transactions in the foregoing markets can result in a bandwidth contract. These contracts provide an effective mechanism for tracking bandwidth sales, and are very useful during the rating and settlements processes.

Static vs. Real-time Bandwidth Purchases

In an exemplary model, a bandwidth provider requires distributors to purchase wholesale Priority 1 and 2 traffic at least 24 hours before the time that it is needed. This means that distributors may be forced to estimate their bandwidth requirements for the following day. As the Internet outage during the last US presidential elections suggests, bandwidth demand may fluctuate significantly for a number of external reasons. In certain instances, it may not be possible to the distributors to predict demand. While the bandwidth market may provide a good mechanism for determining price when the next day's demand is known, it does not help in situations of great uncertainty.

In addition to causing problems for distributors in tracking and estimating customer demand, the 24 hour advanced bandwidth model could be problematic for the bandwidth provider. Just as distributors may not be able to predict the next day's demand, the bandwidth provider may not be able to determine the optimal price of the bandwidth. While a static bandwidth market based on contracts negotiated 24 hours in advance of their actual execution may certainly help determine pricing, the 24 hour requirement may result in some inefficiencies. On a similar note, although the bandwidth market reduces risk by providing a mechanism for reselling excess capacity, the 24 hour rule results in a one day liability to distributors.

Another problem with the 24 hour requirement is that it does not allow a customer to transparently access irregular services or locations. If a customer decides that they want to call an unusual location or access a service that has not been pre-negotiated by their DVNS, they may have to call up their distributor to have them acquire the appropriate service for the next day. A customer in the United States may not be willing to contact its service provider 24 hours in advance to setup a video conference call to someone in Botswana.

What is needed to solve these problems is the capability to purchase bandwidth in real-time. By giving the distributor the ability to buy and sell bandwidth in real-time, an efficient market can be created in which revenues are maximized. The value of the bandwidth is allowed to "float" based on supply and demand. This would also be much more efficient than a static market, where the price is set or buyers are allowed to bid over time with the highest bid taking the bandwidth, because the bandwidth could be purchased immediately and perhaps below the price that would otherwise be asked for the bandwidth in a static market. The mechanics for negotiating real-time bandwidth contracts is outlined hereinafter.

While a real-time bandwidth market is very desirable, it does not negate the benefits of a static bandwidth market. Although a static bandwidth market does not result in the same pricing efficiencies that can be realized in a real-time market, it still offers benefits to the bandwidth provider and its distributors. As the market provides a mechanism to buy and sell excess bandwidth, distributors may be more apt to commit to large, long-term commitments. In addition, although customers may need to call a day in advance to access a service or location, this is better the not having access. Distributors are also relieved of the burden of having to negotiate hundreds of bilateral agreements. As discussed below, the bandwidth contracts that are traded in the market are very useful for rating and settlements processing.

Contract Negotiation During Call Setup

Figure 132:
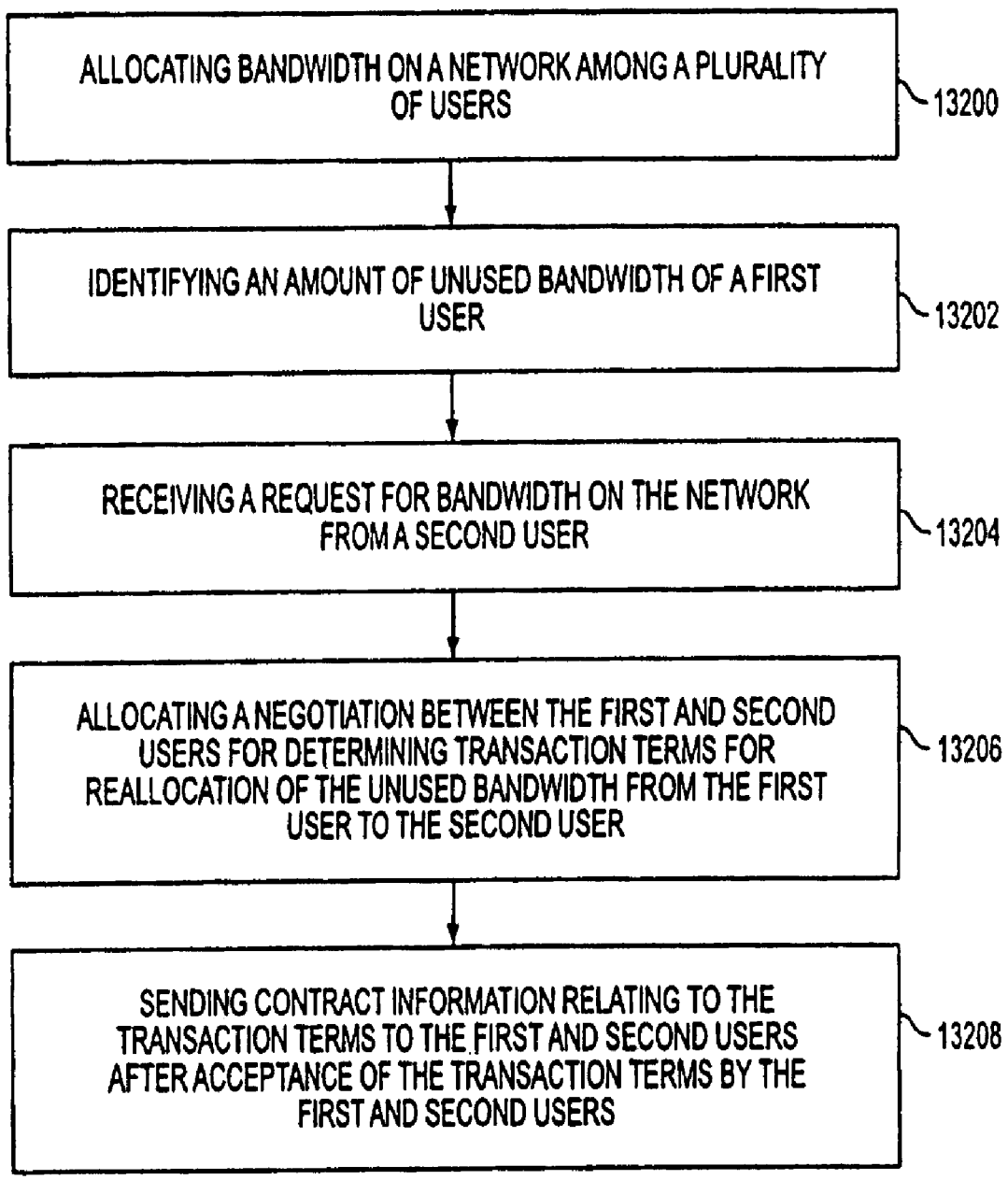

In order to support a real-time bandwidth market, it may be necessary to include contract negotiation in the call setup process. FIG. 132 illustrates a contract negotiation process. In operation 13200, bandwidth on a network is allocated, i.e., sold or traded in allotments, among a plurality of users. In operation 13202, an amount of unused bandwidth of a first user is identified. A request for bandwidth on the network is received from a second user in operation 13204. It should be noted that operations 13200–13204 may be accomplished by any means including those specified hereinabove with respect to operations 12800–12804 of FIG. 128.

Then, a negotiation between the first and second users is allowed in operation 13206 to determine transaction terms for reallocation of the unused bandwidth from the first user to the second user. In its simplest form, one embodiment of the present invention would simply receive pricing information from one user and send it to the other user, and vice versa, over and over until each user is satisfied with the terms for the transaction. Upon acceptance of the transaction terms by the first and second users, contract information relating to the transaction terms is sent to the first and second users in operation 13208. Optionally, the terms may set forth in a contract format which the first and second users may agree to form a contract. Alternatively, acceptance of the terms of the transaction may be an acceptance of a contract including the terms of the transaction, and the contract information is a recitation of the terms of the contract.

In one embodiment of the present invention, the contract information defines the amount of unused bandwidth, a duration of use of the unused bandwidth, a service level, and/or a price. Optionally, a transaction fee may be charged for allowing the negotiation between the first and second users. Further, the step of allowing the negotiation between the first and second users may occur in real time. In another aspect of the present invention, the contract information is sent to a third party after the third party requests bandwidth from the second user. Furthermore, the contract information may include a contract identifier.

Figure 133:
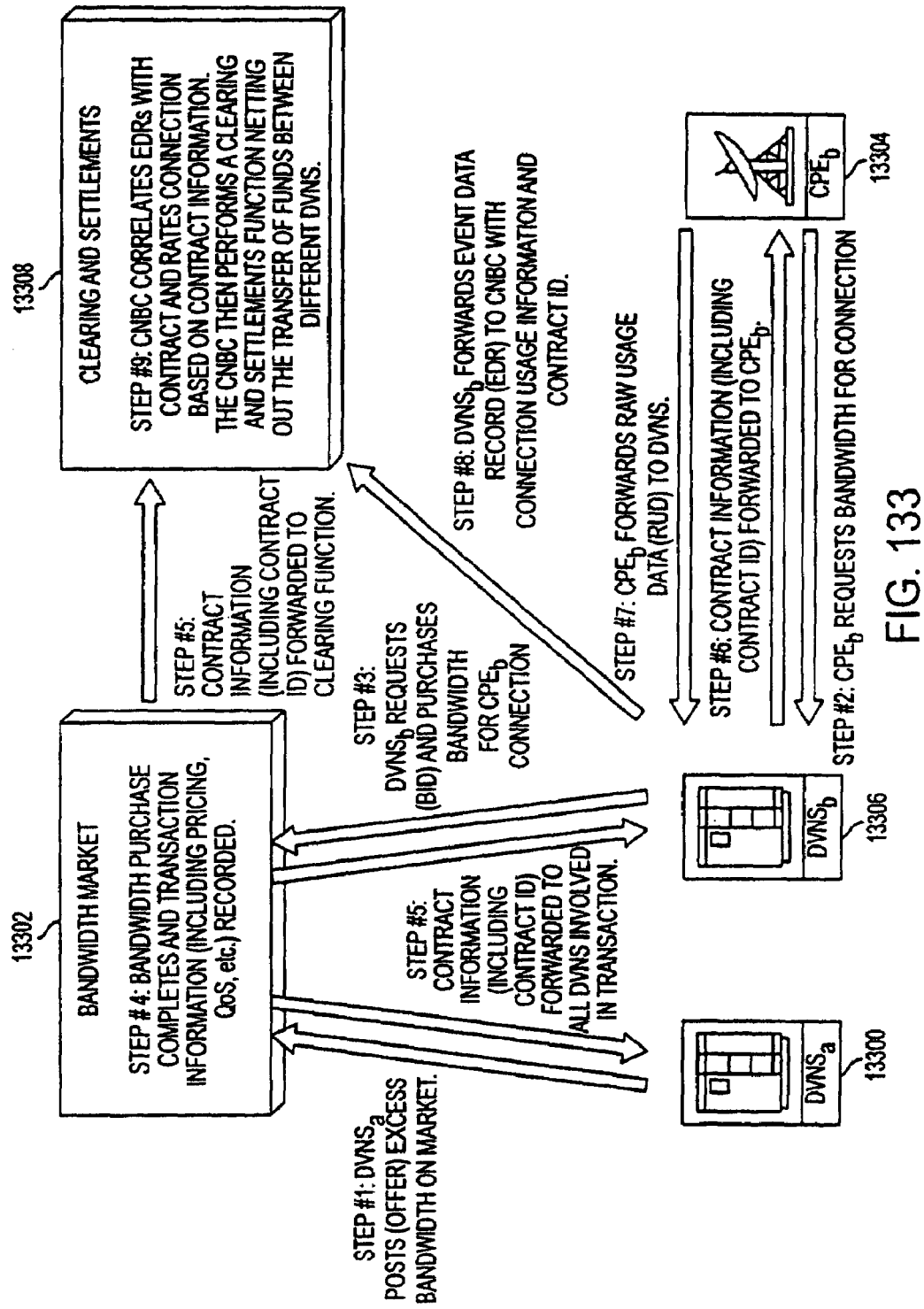

FIG. 133 outlines the exemplary contract negotiation of FIG. 132 in more detail.

In Step #1, a DVNS 13300 that has purchased too much bandwidth packages their excess capacity and posts it to one of the segments on the bandwidth market 13302. When a customer call request comes in and the distributor 13304 does not have the bandwidth available (Step #2), its DVNS 13306 first determines the appropriate call parameters. It then bids on and purchases bandwidth from the bandwidth market 13302 (Step #3). The bandwidth market 13302 completes and records the transaction (Step #4), and forwards the contract information, including bandwidth, location, service levels, and Contract ID, to each DVNS 13300, 13306 involved in the transaction (Step #5). The information is also forwarded to the rating, clearing, and settlements processes in the Network Business Center (CNBC) 13308. When the information is successfully received by the DVNS 13306, the contract information, including the Contract ID, is forwarded to the CPE 13304 along with other call setup information (Step #6). After the call is established, the CPE 13304 periodically sends cumulative Raw Usage Data (RUD) information to its DVNS 13306 (Step #7). Either at the end of the call or an appropriate interval, the DVNS 13306 cuts an Event Data Record (EDR) and forwards it to the Network Business Center (CNBC) 13308 (Step #8) for rating and settlements processing (Step #9).

One of the advantages of the present process is that the CPE can use standard call setup signaling assuming that it is similar to the Q.2931 method used by ATM. When a call request arrives at the DVNS, the call parameters and bandwidth requirements are assessed. The customer is first validated by the DVNS, which also checks to see if they are allowed to request this service. If the request is valid and the DVNS has available resources as a result of other contracts (which may be from long-term bandwidth purchases made in the Pre-Sold bandwidth market), the DVNS may complete the call and pass the Contract ID back to the CPE in a User-Defined Information Element (1E) using standard Q.2931 signaling. If the DVNS does not have the appropriate bandwidth available, it may temporarily suspend the call setup process and purchase the bandwidth using the process outlined above. Assuming the DVNS successfully purchases the resources, it may forward the Contract ID specified by the transaction to the CPE and complete the call setup process. All calls may require a Contract ID to complete. If for some reason the bandwidth is not available, the DVNS may reject the call and notify the CPE that resources were not available.

It should be noted that ATM is designed to allow the customer to renegotiate call parameters, such as Peak Cell Rate and Sustainable Cell Rate, even after the call is established. If a bandwidth provider plans to fully support ATM, a different contract may be required to satisfy an upgrade request. This may require that the DVNS has the ability to renegotiate in the middle of a call. As the call may have two or more Contract IDs, the DVNS could close out an EDR record and treat the remainder of the connection as a new call assigning a new EDR.

In evaluating the real-time purchasing of bandwidth during call establishment, one pertinent area is the time required to complete a transaction. As many protocols such as ATM have timeout values for call setup, it may be necessary to stay within these specifications. These timeout values are typically high to accommodate network congestion. In addition, some of these values can be tuned by vendor equipment.

Setting CPE Thresholds

One of the advantages of the bandwidth market and bandwidth contracts is the ability to control CPE usage patterns. As a DVNS may need to assign a contract to complete all call setups, information in this contract can be passed to the CPE. Based on a variety of factors such as the customer's credit limit, the CPE can be instructed to terminate a call when it hits certain thresholds. These thresholds could be based on call duration or cell counts. This may be an excellent mechanism for supporting pre-paid billing.

In addition, the DVNS may be configured with certain cost thresholds for a particular customer. When establishing an account, the customer could instruct the DVNS not to allow video conference calls if the rate is greater than $1.00 a minute. If the DVNS is unable to satisfy a call request within certain pre-defined thresholds, the CPE may be instructed that the resources are not available, possibly notifying the customer the reason that the call could not be setup (e.g. rates too high). With little effort, this could be extended to allow the customer to configure the information directly into the CPE, which in turn would pass it to the DVNS in User Defined Information Elements during call setup.

Hot Billing

Another advantage of bandwidth contracts are their ability to support hot billing. By requiring a contract in order to complete a call, the DVNS could take advantage of pricing information inherent in the agreement. If the DVNS forwards this pricing information along with the contract to the CPE, this would allow the CPE to notify the user on a real-time basis how much they have spent during the call. In addition, because the rating information accompanies the bandwidth contract, the DVNS can calculate the cost of the service and debit the user immediately.

It is important to note that taxation may need to be evaluated if the bandwidth provider supports this model.

Clearinghouse Function

In addition to providing markets to buy and sell bandwidth, the bandwidth provider may also provide a clearinghouse function. As all usage data may be tagged with a Contract ID, the contracts generated in the bandwidth market may be excellent tools for rating calls and determining revenue allocation. These contracts may be forwarded to the rating and settlements engines, providing important information needed for each of these processes. Usage data may be correlated to the appropriate contract, which may provide rating information, service level guarantees, and revenue allocation information. This information may be used by the rating and net settlements processing.

As different bandwidth market segments may have different contract structures, it may make sense for the clearinghouse function to mimic the bandwidth market structure. Pre-Sold Bandwidth of a bandwidth provider could be cleared by a Pre-Sold Bandwidth Clearing function. Likewise, the Open and Closed markets could have their own clearing functions. Eventually these may feed into one larger clearing process, which provides net settlements functions between a bandwidth provider and its distributors.

One of the key functions of the clearinghouse is to offer a mechanism to bill back services between distributors. If a DVNS in Thailand purchases bandwidth from an American distributor in order to complete a video call to the United States, the American distributor needs some mechanism for receiving payment from the Thai DVNS. As all distributors must deal with a bandwidth provider at some level, it makes sense for the bandwidth provider to provide clearing functions between distributors. The clearing function may allow the US DVNS to bill the Thai DVNS for the bandwidth that it used. The Thai DVNS may then bill its customer for the call. By leveraging a bandwidth provider's fiduciary relationship with each DVNS, the bandwidth market, when coupled with a clearinghouse function, provides a mechanism for one distributor to indirectly bill another distributor's customers.

Figure 134:
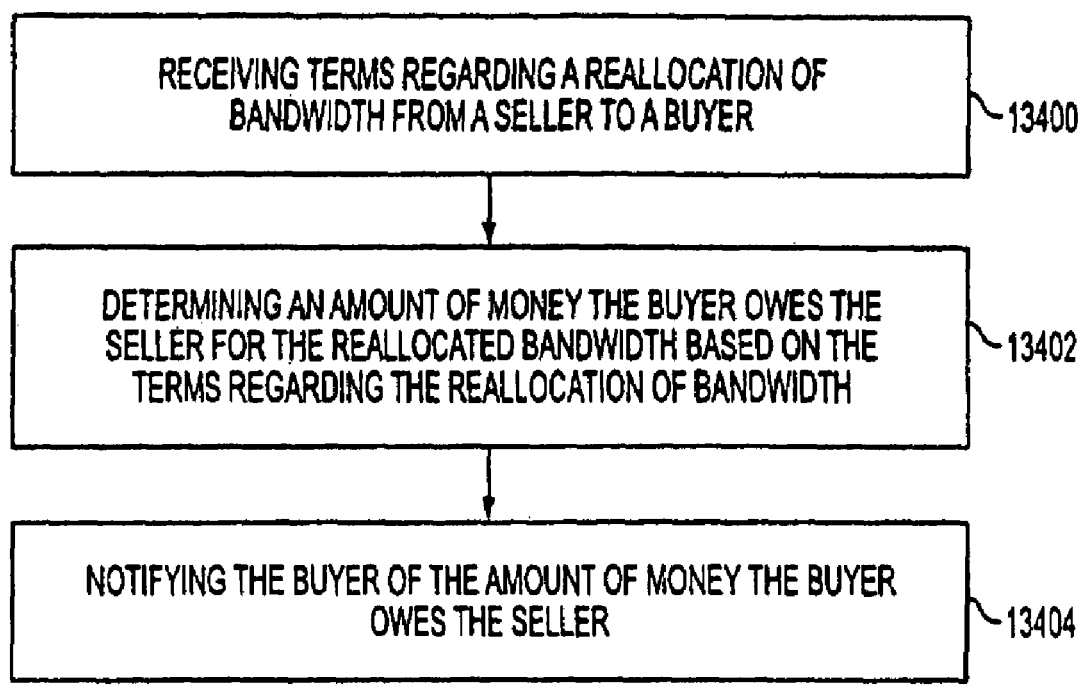

FIG. 134 illustrates a method of performing clearing and settlement functions in a bandwidth market environment. First, terms regarding a reallocation of bandwidth from a seller to a buyer are received in operation 13400. These terms may be received from input of the seller and buyer. Alternatively, the terms may be taken from a set of guidelines concerning the transaction. In any case, the terms may set forth, for example, the purchase price, time for transfer of the bandwidth, penalties, latency requirements, etc. See the discussion with reference to FIGS. 135 through 139 below for more detail.

Then, in operation 13402, an amount of money the buyer owes the seller for the reallocated bandwidth is determined based on the terms regarding the reallocation of bandwidth. Most often, this may be calculated as the price per unit of bandwidth times the number of units of bandwidth being sold and taking into account any penalties and discounts. If amounts of bandwidth of more than one seller are sold together such as under a contract as discussed above, the amount of money the buyer owes each seller is calculated. More detail is provided below in the discussion referencing FIGS. 135 through 139.

Finally, in operation 13404, the buyer is notified of the amount of money the buyer owes the seller. Notification may be made in a variety of ways. One is through email. Another is via facsimile. Yet another way is an automated voice message sent via telephone. Also, a printout with the amount on it (i.e., a bill) may be sent to the buyer via a delivery service such as the United States Postal Service.

Optionally, the present invention may verify that the terms regarding the reallocation of bandwidth have been complied with. This could include verifying the amount of bandwidth that the seller is offering for sale. This could also include verifying that the seller has relinquished control of the bandwidth. Further, the buyer's access to the newly purchased bandwidth could be verified.

In one embodiment of the present invention, usage data may be received from the buyer and used to determine the amount of money the buyer owes the seller for the reallocated bandwidth. In such an embodiment, the buyer could be allowed to purchase bandwidth according to the buyer's requirements. The buyer would then only be liable for the amount of bandwidth actually used, plus incidental costs.

The usage data may also be used to determine the cost per unit of bandwidth. Bandwidth used during peak hours is most often more valuable than, say, bandwidth used in the middle of the night. Thus, the usage data could include times of use of the bandwidth as well as the particular amount of bandwidth used during peak hours.

Optionally, the usage data may be correlated with corresponding terms via a contract identifier (Contract ID as discussed above) associated with the usage data. The contract identifier would allow the DVNS or a settlements process to correlate the use of bandwidth back to the original transaction to ensure that the proper party is being billed.

A transaction fee may be charged for performing the determination of the amount of money the buyer owes the seller for the reallocated bandwidth. The transaction fee may be a percentage of the total value of the bandwidth traded or sold, or may be a flat fee charged per transaction.

Additionally, as the present invention manages both the bandwidth market and Clearinghouse functions, it is also the natural choice for arbitrating disputes between distributors.

In an exemplary embodiment of the present invention, operations 13400 and 13402 of FIG. 134 are handled by a data processing based apparatus which makes an automated trading market for one or more amounts of bandwidth. The system retrieves the best obtaining bid and asked prices from a remote data base covering the ensemble of institutions or others making a market for the relevant amounts of bandwidth. Data characterizing each bandwidth buy/sell order requested by a customer is supplied to the system. The order is qualified for execution by comparing its specific content fields with predetermined stored parameters. The stored parameters include items such as the operative bid and asked current market prices, the amount of bandwidth available for customer purchase or sale as appropriate, and the maximum acceptable single order size.

As used herein, the terms "buy" and "sell" refer to customer and distributor purchases and sales. It should be noted that when a customer purchases an amount of bandwidth, the market maker sells the amount of bandwidth from its position, either reducing a long position, increasing a short position, or both where the amount of bandwidth sold to the customer exceeds the initial long position. When a customer sells bandwidth, the market maker adds bandwidth to its position and/or reduces a short position in the bandwidth.

The system may be implemented by any digital data processing equipment per se well known to those skilled in the art, e.g., any common bus system interconnecting a digital processor, manual data entry terminal apparatus, one or more memories (one of which contains the controlling program), and output signaling apparatus such as a cathode ray tube and printer. The system may be coded in any program language per se well known to those skilled in the art. The process variables may be of any form which conform to the constraints of the particular language being used and the below listed variables are for purposes of illustration only.

In the operation of an illustrative system, the below listed process variables may be utilized:

| Variable | Functional Description |
|---|---|
| Order Variable | |
| BWTH | An order field identifying a particular amount of bandwidth a customer wishes to buy or sell. |
| AMT | Amount of bandwidth BWTH in a transaction. |
| CUSTID | Customer identification. |
| B/S | Buy vis-a-vis sell bit, identifying whether the customer wishes to buy or sell bandwidth BWTH |
| PR/M | An order variable field containing a customer price for a limit order (minimum price for a sale of bandwidth or a maximum price he will pay for a purchase)-or a code designating a market order where the customer will accept the currently prevailing market price. |
| SP | Special instructions field (e.g., special commission structure or the like. |
| .0.RN | Order number (usually sequential). |
| .0.RIGID | Identification of the originator of the transaction (e.g., a branch office or account executive). |
| Market Trade Criteria | |
| BSTB(BWTH) | Best bid price for the bandwidth BWTH as retrieved from the Bandwidth Market, i.e., the highest price some market maker is willing to pay for the amount of bandwidth. This is an indexed variable, or array, having one element for each amount of bandwidth handled by the system proprietor. The other arrays below are similarly indexed by BWTH. |
| BSTA(BWTH) | Best asked price for the amount of bandwidth BWTH supplied by Bandwidth Market, i.e., the lowest price a market maker is willing to sell the bandwidth BWTH. |
| BSZ(BWTH) | Buy size, which is the amount of bandwidth (the array index BWTH) available for customer purchase at a particular price from the system proprietor |

-continued

| Variable | Functional Description |
| --- | --- |
| SSZ(BWTH) | The amount of bandwidth BWTH that the market maker will accept from customer sales at a particular price (a sell size array). |
| .0.RSZ(BWTH) | The maximum acceptable order size which the system operator will accept for the bandwidth BWTH. |
| Profitability Variables | |
| AVCST(BWTH) | Average cost of the amount of bandwidth BWTH. |
| P.0.S(BWTH) | The amount of bandwidth (current position) of each type of bandwidth BWTH held by the market maker. P.0.S(BWTH) is positive for a long position and negative for a short position. |
| LP.0. S(BWTH) | The previous (last) position of the market maker in the bandwidth BWTH before execution of a current trade in BWTH. |
| PR(BWTH) | Profit to date made by the system operator on purchases or sales of bandwidth BWTH. |

Figure 135:
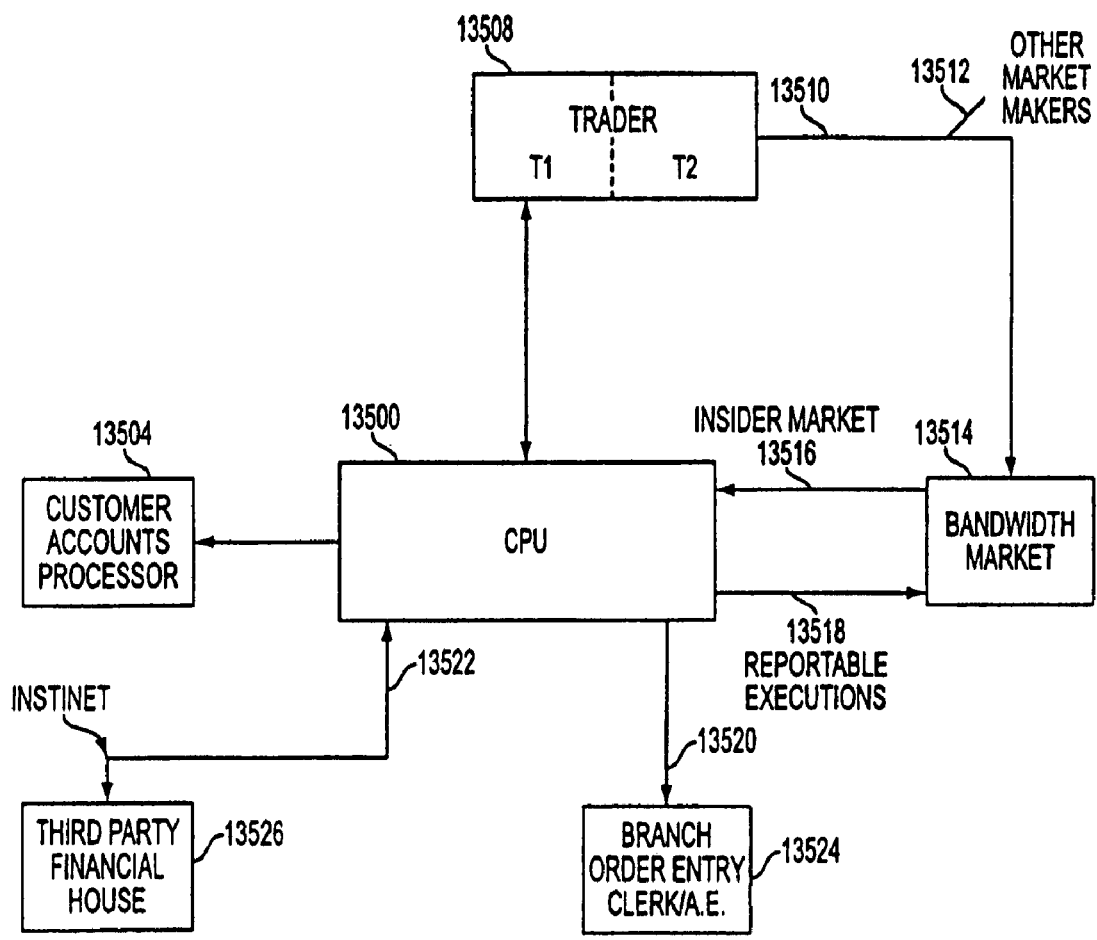

FIG. 135 illustrates in overview a system arrangement for implementing the over the counter (or other) bandwidth market making system of one embodiment of the instant invention. For specificity and without limitation, over the counter bandwidth trading is presumed and it will further be assumed that the market making institution (system proprietor) is a brokerage firm. The market making system includes composite digital computing apparatus 13500 which includes a processor and ancillary memory. The memory constituents of processor 13500 store the system controlling program, and an appropriate scratch pad memory stores all necessary processing operands. Digital computer 13500 is connected by an output line 13502 to a customer account processor 13504, for example the brokerage firm computer which handles all of the customer account records and files including customer balances, bandwidth positions, trade records, and the like. It should be understood that CPU 13500 and customer account processor 13504 could be combined in single, integrated computing equipment.

The processor 13500 communicates over a link 13506 with a trader terminal position 13508 containing an output signaling device such as a cathode ray tube display, and data input apparatus such as a keyboard. Trader terminal 13508 has two portions. A terminal position section T1 communicates with the processor 13500; and a section T2 is connected by link 13510 to a bandwidth market system 13514. The trader terminal 13508 communicates its current bid and asked prices for bandwidth s in which it makes a market to bandwidth market via link 13510—as do other market makers bridged (13512) to link 13510. The terminal portions T1 and T2 may be one integrated smart terminal (computer) assembly, or two separate devices available to the trader at the station 13508.

The processor 13500 receives and stores the best (highest) bid (processing variable BSTB(BWTH)) for each amount of bandwidth (BWTH) in which it makes a market, and the best (lowest) asked price BSTA(BWTH) from the bandwidth market system 13514 via a communications path 13516. The best bid and best asked prices as reported by the bandwidth market form the so-called "insider market" for over the counter amounts of bandwidth. Processor 13500 communicates to the bandwidth market system 13514 via a link 13518 each reportable, executed trade for various informational and regulatory purposes. Link 13518 may also report trades to the Consolidated Tape Authority (CTA) and the NASD National Market System (NMS) for subsequent reporting to the financial industry and general public.

Communications path 13518 also connects processor 13500 with the NASD small order execution system (SOES) and computer assisted execution system (CAES) which can participate in relatively small order execution.

Input/output network 13520 provides data communication with the various branch offices 13524 of the brokerage house. Line 13520 permits communication with either the branch order entry clerk or directly to the account executives at each branch. While only one branch 13524 is shown in FIG. 135, it is to be understood that a multiplicity of branches 13524 are in data communication with processor 13500. Computer 13500 also communicates with third party financial houses 13526 via a two-way data link 13522 (e.g., including INSTINET).

To characterize the FIG. 135 arrangement in overview, the operative (best bid, best asked inside market) prices for each amount of bandwidth in which the system proprietor makes a market are communicated over link 13516 from bandwidth market and repose in memory at processor 13500. The market maker has a position in each amount of bandwidth in which he makes a market and the particulars of that position also repose in memory within the composite processor 13500. Orders for trades in the relevant amounts of bandwidth are funneled to the processor 13500 in real time as they occur. Orders can be received in several ways. For example and most typically, orders may be generated by the brokerage firm's account executives at the branches 13524 and communicated to the CPU 13500 via the communication path 13520. Orders are also supplied to the processor 13500 from third party financial sources 13526 (e.g., other brokerage firms, directly from computer equipped customers, banks or the like) over communication network 13522. Each of the orders includes appropriate data fields outlined above and more fully discussed below, such as an identification of the office and customer or other originator of order, bandwidth identification, price particulars and so forth.

The processor 13500 first determines whether or not each received order can be executed, i.e., "qualifies" the order. There are various reasons why an order may not be executed by the market maker. Thus, for example, the customer may seek to sell an amount of bandwidth above the current bid price or to purchase the amount of bandwidth below the current asked price. A customer may seek to trade an amount of bandwidth which exceeds the amount which the particular market maker is willing to accommodate, either in gross or for any one order. Orders not executable, i.e., orders not qualified, are either stored in memory in the processor 13500 for later execution if they become qualified (such as by a favorable change in the market price for an amount of bandwidth which can then accommodate the customer's price limits) or are forwarded to other market makers for potential execution over communication links 13518 or 13522.

Assuming that an order is executable, the processor 13500 "executes" the order, appropriately adjusting all balances. Information characterizing the executed order is sent to computer 13504 for customers of that brokerage house or reported to the appropriate other institution via links 13518 or 13522. The specifics of appropriate transactions may also be reported to the NASD for informational purposes and to the Consolidated Tape Authority and so forth and may become ticker entries.

The bandwidth market system 13514 is apprised of the current quotations from all traders making a market in the subject amounts of bandwidth via communication path 13510. The insider market (best bid and asked prices) are communicated to the market maker's processor 13500 via link 13516. When the insider market price changes (a variation in the best bid or best asked price), the processor 13500 in accordance with the instant invention signals the trader at station 13508 who is then given the opportunity to readjust his quantity or other market-characterizing criteria. Following each price change, all non-executable orders stored in the processor 13500 memory are reviewed to determine whether they have become executable and, if so, they are in fact executed. Processing then continues as above described to accommodate the real time order inflow.

Figure 136:
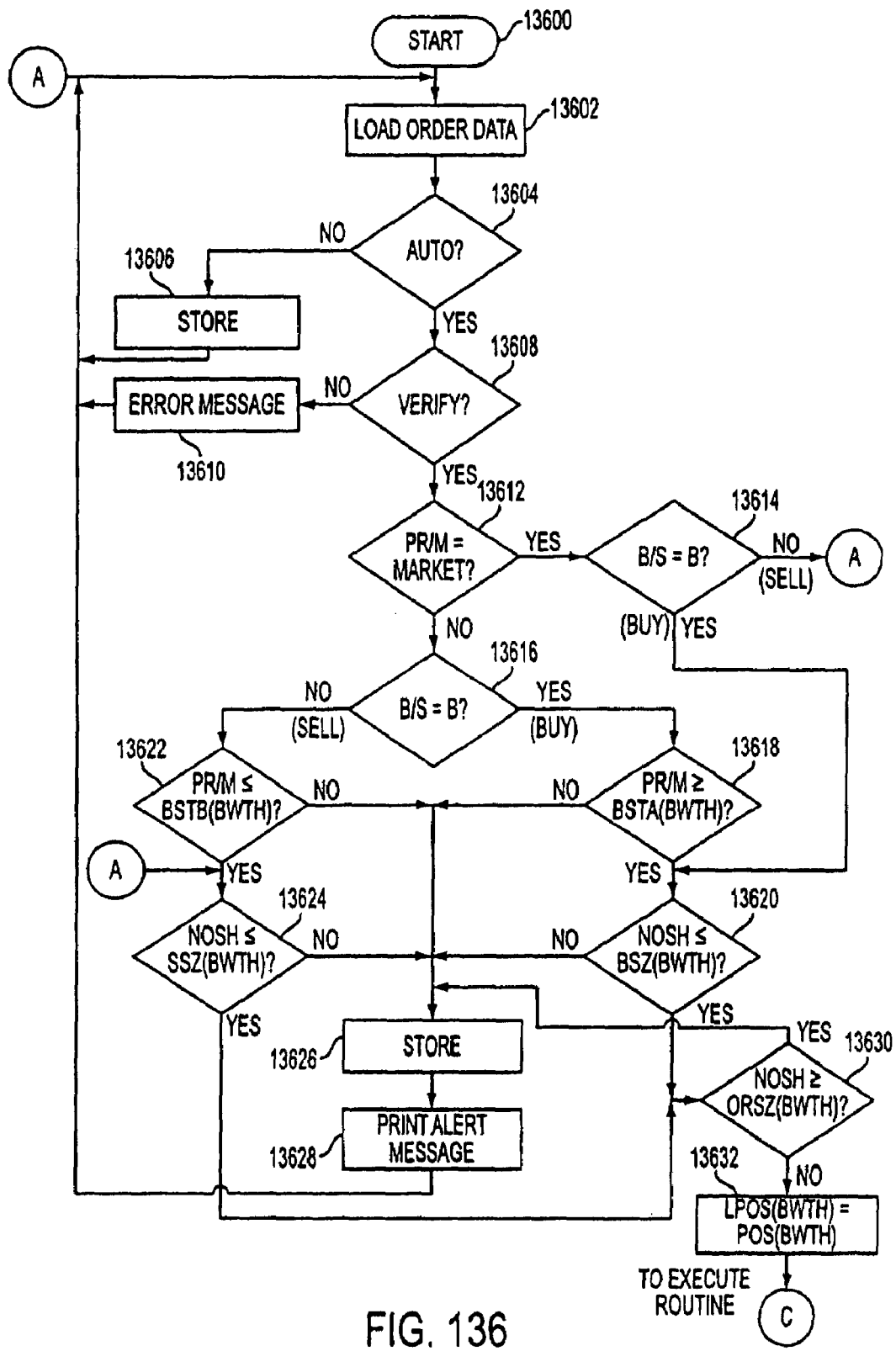

With the above overview in mind, attention is now directed to FIG. 136 which is a flow chart of data processing for qualifying for execution an order communicated from a branch order entry clerk or account executive. Proceeding from a start node 13600, the data fields comprising this next-recorded order is loaded (block 13602). The order data fields include the name of the amount of bandwidth (BWTH); the total amount of bandwidth for the transaction (AMT); customer identification (CUSTID); a buy vis-a-vis sell bit (B/S); the customer's price limit if he wants one or, if not, a market order designator (PR/M); special instructions if any (SP); an order number (.0.RN); and an originator (e.g., office, account executive, or third party institution) identification (.0.RIGID).

The computer includes a number of stored variables characterizing the market for the bandwidth BWTH which the customer wishes to trade, and the market maker's own criteria for his participation in BWTH trading. Thus, for example, the computer stores the best bid BSTB(BWTH); the best asked price BSTA(BWTH); the buy size BSZ (BWTH), i.e., the total amount of bandwidth BWTH the market maker is willing to sell for customer purchase at the current price; the market maker's sell size SSZ(BWTH); the maximum single order size for bandwidth BWTH which the market maker will accept .0.RSZ(BWTH); the present amount of bandwidth BWTH long or short in the market maker's position P.0.S(BWTH)—long being positive and short being negative; the average cost per unit of bandwidth AVCST(BWTH) for the bandwidth BWTH long or short in the market maker's portfolio; and a running profit total PR(BWTH) of the market maker in the bandwidth BWTH. Block 13604 functioning next determines if order processing is operative in the normal, automated market mode for the particular amount of bandwidth BWTH. If not (please see below with respect to FIG. 139), program flow branches to block 13606 to store the order for later retrieval or manual execution. Program flow then returns to start node 13600 for retrieval of the next order. Assuming normal automated mode processing (YES output of test 13604), program flow continues to test 13608 to verify the incoming data (order) to assure correct reception and internal consistency. If an error occurred, an error message is produced (block 13610) and program flow returns to the start node 13600 for entry of the incoming next order. In the usual case, the order is verified at test 13608, and program flow continues to block 13612 to determine if the order is a market order or has a limit price (test of the PR/M variable).

If the order is not a market order but rather is to be executed at or better than a customer specified price (N.0. branch from test 13612), program flow proceeds to block 13616 which distinguishes a customer buy (B/S=B) from a sell order (B/S=S).

If it is a buy order (YES, (BUY) branch from test 13616), block 13618 determines if the price at which the order is to be executed (contents of PR/M) is greater than or equal to the prevailing asked price (BSTA(BWTH)) of the bandwidth. If the purchase price of the order to be executed is greater than the best asked price (YES branch of test 13618), block 13620 determines if the amount of bandwidth AMT in the trade is less than or equal to the amount of bandwidth available for purchase from the market maker, i.e., less than the buy size BSZ(BWTH). If so (YES branch of test 13620), the amount of bandwidth AMT in the transaction is compared to the maximum acceptable single order size .0.RSZ (BWTH)—step 13630. Assuming this final criteria is satisfied (N.0. exit), the order is qualified for execution, and program flow continues to block 13632 where a variable storing the last position in bandwidth BWTH, LP.0.S (BWTH) is set equal to P.0.S(BWTH). The program thereafter proceeds to order execution as detailed in FIG. 12 and discussed below.

If the price or buy size tests performed at blocks 13618 and 13620 fail (N.0. branch), or if the order size test performed at block 13630 indicates the order is too large (YES branch), the order is not qualified for and will not be executed. When any of these conditions obtain, program flow branches to block 13626 to store the order for possible later execution if market conditions or market maker criteria change. An appropriate report is generated at block 13628 via terminal 13508 (FIG. 135) to characterize non-executed order. Thereafter program flow returns to node 13600 to process the next received order. The human market system controller receiving the report may of course over-ride and complete the trade by hand or manual entry—e.g., by authorizing more bandwidth (increasing BSZ(BWTH)) if that criterion inhibited order execution.

The foregoing analysis has considered a limit buy order. Returning now to block 13616, program flow for a customer sale will next be considered. If the buy/sell flag signals a sale, program flow branches to block 13622 where the PR/M limit price is compared to the best bid price (PR/M.ltoreq.B-STB(BWTH)). If so (YES branch), the amount of bandwidth AMT in the order is compared against the available sell size (AMT.ltoreq.SSZ(BWTH)). If there is sufficient bandwidth in the sell size (YES branch), block 13630 determines if the amount of bandwidth (AMT) is greater than the maximum permissible single order size (.0.RSZ(BWTH)). If the amount of bandwidth AMT does not exceed .0.RSZ(BWTH) all criteria are satisfied and the sell order will be executed. Processing proceeds to block 13632 where the "last" position intermediate processing variable LP.0.S(BWTH) is set equal to P.0.S(BWTH), and order execution proceeds as set forth in FIG. 137. If any price or sell size test performed at blocks 13622, or 13630 fails, program flow branches to block 13626 for storage and reporting (block 13628).

The above description details order qualification for a limit price transaction. In a trade that is to be executed at market, the price tests performed at block 13618 for a buy and block 13622 for a sale are by-passed. Accordingly, when block 13612 determines that the order is to be executed at market (PR/M=market), block 13614 is reached and branches the program to size test 13624 for a customer sale and test 13620 for a customer purchase. The system then operates in the manner above described, qualifying the order for execution if the two operative size criteria are satisfied or, otherwise, storing the order and reporting (step 13628).

FIG. 137 illustrates data processing for executing and accounting for orders that have been qualified for execution by the order qualifying data processing of FIG. 136. A block 13700 determines whether the order is a customer purchase or sale. If the buy/sell digit signals indicate a customer buy, program flow branches to block 13702 for decrementing the amount of bandwidth remaining available for customer purchase (BSZ(BWTH)) from the market maker. BSZ(BWTH) is decremented by the amount of bandwidth (AMT) purchased by the customer, i.e., BSZ(BWTH)=BSZ(BWTH)−AMT. The market maker's position in the bandwidth is algebraically decremented by the amount of bandwidth purchased, P.0.S(BWTH)=P.0.S(BWTH)−AMT (step 13704). If at block 13700 it is determined that the order is a sell, block 13706 decrements sell size SSZ(BWTH) by the amount of bandwidth sold to the customer, SSZ(BWTH)=SSZ(BWTH)−AMT. The market maker's position P.0.S(BWTH) in the bandwidth is updated by algebraically incrementing the amount of bandwidth sold by the customer, P.0.S(BWTH)=P.0.S(BWTH)+AMT (step 13708).

After the position P.0.S(BWTH), buy size BSZ(BWTH), and sell size SSZ(BWTH) variables have been updated, program flow continues to block 13710 where messages confirming execution of the trade are furnished to the customer account processor 13504 which sends out confirmations of the transaction and otherwise performs the necessary accounting functions for the customer account. The branch clerk or account executive 13524 is also notified of order execution via link 13520. The order variables CUS-TID, SP, .O.RN and .0.RIGID are used to appropriately distribute trade reporting, proper commission computation and the like. Further, the transaction price is typically communicated to the bandwidth market system 13514 and the various tape services for reporting. The updated internal market maker variables (e.g., SSZ(BWTH), BSZ(BWTH), LP.0.S(BWTH), P.0.S(BWTH)) are stored in memory for use in subsequent order transactions (step 13712). Program flow proceeds to block 13714 to update the market maker's average per unit of bandwidth inventory cost AVCST(BWTH) and profit PR(BWTH) internal management variables for the bandwidth BWTH, the data processing for which is described below in conjunction with FIGS. 137 and 138. After inventory updating and profit accounting, data processing exits at node 13716 ready to process the next trade.

Figure 138:
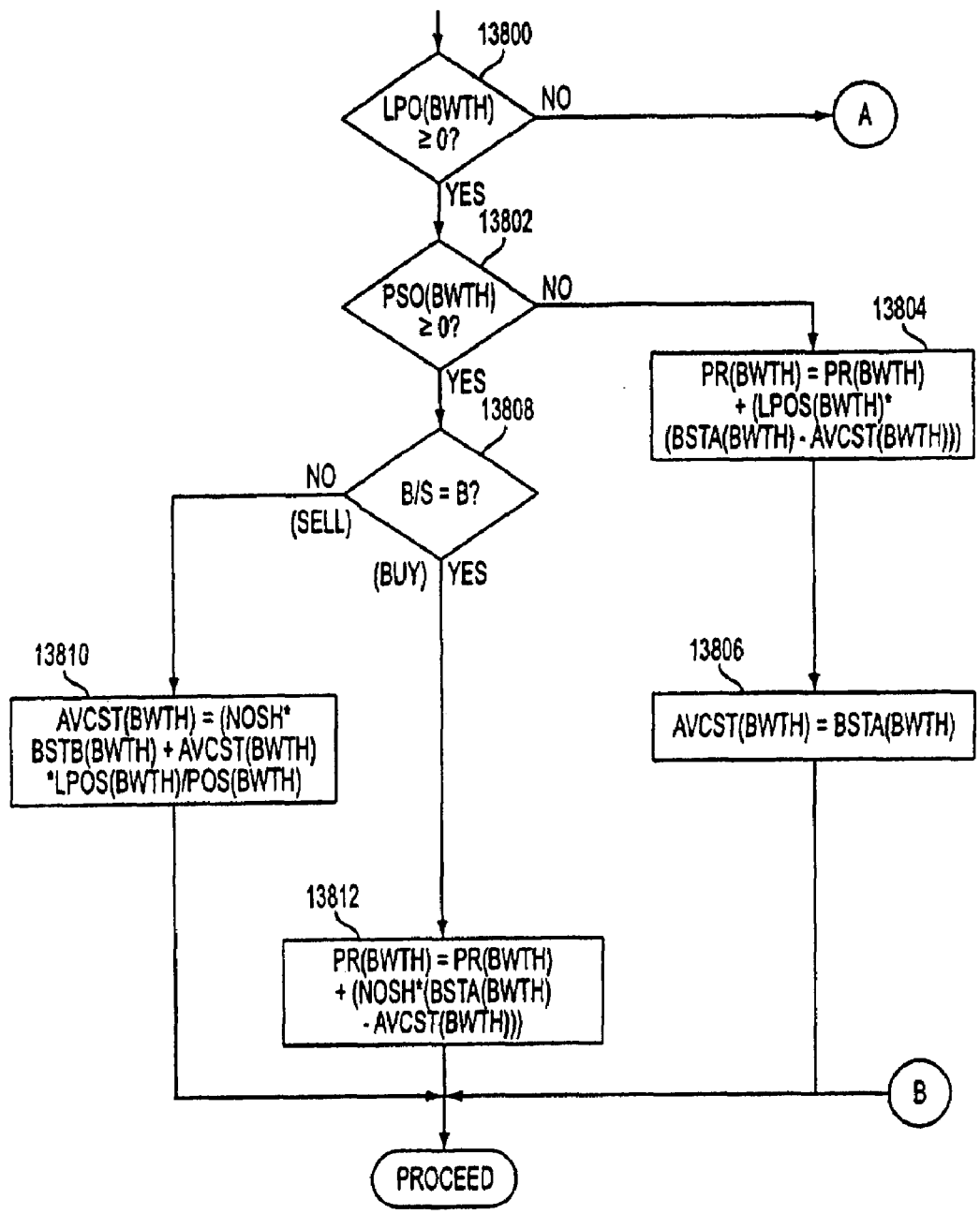

FIGS. 138 and 139 are the left and right portions of a flow chart for the data processing of block 13714 (FIG. 137) for updating the inventory cost (average price per unit of bandwidth AVCST(BWTH)) of the bandwidth BWTH and the running profit PR(BWTH) realized from the execution of each trade. To this end, the last position of the market maker LP.0.S(BWTH) before the just executed trade is tested to determine whether the market maker was previously long or short in the bandwidth BWTH (step 13803). If LP.0.S(BWTH).gtoreq.0 then the market maker's previous position was long and program flow proceeds to block 13802 where the present (post trade) position of the market maker P.0.S(BWTH) is tested to determine if it is long (P.0.S(BWTH).gtoreq.0?=YES) or short (N.0.). If the market maker's present position is short (N.0. branch), the transaction was a branches to block 13804 to update profit PR(BWTH) for bandwidth BWTH, as by:

$$PR(BWTH)=PR(BWTH)+(LP.0.S(BWTH)*(BSTA(BWTH)-AVCST(BWTH))). \qquad \text{Eq. 1.}$$

In the right side of the programming statement of Equation 1, the variable BSTA(BWTH)−AVCST(BWTH) is the profit (or loss) margin on the sale representing the difference between the current asked price BSTA(BWTH) at which the trade occurred and the average cost per unit of bandwidth AVCST(BWTH) of the bandwidth. When multiplied by the amount of bandwidth previously in the long position (LP.0.S(BWTH)), the right factor following the plus sign in the statement of Equation 1 is the profit (or loss) for the transaction. When added to the previous running profit total PR(BWTH), the final result stored in PR(BWTH) is an updated running total of the profit of the market maker in the bandwidth BWTH since the PR(BWTH) storage array element was last cleared.

Thereafter for the assumed event, program flow proceeds to block 13806 where the average cost per unit of bandwidth of the new short position in the bandwidth is calculated. In this instance, the average cost of the bandwidth is equal to the operative asked price, i.e., AVCST(BWTH)=BSTA(BWTH). FIG. 138 programming then exits at the PROCEED node.

If at block 13802 the market maker's present position is long (P.0.S(BWTH).gtoreq.0?=YES), program flow continues to test 13808 where the buy/sell digit determines whether the transaction is a customer purchase or sale. If the trade is a customer sale thus increasing the initially long LPOS(BWTH) position, it is an inventory transaction and program flow branches to block 13810 to update the average cost of the BWTH bandwidth position:

$$AVCST(BWTH)=((AMT*BSTB(BWTH))+(AVCST(BWTH)*LP.0.S(BWTH)))/P.0.S(BWTH). \qquad \text{Eq. 2.}$$

In the statement of Equation 2, AMT*BSTB(BWTH) is the cost of the bandwidth just purchased from the customer and AVCST(BWTH)*LP.0.S(BWTH) is the cost of the previous LP.0.S(BWTH) inventory. Thus, by dividing the sum of the new and former purchases by the amount of bandwidth held P.0.S(BWTH) the new average cost AVCST(BWTH) is determined.

If at block 13808 the transaction was determined to be a customer purchase (market maker sale), program flow proceeds to block 13812 where the market maker's profit is updated:

$$PR(BWTH)=PR(BWTH)+(AMT*(BSTA(BWTH)-AVCST(BWTH))). \qquad \text{Eq. 3.}$$

The above FIG. 138 processing has reviewed the three possibilities beginning with a long (positive) market maker bandwidth position entering a transaction as signaled by the contents of LP.0.S(BWTH). Comparable functioning obtains if the contents of LP.0.S(BWTH) in test 13800 are negative, signaling an initial short position (N.0. output of test 13800). Assuming such an initial short position, program flow passes to that shown in FIG. 139 which is the analog of that shown in FIG. 138.

In brief, a test 13900 of FIG. 139 determines whether the present position P.0.S(BWTH) is short or long. If the present position is also short (P.0.S(BWTH)<0), program flow proceeds to block 13902 where the buy/sell bit is read. If the buy/sell digit indicates a customer buy, the transaction represents an inventory accumulation (the previous short position in LP.0.S(BWTH) being increased in P.0.S(BWTH)) and program flow branches ("YES") to block 13904 where the average cost of the bandwidth is updated:

$$AVCST(BWTH)=((AMT*BSTA(BWTH))+(AVCST(BWTH)*LP.0.S(BWTH)))/P.0.S(BWTH). \qquad \text{Eq. 4.}$$

If at block 13902 the transaction is determined a sell, block 13906 updates the profit total:

$$PR(BWTH)=PR(BWTH)+(AMT*(BSTB(BWTH)-AVCST(BWTH))). \quad \text{Eq. 5.}$$

As a final possibility in FIG. 139, if at block 13900 the market maker's present position is long (P.0.S(BWTH) <0?=N.0.), the transaction was necessarily a customer sale (market maker purchase), and program flow branches to block 13908 where the profit PR(BWTH) is updated:

$$PR(BWTH)=PR(BWTH)+(LP.0.S(BWTH)*(BSTB(BWTH)-AVCST(BWTH))). \quad \text{Eq. 6.}$$

The average cost per unit of bandwidth of the new P.0.S(BWTH) short position is the best bid (transaction) price (AVCST=BSTB(BWTH))–block 13910. This concludes the profit and cost updating for the transaction.

In most instances, more than one institution makes a market in a particular amount of bandwidth. Any market maker may change its bid or asked price at any time, transmitting the change to the bandwidth market system via link 13510 as above discussed. In such an instance, it may be necessary to update the market maker's own prices—as where the change affects the insider market (best current bid and asked) to afford the customer execution at the best prevailing price. FIG. 140 is a flow chart illustrating data processing upon receipt of a new market maker quotation from the bandwidth market system 13514. Beginning at an interrupt entry node 14000, the system is placed in non-automatic execution mode (step 14002) which prevents automatic execution of any orders in the particular amount of bandwidth (BWTH) until the market maker has had a chance to respond to the new market prices. If at block 14004 it is determined that the best bid BSTB(BWTH) or best asked BSTA(BWTH) price has changed, program flow proceeds to block 14006 where the best bid BSTB(BWTH) and/or best asked price BSTA(BWTH) are updated to the new values received from bandwidth market.

The system then interactively communicates with the trader terminal 13508 in block 14008. A prompt appears on trader T1 terminal 13508 requesting input regarding possible changes in the maximum acceptable order size (0.0.RS (BWTH)), the amount of bandwidth available for customer purchase (BSZ(BWTH)), and the amount of bandwidth acceptable for customer sales (SSZ(BWTH)). After input of the requested parameters (or initializing to default values), any orders previously stored in memory are reprocessed (block 14010) as these orders may now be qualified for execution due to the change in price or other parameters. After stored orders are reviewed and executed if possible, data processing is restored to automatic mode (block 14012)—as by simply setting a variable AUT.0. to a predetermined state (e.g., "AUT.0."), and interrupt mode is exited at node 14014. If at block 14004 it is determined that the insider market price was not changed by the new market maker quotation, program flow branches directly to block 14012 to restore automatic mode and exit interrupt mode.

The market making system of the above-described invention has thus been shown to automatically accommodate a random, real time order flow for bandwidth purchases or sales. Incoming orders are first examined to assure that they satisfy currently operative criteria regarding bandwidth price, bandwidth availability and bandwidth order size. Those orders being qualified under the existing criteria are executed and profit and inventory price internal management storage elements are appropriately updated to reflect the several transactions experienced by the system. Orders not qualified for execution are stored and re-examined from time to time for possible later executability. The system proceeds automatically without human intervention, save to update operative market maker order qualification criteria.

In another exemplary embodiment of the present invention, payment of the amount of money that the buyer owes the seller is requested, such as through sending the user a bill. Further, the amount of money for the reallocated bandwidth can be received from the seller, where it will be processed and sent to the seller, placed in an account of the seller, and/or used to pay amounts of money the seller owes to a third party or for the transaction fee.

In an alternate embodiment, an operator captures consumer payment directives using a telephone with a small text display. These consumer payment directives are sent to a central computer operated by the system, which then uses an automated teller machine network to obtain funds in the amount of the payment from the consumer's automated teller machine-accessible bank account. Once the funds are obtained into an account of the system operator, the system determines how to pay the biller, either by wire transfer, debit network using the biller's bank account number, or by check and list.

Several exemplary embodiments of the present invention for performing clearing and settlement functions include bill pay or remittance processing systems as set forth below. For brevity and clarity, the consumer's account with the biller is referred to herein as the C-B ("consumer-biller") account, thereby distinguishing that account from other accounts: the consumer's account with its bank, the biller's account with its bank, etc. In most cases, the biller uses the C-B account number to uniquely identify the consumer in its records.

Bill pay transactions, however accomplished, have several common elements, which are either explicit or can be implied by the nature of the transaction. The first is presentment: a biller presents the consumer with a bill showing the C-B account number and an amount due. The second common element is payment authorization: the consumer performs some act (e.g., signs a check or other negotiable instrument) which authorizes the consumer's bank to transfer funds from the consumer's account to the biller; this element might occur after presentment or before (as in the case of pre-authorized withdrawals), and need not be explicit (delivery of a check is implicit authorization for the amount of the check). This element is almost always accompanied by some action by the consumer bank to ensure payment to it from the consumer, such as withdrawing the funds from consumer's bank account, posting the amount to the consumer's credit card account or line of credit, etc. The third common element is confirmation to the consumer of the funds withdrawal. The fourth common element is the crediting of the payment to the C-B account. In some cases, the biller acknowledges the crediting with nothing more than refraining from sending a past due bill.

FIGS. 141 through 143 show block diagrams of bill pay systems which implement these four common elements in different ways. In those block diagrams, the participants are shown in ovals, and the flow of material is shown by numbered arrows roughly indicating the chronological order in which the flows normally occur. The arrows embody a link, which is a physical link for paper flow, a data communications channel from one point to another, or other means for transferring material. Where several alternatives exist for a flow, the alternatives might be shown with a common number and a letter appended thereto, such as "2" and "2A". "Material" refers to documents and/or information, whether paper-based ("postal mail"), electronic (e-mail, messages, packets, etc.), or other transfer medium. In most cases, the material which is flowing is shown near the arrow which links the material's source and destination.

FIG. 141 is a block diagram of a paper bill pay system 14100, wherein billers send paper bills or coupon books to consumers and consumers return paper checks and payment coupons. The proof and capture process for these remittances is highly automated, except for the aptly-named "exception items."

In bill pay system 14100, the participants are a consumer C (14102), a biller B (14104), consumer C's bank (Bank C) 14106, biller B's bank (Bank B) 14108 and, optionally, a lockbox operator 14110. Bank C maintains consumer C's bank account 14112 and a clearing account 14114, while Bank B maintains biller B's bank account 14116 and a clearing account 14118. The material passing between the participants includes a bill 14120, a remittance 14122 comprising a check 14124 and a payment coupon 14126, an account statement 14128, an accounts receivable ("A/R") data file 14130, an encoded check, which is check 14124 with MICR encoding, and possibly a non-sufficient funds ("NSF") notice 14136.

The flow of material between participants in bill pay system 14100 begins (arrow 1) when biller B sends bill 14120 through the postal mails to consumer C. Bill 14120 indicates a C-B account number and an amount due, and is typically divided into an invoice portion to be retained by consumer C and a payment coupon portion to be returned, each of which shows the C-B account number and amount due.

In response to receiving bill 14120, consumer C sends remittance 14122 to biller B (arrow 2). Remittance 14122 contains check 14124 drawn on consumer C's account 14112 at Bank C and payment coupon 14126, preferably included in the return envelope provided by biller B. Biller B then MICR encodes the amount of the remittance onto check 14124 to create encoded check 14134, and deposits check 14134 (arrow 3), and credits consumer C's account in biller B's customer general ledger ("G/L") account database 14132. Alternately, remittance 14122 is mailed to lockbox operator 14110 (arrow 2A), which opens remittance 14122, MICR encodes check 14124 to create encoded check 14134, captures the C-B account number and amount of the check electronically to create A/R data file 14130. Lockbox operator 14110 then sends A/R data file 14130 to biller B, and sends encoded check 14134 to Bank B to be credited to biller B's account 14116 (arrow 3A). Because check 14134 is signed by consumer C, it authorizes Bank C to pass the amount of the check to Bank B after Bank B presents the check to Bank C. The signed check serves as the second common element of a bill pay transaction: authorization.

However encoded check 14134 reaches Bank B, Bank B then presents check 14134 to Bank C, along with other checks received by Bank B which were drawn on Bank C accounts (arrow 4). When Bank C receives check 14134, it withdraws the amount of the check from C's account 14112 and passes the funds to B's account at Bank B (arrow 5). Actually, this funds transfer occurs from C's account 14112 to clearing account 14114, to clearing account 14118, and then to B's account 14116, possibly with one or more intermediate settlement banks in the chain (omitted for clarity).

If the funds are not available in C's account 14112 to cover the amount of check 14134 or if C's account 14112 has been closed, then Bank C will return the check to Bank B, who will in turn return the check to biller B. Biller B will then have to reverse the transaction crediting consumer C's C-B account in G/L database 14132 and renegotiate payment from consumer C, all at significant cost to biller B. Even if check 14134 clears, the process of providing good funds to biller B is not instantaneous, since check 14134 must physically travel from biller B to Bank B to Bank C. Of course, if biller B has sufficient credit rating with Bank B, Bank B could move the funds from clearing account 14118 to B's account 14116 when Bank B receives check 14134.

At some time following the clearing of check 14134, biller B also updates its A/R records in G/L database 14132 to credit consumer C's C-B account, and Bank C confirms to consumer C the withdrawal of the amount of check 14134 by listing it on statement 14128 and/or by the return of cancelled check 14134. If the check doesn't clear, then biller B and other parties to the transaction unwind the payment.

One benefit of bill pay system 14100 is that, for nearly all billers, there is no need for biller enrollment (any consumer can pay a biller without prior arrangements or a waiting period).

Similar to the above system is the GIRO systems used in several countries in Northern Europe. The GIRO systems were set up there either by the government or the postal system, which is a traditional supplier of financial services. In a GIRO system, it is mandated that each bill payer and each bill payee be assigned a GIRO number. The biller sends bills with its biller GIRO number on the payment coupons. The layout, shape, etc. of the GIRO payment coupons is also mandated, so a consumer will receive similar coupons with each bill. After reviewing the bill, the consumer simply adds their GIRO number to the payment coupon and signs it. Thus, the payment coupon also serves as a banking instrument similar to a check.

The consumers in a GIRO system are comfortable with it because the payment coupons all look the same. The consumer then mails the payment coupons to either a GIRO central processor or its own bank, which then sorts them by biller GIRO number and submits them to the biller. Since the payment coupons are all in a fixed format, they can be easily encoded in a machine readable format, including the payment amount, which the biller pre-prints onto the coupon. If the consumer gives their GIRO number to the biller, the biller can also pre-print that number on the payment coupon as well. Since all the coupons look the same, the banks can process them like a check and achieve economies of scale.

FIG. 142 is a block diagram of an alternate bill pay system 14200, which reduces the effort required on the part of consumer C relative to bill pay system 14100, but which increases costs for billers. The difference between bill pay system 14200 and bill pay system 14100 is that consumer C initiates payment electronically (or by other non-check means).

Bill pay system 14200 includes most of the same participants as bill pay system 14100: consumer C, Bank C, Bank B, possibly a lockbox operator (not shown in FIG. 142), and biller B, who is typically not a proactive or willing participant in this system. Additionally, a service bureau S (14202) and a Bank S (14204) are participants, with service bureau S maintaining a service database 14206 which is used to match bill payment orders with billers. The material passing among the participants includes bill 14120, as in the prior example, as well as a bill payment order 14208 and related confirmation of receipt 14216 (both typically transmitted electronically), an enrollment package 14209, a biller confirmation 14210, a bill payment 14212 ("check and list") which includes check 14214.

In bill pay system 14200, consumer C enrolls in bill pay system 14200 by sending service bureau S (arrow 1) enrollment package 14209 comprising a voided check and list of billers to be paid by S on behalf of C. S subsequently sends biller B biller confirmation 14210 (arrow 2) to verify (arrow 3) that C is indeed a customer of B.

With bill pay system 14100 (FIG. 141), consumer C identifies the proper biller by the remittance envelope and the payment coupon, neither of which is available to service bureau S in bill pay system 14200. Thus, service bureau S must identify the correct biller for each bill payment order some other way. Typically, service bureau does this by asking consumer C for biller B's name, address, telephone number and consumer C's account number with biller B ("C-B account number"). Since neither Bank C nor service bureau S may have any account relationship with biller B, they must rely upon consumer C's accuracy in preparing enrollment package 14209 which is used to put biller B's information into service database 14206.

Service bureau S typically requires this information only once, during biller enrollment, storing it to service database 14206 for use with subsequent payments directed to the same billers. Of course, if this information changes, service database 14206 would be out of date. If this information is wrong to start with, or becomes wrong after a change, service bureau S might send funds to the wrong entity. What a service bureau will often do to reduce errors in biller identification is to not allow the consumer to make payments to a biller for a specified time period after enrolling the biller, to allow service bureau S to verify biller B and the C-B account structure with biller B in a biller confirmation message 14210.

Sometime later, consumer C receives bill 14120 (arrow 4) and initiates bill payment order 14208 (arrow 5). Bill payment order 14208 includes authorization for service bureau S to withdraw funds from C's account 14112 to pay bill 14120, the amount to pay (not necessarily the amount due on bill 14120), the date on which to pay, and some indication of biller B as the payee. Service bureau S responds with confirmation of receipt 14216 indicating that bill pay order 14208 was received (arrow 6). Consumer C can send bill pay order 14208 in any number of ways, such as using a personal computer and modem, directly or through a packet of other data network, via an automatic teller machine (ATM), video touch screen, a screen phone, or telephone Touch-Tone pad (TTP) interacting with a voice response unit (VRU). However this is done, service bureau S receives one or more bill pay orders from consumer C. These orders could be instructions to pay some amount for a bill or a set amount of money at periodic intervals.

Assuming that service bureau S has correctly identified and confirmed that biller B is a biller which consumer C desired to pay with bill pay order 14208, then service bureau S passes the funds to biller B as biller payment 14212 (arrow 12) after securing funds to cover the remittance. Bill payment can take several forms as discussed below. In FIG. 142 a "check and list" is depicted, which is common in the art. A check and list comprises a single payment, check 14214 drawn on service bureau S's account 14218, accompanied by a list of all consumers whose individual remittances are aggregated in the single check. The list shows C-B account numbers and payment amounts for each consumer included on the list which should total to the amount of the single check 14214. This process brings some economies of scale to service bureau S, although at additional expense to biller B. In some cases, rather than endure the expense of checking over the list to ensure it matches the check amount, biller B will refuse to accept that form of payment.

To secure funds, service bureau S clears check 14134 through Bank S 14204 drawn on C's account 14112 at Bank C (arrows 7–11). S then sends payment 14212 to biller B (arrow 12). Biller B must treat payment 14212 as an exception item, posting G/L database 14132 from the list instead of payment coupons as in bill pay system 14100. Biller B deposits check 14214 with Bank B (arrow 13) who clears it through Bank S and a settlement account 14220 to obtain good funds for B's account 14116 (arrows 14–142). If the bill pay transaction goes through, Bank C will confirm that it went through by sending a confirmation (typically statement 14128) to consumer C. The cycle is completed (arrow 18) when consumer C receives notice that funds were withdrawn from C's account 14112 for the amount entered in bill pay order 14208.

Several variations of the system shown in FIG. 142 are used today. In one variation, S sends an individual check 14134 (unsigned—signature on file) drawn on C's account 14112 to biller B in response to bill pay order 14208. This clears as in bill pay system 14100 (FIG. 141, arrows 3–7), but B must process these one at a time, since they are exception items. This reduces the possibility that B will refuse to process check 14134, since it only differs from the expected payment form by lacking a coupon. Thus, biller B is less likely to refuse this form of payment over a check and list, and the biller is less likely to have problems of the list not balancing or having bad account numbers.

In a second variation, instead of a check from Bank C cleared through Bank S to credit S's account 14218, S has Bank S submit a debit to C's account 14112 through the Automated Clearing House ("ACH") (see FIG. 143 and accompanying text). In a third variation, in place of arrows 12–17, ("check and list"), S may send A/R data and a credit to biller B through one path of: i) Bank S to ACH to Bank B to biller B or ii) MasterCard's RPS (Remittance Processing System) to Bank B to biller B. As used here, the RPS is merely an alternative to the ACH. In a fourth variation, a combination of the second and third variations, S sends simultaneous ACH transactions (debit account 14112 and credit account 14116).

FIG. 143 is a block diagram of yet another bill pay system 14300, which is usually used with billers who expect regular, periodic and small payments. Relative to the previously discussed bill payment systems, billers generally prefer bill pay system 14300 when they are set up to handle such transactions.

Bill pay system 14300, while providing more efficient remittance processing by biller B due to its increased control over the process, leaves consumer C with very little control over the bill pay transactions after the relationship is set up, since consumer C is typically required to give biller B an open ended authorization to withdraw funds. Furthermore, bill pay system 14300 is not appropriate for all types of billers, such as those who do not have an on-going and predictable relationship with consumers.

FIG. 143 introduces several new items which flow among the participants including ACH 14302, such as a voided check 14306, a debit advice 14308, a pre-authorization message 14310, and a debit request message 14312. In bill pay system 14300, biller B is required to maintain an additional customer database 14304.

For bill pay system 14300 to work properly, there is an enrollment phase (arrows 1–4) and an operational phase (arrows 5–13). In the enrollment phase, consumer C gives biller B voided check 14306, which biller B uses to initiate pre-authorization message 14310. Biller B is not allowed by ACH 14302 to directly submit pre-authorization message 14310, which means Bank B, an ACH Originating Financial Depository Institution (OFDI), must get involved and submit message 14310 to Bank C, an ACH Receiving Financial Depository Institution (RFDI). After pre-authorization message 14310 is accepted by Bank C, Bank C will accept Bank B initiated automatic debits to be posted to C's account 14112. In the operational phase, biller B queries customer database 14304 to determine if consumer C is enrolled as an automatic debitor. If so, biller B optionally sends debit advice 14308 to consumer C, and sends debit request message 14312 to biller B's bank, Bank B, which then sends it through the ACH 14302 to Bank C, which debits C's account 14112 and transfers the funds to biller B's account 14116 via the ACH. The transaction is confirmed to consumer C on bank statement 14128 sent to consumer C from Bank C. In this system 14300, debit request message 14312 might be rejected by Bank C for, among other reasons, non-sufficient funds, resulting in the flows along arrows 10–12.

Centralized vs. De-centralized DVNS

One issue that the bandwidth market raises is the question of where to place certain DVNS functions. The current strategy of many bandwidth providers is built upon a DVNS that runs and operates completely at the distributor. However, there may be some benefit to a bandwidth provider in moving part of the DVNS functions from the distributor to a Network Business Center (NBC) or Network Operations Control Center (NOCC). In particular, by placing most of the DVNS Operations Manager functionality at a centralized location, the bandwidth provider may have a much better view on the state of the network. In an exemplary model, each DVNS is responsible for setting up calls for their CPEs. While the DVNS has a good idea of how its customers are using the network, the NOCC may not have a good handle on the overall network. By moving call setup to a central location, the bandwidth provider's operators can get a complete overview of what is happening on the network at all times. This eliminates the possibility of a DVNS over-allocating bandwidth to its customers.

In addition to providing better network management capabilities, centralized call setup opens up some interesting possibilities. As a single system will know the state of the network at all times, it could potentially increase prices in those areas where demand is greatest. Armed with real-time call information, a centralized management system could analyze the information and automatically raise the bandwidth providers' wholesale prices in high traffic areas. On a similar note, the bandwidth providers could also lower their prices in areas where the network is underutilized in order to stimulate demand. Assuming bandwidth demand is elastic, this would allow a bandwidth provider to price its wholesale services at the exact point where supply hits demand, optimizing its revenues.

In order to maintain a sense of autonomy, a bandwidth provider could offer its distributors a series of APIs that allow them access to Operations Management functions at the central location. In addition, a graphical user interface could be developed to permit remote configuration and management. The central application could be designed in such a way that distributors would only have access to their managed partition.

One downside of this approach is the need to split the Operations and Service Managers. As the Service Manager provides the distributors with specific functions that map their value added services, or content, to the bandwidth providers, they will need to be tailored to each distributor. For this reason, the Service Manager will probably need to reside at the distributor's location. Any hooks between the Service Manager and Operations Manager that are required to map content to a bandwidth provider's services, will have to traverse the bandwidth provider's network.

Another downside to a centralized call setup mechanism is that it represents a single point of failure. However, this could be solved by providing a backup system located at another site.

It is important to note that the bandwidth market will work irrespective of where the DVNS Operations Management functions are located.

Capacity Management/Customer Questonnaires

The service provider may use a process that basically uses what is called "the 3 minute switch time" which is a expected time of telephone usage for a call to be made from one party to another. This is the basis for capacity management. With data, video and other communication methods coming into the marketplace this method becomes more and more obsolete. By developing detailed Demand Management models, the present invention allows one to look at the causes for usage of this capacity based on Economics, Demographics, Population, Business/Retail shifts and the impact it will have on the Network capacity. The Business goals and objectives of the Service Providers may also be integrated to establish an approved working model (approved model by the Service Provider) that may be executed over the eSpace as part of a collaborative process in an end to end supply chain. This may be applied at any point of the supply chain.

Theses Demand Management models may also be built based on a causal forecast standpoint based on demographics and economic models based on demand to support the business goals and objectives of a service provider. Demand planning tools are used to integrate information into how clients meet their individual business demands. They choose which one they want, and they execute it through the supply chain. With modeling the issues focus more on, "What do I need and how do I deploy it and determine optimal deployment." Also, there may be a lot of installation planning by gathering information through the supply chain how it should be built, when it should be built and where to build it. Quickly and expeditiously. So, what it becomes is multi-company materials management utilizing e-tools.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method carried out by a computerized framework manager to supply collaborative planning comprising:
   (a) furnishing connections to a network for use by a plurality of business entities, wherein the plurality business entities comprise at least one of service providers, vendors, resellers, and manufacturers;
   (b) receiving information via the network from a first business entity of the plurality of business entities, including information relating to a demand of the first business entity for offerings;
   (c) receiving information via the network from a second business entity of the plurality of business entities, including information relating to a supply of offerings from the second business entity;

(d) analyzing the supply and the demand for the offerings to plan future supply and demand for the offerings;
(e) using the network to facilitate planning between the first business entity and the second business entity;
(f) using the network to provide data access from multiple simultaneous data sources for demand and supply planning;
(g) using the network to store capacity data wherein the step of storing capacity data using the network includes replication and synchronization capabilities; and
(h) using the network to conduct reverse inventory management between the first business entity and the second business entity, comprising:
   using a network to collect data relating to usage and events occurring on at least one service provided by at least one service provider;
   analyzing the data to determine a status of the service;
   using the status of the service to predict future demand by the service provider for equipment offering supplied by a manufacturer;
   determining production capacity, inventory, costs and discounts of manufacturer offerings based on the status of the service; and
   using the network to suggest changes to the manufacturer offerings inventory of at least one manufacturer based on the status of the service in order to optimize supply and costs of the manufacturer offerings.

2. A computer program embodied on a computer readable medium and executable on a computer for a computerized framework manager to supply collaborative planning comprising:
(a) a code segment furnishing connections to a network for use by a plurality of business entities, wherein the plurality business entities comprise at least one of service providers, vendors, resellers, and manufacturers;
(b) a code segment for receiving information via the network from a first business entity for the plurality of business entities, including information relating to a demand of the first business entity for offerings;
(c) a code segment for receiving information via the network from a second business entity of the plurality of business entities, including information relating to a supply of offerings from the second business entity;
(d) a code segment for analyzing the supply and the demand for the offerings to plan future supply and demand for the offerings;
(e) a code segment for using the network to facilitate planning between at least the first business entity and the second business entity;
(f) a code segment for using the network to provide data access from multiple simultaneous data sources for demand and supply planning;
(g) a code segment for using the network to store capacity data wherein the step of storing capacity data using the network includes replication and synchronization capabilities; and
(h) a code segment for using the network to conduct reverse inventory management between the first business entity and the second business entity, comprising:
   a code segment for using a network to collect data relating to usage and events occurring on at least one service provided by at least one service provider;
   a code segment for analyzing the data to determine a status of the service;
   a code segment for using the status of the service to predict future demand by the service provider for equipment offering supplied by a manufacturer;
   a code segment for determining production capacity, inventory, costs and discounts of manufacturer offerings based on the status of the service; and
   a code segment for using the network to suggest changes to the manufacturer offerings inventory of at least one manufacturer based on the status of the service in order to optimize supply and costs of the manufacturer offerings.

3. A system for a computerized framework manager to supply collaborative planning comprising:
(a) a module for providing connections to a network for use by a plurality of business entities, wherein the first and second business entities comprise at least one of service providers, vendors, resellers, and manufacturers;
(b) a module for receiving information via the network from a first business entity of the plurality of business entities, including information relating to a demand of the first independent business entity for offerings;
(c) a module for receiving information via the network from a second business entity of the plurality of business entities, including information relating to a supply of offerings from the second business entity;
(d) a module for analyzing the supply and the demand for the offerings to plan future supply and demand for the offerings;
(e) a module for using the network to facilitate planning between at least the first business entity and the second business entity;
(f) a module for using the network to provide data access from multiple simultaneous data sources for demand and supply planning;
(g) a module for using the network to store capacity data wherein the step of storing capacity data using the network includes replication and synchronization capabilities; and
(h) a module for using the network to conduct reverse inventory management between the first business entity and the second business entity, comprising:
   a module for using a network to collect data relating to usage and events occurring on at least one service provided by at least one service provider;
   a module for analyzing the data to determine a status of the service;
   a module for using the status of the service to predict future demand by the service provider for equipment offering supplied by a manufacturer;
   a module for determining production capacity, inventory, costs and discounts of manufacturer offerings based on the status of the service; and
   a module for using the network to suggest changes to the manufacturer offerings inventory of at least one manufacturer based on the status of the service in order to optimize supply and costs of the manufacturer offerings.

* * * * *